US009382356B2

(12) United States Patent
Tohi et al.

(10) Patent No.: US 9,382,356 B2
(45) Date of Patent: Jul. 5, 2016

(54) CATALYST FOR OLEFIN POLYMERIZATION, METHOD FOR PRODUCING OLEFIN POLYMER, METHOD FOR PRODUCING PROPYLENE-BASED COPOLYMER, PROPYLENE POLYMER, PROPYLENE-BASED POLYMER COMPOSITION, AND USE OF THOSE

(75) Inventors: Yasushi Tohi, Ichihara (JP); Masahiko Okamoto, Chiba (JP); Ryoji Mori, Ichihara (JP); Tatsuya Nakamura, Ichihara (JP); Takashi Yukita, Chiba (JP); Takashi Nakagawa, Ichihara (JP); Miyuki Konno, Nerima-ku (JP); Yuichi Yamamura, Ichihara (JP); Shiegenobu Ikenaga, Ichihara (JP); Mayumi Hiwara, Chiba (JP); Naritoshi Hirota, Takaishi (JP); Hiromasa Marubayashi, Chigasaki (JP); Kouji Nagahashi, Kuga-gun (JP); Shiro Otsuzuki, Hatsukaichi (JP); Tomohiro Yamaguchi, Kuga-gun (JP); Masashi Higuchi, Takaishi (JP); Yasuo Ichiki, Takaishi (JP); Takayuki Kajihara, Funabashi (JP)

(73) Assignee: MITSUI CHEMICALS, INC., Tokyo (JP)

( * ) Notice: Subject to any disclaimer, the term of this patent is extended or adjusted under 35 U.S.C. 154(b) by 159 days.

(21) Appl. No.: 11/984,440

(22) Filed: Nov. 16, 2007

(65) Prior Publication Data
US 2008/0220193 A1    Sep. 11, 2008

Related U.S. Application Data

(63) Continuation-in-part of application No. PCT/JP2006/309972, filed on May 18, 2006.

(30) Foreign Application Priority Data

| May 18, 2005 | (JP) | 2005-144873 |
| Jul. 25, 2005 | (JP) | 2005-214685 |
| Nov. 9, 2005 | (JP) | 2005-324814 |
| Jan. 20, 2006 | (JP) | 2006-012494 |
| Jan. 20, 2006 | (JP) | 2006-012970 |
| Jan. 20, 2006 | (JP) | 2006-012971 |
| Feb. 24, 2006 | (JP) | 2006-047857 |
| Apr. 13, 2006 | (JP) | 2006-111398 |
| Apr. 13, 2006 | (JP) | 2006-111399 |
| Apr. 20, 2006 | (JP) | 2006-116963 |
| May 1, 2006 | (JP) | 2006-127890 |
| May 1, 2006 | (JP) | 2006-127891 |
| Nov. 17, 2006 | (JP) | 2006-312233 |
| Nov. 22, 2006 | (JP) | 2006-316026 |

(51) Int. Cl.
*C08F 210/06* (2006.01)
*C08F 10/00* (2006.01)
(Continued)

(52) U.S. Cl.
CPC .............. *C08F 210/06* (2013.01); *C08F 10/00* (2013.01); *C08J 5/18* (2013.01); *C08L 23/14* (2013.01);
(Continued)

(58) Field of Classification Search
CPC .............. C08F 210/06; C08F 4/65908; C08F 4/65912; C08F 10/00; Y10T 428/1397; C08J 5/18; C08J 2323/10; C08L 23/142; C08L 23/14; C08L 2205/025; C08L 2205/03; C08L 2314/06
USPC ................... 526/351, 943; 525/240
See application file for complete search history.

(56) References Cited

U.S. PATENT DOCUMENTS

| 3,046,606 A | * | 7/1962 | Carter ........................... 264/141 |
| 4,262,051 A | * | 4/1981 | Welz et al. ..................... 442/396 |

(Continued)

FOREIGN PATENT DOCUMENTS

| CN | 1327448 A | 12/2001 |
| EP | 0 351 391 A2 | 1/1990 |

(Continued)

OTHER PUBLICATIONS

Machine translation of JP 2004161957 (2004).*

(Continued)

*Primary Examiner* — Callie Shosho
*Assistant Examiner* — John Freeman
(74) *Attorney, Agent, or Firm* — Foley & Lardner LLP

(57) ABSTRACT

A catalyst for olefin polymerization, comprising:
(A-1) a bridged metallocene compound represented by the following Formula [1-1], and (b) at least one compound selected from: (b-1) an organoaluminum oxy compound, (b-2) a compound which forms an ion pair, and (b-3) an organoaluminum compound:

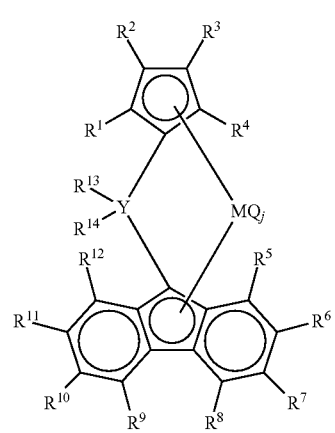

[1-1]

wherein in Formula [1-1], $R^1$, $R^2$, $R^3$, $R^4$, $R^5$, $R^8$, $R^9$, and $R^{12}$ are each selected from a hydrogen, a hydrocarbon group and a silicon-containing group; the four groups of $R^6$, $R^7$, $R^{10}$, and $R^{11}$ are not hydrogen atoms, and are each selected from a hydrocarbon group or a silicon-containing group; $R^{13}$ and $R^{14}$ are each a hydrocarbon group or the like, excluding a hydrogen atom and a methyl group; M is Ti, Zr or the like; Y is carbon or the like; Q is a halogen or the like; and j is an integer from 1 to 4.

13 Claims, 6 Drawing Sheets

(51) Int. Cl.
*C08J 5/18* (2006.01)
*C08L 23/14* (2006.01)
*C08F 4/659* (2006.01)

(52) U.S. Cl.
CPC .......... *C08L 23/142* (2013.01); *C08F 4/65908* (2013.01); *C08F 4/65912* (2013.01); *C08F 4/65916* (2013.01); *C08J 2323/10* (2013.01); *C08L 2205/025* (2013.01); *C08L 2205/03* (2013.01); *C08L 2314/06* (2013.01); *Y10T 428/1397* (2015.01)

(56) References Cited

U.S. PATENT DOCUMENTS

| | | | | |
|---|---|---|---|---|
| 5,213,744 A | * | 5/1993 | Bossaert | 264/173.19 |
| 5,232,992 A | * | 8/1993 | Asanuma et al. | 525/240 |
| 5,232,993 A | | 8/1993 | Winter et al. | |
| 5,476,914 A | | 12/1995 | Ewen et al. | |
| 5,525,690 A | | 6/1996 | Chien et al. | |
| 5,637,367 A | * | 6/1997 | Asanuma et al. | 428/36.92 |
| 5,759,469 A | * | 6/1998 | Asanuma et al. | 264/235 |
| 5,837,773 A | * | 11/1998 | Olivier et al. | 525/72 |
| 6,121,394 A | | 9/2000 | Sugimoto et al. | |
| 6,342,568 B1 | * | 1/2002 | Sunaga et al. | 526/160 |
| 6,469,188 B1 | * | 10/2002 | Miller et al. | 556/12 |
| 6,693,153 B2 | | 2/2004 | Miller et al. | |
| 6,800,707 B2 | * | 10/2004 | Razavi | 526/160 |
| 6,939,928 B1 | | 9/2005 | Kawai et al. | |
| 7,335,711 B2 | * | 2/2008 | Marin et al. | 526/160 |
| 7,393,965 B2 | * | 7/2008 | Tohi | C07F 17/00 502/103 |
| 7,449,533 B2 | | 11/2008 | Kawai et al. | |
| 2003/0060584 A1 | | 3/2003 | Coates et al. | |
| 2004/0077805 A1 | | 4/2004 | Razavi | |
| 2005/0148460 A1 | * | 7/2005 | Marin et al. | 502/152 |
| 2005/0261235 A1 | | 11/2005 | Koizumi et al. | |
| 2006/0025299 A1 | | 2/2006 | Miller et al. | |
| 2006/0116303 A1 | * | 6/2006 | Iimura et al. | 508/591 |

FOREIGN PATENT DOCUMENTS

| | | | |
|---|---|---|---|
| EP | 0 351 391 A3 | 1/1990 | |
| EP | 0 500 944 A1 | 9/1992 | |
| EP | 0773238 A2 * | 5/1997 | |
| EP | 1 179 553 A1 | 2/2002 | |
| EP | 1 548 018 A1 | 6/2005 | |
| EP | 1 731 533 A1 | 12/2006 | |
| EP | 1 803 742 A1 | 7/2007 | |
| JP | 2-274703 | 11/1990 | |
| JP | 3-12439 | 1/1991 | |
| JP | 03-081128 | 4/1991 | |
| JP | 4-69394 | 3/1992 | |
| JP | 4-80214 | 3/1992 | |
| JP | 04-332740 | 11/1992 | |
| JP | 05-017589 | 1/1993 | |
| JP | 05-162158 | 6/1993 | |
| JP | 06-075101 | 3/1994 | |
| JP | 7-247387 | 9/1995 | |
| JP | 8-59916 | 3/1996 | |
| JP | 8-67713 | 3/1996 | |
| JP | 9-216640 | 8/1997 | |
| JP | 10-101689 | 4/1998 | |
| JP | 2000-191852 | 7/2000 | |
| JP | 2000-191856 A | 7/2000 | |
| JP | 2000-191858 | 7/2000 | |
| JP | 2000-212194 | 8/2000 | |
| JP | 2001-172448 | 6/2001 | |
| JP | 2001-172450 A | 6/2001 | |
| JP | 2001-526730 | 12/2001 | |
| JP | 2002-97325 | 4/2002 | |
| JP | 2003-147135 | 5/2003 | |
| JP | 2004-161957 | 6/2004 | |
| JP | 2004-175759 | 6/2004 | |
| JP | 2004161957 A * | 6/2004 | C08F 4/64 |
| JP | 2004-182715 | 7/2004 | |
| JP | 2004-182725 | 7/2004 | |
| JP | 2004-189666 | 7/2004 | |
| JP | 2004-189667 | 7/2004 | |
| JP | 2004-238520 | 8/2004 | |
| JP | 2004-244044 | 9/2004 | |
| JP | 2005-53131 | 3/2005 | |
| JP | 2005-314680 | 11/2005 | |
| JP | 2006-056128 | 3/2006 | |
| WO | WO-01/55227 A2 | 8/2001 | |
| WO | WO-01/55227 A3 | 8/2001 | |
| WO | WO 2004/067627 A1 | 8/2004 | |
| WO | WO 2007/022244 A2 | 2/2007 | |

OTHER PUBLICATIONS

Ewen, John A. et al., "Syndiospecific Propylene Polymerizations with Group 4 Metallocenes", Journal of the American Chemical Society, Aug. 1988, vol. 110, No. 18, pp. 6255-6256.
Kaminsky, Walter et al., "Polymerization of Propene and Butene with a Chiral Zirconocene and Methylalumoxane as Cocatalyst", Angewandte Chemie International Edition in English, Jun. 1985, vol. 24, No. 6, pp. 507-508.
Taiwanese Office Action mailed Dec. 7, 2009 in Taiwanese Application No. 095117662.
European Search Report mailed Nov. 13, 2009 in European Application No. 06746639.1.
Chinese Office Action with English translation, Application No. 2006800170896, dated Oct. 23, 2009, 9 pgs.
Korean Office Action, Application No. 2009-043994936, dated Oct. 26, 2009, 6 pgs.
Alt, et al. "Effect of the Nature of Metallocene Complexes of Group IV Metals on Their Performance in Catalytic Ethylene and Propylene Polymerization" Chemical Reviews, 2000, vol. 100, pp. 1205-1221.
Miller, et al. "Highly Stereoregular Syndiotactic Polypropylene Formation with Metallocene Catalysts via Influence of Distal Ligand Substituents" Organometallics, 2004, vol. 23, pp. 1777-1789.
Office Action in JP Appln No. 2006-155044 dated Jun. 13, 2011. (partial translation).
Office Action in JP Appln. No. 2006-155116 dated Jun. 15, 2011. (partial translation).
Polypropylene Handbook, Japan, Kogyo Chosakai Publishing Co., Ltd., Jul. 20, 2001, First Edition pp. 480-483. (partial translation).
Extended European Search Report issued in European Patent Application No. 10176161.7 dated Jan. 7, 2015.
F. G. Karssenberg et al., Chain Microstructure of Homogeneous Ethylene-1-Alkene Copolymers and Characteristics of Single Site Catalysts Using a Direct $^{13}C$ NMR Peak Method. Part III. Application to Ethylene-Propylene Copolymers Showing No Inversion, Journal of Polymer, Science Part B: Polymer Physics, vol. 44, No. 4, Jan. 12, 2006, pp. 747-755.
Frederik G. Karssenberg et al., Bernoullian, Terminal, Penultimate or Third Order Markov Statistics? Macromolecular Theory and Simulations., vol. 14, No. 5, Jun. 2, 2005, pp. 295-299.
Partial European Search Report issued in European Patent Application No. 10176160.9 dated Jan. 13, 2015.
Extended European Search Report dated Apr. 29, 2015 issued in European Patent Application No. 10176160.9.
Rosa et al., "Synthesis and Characterization of High-Molecular-Weight Syndiotactic Amorphous Polypropylene", Journal of the American Chemical Society, vol. 125, No. 36, Jan. 1, 2003, pp. 10913-10920.

* cited by examiner

CATALYST FOR OLEFIN POLYMERIZATION, METHOD FOR PRODUCING OLEFIN POLYMER, METHOD FOR PRODUCING PROPYLENE-BASED COPOLYMER, PROPYLENE POLYMER, PROPYLENE-BASED POLYMER COMPOSITION, AND USE OF THOSE

TECHNICAL FIELD

The present invention (1) relates to a catalyst for olefin polymerization which contains a bridged metallocene compound having a specific structure, and a method for producing an olefin polymer using the catalyst for olefin polymerization.

The present invention (2) relates to a method for producing a propylene-based copolymer.

The present invention (3) relates to a propylene polymer, and molded products obtained from the polymer, and more particularly, to a syndiotactic propylene polymer, and molded products obtained from the polymer.

The present invention (4) relates to a propylene-based polymer composition, molded products formed from the composition, pellets formed from the propylene-based polymer composition, a modifier for thermoplastic polymer comprising the pellets, and a method for producing a thermoplastic resin composition.

The present invention (5) relates to a propylene-based polymer composition, and molded products formed from the composition.

The present invention (6) relates to a propylene-based polymer composition, and molded products using the composition.

BACKGROUND ART

So-called "metallocene compounds" are well known as homogeneous catalysts for olefin polymerization. Methods for polymerizing olefins using the metallocene compounds, particularly those methods for stereoregularly polymerizing α-olefins, have been the subject of numerous researches for amelioration, since the reports made by W. Kaminsky, et al. on isotactic polymerization, from the viewpoints of further enhancement of polymerization activity and improvement in stereoregularity (Non-Patent Document 1).

In an exemplary research, J. A. Ewen has reported that when propylene is polymerized in the presence of a catalyst comprising aluminoxane and a metallocene compound, which is a transition metal catalyst having a ligand of isopropylidene(cyclopentadienyl)(9-fluorene) synthesized from a ligand comprising cyclopentadienyl and fluorenyl bridged by isopropylidene, a polypropylene having a high tacticity with a syndiotactic pentad fraction of greater than 0.7 can be obtained (Non-Patent Document 2).

To improve this metallocene compound, it has been attempted to enhance the stereoregularity by replacing the fluorenyl with a 2,7-di-tert-butylfluorenyl group (Patent Document 1).

In addition to that, an attempt to enhance stereoregularity by replacing the fluorenyl with a 3,6-di-tert-butylfluorenyl group (Patent Document 2), or attempts to convert the bridging moiety which joins the cyclopentadienyl and fluorenyl (Patent Documents 3 and 4), have also been reported. Furthermore, dimethylmethylene(3-tert-butyl-5-methylcyclopentadienyl)(fluorenyl)zirconium dichloride having a methyl group introduced at the 5-position of the cyclopentadienyl ring, rather than dimethylmethylene(3-tert-butylcyclopentadienyl)(fluorenyl)zirconium dichloride, gives high molecular weight isotactic polypropylene (Patent Document 5).

However, the polymerization performance of these metallocene compounds is not sufficient. Moreover, with the catalysts of related art, it was not impossible to obtain α-olefin polymers having fairly high melting point, which is an index for stereoregularity, but polymers having high molecular weights could not be obtained. Thus, there has been a demand for production of a polymer having a fairly high melting point and a high molecular weight. Also, there has been a demand for a polymer having a higher melting point compared to the polymers of related art. Moreover, in order to enable industrialization, it is demanded to produce an α-olefin polymer having the above-described features at normal temperature or above, preferably at a high temperature exceeding normal temperature, but a catalyst which is capable of such production has not been reported heretofore.

Furthermore, even if an existing catalyst has improved polymerization performance for a specific α-olefin, the same catalyst cannot be said to be necessarily suitable for the polymerization of other α-olefins, for example, ethylene, and the catalyst had to be changed whenever the type of the polymer to be produced was varied, thus giving much inconvenience during the production.

Considering such circumstances, the inventors of the present invention have devotedly conducted research. As a result, the inventors have found that when an α-olefin such as, for example, propylene, is polymerized using a catalyst for olefin polymerization containing a specific transition metal catalyst, an α-olefin polymer having a high melting point can be obtained in a polymerization process at normal temperature, as well as in a polymerization process at a high temperature which is capable of industrialization, and also have found that even in the case of polymerizing α-olefins including ethylene as the main component under high temperature polymerization conditions, an ethylene-based polymer having a high molecular weight can be obtained with high polymerization activity, that is, the catalyst exhibits high performance in a wide range of polymerization processes, thus completing the present invention (1).

Meanwhile, a propylene-based copolymer is used in a variety of uses as a thermoplastic resin material or as a modifier for thermoplastic resin. As the polymerization catalyst used in the production of propylene-based copolymers, titanium-based catalysts and metallocene-based catalysts are known. However, in the case of using a titanium-based catalyst, there are problems such as that the composition of propylene that can be produced is limited, and the compatibility is not uniform because of wide molecular weight distribution. Furthermore, a metallocene-based catalyst shows excellent properties for copolymerization with α-olefins and enables polymerization of products with a wide range of composition, but on the other hand, there are problems such as that the molecular weight is not increased when polymerization is performed at high temperatures, and that the polymerization activity is so low that cost reduction cannot be achieved.

On the other hand, J. A. Ewen et al. found that when a catalyst comprising aluminoxane and a transition metal catalyst having a ligand of isopropylidene(cyclopentadienyl)(9-fluorene), in which cyclopentadiene and fluorene are bridged by isopropylidene, is used, a polypropylene having a high tacticity with a syndiotactic pentad fraction of greater than 0.7 can be obtained (Non-Patent Document 2).

It is also reported that a copolymer of propylene and ethylene with a high molecular weight can be obtained using a catalyst similar to the transition metal catalyst exhibiting syndiotactic polypropylene activity (Patent Document 6).

However, this transition metal catalyst has low polymerization performance at high temperatures, and in particular, needs further improvement in the molecular weight.

The present inventors report that a propylene-based copolymer having a high molecular weight can be obtained using a specific transition metal catalyst (Patent Document 7). However, there still is a demand for enabling production of high molecular weight polymers under higher temperature conditions.

Therefore, the present inventors have devotedly conducted research under such circumstances, and as a result, have found that a propylene-based copolymer obtained using a specific transition metal catalyst has a high molecular weight and can be produced by polymerization at high temperatures, thus completing the present invention (2).

Meanwhile, polypropylene includes isotactic polypropylene, syndiotactic polypropylene and the like, and among these, isotactic polypropylene is used in various uses because of its low cost, and excellent rigidity, heat resistance and surface gloss.

In contrast to this, it is known that syndiotactic polypropylene can be obtained by low temperature polymerization in the presence of a catalyst comprising a vanadium compound, ether and an organoaluminum compound. The polymer obtained by this method has low syndiotacticity, so that the polymer is not considered to properly show the original syndiotactic properties.

Recently, since J. A. Ewen et al. first discovered that polypropylene having high tacticity with a syndiotactic pentad fraction larger than 0.7 can be obtained by a catalyst comprising aluminoxane and a transition metal catalyst having an asymmetric ligand (J. Am. Chem. Soc., 1988, 110, 6255-6256 (Non-Patent Document 2)), numerous successful results concerning syndiotactic polypropylene have been disclosed. For example, JP-A No. 8-67713 (Patent Document 8) discloses a method for producing syndiotactic polypropylene using a catalyst comprising rac-2,2-dimethylpropylidene(1-$\eta^5$-cyclopentadienyl)(1-$\eta^5$-fluorenyl)dichlorometallocene of titanium, zirconium, hafnium and vanadium, and a co-catalyst. Also, the Applicant of the present invention disclosed that a syndiotactic polypropylene satisfying particular properties is produced using a polymerization catalyst comprising 1,4-cyclohexanediylidenebis[(cyclopentadienyl-9-fluorenyl)zirconium dichloride] (JP-A No. 4-802147 (Patent Document 9)).

Syndiotactic polypropylene has very high transparency, very high surface gloss and excellent flexibility compared to conventional isotactic polypropylene. Thus, in addition to the applications known for conventional isotactic polypropylene, such as films, sheets, fibers, injection molded products and blow molded products, new applications that so far could not be applied to isotactic polypropylene are expected. However, the syndiotactic polypropylene that can be obtained by the method described in the unexamined patent application publications described above, is slow in the rate of crystallization and has low crystallization temperature, thus having a problem of poor molding processability. For example, it is difficult for syndiotactic polypropylene to be crystallized even in the pelletization step during a continuous operation, and moreover the crystallization temperature is low, so that the time required in cooling an injection molded product or an extrusion processed film or sheet is much longer than that required by isotactic polypropylene. This property impedes the production rate of molded products, and consequently leads to an increase in the energy cost. There is also a need for further improvement in the moldability as well as in the balance between the heat resistance, transparency, rigidity and strength exhibited by molded products.

Materials prepared with plastics have been used in many industrial fields where needs cannot be met by using existing propylene-based resins only. Of the industrial fields, films for food containers and medical containers are required to be excellent in the balance between high heat resistance, flexibility, low temperature impact resistance, and transparency.

Recently, a demand for retort foods has been rapidly increased at home as well as in business fields, and thus the advent of packaging materials (retort pouches) which can pack a mass of foods at once has been desired. Retort foods are usually used for storage at room temperature or in a fridge or freezer over a long period of time, and thus a film for use in the packaging material is required to have a high heat sealing strength and a good low temperature impact resistance such that a content therein does not break out of the heat sealed part of the package. In addition, since the retort sterilization treatment is carried out at high temperature of about 100 to 140° C./through autoclave after the retort pouches are filled with foods and sealed, it is necessary for the heat sealed part to maintain its heat resistance and heat sealing strength during the treatment in view of ensuring the food quality. Meanwhile, since the sterilization at higher temperature for a shorter period of time leads to enhanced working efficiency as well as improvements in retaining the quality and function of the content, further improved heat resistance of a propylene-based resin for use in a sealant layer of retort pouches or the like has been demanded (JP-A No. 09-216640 (Patent Document 910)).

For medical containers, containers made from relatively flexible and soft vinyl chloride resins and ethylene/vinyl acetate copolymer resins have been generally used. These medical bags are advantageous in that contamination from outside will not happen because they have a closed system that requires no vent needle in infusion. However, since containers made from a soft vinyl chloride resin contain additives such as a plasticizer and a stabilizer, it has been necessary to prevent the dissolution thereof. In addition, since medical bags made from an ethylene/vinyl acetate copolymer resin have poor heat resistance, the resin has to be crosslinked (JP-A Nos. 2005-053131 and 2004-244044 (Patent Documents 11 and 12)).

The Applicant of the present invention has offered the following proposals before.

JP-A No. 3-12439 (Patent Document 10) proposes a syndiotactic polypropylene resin composition comprising a substantial homopolymer of propylene in which the peak intensity of syndiotactic pentad bonding of a methyl group in the spectrum determined by $^{13}$C-NMR is greater than or equal to 0.7 of the peak intensity of methyl groups in total, and a copolymer of ethylene and propylene. The composition has high syndiotacticity, and has excellent impact resistance and transparency.

JP-A No. 7-247387 (Patent Document 11) proposes a syndiotactic polypropylene resin composition comprising 50 to 99.9 parts by weight of a resin component which is composed of 50 to 99 parts by weight of syndiotactic polypropylene and 1 to 50 parts by weight of isotactic polypropylene, and 0.1 to 50 parts by weight of a plasticizer. The composition has excellent molding processability and can result in molded products having excellent transparency and flexibility. The composition also has a rapid crystallization rate and excellent molding processability.

Furthermore, JP-A No. 8-59916 (Patent Document 12) proposes a syndiotactic polypropylene resin composition comprising 97 to 99.99% by weight of a syndiotactic polypropylene of which syndiotactic pentad fraction as measured by $^{13}$C-NMR is 0.7 or more, and 0.01 to 3% by weight of polyethylene. The composition has a rapid crystallization rate and excellent molding processability.

JP-A No. 2000-191852 (Patent Document 13) proposes a flexible transparent syndiotactic polypropylene composition comprising syndiotactic polypropylene and an amorphous propylene.α-olefin copolymer. The composition has excellent transparent, flexibility, scratch resistance and heat resistance.

JP-A No. 2000-191858 (Patent Document 14) proposes a flexible transparent syndiotactic polypropylene composition comprising syndiotactic polypropylene and a propylene.ethylene copolymer which has a substantial syndiotactic structure. The composition is described to have excellent transparency, flexibility, scratch resistance and heat resistance.

However, all of these compositions described in the publications described above are still in need of further improvement in the balance between moldability, heat resistance, transparency, impact resistance, flexibility and scratch resistance.

Furthermore, all of these compositions described in the publications described above are still in need of further improvement in the balance between moldability, heat resistance, transparency, low temperature impact resistance and flexibility.

Also, all of these compositions described in the publications described above are still in need of further improvement in the balance between moldability, heat resistance, flexibility, scratch resistance, abrasion resistance and damping properties.

[Patent Document 1] JP-A No. H4-69394
[Patent Document 2] JP-A No. 2000-212194
[Patent Document 3] JP-A No. 2004-189666
[Patent Document 4] JP-A No. 2004-189667
[Patent Document 5] JP-W No. 2001-526730
[Patent Document 6] JP-A No. H2-274703
[Patent Document 7] JP-A No. 2004-161957
[Patent Document 8] JP-A No. 1996-67713
[Patent Document 9] JP-A No. 1992-802147
[Patent Document 10] JP-A No. 09-216640
[Patent Document 11] JP-A No. 2005-053131
[Patent Document 12] JP-A No. 2004-244044
[Patent Document 13] JP-A No. H3-12439
[Patent Document 14] JP-A No. H7-247387
[Patent Document 15] JP-A No. H8-59916
[Patent Document 16] JP-A No. 2000-191852
[Patent Document 17] JP-A No. 2000-191858
[Non-Patent Document 1] Angew. Chem. Int. Ed. Engl., 24, 507 (1985)
[Non-Patent Document 2] J. Am. Chem. Soc., 110, 6255-6256 (1988)

DISCLOSURE OF THE INVENTION

The problem to be solved by the present invention (1) is to provide a catalyst for olefin polymerization which, in the case of polymerizing an α-olefin such as propylene or the like, can give an α-olefin polymer having a high melting point and a sufficient molecular weight under high temperature conditions as well as normal temperature conditions, and also, in the case of polymerizing α-olefins including ethylene as the main component under high temperature conditions, can give with good activity an ethylene polymer having high molecular weight, that is, a catalyst showing high performance in the production of a wide range of olefin polymers. Also, the present invention is to provide a method for producing an olefin polymer using such catalyst for olefin polymerization.

The problem to be solved by the present invention (2) is to provide a method for producing a propylene copolymer, wherein the method yields a propylene copolymer a high molecular weight, and enables excellent polymerization activity and polymerization at high temperatures.

The problem to be solved by the present invention (3) is to provide a syndiotactic propylene copolymer having improved properties with respect to the problems described above, and molded products obtainable from the copolymer. More particularly, the present invention (3) is to provide a syndiotactic propylene polymer having excellent moldability which has been acquired by improving the crystallization rate and crystallization temperature, and to provide a molded product having excellent heat resistance, transparency, rigidity and breaking tensile strength.

The problem to be solved by the present invention (3) is also to provide a propylene-based polymer composition having excellent moldability and heat resistance.

The problem to be solved by the present invention (4) is to address the problems described above, and to provide a composition having excellent flexibility, transparency and scratch resistance as well as excellent moldability and heat resistance, and a molded product comprising the composition. Furthermore, the problem to be solved by the present invention (4) is to provide pellets comprising a propylene-based polymer composition, which pellets can yield a thermoplastic polymer composition having excellent flexibility, transparency and scratch resistance as well as excellent moldability and heat resistance, a modifier for thermoplastic polymer comprising the pellets, and a method for producing a thermoplastic resin composition, using the above-described composition.

The problem to be solved by the present invention (5) is to address the problems described above, and to provide a composition having excellent flexibility, transparency and low temperature impact resistance as well as excellent moldability and heat resistance, and a molded product comprising the composition.

The problem to be solved by the present invention (6) is to address the problems described above, and to provide a propylene-based polymer composition having excellent moldability and heat resistance; to provide a propylene-based polymer composition having excellent moldability, heat resistance, scratch resistance, abrasion resistance and damping properties; to provide a propylene-based polymer composition having excellent flexibility, in addition to moldability, heat resistance, scratch resistance, abrasion resistance and damping properties; and to provide a propylene-based polymer composition having excellent scratch resistance, abrasion resistance, flexibility and low temperature impact resistance, in addition to moldability and heat resistance.

Objects of the present invention (7) are to solve the problems described above, and to provide monolayer and multilayer polypropylene-based resin films excellent in all of heat resistance, transparency, flexibility, and impact resistance.

The catalyst (1) for olefin polymerization of the present invention (1) comprises:
(a-1) a bridged metallocene compound represented by the following formula [1-1]; and
(b) at least one compound selected from:
(b-1) an organoaluminium oxy compound,
(b-2) a compound which reacts with the bridged metallocene compound (a-1) to form an ion pair, and
(b-3) an organoaluminum compound;

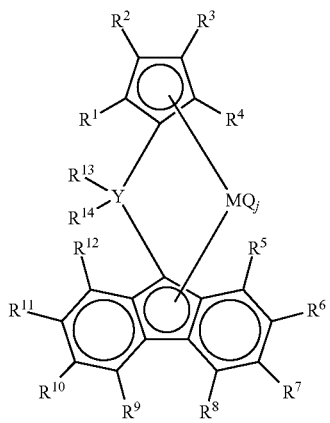

[1-1]

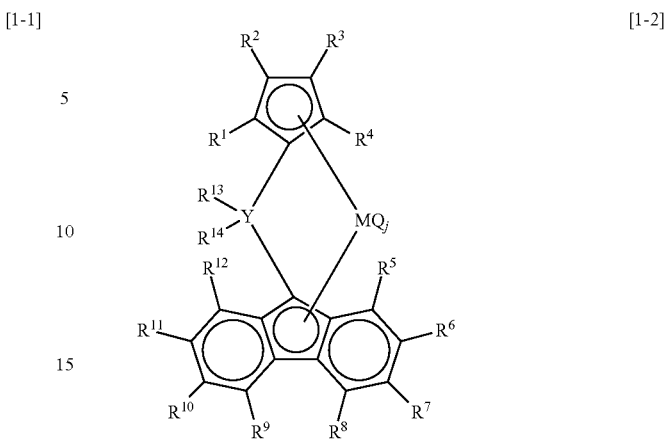

[1-2]

wherein in Formula [1-1], $R^1$, $R^2$, $R^3$, $R^4$, $R^5$, $R^8$, $R^9$ and $R^{12}$ which may be identical to or different from each other, are each selected from hydrogen, a hydrocarbon group and a silicon-containing group;

the four groups of $R^6$, $R^7$, $R^{10}$ and $R^{11}$, which may be identical to or different from each other, are not hydrogen atoms, and are each selected from a hydrocarbon group and a silicon-containing group;

$R^2$ and $R^3$ may be linked to each other to form a ring;

in one or more combinations of adjacent groups selected from $R^5$ and $R^6$, $R^7$ and $R^8$, $R^8$ and $R^9$, $R^9$ and $R^{10}$, and $R^{11}$ and $R^{12}$, the adjacent groups may be linked to each other to form a ring;

$R^{13}$ and $R^{14}$, which may be identical to or different from each other, are each an atom or a substituent selected from the group consisting of a hydrogen atom, a hydrocarbon group excluding a methyl group, and a silicon atom-containing group, and the substituents may be linked to each other to form a ring;

M is Ti, Zr or Hf;

Y is carbon or silicon;

Q, which may be identical to or different from each other, is selected from a halogen, a hydrocarbon group, an anion ligand and a neutral ligand capable of coordination with a lone electron pair; and j is an integer from 1 to 4.

Furthermore, it is preferable that $R^1$, $R^2$, $R^3$ and $R^4$ in the Formula [1-1] are each a hydrogen. The catalyst (1) for olefin polymerization of the present invention (1) preferably further contains a support (c).

The method for producing an olefin polymer of the present invention (1) comprises polymerizing at least one monomer selected from α-olefins having 2 or more carbon atoms in the presence of the catalyst (1) for olefin polymerization.

The present invention (2) is a method for producing a propylene-based copolymer (B1), said method comprising polymerizing propylene, and at least one monomer selected from α-olefins excluding propylene and polyenes, in the presence of a catalyst (2) for olefin polymerization comprising:

(a-2) a bridged metallocene compound represented by the following Formula [1-2], (b) at least one compound selected from:

(b-1) an organoaluminum oxy compound, (b-2) a compound which reacts with the bridged metallocene compound (a-2) to form an ion pair, and (b-3) an organoaluminum compound.

Hereinafter, with regard to the present invention (2), unless otherwise noted, this α-olefin does not include propylene.

wherein in Formula [1-2], $R^1$, $R^2$, $R^3$, $R^4$, $R^5$, $R^8$, $R^9$ and $R^{12}$, which may be identical to or different from each other, are each an atom or a group selected from a hydrogen atom, a hydrocarbon group and a silicon-containing group;

$R^6$ and $R^{11}$ are the same atoms or same groups selected from a hydrogen atom, a hydrocarbon group and a silicon-containing group;

$R^7$ and $R^{10}$ are the same atoms or same groups selected from a hydrogen atom, a hydrocarbon group and a silicon-containing group;

all of $R^6$, $R^7$, $R^{10}$ and $R^{11}$ cannot be simultaneously hydrogen atoms;

$R^2$ and $R^3$ may be linked to each other to form a ring;

among $R^5$ to $R^{12}$, adjacent groups may be linked to each other to form a ring;

$R^{13}$ and $R^{14}$, which may be identical to and different from each other, are each selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms;

at least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms;

M is Ti, Zr or Hf;

Y is carbon or silicon;

Q is selected from halogen, a hydrocarbon group, a neutral, conjugated or non-conjugated diene having 10 or fewer carbon atoms, an anion ligand, and a neutral ligand capable of coordination with a lone electron pair, in identical or different combinations; and j is an integer from 1 to 4.

In a preferred embodiment of the present invention (2), in the Formula [1-2], $R^{13}$ and $R^{14}$ are each selected from an aryl group having 11 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms, and may be identical to or different from each other.

In a preferred embodiment of the present invention (2), in the Formula [1-2], $R^6$ and $R^{11}$ are the same groups selected from a hydrocarbon group and a silicon-containing group, and $R^7$ and $R^{10}$ are the same groups selected from a hydrocarbon group and a silicon-containing group. $R^6$ and $R^7$ may be linked to each other to form a ring, and $R^{10}$ and $R^{11}$ may be linked to each other to form a ring.

In a preferred embodiment of the present invention (2), in the Formula [1-2], $R^1$, $R^2$, $R^3$ and $R^4$ are each a hydrogen.

In a preferred embodiment of the present invention (2), the produced propylene-based copolymer (B1) contains a propylene component in an amount of 95 to 51 mol %, contains an α-olefin component, which is at least one selected from ethylene, 1-butene, 4-methylpentene-1,1-hexene, 1-octene and 1-decene, in an amount of 5 to 49 mol %, and contains a polyene component, which is at least one selected from conjugated or non-conjugated dienes and non-conjugated trienes, in an amount of 0 to 20 mol %, provided that the sum of amounts of the α-olefin component and the polyene component is 5 to 49 mol %.

In a preferred embodiment of the present invention (2), the produced propylene-based copolymer (B1) contains a propylene component in an amount of 95 to 51 mol %, contains an α-olefin component, which is at least one selected from ethylene, 1-butene and 1-octene, in an amount of 5 to 49 mol %, and contains a polyene component, which is at least one selected from dienes having a norbornene skeleton, 4,8-dimethyl-1,4,8-decatriene and 4-ethylidene-8-methyl-1,7-nonadiene (EMND), in an amount of 0 to 20 mol %, provided that the sum of amounts of the α-olefin component and the polyene component is 5 to 49 mol %.

In the method for production described above, when the molar fraction of the constituent units derived from ethylene of the produced propylene-based copolymer (B1) is designated as $P_E$, and the molar fraction of an α-olefin having 4 or more carbon atoms is designated as $P_{HAO}$, the value of $P_E/P_{HAO}$ is preferably 0 to 0.80.

In a preferred embodiment of the present invention (2), the propylene-based copolymer (B1) is produced under the conditions such as a polymerization temperature of 40° C. to 200° C. and a polymerization pressure of 0.5 MPa to 10 MPa.

The propylene polymer of the present invention (3) is a propylene-based polymer (provided that the sum of amounts of the constituent units is 100 mol %) containing constituent units derived from propylene in an amount of more than 90 mol % (provided that the total amount of the constituent units in the polymer (A) is 100 mol %), and is a syndiotactic propylene polymer which satisfies the following requirements [1] and [2-1]. The propylene-based polymer is preferably a syndiotactic propylene polymer which contains constituent units derived from propylene in an amount of more than 90 mol % to less than or equal to 100 mol %, and constituent units derived from at least one selected from ethylene and an α-olefin having 4 to 20 carbon atoms in an amount of more than or equal to 0 mol % to less than 10 mol % (provided that the sum of amounts of the constituent units is 100 mol %), and satisfies the following requirements [1], [2-2] and [3] (In the following description, the term "propylene polymer" may be used as a term encompassing propylene copolymers with the α-olefin as well as homopolymer. Also, the propylene polymer of the present invention may be occasionally referred to as "syndiotactic propylene polymer (A)")

[1] The syndiotactic pentad fraction (rrrr fraction) as measured by $^{13}$C-NMR is 85% or greater.

[2-1] The melting point (Tm) determined by differential scanning calorimetry (DSC) is 145° C. or higher.

[2-2] The melting point (Tm) is 145° C. or higher, and the heat of fusion (ΔH) is 40 mJ/mg or greater, each determined by differential scanning calorimetry (hereinafter, referred to as DSC).

[3] When the isothermal crystallization temperature determined by differential scanning calorimetry is designated as $T_{iso}$, and the half-crystallization time at the isothermal crystallization temperature $T_{iso}$ is designated as $t_{1/2}$, the following Equation (Eq-1) is satisfied within the range of $110 \leq T_{iso} \leq 150$ (° C.):

$$1.67 \times 10^{-4} \exp(0.10 \times T_{iso}) \leq t_{1/2} \leq 5.56 \times 10^{-4} \exp(0.12 \times T_{iso}) \qquad \text{(Eq-1)}$$

The syndiotactic propylene polymer (A) of the present invention preferably satisfies the following requirement [4] in addition to the above-described requirements.

[4] The amount of the n-decane-soluble part is 1 wt % or less.

Furthermore, in the following description, a syndiotactic propylene polymer (A) which satisfies the requirement [4] in addition to the requirements [1] to [3] may be particularly referred to as syndiotactic propylene polymer (A').

The syndiotactic propylene polymer (A) of the present invention preferably simultaneously satisfies the following requirements [a] to [d], in addition to the above-described requirements [1] to [4].

[a] The tensile modulus is in the range of 500 to 2,000 MPa.
[b] The breaking tensile strength is 20 MPa or larger.
[c] The internal haze value of a press sheet having a thickness of 1 mm is 50% or less.
[d] The needle penetration temperature is 145° C. or higher.

Furthermore, in the following description, a syndiotactic propylene polymer which satisfies requirements [α] to [δ], in addition to the requirements [1] to [4] may be particularly referred to as syndiotactic propylene polymer (A").

The present invention (3) also includes molded products obtained from the above-described syndiotactic propylene polymers (A), (A') and (A").

Furthermore, the propylene-based polymer composition of the present invention contains the syndiotactic propylene polymer (A). The molded product of the present invention (3) is obtained from the aforementioned composition.

The propylene-based polymer composition (X1) of the present invention (4) is a propylene polymer composition (X1) which comprises:

10 to 95 parts by weight of a syndiotactic propylene polymer (AA) and 90 to 5 parts by weight of a propylene.α-olefin copolymer (B2) (provided that the sum of amounts of (AA) and (B2) is 100 parts by weight), wherein the polymer (AA) satisfies the following requirement (a), and the copolymer (B2) satisfies the following requirement (b):

(a) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent units in the polymer (AA) is 100 mol %);

(b) constituent units derived from propylene are contained in an amount of 55 to 90 mol %, constituent units derived from at least one olefin selected from α-olefins having 2 to 20 carbon atoms (excluding propylene) are contained in an amount of 10 to 45 mol % (provided that the sum of amounts of the constituent units derived from propylene and the constituent units derived from the α-olefin having 2 to 20 carbon atoms (excluding propylene) is 100 mol %), the MFR measured according to JIS K-6721 at 230° C. under a load of 2.16 kg is in the range of 0.01 to 100 g/10 min, and at least one of the following requirements (b-1) and (b-2) is satisfied;

(b-1) the syndiotactic triad fraction (rr fraction) as measured by $^{13}$C-NMR is 60% or greater; and (b-2) the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

Examples of preferred embodiments of the propylene-based polymer composition (X1) of the present invention (4) include a propylene-based polymer composition comprising:

50 parts by weight or more and 95 parts by weight or less of the syndiotactic propylene polymer (AA), and 5 parts by weight or more and 50 parts by weight or less of the propylene.α-olefin copolymer (B2) (the sum of amounts of (AA) and (B2) is 100 parts by weight) (hereinafter, this composition may be referred to as "composition (X1i)"), and a propylene-based polymer composition comprising:

10 parts by weight or more and less than 50 parts by weight of the syndiotactic propylene polymer (AA), and more than 50 parts by weight and 90 parts by weight or less of the propylene.α-olefin copolymer (B2) (the sum of amounts of (AA) and (B2) is 100 parts by weight) (hereinafter, this composition may be referred to as composition (X1ii)).

It is preferable for the composition (X1), (X1i) or (X1ii) that (1) the half-crystallization time ($t_{1/2}$) during isothermal crystallization at 110° C. as determined by differential scanning calorimetry is in the range of 1,000 sec or less.

It is preferable for the composition (X1), (X1i) or (X1ii) that (2) the needle penetration temperature is 145° C. or higher.

It is particularly preferable for the propylene-based polymer composition (X1i) that (2) the needle penetration temperature is 145° C. or higher, (3) the Izod impact strength at 0° C. is 50 J/m or larger, (4) the tensile modulus is in the range of 100 MPa to 2000 MPa, and (5) the internal haze value of a press sheet having a thickness of 1 mm is 50% or less.

It is particularly preferable for the propylene-based polymer composition (X1ii) that (2) the needle penetration temperature is 145° C. or higher, (4) the tensile modulus is in the range of 1 MPa to 400 MPa, and (5) the internal haze value of a press sheet having a thickness of 1 mm is 30% or less.

With regard to the propylene-based polymer composition (X1), composition (X1i) or (X1ii), it is preferable for the syndiotactic propylene polymer (AA) that the intrinsic viscosity [η] measured in decalin at 135° C. is in the range of 0.1 to 10 dL/g, and the heat of fusion (ΔH) determined by differential scanning calorimetry (DSC) is 40 mJ/mg or greater.

With regard to the propylene-based polymer composition (X1), composition (X1i) and (X1ii), it is preferable that the propylene.α-olefin polymer (B2) has a molecular weight distribution (Mw/Mn, Mn: number average molecular weight, Mw: weight average molecular weight) as determined by GPC, of 3.5 or less.

The propylene-based polymer composition (Y) related to another embodiment of the present invention (4) comprises:

99.7 to 70.0 mol % of constituent units derived from propylene, and 0.3 to 30.0 mol % of constituent units derived from an α-olefin having 2 to 20 carbon atoms (excluding propylene) (the amount of the constituent units derived from the α-olefin having 2 to 20 carbon atoms (including propylene) is 100 ml %), and has:

(2) a needle penetration temperature of 145° C. or higher, (3) an Izod impact strength at 0° C. of 50 J/m or larger, (4) a tensile modulus is in the range of 100 MPa to 2,000 MPa, and (5) an internal haze value of a press sheet having a thickness of 1 mm is 50% or less.

Furthermore, the propylene-based polymer composition (Z) related to another embodiment of the present invention (4) comprises:

95.0 to 55.0 mol % of constituent units derived from propylene, and 5.0 to 45.0 mol % of constituent units derived from an α-olefin having 2 to 20 carbon atoms (excluding propylene) (the amount of the constituent units derived from the α-olefin having 2 to 20 carbon atoms (including propylene) is 100 ml %), and has:

(2) a needle penetration temperature of 145° C. or higher, (3) a tensile modulus in the range of 1 MPa to 400 MPa, and (4) an internal haze value of a press sheet having a thickness of 1 mm of 30% or less.

Also, the molded product of the present invention (4) can be obtained using the propylene-based polymer composition described above.

The pellets of the present invention (4) are pellets comprising a propylene-based polymer composition (W), said composition (W) comprising:

1 to 65 parts by weight of a syndiotactic propylene polymer (AA1), and 99 to 35 parts by weight of a propylene.α-olefin copolymer (B21) (provided that the sum of amounts of (AA1) and (B21) is 100 parts by weight), wherein the polymer (AA1) satisfies the following requirement (a1), and the copolymer (B21) satisfies the following requirement (b1):

(a1) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent units in the polymer (AA1) is 100 mol %), (b1) constituent units derived from propylene are contained in an amount of 55 to 90 mol %, constituent units derived from at least one olefin selected from α-olefins having 2 to 20 carbon atoms (excluding propylene) are contained in an amount of 10 to 45 mol % (provided that the sum of amounts of the constituent units derived from propylene and the constituent units derived from the α-olefin having 2 to 20 carbon atoms (excluding propylene) is 100 mol %), the MFR measured according to JIS K-6721 at 230° C. under a load of 2.16 kg is in the range of 0.01 to 100 g/10 min, and at least one of the following requirements (b1-1) and (b1-2) is satisfied:

(b1-1): the syndiotactic triad fraction (rr fraction) as measured by $^{13}$C-NMR is 60% or greater.

(b1-2) the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}.$$

The modifier for thermoplastic polymer of the present invention (4) comprises the above-described pellets.

The method for producing a thermoplastic polymer composition of the present invention (4) comprises kneading the modifier for thermoplastic polymer and a thermoplastic polymer.

The propylene-based polymer composition (X2) of the present invention (5) comprises:

100 to 25 parts by weight of a syndiotactic propylene polymer (AA), 0 to 75 parts by weight of a propylene.α-olefin copolymer (B2) (provided that the sum of amounts of (AA) and (B2) is 100 parts by weight), and 1 to 100 parts by weight of an ethylene.α-olefin copolymer (C0) based on 100 parts by weight of the sum of amounts of (AA) and (B2), wherein the polymer (AA) satisfies the following requirement (a), the polymer (B2) satisfies the following requirement (b), and the copolymer (C0) satisfies the following requirement (c):

(a) the syndiotactic pentad fraction (rrrr fraction) as measured by $^{13}$C-NMR is 85% or greater, the melting point (Tm) as measured by DSC is 145° C. or higher, and constituent units derived from propylene are contained in an amount of more than 90 mol % (provided that the total amount of the constituent unit in the polymer (AA) is 100 mol %), (b) constituent units derived from propylene are contained in an amount of 55 to 90 mol %, constituent units derived from at least one olefin selected from α-olefins having 2 to 20 carbon atoms (excluding propylene) are contained in an amount of 10 to 45 mol % (provided that the sum of amounts of the constituent units derived from propylene and the constituent units derived from the α-olefin having 2 to 20 carbon atoms (excluding propylene) is 100 mol %), the MFR measured according to JIS K-6721 at 230° C. under a load of 2.16 kg is in the range of 0.01 to 100 g/10 min, and at least one of the following requirements (b-1) and (b-2) is satisfied:

(b-1) the syndiotactic triad fraction (rr fraction) as measured by $^{13}$C-NMR is 60% or greater, and (b-2) the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)},$$

(c) constituent units derived from ethylene are contained in an amount of 50 to 99 mol %, and constituent units derived from an α-olefin having 3 to 20 carbon atoms other than ethylene are contained in an amount of 1 to 50 mol % (provided that the sum of amounts of the constituent units derived from ethylene and the constituent units derived from the α-olefin having 3 to 20 carbon atoms is 100 mol %).

Examples of preferred embodiments of the propylene-based polymer composition of the present invention (5) include:

a propylene-based polymer composition (X2) (hereinafter, this composition may be referred to as "composition (X2i)") comprising:

98 to 40 parts by weight of the syndiotactic propylene polymer (AA);

2 to 60 parts by weight of the propylene.α-olefin copolymer (B2) (provided that the sum of amounts of (AA) and (B2) is 100 parts by weight); and 1 to 100 parts by weight of the ethylene.α-olefin copolymer (C0) based on 100 parts by weight of the sum of amounts of (AA) and (B2), wherein the polymer (AA) satisfies the following requirement (a), the copolymer (B2) satisfies the following requirement (b'), and the copolymer (C0) satisfies the following requirement (c'):

(a) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent units in the polymer (AA) is 100 mol %), (b') constituent units derived from propylene are contained in an amount of 65 to 90 mol %, constituent units derived from at least one olefin selected from α-olefins having 2 to 20 carbon atoms (excluding propylene) are contained in an amount of 10 to 35 mol % (provided that the sum of amounts of the constituent units derived from propylene and the constituent units derived from the α-olefin having 2 to 20 carbon atoms (excluding propylene) is 100 mol %), the MFR as measured according to JIS K-6721 at 230° C. under a load of 2.16 kg is in the range of 0.01 to 100 g/10 min, and at least one of the following requirements (b-1) and (b-2) is satisfied:

(b-1) the syndiotactic triad fraction (rr fraction) as measured by $^{13}$C-NMR is 60% or greater, and (b-2) the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)},$$

(c') constituent units derived from ethylene are contained in an amount of 60 to 95 mol %, and constituent units derived from an α-olefin having 3 to 20 carbon atoms other than ethylene are contained in an amount of 5 to 40 mol % (provided that the sum of amounts of the constituent units derived from ethylene and the constituent units derived from the α-olefin having 3 to 20 carbon atoms is 100 mol %).

Examples of preferred embodiments of the present invention (5) include:

a propylene-based polymer composition (X2) (hereinafter, this composition may be referred to as "composition (X2ii)") comprising:

100 parts by weight of the syndiotactic propylene polymer (AA); and 1 to 100 parts by weight of the ethylene.α-olefin copolymer (C0), wherein the polymer (AA) satisfies the following requirement (a), and the copolymer (C0) satisfies the following requirement (c'):

(a) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent units in the polymer (AA) is 100 mol %), and (c') constituent units derived from ethylene are contained in an amount of 60 to 95 mol %, and constituent units derived from an α-olefin having 3 to 20 carbon atoms other than ethylene are contained in an amount of 5 to 40 mol % (provided that the sum of amounts of the constituent units derived from ethylene and the constituent units derived from the α-olefin having 3 to 20 carbon atoms is 100 mol %).

It is preferable for the composition (X2), (X2i) or (X2ii) that, for example, (1) the half-crystallization time ($t_{1/2}$) during isothermal crystallization at 110° C. as determined by differential scanning calorimetry is in the range of 1,000 sec or less.

It is also preferable for the composition (X2), (X2i) or (X2ii) that the needle penetration temperature is 145° C. or higher.

It is preferable for the propylene.α-olefin polymer (B2) that the intrinsic viscosity [η] as measured in decalin at 135° C. is in the range of 0.1 to 10 dL/g, and the molecular weight distribution (Mw/Mn, Mn: number average molecular weight, Mw: weight average molecular weight) as measured by GPC is 3.5 or less.

It is preferable for the ethylene.α-olefin copolymer (C0) that the MFR measured according to JIS K-6721 at 190° C.

under a load of 2.16 kg is in the range of 0.01 to 100 g/10 min, and the density is 0.910 to 0.850 (g/cm$^3$).

The molded product of the present invention (5) is formed using the above-described propylene-based polymer composition (X2).

The propylene-based polymer composition (X3) of the present invention (6) comprises:

10 to 95 parts by weight of a syndiotactic propylene polymer (AA), and 90 to 5 parts by weight of a propylene.α-olefin copolymer (B3) (provided that the sum of amounts of (AA) and (B3) is 100 parts by weight), wherein the polymer (AA) satisfies the following requirement (a) and the copolymer (B3) satisfies the following requirement (b):

(a) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent unit in the polymer (AA) is 100 mol %), and (b) constituent units derived from propylene are contained in an amount of 30 to 90 mol %, constituent units derived from at least one olefin selected from α-olefins having 2 to 20 carbon atoms (excluding propylene) are contained in an amount of 10 to 70 mol % (provided that the sum of amounts of the constituent units derived from propylene and the constituent units derived from the α-olefin having 2 to 20 carbon atoms (excluding propylene) is 100 mol %), the MFR measured according to JIS K-6721 at 230° C. under a load of 2.16 kg is in the range of 0.01 to 100 g/10 min, and at least one of the following requirements (b-1) and (b-2) is satisfied:

(b-1) the syndiotactic triad fraction (rr fraction) as measured by $^{13}$C-NMR is 60% or greater, and (b-2) the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}.$$

Examples of preferred embodiments of the propylene-based polymer composition (X3) of the present invention (6) (hereinafter, simply referred to as "composition (X3)") include:

a propylene-based polymer composition (hereinafter, this composition may be referred to as "composition (X3i)") further comprising 0.1 to 100 parts by weight of one or more resins (c1) selected from the group consisting of rosin-based resins, terpene-based resins and petroleum resins, based on 100 parts by weight of the sum of amounts of the syndiotactic propylene polymer (AA) and the propylene.α-olefin copolymer (B3).

Examples of preferred embodiments of the composition (X3) and composition (X3i) include:

a propylene-based polymer composition (X3) in which the propylene.α-olefin copolymer (B3) is a copolymer of propylene, ethylene and α-olefin having 4 to 20 carbon atoms, comprising constituent units derived from propylene in an amount of 30 to 90 mol %, and constituent units derived from ethylene and constituent units derived from an α-olefin having 4 to 20 carbon atoms in a total amount of 10 to 70 mol % (the sum of amounts of the constituent units derived from propylene, the constituent units derived from ethylene and constituent units derived from the α-olefin having 4 to 20 carbon atoms is 100 mol %), and satisfies $P_E \leq P_{HAO}$ when the proportion of the constituent units derived from ethylene is designated as $P_E$ (mol %), and the proportion of the constituent units derived from the α-olefin is designated as $P_{HAO}$ (mol %).

Examples of a preferred embodiment of the propylene-based polymer composition (X3) of the present invention (6) include:

the propylene-based polymer composition (hereinafter, this composition may be referred to as "composition (X3ii)"), further comprising 0.1 to 500 parts by weight of a non-crosslinked or partially crosslinked olefin-based thermoplastic elastomer (C2), based on 100 parts by weight of the sum of amounts of the syndiotactic propylene polymer (AA) and propylene.α-olefin copolymer (B3).

In the composition (X3), it is preferable that the syndiotactic propylene polymer (AA) has an intrinsic viscosity [η] measured in decalin at 135° C. in the range of 0.1 to 10 dL/g, and a heat of fusion (ΔH) determined by measurement of differential scanning calorimetry (DSC) of 40 mJ/mg or greater.

In the composition (X3), it is preferable that the molecular weight distribution (Mw/Mn, Mn: number average molecular weight, Mw: weight average molecular weight) of the propylene.α-olefin polymer (B3) as measured by GPC is 3.5 or less.

The molded product of the present invention (6) is formed using the composition (X3).

The polypropylene-based resin film of the present invention (7) has a thickness of 10 to 500 μm and satisfies the following requirements (1) to (3):

(1) Young's modulus as measured according to JIS K 6781 is in the range of 10 to 500 MPa, (2) Tensile impact strength measured at 0° C. is in the range of 50 to 1,000 kJ/m$^2$, and (3) Light transmittance is in the range of 85 to 99%, and the rate of decrease in light transmittance after hot water treatment at 120° C. for 30 minutes is in the range of 0 to 15%.

The polypropylene-based resin film preferably further satisfies the following requirement (4):

(4) Tm as measured by DSC is 145° C. or higher.

The polypropylene-based resin film preferably satisfies the following requirement (5):

(5) The polypropylene-based resin film comprises a propylene-based polymer composition comprising:

(7A) 85 to 25 parts by weight of syndiotactic propylene polymer satisfying the following requirement (a); and (7B) 15 to 75 parts by weight of propylene.α-olefin copolymer satisfying the following requirement (b) (provided that the sum of amounts of (7A) and (7B) is 100 parts by weight):

(a): the syndiotactic pentad fraction (rrrr fraction) as measured by $^{13}$C-NMR is 85% or more, the melting point (Tm) as measured by differential scanning calorimetry (DSC) is 145° C. or higher, and propylene units are contained in an amount of more than 90 mol % (provided that the total amount of constituent units in the polymer (7A) is 100 mol %), (b): propylene units are contained in an amount of 55 to 90 mol % (provided that the total amount of constituent units in the copolymer (7B) is 100 mol %), α-olefin units of at least one kind selected from α-olefins having 2 to 20 carbon atoms (excluding propylene) are contained in an amount of 10 to 45 mol % (provided that the sum of amounts of the propylene units and the units of α-olefin having 2 to 20 carbon atoms (excluding propylene) is 100 mol %), the MFR measured according to JIS K-6721 at 230° C. under a load of 2.16 kg is in the range of 0.01 to 100 g/10 min, and at least one of the following requirements (b-1) and (b-2) is satisfied:

(b-1): the syndiotactic triad fraction (rr fraction) as measured by $^{13}$C-NMR is 60% or more, and (b-2): the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}.$$

The propylene-based polymer composition may also contain 1 to 100 parts by weight of an ethylene.α-olefin copolymer (7C) satisfying the following requirement (c), based on 100 parts by weight of the sum of amounts of (7A) and (7B):

(c): the copolymer contains 50 to 99 mol % of ethylene units, and 1 to 50 mol % of units of α-olefin having 3 to 20 carbon atoms (provided that the total amount of the constituent units in the copolymer (7C) is 100 mol %).

The polypropylene-based resin film preferably further satisfies the following requirement (6):

(6) The polypropylene-based resin film comprises a polypropylene-based resin having a propylene unit concentration ($S_p$) of 40 to 95 mol %, an ethylene unit concentration ($S_E$) of 60 to 5 mol %, and a C4-10 α-olefin unit concentration ($S_\alpha$) of 0 to 15 mol % (provided that $S_p+S_E+S_\alpha=100$ mol %, and $S_p/S_e>1$).

The polypropylene-based resin film preferably further satisfies the following requirement (6):

(7) The intrinsic viscosity of a n-decane-soluble component (Dsol) which is soluble in n-decane at room temperature is from 1.5 to 4.0 (dl/g).

The polypropylene-based resin film is preferably molded by an inflation or extrusion method.

A multilayer film of the present invention (7) is obtained by laminating the polypropylene-based resin film described above as a base layer, and an outer layer comprising a polyolefin-based resin on at least one side of the base layer.

A food container of the present invention (7) comprises the polypropylene-based resin film or the multilayer film.

A medical container of the present invention (7) comprises the polypropylene-based resin film or the multilayer film.

Effects of the Invention

When α-olefins having 3 or more carbon atoms such as propylene are polymerized using the catalyst (1) for olefin polymerization of the present invention (1), an α-olefin polymer having high melting point and sufficiently high molecular weight can be obtained with good activity under high temperature conditions as well as under normal temperature conditions. Furthermore, even when α-olefins including at least ethylene are polymerized under high temperature conditions using the same catalyst, an ethylene polymer having good activity and sufficiently high molecular weight can be obtained. That is, the catalyst shows high performance in the production of a wide range of olefin polymers.

Furthermore, by producing olefin polymers using such catalyst for olefin polymerization, α-olefin polymers having high melting point and sufficiently high molecular weight can be obtained with good activity even under high temperature conditions. Also, even when α-olefins including at least ethylene are polymerized under high temperature conditions using the same catalyst, ethylene polymers having sufficiently high molecular weight can be obtained with good activity.

According to the method for producing a propylene-based copolymer (B1) of the present invention (2), a propylene-based copolymer (B1) having high molecular weight can be obtained with excellent copolymerizability. Thus, a propylene copolymer having high molecular weight, which could not be achieved by existing solution polymerization, can be efficiently produced. Moreover, even upon producing a propylene copolymer having the same molecular weight, since polymerization at higher temperatures is made possible compared to the cases of using existing catalysts for olefin polymerization, a propylene copolymer can be efficiently produced.

According to the present invention (3), a syndiotactic propylene polymer having excellent moldability and heat resistance, and particularly having excellent moldability, heat resistance, transparency, rigidity and breaking tensile strength, and molded products comprising the polymer can be provided.

The composition containing the syndiotactic propylene polymer (A) of the present invention (3) has excellent moldability and heat resistance. The molded products obtained from the composition containing the syndiotactic propylene polymer (A) of the present invention have excellent heat resistance.

The propylene-based polymer composition of the present invention (4) has excellent moldability and heat resistance, and also has excellent transparency, flexibility and scratch resistance.

The molded products of the present invention (4) have excellent heat resistance, and also have excellent transparency, flexibility and scratch resistance.

Using the pellets of the present invention (4), a thermoplastic polymer composition having excellent moldability and heat resistance, and also having excellent flexibility, transparency and scratch resistance can be obtained.

When the modifier for thermoplastic polymer of the present invention (4) is used, a thermoplastic polymer composition having excellent moldability and heat resistance, and also having excellent flexibility, transparency and scratch resistance can be obtained. The method for producing a thermoplastic resin composition of the present invention (4) can produce with good productivity, a thermoplastic polymer composition having excellent moldability and heat resistance, and also having excellent flexibility, transparency and scratch resistance.

The propylene-based polymer composition (X2) of the present invention (5) has excellent moldability and heat resistance, and also has excellent transparency, flexibility and low temperature impact resistance.

The molded products of the present invention (5) have excellent heat resistance, and excellent transparency, flexibility and low temperature impact resistance.

The propylene-based polymer composition (X3) of the present invention (6) has excellent moldability and heat resistance.

When the propylene-based polymer composition (X3) of the present invention (6) satisfies $P_E \leq P_{HAO}$ in which the proportion of constituent units derived from ethylene is designated as $P_E$ (mol %), and the proportion of constituent units derived from an α-olefin having 4 to 20 carbon atoms is designated as $P_{HAO}$ (mol %), the composition has excellent moldability, heat resistance, scratch resistance, abrasion resistance, and damping properties.

Furthermore, when the propylene-based polymer composition (X3) of the present invention (6) contains one or more resins selected from the group consisting of rosin-based resins, terpene-based resins and petroleum resins, the composition has excellent moldability, heat resistance, scratch resistance, abrasion resistance, damping properties and flexibility.

When the propylene-based polymer composition (X3) of the present invention (6) contains a thermoplastic elastomer, the composition has excellent moldability, heat resistance, scratch resistance, abrasion resistance, flexibility and low temperature impact resistance.

The polypropylene-based resin film of the present invention (7) is excellent in heat resistance, transparency, flexibility, and low temperature impact resistance.

By the use of the polypropylene-based resin film of the present invention (7), monolayer and multilayer polypropylene-based resin films having a film transparency that does not deteriorate by a sterilization treatment at high temperature as well as excellent impact resistance at low temperature and flexibility can be provided.

BEST MODE FOR CARRYING OUT THE INVENTION

<Catalyst for Olefin Polymerization (1)>

Figure 1:
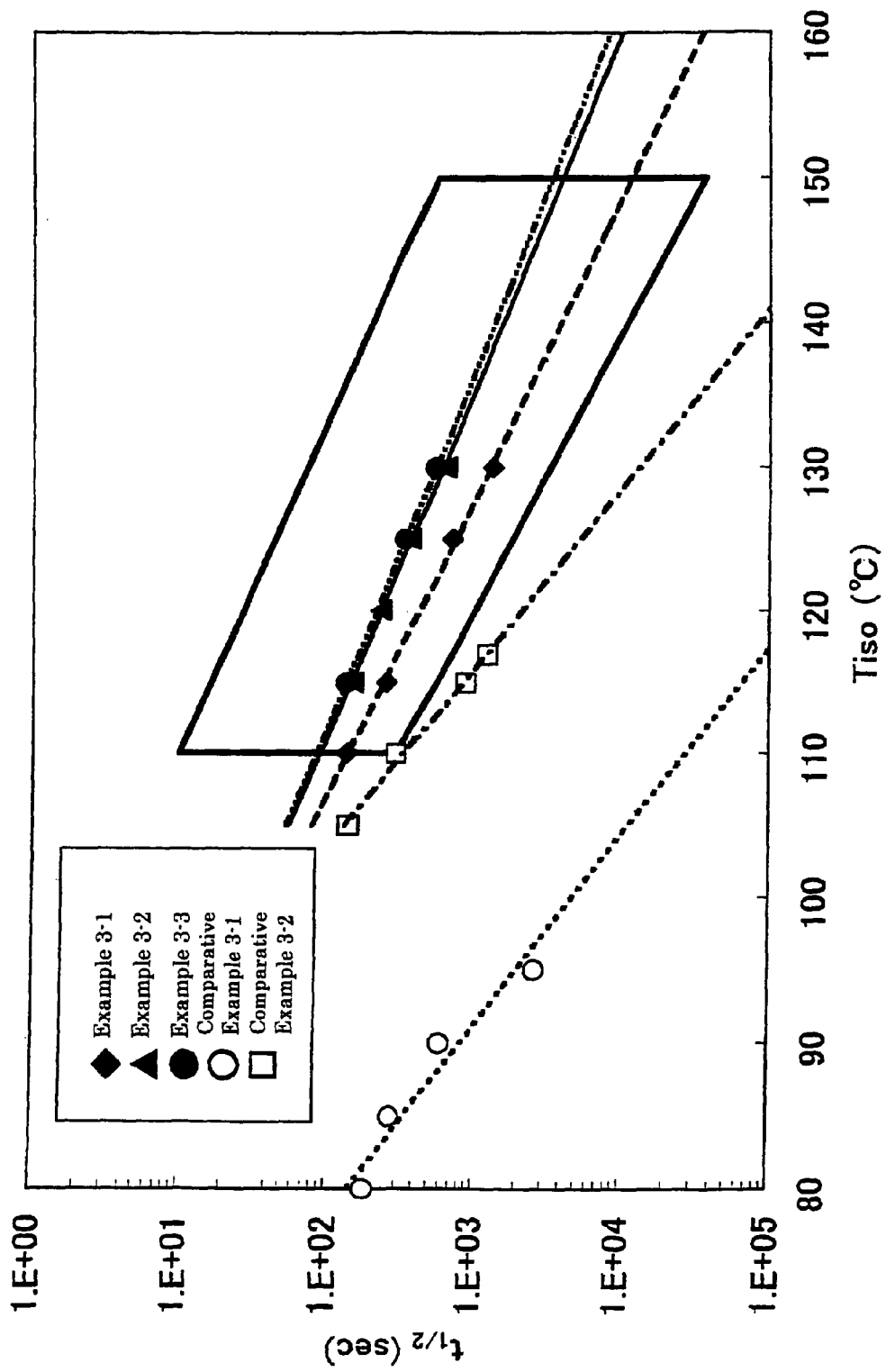
FIG. 1 is a diagram plotting the relationship between the specific isothermal crystallization temperature ($T_{iso}$) and the half-crystallization time ($t_{1/2}$) at the temperature, for the syndiotactic propylene polymers described in Examples and Comparative Examples of the present invention (3). The part surrounded by bold line indicates a region defined by the parameter inequality expression (Eq-1) defined in the requirement [3].

First, the catalyst (1) for olefin polymerization of the present invention (1) will be described in detail.

The catalyst (1) for olefin polymerization of the present invention (1) is characterized in comprising:

(a-1) a bridged metallocene compound represented by the above Formula [1-1]; and (b) at least one compound selected from:

(b-1) an organoaluminum oxy compound, (b-2) a compound which reacts with the bridged metallocene compound (a-1) to form an ion pair, and (b-3) an organoaluminum compound.

Hereinafter, the bridged metallocene compound (a-1) used in the catalyst (1) for olefin polymerization of the present invention (1), the catalyst (1) for olefin polymerization containing the bridged metallocene compound (a-1), and a method for polymerizing olefin in the presence of this catalyst for olefin polymerization (1) will be described in order by way of preferred embodiments for carrying out the present invention.

(a-1) Bridged Metallocene Compound

The bridged metallocene compound (a-1) represented by the above Formula [1-1] (in the present specification, may also be referred to as "component (a-1)") has the following chemical structural features [m1-1] to [m1-2].

[m1-1] Of the two ligands, one is a cyclopentadienyl group which may be substituted, and the other is a fluorenyl group which is substituted (hereinafter, may be referred to as "substituted fluorenyl group").

[m1-2] The transition metal (M) constituting the metallocene compound is titanium, zirconium or hafnium.

Hereinafter, the cyclopentadienyl group which may be substituted, the substituted fluorenyl group and a bridging part, which are chemical structural features of the bridged metallocene compound (a-1) used in the present invention (1), and other features will be described in order, and preferred bridged metallocene compounds [1-1] having all of the features, and examples thereof, and finally the method for polymerization of the present invention (1) using the bridged metallocene compound (a-1) will be described in detail.

Cyclopentadienyl Group which May be Substituted

The cyclopentadienyl group may be substituted and may be unsubstituted. The unsubstituted cyclopentadienyl group is a cyclopentadienyl group in which $R^1$, $R^2$, $R^3$ and $R^4$ possessed by the cyclopentadienyl group moiety in the above Formula [1-1] are all hydrogen atoms, and the substituted cyclopentadienyl group may be a cyclopentadienyl group in which any one or more of $R^1$, $R^2$, $R^3$ and $R^4$ may be a hydrocarbon group (f1), or a silicon-containing group (f2). In the case of a group in which two or more of $R^1$, $R^2$, $R^3$ and $R^4$ are groups other than hydrogen atom, these groups may be identical to or different from each other.

The hydrocarbon group (f1) used for $R^1$ to $R^4$ is preferably exemplified, in the case where the substituent does not form a ring together with another substituent, by a hydrocarbon group having 1 to 20 carbon atoms in total (hereinafter, may also be referred to as "hydrocarbon group (f1')").

When $R^2$ and $R^3$ are hydrocarbon groups (f1), $R^2$ and $R^3$ may be linked to each other to form a ring (hereinafter, may also be referred to as "ring (f1''')"). In this case, it is more preferable that only $R^2$ and $R^3$ among $R^1$ to $R^4$ form a ring, from the viewpoint that, for example, syndiotactic poly-α-olefin having high stereoregularity can be produced.

In the case where, for example, substituents $R^2$ and $R^3$ are linked to each other to form a ring, regardless of the fact that each of the above-mentioned $R^2$ and $R^3$ preferably has 1 to 20 carbon atoms, the sum of amounts of the carbon atoms of the two substituents forming a ring is preferably 2 to 40, more preferably 3 to 30, and even more preferably 4 to 20.

Also in the case where the substituents $R^2$ and $R^3$ are linked to each other to form a ring, a part of the hydrogen atoms directly attached to carbon atoms of the substituents may be substituted by a halogen atom, an oxygen-containing group, a nitrogen-containing group or a silicon-containing group, and in this case, the sum of amounts of the carbon atoms of the two substituents forming a ring includes the number of carbon atoms contained in the oxygen-containing group, the nitrogen-containing group and the silicon-containing group.

The hydrocarbon group (f1') having 1 to 20 carbon atoms in total means an alkyl group, an alkenyl group, an alkynyl group or an aryl group, which is constituted only with carbon and hydrogen.

The hydrocarbon group (f1') having 1 to 20 carbon atoms in total includes a heteroatom-containing hydrocarbon group in which a part of the hydrogen atoms are substituted with a halogen atom, an oxygen-containing group, a nitrogen-containing group or a silicon-containing group, in addition to the alkyl group, alkenyl group, alkynyl group or aryl group constituted only with carbon and hydrogen. Examples of such hydrocarbon group (f1') include:

straight-chained hydrocarbon groups such as a methyl group, an ethyl group, an n-propyl group, an allyl group, an n-butyl group, an n-pentyl group, an n-hexyl group, an n-heptyl group, an n-octyl group, an n-nonyl group, and an n-decanyl group;

branched hydrocarbon groups such as an isopropyl group, a t-butyl group, an amyl group, a 3-methylpentyl group, a 1,1-diethylpropyl group, a 1,1-dimethylbutyl group, 1-methyl-1-propylbutyl group, a 1,1-propylbutyl group, a 1,1-dimethyl-2-methylpropyl group, and a 1-methyl-1-isopropyl-2-methylpropyl group;

saturated cyclic hydrocarbon groups such as a cyclopentyl group, a cyclohexyl group, a cycloheptyl group, a cyclooctyl group, a norbornyl group, and an adamantyl group;

unsaturated cyclic hydrocarbon groups such as a phenyl group, a naphthyl group, a biphenyl group, a phenanthryl group, and an anthracenyl group, and nuclear alkyl-substituted products thereof;

saturated hydrocarbon groups substituted with an aryl group such as a benzyl group, and a cumyl group; and heteroatom-containing hydrocarbon groups such as a methoxy group, an ethoxy group, a phenoxy group, an N-methylamino group, a trifluoromethyl group, a tribromomethyl group, a pentafluoroethyl group, a pentafluorophenyl group, a fluorophenyl group, a chlorophenyl group, a bromophenyl group, a chlorobenzyl group, a fluorobenzyl group, a bromobenzyl group, a dichlorobenzyl group, a difluorobenzyl group, a trichlorobenzyl group, and a trifluorobenzyl group.

The silicon-containing group (f2) is a group having a silicon atom which is covalently bonded to a ring carbon of the cyclopentadienyl group, and is specifically an alkylsilyl group or an arylsilyl group. A preferred silicon-containing group (f2), in the case where the substituent does not form a ring together with another substituent, is exemplified by a silicon-containing group (f2') having 1 to 20 carbon atoms in total such as a trimethylsilyl group, and a triphenylsilyl group.

In this cyclopentadienyl group, it is preferable that $R^1$ and $R^4$ are identical atoms or identical groups, and that $R^2$ and $R^3$ are linked to form a ring, or they are identical atoms or identical groups. It is more preferable that $R^1$ and $R^4$ are hydrogen atoms, and it is particularly preferable that all of $R^1$, $R^2$, $R^3$ and $R^4$ are hydrogen atoms.

Substituted Fluorenyl Group

The first important feature for the fluorenyl group moiety in the chemical structure represented by the above Formula [1-1] used in the method for polymerization of the present invention (1), is that the four groups of $R^6$, $R^7$, $R^{10}$ and $R^{11}$ in the above Formula [1-1] are not hydrogen atoms. $R^6$, $R^7$, $R^{10}$ and $R^{11}$ are selected from a hydrocarbon group and a silicon-containing group, and each may be the hydrocarbon group (f1) described above, or the silicon-containing group (f2) described above.

The second important feature for the fluorenyl group moiety is that $R^6$ and $R^7$, and $R^{10}$ and $R^{11}$ are not linked to each other to form rings. Since the four groups of $R^6$, $R^7$, $R^{10}$ and $R^{11}$ are not hydrogen atoms, and also $R^6$ and $R^7$ are not linked to each other to form rings and $R^{10}$ and $R^{11}$ are not linked to each other to form rings in the bridged metallocene compound (a-1), a polymerization activity can be achieved, which could not be achieved by existing polymerization processes, and it is possible to produce a polymer of an α-olefin having 3 or more carbon atoms, for example, a propylene polymer, which has a high melting point.

Furthermore, $R^5$, $R^8$, $R^9$ and $R^{12}$ may be atoms or groups that are identical to or different from each other, and selected from a hydrogen, the hydrocarbon group (f1) and the silicon-containing group (f2), and in the one or more combinations of adjacent groups selected from $R^5$ and $R^6$, $R^7$ and $R^8$, $R^8$ and $R^9$, $R^9$ and $R^{10}$, and $R^{11}$ and $R^{12}$, the adjacent groups may be linked to each other to form a ring.

Examples of the hydrocarbon group (f1) used in the substituents $R^5$ to $R^{12}$ include, in the case where the substituent is a group not forming a ring together with another substituent, the hydrocarbon group having 1 to 20 carbon atoms in total (hydrocarbon group (f1')).

When the substituents $R^5$ to $R^{12}$ are each the hydrocarbon group (f1), the substituent may be linked to another substituent among the substituents $R^5$ to $R^{12}$ within the range of the above-described combinations of adjacent groups, to form a ring. In this case, the adjacent substituents among $R^5$ to $R^{12}$ are linked to each other to form a ring (ring (f''')).

Furthermore, when adjacent substituents among the substituents $R^5$ to $R^{12}$ are linked to each other within the range of the above-described combinations of adjacent groups, to form a ring, it is preferable that two adjacent groups among the substituents $R^5$ to $R^{12}$ are linked to each other to form a ring.

For example, when two adjacent substituents are linked to each other to form a ring (when one or more adjacent combinations of adjacent groups selected from $R^5$ and $R^6$, $R^7$ and $R^8$, $R^8$ and $R^9$, $R^9$ and $R^{10}$, $R^{11}$ and $R^{12}$ form a ring), regardless of the fact that the preferred number of carbon atoms for each of the above-described $R^5$ to $R^{12}$ is 1 to 20, the sum of carbon atoms in the two substituents forming a ring is preferably 2 to 40, more preferably 3 to 30, and even more preferably 4 to 20.

When adjacent substituents are linked to each other to form a ring, a part of the hydrogen atoms directly attached to carbon atoms of the substituent may also be substituted by a halogen atom, an oxygen-containing group, a nitrogen-containing group or a silicon-containing group, and the sum of carbon atoms in a plurality of substituents forming a ring includes the number of carbon atoms contained in the oxygen-containing group, the nitrogen-containing group and the silicon-containing group.

From the viewpoint of synthesis of the catalyst of the present invention (1), it is preferable that $R^6$ and $R^{11}$ are identical atoms or identical groups, and $R^7$ and $R^{10}$ are identical atoms or identical groups. Preferred group as the hydrocarbon group (f1) is the aforementioned hydrocarbon group (f1') having 1 to 20 carbon atoms in total, and the ring structure (f'''). Preferred examples of the silicon-containing group (f2) include the silicon-containing group (f2') having 1 to 20 carbon atoms in total in the case where the substituent described above does not form a ring with another substituent.

According to the present invention (1), from the viewpoint that a polymer of an α-olefin having 3 or more carbon atoms, which has a melting point higher than or equal to the melting point of conventional polymers, and has a high molecular weight, can be obtained under the conditions of high temperature polymerization as well as under the conditions of polymerization at normal temperature, it is particularly preferable that $R^6$ and $R^{11}$ are any one of the following (1) and (2):

(1) hydrocarbon groups, and in the case where they do not form a ring with adjacent groups, they are each independently a hydrocarbon group having 2 or more carbon atoms, more preferably 3 or more carbon atoms, and particularly preferably 4 or more carbon atoms; and (2) respectively silicon-containing groups.

Furthermore, among the silicon-containing groups, a silicon-containing group of which the sum of carbon atoms and silicon atoms is 3 or more, and preferably 4 or more, is preferred. In order to enhance the effect of the present invention, when $R^6$ is a hydrocarbon group which does not form a ring with its adjacent group, and $R^7$ is a hydrocarbon group which does not form a ring together with an adjacent group, it is preferable that the number of carbon atoms of $R^6$ is equal to or larger than the number of carbon atoms of $R^7$;

when $R^6$ is a silicon-containing group, and $R^7$ is a silicon-containing group, it is preferable that the total number of silicon atoms and carbon atoms of $R^6$ is equal to or larger than the total number of silicon atoms and carbon atoms of $R^7$;

when $R^6$ is a hydrocarbon group which does not form a ring with an adjacent group, and $R^7$ is a silicon-containing group, it is preferable that the number of carbon atoms of $R^6$ is equal to or larger than the total number of silicon atoms and carbon atoms of $R^7$; and when $R^6$ is a silicon-containing group, and $R^7$ is a hydrocarbon group which does not form a ring, it is preferable that the total number of silicon atoms and carbon atoms of $R^6$ is equal to or larger than the number of carbon atoms of $R^7$.

As $R^6$ and $R^{11}$, an aryl group or a substituted aryl group is preferred, and specific examples thereof include a phenyl group, an o-tolyl group, an m-tolyl group, a p-tolyl group, a t-butylphenyl group, a naphthyl group, a dimethylphenyl group, a trimethylphenyl group, a biphenyl group, an o-fluorophenyl group, an m-fluorophenyl group, a p-fluorophenyl group, an o-chlorophenyl group, an m-chlorophenyl group, a p-chlorophenyl group, an o-trifluorophenyl group, an m-trifluorophenyl group, and a p-trifluorophenyl group.

When $R^6$ and $R^{11}$ of the substituted fluorenyl group is one of the above-described (1) and (2), there can be obtained a polymer of an α-olefin having 3 or more carbon atoms, whose melting point is higher, and whose molecular weight is equal to or larger than conventional polymers, as compared in terms of polymerization under the same polymerization conditions. Alternatively, even under high temperature polymerization conditions as well as under polymerization conditions at normal temperature, there can be obtained a polymer of an α-olefin having 3 or more carbon atoms, whose melting point is equal to or higher than that of conventional polymers, as compared in terms of polymerization under the same polymerization conditions. In particular, an α-olefin polymer having excellent in the balance of performance can be produced.

Covalently Bonded Bridge

The main chain part of the bond connecting the cyclopentadienyl group which may be substituted and the substituted fluorenyl group is a divalent covalently bonded bridge containing one carbon atom or silicon atom.

An important feature in the covalently bonded bridge part in the bridged metallocene compound (a-1) used in the present invention (1), is that the bridging atom Y in the above Formula [1-1] has $R^{13}$ and $R^{14}$, and these are atoms or substituents selected from a hydrogen atom, a hydrocarbon group excluding a methyl group, and a silicon atom-containing group, which may be identical to and different from each other, and the substituents may be linked to each other to form a ring.

When Y is carbon, $R^{13}$ and $R^{14}$ are each preferably a hydrocarbon group excluding a methyl group, or a silicon-containing group. When Y is silicon, $R^{13}$ and $R^{14}$ are each preferably a hydrocarbon group excluding a methyl group.

Among these, it is desirable that Y is carbon, and $R^{13}$ and $R^{14}$ are each a hydrocarbon group having 2 to 20 carbon atoms.

Since such covalently bonded bridge is combined with the substituted fluorenyl group, production of a propylene polymer having high melting point under high temperature polymerization conditions, which could not be achieved in existing polymerization processes, is now possible.

Preferred examples of the hydrocarbon group excluding a methyl group, used in $R^{13}$ and $R^{14}$ include, in the case where $R^{13}$ and $R^{14}$ are not linked to form a ring, a hydrocarbon group having 2 to 20 carbon atoms in total (hereinafter, may also be referred to as "hydrocarbon group (f1")"). Furthermore, when $R^{13}$ and $R^{14}$ are each a hydrocarbon group, $R^{13}$ and $R^{14}$ may be linked to each other to form a ring (ring (f'''')).

The hydrocarbon group having 2 to 20 carbon atoms in total (f1") means the resultant of excluding a methyl group from the hydrocarbon group having 1 to 20 carbon atoms in total (f1').

When $R^{13}$ and $R^{14}$ are linked to each other to form a ring, regardless of the preferred scope that the $R^{13}$ and $R^{14}$ each have 2 to 20 carbon atoms, it is preferable that the total number of carbon atoms of $R^{13}$ and $R^{14}$ forming a ring structure is 4 to 40, and this ring structure is also preferred as well as the hydrocarbon group.

When $R^{13}$ and $R^{14}$ are linked to each other to form a ring, a part of the hydrogen atoms directly attached to carbon of the $R^{13}$ or $R^{14}$ may also be substituted with a halogen atom, an oxygen-containing group, a nitrogen-containing group or a silicon-containing group. In this case, the sum of carbon atoms in the plurality of substituents forming a ring includes the number of carbon atoms included in the oxygen-containing group, the nitrogen-containing group and the silicon-containing group.

Preferred examples of the hydrocarbon group (f1") include an alkyl group, a substituted alkyl group (including a halogen-substituted alkyl group), a cycloalkyl group, a substituted cycloalkyl group (including a halogen-substituted alkyl group), an arylalkyl group, a substituted arylalkyl group (including a halogen-substituted arylalkyl group and an arylalkyl group substituted with a halogenated alkyl group), an alkylaryl group, a substituted alkylaryl group (including a halogen-substituted alkylaryl group, and an alkylaryl group substituted with a halogenated alkyl group), an aryl group (an aromatic group), a divalent hydrocarbon group (which means the structure where $R^{13}$ and $R^{14}$ are linked to form a ring), and a divalent substituted hydrocarbon group. Preferred examples of the thereof also include a substituted aryl group (including a halogen-substituted aryl group, and an aryl group substituted with a halogenated alkyl group). With regard to the substituted arylalkyl group and the substituted alkylaryl group, the substituent may be attached to the aryl moiety or may be attached to the alkyl moiety.

The silicon-containing group (f2) is a group having a silicon atom which is covalently bonded to a ring carbon of the cyclopentadienyl group, and is specifically an alkylsilyl group or an arylsilyl group. For example, when the substituent does not form a ring with another substituent, the silicon-containing group (f2') having 1 to 20 carbon atoms in total is exemplified by a trimethylsilyl group, a triethylsilyl group, a triphenylsilyl group, or the like.

As $R^{13}$ and $R^{14}$, inter alia, preferred are alkyl groups such as an ethyl group, an n-propyl group, an isopropyl group, an n-butyl group, an isobutyl group, and a tert-butyl group;

cycloalkyl groups such as a cyclopentyl group, a cyclohexyl group, and a cycloheptyl group;

aryl groups such as a phenyl group, a biphenyl group, and a naphthyl group;

alkylaryl groups such as an o-tolyl group, an m-tolyl group, and a p-tolyl group;

arylalkyl groups such as a benzyl group, and a phenylbenzyl group;

substituted aryl groups substituted with a group having a halogen atom, such as an m-(trifluoromethyl)phenyl group, a p-(trifluoromethyl)phenyl group, a bis(trifluoromethyl)phenyl group, an m-chlorophenyl group, a p-chlorophenyl group, and a dichlorophenyl group; and substituted alkylaryl groups substituted with a group having a halogen atom, such as an m-chlorobenzyl group, a p-chlorobenzyl group, an m-fluorobenzyl group, a p-fluorobenzyl group, an m-bromobenzyl group, a p-bromobenzyl group, a dichlorobenzyl group, a difluorobenzyl group, a trichlorobenzyl group, and a trifluorobenzyl group. In the case of having a substituent in the aromatic moiety of the aryl group or arylalkyl group, the group having their substituent at the meta-position and/or para-position is preferred.

Among these, an alkyl group, an arylalkyl group, a substituted arylalkyl group (including a halogen-substituted arylalkyl group and an arylalkyl group substituted with a halogenated alkyl group), and an alkylaryl group are more preferred. Particularly in this case, in addition to the features described above, an α-olefin polymer having a higher melting point and a larger molecular weight can be produced at a temperature above or equal to normal temperature.

As the bridged metallocene compound (a-1) used in the present invention (1), a compound having in which $R^{13}$ and $R^{14}$ are the same is preferably used in view of the ease in production.

Other Features of Bridged Metallocene Compound (a-1)

In the above formula [1-1], Q is selected from a halogen, a hydrocarbon group having 1 to 10 carbon atoms, a neutral, conjugated or non-conjugated diene having 10 or fewer carbon atoms, an anion ligand, and a neutral ligand capable of coordination with a lone electron pair, in identical or different combinations. Specific examples of the halogen include fluorine, chlorine, bromine and iodine, and specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, and 1-methyl-1-cyclohexyl.

Specific examples of the neutral, conjugated or non-conjugated diene having 10 or fewer carbon atoms include s-cis or s-trans-$\eta^4$-1,3-butadiene, s-cis or s-trans-$\eta^4$-1,4-diphenyl-1,3-butadiene, s-cis or s-trans-$\eta^4$-3-methyl-1,3-pentadiene, s-cis or s-trans-$\eta^4$-1,4-dibenzyl-1,3-butadiene, s-cis or s-trans-$\eta^4$-2,4-hexadiene, s-cis or s-trans-$\eta^4$-1,3-pentadiene, s-cis or s-trans-$\eta^4$-1,4-ditolyl-1,3-butadiene, and s-cis or s-trans-$\eta^4$-1,4-bis(trimethylsilyl)-1,3-butadiene.

Specific examples of the anion ligand include alkoxy groups such as methoxy, tert-butoxy, and phenoxy, carboxylate groups such as acetate, and benzoate, and sulfonate groups such as mesylate, and tosylate.

Specific examples of the neutral ligand capable of coordination with a lone electron pair include organophosphorus compounds such as trimethylphosphine, triethylphosphine, triphenylphosphine, and diphenylmethylphosphine, and ethers such as tetrahydrofuran, diethyl ether, dioxane, and 1,2-dimethoxyethane.

j is an integer from 1 to 4, and when j is 2 or greater, Q may be identical to or different from each other.

Preferred Bridged Metallocene Compound (a-1) and Examples Thereof.

Specific examples of the Group 4 transition metal compound represented by the above Formula [1-1] will be shown in the following, but the scope of the present invention (1) is not intended to be limited particularly to these.

Examples thereof include di-n-butylmethylene(cyclopentadienyl)(2,7-dimethyl-3,6-di-tert-butylfluorenyl)zirconium dichloride, di-n-butylmethylene(cyclopentadienyl(2,7-di(2,4,6-trimethylphenyl)-3,6-di-tert-butylfluorenyl)zirconium dichloride, di-n-butylmethylene(cyclopentadienyl)(2,7-diphenyl-3,6-di-tert-butylfluorenyl)zirconium dichloride, di-n-butylmethylene(cyclopentadienyl)(2,7-di(3,5-dimethylphenyl)-3,6-di-tert-butylfluorenyl)zirconium dichloride, di-n-butylmethylene(cyclopentadienyl)(2,3,6,7-tetra-tert-butylfluorenyl)zirconium dichloride, di-n-butylmethylene(cyclopentadienyl)(2,7-di(4-methylphenyl)-3,6-di-tert-butylfluorenyl)zirconium dichloride, di-n-butylmethylene(cyclopentadienyl)(2,7-di-naphthyl-3,6-di-tert-butylfluorenyl)zirconium dichloride, di-n-butylmethylene(cyclopentadienyl)(2,7-di(4-tert-butylphenyl)-3,6-di-tert-butylfluorenyl)zirconium dichloride, diisobutylmethylene(cyclopentadienyl)(2,7-dimethyl-3,6-di-tert-butylfluorenyl)zirconium dichloride, diisobutylmethylene(cyclopentadienyl(2,7-di(2,4,6-trimethylphenyl)-3,6-di-tert-butylfluorenyl)zirconium dichloride, diisobutylmethylene(cyclopentadienyl)(2,7-diphenyl-3,6-di-tert-butylfluorenyl)zirconium dichloride, diisobutylmethylene(cyclopentadienyl)(2,7-di(3,5-dimethylphenyl)-3,6-di-tert-butylfluorenyl)zirconium dichloride, diisobutylmethylene(cyclopentadienyl)(2,3,6,7-tetra-tert-butylfluorenyl)zirconium dichloride, diisobutylmethylene(cyclopentadienyl)(2,7-di(4-methylphenyl)-3,6-di-tert-butylfluorenyl)zirconium dichloride, diisobutylmethylene(cyclopentadienyl)(2,7-di-naphthyl-3,6-di-tert-butylfluorenyl)zirconium dichloride, diisobutylmethylene(cyclopentadienyl)(2,7-di(4-tert-butylphenyl)-3,6-di-tert-butylfluorenyl)zirconium dichloride, dibenzylmethylene(cyclopentadienyl)(2,7-dimethyl-3,6-di-tert-butylfluorenyl)zirconium dichloride [also referred to as 1,3-diphenylisopropylidene(cyclopentadienyl)(2,7-dimethyl-3,6-di-tert-butylfluorenyl)zirconium dichloride, the same applies hereinafter], dibenzylmethylene(cyclopentadienyl)(2,7-di(2,4,6-trimethylphenyl)-3,6-di-tert-butylfluorenyl)zirconium dichloride,
dibenzylmethylene(cyclopentadienyl)(2,7-diphenyl-3,6-di-tert-butylfluorenyl)zirconium dichloride,
dibenzylmethylene(cyclopentadienyl)(2,7-di(3,5-dimethylphenyl)-3,6-di-tert-butylfluorenyl)zirconium dichloride,
dibenzylmethylene(cyclopentadienyl)(2,3,6,7-tetra-tert-butylfluorenyl)zirconium dichloride,
dibenzylmethylene(cyclopentadienyl)(2,7-di(4-methylphenyl)-3,6-di-tert-butylfluorenyl)zirconium dichloride,
dibenzylmethylene(cyclopentadienyl)(2,7-di-naphthyl-3,6-di-tert-butylfluorenyl)zirconium dichloride,
dibenzylmethylene(cyclopentadienyl)(2,7-di(4-tert-butylphenyl)-3,6-di-tert-butylfluorenyl)zirconium dichloride,
diphenethylmethylene(cyclopentadienyl)(2,7-dimethyl-3,6-di-tert-butylfluorenyl)zirconium dichloride,
diphenethylmethylene(cyclopentadienyl)(2,7-diphenyl-3,6-di-tert-butylfluorenyl)zirconium dichloride,
di(benzhydryl)methylene(cyclopentadienyl)(2,7-dimethyl-3,6-di-tert-butylfluorenyl)zirconium dichloride,
di(benzhydryl)methylene(cyclopentadienyl)(2,7-diphenyl-3,6-di-tert-butylfluorenyl)zirconium dichloride,
di(cumyl)methylene(cyclopentadienyl)(2,7-dimethyl-3,6-di-tert-butylfluorenyl)zirconium dichloride,
di(cumyl)methylene(cyclopentadienyl)(2,7-diphenyl-3,6-di-tert-butylfluorenyl)zirconium dichloride,
di(1-phenyl-ethyl)methylene(cyclopentadienyl)(2,7-dimethyl-3,6-di-tert-butylfluorenyl)zirconium dichloride,
di(1-phenyl-ethyl)methylene(cyclopentadienyl)(2,7-diphenyl-3,6-di-tert-butylfluorenyl)zirconium dichloride,
di(cyclohexylmethyl)methylene(cyclopentadienyl)(2,7-dimethyl-3,6-di-tert-butylfluorenyl)zirconium dichloride,
di(cyclohexylmethyl)methylene(cyclopentadienyl)(2,7-diphenyl-3,6-di-tert-butylfluorenyl)zirconium dichloride,
di(cyclopentylmethyl)methylene(cyclopentadienyl)(2,7-dimethyl-3,6-di-tert-butylfluorenyl)zirconium dichloride,
di(cyclopentylmethyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
(benzyl)(n-butyl)methylene(cyclopentadienyl)(2,7-dimethyl-3,6-di-tert-butylfluorenyl)zirconium dichloride,
(benzyl)(n-butyl)methylene(cyclopentadienyl)(2,7-diphenyl-3,6-di-tert-butylfluorenyl)zirconium dichloride,
(benzyl)(cumyl)methylene(cyclopentadienyl)(2,7-dimethyl-3,6-di-tert-butylfluorenyl)zirconium dichloride,
(benzyl)(cumyl)methylene(cyclopentadienyl)(2,7-diphenyl-3,6-di-tert-butylfluorenyl)zirconium dichloride,
cyclopropylidene(cyclopentadienyl)(2,7-dimethyl-3,6-di-tert-butylfluorenyl)zirconium dichloride,
cyclopropylidene(cyclopentadienyl)(2,7-diphenyl-3,6-di-tert-butylfluorenyl)zirconium dichloride,
cyclobutylidene(cyclopentadienyl)(2,7-dimethyl-3,6-di-tert-butylfluorenyl)zirconium dichloride,
cyclobutylidene(cyclopentadienyl)(2,7-diphenyl-3,6-di-tert-butylfluorenyl)zirconium dichloride,
cyclopentylidene(cyclopentadienyl)(2,7-dimethyl-3,6-di-tert-butylfluorenyl)zirconium dichloride,
cyclopentylidene(cyclopentadienyl)(2,7-diphenyl-3,6-di-tert-butylfluorenyl)zirconium dichloride,
cyclohexylidene(cyclopentadienyl)(2,7-dimethyl-3,6-di-tert-butylfluorenyl)zirconium dichloride,
cyclohexylidene(cyclopentadienyl)(2,7-diphenyl-3,6-di-tert-butylfluorenyl)zirconium dichloride,
cycloheptylidene(cyclopentadienyl)(2,7-dimethyl-3,6-di-tert-butylfluorenyl)zirconium dichloride,
cycloheptylidene(cyclopentadienyl)(2,7-diphenyl-3,6-di-tert-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
dibenzylmethylene(cyclopentadienyl)(2,7-dimethyl-3,6-dicumyl-butylfluorenyl)zirconium dichloride,
di-n-butylmethylene(cyclopentadienyl)(2,7-dimethyl-3,6-dicumyl-butylfluorenyl)zirconium dichloride,
dibenzylmethylene(cyclopentadienyl)(2,7-dimethyl-3,6-di(trimethylsilyl)-butylfluorenyl)zirconium dichloride,
di-n-butylmethylene(cyclopentadienyl)(2,7-dimethyl-3,6-di(trimethylsilyl)-butylfluorenyl)zirconium dichloride,
dibenzylmethylene(cyclopentadienyl)(2,7-dimethyl-3,6-diphenyl-butylfluorenyl)zirconium dichloride,
di-n-butylmethylene(cyclopentadienyl)(2,7-dimethyl-3,6-diphenyl-butylfluorenyl)zirconium dichloride,
dibenzylmethylene(cyclopentadienyl)(2,7-dimethyl-3,6-dibenzyl-butylfluorenyl)zirconium dichloride,
di-n-butylmethylene(cyclopentadienyl)(2,7-dimethyl-3,6-dibenzyl-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
diphenylmethylene(cyclopentadienyl)(2,7-dimethyl-3,6-di-tert-butylfluorenyl)zirconium dichloride,
diphenylmethylene(cyclopentadienyl)(2,7-diphenyl-3,6-di-tert-butylfluorenyl)zirconium dichloride,
di(p-tolyl)methylene(cyclopentadienyl)(2,7-dimethyl-3,6-di-tert-butylfluorenyl)zirconium dichloride,
di(p-tolyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-tert-butyl-phenyl)methylene(cyclopentadienyl)(2,7-dimethyl-3,6-di-tert-butylfluorenyl)zirconium dichloride, di(p-tert-butyl-phenyl)methylene(cyclopentadienyl)(2,7-diphenyl-3,6-di-tert-butylfluorenyl)zirconium dichloride,
di(p-n-butyl-phenyl)methylene(cyclopentadienyl)(2,7-dimethyl-3,6-di-tert-butylfluorenyl)zirconium dichloride,
di(p-n-butyl-phenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-diphenyl-3,6-di-tert-butylfluorenyl)zirconium dichloride,
di(1-naphthyl)methylene(cyclopentadienyl)(2,7-dimethyl-3,6-di-tert-butylfluorenyl)zirconium dichloride,
di(1-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(p-isopropylphenyl)methylene(cyclopentadienyl)(2,7-dimethyl-3,6-di-tert-butylfluorenyl)zirconium dichloride,
di(p-isopropylphenyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
diphenylsilylene(cyclopentadienyl)(2,7-dimethyl-3,6-di-tert-butylfluorenyl)zirconium dichloride,
diphenylsilylene(cyclopentadienyl)(2,7-diphenyl-3,6-di-tert-butylfluorenyl)zirconium dichloride,
di(4-chlorobenzyl)methylene(cyclopentadienyl)(2,7-diphenyl-3,6-dimethyl-butylfluorenyl)zirconium dichloride,
di(3-chlorobenzyl)methylene(cyclopentadienyl)(2,7-diphenyl-3,6-dimethyl-butylfluorenyl)zirconium dichloride,
di(4-bromobenzyl)methylene(cyclopentadienyl)(2,7-diphenyl-3,6-dimethyl-butylfluorenyl)zirconium dichloride,
di(3-bromobenzyl)methylene(cyclopentadienyl)(2,7-diphenyl-3,6-dimethyl-butylfluorenyl)zirconium dichloride,
di(4-fluorobenzyl)methylene(cyclopentadienyl)(2,7-diphenyl-3,6-dimethyl-butylfluorenyl)zirconium dichloride,
di(3-fluorobenzyl)methylene(cyclopentadienyl)(2,7-diphenyl-3,6-dimethyl-butylfluorenyl)zirconium dichloride,
di(4-chlorobenzyl)methylene(cyclopentadienyl)(2,7-dimethyl-3,6-dimethyl-butylfluorenyl)zirconium dichloride,
di(4-chlorobenzyl)methylene(cyclopentadienyl)(2,7-dinaphthyl-3,6-dimethylbutylfluorenyl)zirconium dichloride,
di(4-chlorobenzyl)methylene(cyclopentadienyl)(2,7-di{p-tolyl}-3,6-dimethyl-butylfluorenyl)zirconium dichloride,
di(4-chlorobenzyl)methylene(cyclopentadienyl)(2,7-di{o-tolyl}-3,6-dimethyl-butylfluorenyl)zirconium dichloride,
di(4-phenylbenzyl)methylene(cyclopentadienyl)(2,7-diphenyl-3,6-di-tert-butylfluorenyl)zirconium dichloride,
dibenzylmethylene(cyclopentadienyl)(2,7-di{p-chlorophenyl}-3,6-di-tert-butylfluorenyl)zirconium dichloride, and
di(4-chlorobenzyl)methylene(cyclopentadienyl)(2,7-di{p-chlorophenyl}-3,6-di-tert-butylfluorenyl)zirconium dichloride Furthermore, a compound resulting from replacing the "zirconium" of the compound described above with "hafnium" or "titanium", a metallocene compound resulting from replacing the "dichloride" of the compound described above with "difluoride", "dibromide" or "diiodide", or resulting from replacing the "dichloride" of the compound described above with "dimethyl" or "methylethyl", and the like are also likewise the metallocene compound related to the catalyst (1) for olefin polymerization of the present invention (1). In particular, by using a metallocene compound having a Cs-symmetric structure, among the catalyst structures described above, a syndiotactic α-olefin polymer having a high melting point can be synthesized.

The bridged metallocene compound (a-1) described above can be produced by a known method, and the method for production is not particularly limited. The known method for production is exemplified by the methods for production described in the pamphlets of WO 2001/27124 and WO 2004/087775 filed by the present applicant.

The metallocene compound as described above can be used alone or in combination of two or more species.

Catalyst for Olefin Polymerization

Next, preferred embodiments of using the bridged metallocene compound (a-1) described above as a polymerization catalyst in the method for olefin polymerization of the present invention (1), will be described.

In the case of using the bridged metallocene compound (a-1) as a catalyst for olefin polymerization, the catalyst component comprises:

(a-1) a bridged metallocene compound represented by the above Formula [1-1]; and (b) at least one compound selected from:

(b-1) an organoaluminum oxy compound, (b-2) a compound which reacts with the bridged metallocene compound (a-1) to form an ion pair, and (b-3) an organoaluminum compound, and if necessary, further comprises a particulate support (c).

Hereinafter, each component will be described in detail.

(b-1) Organoaluminum Oxy Compound

As the organoaluminum oxy compound (b-1) described above (in the present specification, may also be referred to as "component (b-1)"), a known aluminoxane may be directly used, and specific examples thereof include a compound represented by the following Formula [2]:

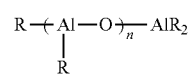

[2]

wherein in the above Formula [2], R's each independently represent a hydrocarbon group having 1 to 10 carbon atom; and n represents an integer of 2 or more, and/or by Formula [3]:

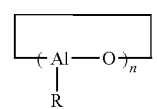

[3]

wherein in the above Formula [3], R represents a hydrocarbon group having 1 to 10 carbon atoms; and n represents an integer of 2 or more. In particular, methylaluminoxane in which R is a methyl group and n is 3 or more, preferably 10 or more, is used. These aluminoxanes may have some amount of an organoaluminum compound incorporated therein.

The characteristic feature in a high temperature solution polymerization of the present invention (1) is that the benzene-insoluble organoaluminum oxy compounds as illustrated in JP-A No. 2-78687 can be also applied. The organoaluminum oxy compounds described in JP-A No. 2-167305, aluminoxanes having 2 or more kinds of alkyl groups as described in JP-A Nos. 2-24701 and 3-103407, and the like are also appropriately used. The "benzene-insoluble" organoaluminum oxy compound means an organoaluminum oxy compound which is insoluble or poorly soluble in benzene to the extent that the Al component soluble in benzene at 60° C. is contained in an amount of generally 10% or less, preferably 5% or less, and particularly preferably 2% or less, relative to Al atoms.

Examples of the organoaluminum oxy compound (b-1) also include modified methylaluminoxane as represented by the following Formula [4] and the like:

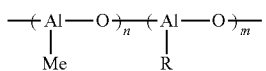

[4]

wherein R represents a hydrocarbon group having 1 to 10 carbon atoms; and m and n each independently represent an integer of 2 or more.

This modified methylaluminoxane is prepared using trimethylaluminum and an alkylaluminum other than trimethylaluminum. Such modified methylaluminoxane is generally referred to as MMAO. MMAO can be prepared by the methods disclosed in U.S. Pat. No. 4,960,878 and U.S. Pat. No. 5,041,584. In addition, such a compound in which R is an isobutyl group, which compound is prepared using trimethylaluminum and triisobutylaluminum, is also commercially produced by Tosoh Finechem Corporation and the like under the product name of MMAO or TMAO. Such MMAO is an aluminoxane having improved solubility in various solvents and storage stability, and specifically, the compound is soluble in aliphatic hydrocarbons and alicyclic hydrocarbons, unlike the aluminoxanes that are insoluble or poorly soluble in benzene, such as the compounds represented by Formula [2] or [3] mentioned.

Furthermore, examples of the organoaluminum oxy compound (b-1) also include an organoaluminum oxy compound containing boron, represented by the following Formula [5].

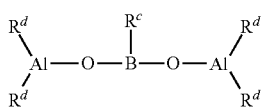

[5]

wherein in the Formula [5], $R^c$ represents a hydrocarbon group having 1 to 10 carbon atoms; $R^d$'s, which may be identical to or different from each other, each represent a hydrogen atom, a halogen atom, or a hydrocarbon group having 1 to 10 carbon atoms.

(b-2) Compound which Reacts with the Bridged Metallocene Compound (a-1) to Form an Ion Pair Examples of the compound (b-2) which reacts with the bridged metallocene compound (a-1) to form an ion pair (hereinafter, may be referred to as "ionic compound (b-2)" or "compound (b-2)") include Lewis acids, ionic compounds, borane compounds and carborane compounds described in JP-A No. 1-501950, JP-A No. 1-502036, JP-A No. 3-179005, JP-A No. 3-179006, JP-A No. 3-207703, JP-A No. 3-207704, U.S. Pat. No. 5,321,106, and the like. Examples thereof also include heteropoly compounds and isopoly compounds.

An ionic compound (b-2) preferably employed in the present invention is a compound represented by the following Formula [6].

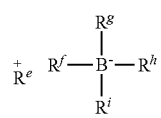

[6]

wherein in the Formula [6], $R^{e+}$ is exemplified by $H^+$, a carbenium cation, an oxonium cation, an ammonium cation, a phosphonium cation, a cycloheptyltrienyl cation, a ferrocenium cation having a transition metal, or the like; $R^f$ to $R^i$ may be identical to or different from each other, and are each an organic group, preferably an aryl group.

Specific examples of the carbenium cation include trisubstituted carbenium cations such as triphenylcarbenium cation, tris(methylphenyl)carbenium cation, and tris(dimethylphenyl)carbenium cation.

Specific examples of the ammonium cation include trialkylammonium cations such as trimethylammonium cation, triethylammonium cation, tri(n-propyl)ammonium cation, triisopropylammonium cation, tri(n-butyl)ammonium cation, and triisobutylammonium cation; N,N-dialkylanilinium cations such as N,N-dimethylanilinium cation, N,N-diethylanilinium cation, and N,N-2,4,6-pentamethylanilinium cation; and dialkylammonium cations such as diisopropylammonium cation, and dicyclohexylammonium cation.

Specific examples of the phosphonium cation include triarylphosphonium cations such as triphenylphosphonium cation, tris(methylphenyl)phosphonium cation, and tris(dimethylphenyl)phosphonium cation.

Among them, $R^{e+}$ is preferably a carbenium cation, an ammonium cation, or the like, and particularly preferably a triphenylcarbenium cation, an N,N-dimethylanilinium cation, an N,N-diethylanilinium cation, or the like.

Specific examples of a carbenium salt include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate, and tris(3,5-dimethylphenyl)carbenium tetrakis(pentafluorophenyl)borate.

Examples of an ammonium salt include trialkyl-substituted ammonium salts, and N,N-dialkylanilinium salts, dialkylammonium salts.

Specific examples of the trialkyl-substituted ammonium salt include triethylammonium tetraphenylborate, tripropylammonium tetraphenylborate, tri(n-butyl)ammonium tetraphenylborate, trimethylammoniumtetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)

borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, and dioctadecylmethylammonium.

Specific examples of an N,N-dialkylanilinium salt include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, and N,N-2,4,6-pentamethylanilinium tetrakis(pentafluorophenyl)borate.

Specific examples of an dialkylammonium salt include di(1-propyl)ammonium tetrakis(pentafluorophenyl)borate, and dicyclohexylammonium tetraphenylborate.

In addition to these, ionic compounds disclosed by the present applicant (JP-A No. 2004-51676) can also be used without limitation.

The ionic compound (b-2) as described above can be used as a mixture of two or more species.

(b-3) Organoaluminum Compound

Examples of the organoaluminum compound (b-3) (in the present specification, may also be referred to as "component (b-3)") forming the catalyst for olefin polymerization include an organoaluminum compound represented by the following Formula [7], and a complex alkylated product of Group 1 transition metal and aluminum represented by the following Formula [8].

$$R^a{}_m Al(OR^b)_n H_p X_q \quad [7]$$

wherein in the Formula [7], $R^a$ and $R^b$, which may be identical to or different from each other, each represent a hydrocarbon group having 1 to 15, preferably 1 to 4, carbon atoms; X represents a halogen atom; m is a number satisfying 0<m≤3, n is a number satisfying 0≤n<3, p is a number satisfying 0≤p<3, and q is a value satisfying 0≤q<3; and m+n+p+q=3.

Specific examples of such compound include tri-n-alkylaluminums such as trimethylaluminum, triethylaluminum, tri-n-butylaluminum, trihexylaluminum, and trioctylaluminum;

tri-branched-alkylaluminums such as triisopropylaluminum, triisobutylaluminum, tri-sec-butylaluminum, tri-tert-butylaluminum, tri-2-methylbutylaluminum, tri-3-methylhexylaluminum, and tri-2-ethylhexylaluminum;

tricycloalkylaluminums such as tricyclohexylaluminum, and tricyclooctylaluminum;

triarylaluminums such as triphenylaluminum, and tritolylaluminum;

dialkylaluminum hydrides such as diisopropylaluminum hydride, and diisobutylaluminum hydride;

alkenylaluminums represented by general formula: $(i\text{-}C_4H_9)_x Al_y (C_5H_{10})_z$ (wherein x, y and z are positive numbers, and z≤2x), such as isoprenylaluminum;

alkylaluminum alkoxides such as isobutylaluminum methoxide, and isobutylaluminum ethoxide;

dialkylaluminum alkoxides such as dimethylaluminummethoxide, diethylaluminumethoxide, and dibutylaluminumbutoxide;

alkylaluminum sesquialkoxides such as ethylaluminum sesquiethoxide, and butylaluminum sesquibutoxide;

partially alkoxylated alkylaluminums having an average composition represented by general formula: $Ra_{2.5}Al(ORb)_{0.5}$  and the like;

alkylaluminum aryloxides such as diethylaluminum phenoxide, and diethylaluminum (2,6-di-t-butyl-4-methylphenoxide);

dialkylaluminum halides such as dimethylaluminum chloride, diethylaluminum chloride, dibutylaluminum chloride, diethylaluminum bromide, and diisobutylaluminum chloride;

alkylaluminum sesquihalides such as ethylaluminum sesquichloride, butylaluminum sesquichloride, and ethylaluminum sesquibromide;

partially halogenated alkylaluminums such as alkylaluminum dihalide such as ethylaluminum dichloride;

dialkylaluminum hydrides such as diethylaluminum hydride, and dibutylaluminum hydride;

partially hydrogenated alkylaluminums such as alkylaluminum dihydride such as ethylaluminum dihydride, and propylaluminum dihydride;

partially alkoxylated and halogenated alkylaluminums such as ethylaluminum ethoxychloride, butylaluminum butoxychloride, and ethylaluminum ethoxybromide.

$$M^2 AlR^a{}_4 \quad [8]$$

wherein in Formula [8], $M^2$ represents Li, Na or K; and $R^a$ represents a hydrocarbon group having 1 to 15, preferably 1 to 4, carbon atoms.

Such compound is exemplified by $LiAl(C_2H_5)_4$, $LiAl(C_7H_{15})_4$ or the like.

A compound similar to the compound represented by the Formula [8] can also be used, and examples thereof include an organoaluminum compound in which two or more aluminum compounds are bound with a nitrogen atom interposed therebetween. Specifically, such compound is exemplified by $(C_2H_5)_2AlN(C_2H_5)Al(C_2H_5)_2$ or the like.

As the organoaluminum compound (b-3), trimethylaluminum and triisobutylaluminum are preferably used from the aspect of easy availability.

Furthermore, in the catalyst (1) for olefin polymerization, if necessary, a support (c) may be used along with the (a-1) bridged metallocene compound represented by the Formula [1-1], and (b) at least one compound selected from (b-1) the organoaluminum oxy compound, (b-2) the compound which reacts with the bridged metallocene compound (a-1) to form an ion pair, and (b-3) the organoaluminum compound.

(c) Support

The support (c) (in the present specification, may be referred to as "component (c)") is an inorganic or organic compound, and is a granular or microparticulate solid. Among these, the inorganic compound is preferably a porous oxide, an inorganic halide, a clay, a clay mineral, or an ion exchangeable lamellar compound.

As the porous oxide, specifically $SiO_2$, $Al_2O_3$, MgO, ZrO, $TiO_2$, $B_2O_3$, CaO, ZnO, BaO, $ThO_2$ and the like, or complexes or mixtures containing these, for example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like can be used. Among these, it is preferable to use $SiO_2$ and/or $Al_2O_3$ as the main component.

The above-mentioned inorganic oxide may contain a small amount of carbonate, sulfate, nitrate or oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Such porous oxide may vary in the properties depending on the type and method for production. The support (c) has a particle size of 3 to 300 μm, preferably 10 to 300 μm, and more preferably 20 to 200 μm, a specific surface area in the range of 50 to 1000 m²/g, preferably 100 to 700 m²/g, and a pore volume preferably in the range of 0.3 to 3.0 cm³/g. Such support is calcined as necessary at 100 to 1000° C., and preferably 150 to 700° C., and used.

As the inorganic halide, $MgCl_2$, $MgBr_2$, $MnCl_2$, $MnBr_2$ and the like are used. The inorganic chloride may be used directly, or may be used after grinding with a ball mill or a vibration mill. Furthermore, a halide obtained by dissolving the inorganic halide in a solvent such as alcohol, and then precipitating the compound into a microparticulate form using a precipitating agent, can also be used.

The clay is usually constituted of a clay mineral as the main component. The ion exchangeable lamellar compound is a compound having a crystal structure in which the planes constituted of ionic bonding are stacked on one another in parallel with weak bonding strength, and in which the ions contained can be exchanged. Most of the clay minerals are ion exchangeable lamellar compounds. The clay, clay mineral and ion exchangeable lamellar compound are not limited to natural products, and artificially synthesized products can also be used. Furthermore, examples of the clay, clay mineral or ion exchangeable lamellar compound include clays, clay minerals, and ion crystalline compounds having lamellar crystal structures such as hexagonal close packed type, antimony type, $CdCl_2$ type, and $CdI_2$ type.

Examples of the clay and clay mineral include kaolin, bentonite, kibushi clay, gairome clay, allophane, hisingerite, pyrophyllite, mica group, montmorillonite group, vermiculite, phyllite group, palygorskite, kaolinite, nacrite, dickite, and halloysite. Examples of the ion exchangeable layer compound include crystalline acid salts of multivalent metals such as $\alpha\text{-}Zr(HAsO_4)_2\cdot H_2O$, $\alpha\text{-}Zr(HPO_4)_2$, $\alpha\text{-}Zr(KPO_4)_2\cdot 3H_2O$, $\alpha\text{-}Ti(HPO_4)_2$, $\alpha\text{-}Ti(HAsO_4)_2\cdot H_2O$, $\alpha\text{-}Sn(HPO_4)_2\cdot H_2O$, $\gamma\text{-}Zr(HPO_4)_2$, $\gamma\text{-}Ti(HPO_4)_2$, and $\gamma\text{-}Ti(NH_4PO_4)_2\cdot H_2O$.

It is preferable for such clay, clay mineral or ion exchangeable lamellar compound that the volume of pores having a radius of 20 Å or more as measured by mercury porosimetry is preferably 0.1 cc/g or larger, and particularly preferably 0.3 to 5 cc/g. The pore volume is measured for the pore radius in the range of 20 to $3\times10^4$ Å according to the mercury porosimetry using the mercury porosimeter.

When a support having a pore volume with 20 Å radius or more of 0.1 cc/g or less is used, there is a tendency that high polymerization activity is hardly obtained.

The clay and clay mineral may preferably be subjected to a chemical treatment. Any of the chemical treatment such as a surface treatment which removes impurities attached on the surface, and treatments giving an effect on the crystal structure of the clay, can be used. Specific examples of the chemical treatment include an acid treatment, an alkali treatment, a treatment with salts, and a treatment with organic compound. The acid treatment removes impurities on a surface, and also increases the surface area by eluting a positive ion such as Al, Fe, and Mg in the crystal structure. The alkali treatment destroys the crystal structure of the clay, and brings a structural change in the clay. The treatment with salts and the treatment with organic compound form an ionic complex, molecular complex, organic derivative or the like, and can change the surface area and the interlayer distance.

The ion exchangeable lamellar compound may be a lamellar compound with the interlayer distance enlarged by exchanging the interlayer exchangeable ion with another bulky ion using its ion exchangeability. Such bulky ion plays a supportive role to support a lamellar structure, and is generally called as a pillar. Also, the introduction of other substance to the interlayer space of the lamellar compound is known as intercalation. Examples of the guest compound for intercalation include a positive ion inorganic compound such as $TiCl_4$ and $ZrCl_4$, a metal alkoxide (wherein R is a hydrocarbon group or the like) such as $Ti(OR)_4$, $Zr(OR)_4$, $PO(OR)_3$, and $B(OR)_3$, a metal hydroxide ion such as $[Al_{13}O_4(OH)_{24}]^{7+}$, $[Zr_4(OH)_{14}]^{2+}$, and $[Fe_3O(OCOCH_3)_6]^+$. These compounds may be used alone or in combination of two or more species. When allowing these compounds to undergo intercalation, a polymer obtained by hydrolyzing metal alkoxide such as $Si(OR)_4$, $Al(OR)_3$ and $Ge(OR)_4$ (R's are each a hydrocarbon group, or the like), a colloidal inorganic compound such as $SiO_2$, or the like can be allowed to coexist. Examples of the pillar include oxides produced by conducting thermal dehydration of the above-mentioned metal hydroxide ion after intercalation thereof. Among them, preferred are clays and clay minerals and particularly preferred are montmorillonite, vermiculite, pectolite, tainiolite, and synthetic mica.

The clays, clay minerals, and ion-exchangeable layer compounds may be used directly, or used after being subjected to a treatment with ball mill, screening or the like. Or alternatively, they may be used after adsorbing newly added water thereonto, or after being subjected to thermal dehydration treatment. They may be used alone or in combination of two or more species.

In the case of using an ion-exchangeable lamellar silicate, it is possible to reduce the amount of use of an organoaluminum oxy compound such as alkylaluminoxane, by using the ion exchangeable property and lamellar structure, in addition to the function as a support. Ion exchangeable lamellar silicate is mainly obtained in nature as a main component of a clay mineral, but without imposing any particular limitation to natural products, artificially synthesized products can also be used. Specific examples of the clay, the clay mineral, and ion exchangeable layer silicate include kaolinite, montmorillonite, hectorite, bentonite, smectite, vermiculite, tiniolite, synthetic mica, and synthetic hectorite.

The organic compound may be exemplified by a granular solid or a microparticulate solid having a particle size in the range of 3 to 300 μm, and preferably 10 to 300 μm. Specific examples thereof include (co)polymers produced from an α-olefin having 2 to 14 carbon atoms such as ethylene, propylene, 1-butene, and 4-methyl-1-pentene as the main component; a (co)polymer produced from vinylcyclohexane, styrene as the main component; and polymers or modified products having a polar functional group obtained by copolymerizing or graft polymerizing a polar monomer such as acrylic acid, acrylic ester and maleic acid anhydride, into the above-mentioned copolymer or a polymer. These particulate supports may be used alone or in combination of two or more species.

Furthermore, the catalyst for olefin polymerization of the present invention (1) may also contain a specific organic compound component (d) that will be described later according to necessity, along with the (a-1) bridged metallocene compound represented by the Formula [1-1], (b) at least one compound selected from (b-1) the organoaluminum oxy compound, (b-2) the compound which reacts with the bridged metallocene compound (a-1) to form an ion pair, and (b-3) the organoaluminum compound, and optional (c) the support.

(d) Organic Compound Component

In the present invention, the organic compound component (d) (in the present specification, may be referred to as "component (d)") is used if needed, for the purpose of improving the polymerization performance and properties of the produced obtained. Such organic compound component (d) is exemplified by alcohols, phenolic compounds, carboxylic acids, phosphorus compounds, sulfonates and the like, but the compound is not limited to these.

In the present invention (1), the method of using each component, and the order of addition are arbitrarily selected, and the following methods may be mentioned as the methods of polymerization.

(1) A method comprising adding the component (a-1) alone into the polymerization vessel.

(2) A method comprising adding the component (a-1) and component (b) into the polymerization vessel in an arbitrary order.

(3) A method comprising adding a catalyst component in which the component (a-1) is supported on the support (c), and the component (b) into the polymerization vessel in an arbitrary order.

(4) A method comprising adding a catalyst component in which the component (b) is supported on the support (c), and the component (a-1) into the polymerization vessel in an arbitrary order.

(5) A method comprising adding a catalyst component in which the component (a-1) and the component (b) are supported on the support (c) into the polymerization vessel.

In the respective methods of (2) to (5) described above, at least two or more of the catalyst components may be brought into contact with each other in advance.

In the respective methods of (4) and (5) described above using supported component (b), unsupported component (b) may be added in any order, as necessary. In this case, the components (b) may be identical to or different from each other.

Furthermore, the solid catalyst component having the component (a-1) supported on the component (c), and the solid catalyst component having the component (a-1) and component (b) supported on the component (c) may have a prepolymerized olefin, or a prepolymerized solid catalyst component may further have the catalyst component supported thereon.

In the method for polymerizing olefin of the present invention (1), olefin is polymerized or copolymerized in the presence of the catalyst for olefin polymerization as described above, to obtain an olefin polymer.

In the present invention (1), polymerization can be carried out by any of a liquid phase polymerization method such as a solution polymerization, and a suspension polymerization, and a gas phase polymerization method. Specific examples of the inert hydrocarbon medium used in the liquid phase polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane, and mixtures thereof. The olefin to be polymerized may also be used per se as the solvent.

When polymerization of olefin is performed using the catalyst for olefin polymerization as described above, the component (a-1) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio [(b-1)/M] of the component (b-1) and the total transition metal atoms (M) in the component (a-1) is usually 0.01 to 5,000, and preferably 0.05 to 2,000. The component (b-2) is used in an amount such that the molar ratio [(b-2)/M] of the component (b-2) and the transition metal atoms (M) in the component (a-1) is usually 1 to 10, and preferably 1 to 5. The component (b-3) is used in an amount such that the molar ratio [(b-3)/M] of the aluminum atoms in the component (b-3) and the total transition metal (M) in the component (a-1) is usually 10 to 5,000, and preferably 20 to 2,000.

The component (d) is used, in the case where the component (b) is component (b-1), in an amount such that the molar ratio [(d)/(b-1)] is usually 0.01 to 10, and preferably 0.1 to 5; in the case where the component (b) is component (b-2), in an amount such that the molar ratio [(d)/(b-2)] is usually 0.01 to 10, and preferably 0.1 to 5; in the case where the component (b) is component (b-3), the molar ratio [(d)/(b-3)] is usually 0.01 to 2, and preferably 0.005 to 1.

The temperature for olefin polymerization using the catalyst for olefin polymerization is generally within the range from −50 to +200° C., preferably from 0 to 170° C., more preferably from 25 to 170° C., and even more preferably from 40 to 170° C. The polymerization pressure is under the condition of generally from normal pressure to 10 MPa gauge pressure, and preferably from normal pressure to 5 MPa gauge pressure, and the polymerization reaction can be carried out either batchwise, semicontinuously or continuously. The polymerization can be carried out by dividing the process into two or more stages having different reaction conditions. The molecular weight of the resulting propylene polymer can be also regulated by allowing hydrogen to exist in the polymerization system or by varying the polymerization temperature. Moreover, the molecule weight can be regulated according to the amount of the component (b) used. When adding hydrogen, the suitable amount to be added is from about 0.001 to 100 NL per 1 kg of the olefin.

In the present invention (1), the olefin supplied to the polymerization reaction is one or more monomers selected from α-olefins having two or more carbon atoms. The α-olefin is a straight-chained or branched α-olefin having 2 to 20 carbon atoms, and is exemplified by ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene or the like.

In the method of polymerization of the present invention (1), there may be used cyclic olefins having 3 to 30 carbon atoms, preferably 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene;

polar monomers, for example, α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic anhydride, and metal salts thereof such as sodium salt, potassium salt, lithium salt, zinc salt, magnesium salt, calcium salt and aluminum salt;

α,β-unsaturated carboxylic esters such as methyl acrylate, n-butyl acrylate, n-propyl acrylate, isopropyl acrylate, n-butyl acrylate, isobutyl acrylate, tert-butyl acrylate, 2-n-butylhexyl acrylate, methyl methacrylate, n-butyl methacrylate, n-propyl methacrylate, isopropyl methacrylate, n-butyl methacrylate and isobutyl methacrylate;

vinyl esters such as vinyl acetate, vinyl propionate, vinyl caproate, vinyl caprate, vinyl laurate, vinyl stearate and vinyl trifluoroacetate;

unsaturated glycidyls such as glycidyl acrylate, glycidyl methacrylate and itaconic acid monoglycidyl ester; and the like.

Furthermore, vinylcyclohexane, dienes and polyenes;

aromatic vinyl compounds, for example, mono- or poly-alkylstryenes such as styrene, o-methylstyrene, m-methylstyrene, p-methylstyrene, o,p-dimethylstyrene, o-n-butylstyrene, m-n-butylstyrene, and p-n-butylstyrene;

styrene derivatives containing a functional group, such as methoxystyrene, ethoxystyrene, vinyl benzoate, methylvinyl benzoate, vinylbenzyl acetate, hydroxystyrene, o-chlorostyrene, p-chlorostyrene and divinyl benzene; and 3-phenylpropylene, 4-phenylpropylene, α-methylstyrene and the like may be allowed to coexist in the reaction system to facilitate the polymerization.

The method for production of the present invention (1) can be used, for example, in the production of a polymer comprising 100 to 90 mol %, preferably 100 to 91 mol %, and more preferably 100 to 96 mol %, of constituent units derived from one monomer (for example, propylene) selected from α-olefins having 3 to 20 carbon atoms; and 10 to 0 mol %, preferably 9 to 0 mol %, and more preferably 4 to 0 mol %, of constituent units derived from one or more selected from α-olefins having 2 to 20 carbon atoms (excluding propylene), which monomer is different from the above-described monomer. Examples thereof include production of propylene homopolymer. Such α-olefin polymer preferably has a syndiotactic structure, and for example, its rrrr value measured by the method that will be described later is preferably 70% or greater, and preferably 85% or greater.

The method for production of the present invention (1) can be used, for example, in the production of a polymer comprising 100 to 50 mol % of constituent units derived from ethylene, and 50 to 0 mol % of constituent units derived from one or more monomers selected from α-olefins having 3 to 20 carbon atoms. Examples thereof include production of ethylene homopolymer.

The method for production of the present invention (1) can also be used in the production of other polymers.

Next, methods for measuring the properties of the polymer obtained by the polymerization of olefin in the presence of a catalyst containing a transition metal compound of the present invention (1), will be described.

[Intrinsic Viscosity ([η])]

It is a value measured at 135° C. using a decalin solvent. Specifically, about 20 mg of granulated pellets are dissolved in 15 ml of decalin, and the specific viscosity ηsp is measured in an oil bath at 135° C. 5 ml of the decalin solvent is added to this decalin solution for dilution, and than the specific viscosity ηsp is measured in the same manner. This dilution operation is additionally repeated two times, and the value of ηsp/C of when the concentration (C) is extrapolated to 0 is determined as the intrinsic viscosity.

$$[\eta] = \lim(\eta sp/C) \ (C \to 0).$$

[Melting Point (Tm)]

A polymer sample maintained at 200° C. for 10 minutes is cooled to 30° C., maintained for 5 minutes, and then heated at a rate of 10° C./min by differential scanning calorimetry (DSC), and the melting point is calculated from the crystal melting peak obtained therefrom. For the propylene polymer described in Example I here, one or two peaks are observed, and when two peaks are detected, the peak on the lower temperature side is indicated as $Tm_1$, and the peak on the higher temperature side is indicated as $Tm_2$. If there is one peak, the peak is indicated as $Tm_2$.

Furthermore, the stereoregularity (rrrr) is calculated from the determination of $^{13}$C-NMR spectrum.

The rrrr fraction is determined from the absorption intensities of Prrrr (absorption intensity resulting from the methyl group of the third unit at a site of 5 propylene units being sequentially syndiotactically bound) and Pw (absorption intensity resulting from all the methyl groups of propylene units), by the following formula (1).

$$rrrr \text{ fraction } (\%) = 100 \times Prrrr/Pw \quad (1)$$

NMR measurement is carried out, for example, in the following manner. Specifically, 0.35 g of a sample is heated to melt in 2.0 ml of hexachlorobutadiene. This solution is filtered through a glass filter (G2), subsequently, 0.5 ml of deuterated benzene is added, and the mixture is placed in an NMR tube having an internal diameter of 10 mm. Then, $^{13}$C-NMR measurement is performed at 120° C. using a GX-500 type NMR measuring apparatus manufactured by JEOL, Ltd. The accumulation times are 10,000 or greater.

<Method for Producing Propylene-Based Copolymer (B1)>

Next, the method for producing the propylene-based copolymer (B1) of the present invention (2) will be described in detail.

The method for producing the propylene-based copolymer (B1) of the present invention (2) is characterized in polymerizing propylene and at least one monomer selected from α-olefins and polyenes, in the presence of a catalyst (2) for olefin polymerization comprising:

(a-2) a bridged metallocene compound represented by the above Formula [1-2]; and (b) at least one compound selected from:
(b-1) an organoaluminum oxy compound,
(b-2) a compound which reacts with the bridged metallocene compound (a-2) to form an ion pair, and
(b-3) an organoaluminum compound.

[1] (a-2) Bridged Metallocene Compound

The bridged metallocene compound (a-2) represented by the above Formula [1-2] (in the present specification, may also be referred to as "component (a-2)") has the following chemical structural features [m2-1] to [m2-3].

[m2-1] Of the two ligands, one is a cyclopentadienyl group which may be substituted, and the other is a fluorenyl group which is substituted (hereinafter, may be referred to as "substituted fluorenyl group").

[m2-2] The two ligands are bound by a covalently bonded bridge containing a carbon atom or silicon atom having an aryl group or a substituted aryl group (hereinafter, may be referred to as "covalently bonded bridge containing an aryl group or a substituted aryl group").

[m2-3] The transition metal (M) constituting the metallocene compound is titanium, zirconium or hafnium.

Hereinafter, the cyclopentadienyl group which may be substituted, the substituted fluorenyl group and the bridging part, which are chemical structural features of the bridged metallocene compound (a-2), and other features will be described in order, and preferred bridged metallocene compounds having these features, and examples thereof, and finally the method for polymerization of the present invention (2) using the bridged metallocene compound (a-2) will be described in detail.

Cyclopentadienyl Group which May be Substituted

The cyclopentadienyl group may or may not be substituted. An unsubstituted cyclopentadienyl group is a cyclopentadienyl group in which $R^1$, $R^2$, $R^3$ and $R^4$ possessed by the cyclopentadienyl group moiety in the above Formula [1-2] are all hydrogen atoms, and a substituted cyclopentadienyl group may be a cyclopentadienyl group in which any one or more of $R^1$, $R^2$, $R^3$ and $R^4$ may be substituted with a hydrocarbon group (f1), or a silicon-containing group (f2). In the case of a group in which two or more of $R^1$, $R^2$, $R^3$ and $R^4$ are groups other than hydrogen atom, these groups may be identical to or different from each other.

The hydrocarbon group (f1) used for $R^1$ to $R^4$ may be preferably exemplified, in the case where the substituent does not form a ring together with another substituent, by a hydrocarbon group having 1 to 20 carbon atoms in total (hereinafter, may also be referred to as "hydrocarbon group (f1')").

When $R^2$ and $R^3$ are each the hydrocarbon group (f1), $R^2$ and $R^3$ may be linked to each other to form a ring (hereinafter, may also be referred to as "ring (f''')"). When substituents $R^2$ and $R^3$ are linked to each other to form a ring, it is more preferable that only $R^2$ and $R^3$ among $R^1$ to $R^4$ form a ring.

In the case where, for example, substituents $R^2$ and $R^3$ are linked to each other to form a ring, regardless of the fact that each of the above-mentioned $R^2$ and $R^3$ preferably has 1 to 20 carbon atoms, the sum of the carbon atoms of the two substituents forming a ring is preferably 2 to 40, more preferably 3 to 30, and even more preferably 4 to 20.

Even in the case where the substituents $R^2$ and $R^3$ are linked to each other to form a ring, a part of the hydrogen atoms directly attached to carbon atoms of the substituents may be substituted by a halogen atom, an oxygen-containing group, a nitrogen-containing group or a silicon-containing group, and in this case, the sum of the carbon atoms of the two substituents forming a ring includes the number of carbon atoms contained in the oxygen-containing group, the nitrogen-containing group and the silicon-containing group.

The hydrocarbon group (f1') having 1 to 20 carbon atoms in total means an alkyl group, an alkenyl group, an alkynyl group or an aryl group, which is constituted only with carbon and hydrogen.

The hydrocarbon group (f1') having 1 to 20 carbon atoms in total includes, in addition to the alkyl group, alkenyl group, alkynyl group or aryl group constituted only with carbon and hydrogen, a heteroatom-containing hydrocarbon group in which a part of the hydrogen atoms are substituted with a halogen atom, an oxygen-containing group, a nitrogen-containing group or a silicon-containing group. Examples of such hydrocarbon group (f1') include:

straight-chained hydrocarbon groups such as a methyl group, an ethyl group, an n-propyl group, an allyl group, an n-butyl group, an n-pentyl group, an n-hexyl group, an n-heptyl group, an n-octyl group, an n-nonyl group, and an n-decanyl group;

branched hydrocarbon groups such as an isopropyl group, a t-butyl group, an amyl group, a 3-methylpentyl group, a 1,1-diethylpropyl group, a 1,1-dimethylbutyl group, 1-methyl-1-propylbutyl group, a 1,1-propylbutyl group, a 1,1-dimethyl-2-methylpropyl group, and a 1-methyl-1-isopropyl-2-methylpropyl group;

saturated cyclic hydrocarbon groups such as a cyclopentyl group, a cyclohexyl group, a cycloheptyl group, a cyclooctyl group, a norbornyl group, and an adamantyl group;

unsaturated cyclic hydrocarbon groups such as a phenyl group, a naphthyl group, a biphenyl group, a phenanthryl group, and an anthracenyl group, and nuclear alkyl-substituted products thereof;

saturated hydrocarbon groups substituted with an aryl group such as a benzyl group, and a cumyl group; and heteroatom-containing hydrocarbon groups such as a methoxy group, an ethoxy group, a phenoxy group, an N-methylamino group, a trifluoromethyl group, a tribromomethyl group, a pentafluoroethyl group, a pentafluorophenyl group, a fluorophenyl group, a chlorophenyl group, a bromophenyl group, a chlorobenzyl group, a fluorobenzyl group, a bromobenzyl group, a dichlorobenzyl group, a difluorobenzyl group, a trichlorobenzyl group, and a trifluorobenzyl group.

The silicon-containing group (f2) is a group having a silicon atom which is covalently bonded to a ring carbon of the cyclopentadienyl group, and is specifically an alkylsilyl group or an arylsilyl group. A preferred silicon-containing group (f2), in the case where the substituent does not form a ring together with another substituent, may be exemplified by a silicon-containing group (f2') having 1 to 20 carbon atoms in total, and examples thereof include a trimethylsilyl group, and a triphenylsilyl group.

In this cyclopentadienyl group, it is preferable that $R^1$ and $R^4$ are identical atoms or identical groups, and $R^2$ and $R^3$ are linked to form a ring, or are identical atoms or identical groups. It is more preferable that $R^1$ and $R^4$ are hydrogen atoms, and it is particularly preferable that all of $R^1$, $R^2$, $R^3$ and $R^4$ are hydrogen atoms.

Substituted Fluorenyl Group

Important features for the fluorenyl group moiety in the chemical structure represented by the above Formula [1-2] used in the method for polymerization of the present invention (1), are that $R^6$ and $R^{11}$ are identical atoms or identical groups selected from hydrogen, a hydrocarbon group, and a silicon-containing group; $R^7$ and $R^{10}$ are identical atoms or identical groups selected from hydrogen, a hydrocarbon group and a silicon-containing group; $R^6$, $R^7$, $R^{10}$ and $R^{11}$ are not simultaneously hydrogen atoms. Therefore, $R^6$, $R^7$, $R^{10}$, $R^{11}$ may be each the hydrocarbon group (f1) described above, or the silicon-containing group (f2) described above.

Furthermore, $R^5$, $R^8$, $R^9$ and $R^{12}$ may be atoms or groups that may be identical to or different from each other, and selected from hydrogen, the hydrocarbon group (f1) and the silicon-containing group (f2), and adjacent groups among $R^5$ to $R^{12}$ may be linked to each other to form a ring.

Examples of the hydrocarbon group (f1) used in the substituents $R^5$ to $R^{12}$ include, in the case where the substituent is a group not forming a ring together with another substituent, a hydrocarbon group having 1 to 20 carbon atoms in total (the hydrocarbon group (f1')).

When the substituents $R^5$ to $R^{12}$ are each the hydrocarbon group (f1), the substituent may be linked to another substituent among the substituents $R^5$ to $R^{12}$ within the range of the above-described combinations of adjacent groups, to form a ring. In this case, the adjacent substituents among $R^5$ to $R^{12}$ are linked to each other to form a ring (ring (f''')).

Furthermore, when adjacent substituents among the substituents $R^5$ to $R^{12}$ are linked to each other within the range of the above-described combinations of adjacent groups, to form a ring, two, three, or four adjacent substituents among substituents $R^5$ to $R^{12}$ may be linked to each other to form a ring(s), and it is preferable that two adjacent groups among the substituents $R^5$ to $R^{12}$ are linked to each other to form a ring.

For example, when two adjacent substituents among substituents $R^5$ to $R^{12}$ are linked to each other to form a ring (for example, when $R^6$ and $R^7$ are linked to each other to form a ring, etc.), regardless of the fact that the preferred number of carbon atoms for each of the above-described $R^5$ to $R^{12}$ is 1 to 20, the sum of the carbon atoms in the two substituents forming a ring is preferably 2 to 40, more preferably 3 to 30, and even more preferably 4 to 20.

For example, when three adjacent substituents among substituents $R^5$ to $R^{12}$ are linked to each other to form rings (for example, $R^5$, $R^6$ and $R^7$ are linked to each other form rings, etc.), regardless of the fact that the preferred number of carbon atoms for each of the above-described $R^5$ to $R^{12}$ is 1 to 20, the sum of the carbon atoms in the three substituents forming a ring is preferably 3 to 60, more preferably 5 to 40, and even more preferably 7 to 30.

For example, when four adjacent substituents among substituents $R^5$ to $R^{12}$ are linked with one another to form rings (for example, $R^5$ and $R^6$, and $R^7$ and $R^8$ are linked to each other to form rings, etc.), regardless of the fact that the preferred number of carbon atoms for each of the above-described $R^5$ to $R^{12}$ is 1 to 20, the sum of carbon atoms in the two substituents forming a ring is preferably 4 to 80, more preferably 7 to 60, and even more preferably 10 to 40.

Even in the case where adjacent substituents are linked to each other to form a ring(s), a part of the hydrogen atoms directly attached to carbon atoms of the substituent may be substituted by a halogen atom, an oxygen-containing group, a nitrogen-containing group or a silicon-containing group, and in this case, the sum of carbon atoms in a plurality of substituents forming a ring includes the number of carbon atoms contained in the oxygen-containing group, the nitrogen-containing group or the silicon-containing group.

From the viewpoint of polymerization activity or increasing the molecular weight of the produced polymer in the present invention (2), it is preferable that $R^6$, $R^7$, $R^{10}$ and $R^{11}$ are all groups other than hydrogen atom, that is, $R^6$ and $R^{11}$ are identical groups selected from a hydrocarbon group and a silicon-containing group, and $R^7$ and $R^{10}$ are identical groups selected from a hydrocarbon group and a silicon-containing group.

It is particularly preferable that $R^6$ and $R^{11}$ are any one of the following (1) to (3):

(1) hydrocarbon groups not forming a ring with adjacent groups, and each independently having 2 or more carbon atoms, more preferably 3 or more carbon atoms, and particularly preferably 4 or more carbon atoms;

(2) hydrocarbon groups, wherein $R^6$ forms a ring with $R^7$, and $R^{11}$ forms a ring with $R^{10}$; and (3) respectively silicon-containing groups.

Furthermore, among the silicon-containing groups, a silicon-containing group of which the sum of carbon atoms and silicon atoms is 3 or more, and preferably 4 or more, is preferred. In order to enhance the effect of the present invention, when $R^6$ is a hydrocarbon group which does not form a ring with its adjacent group, and $R^7$ is a hydrocarbon group which does not form a ring together with an adjacent group, it is preferable that the number of carbon atoms of $R^6$ is equal to or larger than the number of carbon atoms of $R^7$;

when $R^6$ is a silicon-containing group, and $R^7$ is a silicon-containing group, it is preferable that the total number of silicon atoms and carbon atoms of $R^6$ is equal to or larger than the total number of silicon atoms and carbon atoms of $R^7$;

when $R^6$ is a hydrocarbon group which does not form a ring with an adjacent group, and $R^7$ is a silicon-containing group, it is preferable that the number of carbon atoms of $R^6$ is equal to or larger than the total number of silicon atoms and carbon atoms of $R^7$; and when $R^6$ is a silicon-containing group, and $R^7$ is a hydrocarbon group which does not form a ring, it is preferable that the total number of silicon atoms and carbon atoms of $R^6$ is equal to or larger than the number of carbon atoms of $R^7$.

The hydrocarbon group or silicon-containing group of $R^6$, $R^7$, $R^{10}$, and $R^{11}$ may be the above-mentioned groups, and the hydrocarbon group (f1'), the ring (f'''), the silicon-containing group (f2') having 1 to 20 carbon atoms in total, and the like are preferred. Particularly preferable examples of specific substituents include a tert-butyl group, a methylcyclohexyl group, a methyladamantyl group, a phenyl group, and a naphthyl group. Furthermore, as described above, $R^6$, $R^7$, $R^{10}$, and $R^{11}$ may not respectively exist as individual substituents, $R^6$ and $R^7$ may also be linked to each other to form rings, and $R^{10}$ and $R^{11}$ may also be linked to each other to form rings, and this is one of the most preferred embodiment of the substituted fluorenyl group of the bridged metallocene compound (a-2).

Covalently Bonded Bridge Containing Aryl Group or Substituted Aryl Group

The main chain part of the bond connecting the cyclopentadienyl group which may be substituted and the substituted fluorenyl group is a divalent covalently bonded bridge containing one carbon atom or silicon atom. An important feature in the method for polymerization of the present invention (2) is that the bridging atom Y in the covalently bonded bridging part has specific groups which may be identical to and different from each other, preferably specific aryl groups or substituted aryl groups [$R^{13}$ and $R^{14}$]. By introducing the specific groups which may be identical to and different from each other, preferably specific aryl groups or substituted aryl groups, to the bridging atom (Y), an olefin polymer having a high molecular weight that could not be achieved by conventional polymerization processes can be efficiently produced by the method for polymerization of the present invention (2).

$R^{13}$ and $R^{14}$ are each selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms, and may be identical to and different from each other. At least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms.

Preferably, $R^{13}$ and $R^{14}$ are each selected from an aryl group having 6 to 18 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms, and may be identical to and different from each other. At least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms.

Examples of the aryl group or substituted aryl group include an aryl group having 6 to 18 carbon atoms, such as a phenyl group, a naphthyl group, an anthryl group and a phenanthryl group, and groups resulting from substitution of one or more of their aromatic hydrogens (sp2-hydrogen) with substituents.

Preferred examples among these include an aryl group having 6 carbon atoms, such as a phenyl group; an aryl group having 10 carbon atoms, such as a naphthyl group; an aryl group having 11 to 18 carbon atoms, preferably 11 to 14 carbon atoms, such as a biphenyl group, an anthryl group, and a phenanthryl group; a chloroaryl group having 6 to 20 carbon atoms, such as a chlorophenyl group, and a dichlorophenyl group; a bromoaryl group having 6 to 20 carbon atoms, such as a bromophenyl group and a dibromophenyl group; an iodoaryl group having 6 to 20 carbon atoms, such as an iodophenyl group and a diiodophenyl group; a chloroalkylaryl group having 7 to 40 carbon atoms, preferably 7 to 20 carbon atoms, such as a (trichloromethyl)phenyl group, and a bis(trichloromethyl)phenyl group; a bromoalkylaryl group having 7 to 40 carbon atoms, preferably 7 to 20 carbon atoms, such as a (tribromomethyl)phenyl group, and a bis(tribromomethyl)phenyl group; an iodoalkylaryl group preferably 7 to 40 carbon atoms, preferably 7 to 20 carbon atoms, such as a (triiodomethyl)phenyl group, and a bis(triiodomethyl)phenyl group; a fluoroalkylaryl group having 7 to 40 carbon atoms, preferably 7 to 20 carbon atoms, such as a (trifluoromethyl)phenyl group, a bis(trifluoromethyl)phenyl group. It is particularly preferable that a substituted phenyl group having their substituents located at the meta-position and/or para-position.

In the present invention (2), particularly preferable examples among these include an aryl group having 11 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms.

More preferred examples include specifically an m-biphenyl group, a p-biphenyl group, an m-chlorophenyl group, a p-chlorophenyl group, an m-trifluorophenyl group, a p-trifluorophenyl group, a p-chlorophenyl group, a p-iodophenyl group, a 3,5-ditrifluorophenyl group, a 5-chloronaphthyl group, and a 6-chloronaphthyl group.

Furthermore, in the present invention (2), $R^{13}$ and $R^{14}$ are each selected from an aryl group having 6 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms, and may be identical to and different from each other. It is preferable that at least one of $R^{13}$ and $R^{14}$ is selected from an aryl group having 11 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms.

In particular, it is preferable that both of $R^{13}$ and $R^{14}$ are selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms, and may be identical to or different from each other. It is preferred that both of $R^{13}$ and $R^{14}$ are selected from an aryl group having 11 to 18 carbon atoms, a chloroaryl group having 6 to 20 carbon atoms, chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms and a fluoroalkylaryl group having 7 to 40 carbon atoms, and may be identical to or different from each other.

The bridged metallocene compound (a-2) having identical $R^{13}$ and $R^{14}$ is preferably used in terms of ease of production.

Other Features of Bridged Metallocene Compound (a-2)

In the Formula [1-2], Q is selected from a halogen, a hydrocarbon group (preferably hydrocarbon groups having 1 to 10 carbon atoms), a neutral, conjugated or non-conjugated diene having 10 or fewer carbon atoms, an anion ligand, and a neutral ligand capable of coordination with a lone electron pair, in identical or different combinations.

Specific examples of the halogen include fluorine, chlorine, bromine and iodine.

Specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, and 1-methyl-1-cyclohexyl.

Specific examples of the neutral, conjugated or non-conjugated diene having 10 or fewer carbon atoms include s-cis or s-trans-$\eta^4$-1,3-butadiene, s-cis or s-trans-$\eta^4$-1,4-diphenyl-1,3-butadiene, s-cis or s-trans-$\eta^4$-3-methyl-1,3-pentadiene, s-cis or s-trans-$\eta^4$-1,4-dibenzyl-1,3-butadiene, s-cis or s-trans-$\eta^4$-2,4-hexadiene, s-cis or s-trans-$\eta^4$-1,3-pentadiene, s-cis or s-trans-$\eta^4$-1,4-ditolyl-1,3-butadiene, and s-cis or s-trans-$\eta^4$-1,4-bis(trimethylsilyl)-1,3-butadiene.

Specific examples of the anion ligand include alkoxy groups such as methoxy, tert-butoxy, and phenoxy; carboxylate groups such as acetate, and benzoate; and sulfonate groups such as mesylate, and tosylate.

Specific examples of the neutral ligand capable of coordination with a lone electron pair include organophosphorus compounds such as trimethylphosphine, triethylphosphine, triphenylphosphine, diphenylmethylphosphine and the like; and ethers such as tetrahydrofuran, diethyl ether, dioxane, and 1,2-dimethoxyethane.

j is an integer from 1 to 4, and when j is 2 or greater, Q may be identical to or different from each other.

Preferred Bridged Metallocene Compound (a-2) and Examples Thereof

Hereinafter, specific examples of the bridged metallocene compound (a-2) represented by the General Formula [1-2] will be described, but the scope of the present invention (2) is not particularly limited to these. Hereinafter, octamethyloctahydrodibenzofluorene refers to a structure represented by Formula [10], octamethyltetrahydrodicyclopentafluorene refers to a structure represented by Formula [11], and dibenzofluorene refers to a structure represented by Formula [12].

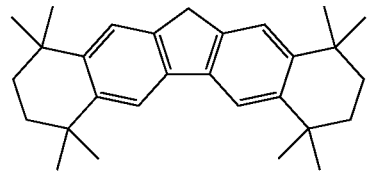

[10]

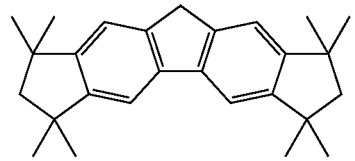

[11]

-continued

[12]

The specific examples include
di(p-chlorophenyl)methylene(cyclopentadienyl)(2,7-di-tert-butylfluorenyl)zirconium dichloride,
di(p-chlorophenyl)methylene(cyclopentadienyl)(3,6-di-tert-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(dibenzofluorenyl)zirconium dichloride,
di(p-chlorophenyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-(trimethylphenyl)-3,6-di-tert-butylfluorenyl)zirconium dichloride,
di(p-chlorophenyl)methylene(cyclopentadienyl)(2,7-(dimethylphenyl)-3,6-di-tert-butylfluorenyl)zirconium dichloride,
di(p-chlorophenyl)methylene(cyclopentadienyl)(2,3,6,7-tetra-tert-butylfluorenyl)zirconium dichloride,
di(m-chlorophenyl)methylene(cyclopentadienyl)(2,7-di-tert-butylfluorenyl)zirconium dichloride,
di(m-chlorophenyl)methylene(cyclopentadienyl)(3,6-di-tert-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(dibenzofluorenyl)zirconium dichloride,
di(m-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-(trimethylphenyl)-3,6-di-tert-butylfluorenyl)zirconium dichloride,
di(m-chlorophenyl)methylene(cyclopentadienyl)(2,7-(dimethylphenyl)-3,6-di-tert-butylfluorenyl)zirconium dichloride,
di(m-chlorophenyl)methylene(cyclopentadienyl)(2,3,6,7-tetratert-butylfluorenyl)zirconium dichloride,
di(p-bromophenyl)methylene(cyclopentadienyl)(2,7-di-tert-butylfluorenyl)zirconium dichloride,
di(p-bromophenyl)methylene(cyclopentadienyl)(3,6-di-tert-butylfluorenyl)zirconium dichloride,
di(p-bromophenyl)methylene(cyclopentadienyl)(octamethyloctahydrodibenzofluorenyl)zirconium dichloride,
di(p-bromophenyl)methylene(cyclopentadienyl)(octamethyltetrahydrodicyclopentafluorenyl)zirconium dichloride,
di(p-bromophenyl)methylene(cyclopentadienyl)(dibenzofluorenyl)zirconium dichloride,
di(p-bromophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-(trimethylphenyl)-3,6-di-tert-butylfluorenyl)zirconium dichloride,
di(p-bromophenyl)methylene(cyclopentadienyl)(2,7-(dimethylphenyl)-3,6-di-tert-butylfluorenyl)zirconium dichloride,
di(p-bromophenyl)methylene(cyclopentadienyl)(2,3,6,7-tetra-tert-butylfluorenyl)zirconium dichloride,
di(m-bromophenyl)methylene(cyclopentadienyl)(2,7-di-tert-butylfluorenyl)zirconium dichloride,
di(m-bromophenyl)methylene(cyclopentadienyl)(3,6-di-tert-butylfluorenyl)zirconium dichloride,
di(m-bromophenyl)methylene(cyclopentadienyl)(octamethyloctahydrodibenzofluorenyl)zirconium dichloride,
di(m-bromophenyl)methylene(cyclopentadienyl)(octamethyltetrahydrodicyclopentafluorenyl)zirconium dichloride,
di(m-bromophenyl)methylene(cyclopentadienyl)(dibenzofluorenyl)zirconium dichloride,
di(m-bromophenyl)methylene(cyclopentadienyl)(2,7-diphenyl-3,6-di-tert-butylfluorenyl)zirconium dichloride,
di(m-bromophenyl)methylene(cyclopentadienyl)(2,7-dimethyl-3,6-di-tert-butylfluorenyl)zirconium dichloride,
di(m-bromophenyl)methylene(cyclopentadienyl)(2,7-(trimethylphenyl)-3,6-di-tert-butylfluorenyl)zirconium dichloride,
di(m-bromophenyl)methylene(cyclopentadienyl)(2,7-(dimethylphenyl)-3,6-di-tert-butylfluorenyl)zirconium dichloride,
di(m-bromophenyl)methylene(cyclopentadienyl)(2,3,6,7-tetra-tert-butylfluorenyl)zirconium dichloride,
di(p-iodophenyl)methylene(cyclopentadienyl)(2,7-di-tert-butylfluorenyl)zirconium dichloride,
di(p-iodophenyl)methylene(cyclopentadienyl)(3,6-di-tert-butylfluorenyl)zirconium dichloride,
di(p-iodophenyl)methylene(cyclopentadienyl)(octamethyloctahydrodibenzofluorenyl)zirconium dichloride,
di(p-iodophenyl)methylene(cyclopentadienyl)(octamethyltetrahydrodicyclopentafluorenyl)zirconium dichloride,
di(p-iodophenyl)methylene(cyclopentadienyl)(dibenzofluorenyl)zirconium dichloride,
di(p-iodophenyl)methylene(cyclopentadienyl)(2,7-diphenyl-3,6-di-tert-butylfluorenyl)zirconium dichloride,
di(p-iodophenyl)methylene(cyclopentadienyl)(2,7-dimethyl-3,6-di-tert-butylfluorenyl)zirconium dichloride,
di(p-iodophenyl)methylene(cyclopentadienyl)(2,7-(trimethylphenyl)-3,6-di-tert-butylfluorenyl)zirconium dichloride,
di(p-iodophenyl)methylene(cyclopentadienyl)(2,7-(dimethylphenyl)-3,6-di-tert-butylfluorenyl)zirconium dichloride,
di(p-iodophenyl)methylene(cyclopentadienyl)(2,3,6,7-tetra-tert-butylfluorenyl)zirconium dichloride,
di(m-trifluoromethyl-phenyl)methylene(cyclopentadienyl)(2,7-di-tert-butylfluorenyl)zirconium dichloride,
di(m-trifluoromethyl-phenyl)methylene(cyclopentadienyl)(3,6-di-tert-butylfluorenyl)zirconium dichloride,
di(m-trifluoromethyl-phenyl)methylene(cyclopentadienyl)(octamethyloctahydrodibenzofluorenyl)zirconium dichloride,
di(m-trifluoromethyl-phenyl)methylene(cyclopentadienyl)(octamethyltetrahydrodicyclopentafluorenyl)zirconium dichloride,
di(m-trifluoromethyl-phenyl)methylene(cyclopentadienyl)(dibenzofluorenyl)zirconium dichloride,
di(m-trifluoromethyl-phenyl)methylene(cyclopentadienyl)(2,7-diphenyl-3,6-di-tert-butylfluorenyl)zirconium dichloride, di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-(trimethylphenyl)-3,6-di-tert-butylfluorenyl)zirconium dichloride,
di(m-trifluoromethyl-phenyl)methylene(cyclopentadienyl)(2,7-(dimethylphenyl)-3,6-di-tert-butylfluorenyl)zirconium dichloride,
di(m-trifluoromethyl-phenyl)methylene(cyclopentadienyl)(2,3,6,7-tetra-tert-butylfluorenyl)zirconium dichloride,
di(p-trifluoromethyl-phenyl)methylene(cyclopentadienyl)(2,7-di-tert-butylfluorenyl)zirconium dichloride,
di(p-trifluoromethyl-phenyl)methylene(cyclopentadienyl)(3,6-di-tert-butylfluorenyl)zirconium dichloride,
di(p-trifluoromethyl-phenyl)methylene(cyclopentadienyl)(octamethyloctahydrodibenzofluorenyl)zirconium dichloride,
di(p-trifluoromethyl-phenyl)methylene(cyclopentadienyl)(octamethyltetrahydrodicyclopentafluorenyl)zirconium dichloride,
di(p-trifluoromethyl-phenyl)methylene(cyclopentadienyl)(dibenzofluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-(trimethylphenyl)-3,6-di-tert-butylfluorenyl)zirconium dichloride,
di(p-trifluoromethyl-phenyl)methylene(cyclopentadienyl)(2,7-(dimethylphenyl)-3,6-di-tert-butylfluorenyl)zirconium dichloride,
di(p-trifluoromethyl-phenyl)methylene(cyclopentadienyl)(2,3,6,7-tetra-tert-butylfluorenyl)zirconium dichloride,
di(p-trichloromethyl-phenyl)methylene(cyclopentadienyl)(2,7-di-tert-butylfluorenyl)zirconium dichloride,
di(p-trichloromethyl-phenyl)methylene(cyclopentadienyl)(3,6-di-tert-butylfluorenyl)zirconium dichloride,
di(p-trichloromethyl-phenyl)methylene(cyclopentadienyl)(octamethyloctahydrodibenzofluorenyl)zirconium dichloride,
di(p-trichloromethyl-phenyl)methylene(cyclopentadienyl)(octamethyltetrahydrodicyclopentafluorenyl)zirconium dichloride,
di(p-trichloromethyl-phenyl)methylene(cyclopentadienyl)(dibenzofluorenyl)zirconium dichloride,
di(p-trichloromethyl-phenyl)methylene(cyclopentadienyl)(2,7-diphenyl-3,6-di-tert-butylfluorenyl)zirconium dichloride,
di(p-trichloromethyl-phenyl)methylene(cyclopentadienyl)(2,7-dimethyl-3,6-di-tert-butylfluorenyl)zirconium dichloride,
di(p-trichloromethyl-phenyl)methylene(cyclopentadienyl)(2,7-(trimethylphenyl)-3,6-di-tert-butylfluorenyl)zirconium dichloride,
di(p-trichloromethyl-phenyl)methylene(cyclopentadienyl)(2,7-(dimethylphenyl)-3,6-di-tert-butylfluorenyl)zirconium dichloride,
di(p-trichloromethyl-phenyl)methylene(cyclopentadienyl)(2,3,6,7-tetra-tert-butylfluorenyl)zirconium dichloride,
di(m-trichloromethyl-phenyl)methylene(cyclopentadienyl)(2,7-di-tert-butylfluorenyl)zirconium dichloride,
di(m-trichloromethyl-phenyl)methylene(cyclopentadienyl)(3,6-di-tert-butylfluorenyl)zirconium dichloride,
di(m-trichloromethyl-phenyl)methylene(cyclopentadienyl)(octamethyloctahydrodibenzofluorenyl)zirconium dichloride,
di(m-trichloromethyl-phenyl)methylene(cyclopentadienyl)(octamethyltetrahydrodicyclopentafluorenyl)zirconium dichloride,
di(m-trichloromethyl-phenyl)methylene(cyclopentadienyl)(dibenzofluorenyl)zirconium dichloride,
di(m-trichloromethyl-phenyl)methylene(cyclopentadienyl)(2,7-diphenyl-3,6-di-tert-butylfluorenyl)zirconium dichloride,
di(m-trichloromethyl-phenyl)methylene(cyclopentadienyl)(2,7-dimethyl-3,6-di-tert-butylfluorenyl)zirconium dichloride,
di(m-trichloromethyl-phenyl)methylene(cyclopentadienyl)(2,7-(trimethylphenyl)-3,6-di-tert-butylfluorenyl)zirconium dichloride,
di(m-trichloromethyl-phenyl)methylene(cyclopentadienyl)(2,7-(dimethylphenyl)-3,6-di-tert-butylfluorenyl)zirconium dichloride,
di(m-trichloromethyl-phenyl)methylene(cyclopentadienyl)(2,3,6,7-tetra-tert-butylfluorenyl)zirconium dichloride,
di(3,5-ditrifluoromethyl-phenyl)methylene(cyclopentadienyl)(2,7-di-tert-butylfluorenyl)zirconium dichloride,
di(3,5-ditrifluoromethyl-phenyl)methylene(cyclopentadienyl)(3,6-di-tert-butylfluorenyl)zirconium dichloride,
di(3,5-ditrifluoromethyl-phenyl)methylene(cyclopentadienyl)(octamethyloctahydrodibenzofluorenyl)zirconium dichloride,
di(3,5-ditrifluoromethyl-phenyl)methylene(cyclopentadienyl)(octamethyltetrahydrodicyclopentafluorenyl)zirconium dichloride,
di(3,5-ditrifluoromethyl-phenyl)methylene(cyclopentadienyl)(dibenzofluorenyl)zirconium dichloride,
di(3,5-ditrifluoromethyl-phenyl)methylene(cyclopentadienyl)(2,7-diphenyl-3,6-di-tert-butylfluorenyl)zirconium dichloride,
di(3,5-ditrifluoromethyl-phenyl)methylene(cyclopentadienyl)(2,7-dimethyl-3,6-di-tert-butylfluorenyl)zirconium dichloride,
di(3,5-ditrifluoromethyl-phenyl)methylene(cyclopentadienyl)(2,7-(trimethylphenyl)-3,6-di-tert-butylfluorenyl)zirconium dichloride,
di(3,5-ditrifluoromethyl-phenyl)methylene(cyclopentadienyl)(2,7-(dimethylphenyl)-3,6-di-tert-butylfluorenyl)zirconium dichloride,
di(3,5-ditrifluoromethyl-phenyl)methylene(cyclopentadienyl)(2,3,6,7-tetratert-butylfluorenyl)zirconium dichloride,
di(3,5-dichloromethyl-phenyl)methylene(cyclopentadienyl)(2,7-di-tert-butylfluorenyl)zirconium dichloride,
di(3,5-dichloromethyl-phenyl)methylene(cyclopentadienyl)(3,6-di-tert-butylfluorenyl)zirconium dichloride,
di(3,5-dichloromethyl-phenyl)methylene(cyclopentadienyl)(octamethyloctahydrodibenzofluorenyl)zirconium dichloride,
di(3,5-dichloromethyl-phenyl)methylene(cyclopentadienyl)(octamethyltetrahydrodicyclopentafluorenyl)zirconium dichloride,
di(3,5-dichloromethyl-phenyl)methylene(cyclopentadienyl)(dibenzofluorenyl)zirconium dichloride,
di(3,5-dichloromethyl-phenyl)methylene(cyclopentadienyl)(2,7-diphenyl-3,6-di-tert-butylfluorenyl)zirconium dichloride,
di(3,5-dichloromethyl-phenyl)methylene(cyclopentadienyl)(2,7-dimethyl-3,6-di-tert-butylfluorenyl)zirconium dichloride, di(3,5-dichloromethyl-phenyl)methylene(cyclopentadienyl)(2,7-(trimethylphenyl)-3,6-di-tert-butylfluorenyl)zirconium dichloride,
di(3,5-dichloromethyl-phenyl)methylene(cyclopentadienyl)(2,7-(dimethylphenyl)-3,6-di-tert-butylfluorenyl)zirconium dichloride,
di(3,5-dichloromethyl-phenyl)methylene(cyclopentadienyl)(2,3,6,7-tetra-tert-butylfluorenyl)zirconium dichloride,
di(4-chloronaphthyl)methylene(cyclopentadienyl)(2,7-di-tert-butylfluorenyl)zirconium dichloride,
di(4-chloronaphthyl)methylene(cyclopentadienyl)(3,6-di-tert-butylfluorenyl)zirconium dichloride,
di(4-chloronaphthyl)methylene(cyclopentadienyl)(octamethyloctahydrodibenzofluorenyl)zirconium dichloride,
di(4-chloronaphthyl)methylene(cyclopentadienyl)(octamethyltetrahydrodicyclopentafluorenyl)zirconium dichloride,
di(4-chloronaphthyl)methylene(cyclopentadienyl)(dibenzofluorenyl)zirconium dichloride,
di(4-chloronaphthyl)methylene(cyclopentadienyl)(2,7-diphenyl-3,6-di-tert-butylfluorenyl)zirconium dichloride,
di(4-chloronaphthyl)methylene(cyclopentadienyl)(2,7-dimethyl-3,6-di-tert-butylfluorenyl)zirconium dichloride,
di(4-chloronaphthyl)methylene(cyclopentadienyl)(2,7-(trimethylphenyl)-3,6-di-tert-butylfluorenyl)zirconium dichloride,
di(4-chloronaphthyl)methylene(cyclopentadienyl)(2,7-(dimethylphenyl)-3,6-di-tert-butylfluorenyl)zirconium dichloride,
di(4-chloronaphthyl)methylene(cyclopentadienyl)(2,3,6,7-tetra-tert-butylfluorenyl)zirconium dichloride,
di(3-chloronaphthyl)methylene(cyclopentadienyl)(2,7-di-tert-butylfluorenyl)zirconium dichloride,
di(3-chloronaphthyl)methylene(cyclopentadienyl)(3,6-di-tert-butylfluorenyl)zirconium dichloride,
di(3-chloronaphthyl)methylene(cyclopentadienyl)(octamethyloctahydrodibenzofluorenyl)zirconium dichloride,
di(3-chloronaphthyl)methylene(cyclopentadienyl)(octamethyltetrahydrodicyclopentafluorenyl)zirconium dichloride,
di(3-chloronaphthyl)methylene(cyclopentadienyl)(dibenzofluorenyl)zirconium dichloride,
di(3-chloronaphthyl)methylene(cyclopentadienyl)(2,7-diphenyl-3,6-di-tert-butylfluorenyl)zirconium dichloride,
di(3-chloronaphthyl)methylene(cyclopentadienyl)(2,7-dimethyl-3,6-di-tert-butylfluorenyl)zirconium dichloride,
di(3-chloronaphthyl)methylene(cyclopentadienyl)(2,7-(trimethylphenyl)-3,6-di-tert-butylfluorenyl)zirconium dichloride,
di(3-chloronaphthyl)methylene(cyclopentadienyl)(2,7-(dimethylphenyl)-3,6-di-tert-butylfluorenyl)zirconium dichloride,
di(3-chloronaphthyl)methylene(cyclopentadienyl)(2,3,6,7-tetra-tert-butylfluorenyl)zirconium dichloride,
di(5-chloronaphthyl)methylene(cyclopentadienyl)(2,7-di-tert-butylfluorenyl)zirconium dichloride,
di(5-chloronaphthyl)methylene(cyclopentadienyl)(3,6-di-tert-butylfluorenyl)zirconium dichloride,
di(5-chloronaphthyl)methylene(cyclopentadienyl)(octamethyloctahydrodibenzofluorenyl)zirconium dichloride,
di(5-chloronaphthyl)methylene(cyclopentadienyl)(octamethyltetrahydrodicyclopentafluorenyl)zirconium dichloride,
di(5-chloronaphthyl)methylene(cyclopentadienyl)(dibenzofluorenyl)zirconium dichloride,
di(5-chloronaphthyl)methylene(cyclopentadienyl)(2,7-diphenyl-3,6-di-tert-butylfluorenyl)zirconium dichloride,
di(5-chloronaphthyl)methylene(cyclopentadienyl)(2,7-dimethyl-3,6-di-tert-butylfluorenyl)zirconium dichloride,
di(5-chloronaphthyl)methylene(cyclopentadienyl)(2,7-(trimethylphenyl)-3,6-di-tert-butylfluorenyl)zirconium dichloride,
di(5-chloronaphthyl)methylene(cyclopentadienyl)(2,7-(dimethylphenyl)-3,6-di-tert-butylfluorenyl)zirconium dichloride,
di(5-chloronaphthyl)methylene(cyclopentadienyl)(2,3,6,7-tetra-tert-butylfluorenyl)zirconium dichloride,
phenyl(p-chlorophenyl)methylene(cyclopentadienyl)(2,7-di-tert-butylfluorenyl)zirconium dichloride,
phenyl(p-chlorophenyl)methylene(cyclopentadienyl)(3,6-di-tert-butylfluorenyl)zirconium dichloride,
phenyl(p-chlorophenyl)methylene(cyclopentadienyl)(octamethyloctahydrodibenzofluorenyl)zirconium dichloride,
phenyl(p-chlorophenyl)methylene(cyclopentadienyl)(octamethyltetrahydrodicyclopentafluorenyl)zirconium dichloride,
phenyl(p-chlorophenyl)methylene(cyclopentadienyl)(dibenzofluorenyl)zirconium dichloride,
phenyl(p-chlorophenyl)methylene(cyclopentadienyl)(2,7-diphenyl-3,6-di-tert-butylfluorenyl)zirconium dichloride,
phenyl(p-chlorophenyl)methylene(cyclopentadienyl)(2,7-dimethyl-3,6-di-tert-butylfluorenyl)zirconium dichloride,
phenyl(p-chlorophenyl)methylene(cyclopentadienyl)(2,7-(trimethylphenyl)-3,6-di-tert-butylfluorenyl)zirconium dichloride,
phenyl(p-chlorophenyl)methylene(cyclopentadienyl)(2,7-(dimethylphenyl)-3,6-di-tert-butylfluorenyl)zirconium dichloride,
phenyl(p-chlorophenyl)methylene(cyclopentadienyl)(2,3,6,7-tetra-tert-butylfluorenyl)zirconium dichloride,
phenyl(m-chlorophenyl)methylene(cyclopentadienyl)(2,7-di-tert-butylfluorenyl)zirconium dichloride,
phenyl(m-chlorophenyl)methylene(cyclopentadienyl)(3,6-di-tert-butylfluorenyl)zirconium dichloride,
phenyl(m-chlorophenyl)methylene(cyclopentadienyl)(octamethyloctahydrodibenzofluorenyl)zirconium dichloride,
phenyl(m-chlorophenyl)methylene(cyclopentadienyl)(octamethyltetrahydrodicyclopentafluorenyl)zirconium dichloride,
phenyl(m-chlorophenyl)methylene(cyclopentadienyl)(dibenzofluorenyl)zirconium dichloride,
phenyl(m-chlorophenyl)methylene(cyclopentadienyl)(2,7-diphenyl-3,6-di-tert-butylfluorenyl)zirconium dichloride,
phenyl(m-chlorophenyl)methylene(cyclopentadienyl)(2,7-dimethyl-3,6-di-tert-butylfluorenyl)zirconium dichloride,
phenyl(m-chlorophenyl)methylene(cyclopentadienyl)(2,7-(trimethylphenyl)-3,6-di-tert-butylfluorenyl)zirconium dichloride,
phenyl(m-chlorophenyl)methylene(cyclopentadienyl)(2,7-(dimethylphenyl)-3,6-di-tert-butylfluorenyl)zirconium dichloride,
phenyl(m-chlorophenyl)methylene(cyclopentadienyl)(2,3,6,7-tetra-tert-butylfluorenyl)zirconium dichloride,
phenyl(m-trifluoromethyl-phenyl)methylene(cyclopentadienyl)(2,7-di-tert-butylfluorenyl)zirconium dichloride,
phenyl(m-trifluoromethyl-phenyl)methylene(cyclopentadienyl)(3,6-di-tert-butylfluorenyl)zirconium dichloride,
phenyl(m-trifluoromethyl-phenyl)methylene(cyclopentadienyl)(octamethyloctahydrodibenzofluorenyl)zirconium dichloride, phenyl(m-trifluoromethyl-phenyl)methylene(cyclopentadienyl)(octamethyltetrahydrodicyclopentafluorenyl)zirconium dichloride,
phenyl(m-trifluoromethyl-phenyl)methylene(cyclopentadienyl)(dibenzofluorenyl)zirconium dichloride,
phenyl(m-trifluoromethyl-phenyl)methylene(cyclopentadienyl)(2,7-diphenyl-3,6-di-tert-butylfluorenyl)zirconium dichloride,
phenyl(m-trifluoromethyl-phenyl)methylene(cyclopentadienyl)(2,7-dimethyl-3,6-di-tert-butylfluorenyl)zirconium dichloride,
phenyl(m-trifluoromethyl-phenyl)methylene(cyclopentadienyl)(2,7-(trimethylphenyl)-3,6-di-tert-butylfluorenyl)zirconium dichloride,
phenyl(m-trifluoromethyl-phenyl)methylene(cyclopentadienyl)(2,7-(dimethylphenyl)-3,6-di-tert-butylfluorenyl)zirconium dichloride,
phenyl(m-trifluoromethyl-phenyl)methylene(cyclopentadienyl)(2,3,6,7-tetra-tert-butylfluorenyl)zirconium dichloride,
naphthyl(p-chlorophenyl)methylene(cyclopentadienyl)(2,7-di-tert-butylfluorenyl)zirconium dichloride,
naphthyl(p-chlorophenyl)methylene(cyclopentadienyl)(3,6-di-tert-butylfluorenyl)zirconium dichloride,
naphthyl(p-chlorophenyl)methylene(cyclopentadienyl)(octamethyloctahydrodibenzofluorenyl)zirconium dichloride,
naphthyl(p-chlorophenyl)methylene(cyclopentadienyl)(octamethyltetrahydrodicyclopentafluorenyl)zirconium dichloride,
naphthyl(p-chlorophenyl)methylene(cyclopentadienyl)(dibenzofluorenyl)zirconium dichloride,
naphthyl(p-chlorophenyl)methylene(cyclopentadienyl)(2,7-diphenyl-3,6-di-tert-butylfluorenyl)zirconium dichloride,
naphthyl(p-chlorophenyl)methylene(cyclopentadienyl)(2,7-dimethyl-3,6-di-tert-butylfluorenyl)zirconium dichloride,
naphthyl(p-chlorophenyl)methylene(cyclopentadienyl)(2,7-(trimethylphenyl)-3,6-di-tert-butylfluorenyl)zirconium dichloride,
naphthyl(p-chlorophenyl)methylene(cyclopentadienyl)(2,7-(dimethylphenyl)-3,6-di-tert-butylfluorenyl)zirconium dichloride,
naphthyl(p-chlorophenyl)methylene(cyclopentadienyl)(2,3,6,7-tetra-tert-butylfluorenyl)zirconium dichloride,
naphthyl(m-chlorophenyl)methylene(cyclopentadienyl)(2,7-di-tert-butylfluorenyl)zirconium dichloride,
naphthyl(m-chlorophenyl)methylene(cyclopentadienyl)(3,6-di-tert-butylfluorenyl)zirconium dichloride,
naphthyl(m-chlorophenyl)methylene(cyclopentadienyl)(octamethyloctahydrodibenzofluorenyl)zirconium dichloride,
naphthyl(m-chlorophenyl)methylene(cyclopentadienyl)(octamethyltetrahydrodicyclopentafluorenyl)zirconium dichloride,
naphthyl(m-chlorophenyl)methylene(cyclopentadienyl)(dibenzofluorenyl)zirconium dichloride,
naphthyl(m-chlorophenyl)methylene(cyclopentadienyl)(2,7-diphenyl-3,6-di-tert-butylfluorenyl)zirconium dichloride,
naphthyl(m-chlorophenyl)methylene(cyclopentadienyl)(2,7-dimethyl-3,6-di-tert-butylfluorenyl)zirconium dichloride,
naphthyl(m-chlorophenyl)methylene(cyclopentadienyl)(2,7-(trimethylphenyl)-3,6-di-tert-butylfluorenyl)zirconium dichloride,
naphthyl(m-chlorophenyl)methylene(cyclopentadienyl)(2,7-(dimethylphenyl)-3,6-di-tert-butylfluorenyl)zirconium dichloride,
naphthyl(m-chlorophenyl)methylene(cyclopentadienyl)(2,3,6,7-tetra-tert-butylfluorenyl)zirconium dichloride,
naphthyl(m-trifluoromethyl-phenyl)methylene(cyclopentadienyl)(2,7-di-tert-butylfluorenyl)zirconium dichloride,
naphthyl(m-trifluoromethyl-phenyl)methylene(cyclopentadienyl)(3,6-di-tert-butylfluorenyl)zirconium dichloride,
naphthyl(m-trifluoromethyl-phenyl)methylene(cyclopentadienyl)(octamethyloctahydrodibenzofluorenyl)zirconium dichloride,
naphthyl(m-trifluoromethyl-phenyl)methylene(cyclopentadienyl)(octamethyltetrahydrodicyclopentafluorenyl)zirconium dichloride,
naphthyl(m-trifluoromethyl-phenyl)methylene(cyclopentadienyl)(dibenzofluorenyl)zirconium dichloride,
naphthyl(m-trifluoromethyl-phenyl)methylene(cyclopentadienyl)(2,7-diphenyl-3,6-di-tert-butylfluorenyl)zirconium dichloride,
naphthyl(m-trifluoromethyl-phenyl)methylene(cyclopentadienyl)(2,7-dimethyl-3,6-di-tert-butylfluorenyl)zirconium dichloride,
naphthyl(m-trifluoromethyl-phenyl)methylene(cyclopentadienyl)(2,7-(trimethylphenyl)-3,6-di-tert-butylfluorenyl)zirconium dichloride,
naphthyl(m-trifluoromethyl-phenyl)methylene(cyclopentadienyl)(2,7-(dimethylphenyl)-3,6-di-tert-butylfluorenyl)zirconium dichloride,
naphthyl(m-trifluoromethyl-phenyl)methylene(cyclopentadienyl)(2,3,6,7-tetra-tert-butylfluorenyl)zirconium dichloride,
(p-tolyl)(p-chlorophenyl)methylene(cyclopentadienyl)(2,7-di-tert-butylfluorenyl)zirconium dichloride,
(p-tolyl)(p-chlorophenyl)methylene(cyclopentadienyl)(3,6-di-tert-butylfluorenyl)zirconium dichloride,
(p-tolyl)(p-chlorophenyl)methylene(cyclopentadienyl)(octamethyloctahydrodibenzofluorenyl)zirconium dichloride,
(p-tolyl)(p-chlorophenyl)methylene(cyclopentadienyl)(octamethyltetrahydrodicyclopentafluorenyl)zirconium dichloride,
(p-tolyl)(p-chlorophenyl)methylene(cyclopentadienyl)(dibenzofluorenyl)zirconium dichloride,
(p-tolyl)(p-chlorophenyl)methylene(cyclopentadienyl)(2,7-diphenyl-3,6-di-tert-butylfluorenyl)zirconium dichloride,
(p-tolyl)(p-chlorophenyl)methylene(cyclopentadienyl)(2,7-dimethyl-3,6-di-tert-butylfluorenyl)zirconium dichloride,
(p-tolyl)(p-chlorophenyl)methylene(cyclopentadienyl)(2,7-(trimethylphenyl)-3,6-di-tert-butylfluorenyl)zirconium dichloride,
(p-tolyl)(p-chlorophenyl)methylene(cyclopentadienyl)(2,7-(dimethylphenyl)-3,6-di-tert-butylfluorenyl)zirconium dichloride,
(p-tolyl)(p-chlorophenyl)methylene(cyclopentadienyl)(2,3,6,7-tetra-tert-butylfluorenyl)zirconium dichloride,
(p-tolyl)(m-chlorophenyl)methylene(cyclopentadienyl)(2,7-di-tert-butylfluorenyl)zirconium dichloride,
(p-tolyl)(m-chlorophenyl)methylene(cyclopentadienyl)(3,6-di-tert-butylfluorenyl)zirconium dichloride,
(p-tolyl)(m-chlorophenyl)methylene(cyclopentadienyl)(octamethyloctahydrodibenzofluorenyl)zirconium dichloride,
(p-tolyl)(m-chlorophenyl)methylene(cyclopentadienyl)(octamethyltetrahydrodicyclopentafluorenyl)zirconium dichloride, (p-tolyl)(m-chlorophenyl)methylene(cyclopentadienyl)(dibenzofluorenyl)zirconium dichloride,
(p-tolyl)(m-chlorophenyl)methylene(cyclopentadienyl)(2,7-diphenyl-3,6-di-tert-butylfluorenyl)zirconium dichloride,
(p-tolyl)(m-chlorophenyl)methylene(cyclopentadienyl)(2,7-dimethyl-3,6-di-tert-butylfluorenyl)zirconium dichloride,
(p-tolyl)(m-chlorophenyl)methylene(cyclopentadienyl)(2,7-(trimethylphenyl)-3,6-di-tert-butylfluorenyl)zirconium dichloride,
(p-tolyl)(m-chlorophenyl)methylene(cyclopentadienyl)(2,7-(dimethylphenyl)-3,6-di-tert-butylfluorenyl)zirconium dichloride,
(p-tolyl)(m-chlorophenyl)methylene(cyclopentadienyl)(2,3,6,7-tetra-tert-butylfluorenyl)zirconium dichloride,
(p-tolyl)(m-trifluoromethyl-phenyl)methylene(cyclopentadienyl)(2,7-di-tert-butylfluorenyl)zirconium dichloride,
(p-tolyl)(m-trifluoromethyl-phenyl)methylene(cyclopentadienyl)(3,6-di-tert-butylfluorenyl)zirconium dichloride,
(p-tolyl)(m-trifluoromethyl-phenyl)methylene(cyclopentadienyl)(octamethyloctahydrodibenzofluorenyl)zirconium dichloride,
(p-tolyl)(m-trifluoromethyl-phenyl)methylene(cyclopentadienyl)(octamethyltetrahydrodicyclopentafluorenyl)zirconium dichloride,
(p-tolyl)(m-trifluoromethyl-phenyl)methylene(cyclopentadienyl)(dibenzofluorenyl)zirconium dichloride,
(p-tolyl)(m-trifluoromethyl-phenyl)methylene(cyclopentadienyl)(2,7-diphenyl-3,6-di-tert-butylfluorenyl)zirconium dichloride,
(p-tolyl)(m-trifluoromethyl-phenyl)methylene(cyclopentadienyl)(2,7-dimethyl-3,6-di-tert-butylfluorenyl)zirconium dichloride,
(p-tolyl)(m-trifluoromethyl-phenyl)methylene(cyclopentadienyl)(2,7-(trimethylphenyl)-3,6-di-tert-butylfluorenyl)zirconium dichloride,
(p-tolyl)(m-trifluoromethyl-phenyl)methylene(cyclopentadienyl)(2,7-(dimethylphenyl)-3,6-di-tert-butylfluorenyl)zirconium dichloride,
(p-tolyl)(m-trifluoromethyl-phenyl)methylene(cyclopentadienyl)(2,3,6,7-tetra-tert-butylfluorenyl)zirconium dichloride,
di(4-biphenyl)methylene(cyclopentadienyl)(2,7-di-tert-butylfluorenyl)zirconium dichloride,
di(4-biphenyl)methylene(cyclopentadienyl)(3,6-di-tert-butylfluorenyl)zirconium dichloride,
di(4-biphenyl)methylene(cyclopentadienyl)(octamethyloctahydrodibenzofluorenyl)zirconium dichloride,
di(4-biphenyl)methylene(cyclopentadienyl)(octamethyltetrahydrodicyclopentafluorenyl)zirconium dichloride,
di(4-biphenyl)methylene(cyclopentadienyl)(dibenzofluorenyl)zirconium dichloride,
di(4-biphenyl)methylene(cyclopentadienyl)(2,7-diphenyl-3,6-di-tert-butylfluorenyl)zirconium dichloride,
di(4-biphenyl)methylene(cyclopentadienyl)(2,7-dimethyl-3,6-di-tert-butylfluorenyl)zirconium dichloride,
di(4-biphenyl)methylene(cyclopentadienyl)(2,7-(trimethylphenyl)-3,6-di-tert-butylfluorenyl)zirconium dichloride,
di(4-biphenyl)methylene(cyclopentadienyl)(2,7-(dimethylphenyl)-3,6-di-tert-butylfluorenyl)zirconium dichloride,
di(4-biphenyl)methylene(cyclopentadienyl)(2,3,6,7-tetra-tert-butylfluorenyl)zirconium dichloride [the above compounds may all be referred to as "bridged metallocene compounds (a-2a)"], and
di(2-naphthyl)methylene(cyclopentadienyl)(2,7-di-tert-butylfluorenyl)zirconium dichloride,
di(2-naphthyl)methylene(cyclopentadienyl)(3,6-di-tert-butylfluorenyl)zirconium dichloride,
di(2-naphthyl)methylene(cyclopentadienyl)(octamethyloctahydrodibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(dibenzofluorenyl)zirconium dichloride,
di(2-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-(trimethylphenyl)-3,6-di-tert-butylfluorenyl)zirconium dichloride,
di(2-naphthyl)methylene(cyclopentadienyl)(2,7-(dimethylphenyl)-3,6-di-tert-butylfluorenyl)zirconium dichloride,
di(2-naphthyl)methylene(cyclopentadienyl)(2,3,6,7-tetra-tert-butylfluorenyl)zirconium dichloride,
di(4-[p-trifluoromethylphenyl]-phenyl)methylene(cyclopentadienyl)(octamethyloctahydrodibenzofluorenyl)zirconium dichloride,
di(4-[p-trifluoromethylphenyl]-phenyl)methylene(cyclopentadienyl)(octamethyltetrahydrodicyclopentafluorenyl)zirconium dichloride,
di(4-[p-trifluoromethylphenyl]-phenyl)methylene(cyclopentadienyl)(dibenzofluorenyl)zirconium dichloride,
di(4-[p-trifluoromethylphenyl]-phenyl)methylene(cyclopentadienyl)(2,7-diphenyl-3,6-di-tert-butylfluorenyl)zirconium dichloride,
di(4-[p-trifluoromethylphenyl]-phenyl)methylene(cyclopentadienyl)(2,7-dimethyl-3,6-di-tert-butylfluorenyl)zirconium dichloride,
di(4-[p-trifluoromethylphenyl]-phenyl)methylene(cyclopentadienyl))(2,7-(trimethylphenyl)-3,6-di-tert-butylfluorenyl)zirconium dichloride,
di(4-[p-trifluoromethylphenyl]-phenyl)methylene(cyclopentadienyl)(2,7-(dimethylphenyl)-3,6-di-tert-butylfluorenyl)zirconium dichloride,
di(4-[p-trifluoromethylphenyl]-phenyl)methylene(cyclopentadienyl)(2,3,6,7-tetra-tert-butylfluorenyl)zirconium dichloride,
di(4-[p-chlorophenyl]-phenyl)methylene(cyclopentadienyl)(octamethyloctahydrodibenzofluorenyl)zirconium dichloride,
di(4-[p-chlorophenyl]-phenyl)methylene(cyclopentadienyl)(octamethyltetrahydrodicyclopentafluorenyl)zirconium dichloride,
di(4-[p-chlorophenyl]-phenyl)methylene(cyclopentadienyl)(dibenzofluorenyl)zirconium dichloride,
di(4-[p-chlorophenyl]-phenyl)methylene(cyclopentadienyl)(2,7-diphenyl-3,6-di-tert-butylfluorenyl)zirconium dichloride,
di(4-[p-chlorophenyl]-phenyl)methylene(cyclopentadienyl)(2,7-dimethyl-3,6-di-tert-butylfluorenyl)zirconium dichloride,
di(4-[p-chlorophenyl]-phenyl)methylene(cyclopentadienyl)(2,7-(trimethylphenyl)-3,6-di-tert-butylfluorenyl)zirconium dichloride,
di(4-[p-chlorophenyl]-phenyl)methylene(cyclopentadienyl)(2,7-(dimethylphenyl)-3,6-di-tert-butylfluorenyl)zirconium dichloride, and
di(4-[p-chlorophenyl]-phenyl)methylene(cyclopentadienyl)(2,3,6,7-tetratert-butylfluorenyl)zirconium dichloride [the above compounds may all be referred to as "bridged metallocene compounds (a-2b)"].

Furthermore, a compound resulting from replacing the "zirconium" of the compound described above (bridged metallocene compound (a-2a) and (a-2b)) with "hafnium" or "titanium", a metallocene compound resulting from replacing the "dichloride" of the compound described above (bridged metallocene compound (a-2a) and (a-2b)) with "difluoride", "dibromide" or "diiodide", or replacing the "dichloride" of the compound described above (bridged metallocene compound (a-2a) and (a-2b)) with "dimethyl" or "methylethyl", and the like are also likewise the metallocene compound represented by the Formula [1-2].

The bridged metallocene compound (a-2) described above can be produced by referring to a known method. Examples of the known method for production include the method for production described in the pamphlet of WO 2004/029062 filed by the present applicant.

The metallocene compound as described above can be used alone or in combination of two or more species.

[2] Catalyst for Olefin Polymerization (2)

Next, preferred embodiments of using the bridged metallocene compound (a-2) described above as a polymerization catalyst in the method for olefin polymerization of the present invention (2), will be described.

In the case of using the bridged metallocene compound (a-2) as a catalyst for olefin polymerization, the catalyst component comprises:

(a-2) the bridged metallocene compound (a-2) represented by the above Formula [1-2]; and (b) at least one compound selected from: (b-1) the organoaluminum oxy compound, (b-2) the compound which reacts with the bridged metallocene compound (a-2) to form an ion pair, and (b-3) the organoaluminum compound.

The "compound (b-2) which reacts with the bridged metallocene compound (a-2) to form an ion pair" is the same as the "compound (b-2) reacting with the bridged metallocene compound (a-1) to form an ion pair (ionic compound (b-2)), and details of the organoaluminum oxy compound (b-1), the ionic compound (b-2) and the organoaluminum compound (b-3) are as described above.

Furthermore, the catalyst (2) for olefin polymerization may also contain a support (c) according to necessity, along with the (a-2) bridged metallocene compound represented by the Formula [1-2], and (b) at least one compound selected from (b-1) the organoaluminum oxy compound, (b-2) the compound which reacts with the bridged metallocene compound (a-2) to form an ion pair, and (b-3) the organoaluminum compound. The respective components may be used after being supported on the above-described support (c) having a particulate form.

The catalyst (2) for olefin polymerization may contain the above-described organic compound component (d) according to necessity, as a catalyst component.

Details of the support (c) and the organic compound component (d) are as described above in the description of the catalyst (1) for olefin polymerization of the present invention (1).

Method for Producing Propylene-Based Copolymer (B1)

For polymerization of the propylene-based copolymer (B1), the method of using each component, and the order of addition are arbitrarily selected, and the following methods may be mentioned as the methods of polymerization.

(1) A method comprising adding the component (a-2) and component (b) into the polymerization vessel in an arbitrary order.

(2) A method comprising adding the component (a-2) and component (b) into the polymerization vessel in an arbitrary order.

(3) A method comprising adding a catalyst component in which the component (a-2) is supported on the support (c), and the component (b) into the polymerization vessel in an arbitrary order.

(4) A method comprising adding a catalyst component in which the component (b) is supported on the support (c), and the component (a-2) into the polymerization vessel in an arbitrary order.

(5) A method comprising adding a catalyst component in which the component (a-2) and the component (b) are supported on the support (c) into the polymerization vessel.

In the respective methods of (2) to (5) described above, at least two or more of the catalyst components may be brought into contact with each other in advance.

In the respective methods of (4) and (5) described above using supported component (b), unsupported component (b) may be added in any order, as necessary. In this case, the components (b) may be identical to or different from each other.

Furthermore, the solid catalyst component having the component (a-2) supported on the component (c), and the solid catalyst component having the component (a-2) and component (b) supported on the component (c) may have a prepolymerized olefin, or a prepolymerized solid catalyst component may further have the catalyst component supported thereon.

In the production of the propylene-based copolymer (B1) described above, polymerization can be carried out by any of a liquid phase polymerization method such as solution polymerization, and a suspension polymerization, and a gas phase polymerization method. Specific examples of the inert hydrocarbon medium used in the liquid phase polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane, and mixtures thereof. The olefin to be polymerized may also be used per se as the solvent.

When polymerization of olefin is performed using the catalyst for olefin polymerization as described above, the component (a-2) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio [(b-1)/M] of the component (b-1) and the total transition metal atoms (M) in the component (a-2) is usually 0.01 to 5,000, and preferably 0.05 to 2,000. The component (b-2) is used in an amount such that the molar ratio [(b-2)/M] of the aluminum atoms in the component (b-2) and the total transition metal (M) in the component (a-2) is usually 1 to 1,000, and preferably 1 to 500. The component (b-3) is used in an amount such that the molar ratio [(b-3)/M] of the component (b-3) and the transition metal atoms (M) in the component (a-2) is usually 1 to 10,000, and preferably 1 to 5,000.

In the present invention (2), propylene and at least one monomer selected from α-olefins and polyenes are usually copolymerized in the liquid phase in the presence of the catalyst for olefin polymerization (2) as described above. In this case, hydrocarbon solvents are generally used, but α-olefins may also be used as the solvent. Copolymerization can be performed in any mode such as batch mode or continuous mode.

Examples of the α-olefin that can be used in the polymerization include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. The α-olefin can be used alone, or in combination of two or more species.

Specific examples of the polyene that can be used in the polymerization include non-conjugated dienes such as 1,4-pentadiene, 1,5-hexadiene, 1,4-hexadiene, 1,4-octadiene, 1,5-octadiene, 1,6-octadiene, 1,7-octadiene, ethylidenenorbornene, vinylnorbornene, dicyclopentadiene, 7-methyl-1,6-octadiene, and 4-ethylidene-8-methyl-1,7-nonadiene;

conjugated dienes such as butadiene, and isoprene;

non-conjugated trienes such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene, and 4-ethylidene-1,7-undecanediene; and conjugated trienes such as 1,3,5-hexatriene.

Such dienes can be used alone or in combination of two or more species, and such trienes can be used alone or in combination of two or more species. The trienes and the dienes can also be used in combination.

Furthermore, the α-olefins and polyenes as described above can also be used in combination.

When performing copolymerization in batch mode using the catalyst for olefin polymerization, the concentration of the metallocene compound in the polymerization system used is usually 0.00005 to 1 mmol, and preferably 0.0001 to 0.50 mmol, per 1 liter of the polymerization volume.

The reaction time (average residence time in the case of performing copolymerization in the continuous mode) may vary depending on the conditions such as catalyst concentration, and polymerization temperature, but it is usually 5 minutes to 3 hours, and preferably 10 minutes to 1.5 hours.

Propylene and at least one monomer selected from the α-olefins and the polyenes are respectively supplied in an amount such that a propylene-based copolymer (B1) of specific composition as described above can be obtained. Upon copolymerization, a molecular weight adjusting agent such as hydrogen can also be used.

When propylene and at least one monomer selected from the α-olefins and the polyenes are copolymerized as described above, the propylene-based copolymer (B1) is usually obtained as a polymerization solution containing the same. This polymerization solution is treated according to conventional methods to obtain the propylene-based copolymer (B1).

The copolymerization reaction is usually performed under the conditions of a temperature of 40° C. to 200° C., preferably 40° C. to 180° C., and more preferably 50° C. to 150° C., and of a pressure of greater than 0 to 10 MPa, preferably 0.5 to 10 MPa, and more preferably 0.5 to 7 MPa.

According to the present invention (2), for example, a propylene copolymer having a high molecular weight (specifically, [η]>2.0) can be obtained even under the condition of a polymerization temperature of 65° C. or higher.

[3] Propylene-Based Copolymer (B1)

The intrinsic viscosity [η] (measured at 135° C. in decalin) of the propylene-based copolymer (B1) obtained by the method for production of the present invention (2) is preferably 0.1 to 10 dl/g, more preferably 0.3 to 7 dl/g, and even more preferably 0.5 to 5 dl/g. Also, the melt flow rate (MFR; ASTM D 1238, 190° C., under a load of 2.16 kg) of the propylene-based copolymer (B1) is preferably 0.01 to 200 g/10 min, more preferably 0.05 to 100 g/10 min, even more preferably 0.05 to 80 g/10 min, and particularly preferably 0.05 to 20 g/10 min.

The propylene content in the propylene-based copolymer (B1) (amount of constituent units derived from propylene in the propylene-based copolymer (B1)) obtained by the method for production of the present invention (2) is preferably in the range of 95 to 51 mol %, more preferably 90 to 51 mol %, and even more preferably 90 to 55 mol %.

The α-olefin component of the propylene-based copolymer (B1) is preferably at least one selected from ethylene, 1-butene, 4-methyl-1-pentene, 1-hexene, 1-octene and 1-decene, and it is preferable that the constituent units derived from an α-olefin in the propylene-based copolymer (B1) are in the range of 5 to 49 mol %, preferably 10 to 49 mol %, and more preferably 10 to 45 mol %. The α-olefin component may be contained alone or as a mixture of two or more species.

In the propylene-based copolymer (B1), the sum of the content of the constituent units derived from propylene and the content of the constituent units derived from α-olefin is 100 mol %.

Furthermore, the polyene is preferably selected from a diene and a triene, and the constituent units derived from the polyene are preferably contained in the propylene-based copolymer (B1) in the range of 0 to 20 mol %. In the case where the propylene-based copolymer (B1) contains the polyene component, the constituent units derived from the polyene are contained in the propylene-based copolymer (B1) in an amount of greater than 0 mol % and less than or equal to 20 mol %, based on 100 mol % of the sum of amounts of propylene and the α-olefin (excluding propylene) (100 mol % of the sum of amounts of the constituent units derived from propylene and the constituent units derived from the α-olefin (excluding propylene)).

The diene may be specifically exemplified by the non-conjugated dienes and conjugated dienes as described above. Among them, a diene having a norbornene skeleton is preferred.

There may be contained one or two or more species of the constituent units derived from diene as described above.

The triene may be specifically exemplified by the non-conjugated trienes or conjugated triene as described above. Among them, 4,8-dimethyl-1,4,8-decatriene and 4-ethylidene-8-methyl-1,7-nonadiene (EMND) are preferred.

There may be contained one or two or more species of the constituent units derived from triene as described above. Also, constituent units derived from the triene and constituent units derived from the diene may be contained together. Among these polyene components, constituent units derived from a polyene having a norbornene skeleton is particularly preferred.

The iodine value of the propylene-based copolymer (B1) containing the polyene component as described above is usually 1 to 80, and preferably 5 to 60.

According to the method for production of the present invention (2), a high molecular weight propylene copolymer containing a large amount of an α-olefin having 4 or more carbon atoms can be easily produced. For the propylene-based copolymer (B1) obtained therefrom, for example, when the molar fraction of the constituent units derived from ethylene is designated as $P_E$, and the molar fraction of an α-olefin having 4 to 20 carbon atoms, such as 1-butene and 1-octene, is designated as $P_{HAO}$, the value of $P_E/P_{HAO}$ is 0 to 0.80 for example, preferably 0 to 0.60, and more preferably 0 to 0.50. Also, when ethylene is to be essentially contained, the ratio $P_E/P_{HAO}$ is in the range of 0.05 to 0.80 for example, preferably 0.06 to 0.60, and more preferably 0.10 to 0.50. An embodiment not containing ethylene is also preferable.

<Syndiotactic Propylene Polymer (A)>

Next, the best embodiments for carrying out the present invention for the syndiotactic propylene polymer (A) (propylene polymer (A)) related to the present invention (3) and molded products comprising the propylene polymer will be described.

Specifically, the characteristic properties of the syndiotactic propylene polymer (A), a representative method for production of the polymer, a method for molding the polymer, and specific examples for them will be described.

Syndiotactic Propylene Polymer (A)

The syndiotactic propylene polymer (A) of the present invention (3) is a propylene polymer comprising constituent units derived from propylene in an amount of 90 mol % or greater (provided that the sum of amounts of the constituent units is 100 mol %).

The syndiotactic propylene polymer (A) of the present invention (3) may be homopolypropylene or may be a random copolymer of propylene.α-olefin having 2 to 20 carbon atoms (excluding propylene), or may be a propylene block copolymer, as long as it is a propylene polymer satisfying the above-described requirements [1] and [2-1], preferably the requirements [1], [2-2] and [3], and more preferably the requirements [1] to [4], and further more preferably, a propylene polymer satisfying the requirements [a] to [d] in addition to the requirements [1] to [4]. However, the polymer is preferably homopolypropylene or a random copolymer of propylene.α-olefin having 2 to 20 carbon atoms (excluding propylene), and particularly preferably homopolypropylene, a copolymer of propylene with ethylene or an α-olefin having 4 to 10 carbon atoms, and a copolymer of propylene with ethylene and an α-olefin having 4 to 10 carbon atoms.

The α-olefin having 2 to 20 carbon atoms other than propylene is exemplified by ethylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, 1-eicosene, or the like.

The propylene polymer of the present invention (3) contains more than 90 mol % of constituent units derived from propylene (provided that the total amount of the constituents unit in the polymer (A) is 100 mol %). The propylene polymer of the present invention (3) is generally a propylene polymer containing more than 90 mol % to 100 mol % or less of constituents unit derived from propylene, and 0 mol % or more and less than 10 mol % of constituent units derived from an α-olefin having 2 to 20 carbon atoms (excluding propylene) (provided that the sum of amounts of the constituent units is 100 mol %); preferably a propylene polymer containing 91 mol % or more and 100 mol % or less of constituent units derived from propylene, and 0 mol % or more and 9 mol % or less of constituent units derived from an α-olefin having 2 to 20 carbon atoms (excluding propylene) (provided that the sum of amounts of the constituent units is 100 mol %); and more preferably a propylene polymer containing 96 mol % or more and 100 mol % or less of constituent units derived from propylene, and 0 mol % or more and 4 mol % or less of constituent units derived from an α-olefin having 2 to 20 carbon atoms (excluding propylene) (provided that the sum of amounts of the constituent units is 100 mol %).

When the syndiotactic propylene polymer of the present invention (3) is a propylene.α-olefin random copolymer, the polymer preferably contains 94 to 99.9 mol % of constituent units derived from propylene and 0.1 to 8 mol % of constituent units derived from an α-olefin having 2 to 20 carbon atoms (excluding propylene), more preferably 93 to 99.9 mol % of constituent units derived from propylene and 0.1 to 7 mol % of constituent units derived from an α-olefin having 2 to 20 carbon atoms (excluding propylene), and even more preferably 94 to 99.9 mol % of constituent units derived from propylene and 0.1 to 6 mol % of constituent units derived from an α-olefin having 2 to 20 carbon atoms (excluding propylene).

Among these syndiotactic propylene polymers, homopolypropylene is more preferred from the viewpoint of heat resistance and the like.

It is desirable that the intrinsic viscosity [η] of the syndiotactic propylene polymer (A) of the present invention (3) as measured in decalin at 135° C. is usually 0.01 to 10.00 dL/g, preferably 0.10 to 9.00 dL/g, more preferably 0.50 to 8.00 dL/g, even more preferably 0.95 to 8.00 dL/g, further more preferably in the range of 1.00 to 8.00, particularly preferably in the range of 1.40 to 8.00 dL/g, and inter alia, preferably in the range of 1.40 to 5.00 dL/g.

The syndiotactic propylene polymer (A) of the present invention (3) is characterized in satisfying the following requirements [1] and [2-1], and preferably the following requirements [1], [2-2] and [3].

[1] The syndiotactic pentad fraction (rrrr fraction) as measured by $^{13}$C-NMR is 85% or greater.

[2-1] The melting point (Tm) determined by differential scanning calorimetry (DSC) is 145° C. or higher.

[2-2] The melting point (Tm) is 145° C. or higher, and the heat of fusion (ΔH) is 40 mJ/mg or greater, each determined by differential scanning calorimetry (hereinafter, referred to as DSC).

[3] When the isothermal crystallization temperature determined by differential scanning calorimetry is designated as $T_{iso}$, and the half-crystallization time at the isothermal crystallization temperature $T_{iso}$ is designated as $t_{1/2}$, the following Equation (Eq-1) is satisfied within the range of $110 \leq T_{iso} \leq 150$ (° C.):

$$1.67 \times 10^{-4} \exp(0.10 \times T_{iso}) \leq t_{1/2} \leq 5.56 \times 10^{-4} \exp(0.12 \times T_{iso}) \quad \text{(Eq-1)}$$

Such syndiotactic propylene polymer (A) has excellent moldability, heat resistance, transparency, rigidity and breaking tensile strength when applied to molding. Hereinafter, the requirements [1] to [3] will be described in detail.

Requirement [1]

The syndiotactic pentad fraction (rrrr fraction, pentad syndiotacticity) of the syndiotactic propylene polymer used in the present invention, as measured by NMR, is 85% or greater, preferably 90% or greater, more preferably 93% or greater, and even more preferably 94% or greater, and a syndiotactic propylene polymer (A) having an rrrr fraction in this range is preferable from the viewpoint of having excellent moldability, heat resistance and transparency, and having good properties as a crystalline polypropylene. There is no particular limitation on the rrrr fraction, but it is 100% or less, and usually 99% or less, for example.

This syndiotactic pentad fraction (rrrr fraction) is measured as follows.

The rrrr fraction is determined from the absorption intensities of Prrrr (the absorption intensity resulting from the methyl group of the third unit at a site of five propylene units being sequentially syndiotactically bonded) and Pw (the absorption intensity resulting from all the methyl groups of propylene units) in the $^{13}$C-NMR spectrum according to the following equation (1):

$$rrrr \text{ fraction (\%)} = 100 \times Prrrr/Pw \quad (1)$$

The NMR measurement is performed, for example, as follows. Specifically, 0.35 g of a sample is dissolved under heating in 2.0 ml of hexachlorobutadiene. This solution is filtered through a glass filter (G2), and then is introduced into an NMR tube having an internal diameter of 10 mm after adding 0.5 ml of deuterated benzene. Then, $^{13}$C-NMR measurement is performed at 120° C. using a GX-500 NMR measuring apparatus manufactured JEOL, Ltd. The accumulation times are 10,000 or more.

The syndiotactic propylene polymer having the rrrr fraction in this range is preferable from the viewpoint having excellent moldability, heat resistance and mechanical properties, and having good properties as a crystalline polypropylene. By using the catalyst system that will be described later and establishing the polymerization conditions that will be described later, the syndiotactic propylene polymer having the rrrr fraction within this range can be produced.

Requirements [2-1] and [2-2]

The melting point of the syndiotactic propylene polymer (A) that can be measured by differential scanning calorimetry (DSC) is 145° C. or higher, preferably 150° C. or higher, more preferably 155° C. or higher, and particularly preferably 156° C. or higher. Moreover, the heat of fusion (ΔH) of the syndiotactic propylene polymer (A) measured at the same time as the melting point, is preferably 40 mJ/mg or higher, more preferably 50 mJ/mg or higher, even more preferably 52 mJ/mg or higher, and particularly preferably 55 mJ/mg. There is no particular upper limit of Tm, but it is usually 170° C. or lower, for example.

The measurement of differential scanning calorimetry is performed, for example, in the following manner. About 5 mg of a sample is filled in an aluminum pan for exclusive use, and the melting point is determined from an endothermic curve obtained by heating the sample from 30° C. to 200° C. at a rate of 320° C./min, maintaining at 200° C. for 5 minutes, cooling from 200° C. to 30° C. at a rate of 10° C./min, maintaining again at 30° C. for 5 minutes, and heating again at a rate of 10° C./min, using DSCPyris1 or DSC7 manufactured by PerkinElmer, Inc. If a plurality of peaks are detected during the DSC measurement, the peak detected on the highest temperature side is defined as the melting point (Tm).

The syndiotactic propylene polymer (A) having the melting point (Tm) in this range is preferable from the viewpoint of having excellent moldability, heat resistance and mechanical properties, and having good properties as a crystalline polypropylene. By using the catalyst system that will be described later and establishing the polymerization conditions that will be described later, a syndiotactic propylene polymer having the melting point within this range can be produced.

Requirement [3]

The syndiotactic propylene polymer satisfies, when the isothermal crystallization temperature determined by differential scanning calorimetry (DSC) is designated as $T_{iso}$, and the half-crystallization time at the isothermal crystallization temperature $T_{iso}$ is designated as $t_{1/2}$, the following Equation (Eq-1) in the range of $110 \leq T_{iso} \leq 150$ (° C.):

$$1.67 \times 10^{-4} \exp(0.10 \times T_{iso}) \leq t_{1/2} \leq 5.56 \times 10^{-4} \exp(0.12 \times T_{iso}) \quad \text{(Eq-1)}$$

preferably satisfies the following equation (Eq-2):

$$1.67 \times 10^{-4} \exp(0.10 \times T_{iso}) \leq t_{1/2} \leq 3.71 \times 10^{-4} \exp(0.12 \times T_{iso}) \quad \text{(Eq-2)}$$

and more preferably satisfies the following equation (Eq-3):

$$1.67 \times 10^{-4} \exp(0.10 \times T_{iso}) \leq t_{1/2} \leq 2.23 \times 10^{-4} \exp(0.12 \times T_{iso}) \quad \text{(Eq-3)}$$

The half-crystallization time ($t_{1/2}$) determined by isothermal crystallization measurement is, when the area between the DSC caloric curve and the baseline during the isothermal crystallization process is considered as the total calories, the time taken to reach 50% of the calories [see New Lectures on Polymer Experiments, 8. Properties of Polymers (KYORITSU SHUPPAN CO., LTD.)].

Measurement of the half-crystallization time ($t_{1/2}$) is performed as follows. About 5 mg of a sample is filled in an aluminum pan for exclusive use, and the half-crystallization time is determined from a DSC curve obtained by heating the sample from 30° C. to 200° C. at a rate of 320° C./min, maintaining at 200° C. for 5 minutes, cooling from that temperature (200° C.) to the respective isothermal crystallization temperature at a rate of 320° C./min, and maintaining at that isothermal crystallization temperature, using DSCPyris1 or DSC7 manufactured by PerkinElmer, Inc. The half-crystallization time ($t_{1/2}$) is determined by setting the initial time of the isothermal crystallization process (the time when it reached to the isothermal crystallization temperature from 200° C.) "t" as 0. For the syndiotactic propylene polymer of the present invention, $t_{1/2}$ can be determined as described above, but when crystallization does not occur at an isothermal crystallization temperature, for example, at 110° C., the measurement is taken for convenience at several points at an isothermal crystallization temperature at or below 110° C., and the half-crystallization time ($t_{1/2}$) is determined from the extrapolated value.

The syndiotactic propylene polymer satisfying the requirement [3] is remarkably excellent in moldability compared to existing syndiotactic propylene polymers. Moldability being excellent indicates that, in the case of carrying out molding such as injection molding, inflation molding, blow molding, extrusion or press-molding, the time taken from the molten state to the solid state is short. Such syndiotactic propylene polymer is also excellent in molding cycle properties, shape stability, long-term productivity and the like.

By using the catalyst system that will be described later and establishing the polymerization conditions that will be described later, a syndiotactic propylene polymer satisfying the requirement [3] can be produced.

The syndiotactic propylene polymer (A) of the present invention preferably simultaneously satisfies the requirement [4] in addition to the requirements [1] to [3].

Requirement [4]

The amount of the n-decane-soluble part of the syndiotactic propylene polymer is preferably 1 (wt %) or less, more preferably 0.8 (wt %) or less, and even more preferably 0.6 (wt %) or less. This amount of n-decane-soluble part is an index closely related to the blocking properties of the propylene random copolymer or the molded products obtained therefrom, and a smaller amount of n-decane-soluble part usually means a smaller amount of low-crystalline components. That is, a syndiotactic propylene polymer (A') satisfying the requirement [4] as well has very good anti-blocking properties.

The syndiotactic propylene polymer (A) of the present invention (3), preferably the syndiotactic propylene polymer (A'), preferably also satisfies the following requirements [a] to [d].

[a] The tensile modulus is in the range of 500 to 2,000 (MPa).

[b] The breaking tensile strength is 20 (MPa) or greater.

[c] The internal haze value of a press sheet having a thickness of 1 mm is 50% or less.

[d] The needle penetration temperature is 145° C. or higher.

Hereinafter, the requirements [a] to [d] will be described in detail.

Requirement [a]

The tensile modulus of the syndiotactic propylene polymer (A) of the present invention (3), preferably the syndiotactic propylene polymer (A'), is in the range of 500 MPa to 2,000 MPa, preferably 600 MPa to 1,800 MPa, and more preferably in the range of 600 MPa to 1,500 MPa.

Specifically, this tensile modulus is a value measured by the following procedure. First, a press sheet having a thickness of 1 mm is punched using an O-dumbbell for No. JIS 3 dumbbell according to JIS K6301 to provide a specimen. The measurement is performed, for example, by measuring the tensile modulus using a tensile tester Inston 1123 manufactured by Instron, Inc. at a span interval of 30 mm and a tensile rate of 30 mm/min at 23° C., and an average value obtained from three runs is adopted The syndiotactic propylene polymer having the tensile modulus within in this range is preferable from the viewpoint of having excellent mechanical properties and strength, and having good properties as a crystalline polypropylene. By using the catalyst system that will be described later and establishing the polymerization conditions that will be described later, a polymer having the tensile modulus within this range can be produced.

Requirement [b]

The breaking tensile strength of the syndiotactic propylene polymer (A) of the present invention (3), preferably the syndiotactic propylene polymer (A'), is 20 (MPa) or greater, preferably 22 (MPa) or greater, more preferably 25 (MPa) or greater, and even more preferably 30 (MPa) or greater.

Specifically, this breaking tensile strength is a value measured by the following procedure. First, a press sheet having a thickness of 1 mm is punched using an O-dumbbell for No. JIS 3 dumbbell according to JIS K6301 to provide a specimen. The measurement is performed, for example, by measuring the tensile modulus using a tensile tester Inston 1123 manufactured by Instron, Inc. at a span interval of 30 mm and a tensile rate of 30 mm/min at 23° C., and an average value obtained from three runs is adopted.

The syndiotactic propylene polymer having the breaking tensile strength within this range is preferable from the viewpoint of having excellent mechanical properties and strength, and having good properties as a crystalline polypropylene. By using the catalyst system that will be described later and establishing the polymerization conditions that will be described later, a polymer having the breaking tensile strength within this range can be produced.

Requirement [c]

The internal haze of the syndiotactic propylene polymer (A) of the present invention (3), preferably the syndiotactic propylene polymer (A'), is 50% or lower, preferably 45% or lower, and more preferably 30% or lower.

This internal haze value is an average value obtained from two runs, in the case of being measured using a press sheet specimen having a thickness of 1 mm with a digital turbidimeter "NDH-20D" manufactured by Nippon Denshoku Industries Co., Ltd.

The syndiotactic propylene polymer having the internal haze within this range is preferable from the viewpoint of having excellent transparency, and having good properties as a crystalline polypropylene. By using the catalyst system that will be described later and establishing the polymerization conditions that will be described later, a polymer having the internal haze within this range can be produced.

Requirement [d]

The needle penetration temperature of the syndiotactic propylene polymer (A) of the present invention (3), preferably the syndiotactic propylene polymer (A'), is 145° C. or higher, and more preferably 150° C. or higher.

The needle penetration temperature (may also be referred to as softening temperature which is determined by TMA) can be measured as follows.

The needle penetration temperature (° C.) is determined from a TMA curve recorded with a specimen of press sheet having a thickness of 1 mm while pressing with a planar indentor of 1.8 mm φ at a pressure of 2 kgf/cm² and heating at 5° C./min using SS-120 manufactured by Seiko Co., Ltd. or Q-400 manufactured by TA Instrument.

The syndiotactic propylene polymer having the needle penetration temperature within this range is preferable from the viewpoint of having excellent heat resistance and having good properties as crystalline polypropylene. The polymer is also preferable from the viewpoint of being excellent in heat resistance, rigidity, material strength and the like, without impairing transparency which is a characteristic of syndiotactic propylene, and having good properties as crystalline polypropylene. By using the catalyst system that will be described later and establishing the polymerization conditions that will be described later, a polymer having the property within this range can be produced.

The present invention (3) relates to the molded products obtained by molding the syndiotactic propylene polymer (A), preferably the syndiotactic propylene polymer (A'), more preferably a syndiotactic propylene polymer (A").

Method for Producing Syndiotactic Propylene Polymer

As the catalyst (3) used in the production of the syndiotactic polypropylene polymer (A) of the present invention (3), and the syndiotactic propylene polymer (AA) used in the present inventions (4), (5) and (6), a catalyst (cat-1) for polymerization comprising:

(a-3) a bridged metallocene compound represented by the following Formula [1-3] (in the present specification, may be referred to as "component (a-3)"), and (b) at least one compound selected from:

(b-1) an organoaluminum oxy compound, (b-2) a compound which reacts with the bridged metallocene compound (a-3) to form an ion pair, and (b-3) an organoaluminum compound, or a catalyst for polymerization (cat-2) having the catalyst (cat-1) supported on a particulate support, is suitably used. However, as long as the produced polymer shows properties that satisfy the requirements [1] to [3], the catalyst used in the production of the syndiotactic polypropylene polymer (A) of the present invention (3), and the catalyst used in the production of the syndiotactic propylene polymer (AA) used in the present inventions (4), (5) and (6) are not limited to such catalysts.

[1-3]

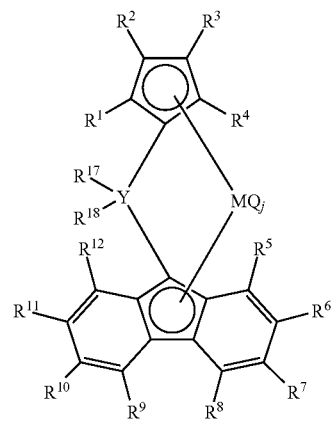

In the Formula [1-3], $R^1$, $R^2$, $R^3$ and $R^4$ are each selected from a hydrogen atom, a hydrocarbon group and a silicon-containing group; $R^2$ and $R^3$ may be linked to each other to form a ring, $R^5$, $R^6$, $R^8$, $R^9$, $R^{11}$ and $R^{12}$ may be selected from hydrogen, a hydrocarbon group and a silicon-containing group; the two groups of $R^7$ and $R^{10}$ are not hydrogen atoms, but are each selected from a hydrocarbon group and a silicon-containing group, and may be identical to and different from each other; and in one or more combinations of adjacent groups selected from $R^5$ and $R^6$, $R^7$ and $R^8$, $R^8$ and $R^9$, $R^9$ and $R^{10}$, and $R^{11}$ and $R^{12}$, the adjacent groups may be linked to each other to form a ring.

$R^{17}$ and $R^{18}$ are each a hydrogen atom, a hydrocarbon group having 1 to 20 carbon atoms or a silicon atom-containing group, and may be identical to and different from each other, while the substituents may be linked to each other to form a ring.

M is Ti; Zr or Hf; Y is carbon; Q may be selected from a halogen, a hydrocarbon group, an anion ligand and a neutral ligand capable of coordination with a lone electron pair, in identical or different combinations; and j is an integer from 1 to 4.

Hereinafter, specific examples of the component (bridged metallocene compound) (a-3) satisfying this definition will be given:

cyclopropylidene(cyclopentadienyl)(3,6-di-tert-fluorenyl)zirconium dichloride,
cyclobutylidene(cyclopentadienyl)(3,6-di-tert-fluorenyl)zirconium dichloride,
cyclopentylidene(cyclopentadienyl)(3,6-di-tert-fluorenyl)zirconium dichloride,
cyclohexylidene(cyclopentadienyl)(3,6-di-tert-fluorenyl)zirconium dichloride,
cycloheptylidene(cyclopentadienyl)(3,6-di-tert-fluorenyl)zirconium dichloride,
dibenzylmethylene(cyclopentadienyl)(3,6-di-tert-butylfluorenyl)zirconium dichloride,
dibenzylmethylene(cyclopentadienyl)(octamethyloctahydrodibenzofluorenyl)zirconium dichloride,
di-n-butylmethylene(cyclopentadienyl)(2,7-dimethyl-3,6-di-tert-butylfluorenyl)zirconium dichloride,
di-n-butylmethylene(cyclopentadienyl(2,7-di(2,4,6-trimethylphenyl)-3,6-di-tert-butylfluorenyl)zirconium dichloride,
di-n-butylmethylene(cyclopentadienyl)(2,7-diphenyl-3,6-di-tert-butylfluorenyl)zirconium dichloride,
di-n-butylmethylene(cyclopentadienyl)(2,7-di(3,5-dimethylphenyl)-3,6-di-tert-butylfluorenyl)zirconium dichloride,
di-n-butylmethylene(cyclopentadienyl)(2,3,6,7-tetra-tert-butylfluorenyl)zirconium dichloride,
di-n-butylmethylene(cyclopentadienyl)(2,7-di(4-methylphenyl)-3,6-di-tert-butylfluorenyl)zirconium dichloride,
di-n-butylmethylene(cyclopentadienyl)(2,7-dinaphthyl-3,6-di-tert-butylfluorenyl)zirconium dichloride,
di-n-butylmethylene(cyclopentadienyl)(2,7-di(4-tert-butylphenyl)-3,6-di-tert-butylfluorenyl)zirconium dichloride,
diisobutylmethylene(cyclopentadienyl)(2,7-dimethyl-3,6-di-tert-butylfluorenyl)zirconium dichloride,
diisobutylmethylene(cyclopentadienyl(2,7-di(2,4,6-trimethylphenyl)-3,6-di-tert-butylfluorenyl)zirconium dichloride,
diisobutylmethylene(cyclopentadienyl)(2,7-diphenyl-3,6-di-tert-butylfluorenyl)zirconium dichloride,
diisobutylmethylene(cyclopentadienyl)(2,7-di(3,5-dimethylphenyl)-3,6-di-tert-butylfluorenyl)zirconium dichloride,
diisobutylmethylene(cyclopentadienyl)(2,3,6,7-tetra-tert-butylfluorenyl)zirconium dichloride,
diisobutylmethylene(cyclopentadienyl)(2,7-di(4-methylphenyl)-3,6-di-tert-butylfluorenyl)zirconium dichloride,
diisobutylmethylene(cyclopentadienyl)(2,7-dinaphthyl-3,6-di-tert-butylfluorenyl)zirconium dichloride,
diisobutylmethylene(cyclopentadienyl)(2,7-di(4-tert-butylphenyl)-3,6-di-tert-butylfluorenyl)zirconium dichloride,
dibenzylmethylene(cyclopentadienyl)(2,7-dimethyl-3,6-di-tert-butylfluorenyl)zirconium dichloride [also referred to as 1,3-diphenyl isopropylidene(cyclopentadienyl)(2,7-dimethyl-3,6-di-tert-butylfluorenyl)zirconium dichloride, the same applies hereinafter],
dibenzylmethylene(cyclopentadienyl(2,7-di(2,4,6-trimethylphenyl)-3,6-di-tert-butylfluorenyl)zirconium dichloride,
dibenzylmethylene(cyclopentadienyl)(2,7-diphenyl-3,6-di-tert-butylfluorenyl)zirconium dichloride,
dibenzylmethylene(cyclopentadienyl)(2,7-di(3,5-dimethylphenyl)-3,6-di-tert-butylfluorenyl)zirconium dichloride,
dibenzylmethylene(cyclopentadienyl)(2,3,6,7-tetra-tert-butylfluorenyl)zirconium dichloride,
dibenzylmethylene(cyclopentadienyl)(2,7-di(4-methylphenyl)-3,6-di-tert-butylfluorenyl)zirconium dichloride,
dibenzylmethylene(cyclopentadienyl)(2,7-dinaphthyl-3,6-di-tert-butylfluorenyl)zirconium dichloride,
dibenzylmethylene(cyclopentadienyl)(2,7-di(4-tert-butylphenyl)-3,6-di-tert-butylfluorenyl)zirconium dichloride,
diphenethylmethylene(cyclopentadienyl)(2,7-dimethyl-3,6-di-tert-butylfluorenyl)zirconium dichloride,
diphenethylmethylene(cyclopentadienyl)(2,7-diphenyl-3,6-di-tert-butylfluorenyl)zirconium dichloride, di(benzhydryl)methylene(cyclopentadienyl)(2,7-dimethyl-3,6-di-tert-butylfluorenyl)zirconium dichloride, di(benzhydryl)methylene(cyclopentadienyl)(2,7-diphenyl-3,6-di-tert-butylfluorenyl)zirconium dichloride,
di(cumyl)methylene(cyclopentadienyl)(2,7-dimethyl-3,6-di-tert-butylfluorenyl)zirconium dichloride,
di(cumyl)methylene(cyclopentadienyl)(2,7-diphenyl-3,6-di-tert-butylfluorenyl)zirconium dichloride,
di(1-phenyl-ethyl)methylene(cyclopentadienyl)(2,7-dimethyl-3,6-di-tert-butylfluorenyl)zirconium dichloride,
di(1-phenyl-ethyl)methylene(cyclopentadienyl)(2,7-diphenyl-3,6-di-tert-butylfluorenyl)zirconium dichloride,
di(cyclohexylmethyl)methylene(cyclopentadienyl)(2,7-dimethyl-3,6-di-tert-butylfluorenyl)zirconium dichloride,
di(cyclohexylmethyl)methylene(cyclopentadienyl)(2,7-diphenyl-3,6-di-tert-butylfluorenyl)zirconium dichloride,
di(cyclopentylmethyl)methylene(cyclopentadienyl)(2,7-dimethyl-3,6-di-tert-butylfluorenyl)zirconium dichloride,
di(cyclopentylmethyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
(benzyl)(n-butyl)methylene(cyclopentadienyl)(2,7-dimethyl-3,6-di-tert-butylfluorenyl)zirconium dichloride,
(benzyl)(n-butyl)methylene(cyclopentadienyl)(2,7-diphenyl-3,6-di-tert-butylfluorenyl)zirconium dichloride,
(benzyl)(cumyl)methylene(cyclopentadienyl)(2,7-dimethyl-3,6-di-tert-butylfluorenyl)zirconium dichloride,
(benzyl)(cumyl)methylene(cyclopentadienyl)(2,7-diphenyl-3,6-di-tert-butylfluorenyl)zirconium dichloride, cyclopropylidene(cyclopentadienyl)(2,7-dimethyl-3,6-di-tert-butylfluorenyl)zirconium dichloride,
cyclopropylidene(cyclopentadienyl)(2,7-diphenyl-3,6-di-tert-butylfluorenyl)zirconium dichloride,
cyclobutylidene(cyclopentadienyl)(2,7-dimethyl-3,6-di-tert-butylfluorenyl)zirconium dichloride,
cyclobutylidene(cyclopentadienyl)(2,7-diphenyl-3,6-di-tert-butylfluorenyl)zirconium dichloride,
cyclopentylidene(cyclopentadienyl)(2,7-dimethyl-3,6-di-tert-butylfluorenyl)zirconium dichloride,
cyclopentylidene(cyclopentadienyl)(2,7-diphenyl-3,6-di-tert-butylfluorenyl)zirconium dichloride,
cyclohexylidene(cyclopentadienyl)(2,7-dimethyl-3,6-di-tert-butylfluorenyl)zirconium dichloride,
cyclohexylidene(cyclopentadienyl)(2,7-diphenyl-3,6-di-tert-butylfluorenyl)zirconium dichloride,
cycloheptylidene(cyclopentadienyl)(2,7-dimethyl-3,6-di-tert-butylfluorenyl)zirconium dichloride,
cycloheptylidene(cyclopentadienyl)(2,7-diphenyl-3,6-di-tert-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
dibenzylmethylene(cyclopentadienyl)(2,7-dimethyl-3,6-dicumyl-butylfluorenyl)zirconium dichloride,
di-n-butylmethylene(cyclopentadienyl)(2,7-dimethyl-3,6-dicumyl-butylfluorenyl)zirconium dichloride,
dibenzylmethylene(cyclopentadienyl)(2,7-dimethyl-3,6-di(trimethylsilyl)-butylfluorenyl)zirconium dichloride,
di-n-butylmethylene(cyclopentadienyl)(2,7-dimethyl-3,6-di(trimethylsilyl)-butylfluorenyl)zirconium dichloride,
dibenzylmethylene(cyclopentadienyl)(2,7-dimethyl-3,6-diphenyl-butylfluorenyl)zirconium dichloride,
di-n-butylmethylene(cyclopentadienyl)(2,7-dimethyl-3,6-diphenyl-butylfluorenyl)zirconium dichloride,
dibenzylmethylene(cyclopentadienyl)(2,7-dimethyl-3,6-dibenzyl-butylfluorenyl)zirconium dichloride,
di-n-butylmethylene(cyclopentadienyl)(2,7-dimethyl-3,6-dibenzyl-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
diphenylmethylene(cyclopentadienyl)(2,7-dimethyl-3,6-di-tert-butylfluorenyl)zirconium dichloride,
diphenylmethylene(cyclopentadienyl)(2,7-diphenyl-3,6-di-tert-butylfluorenyl)zirconium dichloride,
di(p-tolyl)methylene(cyclopentadienyl)(2,7-dimethyl-3,6-di-tert-butylfluorenyl)zirconium dichloride,
di(p-tolyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-tert-butyl-phenyl)methylene(cyclopentadienyl)(2,7-dimethyl-3,6-di-tert-butylfluorenyl)zirconium dichloride,
di(p-tert-butyl-phenyl)methylene(cyclopentadienyl)(2,7-diphenyl-3,6-di-tert-butylfluorenyl)zirconium dichloride,
di(p-n-butyl-phenyl)methylene(cyclopentadienyl)(2,7-dimethyl-3,6-di-tert-butylfluorenyl)zirconium dichloride,
di(p-n-butyl-phenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-diphenyl-3,6-di-tert-butylfluorenyl)zirconium dichloride,
di(1-naphthyl)methylene(cyclopentadienyl)(2,7-dimethyl-3,6-di-tert-butylfluorenyl)zirconium dichloride,
di(1-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(p-isopropylphenyl)methylene(cyclopentadienyl)(2,7-dimethyl-3,6-di-tert-butylfluorenyl)zirconium dichloride,
di(p-isopropylphenyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
diphenylsilylene(cyclopentadienyl)(2,7-dimethyl-3,6-di-tert-butylfluorenyl)zirconium dichloride, and
diphenylsilylene(cyclopentadienyl)(2,7-diphenyl-3,6-di-tert-butylfluorenyl)zirconium dichloride.

Furthermore, examples thereof also include a compound resulting from replacing the "zirconium" of the compound described above with "hafnium" or "titanium", and a bridged metallocene compound resulting from replacing the "dichloride" of the compound described above with "difluoride", "dibromide" or "diiodide", or resulting from replacing the "dichloride" of the compound described above with "dimethyl" or "methylethyl".

The bridged metallocene compound (a-3) described above can be produced by known methods, and the method for production is not particularly limited. Examples of the known method for production include the methods for production described in WO 2001/27124 and WO 2004/087775 filed by the present applicant. Such bridged metallocene compound (a-3) can be used alone or in combination of two or more species.

The compound (b) is at least one compound selected from the organoaluminum oxy compound (b-1), the compound which reacts with the bridged metallocene compound (a-3) to form an ion pair (b-2), and the organoaluminum compound (b-3).

The "compound which reacts with the bridged metallocene compound (a-3) to form an ion pair (b-2)" is identical to the "compound which reacts with the bridged metallocene compound (a-1) to form an ion pair (b-2) (ionic compound (b-2))", and details of the organoaluminum oxy compound (b-1), the compound (b-2) and the organoaluminum compound (b-3) are as described above.

The catalyst (3) described above may contain, if necessary, the above-described support (c), along with the (a-3) bridged metallocene compound represented by the Formula [1-3], and the (b) at least one compound selected from (b-1) the organoaluminum oxy compound, (b-2) the compound which reacts with the bridged metallocene compound (a-3) to form an ion pair, and (b-3) the organoaluminum compound, and the respective components may be used while being supported on the particulate support (c).

The catalyst (3) may contain the organic compound component (d) as the catalyst component, if necessary.

Details of the support (c) and the organic compound component (d) are as described above.

Method for Producing Syndiotactic Propylene Polymer (A)

For polymerization of the syndiotactic propylene polymer (A) of the present invention (3), the method of using each component, and the order of addition are arbitrarily selected, and the following methods may be mentioned as the methods of polymerization.

(1) A method comprising adding the component (a-3) alone into the polymerization vessel.

(2) A method comprising adding the component (a-3) and component (b) into the polymerization vessel in an arbitrary order.

(3) A method comprising adding a catalyst component in which the component (a-3) is supported on the support (c), and the component (b) into the polymerization vessel in an arbitrary order.

(4) A method comprising adding a catalyst component in which the component (b) is supported on the support (c), and the component (a-3) into the polymerization vessel in an arbitrary order.

(5) A method comprising adding a catalyst component in which the component (a-3) and the component (b) are supported on the support (c) into the polymerization vessel.

According to the respective methods of (2) to (5) described above, at least two or more of the catalyst components may be brought into contact with each other in advance.

In the respective methods of (4) and (5) described above using supported component (b), unsupported component (b) may be added in any order, as necessary. In this case, the component (b) may be identical to or different from each other.

Furthermore, the solid catalyst component having the component (a-3) supported on the component (c), and the solid catalyst component having the component (a-3) and component (b) supported on the component (c) may have a prepolymerized olefin, or a prepolymerized solid catalyst component may further have the catalyst component supported thereon.

In the production of the syndiotactic propylene polymer (A) of the present invention (3), polymerization can be carried out by any of liquid phase polymerization method such as a solution polymerization, and suspension polymerization, and a gas phase polymerization method. Specific examples of the inert hydrocarbon medium used in the liquid phase polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane, and mixtures thereof. The olefin to be polymerized may also be used per se as the solvent.

When polymerization of olefin is performed using the catalyst for olefin polymerization as described above, the component (a-3) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio [(b-1)/M] of the component (b-1) and the total transition metal atoms (M) in the component (a-3) is usually 0.01 to 5,000, and preferably 0.05 to 2,000. The component (b-2) is used in an amount such that the molar ratio [(b-2)/M] of the component (b-2) and the transition metal atoms (M) in the component (a-3) is usually 1 to 10, and preferably 1 to 5. The component (b-3) is used in an amount such that the molar ratio [(b-3)/M] of the aluminum atoms in the component (b-3) and the total transition metal (M) in the component (a-3) is usually 10 to 5,000, and preferably 20 to 2,000.

The component (d) is used, in the case where the component (b) is component (b-1), in an amount such that the molar ratio [(d)/(b-1)] is usually 0.01 to 10, and preferably 0.1 to 5; in the case where the component (b) is component (b-2), in an amount such that the molar ratio [(d)/(b-2)] is usually 0.01 to 10, and preferably 0.1 to 5; and, in the case where the component (b) is component (b-3), in an amount such that the molar ratio [(d)/(b-3)] is usually 0.01 to 2, and preferably 0.005 to 1.

The temperature for olefin polymerization using the catalyst for olefin polymerization is generally within the range from −50 to +200° C., and preferably from 0 to 170° C. The polymerization pressure is under the condition of generally from normal pressure to 10 MPa gauge pressure, and preferably from normal pressure to 5 MPa gauge pressure, and the polymerization reaction can be carried out either batchwise, semicontinuously or continuously. The polymerization can be carried out by dividing the process into two or more stages having different reaction conditions. The molecular weight of the resulting propylene polymer can be also regulated by allowing hydrogen to exist in the polymerization system or by varying the polymerization temperature. Moreover, the molecule weight can be regulated according to the amount of the component (b) used. When adding hydrogen, the suitable amount to be added is from about 0.001 to 100 NL per 1 kg of olefin.

The syndiotactic propylene polymer (A) obtained by the above-described method for polymerization may have a part thereof graft-modified by a polar monomer. This polar monomer may be exemplified by a hydroxyl group-containing ethylenic unsaturated compound, an amino group-containing ethylenic unsaturated compound, an epoxy group-containing ethylenic unsaturated compound, an aromatic vinyl compound, an unsaturated carboxylic acid or its derivatives, a vinyl ester compound, vinyl chloride, a vinyl group-containing organosilicon compound, a carbodiimide compound, or the like.

As the polar monomer, in particular, the unsaturated carboxylic acid or its derivatives are particularly preferred. Examples of the unsaturated carboxylic acid or its derivatives include an unsaturated compound having at least one carboxylic acid group, an ester of a compound having a carboxylic acid group and an alkyl alcohol, and an unsaturated compound having at least one anhydrous carboxylic acid group, and examples of the unsaturated group include a vinyl group, a vinylene group, and an unsaturated cyclic hydrocarbon group. Specific examples of the compound include unsaturated carboxylic acids such as acrylic acid, maleic acid, fumaric acid, tetrahydrophthalic acid, itaconic acid, citraconic acid, crotonic acid, isocrotonic acid, and Nadic acid [trade name] (endocis-bicyclo[2.2.1]hept-5-ene-2,3-dicarboxylic acid); and derivatives thereof such as acid halides, amides, imides, anhydrides, esters and the like. Specific examples of these derivatives include malenyl chloride, maleimide, maleic anhydride, citraconic anhydride, monomethyl maleate, dimethyl maleate, glycidyl maleate. These unsaturated carboxylic acids and/or derivatives thereof may be used alone or in combination of two or more species. Among these, an unsaturated dicarboxylic acid or an acid anhydride thereof is preferred, and particularly maleic acid, Nadic acid [trade name] or acid anhydrides thereof are preferably used.

A modified syndiotactic propylene polymer can be obtained by graft polymerizing a polar monomer to the syndiotactic propylene polymer (A) as described above. When graft polymerizing such polar monomer to the syndiotactic propylene polymer, the polar monomer is usually used in an amount of 1 to 100 parts by weight, and preferably 5 to 80 parts by weight, based on 100 parts by weight of the syndiotactic propylene polymer (A). This graft polymerization is generally performed in the presence of a radical initiator.

As the radical initiator, an organic peroxide, an azo compound or the like may be used.

The radical initiator can be used by directly mixing with the syndiotactic propylene polymer and the polar monomer, but may be used after dissolving the initiator in a small amount of an organic solvent. This organic solvent is not particularly limited for use, as long as it is an organic solvent which can dissolve the radical initiator.

Upon graft polymerizing a polar monomer to the syndiotactic propylene polymer (A), a reducing substance can be used. If a reducing substance is used, the amount of the polar monomer to be grafted can be enhanced.

Graft modification of the syndiotactic propylene polymer (A) with a polar monomer can be performed by a conventionally known method, and for example, can be performed by dissolving the syndiotactic propylene polymer (A) in an organic solvent, subsequently adding a polar monomer, a radical initiator and the like to the solution, and allowing the mixture to react at a temperature of 70 to 200° C., and preferably 80 to 190° C., for 0.5 to 15 hours, and preferably 1 to 10 hours.

A modified syndiotactic propylene polymer can also be produced by reacting the syndiotactic propylene polymer (A) with a polar monomer in the absence of solvent, using an extruder or the like. This reaction is preferably performed at a temperature usually above the melting point of an ethylene-based polymer, specifically at a temperature of 120 to 250° C., usually for 0.5 to 10 minutes.

The modification ratio of the modified syndiotactic propylene polymer thus obtained (the grafting ratio of the polar monomer) is preferably 0.1 to 50 wt %, more preferably 0.2 to 30 wt %, and even more preferably 0.2 to 10 wt %.

When the modified syndiotactic propylene polymer is contained in the syndiotactic propylene polymer (A) of the present invention (3), adhesiveness to other resins and compatibility may be excellent, and also the wettability of the surface of molded products may be improved.

The modified syndiotactic propylene polymer of the invention (3) may be preferably used, after crosslinking, in crosslinked wire, and crosslinked pipes.

The syndiotactic propylene polymer (A) of the present invention (3) may also contain a nucleating agent, which is a specific arbitrary component, in order to improve the moldability, that is, to increase the crystallization temperature and increase the rate of crystallization. In this case, for example, the nucleating agent is a dibenzylidene sorbitol-based nucleating agent, phosphoric acid ester salt-based nucleating agent, a rosin-based nucleating agent, a benzoic acid metal salt-based nucleating agent, a fluorinated polyethylene, sodium 2,2-methylenebis(4,6-di-tert-butylphenyl)phosphate, pimelic acid or a salt thereof, 2,6-naphthalenic acid dicarboxylic acid dicyclohexylamide, or the like. The amount of mixing is not particularly limited, but the amount is preferably about 0.1 to 1 part by weight based on 100 parts by weight of the syndiotactic propylene polymer (A). The timing for mixing is not particularly limited, and addition is possible during or after polymerization, or during the molding process.

The syndiotactic propylene polymer (A) of the present invention (3) may have incorporated, if necessary, within the scope of not impairing the purpose of the present invention, additives such as a weather resistant stabilizer, a heat resistant stabilizer, an antistatic agent, an anti-slipping agent, an anti-blocking agent, a foaming agent, a crystallization aid, an anti-fogging agent, a transparent nucleating agent, a lubricant, a dye, a pigment, a plasticizer, an anti-aging agent, a hydrochloric acid absorbent, an antioxidant, a releasing agent, an impact improving agent, and an anti-UV agent.

The syndiotactic propylene polymer (A) can be produced in the scope described above by various methods that are known, for example, by multi-stage polymerizing the respective components in the continuous mode or batch mode in a slurry phase, solution phase or gas phase, by mixing the respective components in a Henschel mixer, a V-blender, a ribbon blender, a tumbler blender or the like, or by melt kneading the respective components in a single screw extruder, a twin screw extruder, a kneader, a Bunbury mixer or the like, and then granulating or grinding.

A composition containing the propylene polymer (A) of the present invention is not particularly limited, as long as it contains (A).

Molding Methods and Molded Products Obtained According to the Methods

The syndiotactic propylene polymer (A) obtained by the above-described method, or a modified product thereof has excellent moldability and heat resistance, and is capable of producing molded products having excellent moldability, heat resistance, transparency, rigidity and breaking tensile strength therefrom. Thus, the syndiotactic propylene polymer (A) obtained by the above-described method, or a modified product thereof can be widely used in polyolefin applications for which it was practically difficult to use conventional syndiotactic polypropylene. The syndiotactic propylene polymer (A) in particular can be molded into, for example, sheets, unstretched or stretched films, filaments, and other molded products of various shapes.

Furthermore, in the molded products formed using the syndiotactic propylene polymer (A), the syndiotactic propylene polymer (A) may be contained in a part of the molded products, that is, the syndiotactic propylene polymer (A) may be used in parts of the molded products, and also the syndiotactic propylene polymer (A) may be used in the entirety of the molded products. Examples of using the syndiotactic propylene polymer (A) in parts of a molded product include a multilayer laminate. Specific examples of the multilayer laminate include multilayer films and sheets, multilayer containers, and multilayer tubes, in which at least one layer is a layer comprising the syndiotactic propylene polymer (A), respectively; and multilayer coating film laminates where it is contained in aqueous coating materials as one constituent component.

The syndiotactic propylene polymer (A) of the present invention (3) can be molded by known thermal molding methods such as extrusion molding, injection molding, inflation molding, extrusion lamination molding, cast molding, blow molding, extrusion blow molding, injection blow molding, press molding, vacuum molding, calender molding, expansion molding, and powder slash molding. The polymer can be used in fibers, monofilaments, non-woven fabrics and the like.

These molded products include those molded products containing parts formed from the syndiotactic propylene polymer (A) and parts formed from other resins (laminates, etc.). The syndiotactic propylene polymer (A) used may be crosslinked during the molding process.

Specific examples of the molded product include molded products obtained by known thermal molding methods such as extrusion molding, injection molding, inflation molding, blow molding, extrusion blow molding, injection blow molding, press molding, vacuum molding, calender molding, expansion molding, and powder slash molding. Hereinafter, the molded products will be described by way of some examples.

In the case where the molded product of the present invention (3) is, for example, an extrusion molded product, the shape and the product type are not particularly limited, but preferred examples thereof include sheets, films (unstretched), pipes, hoses, wire coatings, and tubes, and particularly preferred are sheets (skin materials), films, tubes, catheters, and monofilaments (non-woven fabrics).

The syndiotactic propylene polymer (A) obtained by the above-described method, or a modified product thereof is excellent in transparency, impact resistance, heat resistance, flexibility or rigidity, abrasion resistance, surface hardness, contractability, soundproofing properties, damping properties, cuttability, high breakdown voltage, radiation resistance, degradation resistance, uniform expandability, rubbery elasticity, kink resistance, stretchability, creep properties, adhesiveness, flexible modifiability, transparent modifiability and the like, and thus can be preferably used in the following applications.

Examples of the application include, in general, food containers, beverage bottles, pipes, food packaging materials, retort containers, medical containers, infusion bags, apparel cases, transparent substrates, transparent sealants, sealants, automobile interior and exterior decorating materials, automobile skin materials, abrasion resistant automobile interior and exterior decorating materials, molding materials, automobile sealing materials, dry skin materials, shrinkable films, wrapping films, porous films, laminates, acoustic insulating materials, damping materials, foam products, foaming materials, cushioning materials, masking films, condenser films, protective films, reflective films, dicing films, laminates (including glass), wire cables, stretched films, shape memory materials, films for laminated glass, bulletproof materials, bulletproof glass films, solar cell sealing materials, radiation resistant films, γ-ray resistant films, flowmark modifiers, weld modifiers, non-woven fabrics, stretchable non-woven fabrics, modifiers, adhesive materials, and compatibilizers (graft modification).

Upon extrusion molding the syndiotactic propylene polymer (A), conventionally known extrusion apparatuses and molding conditions may be employed, and for example, using a single screw extruder, a kneading extruder, a ram extruder, a gear extruder and the like, a desired shape can be molded by extruding a molten propylene composition through a certain die or the like.

A stretched film can be obtained by stretching an extruded sheet or extruded film (unstretched) as described above by a known stretching method such as a tentering method (longitudinal transverse stretching, transverse longitudinal stretching), a simultaneous biaxial stretching method, and a uniaxial stretching method.

The draw ratio employed during stretching a sheet or an unstretched film is typically about 20 to 70 times in the case of biaxial stretching, and typically about 2 to 10 times in the case of uniaxial stretching. It is preferable to obtain a stretched film having a thickness of about 5 to 200 µm by stretching.

An inflation film can also be produced as a film-shaped molded product. Drawdown is unlikely to occur during the process of inflation molding.

The sheet and film molded products formed using the syndiotactic propylene polymer (A) are not likely to be statically charged, and are excellent in mechanical properties, heat resistance, stretchability, impact resistance, aging resistance, transparency, visibility, gloss, rigidity, moisture-proof properties and gas barrier properties. The products can be widely used as packaging films and the like.

In this case, the sheet and film molded products formed using the syndiotactic propylene polymer (A) may be multilayer molded products, and may be used as multilayer laminates having at least one layer of the syndiotactic propylene polymer.

A filament molded product can be produced by, for example, extruding the molten syndiotactic propylene polymer (A) through a spinneret. Specifically, a spun-bonding method or a melt blown method is preferably used. A filament thus obtained may be further stretched. This stretching may be performed to the extent that the molecules become oriented in at least one axial direction of the filament, and it is usually desirable to perform stretching at a draw ratio of about 5 to 10 times. The filament obtained from the thermoplastic composition according to the present invention is hardly charged, and is excellent in transparency, rigidity, thermal resistance, impact resistance and stretchability.

An injection molded product can be produced by injection molding the syndiotactic propylene polymer (A) into various shapes using conventionally known injection molding apparatuses and employing known conditions. The injection molded product obtained using the propylene composition is not likely to be statically charged, is excellent in transparency, rigidity, thermal resistance, impact resistance, surface gloss, chemical resistance, abrasion resistance and the like, and can be used widely as a trimming material for automobile interior decoration, a material for automobile exterior decoration, housing for household electric appliances, containers, and the like.

A blow molded product can be produced by blow molding the syndiotactic propylene polymer (A) by using conventionally known blow molding apparatuses and employing known conditions. In this case, the blow molded product formed from the syndiotactic propylene polymer (A) may be a multilayer molded product, and has at least one layer of the syndiotactic propylene polymer (A).

For example, in extrusion blow molding, the syndiotactic propylene polymer (A) is extruded from a die in a molten state at a resin temperature of 100 to 300° C. to form a tube-shaped parison. Then, after retaining the parison in a mold of a desired shape, air is blown in to make the parison fit the mold at a resin temperature of 130 to 300° C., and thereby a hollow molded product can be produced. It is desirable that the draw (blow) ratio is about 1.5 to 5 times in the transverse direction.

In injection blow molding, the syndiotactic propylene polymer (A) is injected into a parison-mold at a resin temperature of 100° C. to 300° C. After retaining the parison in a mold of the desired shape, air is blown in to make the parison fit the mold at a resin temperature of 120° C. to 300° C., and thereby a hollow molded product can be produced. In obtaining the hollow molded product, it is desirable that the draw (blow) ratio is 1.1 to 1.8 times in the longitudinal direction and 1.3 to 2.5 times in the transverse direction.

Blow molded products formed using the syndiotactic propylene polymer (A) has excellent transparency, rigidity or flexibility, thermal resistance and impact resistance, and is also excellent in moisture-proof properties.

Examples of a press molded product include mold stamping molded products. For example, when a base material and a skin material are simultaneously press molded to perform composite integral molding (mold stamping molding) of the two materials, the base material can be formed from the syndiotactic propylene polymer (A).

Specific examples of such mold stamping molded product include the materials for automobile interior decoration, such as door trims, rear package trims, seat back garnishes, and instrument panels.

Press molded products formed using the syndiotactic propylene polymer (A) are not likely to be statically charged, and are excellent in flexibility, thermal resistance, transparency, impact resistance, aging resistance, surface gloss, chemical resistance, abrasion resistance and the like.

Foamed molded products formed using the syndiotactic propylene polymer (A) can be obtained at high foaming ratios, and also have good injection moldability, as well as high rigidity and material strength.

The syndiotactic propylene polymer (A) can be produced into vacuum molded products such as interior decoration skin materials for instrument panels, door trims and the like of automobiles. The molded products are not likely to be statically charged, and are excellent in flexibility, heat resistance, impact resistance, aging resistance, surface gloss, chemical resistance, abrasion resistance and the like.

By molding the propylene polymer (A) of the present invention (3), powder slash molded products such as automobile parts, electric appliance parts, toys, miscellaneous goods and the like can be produced. The molded products are not likely to be statically charged, and are excellent in flexibility, heat resistance, impact resistance, aging resistance, surface gloss, chemical resistance, abrasion resistance and the like.

Examples of the molded product of the present invention (3) include a laminate having at least one layer comprising the syndiotactic propylene polymer (A).

The propylene polymer of the present invention (3) is particularly appropriate for extrusion molded products (films, sheets, etc.), inflation molded products, injection molded products, blow molded products, and fibers, and are particularly appropriate for extrusion molded products, inflation molded products, injection molded products and blow molded products, from the viewpoints of transparency and heat resistance.

The propylene polymer of the present invention (3) is appropriate in, for example, containers or non-woven fabrics. Such container may be exemplified by food containers such as freeze storage containers, and retort pouches, bottle containers and the like. Examples thereof also include medical containers, and infusion bags.

A composition comprising the propylene polymer (A) of the present invention (3) is excellent in moldability and heat resistance, and thus can also be used in the above-described applications (applications of the propylene polymer (A)).

<Propylene-Based Polymer Composition (X1)>

Hereinafter, the present invention (4) will be described in detail.

The propylene-based polymer composition (X1) of the present invention (4) comprises a specific (AA) syndiotactic propylene polymer and a specific (B2) propylene.α-olefin copolymer.

(AA) Syndiotactic Propylene Polymer

The syndiotactic propylene polymer (AA) used in present the invention (4) and in the present inventions (5) and (6) that will be described later may be homopolypropylene or may be a random copolymer of propylene.α-olefin having 2 to 20 carbon atoms (excluding propylene), or may be a propylene block copolymer, if the polymer possesses the following properties, homopolypropylene or a random copolymer of propylene.α-olefin having 2 to 20 carbon atoms (excluding propylene) is preferred. The polymer is particularly preferably homopolypropylene or a copolymer of propylene with ethylene or an α-olefin having 4 to 10 carbon atoms, and homopolypropylene is particularly preferred in view of heat resistance.

Here, the α-olefin having 2 to 20 carbon atoms other than propylene may be exemplified by ethylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, 1-eicosene, or the like. Also, usually, constituent units derived from propylene are contained in an amount of more than 90 mol %, and preferably 91 mol % or more, based on 100 mol % of the total amount of the constituent unit derived from the α-olefin having 2 to 20 carbon atoms (including propylene). In other words, the syndiotactic propylene polymer (AA) of the present invention usually contains constituent units derived from propylene in an amount of more than 90 mol % to 100 mol % or less, and constituent units derived from an α-olefin having 2 to 20 carbon atoms (excluding propylene) in an amount of 0 mol % or more to less than 10 mol % (provided that the sum of amounts of the constituent unit derived from propylene and the constituent unit derived from α-olefin having 2 to 20 carbon atoms (excluding propylene) is 100 mol %), and preferably constituent units derived from propylene in an amount of 91 mol % or more and 100 mol % or less, and constituent units derived from an α-olefin having 2 to 20 carbon atoms (excluding propylene) in an amount of 0 mol % or more and 9 mol % or less.

When the syndiotactic propylene polymer (AA) is a propylene.α-olefin random copolymer, it preferably contains the constituent unit derived from α-olefin having 2 to 20 carbon atoms (excluding propylene) in an amount of 0.3 to 7 mol %, preferably 0.3 to 6 mol %, and more preferably 0.3 to 5 mol %.

The syndiotactic pentad fraction (rrrr fraction, pentad syndiotacticity) of the above-described syndiotactic propylene polymer (AA), as measured by NMR, is 85% or greater, preferably 90% or greater, more preferably 93% or greater, and even more preferably 94% or greater, and a syndiotactic propylene polymer (AA) having an rrrr fraction in this range has excellent moldability, heat resistance and transparency, and have good properties as a crystalline polypropylene, which is preferable. There is no particular limitation on the rrrr fraction, but it is 100% or less, and usually 99% or less, for example.

This syndiotactic pentad fraction (rrrr fraction) is measured as follows.

The rrrr fraction is determined from the absorption intensities of Prrrr (the absorption intensity resulting from the methyl group in the third unit at a site wherein five propylene units are sequentially syndiotactically bonded) and PW (the absorption intensity originating from the entire methyl groups in the propylene units) in the $^{13}$C-NMR spectrum according to the following equation (1):

$$rrrr \text{ fraction } (\%) = 100 \times Prrrr/PW \qquad (1)$$

The NMR measurement is performed, for example, as follows. Specifically, 0.35 g of a sample is dissolved under heating in 2.0 ml of hexachlorobutadiene. This solution is filtered through a glass filter (G2), and then is introduced into an NMR tube having an internal diameter of 10 mm after adding 0.5 ml of deuterated benzene. Then, $^{13}$C-NMR measurement is performed at 120° C. using a GX-500 NMR measuring apparatus manufactured JEOL, Ltd. The accumulation times are 10,000 times or more.

The intrinsic viscosity [η] of the syndiotactic propylene polymer (AA) as measured in decalin at 135° C. is usually 0.1 to 10 dL/g, preferably 0.5 to 10 dL/g, more preferably 0.50 to 8.00 dL/g, even more preferably 0.95 to 8.00 dL/g, particularly preferably in the range of 1.00 to 8.00, more preferably in the range of 1.40 to 8.00 dL/g, and inter alia, preferably in the range of 1.40 to 5.00 dL/g. A syndiotactic propylene polymer (AA) having such intrinsic viscosity [η] value exhibits good flowability and good miscibility with other components, and tends to yield molded products having excellent mechanical strength from the resulting composition.

Furthermore, the melting point (Tm) of the syndiotactic propylene polymer (AA) that can be measured by differential scanning calorimetry (DSC) is 145° C. or higher, preferably 150° C. or higher, more preferably 155° C. or higher, and particularly preferably 156° C. or higher. Although there is no particular upper limit of Tm, it is usually 170° C. or lower, for example. Moreover, the heat of fusion (ΔH) of the syndiotactic propylene polymer (AA) that can be measured by differential scanning calorimetry (DSC) is preferably 40 mJ/mg or higher, more preferably 45 mJ/mg, even more preferably 50 mJ/mg or higher, even more preferably 52 mJ/mg or higher, and particularly preferably 55 mJ/mg or higher.

The measurement of differential scanning calorimetry is performed, for example, in the following manner. About 5.00 mg of a sample is filled in an aluminum pan for exclusive use, and the melting point (Tm) and the heat of fusion (ΔH) is determined from an endothermic curve obtained by heating the sample from 30° C. to 200° C. at a rate of 320° C./min, maintaining at 200° C. for 5 minutes, cooling from 200° C. to 30° C. at a rate of 10° C./min, maintaining again at 30° C. for 5 minutes, and heating again at a rate of 10° C./min, using DSCPyris1 or DSC7 manufactured by PerkinElmer, Inc. If a plurality of peaks are detected during the DSC measurement, the peak detected on the highest temperature side is defined as the melting point (Tm).

A syndiotactic propylene polymer (AA) having the melting point (Tm) in this range has excellent moldability, heat resistance and mechanical properties, and has good properties as a crystalline polypropylene, which is preferable. By establishing the polymerization conditions that will be described later using the catalyst system that will be described later, a syndiotactic propylene polymer (AA) having the melting point within this range can be produced.

The syndiotactic propylene polymer (AA) satisfies, when the isothermal crystallization temperature determined by differential scanning calorimetry (DSC) is designated as $T_{iso}$, and the half-crystallization time at the isothermal crystallization temperature $T_{iso}$ is designated as $t_{1/2}$, the following Equation (Eq-1) in the range of $110 \leq T_{iso} \leq 150$ (° C.):

$$1.67 \times 10^{-4} \exp(0.10 \times T_{iso}) \leq t_{1/2} \leq 5.56 \times 10^{-4} \exp(0.12 \times T_{iso}) \qquad \text{(Eq-1)}$$

preferably satisfies the following equation (Eq-2):

$$1.67 \times 10^{-4} \exp(0.10 \times T_{iso}) \leq t_{1/2} \leq 3.71 \times 10^{-4} \exp(0.12 \times T_{iso}) \qquad \text{(Eq-2)}$$

and more preferably satisfies the following equation (Eq-3):

$$1.67 \times 10^{-4} \exp(0.10 \times T_{iso}) \leq t_{1/2} \leq 2.23 \times 10^{-4} \exp(0.12 \times T_{iso}) \qquad \text{(Eq-3)}$$

The half-crystallization time ($t_{1/2}$) determined by isothermal crystallization measurement is, when the area between the DSC caloric curve and the baseline during the isothermal crystallization process is considered as the total calories, the time taken to reach 50% of the calories [see New Lectures on Polymer Experiments, 8. Properties of Polymers (KYORITSU SHUPPAN CO., LTD.)].

Measurement of the half-crystallization time ($t_{1/2}$) is performed as follows. About 5 mg of a sample is filled in an aluminum pan for exclusive use, and the half-crystallization time is determined from a DSC curve obtained by heating the sample from 30° C. to 200° C. at a rate of 320° C./min, maintaining at 200° C. for 5 minutes, cooling from that temperature (200° C.) to the respective isothermal crystallization temperature at a rate of 320° C./min, and maintaining at that isothermal crystallization temperature, using DSCPyris1 or DSC7 manufactured by PerkinElmer, Inc. Here, the half-crystallization time ($t_{1/2}$) is determined by setting the initial time of the isothermal crystallization process (the time to reach the isothermal crystallization temperature from 200° C.) as t=0. For the syndiotactic propylene polymer of the present invention, $t_{1/2}$ can be determined as described above, but when crystallization does not occur at any isothermal crystallization temperature, for example, at 110° C., then measurement is taken for convenience at several points at an isothermal crystallization temperature at below 110° C., and the half crystallization time ($t_{1/2}$) is determined from the extrapolated value.

A syndiotactic propylene polymer (AA) satisfying the equation (Eq-1) is remarkably excellent in moldability compared to existing syndiotactic propylene polymers. Here, moldability being excellent indicates that in the case of carrying out molding such as injection molding, inflation molding, blow molding, extrusion or press molding, the time taken from the molten state to the solid state is short. Also, such syndiotactic propylene polymer is excellent in molding cycle properties, shape stability, long-term productivity and the like.

By establishing the polymerization conditions that will be described later using the catalyst system that will be described later, a syndiotactic propylene polymer (AA) satisfying the equation (Eq-1) can be produced.

As a preferred embodiment of the syndiotactic propylene polymer (AA) may be exemplified by an embodiment of simultaneously satisfying the following requirement (n-decane-soluble part), in addition to the above-described preferred embodiments (satisfying ΔH≥40 mJ/mg, and satisfying the above equation (Eq-1)).

The amount of the n-decane-soluble part of the syndiotactic propylene polymer (AA) is preferably 1 (wt %) or less, more preferably 0.8 (wt %) or less, and even more preferably 0.6 (wt %) or less. This amount of n-decane-soluble part is an index closely related to the blocking properties of the syndiotactic propylene polymer (AA) or the molded products obtained therefrom, and a smaller amount of n-decane-soluble part usually means a smaller amount of low-crystalline components. That is, a syndiotactic propylene polymer (AA) satisfying the present requirement (n-decane-soluble part) as well has very good anti-blocking properties.

Therefore, one of the most preferred embodiments of the component (AA) is a syndiotactic propylene polymer containing constituent units derived from propylene in an amount of more than 90 mol %, has a syndiotactic pentad fraction (rrrr fraction) of 85% or more as measured by $^{13}$C-NMR, a melting point (Tm) of 145° C. or higher as measured by DSC, and a heat of fusion (ΔH) of 40 mJ/mg or more, satisfies the equation (Eq-1), and has an n-decane-soluble part of 1 wt % or less.

In the production of the syndiotactic polypropylene polymer (AA), the catalyst for polymerization (cat-1) comprising:
(a-3) a bridged metallocene compound represented by the following General Formula [1-3], and
(b) at least one compound selected from:
(b-1) an organoaluminum oxy compound,
(b-2) a compound which reacts with the bridged metallocene compound (a-3) to form an ion pair, and
(b-3) an organoaluminum compound,
or the catalyst for polymerization (cat-2) having the catalyst (cat-1) supported on a particulate support, is suitably used. However, as long as the produced polymer shows properties that satisfy the requirements required from the syndiotactic propylene polymer (AA), the catalyst used in the production of the syndiotactic polypropylene polymer (AA) is not limited to such catalysts.

Details of the component (a-3), component (b-1), component (b-2) and component (b-3) are as described above.

The component (a-3), component (b-1), component (b-2) and component (b-3) may be used after being supported on the particulate support (c), if necessary.

Also, the catalyst for olefin polymerization (3) used in the production of the syndiotactic propylene polymer (AA) may contain the organic compound component (d) if necessary, along with the respective components.

Details of the component (c) and component (d) are as described above.

Method for Producing Syndiotactic Propylene Polymer (AA)

During the polymerization, the method of using each component, and the order of addition are arbitrarily selected, but the following methods may be mentioned as the methods of polymerization.

(1) Method of adding the component (a-3) alone into the polymerization vessel.

(2) Method of adding the component (a-3) and component (b) into the polymerization vessel in an arbitrary order.

(3) Method of adding a catalyst component in which the component (a-3) is supported on the support (c), and the component (b) into the polymerization vessel in an arbitrary order.

(4) Method of adding a catalyst component in which the component (b) is supported on the support (c), and the component (a-3) into the polymerization vessel in an arbitrary order.

(5) Method of adding a catalyst component in which the component (a-3) and the component (b) are supported on the support (c) into the polymerization vessel.

According to the respective methods of (2) to (5) described above, at least two or more of the catalyst components may be brought into contact in advance.

In the respective methods of (4) and (5) described above using supported component (b), unsupported component (b) may be added in any order, as necessary. In this case, the component (b) may be identical or different.

Furthermore, the solid catalyst component having the component (a-3) supported on the component (c), and the solid catalyst component having the component (a-3) and component (b) supported on the component (c) may have the olefin prepolymerized, or the prepolymerized solid catalyst component may further have the catalyst component supported thereon.

The syndiotactic propylene polymer (AA) can be obtained by polymerizing or copolymerizing propylene and at least one olefin selected from α-olefins having 2 to 20 carbon atoms (excluding propylene) in the presence of the catalyst for olefin polymerization as described above.

Polymerization can be carried out by any of liquid phase polymerization method such as a solution polymerization, suspension polymerization or the like, and a gas phase polymerization method. As the inert hydrocarbon medium used in the liquid phase polymerization method, specifically aliphatic hydrocarbons such as propane, butane, pentane, hexane, heptane, octane, decane, dodecane, kerosene and the like; alicyclic hydrocarbons such as cyclopentane, cyclohexane, methylcyclopentane and the like; halogenated hydrocarbons such as ethylene chloride, chlorobenzene, dichloromethane and the like, or mixtures thereof may be mentioned, and the olefin to be polymerized may also be used per se as the solvent.

When polymerization of propylene and at least one olefin selected from α-olefins having 2 to 20 carbon atoms (excluding propylene) is performed using the catalyst for olefin polymerization as described above, the component (a-3) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio of the component (b-1) and the total transition metal atoms (M) in the component (a-3) [(b-1)/M] is usually 0.01 to 5000, and preferably 0.05 to 2000. The component (b-2) is used in an amount such that the molar ratio of the component (b-2) and the transition metal atoms (M) in the component (a-3) [(b-2)/M] is usually 1 to 10, and preferably 1 to 5. The component (b-3) is used in an amount such that the molar ratio of the aluminum atoms in the component (b-3) and the total transition metal (M) in the component (a-3) is usually 10 to 5000, and preferably 20 to 2000.

The component (d) is used, in the case where the component (b) is component (b-1), in an amount such that the molar ratio [(d)/(b-1)] is usually 0.01 to 10, and preferably 0.1 to 5; in the case where the component (b) is component (b-2), in an amount such that the molar ratio [(d)/(b-2)] is usually 0.01 to 10, and preferably 0.1 to 5; in the case where the component (b) is component (b-3), the molar ratio [(d)/(b-3)] is usually 0.01 to 2, and preferably 0.005 to 1.

The temperature for olefin polymerization using the catalyst for olefin polymerization is generally within the range from −50 to +200° C., and preferably from 0 to 170° C. The polymerization pressure is under the condition of generally from normal pressure to 10 MPa gauge pressure, and preferably from normal pressure to 5 MPa gauge pressure, and the polymerization reaction can be carried out either batchwise, semicontinuously or continuously. The polymerization can be carried out by dividing the process into two or more stages having different reaction conditions. The molecular weight of the resulting propylene polymer can be also regulated by allowing hydrogen to exist in the polymerization system or by varying the polymerization temperature. Moreover, the molecule weight can be regulated according to the amount of the component (b) used. When adding hydrogen, the suitable amount to be added is from about 0.001 to 100 NL per 1 kg of olefin.

The olefin supplied to the polymerization reaction is one or more olefins selected from α-olefins having 2 to 20 carbon atoms (excluding propylene). The α-olefin having 4 to 20 carbon atoms is a straight-chained or branched α-olefin having 4 to 20 carbon atoms, preferably 4 to 10 carbon atoms, and for example, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene and the like may be mentioned.

(B2) Propylene.α-Olefin Copolymer

The propylene.α-olefin copolymer (B2) is a propylene.α-olefin copolymer containing constituent units derived from propylene in an amount of 55 to 90 mol %, and constituent units derived from at least one olefin selected from α-olefins having 2 to 20 carbon atoms (excluding propylene) in an amount of 10 to 45 mol %, has an MFR in the range of 0.01 to 100 g/min as measured according to JIS K-6721 at 230° C. under a load of 2.16 kg, and is characterized in satisfying at least one of the following requirements (b-1) and (b-2):

(b-1): the syndiotactic triad fraction (rr fraction) as measured by $^{13}$C-NMR is 60% or greater, and (b-2): the intrinsic viscosity [η] (dL/g) as measured in decalin at 135° C. and the MFR (g/10 min, 230° C., under a load of 2.16 kg) satisfy the following relationship.

$$1.50 \times MFR^{(-0.20)} \leq [\eta] \leq 2.65 \times MFR^{(-0.20)}$$

The propylene.α-olefin copolymer (B2) contains constituent units derived from propylene in an amount of 50 to 95 mol %, and constituent units derived from an α-olefin having 2 to 20 carbon atoms (excluding propylene) in an amount of 10 to 45 mol %.

In the case of using in the present invention (4), when the syndiotactic propylene polymer (AA) is used in an amount of 50 parts by weight based on 100 parts by weight of the sum of amounts of (AA) and (B2), the polymer contains constituent units derived from propylene in an amount of 55 to 90 mol %, preferably in an amount of 55 to 85 mol %, and more preferably in an amount of 60 to 85 mol %, and constituent units derived from an α-olefin having 2 to 20 carbon atoms (excluding propylene) in an amount of 10 to 45 mol %, preferably 15 to 45 mol %, and more preferably 15 to 40 mol %.

When used in the present invention (4), in the case where the syndiotactic propylene polymer (AA) is present in an amount of less than 50 parts by weight based on 100 parts by weight of the sum of amounts of (AA) and (B2), the propylene.α-olefin copolymer (B2) contains a constituent derived from propylene in an amount of 55 to 90 mol %, preferably in an amount of 65 to 85 mol %, and more preferably in an amount of 70 to 85 mol %, and constituent units derived from an α-olefin having 2 to 20 carbon atoms (excluding propylene) in an amount of 10 to 45 mol %, preferably 15 to 35 mol %, and more preferably 15 to 30 mol %.

Here, the sum of amounts of the constituent unit derived from propylene and the constituent unit derived from an α-olefin having 2 to 20 carbon atoms (excluding propylene) is 100 mol %.

In addition, the α-olefin having 2 to 20 carbon atoms (excluding propylene) may be exemplified by ethylene, 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene, 1-eicosene or the like. In particular, ethylene, 1-butene, 1-hexene, 4-methyl-1-pentene and 1-octene are preferred.

Among the propylene.α-olefin copolymers (B2) as described above, a propylene-ethylene copolymer is one of preferred embodiments.

Also, among the propylene.α-olefin copolymers (B2) as described above, a propylene.ethylene.HAO copolymer comprising constituent units derived from propylene, constituent units derived from ethylene, and constituent units derived from any one of 1-butene, 1-hexene, 4-methyl-1-pentene and 1-octene (may be referred to as HAO comonomer), wherein the proportion of the constituent unit derived from ethylene is larger than the proportion of the constituent unit derived from the HAO comonomer, is one of preferred embodiments.

Furthermore, for the propylene.ethylene copolymer or the propylene.ethylene.HAO copolymer, which are polymers of the preferred scope, those satisfying both (b-1) and (b-2) described above.

The propylene.α-olefin copolymer (B2) preferably has an MFR in the range of 0.01 to 100 g/10 min, and more preferably in the range of 0.02 to 100 g/10 min, as measured according to JIS K-6721 at 230° C. under a load of 2.16 kg.

The propylene.α-olefin copolymer (B2) satisfies at least one of (b-1) and (b-2) below;

(b-1): The syndiotactic triad fraction (rr fraction, triad syndiotacticity) as measured by $^{13}$C-NMR is 60% or greater; and (b-2): The intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

First, the requirement (b-1) will be explained.

(b-1): The syndiotactic triad fraction (rr fraction, triad syndiotacticity) of the propylene.α-olefin copolymer (B2) as measured by $^{13}$C-NMR is 60% or greater, preferably 70% or greater, and more preferably 75% or greater, and a propylene.α-olefin copolymer (B2) having the rr fraction in this range has good compatibility with the syndiotactic propylene polymer (AA), which is preferable.

A polymer satisfying (b-1) can be obtained, for example, by copolymerizing propylene and an α-olefin in the presence of a catalyst capable of producing syndiotactic polypropylene, and may also be produced using, for example, a catalyst as will be described later.

The rr fraction is determined from the absorption intensities of Prr (absorption intensity resulting from the methyl group of the second unit at a site of 3 propylene units being sequentially syndiotactically bound) and Pw (absorption intensity resulting from the total methyl groups of propylene units) in the $^{13}$C-NMR spectrum, by the following formula (2).

$$rr \text{ fraction } (\%) = 100 \times Prr/Pw \qquad (2)$$

Here, when the absorption resulting from mr (the absorption resulting from at least both the syndiotactic bonding and isotactic bonding among the 3 propylene units; used in the determination of Pmr (absorption intensity)), the absorption resulting from rr (the absorption resulting from the methyl group of the second unit at a site of 3 propylene units being sequentially syndiotactically bound; used in the determination of Prr (absorption intensity)), or the absorption resulting from mm (the absorption resulting from the methyl group of the second unit at a site of 3 propylene units being sequentially isotactically bound; used in the determination of Pmm (absorption intensity)) overlaps the absorption resulting from the comonomer, the value is directly calculated without subtracting the contribution of the comonomer component.

Specifically, in the description of the method for determining the "syndiotacticity parameter (SP value)" described in from [0018] to [0031] of JP-A No. 2002-097325, the procedure from [0018] to [0023] is performed, and the value is determined by calculating from the integrated intensities of the signals from the first region, the second region and the third region, by the above formula (2).

Also, in the present invention (4), particularly the $rr_1$ value, specifically, the value determined by the method for determining the "syndiotacticity parameter (SP value)" described in from [0018] to [0031] of JP-A No. 2002-097325, is preferably 60% or greater, more preferably 65% or greater, and even more preferably 70% or greater. In the calculation of the $rr_1$ value, that is, of the rr value, when the absorption resulting from mr (the absorption resulting from at least both the syndiotactic bonding and isotactic bonding among the 3 propylene units; used in the determination of Pmr (absorption intensity)), the absorption resulting from rr (the absorption resulting from the methyl group of the second unit at a site of 3 propylene units being sequentially syndiotactically bound; used in the determination of Prr (absorption intensity)), or the absorption resulting from mm (the absorption resulting from the methyl group of the second unit at a site of 3 propylene units being sequentially isotactically bound; used in the determination of Pmm (absorption intensity)) overlaps the absorption resulting from the comonomer, subtraction of the contribution of the comonomer component has been taken into account.

The measurement of the rr value and $rr_1$ value is, for example, carried out in the following manner. Specifically, 0.35 g of a sample is heated to melt in 2.0 ml of hexachlorobutadiene. This solution is filtered through a glass filter (G2), subsequently, 0.5 ml of deuterated benzene is added, and the mixture is placed in an NMR tube having an internal diameter of 10 mm. Then, $^{13}$C-NMR measurement is performed at 120° C. using a GX-500 type NMR measuring apparatus manufactured by JEOL, Ltd. The accumulation times are 8,000 or greater.

Next, the requirement (b-2) will be explained.

(b-2): The propylene.α-olefin copolymer (B2) is such that the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

more preferably, $$1.80 \times MFR^{(-0.20)} \leq [\eta] \leq 2.50 \times MFR^{(-0.19)}$$

A propylene.α-olefin copolymer (B2) satisfying these relationships has good compatibility with the syndiotactic propylene polymer (AA), and thus is preferable.

The propylene.α-olefin copolymer (B2) satisfying the above expressions can be obtained, for example, by copolymerizing propylene with an α-olefin with a catalyst capable of producing syndiotactic polypropylene, and may be produced, for example, using a catalyst as will be described later. Such materials are highly compatible with the syndiotactic propylene polymer (AA), which is preferable.

A propylene.α-olefin copolymer satisfying (b-2) has the same [η] and a larger MFR compared to conventionally isotactic propylene-based copolymers.

It is conceived that as described in Macromolecules, 31, 1335-1340 (1998), this is attributable to the difference between the entanglement molecular weight (reported as Me=6900 (g/mol) in the article) of isotactic polypropylene and the entanglement molecular weight of syndiotactic polypropylene (reported as Me=2170 (g/mol) in the article). That is, it is conceived that at the same [η], having a syndiotactic structure leads to a larger number of entanglements and larger MFR compared to a material having an isotactic structure.

As described above, the (B2) propylene.α-olefin copolymer satisfying at least one of (b-1) and (b-2) is a polymer having different stereoregularity from the propylene.α-olefin copolymer having an isotactic structure, and is thought to have a syndiotactic structure. Therefore, the propylene.α-olefin copolymer (B2) is believed to have good compatibility with the component (AA).

The intrinsic viscosity [η] of the propylene.α-olefin copolymer (B2) as measured in decalin at 135° C. is preferably 0.1 to 10 dL/g, more preferably 0.5 to 10 dL/g, and even more preferably 0.5 to 7.0 dL/g.

This propylene.α-olefin copolymer (B2) preferably has a degree of crystallization of 20% or less, and more preferably 0 to 15%, as measured by X-ray diffraction.

It is preferable that this propylene.α-olefin copolymer (B2) has a single glass transition temperature, and the glass transition temperature (Tg) obtained by the measurement of differential scanning calorimeter (DSC) is usually 0° C. or less. If the glass transition temperature (Tg) of the propylene.α-olefin copolymer (B2) is within the above-described range, the cold resistance and low temperature properties are excellent.

Differential scanning calorimetric measurement is performed, for example, in the following manner. About 10.00 mg of a sample is filled in an aluminum pan for exclusive use, and the glass transition temperature (Tg) is determined from a endothermal curve obtained by heating the sample from 30° C. to 200° C. at a rate of 200° C./min, maintaining at 200° C. for 5 minutes, cooling 200° C. to −100° C. at a rate of 10° C./min, maintaining at −100° C. for 5 minutes, and then heating at a rate 10° C./min, using DSCRDC220 manufactured by Seiko Instruments, Inc.

Also, the molecular weight distribution of this propylene.α-olefin copolymer (B2) as measured by GPC (Mw/Mn, relative to polystyrene, Mw: weight average molecular weight, Mn: number average molecular weight) is preferably 3.5 or less, more preferably 3.0 or less, and even more preferably 2.5 or less.

The propylene.α-olefin copolymer (B2) can be produced by polymerizing propylene, and at least one monomer selected from α-olefins having 2 to 20 carbon atoms (excluding propylene), in the presence of a catalyst for olefin polymerization comprising:

(a-2) a bridged metallocene compound represented by the following Formula [1-2], (b) at least one compound selected from:

(b-1) an organoaluminum oxy compound, (b-2) a compound which reacts with the bridged metallocene compound (a-2) to form an ion pair, and (b-3) an organoaluminum compound, But as long as the polymer satisfies the requirements as the propylene.α-olefin copolymer (B2), the method for production is not limited to this.

[1-2]

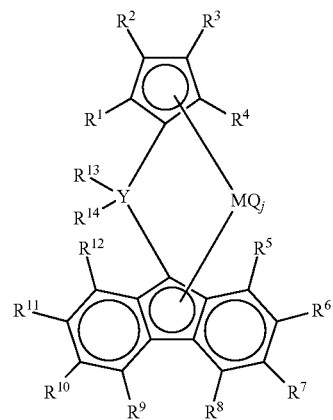

wherein in Formula [1-2], $R^1$, $R^2$, $R^3$, $R^4$, $R^8$, $R^9$ and $R^{12}$, which may be identical to or different from each other, are each an atom or a group selected from a hydrogen atom, a hydrocarbon group and a silicon-containing group;

$R^6$ and $R^{11}$ are the same atoms or same groups selected from a hydrogen atom, a hydrocarbon group and a silicon-containing group;

$R^7$ and $R^{10}$ are the same atoms or same groups selected from a hydrogen atom, a hydrocarbon group and a silicon-containing group;

all of $R^6$, $R^7$, $R^{10}$ and $R^{11}$ cannot be simultaneously hydrogen atoms;

$R^2$ and $R^3$ may be linked to each other to form a ring; among $R^5$ to $R^{12}$, adjacent groups may be linked to each other to form a ring;

$R^{13}$ and $R^{14}$, which may be identical to and different from each other, are each selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms;

at least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms;

M is Ti, Zr or Hf;

Y is carbon or silicon;

Q is selected from a halogen, a hydrocarbon group, a neutral, conjugated or non-conjugated diene having 10 or fewer carbon atoms, an anion ligand, and a neutral ligand capable of coordination with a lone electron pair, in identical or different combinations; and j is an integer from 1 to 4.

Hereinafter, specific examples of the bridged metallocene compound represented by the General Formula [1-2] will be given, but the scopes of the present invention (4) and the present invention (5) that will be described later are not intended to be particularly limited thereby. Herein, octamethyloctahydrodibenzofluorene refers to a structure represented by Formula [10], octamethyltetrahydrodicyclopentafluorene refers to a structure represented by Formula [11], and dibenzofluorene refers to a structure represented by Formula [12].

[10]
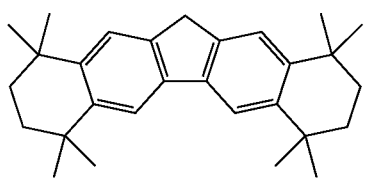

[11]
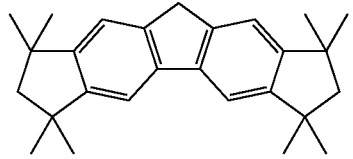

[12]
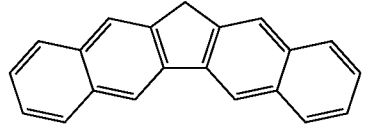

Specific examples of this bridged metallocene compound (a-2) include the bridged metallocene compound (a-2a) elucidated in the description of the present invention (2).

Furthermore, a compound resulting from replacing the "zirconium" of the compound described above with "hafnium" or "titanium", as well as a metallocene compound having "difluoride", "dibromide" or "diiodide" instead of "dichloride", or having "dimethyl" or "methylethyl" instead of "dichloride", and the like are also likewise the metallocene compound represented by General Formula [1-2].

The bridged metallocene compound (a-2) described above can be produced by referring to known methods. As the known method for production, for example, the method for production described in the pamphlet of WO 04/029062 filed by the present Applicant may be mentioned.

The metallocene compound as described above can be used individually or in combination of two or more species.

As the organoaluminum oxy compound (b-1) used in the production of the propylene.α-olefin copolymer (B2), the same compound as the organoaluminum oxy compound (b-1) used in the production of the syndiotactic propylene polymer (AA) described above, is used.

As the compound (b-2) reacting with the bridged metallocene compound (a-2) to form an ion pair used in the production of the propylene.α-olefin copolymer (B2), the same compound as the compound (b-2) reacting with the bridged metallocene compound (a-2) to form an ion pair used in the production of the syndiotactic propylene polymer (AA) described above, is used.

As the organoaluminum compound (b-3) used in the production of the propylene.α-olefin copolymer (B2), the same compound as the organoaluminum compound (b-3) used in the production of the syndiotactic propylene polymer (AA), is used.

The component (a-3), component (b-1), component (b-2) and component (b-3) may be used after being supported on the particulate support (c), if necessary.

Method for Producing Propylene.α-Olefin Copolymer (B2)

During polymerization of the propylene.α-olefin copolymer (B2), the method of using each component, and the order of addition are arbitrarily selected, but the following method may be mentioned.

Method of adding the component (a-2) and component (b) into the polymerization vessel in an arbitrary order.

According to the method described above, at least two or more of the catalyst components may be brought into contact in advance.

When polymerization of olefin is performed using the catalyst for olefin polymerization as described above, the component (a-2) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio of the component (b-1) and the total transition metal atoms (M) in the component (b-1) and the component (a-2) [(b-1)/M] is usually 0.01 to 5000, and preferably 0.05 to 2000. The component (b-2) is used in an amount such that the molar ratio of the aluminum atoms in the component (b-2) and the total transition metal (M) in the component (a-2) [(b-2)/M] is usually 1 to 1,000, and preferably 1 to 500. The component (b-3) is used in an amount such that the molar ratio of the component (b-3) and the transition metal atoms (M) in the component (b-3) and the component (a-2) [(b-3)/M] is usually 1 to 10,000, and preferably 1 to 5,000.

For the propylene.α-olefin copolymer (B2), propylene and at least one olefin selected from α-olefins having 2 to 20 carbon atoms (excluding propylene) are usually copolymerized in the liquid phase in the presence of the catalyst for olefin polymerization as described above. Here, hydrocarbon solvents are generally used, but α-olefins may also be used as the solvent. As the hydrocarbon medium, the same compounds as those described above may be specifically mentioned. Copolymerization can be performed in any mode such as batch mode or continuous mode.

Examples of the α-olefin that can be used in polymerization include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene and the like. The α-olefin can be used alone, or in combination of two or more species.

When performing copolymerization in batch mode using the catalyst for olefin polymerization, the concentration of the metallocene compound in the polymerization system used is usually 0.00005 to 1 millimoles, and preferably 0.0001 to 0.50 millimoles, per 1 liter of the polymerization volume.

Furthermore, the reaction time (average residence time in the case of performing copolymerization in the continuous mode) may vary depending on the conditions such as catalyst concentration, polymerization temperature and the like, but it is usually 5 minutes to 3 hours, and preferably 10 minutes to 1.5 hours.

The propylene and the at least one monomer selected α-olefins having 2 to 20 carbon atoms (excluding propylene) are respectively supplied in an amount such that a propylene.α-olefin copolymer (B2) of specific composition can be obtained as described above. Upon copolymerization, a molecular weight adjusting agent such as hydrogen can also be used.

When propylene and at least one olefin selected from α-olefins having 2 to 20 carbon atoms (excluding propylene) are copolymerized as described above, the propylene.α-olefin copolymer (B2) is usually obtained as a polymerization solution containing the same. This polymerization solution is treated according to conventional methods to obtain the propylene.α-olefin copolymer (B2).

The copolymerization reaction is usually performed under the conditions of a temperature of 40° C. to 200° C., preferably 40° C. to 180° C., and more preferably 50° C. to 150° C., and of a pressure of greater than 0 to 10 MPa, preferably 0.5 to 10 MPa, and more preferably 0.5 to 7 MPa.

Propylene-Based Polymer Composition (X1)

The propylene-based polymer composition (X1) of the present invention (4) contains:

(AA) 10 to 95 parts by weight, preferably 15 to 90 parts by weight, of the syndiotactic propylene polymer, and (B2) 90 to 5 parts by weight, preferably 85 to 10 parts by weight, of the propylene.α-olefin copolymer (provided that the sum of amounts of (AA) and (B2) is 100 parts by weight).

Within this range, a propylene-based polymer composition having excellent moldability and heat resistance, as well as excellent transparency, flexibility and scratch resistance, is obtained, which is preferable.

Also, if a material having high heat resistance, high rigidity and excellent impact resistance is needed, the composition preferably contains 50 parts by weight or more and 95 parts by weight or less, more preferably 55 parts by weight or more and 90 parts by weight or less, of the syndiotactic propylene polymer (AA), and 5 parts by weight or more and 50 parts by weight or less, more preferably 10 parts by weight or more and 45 parts by weight or less, of the propylene.α-olefin copolymer (B2) (here, the sum of amounts of (AA) and (B2) is 100 parts by eight) (composition (X1i)).

When a material having excellent flexibility and rubber elasticity is needed, the composition preferably contains 10 parts by weight or more to less than 50 parts by weight, more preferably 10 parts by weight or more and 49 parts by weight or less, and even more preferably 15 to 45 parts by weight, of the syndiotactic propylene polymer (AA), and preferably more than 50 parts by weight and 90 parts by weight or less, more preferably 51 parts by weight or more and 90 parts by weight or less, and even more preferably 55 to 85 parts by weight, of the propylene.α-olefin copolymer (B2) (composition (X1ii)).

The composition of the present invention (4) has particularly excellent moldability and heat resistance, and also excellent transparency, flexibility and scratch resistance.

Here, moldability being excellent indicates that in the case of carrying out molding such as injection molding, inflation molding, blow molding, extrusion or press molding, the time taken from the molten state to the solid state is short. Also, such syndiotactic propylene polymer is excellent in molding cycle properties, shape stability, long-term productivity and the like.

Specifically, the time to solidification is such that the half-crystallization time ($t_{1/2}$) during the isothermal crystallization measurement at 110° C. as determined by differential scanning calorimetry (DSC) is in the range of 1000 sec or less, and more preferably 500 sec or less. Also, the half-crystallization time ($t_{1/2}$) determined from the isothermal crystallization measurement at 110° C. as determined by differential scanning calorimetry (DSC) may be referred to as property (1). The composition of the present invention (4) has remarkably improved $t_{1/2}$, compared to prior art, by containing specific components (AA) and (B2), and for example, can be molded without difficulties by generally used molding methods for isotactic polypropylene.

The half-crystallization time ($t_{1/2}$) determined by isothermal crystallization measurement is, when the area between the DSC caloric curve and the baseline during the isothermal crystallization process is considered as the total calories, the time taken to reach 50% of the calories [see New Lectures on Polymer Experiments, 8. Properties of Polymers (KYORITSU SHUPPAN CO., LTD.)]. Measurement of the half-crystallization time ($t_{1/2}$) is performed as follows. About 5.00 mg of a sample is filled in an aluminum pan for exclusive use, and the half-crystallization time is determined from a DSC curve obtained by heating the sample from 30° C. to 200° C. at a rate of 320° C./min, maintaining at 200° C. for 5 minutes, cooling from that temperature (200° C.) to the isothermal crystallization temperature of 110° C. at a rate of 320° C./min, and maintaining the temperature at 110° C., using DSCPyris1 or DSC7 manufactured by PerkinElmer, Inc. Here, the half-crystallization time ($t_{1/2}$) is determined by setting the initial time of the isothermal crystallization process (the time to reach the isothermal crystallization temperature of 110° C. from 200° C.) as t=0. For the composition of the present invention (4), $t_{1/2}$ can be determined as described above, but when crystallization does not occur at any isothermal crystallization temperature, for example, at 110° C., then measurement is taken for convenience at several points at an isothermal crystallization temperature at or below 110° C., and the half crystallization time ($t_{1/2}$) is determined from the extrapolated value.

The needle penetration temperature (hereinafter, may also be referred to as property (2)) measured for the propylene-based polymer composition (X1) described above is 145° C. or higher, more preferably 147° C. or higher, and particularly preferably 150° C. or higher.

The needle penetration temperature (may be referred to as softening temperature which is determined by TMA) can be measured as follows.

Using SS-120 manufactured by Seiko Co., Ltd. or Q-400 manufactured by TA Instrument, and using a specimen of press sheet having a thickness of 1 mm, a pressure of 2 kgf/cm² is applied with a planar indentor of 1.8 mm φ at a rate of temperature increase of 5° C./min, and the needle penetration temperature (° C.) is determined from the TMA curve.

Furthermore, methods for measurement of the Izod impact strength (may also be referred to as property (3)), tensile modulus (may also be referred to as property (4)), and haze (may also be referred to as property (5)) will be described below.

For the Izod impact strength, a specimen of 12.7 mm (width)×3.2 mm (thickness)×64 mm (length) is punched from a press sheet having a thickness of 3 mm, a notch is inserted by machine processing, and the Izod impact strength is measured at 0° C. An average of three measurements was taken as the value.

For the tensile modulus, a press sheet having a thickness of 1 mm was punched for No. JIS3 dumbbell according to JIS K6301, and the specimen was provided as evaluation sample. The measurement was performed, for example, by measuring the tensile modulus using a tensile tester Inston 1123 manufactured by Instron, Inc. at a span interval of 30 mm and a tensile rate of 30 mm/min at 23° C., and an average value of 3 measurements was taken as the value.

Using a specimen from a press sheet having a thickness of 1 mm, the internal haze was measured with a digital turbidimeter "NDH-2OD" manufactured by Nippon Denshoku Industries Co., Ltd., and an average of 2 measurements was taken as the value.

Also, for the description above, in the respective tests, specimens were obtained by producing a sheet having a pre-determined thickness by residual pre-heating the sample at 200° C. for 5 minutes to 10 minutes in a press molding machine, subsequently molding the sheet for 1 to 2 minutes under a pressure of 10 MPa, and then cooling the sheet at 20° C. under a pressure of 10 MPa.

In the case of the composition (X1i), as the α-olefin having 2 to 20 carbon atoms (excluding propylene) of the propylene.α-olefin copolymer (B2), ethylene, or a combination of ethylene and a HAO comonomer is preferred, and ethylene is particularly preferred. Also, the constituent unit derived from an α-olefin is more preferably contained in an amount of 15 mol % to 45 mol %, and particularly preferably 15 to 40 mol %. Within this range, a composition having particularly excellent heat resistance, transparency and impact resistance is obtained.

In the case of the composition (X1i), the half-crystallization time (1) is preferably 1000 sec or less, and more preferably 500 sec or less; the needle penetration temperature (2) is preferably 145° C. or higher, and more preferably 147° C. or higher; the Izod impact strength (3) is preferably 50 J/m or greater, and more preferably 100 J/m; the tensile modulus (4) is preferably in the range of 100 MPa to 2000 MPa, more preferably in the range of 200 MPa to 1500 MPa, and even more preferably in the range of 400 MPa to 1000 MPa; and the internal haze (5) is preferably 50% or less, and more preferably 40% or less.

In the case of the composition (X1i), it is preferable that at least one or more of the properties among (1) to (5) satisfy the preferred ranges; it is more preferable that the composition satisfies (1) or (2); it is even more preferable that the composition either simultaneously satisfies (1), (3) and (4), or simultaneously satisfies (2), (3) and (4), or simultaneously satisfies (3), (4) and (5); and it is even more preferable that the composition simultaneously satisfies (2), (3), (4) and (5); and it is particularly preferable that the composition satisfies all of (1), (2), (3), (4) and (5).

Furthermore, in the case of the composition (X1ii), the syndiotactic propylene polymer (AA) is preferably contained in an amount of 10 parts by weight or more to less than 50 parts by weight, more preferably 10 parts by weight or more and 49 parts by weight or less, and even more preferably 15 parts by weight or more and 45 parts by weight or less; while the propylene.α-olefin copolymer (B2) is preferably contained in an amount of more than 50 parts by weight to 90 parts by weight or less, more preferably 51 to 90 parts by weight, and even more preferably 55 to 85 parts by weight.

In this case, as the α-olefin having 2 to 20 carbon atoms (excluding propylene) of the propylene.α-olefin copolymer (B2), ethylene, or a combination of ethylene and a HAO comonomer is preferred, and ethylene is particularly preferred. Also, the constituent unit derived from an α-olefin is more preferably contained in an amount of 10 mol % to 45 mol %, even more preferably 15 to 35 mol %, and particularly preferably 15 to 30 mol %. Within this range, a composition having particularly excellent heat resistance, transparency and impact resistance is obtained.

In the case of the composition (X1ii), the half-crystallization time (1) is preferably 1000 sec or less, and more preferably 500 sec or less; the needle penetration temperature (2) is preferably 145° C. or higher, and more preferably 147° C. or higher; the Izod impact strength (3) is preferably 100 J/m or greater, and more preferably 200 J/m; the tensile modulus (4) is in the range of 1 MPa to 400 MPa, more preferably in the range of 1 MPa to 200 MPa, and even more preferably 1 MPa to 100 MPa; and the internal haze (5) is 30 or less, and more preferably 25 or less.

In the case of the composition (X1ii), it is preferable that at least one or more properties among (1), (2), (4) and (5); it is more preferable that (1) or (2) satisfies the preferred range; it is even more preferable that the composition either simultaneously satisfies (1) and (4), or simultaneously satisfies (2) and (4), or simultaneously satisfies (4) and (5); it is even more preferable that the composition either simultaneously satisfies (1), (4) and (5), or simultaneously satisfies (2), (4) and (5); and it is particularly preferable that the composition satisfies all of (1), (2), (4) and (5).

Also, in the case of the composition (X1ii), the residual deformation after 200% stretching is preferably 50(%) or less, and more preferably 40(%) or less. The gross rate of change before and after the Japan Society for the Promotion of Science type abrasion test is preferably 40(%) or less, and more preferably 30(%) or less. Within this range, a composition having heat resistance, transparency, flexibility, scratch resistance and rubber elasticity is obtained.

The propylene-based polymer composition (Y) of the present invention (4) comprises:

99.7 to 70 mol % of constituent units derived from propylene, and 0.3 to 30 mol % of constituent units derived from an α-olefin having 2 to 20 carbon atoms (excluding propylene) (here, the constituent unit derived from an α-olefin having 2 to 20 carbon atoms (including propylene) is 100 ml %), and has:

(2) a needle penetration temperature of 145° C. or higher, and preferably 147° C. or higher;

(3) an Izod impact strength of 50 J/m or larger, and preferably 100 J/m;

(4) a tensile modulus of in the range of 100 MPa to 2,000 MPa, and preferably in the range of 200 MPa to 1,500 MPa; and (5) an internal haze value of 50% or less, and preferably 40% or less.

The term "composition" with regard to this propylene-based polymer composition (Y) refers to a composition having at least a 23° C. decane-soluble part and a 23° C. decane-insoluble part, and 2 parts by weight or more and 98 parts by weight or less of the 23° C. decane-soluble part, and 2 parts by weight or more and 98 parts by weight or less of the 23° C. decane-insoluble part.

Here, in the case of the composition (Y), the decane-soluble part is in the range of 5 to 55 parts by weight, and preferably in the range of 5 to 50 parts by weight. Also, the syndiotactic pentad fraction (rrrr fraction) of the decane-insoluble part is 85% or greater, and the melting point (Tm) determined by DSC is 145° C. or higher.

The measurement of the amount of n-decane-soluble component is performed by adding and dissolving about 3 g of the composition in 450 ml of n-decane at 145° C., subsequently cooling the solution to room temperature, removing the n-decane-insoluble part by filtration, and recovering the n-decane-soluble part from the filtrate.

The constituent unit derived from propylene is more preferably contained in an amount of 99.7 to 75 mol %, and the constituent unit derived from α-olefin is more preferably contained in an amount of 0.3 to 25 mol %.

As the α-olefin, it is more preferable that at least ethylene is contained, and it is even more preferable that only ethylene is contained.

This composition can be produced, for example, by blending the components that can constitute the composition (X1i) in the propylene-based polymer composition (X1) described above.

Another propylene-based polymer composition (Z) of the present invention (4) comprises 95 to 55 mol %, preferably 95 to 60 mol %, of constituent units derived from propylene, and 5 to 45 mol %, and preferably 5 to 40 mol %, of constituent units derived from an α-olefin having 2 to 20 carbon atoms (excluding propylene) (here, the constituent unit derived from an α-olefin having 2 to 20 carbon atoms (including propylene) is 100 ml %), and has:

(2) a needle penetration temperature of 145° C. or higher, and preferably 147° C. or higher;

(3) a tensile modulus of in the range of 1 to 400 MPa, and preferably 1 to 200 MPa; and (5) an internal haze value of 40% or less, and preferably 30% or less. Here, the term "composition" with regard to the propylene-based polymer composition (Z) refers to a composition having at least a 23° C. decane-soluble part and a 23° C. decane-insoluble part, and 2 parts by weight or more and 98 parts by weight or less of the 23° C. decane-soluble part, and 2 parts by weight or more and 98 parts by weight or less of the 23° C. decane-insoluble part.

Here, in the case of the composition (Z), the decane-soluble part is in the range of 50 to 95 parts by weight, and preferably in the range of 50 to 90 parts by weight. Also, the syndiotactic pentad fraction (rrrr fraction) of the decane-insoluble part is 85% or greater, and the melting point (Tm) determined by DSC is 145° C. or higher.

This composition can be produced, for example, by blending the components that can constitute the composition (X1ii) in the propylene-based polymer composition (X1) described above.

Graft Modification

With regard to any of the propylene-based polymer composition (X1), propylene-based polymer composition (Y) and propylene-based polymer composition (Z) of the present invention (4), at least a part or the entirety of the propylene-based polymer composition as described above may be graft modified with a polar monomer.

In the case of the propylene-based polymer composition (X1), for example, a part or all of the component (AA) may be graft modified, a part or all of the component (B2) may be graft modified, and a part or all of each of the component (AA) and component (B2) may be graft modified.

This polar monomer may be exemplified by a hydroxyl group-containing ethylenic unsaturated compound, an amino group-containing ethylenic unsaturated compound, an epoxy group-containing ethylenic unsaturated compound, an aromatic vinyl compound, an unsaturated carboxylic acid or a derivative thereof, a vinyl ester compound, vinyl chloride, a carbodiimide compound, or the like.

As the polar monomer, in particular, the unsaturated carboxylic acid or its derivatives are particularly preferred. As the unsaturated carboxylic acid or its derivatives, an unsaturated compound having at least one carboxylic acid group, an ester of a compound having a carboxylic acid group and an alkyl alcohol, an unsaturated compound having at least one anhydrous carboxylic acid group, or the like, and as the unsaturated group, a vinyl group, a vinylene group, an unsaturated cyclic hydrocarbon group, or the like.

Specific examples of the compound include unsaturated carboxylic acids such as acrylic acid, maleic acid, fumaric acid, tetrahydrophthalic acid, itaconic acid, citraconic acid, crotonic acid, isocrotonic acid, Nadic acid [trade name] (endocis-bicyclo[2.2.1]hept-5-ene-2,3-dicarboxylic acid) and the like; or derivatives thereof, for example, acid halides, amides, imides, anhydrides, esters and the like. Specific examples of these derivatives include, for example, malenyl chloride, maleimide, maleic anhydride, citraconic anhydride, monomethyl maleate, dimethyl maleate, glycidyl maleate and the like.

These unsaturated carboxylic acids and/or derivatives thereof may be used individually or in combination of two or more species. Among these, an unsaturated dicarboxylic acid or an acid anhydride thereof is suitable, and particularly maleic acid, Nadic acid or acid anhydrides thereof are preferably used.

Modification can be obtained by graft polymerizing a polar monomer to a product to be modified. When graft polymerizing such polar monomer to the product to be modified, the polar monomer is usually used in an amount of 1 to 100 parts by weight, and preferably 5 to 80 parts by weight, based on 100 parts by weight of the product to be modified. This graft polymerization is generally performed in the presence of a radical initiator.

As the radical initiator, an organic peroxide, an azo compound or the like may be used.

The radical initiator can be used after directly mixing with the product to be modified and the polar monomer, but may be used after dissolving the initiator in a small amount of an organic solvent. This organic solvent is not particularly limited for use, as long as it is an organic solvent which can dissolve the radical initiator.

Also, upon graft polymerizing a polar monomer to the product to be modified, a reducing substance can be used. If a reducing substance is used, the amount of the polar monomer to be grafted can be enhanced.

Graft modification of the product to be modified with a polar monomer can be performed by a conventionally known method, and for example, can be performed by dissolving the product to be modified in an organic solvent, subsequently adding a polar monomer, a radical initiator and the like to the solution, and allowing the mixture to react at a temperature of 70 to 200° C., and preferably 80 to 190° C., for 0.5 to 15 hours, and preferably 1 to 10 hours.

Also, a modified propylene-based polymer composition can be produced by reacting the product to be modified with a polar monomer in the absence of solvent, using an extruder or the like. This reaction is preferably performed at a temperature usually above the melting point the product to be modified, specifically in the case of modifying the component (B2), at a temperature of 120 to 300° C., and preferably 120 to 250° C., usually for 0.5 to 10 minutes. Also, in the case of modifying a product to be modified containing the component (AA), for example, the reaction is preferably performed at a temperature of 160 to 300° C., and preferably 180° C. to 250° C., usually for 0.5 to 10 minutes.

The amount of modification of the modified product thus obtained (amount of the polar monomer to be grafted) is usually 0.1 to 50 wt %, preferably 0.2 to 30 wt %, and more preferably 0.2 to 10 wt %, when the modified product is taken as 100 wt %.

In the present invention (4), a propylene-based polymer composition (X1), a propylene-based polymer composition (Y), or a propylene-based polymer composition (Z) of the present invention (4), which is at least partially graft modified, can be obtained by using these modified products, and kneading, if necessary, the products with one or more unmodified products selected from the component (AA) and component (B2).

For example, the propylene-based polymer composition (W) of the present invention (4), or pellets of the propylene-based polymer composition (W) are modified, and this modified product may be further melt kneaded with a necessary amount of unmodified polymer (one or more selected from the component (AA) and component (B2)), to produce the propylene-based polymer (X1), (Y) or (Z).

Furthermore, in any of the propylene-based polymer composition (X1), (Y), and (Z), the content of the polar monomer relative to 100 wt % of the propylene-based polymer composition having at least partially graft modified by the polar monomer is usually 0.001 to 50 wt %, preferably 0.001 to 10 wt %, more preferably 0.001 to 5 wt %, and even more preferably 0.01 to 3 wt %. Control of the content of the polar monomer can be easily performed, for example, by appropriately selecting the grafting conditions.

When the propylene-based polymer composition of the present invention (4) is at least partially graft modified by a polar monomer, the composition has excellent adhesiveness to other resins and excellent compatibility, and also, the surface wettability of the molded product obtained from the propylene-based polymer composition may be improved.

Also, by at least partially graft modifying the composition, compatibility with other materials or adhesiveness may be added, while maintaining the performance of the propylene-based polymer composition of the present invention (4), such as transparency, low temperature impact resistance, mechanical properties (rigidity or flexibility), heat resistance, and the like.

When the content of the polar monomer, for example, an unsaturated carboxylic acid and/or a derivative thereof, is within in the mentioned range, the propylene-based polymer composition of the present invention (4) shows high adhesive strength to polar group-containing resins (for example, polyesters, polyvinyl alcohols, ethylene-vinyl alcohol copolymers, polyamides, PMMA, polycarbonates, etc.).

The at least partially graft modified propylene-based polymer composition of the present invention (4) may have added other polymers, for example, thermoplastic resins or elastomers, within the scope of not impairing the properties possessed by the modified product. Such addition may be carried out by mixing during the graft modification step, or after modification.

The propylene-based polymer composition of the present invention (4) may have incorporated, if necessary, within the scope of not impairing the purpose of the present invention, additives such as a weather resistant stabilizer, a heat resistant stabilizer, an antistatic agent, an anti-slipping agent, an anti-blocking agent, an anti-fogging agent, a nucleating agent, a lubricating agent, a dye, a pigment, a plasticizer, an anti-aging agent, a hydrochloric acid absorbent, an antioxidant, and the like.

The propylene-based polymer composition of the present invention (4) may contain other polymers such as elastomers, resins and the like, within the scope of not impairing the purpose of the present invention (4).

Also, the propylene-based polymer composition of the present invention (4) may contain a nucleating agent, which is a specific arbitrary component, in order to improve the moldability, that is, to increase the crystallization temperature and increase the rate of crystallization. In this case, for example, the nucleating agent is a dibenzylidene sorbitol-based nucleating agent, phosphoric acid ester-based nucleating agent, a rosin-based nucleating agent, a benzoic acid metal salt-based nucleating agent, a fluorinated polyethylene, sodium 2,2-methylenebis(4,6-di-tert-butylphenyl)phosphate, pimellic acid or a salt thereof, 2,6-naphthalenic acid dicarboxylic acid dicyclohexylamide, or the like. The amount of mixing is not particularly limited, but the amount is preferably about 0.1 to 1 part by weight based on 100 parts by weight of the propylene based polymer composition. The timing for mixing is not particularly limited, and addition is possible during or after polymerization, or during the molding process.

Method for Production of Propylene-Based Polymer Composition (X1)

The propylene-based polymer composition as described above can be produced by various methods that are known in the scope described above, for example, by multi-stage polymerizing the respective components in the continuous mode or batch mode in a slurry phase, solution phase or gas phase, by mixing the respective components in a Henschel mixer, a V-blender, a ribbon blender, a tumbler blender or the like, or by melt kneading the respective components in a single screw extruder, a twin screw extruder, a kneader, a Bunbury mixer or the like, and then granulating or grinding.

The pellets of the present invention (4) comprises a propylene-based polymer composition (W) comprising 1 to 65 parts by weight of the syndiotactic propylene polymer (AA1) and 99 to 35 parts by weight of the propylene.α-olefin copolymer (B21) (provided that the sum of amounts of (AA1) and (B21) is 100 parts by weight), wherein the polymer (AA1) satisfies the following requirement (a1) and the copolymer (B21) satisfies the following requirement (b1):

(a1): the syndiotactic pentad fraction (rrrr fraction) as measured by $^{13}$C-NMR is 85% or greater, the melting point (Tm) as determined by DSC is 145° C. or higher, and constituent units derived from propylene is contained in an amount of more than 90 mol % (provided that the total amount of the constituent unit in the polymer (AA1) is 100 mol %);

(b1): constituent units derived from propylene are contained in an amount of 55 to 90 mol % (provided that the sum of amounts of the constituent units in the copolymer (B21) is 100 mol %), constituent units derived from at least one olefin selected from α-olefins having 2 to 20 carbon atoms (excluding propylene) are contained in an amount of 10 to 45 mol %, the MFR measured according to JIS K-6721 at 230° C. under a load of 2.16 kg is in the range of 0.01 to 100 g/10 min, and at least one of the following requirements (b1-1) and (b1-2) is satisfied;

(b1-1) The syndiotactic triad fraction (rr fraction) as measured by $^{13}$C-NMR is 60% or greater; and (b1-2) The intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

The syndiotactic propylene polymer (AA1) used in the pellets of the present invention (4) may be exemplified by the same ones as the propylene-based polymer used in the propylene-based polymer composition (X1) described above. Preferred embodiments of the bonding mode, the type of the constituent unit derived from α-olefin other than the constituent unit derived from propylene, the amount present, syndiotactic pentad fraction, Tm, ΔH, [η] and the like, and the method for production are all the same as those concerning the syndiotactic propylene polymer (AA) used in the propylene polymer composition (X1).

The (B21) propylene.α-olefin copolymer used in the pellets of the present invention (4) may be exemplified by the same copolymer as the propylene.α-olefin copolymer (B2) used in the propylene-based polymer composition (X1).

According to the present invention (4), preferred embodiments of the type of the constituent units of the copolymer, proportions, rr value, rr1 value, [η], degree of crystallization, Tg, Mw/Mn and the like, and the method for production are all the same as those concerning the propylene.α-olefin copolymer (B2) used in the propylene-based polymer composition (X1).

The pellets of the present invention (4) comprises a propylene-based polymer composition (W) containing 1 to 65 parts by weight, preferably 1 to 40 parts by weight, of the component (AA1), and 99 to 35 parts by weight, preferably 99 to 60 parts by weight, of the component (B21) (herein, the sum of amounts of the component (AA1) and the component (B21) is 100 parts by weight).

The shape of the pellets of the propylene-based polymer composition (W) may be exemplified by spherical shape, cylindrical shape, lens shape, or cubic shape. These can be produced by existing method for pelletization, and for example, spherical, cylindrical or lens-shaped pellets can be obtained by homogeneously melt mixing the component (AA1) and the component (B21), extruding the mixture through an extruder, and then subjecting the extrudate to hot cutting or strand cutting. In this case, cutting may be performed either in the water, or under a gas stream such as air. Also, by cutting an extruder having an apparatus which can constitute the outer layer and the inner layer of the strand with different polymers, a strand having a dual structure having the component (AA1) disposed in the outer layer and the component (B21) disposed in the inner layer, inter-adhesiveness can be further suppressed, which is effective. Cubic-shaped pellets can be obtained, for example, by homogeneously mixing, molding into a sheet shape with rollers or the like, and using a sheet pelletizer. A preferred size is that the length of the longest part of a pellet is 3 cm or less. In the case of a pellet having a size exceeding this length, the metering error may be increased.

The pellets of the propylene-based polymer composition (W) may have the pellet surface powdered with one or two or more powders of calcium carbonate, barium sulfate, silica, talc, stearic acid and polyolefin. This is preferable in view of further suppressing inter-adhesion, or suppressing the bridge phenomenon of pellets when taken out of silo. The amount of powdering is such that a necessary amount may be added depending on the size and shape of the pellet, but usually 0.05 to 3 parts by weight is added to resin composition pellets.

Within the scope of not impairing the purpose of the present invention (4), the propylene-based polymer composition of the present invention (4) may have incorporated, if necessary, within the scope of not impairing the purpose of the present invention, additives such as a weather resistant stabilizer, a heat resistant stabilizer, an antistatic agent, an anti-slipping agent, an anti-blocking agent, an expanding agent, a crystallization aid, an anti-fogging agent, a nucleating agent, a lubricating agent, a dye, a pigment, a plasticizer, an anti-aging agent, a hydrochloric acid absorbent, an anti-oxidant, and the like. The propylene-based polymer composition of the present invention (4) may contain other polymers (excluding propylene polymer (AA1) and propylene.α-olefin copolymer (B21)) within the scope of not impairing the purpose of the present invention (4).

As a preferred method of obtaining pellets of the propylene-based polymer composition (W), a method may be mentioned in which the component (AA1) and the component (B21) are kneaded at a temperature above the maximum peak temperature (Tm) of the component (AA1) in differential scanning calorimetry (DSC), and for example, a temperature of 280° C. or lower.

The pellets of the propylene-based polymer composition (W) of the present invention (4) can be used as a modifier for thermoplastic polymers, and preferably as a modifier for polyolefin polymers.

The polymer to be modified is not particularly limited, but polyolefin polymers are preferred. Examples of the polyolefin resin include high density polyethylene, medium density polyethylene, low density polyethylene, LLDPE (linear low density polyethylene), polypropylene-based polymer, poly-4-methyl-pentene-1, and the like. Preferred are polypropylene-based resins. The polypropylene-based polymer in this case is a crystalline polypropylene-based polymer, and is a homopolymer of propylene, or a random or block copolymer of propylene and a small amount of α-olefin and/or ethylene.

It is preferable that Tm of the polypropylene-based polymer in this case, as measured by DSC, is 120° C. or higher and 170° C. or lower. Also, the polypropylene-based polymer may be exemplified by the same ones as the component (AA). Preferred embodiments of the bonding mode, the type of the constituent unit derived from α-olefin other than the constituent unit derived from propylene, the amount present, syndiotactic pentad fraction, Tm, ΔH, MFR and the like, and the method for production are all the same as those concerning the propylene-based polymer (AA) used in the propylene-based polymer composition (X1).

The component (AA1) contained in the pellets of the present invention (4) and the polymer to be modified may be of the same properties.

To obtain a modified polymer composition, the polymer to be modified, for example, a polyolefin-based polymer, the polyolefin-based modifier of the present invention (4), and if necessary, the additives described in the section for the propylene-based polymer composition (X1) may be kneaded in. As the method for kneading, it is preferable to melt knead the pellets of the present invention (4) and the polymer to be modified. The amount of addition of the modifier is 3 to 95 wt %, preferably 10 to 80 wt %, and more preferably 30 to 70 wt %. If the amount is within this range, a modified polymer composition having sufficient modification effect, good flowability, excellent molding processability and strength, and excellent heat resistance, can be obtained.

The pellets of the present invention (4) have excellent anti-blocking properties, and thus can modify other polymers with good productivity, but are useful as a modifier for polymers because a polymer composition having excellent transparency, low temperature impact resistance, mechanical properties (flexibility or rigidity, etc.), as well as excellent heat resistance can be obtained. The effect of modification is particularly great for the propylene-based polymer (AA) used in the propylene-based polymer composition (X1).

Therefore, the composition (X1) of the present invention (4) can be obtained by melt kneading the pellets of the present invention (4) (modifier for thermoplastic polymers), a necessary amount of the component (AA), and if necessary, other polymers (excluding the propylene-based polymer (AA) and propylene.α-olefin copolymer (B2)) and additives.

<Propylene-Based Polymer Composition (X2)>

Hereinafter, the present invention (5) which is one of preferred embodiments of the composition containing the syndiotactic propylene polymer (AA) will be described in detail.

The propylene-based polymer composition (X2) of the present invention (5) comprises the specific (AA) syndiotactic propylene polymer, a specific (B2) propylene.α-olefin copolymer, and a (C0) ethylene.α-olefin copolymer.

Details of the syndiotactic propylene polymer (AA) and propylene.α-olefin copolymer (B2) are as described above.

Ethylene.α-Olefin Random Copolymer (C0)

The ethylene.α-olefin random copolymer (C0) used in the present invention (5) is preferably an ethylene.α-olefin copolymer containing 50 to 99 mol % of constituent units derived from ethylene, and 1 to 50 mol % of constituent units derived from an α-olefin having 3 to 20 carbon atoms other than ethylene (the sum of amounts of ethylene and α-olefin is 100 mol %).

Preferably, the polymer contains constituent units derived from ethylene in an amount of 60 to 95 mol %, and constituent units derived from an α-olefin having 3 to 20 carbon atoms other than ethylene in an amount of 5 to 40 mol % (the sum of amounts of ethylene and α-olefin is 100 mol %), has a density of 910 to 850 kg/m$^3$, and has an MFR in the range of 0.01 to 100 g/10 min, as measured according to JIS K-6721 at 190° C. under a load of 2.16 kg.

More preferably, the polymer contains constituent units derived from ethylene in an amount of 80 to 95 mol %, and constituent units derived from an α-olefin having 3 to 20 carbon atoms other than ethylene in an amount of 5 to 20 mol % (the sum of amounts of ethylene and α-olefin is 100 mol %), has a density of 900 to 860 kg/m$^3$, and has an MFR in the range of 0.05 to 50 g/10 min, as measured according to JIS K-6721 at 190° C. under a load of 2.16 kg.

The α-olefin to be copolymerized with ethylene is an α-olefin having 3 to 20 carbon atoms, and specific examples thereof include propylene, 1-butene, 1-pentene, 1-hexene, 1-heptene, 1-octene, 1-nonene, 1-decene, 1-undecene, 1-dodecene, 1-hexadodecene, 1-octadecene, 1-nonadecene, 1-eicosene, 4-methyl-1-pentene, and the like. Among these, an α-olefin having 3 to 10 carbon atoms is preferred. In particular, propylene, 1-butene, 4-methyl-1-pentene, 1-hexene and 1-octene are preferred. These α-olefins are used individually or in combination of two or more species.

Also, the ethylene.α-olefin random copolymer (C0) may contain a unit derived from other polymerizable monomers, within the scope of not impairing the purpose of the present invention.

Examples of these other polymerizable monomers include vinyl compounds such as styrene, vinylcyclopentene, vinylcyclohexane, vinylnorbornane and the like; vinyl esters such as vinyl acetate and the like; unsaturated organic acids or derivatives thereof, such as maleic anhydride and the like; conjugated dienes such as butadiene, isoprene, pentadiene, 2,3-dimethylbutadiene and the like; non-conjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropene-2-norbornene, 2,3-diisopropylidene-5-norbornene, 2-ethylidene-3-isopropylidene-5-norbornene, 2-propenyl-2,2-norbornadiene and the like. Furthermore, one of preferred embodiments does not contain non-conjugated dienes and non-conjugated polyenes.

The ethylene.α-olefin random copolymer (C0) may contain such unit derived from other polymerizable monomers in an amount of 10 mol % or less, preferably 5 mol % or less, and more preferably 3 mol % or less.

Specific examples of the ethylene.α-olefin random copolymer (C0) include ethylene.propylene random copolymer, ethylene.1-butene random copolymer, ethylene.propylene.1-butene random copolymer, ethylene.propylene.ethylidenenorbornene random copolymer, ethylene.1-butene.1-octene random copolymer, ethylene.4-methyl-1-pentene random copolymer, ethylene.1-hexene random copolymer, ethylene.1-octene random copolymer, and the like. Among these, ethylene.propylene random copolymer, ethylene.1-butene random copolymer, ethylene.1-butene.1-octene random copolymer, ethylene.1-hexene random copolymer, ethylene.1-octene random copolymer, and the like are particularly preferably used. These copolymers may be used in combination of two or more species.

Also, the ethylene.α-olefin random copolymer (C0) used in the present invention (5) has a degree of crystallization, as measured by X-ray diffraction, of usually 40% or less, preferably 0 to 39%, and more preferably 0 to 35%. Also, the ethylene.α-olefin random copolymer (C0) of the present invention (5) has an intrinsic viscosity [η], as measured in decalin at 135° C., of usually 0.1 to 10 dL/g, and more preferably 0.5 to 5 dL/g.

According to the present invention (5), by using the component (C0), particularly the balance between impact resistance and transparency is improved.

The ethylene.α-olefin random copolymer as described above can be produced by conventionally known methods of using a vanadium-based catalyst, a titanium-based catalyst, or a metallocene-based polymer. As the ethylene.α-olefin random copolymer (C0), for example, commercial products may be used, and trade name "TAFMER™" manufactured by Mitsui Co., Ltd. and the like may be used.

Propylene-Based Polymer Composition (X2)

The propylene-based polymer composition (X2) of the present invention (5) is characterized in comprising:

(AA) 100 to 25 parts by weight of the syndiotactic propylene polymer, (B2) 0 to 75 parts by weight of the propylene.α-olefin copolymer (provided that the sum of amounts of (AA) and (B2) is 100 parts by weight), and (C0) 1 to 100 parts by weight of the ethylene.α-olefin copolymer, based on 100 parts by weight of the sum of amounts of (AA) and (B2).

Within this range, a propylene-based polymer composition having particularly excellent moldability and heat resistance, and excellent transparency, flexibility, and low temperature impact resistance, is obtained, which is preferable.

Also, in the case of needing a material having good flexibility and excellent low temperature impact resistance, a composition comprising:

(AA) 98 to 40 parts by weight of the syndiotactic propylene polymer, (B2) 2 to 60 parts by weight of the propylene.α-olefin copolymer (provided that the sum of amounts of (AA) and (B2) is 100 parts by weight), and (C0) 1 to 100 parts by weight of the ethylene.α-olefin copolymer, based on 100 parts by weight of the sum of amounts of (AA) and (B2) (may be referred to as composition (X2i)), is preferred.

In the case of needing a material having excellent heat resistance, relatively high rigidity and good low temperature impact resistance, a composition comprising:

(AA) 100 parts by weight of the syndiotactic propylene polymer, (B2) 0 part by weight of the propylene.α-olefin copolymer, and (C0) 1 to 100 parts by weight of the ethylene.α-olefin copolymer (may be referred to as composition (X2ii)), is preferred.

The composition of the present invention (5) is excellent in moldability and heat resistance, as well as in the balance between transparency, flexibility and low temperature impact resistance. Here, the low temperature impact resistance being excellent indicates that, for example, when a comparison is made with materials having the same elastic moduli, a material having higher low temperature impact strength, or having, for example, the same low temperature impact strength, the tensile modulus is higher.

Also, moldability being excellent indicates herein that in the case of carrying out molding such as injection molding, inflation molding, blow molding, extrusion or press molding, the time taken from the molten state to the solid state is short. Also, good moldability means being excellent in molding cycle properties, shape stability, long-term productivity and the like.

Specifically, the time to solidification is such that the half-crystallization time $(t_{1/2})$ during the isothermal crystallization measurement at 110° C. as determined by differential scanning calorimetry (DSC) is in the range of 1000 sec or less, and more preferably 500 sec or less. Also, the half-crystallization time $(t_{1/2})$ determined from the isothermal crystallization measurement at 110° C. as determined by differential scanning calorimetry (DSC) may be referred to as property (1). The composition of the present invention (5) has remarkably improved $t_{1/2}$, compared to prior art, by containing specific components (AA) and (B2), and for example, can be molded without difficulties by generally used molding methods for isotactic polypropylene.

The half-crystallization time $(t_{1/2})$ determined by isothermal crystallization measurement is, when the area between the DSC caloric curve and the baseline during the isothermal crystallization process is considered as the total calories, the time taken to reach 50% of the calories [see New Lectures on Polymer Experiments, 8. Properties of Polymers (Shinkoubunsizikkenkouza 8 Koubunsi no Bussei) (KYORITSU SHUPPAN CO., LTD.)]. Measurement of the half-crystallization time $(t_{1/2})$ is performed as follows. About 5.00 mg of a sample is filled in an aluminum pan for exclusive use, and the half-crystallization time is determined from a DSC curve obtained by heating the sample from 30° C. to 200° C. at a rate of 320° C./min, maintaining at 200° C. for 5 minutes, cooling from that temperature (200° C.) to the isothermal crystallization temperature of 110° C. at a rate of 320° C./min, and maintaining the temperature at 110° C., using DSCPyris1 or DSC7 manufactured by PerkinElmer, Inc. Here, the half-crystallization time $(t_{1/2})$ is determined by setting the initial time of the isothermal crystallization process (the time to reach the isothermal crystallization temperature of 110° C. from 200° C.) as t=0. For composition of the present invention (5), $t_{1/2}$ can be determined as described above, but when crystallization does not occur at any isothermal crystallization temperature, for example, at 110° C., then measurement is taken for convenience at several points at an isothermal crystallization temperature at or below 110° C., and the half crystallization time $(t_{1/2})$ is determined from the extrapolated value.

The needle penetration temperature (softening temperature determined by TMA measurement; hereinafter, may also be referred to as property (2)) measured for the propylene-based polymer composition (X2) described above is 145° C. or higher, more preferably 150° C. or higher.

The needle penetration temperature (may be referred to as softening temperature which is determined by TMA) can be measured as follows.

Using SS-120 manufactured by Seiko Co., Ltd. or Q-400 manufactured by TA Instrument, and using a specimen of press sheet having a thickness of 1 mm, a pressure of 2 kgf/cm$^2$ is applied with a planar indentor of 1.8 mm φ at a rate of temperature increase of 5° C./min, and the needle penetration temperature (° C.) is determined from the TMA curve.

Furthermore, methods for measurement of the Izod impact strength (may also be referred to as property (3)), tensile modulus (may also be referred to as property (4)), and haze (may also be referred to as property (5)) will be described below.

For the Izod impact strength, a specimen of 12.7 mm (width)×3.2 mm (thickness)×64 mm (length) is punched from a press sheet having a thickness of 3 mm, a notch is inserted by machine processing, and the Izod impact strength is measured at 0° C. An average of three measurements is employed.

For the tensile modulus, a press sheet having a thickness of 1 mm is punched for No. JIS3 dumbbell according to JIS K6301, and the specimen is provided as evaluation sample. The measurement was performed, for example, by measuring the tensile modulus using a tensile tester Inston 1123 manufactured by Instron, Inc. at a span interval of 30 mm and a tensile rate of 30 mm/min at 23° C., and an average value of 3 measurements is employed.

Using a specimen from a press sheet having a thickness of 1 mm, the internal haze is measured with a digital turbidimeter "NDH-2OD" manufactured by Nippon Denshoku Industries Co., Ltd., and an average of 2 measurements is employed.

Also, in the respective tests, a specimen is obtained by producing a sheet having a predetermined thickness by preheating the sample at 200° C. for 5 minutes to 10 minutes in a press molding machine, subsequently molding the sheet for 1 to 2 minutes under a pressure of 10 MPa, and then cooling the sheet at 20° C. under a pressure of 10 MPa.

The propylene-based polymer composition (X2) of the present invention (5) preferably satisfies:

(2) the needle penetration temperature is 145° C. or higher, and preferably 147° C. or higher;

(3) the Izod impact strength is 50 J/m or larger, and preferably 100 J/m;

(4) the tensile modulus is in the range of 1 MPa to 2000 MPa, and preferably in the range of 1 MPa to 1500 MPa; and (5) the internal haze value is 50% or less, and preferably 40% or less.

In the case of the composition (X2i), as the α-olefin propylene.α-olefin copolymer (B2), ethylene, or a combination of ethylene and a HAO comonomer is preferred, and ethylene is particularly preferred. Also, the constituent unit derived from an α-olefin is more preferably contained in an amount of 10 mol % to 40 mol %, and particularly preferably 15 to 35 mol %. Within this range, a composition having particularly excellent heat resistance, transparency and impact resistance is obtained.

In the case of the composition (X2i), the half-crystallization time (1) is preferably 1000 sec or less, and more preferably 500 sec or less;

the needle penetration temperature (2) is preferably 145° C. or higher, and more preferably 147° C. or higher;

the Izod impact strength (3) is preferably 50 J/m or greater, and more preferably 100 J/m or greater;

the tensile modulus (4) is preferably in the range of 1 MPa to 2000 MPa, more preferably in the range of 1 MPa to 1000 MPa, and even more preferably in the range of 1 MPa to 800 MPa; and the internal haze (5) is preferably 50% or less, and more preferably 40% or less.

In the case of the composition (X2i), it is preferable that at least one or more of the properties among (1) to (5) satisfy the preferred ranges; it is more preferable that the composition either simultaneously satisfies (1), (3) and (4), or simultaneously satisfies (2), (3) and (4), or simultaneously satisfies (3), (4) and (5); it is even more preferable that the composition simultaneously satisfies (2), (3), (4) and (5); and it is particularly preferable that the composition satisfies all of (1), (2), (3), (4) and (5).

In the case of the composition (X2ii), as the α-olefin of the ethylene.α-olefin copolymer (C0), 1-butene and 1-octene are particularly preferred. Also, the constituent derived from α-olefin is preferably 5 mol % to 40 mol %, more preferably 5 to 30 mol %, and particularly preferably 5 to 20 mol %. Within this range, a composition having particularly excellent heat resistance, transparency, low temperature impact resistance and rigidity is obtained.

In the case of the composition (X2ii), the half-crystallization time (1) is preferably 1000 sec or less, and more preferably 500 sec or less;

the needle penetration temperature (2) is preferably 145° C. or higher, more preferably 147° C. or higher, and even more preferably 150° C. or higher;

the Izod impact strength (3) is preferably 100 J/m or greater, and more preferably 200 J/m;

the tensile modulus (4) is in the range of 100 MPa to 2000 MPa, more preferably in the range of 100 MPa to 1000 MPa, and even more preferably 100 MPa to 800 MPa; and the internal haze (5) is 50% or less, and more preferably 40% or less.

In the case of the composition (X2ii), it is preferable that at least one or more of the properties among (1), (2), (3), (4) and (5) satisfy the preferred ranges; it is even more preferable that the composition either simultaneously satisfies (1), (3) and (4), or simultaneously satisfies (2), (3) and (4), or simultaneously satisfies (3), (4) and (5); it is even more preferable that the composition either simultaneously satisfies (1), (3), (4) and (5), or simultaneously satisfies (2), (3), (4) and (5); and it is particularly preferable that the composition satisfies all of (1), (2), (3), (4) and (5).

The propylene-based polymer composition (X2) of the present invention (5) preferably contains 99.0 to 35.0 mol % of constituent units derived from propylene, and 1.0 to 65 mol % of constituent units derived from an α-olefin having 2 to 20 carbon atoms (excluding propylene) (herein the amount of the constituent unit derived from α-olefin having 2 to 20 carbon atoms (including propylene) is 100 mol %). It is more preferable that the composition contains ethylene as the α-olefin having 2 to 20 carbon atoms (excluding propylene).

The propylene-based polymer composition (X2) of the present invention (5) may have incorporated, if necessary, within the scope of not impairing the purpose of the present invention, additives such as a weather resistant stabilizer, a heat resistant stabilizer, an antistatic agent, an anti-slipping agent, an anti-blocking agent, an anti-fogging agent, a nucleating agent, a lubricating agent, a dye, a pigment, a plasticizer, an anti-aging agent, a hydrochloric acid absorbent, an antioxidant, and the like.

The propylene-based polymer composition (X2) of the present invention (5) may contain other polymers such as elastomers, resins and the like, within the scope of not impairing the purpose of the present invention (5).

Graft Modification

In the propylene-based polymer composition (X2) of the present invention (5), at least a part or the entirety of the propylene polymer composition as described above may be graft modified with a polar monomer.

For example, a part or all of the component (AA) may be graft modified; a part or all of the component (B2) may be graft modified; a part or all of the component (C0) may be graft modified; a part or all of each of the component (AA) and component (B2) may be graft modified; a part or all of each of the component (B2) and component (C0) may be graft modified; a part or all of each of the component (AA) and component (C0) may be graft modified; and a part or all of each of the component (AA), component (B2) and component (C0) may be graft modified.

This polar monomer may be exemplified by a hydroxyl group-containing ethylenic unsaturated compound, an amino group-containing ethylenic unsaturated compound, an epoxy group-containing ethylenic unsaturated compound, an aromatic vinyl compound, an unsaturated carboxylic acid or a derivative thereof, a vinyl ester compound, vinyl chloride, a carbodiimide compound, or the like.

As the polar monomer, in particular, the unsaturated carboxylic acid or its derivatives are particularly preferred. As the unsaturated carboxylic acid or its derivatives, an unsaturated compound having at least one carboxylic acid group, an ester of a compound having a carboxylic acid group and an alkyl alcohol, an unsaturated compound having at least one anhydrous carboxylic acid group, or the like, and as the unsaturated group, a vinyl group, a vinylene group, an unsaturated cyclic hydrocarbon group, or the like.

Specific examples of the compound include unsaturated carboxylic acids such as acrylic acid, maleic acid, fumaric acid, tetrahydrophthalic acid, itaconic acid, citraconic acid, crotonic acid, isocrotonic acid, Nadic acid [trade name] (endocis-bicyclo[2.2.1]hept-5-ene-2,3-dicarboxylic acid) and the like; or derivatives thereof, for example, acid halides, amides, imides, anhydrides, esters and the like. Specific examples of these derivatives include, for example, malenyl chloride, maleimide, maleic anhydride, citraconic anhydride, monomethyl maleate, dimethyl maleate, glycidyl maleate and the like.

These unsaturated carboxylic acids and/or derivatives thereof may be used individually or in combination of two or more species. Among these, an unsaturated dicarboxylic acid or an acid anhydride thereof is suitable, and particularly maleic acid, Nadic acid or acid anhydrides thereof are preferably used.

Modification can be obtained by graft polymerizing a polar monomer to a product to be modified. When graft polymerizing such polar monomer to the product to be modified, the polar monomer is usually used in an amount of 1 to 100 parts by weight, and preferably 5 to 80 parts by weight, based on 100 parts by weight of the product to be modified. This graft polymerization is generally performed in the presence of a radical initiator.

As the radical initiator, an organic peroxide, an azo compound or the like may be used.

The radical initiator can be used after directly mixing with the product to be modified and the polar monomer, but may be used after dissolving the initiator in a small amount of an organic solvent. This organic solvent is not particularly limited for use, as long as it is an organic solvent which can dissolve the radical initiator.

Also, upon graft polymerizing a polar monomer to the product to be modified, a reducing substance can be used. If a reducing substance is used, the amount of the polar monomer to be grafted can be enhanced.

Graft modification of the product to be modified with a polar monomer can be performed by a conventionally known method, and for example, can be performed by dissolving the product to be modified in an organic solvent, subsequently adding a polar monomer, a radical initiator and the like to the solution, and allowing the mixture to react at a temperature of 70 to 200° C., and preferably 80 to 190° C., for 0.5 to 15 hours, and preferably 1 to 10 hours.

Also, a modified propylene-based polymer composition can be produced by reacting the product to be modified with a polar monomer, using an extruder or the like. This reaction is preferably performed at a temperature usually above the melting point of a product to be modified, specifically in the case of modifying the component (B2), at a temperature of 120 to 300° C., and preferably 120 to 250° C., usually for 0.5 to 10 minutes. Also, in the case of modifying a product to be modified containing the component (AA), for example, the reaction is preferably performed at a temperature of 160 to 300° C., and preferably 180° C. to 250° C., usually for 0.5 to 10 minutes.

The amount of modification of the modified product thus obtained (amount of the polar monomer to be grafted) is usually 0.1 to 50 wt %, preferably 0.2 to 30 wt %, and more preferably 0.2 to 10 wt %, when the modified product is taken as 100 wt %.

In the present invention (5), the propylene-based polymer composition (X2) of the present invention (5) can be obtained by using these modified products, and kneading, if necessary, the products with one or more unmodified products selected from the component (AA), component (B2) and component (C0).

For example, the propylene-based polymer composition (V) of the present invention (5) that will be described later, or pellets of the propylene-based polymer composition (V) are modified, and this modified product may be further melt kneaded with a necessary amount of unmodified polymer (one or more selected from the component (AA), component (B2) and component (C0)), to produce the propylene-based polymer (X2).

Furthermore, the content of the polar monomer relative to 100 wt % of the propylene-based polymer composition (X2) having at least partially graft modified by the polar monomer is usually 0.001 to 50 wt %, preferably 0.001 to 10 wt %, more preferably 0.001 to 5 wt %, and even more preferably 0.01 to 3 wt %. Control of the content of the polar monomer can be easily performed, for example, by appropriately selecting the grafting conditions.

When the propylene-based polymer composition of the present invention (5) is at least partially graft modified by a polar monomer, the composition has excellent adhesiveness to other resins and excellent compatibility, and also, the surface wettability of the molded product obtained from the propylene-based polymer composition may be improved.

Also, by at least partially graft modifying the composition, compatibility with other materials or adhesiveness may be added, while maintaining the performance of the propylene polymer composition of the present invention (5), such as transparency, low temperature impact resistance, mechanical properties (rigidity or flexibility), heat resistance, and the like.

When the content of the polar monomer, for example, an unsaturated carboxylic acid and/or a derivative thereof, is within in the mentioned range, the polyolefine composition of the present invention (5) shows high adhesive strength to polar group-containing resins (for example, polyesters, polyvinyl alcohols, ethylene.vinyl alcohol copolymers, polyamides, PMMA, polycarbonates, etc.).

The at least partially graft modified propylene-based polymer composition of the present invention (5) may have added other polymers, for example, thermoplastic resins or elastomers, within the scope of not impairing the properties possessed by the modified product. Such addition may be carried out by mixing during the graft modification step, or after modification.

Also, the propylene polymer composition of the present invention (5) may contain a nucleating agent, which is a specific arbitrary component, in order to improve the moldability, that is, to increase the crystallization temperature and increase the rate of crystallization. In this case, for example, the nucleating agent is a dibenzylidene sorbitol-based nucleating agent, phosphoric acid ester-based nucleating agent, a rosin-based nucleating agent, a benzoic acid metal salt-based nucleating agent, a fluorinated polyethylene, sodium 2,2-methylenebis(4,6-di-tert-butylphenyl)phosphate, pimellic acid or a salt thereof, 2,6-naphthalenic acid dicarboxylic acid dicyclohexylamide, or the like. The amount of mixing is not particularly limited, but the amount is preferably about 0.1 to 1 part by weight based on 100 parts by weight of the propylene based polymer composition. The timing for mixing is not particularly limited, and addition is possible during or after polymerization, or during the molding-process.

Method for Producing Propylene-Based Polymer Composition (X2)

The propylene-based polymer composition as described above can be produced by various methods that are known in the scope described above, for example, by multi-stage polymerizing the respective components in the continuous mode or batch mode in a slurry phase, solution phase or gas phase, by mixing the respective components in a Henschel mixer, a V-blender, a ribbon blender, a tumbler blender or the like, or by melt kneading the respective components in a single screw extruder, a twin screw extruder, a kneader, a Bunbury mixer or the like, and then granulating or grinding.

Upon producing the propylene-based polymer composition (X2) of the present invention (5), for example, pellets comprising the propylene-based polymer composition (V) as described later can be used as the raw material. The propylene-based polymer composition (V) comprises:

1 to 65 parts by weight of a syndiotactic propylene-based polymer (AA1), and 99 to 35 parts by weight of a propylene.α-olefin copolymer (B21) (provided that the sum of amounts of (AA1) and (B21) is 100 parts by weight), wherein the polymer (AA1) satisfies the following requirement (a1), and the copolymer (B21) satisfies the following requirement (b'):

(a1) the syndiotactic pentad fraction (rrrr fraction) as measured by $^{13}$C-NMR is 85% or greater, the melting point (Tm) as determined by DSC is 145° C. or higher, and constituent units derived from propylene are contained in an amount of more than 90 mol % (provided that the total amount of the constituent units in the polymer (AA1) is 100 mol %), (b1) constituent units derived from propylene are contained in an amount of 55 to 90 mol %, constituent units derived from at least one olefin selected from α-olefins having 2 to 20 carbon atoms (excluding propylene) are contained in an amount of 10 to 45 mol % (provided that the sum of amounts of the constituent unit derived from propylene and the constituent units derived from the α-olefin having 2 to 20 carbon atoms (provided that propylene is excluded) is 100 mol %), the MFR measured according to JIS K-6721 at 230° C. under a load of 2.16 kg is in the range of 0.01 to 100 g/10 min, and at least one of the following requirements (b1-1) and (b1-2) is satisfied:

(b1-1): the syndiotactic triad fraction (rr fraction) as measured by $^{13}$C-NMR is 60% or greater.

(b1-2): the intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

As the syndiotactic propylene polymer (AA1) used in the pellets, the same one as the propylene-based polymer used in the propylene-based polymer composition (X2) can be mentioned. The bonding mode, Preferred embodiments of the bonding mode, the type of the constituent unit derived from α-olefin other than the constituent unit derived from propylene, the amount present, syndiotactic pentad fraction, Tm, ΔH, [η] and the like, and the method for production are all the same as those concerning the syndiotactic propylene polymer (AA) used in the propylene-based polymer composition (X1).

The (B21) propylene.α-olefin copolymer used in the pellets of the present invention (5) may be exemplified by the same as the propylene.α-olefin copolymer (B2) used in the propylene-based polymer composition (X2).

According to the present invention (5), preferred embodiments of the type of the constituent units of the copolymer, proportions, rr value, rr1 value, [η], degree of crystallization, Tg, Mw/Mn and the like, and the method for production are all the same as those concerning the propylene.α-olefin copolymer (B2) used in the propylene-based polymer composition (X2).

The pellets comprise propylene based polymer composition (V) which includes 1 to 65 parts by weight, preferably 1 to 40 parts by weight, of the (AA1) component; 99 to 35 parts by weight, preferably 99 to 60 parts by weight, of (B21) component (herein, the sum of amounts of (AA1) component and (B21) component is 100 mol).

The shape of the pellets of the propylene-based polymer composition (V) may be exemplified by spherical shape, cylindrical shape, lens shape, or cubic shape. These can be produced by existing method for pelletization, and for example, spherical, cylindrical or lens-shaped pellets can be obtained by homogeneously melt mixing the component (AA1) and the component (B21), extruding the mixture through an extruder, and then subjecting the extrudate to hot cutting or strand cutting. In this case, cutting may be performed either in the water, or under a gas stream such as air. Also, by cutting an extruder having an apparatus which can constitute the outer layer and the inner layer of the strand with different polymers, a strand having a dual structure having the component (AA1) disposed in the outer layer and the component (B21) disposed in the inner layer, inter-adhesiveness can be further suppressed, which is effective. Cubic-shaped pellets can be obtained, for example, by homogeneously mixing, molding into a sheet shape with rollers or the like, and using a sheet pelletizer. A preferred size is that the length of the longest part of a pellet is 3 cm or less. In the case of a pellet having a size exceeding this length, the metering error may be increased.

The pellets comprising the propylene-based polymer composition (V) may have the pellet surface powdered with one or two or more powders of calcium carbonate, barium sulfate, silica, talc, stearic acid and polyolefin. This is preferable in view of further suppressing inter-adhesion, or suppressing the bridge phenomenon of pellets when taken out of silo. The amount of powdering is such that a necessary amount may be added depending on the size and shape of the pellet, but usually 0.05 to 3 parts by weight is added to resin composition pellets.

Within the scope of not impairing the purpose of the present invention (5), the propylene-based polymer composition of the present invention (5) may have incorporated, if necessary, within the scope of not impairing the purpose of the present invention, additives such as a weather resistant stabilizer, a heat resistant stabilizer, an antistatic agent, an anti-slipping agent, an anti-blocking agent, an expanding agent, a crystallization aid, an anti-fogging agent, a nucleating agent, a lubricating agent, a dye, a pigment, a plasticizer, an anti-aging agent, a hydrochloric acid absorbent, an antioxidant, and the like. The propylene-based polymer composition of the present invention (5) may contain other polymers (excluding propylene polymer (AA1), propylene.α-olefin copolymer (B21), and ethylene.α-olefin copolymer (C0)) within the scope of not impairing the purpose of the present invention (5).

As a preferred method of obtaining pellets of the propylene-based polymer composition (V), a method may be mentioned in which the component (AA1) and the component (B21) are kneaded at a temperature above the maximum peak temperature (Tm) of the component (AA1) in differential scanning calorimetry (DSC), and for example, a temperature of 280° C. or lower.

To obtain a modified polymer composition (X2) from the propylene-based polymer composition (V), the polymer to be modified, for example, a polyolefin polymer, the polyolefin modifier of the present invention (5), and if necessary, the additives described in the section for the propylene-based polymer composition (X2) may be kneaded in. As the method for kneading, it is preferable to melt knead the pellets of the present invention (5) and the polymer to be modified. The amount of addition of the modifier is 3 to 95 wt %, preferably 10 to 80 wt %, and more preferably 30 to 70 wt %. If the amount is within this range, a modified polymer composition having sufficient modification effect, good flowability, excellent molding processability and strength, and excellent heat resistance, can be obtained.

The pellets have excellent anti-blocking properties, and thus can modify other polymers with good productivity.

Therefore, the composition (X2) of the present invention (5) can be obtained by melt kneading the pellets of the present invention (5) (modifier for thermoplastic polymers), a necessary amount of component (AA), and if necessary, a necessary amount of (C0) ethylene.α-olefin copolymer, other polymers (excluding the syndiotactic propylene polymer (AA) and propylene.α-olefin copolymer (B2) having 2 to 20 carbon atoms (excluding propylene), ethylene.α-olefin copolymer (C0) having 3 to 20 carbon atoms) and additives.

<Propylene-Based Polymer Composition (X3)>

Hereinafter, the present invention (6) will be described in detail.

The propylene-based polymer composition (X3) of the present invention (6) comprises a specific (AA) syndiotactic propylene polymer, and a specific (B3) propylene.α-olefin copolymer.

Details of the syndiotactic propylene polymer (AA) are as described above.

Propylene.α-Olefin Copolymer (B3)

The propylene.α-olefin copolymer (B3) contains constituent units derived from propylene in an amount of 30 to 90 mol %, and constituent units derived from at least one olefin selected from α-olefins having 2 to 20 carbon atoms (excluding propylene) in an amount of 10 to 70 mol % (provided that the sum of amounts of the constituent unit derived from propylene and the constituent unit derived from the α-olefin having 2 to 20 carbon atom (excluding propylene) is 100 mol %), has an MFR in the range of 0.01 to 100 g/10 min as measured according to JIS K-6721 at 230° C. under a load of 2.16 kg, and is characterized in satisfying at least one of the following requirements (b-1) and (b-2):

(b-1): the syndiotactic triad fraction (rr fraction) as measured by $^{13}$C-NMR is 60% or greater, and (b-2): the intrinsic viscosity [η9] (dL/g) as measured in decalin at 135° C. and the MFR (g/10 min, 230° C., under a load of 2.16 kg) satisfy the following relationship.

$$1.50 \times MFR^{(-0.20)} \leq [\eta] \leq 2.65 \times MFR^{(-0.20)}$$

According to the present invention (6), a propylene.α-olefin copolymer (B3) having various properties within the above-described ranges is used without any particularly limitation, but this propylene.α-olefin copolymer (B3) is a copolymer containing 30 to 90 mol %, preferably 40 to 90 mol %, more preferably 50 to 90 mol %, and even more preferably 51 to 90 mol % of constituent units derived from propylene; and 10 to 70 mol % (herein the sum of amounts of the constituent units derived from propylene and a constituent unit derived from ethylene, and constituent units derived from α-olefin is 100 mol %), preferably 10 to 60 mol %, more preferably 10 to 50 mol %, and even more preferably 10 to 49 mol %, in a total amount of constituent units derived from ethylene and constituent units derived from an α-olefin having 4 to 20 carbon atoms. This is one of preferred embodiments in view of damping properties, scratch resistance and abrasion resistance.

The propylene.α-olefin copolymer (B3) is a copolymer of propylene, ethylene and an α-olefin having 4 to 20 carbon atoms, and when the molar fraction of the constituent unit derived from ethylene is designated as $P_E$, and the molar fraction of an α-olefin having 4 to 20 carbon atoms is designated as $P_{HAO}$, a copolymer having $P_E \leq P_{HAO}$ is more preferred. More specifically, the value of $P_E/P_{HAO}$ is 0.01 to 1.00, preferably 0.05 to 0.80, more preferably 0.06 to 0.60, and even more preferably 0.10 to 0.50.

The propylene-based polymer composition (X3) of the present invention (6) is a composition (composition (X3i)) further containing 0.1 to 100 parts by weight of a hydrocarbon resin (C1) that will be described later, based on 100 parts by weight of the sum of amounts of the syndiotactic propylene polymer (AA) and propylene.α-olefin copolymer (B3)), and the propylene.α-olefin copolymer (B3) is a copolymer of propylene.ethylene.α-olefin containing 4 to 20 carbon atoms, containing constituent units derived from propylene in an amount of 30 to 90 mol %, preferably 40 to 90 mol %, more preferably 50 to 90 mol %, and even more preferably 51 to 90 mol %, and constituent units derived from ethylene and constituent units derived from an α-olefin having 4 to 20 carbon atoms in a total amount of 10 to 70 mol % (herein, the sum of amounts of the constituent unit derived from propylene, the constituent unit derived from ethylene, and the constituent unit derived from an α-olefin having 4 to 20 is 100 mol %), preferably 10 to 60 mol %, more preferably 10 to 50 mol %, and even more preferably 10 to 49 mol %, wherein α-olefin copolymer is preferably an copolymer of propylene.ethylene.α-olefin having 4 to 20 carbon atoms which satisfies $P_E \leq P_{HAO}$ when the proportion of the constituent unit derived from ethylene being designated as $P_E$ (mol %), and the proportion of an α-olefin having 4 to 20 carbon atoms being designated as $P_{HAO}$ (mol %).

More specifically, the value of $P_E/P_{HAO}$ is preferably 0.01 to 1.00, more preferably 0.05 to 0.80, even more preferably 0.06 to 0.60, and particularly preferably 0.10 to 0.50.

When the propylene-based polymer composition (X3) of the present invention (6) is a composition ("composition (X3ii)") further containing 0.1 to 500 parts by weight of a non-crosslinked or crosslinked olefinic thermoplastic elastomer (C2), based on 100 parts by weight of the sum of amounts of the syndiotactic propylene polymer (AA) and propylene.α-olefin copolymer (B3), the propylene.α-olefin copolymer (B3) more preferably contains constituent units derived from propylene in an amount of 30 to 90 mol %, preferably 50 to 90 mol %, more preferably 55 to 90 mol %, and even more preferably 60 to 90 mol %, and the sum of amounts of constituent units derived from ethylene and constituent units derived from an α-olefin having 4 to 20 carbon atoms is 10 to 70 mol % (herein, the sum of amounts of the constituent unit derived from propylene, the constituent unit derived from ethylene, and the constituent unit derived from an α-olefin having 4 to 20 is 100 mol %), preferably 10 to 50 mol %, and more preferably 10 to 40 mol %.

Preferred examples of the α-olefin having 2 to 20 carbon atoms (excluding propylene) include ethylene, 1-butene, 1-pentene, 3-methyl-1-butene, 1-hexene, 4-methyl-1-pentene, 1-octene, 1-decene, 1-dodecene, 1-tetradecene, 1-hexadecene, 1-octadecene, 1-eicosene and the like.

It is preferable that the MFR of the propylene.α-olefin copolymer (B3) as measured according to JIS K-6721 at 230° C. under a load of 2.16 kg, is within the range of 0.01 to 100 g/10 min.

The propylene.α-olefin copolymer (B3) used in the present invention (6) satisfies at least one of the following (b-1) and (b-2).

(b-1) The syndiotactic triad fraction (rr fraction) as measured by $^{13}$C-NMR is 60% or greater; and (b-2) The intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

These requirements (b-1) and (b-2) are the same as the requirements (b-1) and (b-2) for the propylene.α-olefin copolymer (B2) used in the present inventions (4) and (5) described above, and details of the requirements are as described above.

The propylene.α-olefin copolymer (B3) is, like the propylene.α-olefin copolymer (B2), can be produced by polymerizing propylene, and at least one olefin selected from α-olefins having 2 to 20 carbon atoms (excluding propylene), in the presence of a catalyst for olefin polymerization comprising:

(a-2) a bridged metallocene compound represented by the following Formula [1-2], (b) at least one compound selected from:

(b-1) an organoaluminum oxy compound, (b-2) a compound which reacts with the bridged metallocene compound (a-2) to form an ion pair, and (b-3) an organoaluminum compound, but as long as the requirements as the propylene.αolefin copolymer (B3) are satisfied, the method for production is not limited thereto.

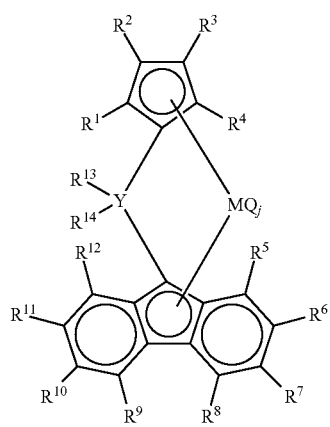

[1-2]

wherein in Formula [1-2], $R^1$, $R^2$, $R^3$, $R^4$, $R^5$, $R^8$, $R^9$ and $R^{12}$, which may be identical to or different from each other, are each an atom or a group selected from a hydrogen atom, a hydrocarbon group and a silicon-containing group;

$R^6$ and $R^{11}$ are the same atoms or same groups selected from a hydrogen atom, a hydrocarbon group and a silicon-containing group;

$R^7$ and $R^{10}$ are the same atoms or same groups selected from a hydrogen atom, a hydrocarbon group and a silicon-containing group;

all of $R^6$, $R^7$, $R^{10}$ and $R^{11}$ cannot be simultaneously hydrogen atoms;

$R^2$ and $R^3$ may be linked to each other to form a ring;

among $R^5$ to $R^{12}$, adjacent groups may be linked to each other to form a ring;

$R^{13}$ and $R^{14}$, which may be identical to and different from each other, are each selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms;

at least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms;

M is Ti, Zr or Hf;

Y is carbon or silicon;

Q is selected from a halogen, a hydrocarbon group, a neutral, conjugated or non-conjugated diene having 10 or fewer carbon atoms, an anion ligand, and a neutral ligand capable of coordination with a lone electron pair, in identical or different combinations; and j is an integer from 1 to 4.

Specific examples of this bridged metallocene compound (a-2) include the bridged metallocene compound (a-2a) described in the explanation of the present invention (4).

Furthermore, a compound resulting from replacing the "zirconium" of the compound described above (bridged metallocene compound (a-2a)) with "hafnium" or "titanium", as well as a metallocene compound having "difluoride", "dibromide" or "diiodide" instead of "dichloride", or having "dimethyl" or "methylethyl" instead of "dichloride", and the like are also likewise the metallocene compound represented by the General Formula [1-2].

The bridged metallocene compound (a-2) described above can be produced by a known method. As the known method for production, for example, the method for production described in the pamphlet of WO 2004/029062 filed by the present Applicant may be mentioned.

The metallocene compound as described above can be used alone or in combination of two or more species.

As the organoaluminum oxy compound (b-1) used in the production of the propylene.α-olefin copolymer (B3), the same compound as the organoaluminum oxy compound (b-1) used in the production of the syndiotactic propylene polymer (AA) is used.

As the compound (b-2) reacting with the bridged metallocene compound (a-2) to form an ion pair, used in the production of propylene.α-olefin copolymer (B3), the same compound as the compound (b-2) reacting with the bridged metallocene compound (a-2) to form an ion pair, used in the production of the syndiotactic propylene polymer (AA), is used.

As the organoaluminum compound (b-3) used in the production of the propylene.α-olefin copolymer (B3), the same compound as the organoaluminum compound (b-3) used in the production of the syndiotactic propylene polymer (AA) is used.

The respective components (a-2, b-1, b-2 and b-3) may be used, if necessary, after being supported on the particulate support (c).

Method for Producing Propylene.α-Olefin Copolymer (B3)

During polymerization of the propylene.α-olefin copolymer (B3), the method of using each component, and the order of addition are arbitrarily selected, but the following method may be mentioned.

Method of adding the component (a-2) and component (b) into the polymerization vessel in an arbitrary order.

According to the method described above, at least two or more of the catalyst components may be brought into contact in advance.

When polymerization of olefin is performed using the catalyst for olefin polymerization as described above, the component (a-2) is usually used in an amount of $10^{-9}$ to $10^{-1}$ moles, and preferably $10^{-8}$ to $10^{-2}$ moles, per liter of the reaction volume.

The component (b-1) is used in an amount such that the molar ratio of the component (b-1) and the total transition metal atoms (M) in the component (b-1) and the component (a-2) [(b-1)/M] is usually 0.01 to 5000, and preferably 0.05 to 2000. The component (b-2) is used in an amount such that the molar ratio of the aluminum atoms in the component (b-2) and the total transition metal (M) in the component (a-2) [(b-2)/M] is usually 1 to 1,000, and preferably 1 to 500. The component (b-3) is used in an amount such that the molar ratio of the component (b-3) and the transition metal atoms (M) in the component (b-3) and the component (a-2) [(b-3)/M] is usually 1 to 10,000, and preferably 1 to 5,000.

For the propylene.α-olefin copolymer (B3), propylene and at least one olefin selected from α-olefins having 2 to 20 carbon atoms (excluding propylene) are usually copolymerized in the liquid phase in the presence of the catalyst for olefin polymerization as described above. Here, hydrocarbon solvents are generally used, but α-olefins may also be used as the solvent. As the hydrocarbon medium, the same compounds as those described above may be specifically mentioned. Copolymerization can be performed in any mode such as batch mode or continuous mode.

Examples of the α-olefin that can be used in polymerization include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene and the like. The α-olefin can be used alone, or in combination of two or more species.

When performing copolymerization in batch mode using the catalyst for olefin polymerization, the concentration of the metallocene compound in the polymerization system used is usually 0.00005 to 1 millimoles, and preferably 0.0001 to 0.50 millimoles, per 1 liter of the polymerization volume.

Furthermore, the reaction time (average residence time in the case of performing copolymerization in the continuous mode) may vary depending on the conditions such as catalyst concentration, polymerization temperature and the like, but it is usually 5 minutes to 3 hours, and preferably 10 minutes to 1.5 hours.

The propylene and the at least one monomer selected α-olefins having 2 to 20 carbon atoms (excluding propylene) are respectively supplied in an amount such that a propylene.α-olefin copolymer (B3) of specific composition can be obtained as described above. Upon copolymerization, a molecular weight adjusting agent such as hydrogen can also be used.

When propylene and at least one olefin selected from α-olefins having 2 to 20 carbon atoms (excluding propylene) are copolymerized as described above, the propylene.α-olefin copolymer (B3) is usually obtained as a polymerization solution containing the same. This polymerization solution is treated according to conventional methods to obtain the propylene.α-olefin copolymer (B3).

The copolymerization reaction is usually performed under the conditions of a temperature of 40° C. to 200° C., preferably 40° C. to 180° C., and more preferably 50° C. to 150° C., and of a pressure of greater than 0 to 10 MPa, preferably 0.5 to 10 MPa, and more preferably 0.5 to 7 MPa.

[(C1) One or More Resins Selected from the Group Consisting of Rosin-Based Resins, Terpene-Based Resins and Petroleum Resins]

Among one or more resins (C1) selected from the group consisting of rosin-based resins, terpene-based resins and petroleum resins used in the present invention (6), examples of the rosin-based resin include natural rosins, polymerized rosins, rosins modified with maleic acid, fumaric acid, (meth) acrylic acid and the like, and rosin derivatives. These rosin derivatives include esterification products of the above-described natural rosins, polymerized rosins or modified rosins, phenol modified products and esterification products thereof, and the like. Hydrogenation products thereof are also included.

Also, examples of terpene-based resins include resins such as α-pinene, β-pinene, limonene, dipentene, terpene phenol, terpene alcohol, terpene aldehyde and the like, and aromatic-modified terpene-based resins obtained by polymerizing an aromatic monomer such as styrene to α-pinene, β-pinene, limonene, dipentene and the like, may also be mentioned. Hydrogenation products thereof are also included.

Furthermore, examples of petroleum resin include aliphatic petroleum resins having the C5 distillate fraction of tar-naphtha as the main ingredient, aromatic petroleum resins having the C9 distillate fraction as the main ingredient, and copolymerization petroleum resins thereof. That is, C5-based petroleum resins (resins polymerized with the C5 distillate fraction of naphtha-cracked oil), C9-based petroleum resins (resins polymerized with the C9 distillate fraction of naphtha-cracked oil), and C5C9-copolymerized petroleum resins (resins copolymerized with the C5 distillate fraction and C9 distillate fraction of naphtha-cracked oil), as well as styrenes, indenes in the tar-naphtha distillate fraction, coumarone, coumarone-indene-based resins containing dicyclopentadiene and the like, alkylphenol resins represented by a condensation product of p-tertiary butylphenol and acetylene, xylene-based resins formed by reacting o-xylene, p-xylene or m-xylene with formalin, and the like.

Also, the one or more resins (C1) selected from the group consisting of rosin-based resins, terpene-based resins and petroleum resins, which may be used in the present invention (6), are preferably in the form of hydrogenated derivatives since the derivatives have excellent weather resistance and discoloration resistance. The softening temperature of the resin (C1) determined by the ring and ball method is preferably in the range of 40 to 18° C. The number average molecular weight (Mn) molecular weight of the resin (C1) determined by GPC is preferably in the range of about 100 to 10,000.

As the one or more resins (C1) selected from the group comprising rosin-based resins, terpene-based resins and petroleum resins, which may be used in the present invention (6), commercially available products can be used.

[Non-Crosslinked or Partially Crosslinked Olefinic Thermoplastic Elastomer (C2)]

Hereinafter, the component (C2) used in the present invention (6) will be described in detail.

The non-crosslinked or partially crosslinked olefinic thermoplastic elastomer (C2) which may be used in the present invention (6) preferably contains polypropylene and an ethylene.α-olefin random copolymer containing a non-conjugated diene, but is not limited thereto. For example, a non-crosslinked or partially crosslinked olefinic thermoplastic elastomer containing polypropylene and an ethylene.α-olefin random copolymer may be used, and the α-olefin is preferably propylene or butene.

The MFR of the non-crosslinked or partially crosslinked olefinic thermoplastic elastomer (C2), as measured at 230° C. under a load of 10 kg, is preferably 0.001 to 100, and more preferably 0.01 to 80.

The melting point (Tm) of the non-crosslinked or partially crosslinked olefinic thermoplastic elastomer (C2), as measured from an endothermic curve of DSC, is preferably in the range of 120 to 165° C., and more preferably 130 to 160° C. The non-crosslinked or partially crosslinked olefinic thermoplastic elastomer (C2) is a non-crosslinked thermoplastic elastomer composition or a partially crosslinked thermoplastic elastomer composition, and is preferably composed of a crystalline polyolefin resin (C2-1) and an α-olefin copolymer rubber (C2-2).

[Crystalline Polyolefin Resin (C2-1)]

The crystalline polyolefin resin (C2-1) which may be used in the present invention (6) is a crystalline high molecular weight solid product obtainable by polymerizing one or two or more monoolefins by a high pressure method or a lower pressure method. Examples of such resin include isotactic and syndiotactic monoolefin polymer resins, but representative resins thereof are commercially available.

Specific examples of suitable raw material olefin for the crystalline polyolefin resin (C2-1) include ethylene, propylene, 1-butene, 1-pentene, 1-hexene, 2-methyl-1-propene, 3-methyl-1-pentene, 4-methyl-1-pentene, 5-methyl-1-hexene, 1-octene, 1-decene, and olefin mixture having two or more of these olefin mixed.

As the crystalline polyolefin resin (C2-1), particularly an isotactic polypropylene having a propylene content of 70 mol % or greater, and preferably having a propylene content of 80 mol % or greater, is suitably used.

The polymerization mode may be any of random type or block type, and any polymerization mode can be employed without any problem, as long as a resin-like product can be obtained. The MFR of the crystalline polyolefin resin (C2-1) (A-1STM A-4 1238-65 T, 230° C.) is usually in the range of 0.01 to 100 g/10 min, and particularly preferably 0.05 to 50 g/10 min.

The melting point (Tm) of the crystalline polyolefin resin (C2-1) used in the thermoplastic elastome (C2), as determined by an endothermic curve of DSC, is preferably in the range of 120 to 165° C., and more preferably 130° C. to 160° C. Also, the crystalline polyolefin resin (C2-1) may be the polypropylene exemplified as the syndiotactic polypropylene (AA), or may be a crystalline polyolefin other than the (AA).

The crystalline polyolefin resin (C2-1) plays a role in enhancing the flowability and heat resistance of the composition. According to the present invention (6), the crystalline polyolefin resin (C2-1) is used in a proportion of 10 to 60 parts by weight, and preferably 20 to 55 parts by weight, based on 100 parts by weight of the sum of amounts of the crystalline polyolefin resin (C2-1) and the α-olefin copolymer rubber (C2-2).

When the crystalline polyolefin resin (C2-1) is used in the proportion as described above, an olefinic thermoplastic elastomer composition having excellent rubber elasticity and excellent molding processability can be obtained.

[α-Olefin Copolymer Rubber (C2-2)]

The α-olefin polymer rubber (C2-2) used in the present invention (6) is a rubber obtained by copolymerizing an α-olefin having 2 to 20 carbon atoms, and preferably 2 to 12 carbon atoms, and if necessary, a non-conjugated polyene, for example, a non-conjugated diene.

Specific examples of the α-olefin include ethylene, propylene, 1-butene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene and the like.

According to the present invention (6), the α-olefins as described above may be used alone or as a mixture of two or more species. In the case of using 4-methyl-1-pentene and another α-olefin as a mixture, the molar ratio of the another α-olefin to 4-methyl-1-pentene (another α-olefin/4-methyl-1-pentene) is preferably in the range of 10/90 to 95/5.

Among the α-olefins, particularly ethylene, propylene and 1-butene are preferably used.

Examples of the α-olefin copolymer rubber (C2-2) include a copolymer containing constituent units derived from ethylene and constituent units derived from an α-olefin having 3 or more carbon atoms, wherein the ratio of the constituent units derived from ethylene and the constituent units derived from an α-olefin having 3 or more carbon atoms, ethylene/α-olefin having 3 or more carbon atoms (molar ratio), is 40/60 to 95/5.

Furthermore, specific examples of the non-conjugated polyene used in the present invention (6) as necessary, include dicyclopentadiene, 1,4-hexadiene, cyclooctadiene, methylenenorbornene, ethylidenenorbornene 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 9-methyl-1,8-undecadiene and the like. Among these, 5-ethylidene-2-norbornene, 5-vinyl-2-norbornene, dicyclopentadiene, 4,8-dimethyl-1,4,8-decatriene (DMDT), and 4-ethylidene-8-methyl-1,7-nonadiene (EMND) in particular are preferred.

According to the present invention (6), in the case of using non-conjugated polyenes as described above, for example, non-conjugated dienes, they may be used alone or as a mixture of two or more species. Furthermore, in addition to the non-conjugated polyenes as described above, other copolymerizable monomers may be used within the scope of not impairing the purpose of the present invention (6).

For the α-olefin polymer rubber (C2-2), when the non-conjugated polyene is copolymerized, the content of the constituent unit derived from the non-conjugated polyene in the copolymer is in the range of 0.01 to 30 mol %, preferably 0.1 to 20 mol %, and particularly preferably 0.1 to 10 mol % (provided that the total amount of the constituent unit in this α-olefin copolymer rubber (C2-2) is 100 mol %).

As the α-olefin copolymer rubber (C2-2), a copolymer of an α-olefin and a non-conjugated polyene is preferred. In particular, there may be preferably mentioned an ethylene.α-olefin having 3 or more carbon atoms non-conjugated polyene copolymer, wherein the ratio of ethylene and the α-olefin having 3 or more carbon atoms, ethylene/α-olefin having 3 or more carbon atoms (molar ratio), is 40/60 to 95/5, and constituent units derived from the non-conjugated polyene is contained in an amount of 0.01 to 30 mol %.

The intrinsic viscosity [η] of the α-olefin copolymer rubber (C2-2), as measured in a decalin solvent at 135° C., is in the range of 1.0 to 10.0 dl/g, and preferably 1.5 to 7 dl/g. Also, without any particularly limitation, the melting point of the α-olefin copolymer rubber (C2-2), as determined from an endothermic curve of DSC, is preferably either absent, or present at a temperature below 120° C.

According to the present invention (6), the α-olefin copolymer rubber (C2-2) is used in a proportion of 90 to 40 parts by weight, and preferably 80 to 45 parts by weight, based on 100 parts by weight of the sum of amounts of the crystalline polyolefin resin (C2-1) and the α-olefin copolymer rubber (C2-2).

The α-olefin copolymer rubber (C2-2) as described above can be produced by the following method. The α-olefin copolymer rubber (C2-2) can be produced but copolymerizing an α-olefin having 2 to 20 carbon atoms, and if necessary, a non-conjugated diene, in the presence of a catalyst for olefin polymerization.

The non-crosslinked or partially crosslinked olefinic thermoplastic elastomer composition (C2) may contain, in addition to the crystalline polyolefin resin (C2-1) and the α-olefin copolymer rubber (C2-2), a softening agent (C2-3) and/or an inorganic filler (C2-4) as optional components.

As the softening agent (C2-3), those softening agents that are usually used for rubber can be used, and specific examples thereof include petroleum-based materials such as process oils, lubricant oils, paraffin, liquid paraffin, petroleum asphalt, petrolatum and the like; coal tar such as coal tar, coal tar pitch and the like; fatty oils such as castor oil, linseed oil, rapeseed oil, soybean oil, palm oil and the like; waxes such as tall oil, beeswax, carnauba wax, lanoline and the like; fatty acids or metal salts thereof, such as ricinolic acid, palmitic acid, stearic acid, barium stearate, calcium stearate and the like; synthetic polymeric materials such as petroleum resins, coumarone-indene resins, atactic polypropylene and the like; ester-based plasticizers such as dioctyl phthalate, dioctyl adipate, dioctyl sebacate and the like; and microcrystalline waxes, sabu (factice), liquid polybutadiene, modified liquid polybutadiene, liquid thiocole, and the like.

According to the present invention (6), the softening agent (C2-3) is used in a proportion of usually 200 parts by weight or less, and preferably 2 to 100 parts by weight, based on 100 parts by weight of the sum of amounts of the crystalline polyolefin resin (C2-1) and the α-olefin copolymer rubber (C2-2).

As the inorganic filler (C2-4), specifically calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, Shirasu balloon, and the like may be mentioned.

According to the present invention (6), the inorganic filler (C2-4) is used in a proportion of usually 100 parts by weight or less, and preferably 2 to 50 parts by weight, based on 100 parts by weight of the sum of amounts of the crystalline polyolefin resin (C2-1) and the α-olefin copolymer rubber (C2-2). According to the present invention (6), when the amount of use of the inorganic filler (C2-4) exceeds 100 parts by weight, rubber elasticity and molding processability of the resulting thermoplastic elastomer composition tend to be deteriorated.

Furthermore, the partially crosslinked olefinic thermoplastic elastomer composition can be obtained under the presence of organic peroxide compounds described-below by dynamically heat treating a mixture of the above-described crystalline polyolefin resin (C2-1), the α-olefin copolymer rubber (C2-2), and the softening agent (C2-3) and/or inorganic filler (C2-4) which are added as necessary, thus to perform partial crosslinking.

The term "dynamically heat treating" as used herein refers to kneading in a molten state. Specific examples of the organic peroxide include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide, tert-butylcumyl peroxide and the like.

Such organic peroxide is used in an amount of 0.02 to 3 parts by weight, and preferably 0.05 to 1 parts by weight, based on 100 parts by weight of the entire material to be treated, that is, the sum of amounts of the crystalline polyolefin resin (C2-1) and the α-olefin copolymer rubber (C2-2). When this amount of mixing is smaller than the above range, the degree of crosslinking of the resulting thermoplastic elastomer composition is low, and thus heat resistance, tensile properties, elastic recovery and rebound resilience and the like are insufficient. Also, when this amount of mixing is larger than the above range, the resulting thermoplastic elastomer composition has a degree of crosslinking so high that moldability may be deteriorated.

According to the present invention (6), during the partial crosslinking treatment by the organic peroxide, a peroxy crosslinking aid such as sulfur, p-quinonedioxime, p,p'-dibenzoylquinonedioxime, N-methyl-N,N'-m-phenylenedimaleimide or the like; a polyfunctional methacrylate monomer of divinylbenzene, triallyl cyanurate, ethylene glycol dimethacrylate, polyethylene glycol dimethacrylate, trimethylolpropane trimethacrylate, acryl methacrylate or the like; or a polyfunctional vinyl monomer such as vinyl butyrate or vinyl stearate may be added therein.

By using a compound as described above, such as a crosslinking aid, a uniform and mild crosslinking reaction can be expected. Such compound as crosslinking aid or polyfunctional vinyl monomer is used in an amount of usually 2 parts by weight or less, and more preferably 0.3 to 1 parts by weight, based on 100 parts by weight of the entire material to be treated.

Furthermore, to promote degradation of the organic peroxide, a degradation promoting agent such as a tertiary amine such as triethylamine, tributylamine, 2,4,6-tri(dimethylamino)phenol or the like, or a naphthenate salt of aluminum, cobalt, vanadium, copper, calcium, zirconium, manganese, magnesium, lead, mercury or the like may also be used.

The dynamic heat treatment in the present invention (6) is preferably performed in a non-open type apparatus, and preferably in an atmosphere of inert gas such as nitrogen, carbon dioxide gas or the like. The temperature is in the range of from the melting point of the crystalline polyolefin resin (C2-1) to 300° C., and usually 150 to 250° C., and preferably 170 to 225° C. The kneading time is usually 1 to 20 minutes, and preferably 1 to 10 minutes. The applied shear force is, in terms of the shear rate, 10 to 100,000 $\sec^{-1}$, and preferably 100 to 50,000 $\sec^{-1}$.

As the kneading apparatus, a mixing roll, an intensive mixer (for example, a Banbury mixer, a kneader), a single screw or twin screw extruder and the like can be used, but a non-open type apparatus is preferred.

An olefinic thermoplastic elastomer composition which comprises the crystalline polyolefin resin (C2-1) and the α-olefin copolymer rubber (C2-2), or which is partially crosslinked, can be obtained by the above-described dynamic heat treatment.

According to the present invention (6), the thermoplastic elastomer composition being partially crosslinked indicates that the gel content as measured by the method that will be described later is 20% or greater, preferably in the range of 20 to 99.5%, and particularly preferably 45 to 98%. Measurement of the gel content can be performed by weighing 100 mg of a sample of the thermoplastic elastomer composition, cutting this to small pieces of 0.5 mm×0.5 mm×0.5 mm, immersing the sample pieces in 30 ml of cyclohexane in a sealed vessel at 23° C. for 48 hours, subsequently removing the sample pieces on a filter paper, and drying at room temperature for 72 hours or more until a constant weight is obtained.

From this dried residual weight, the weight of all cyclohexane-insoluble components other than the polymer components (fiber-shaped filler, filler, pigment, etc.) and the weight of the crystalline polyolefin resin (C2-1) in the sample prior to immersion in cyclohexane are subtracted, and the result is designated as "corrected final weight [y]".

Meanwhile, the weight of the α-olefin copolymer (C2-2) in the sample is designated as "corrected initial weight [x]". Herein, the gel content is determined by the following equation.

Gel content [wt %]=(corrected final weight [y]/corrected initial weight [x])×100.

Propylene-Based Polymer Composition (X3)

The propylene-based polymer composition (X3) of the present invention (6) comprises:

(AA) 10 to 95 parts by weight, preferably 15 to 90 parts by weight, of the syndiotactic propylene polymer, and (B3) 90 to 5 parts by weight, preferably 85 to 10 parts by weight, of the propylene.α-olefin copolymer (provided that the sum of amounts of (AA) and (B3) is 100 parts by weight).

A composition (X3) having the mixing ratio of the syndiotactic propylene polymer (AA) and the propylene.α-olefin copolymer within this range has excellent moldability and heat resistance, as well as excellent flexibility, scratch resistance and abrasion resistance, which is preferable.

As a material having high heat resistance, and excellent flexibility, abrasion resistance, scratch resistance, damping properties and tackiness, a propylene polymer composition (X3) (composition (X3i) comprising:

(AA) 10 to 95 parts by weight, preferably 15 to 90 parts by weight, of the syndiotactic propylene polymer, (B3) 90 to 5 parts by weight, preferably 85 to 10 parts by weight, of the propylene.α-olefin copolymer (provided that the sum of amounts of (AA) and (B3) is 100 parts by weight), and 0.1 to 100 parts by weight in total of one or more resins (C1) selected from the group consisting of rosin-based resins, terpene-based resins and petroleum resins) may be preferably mentioned.

The one or more resins (C1) selected from the group consisting of rosin-based resins, terpene-based resins and petroleum resins is used in an amount of preferably 1 to 90 parts by weight, more preferably 1 to 80 parts by weight, and even more preferably 2 to 70 parts by weight. When (C1) is contained within the above range, the propylene-based polymer composition (X3) has excellent tackiness. Also, the composition (X3i) can be provided as a composition having excellent transparency.

As a material having high heat resistance, as well as excellent abrasion resistance, scratch resistance and low temperature impact resistance, a propylene-based polymer composition (X3) (composition (X3ii) comprising:

(AA) 10 to 95 parts by weight, preferably 15 to 90 parts by weight, of the syndiotactic propylene polymer, (B3) 90 to 5 parts by weight, preferably 85 to 10 parts by weight, of the propylene.α-olefin copolymer (provided that the sum of amounts of (AA) and (B3) is 100 parts by weight), and 0.1 to 500 parts by weight of the non-crosslinked or crosslinked olefinic thermoplastic elastomer (C2)) may be preferably mentioned. The content of the elastomer (C2) is more preferably 1 to 500 parts by weight, and even more preferably 50 to 400 parts by weight.

The composition of the present invention (6) can be provided as a material having particularly excellent moldability and heat resistance, as well as excellent flexibility, scratch resistance and abrasion resistance.

Herein, moldability being excellent indicates that in the case of carrying out molding such as injection molding, inflation molding, blow molding, extrusion, foam or press molding, the time taken from the molten state to the solid state is short. In the case of moldability being excellent, molding cycle properties, shape stability, long-term productivity and the like are also excellent.

Specifically, the time to solidification is such that the half-crystallization time ($t_{1/2}$) during the isothermal crystallization measurement at 110° C. as determined by differential scanning calorimetry (DSC) is in the range of 1000 sec or less, and more preferably 500 sec or less. Also, the half-crystallization time ($t_{1/2}$) determined from the isothermal crystallization measurement at 110° C. as determined by differential scanning calorimetry (DSC) may be referred to as property (1). The composition of the present invention (6) has remarkably improved $t_{1/2}$, compared to prior art, by containing specific components (AA) and (B3), and for example, can be molded without difficulties by generally used molding methods for isotactic polypropylene.

The half-crystallization time ($t_{1/2}$) determined by isothermal crystallization measurement is, when the area between the DSC caloric curve and the baseline during the isothermal crystallization process is considered as the total calories, the time taken to reach 50% of the calories. For details, refer to technical literatures such as New Lectures on Polymer Experiments, 8. Properties of Polymers (Shin-koubunsizikkenkouza 8 Koubunsi no Bussei) (KYORITSU SHUPPAN CO., LTD.)].

Measurement of the half-crystallization time ($t_{1/2}$) is performed as follows. About 5.00 mg of a sample is filled in an aluminum pan for exclusive use, and the half-crystallization time is determined from a DSC curve obtained by heating the sample from 30° C. to 200° C. at a rate of 320° C./min, maintaining at 200° C. for 5 minutes, cooling from that temperature (200° C.) to the isothermal crystallization temperature of 110° C. at a rate of 320° C./min, and maintaining the temperature at 110° C., using DSCPyris1 or DSC7 manufactured by PerkinElmer, Inc. Here, the half-crystallization time ($t_{1/2}$) is determined by setting the initial time of the isothermal crystallization process (the time to reach the isothermal crystallization temperature of 110° C. from 200° C.) as t=0. For the composition of the present invention (6), $t_{1/2}$ can be determined as described above, but when crystallization does not occur at any isothermal crystallization temperature, for example, at 110° C., then measurement is taken for convenience at several points at an isothermal crystallization temperature at or below 110° C., and the half crystallization time ($t_{1/2}$) is determined from the extrapolated value.

The propylene polymer composition (X3) of the present invention (6) preferably satisfies any one of the following (1) and (2), and it is more preferable that (1) and (2) are respectively in their preferred ranges.

(1) The half-crystallization time ($t_{1/2}$) is preferably 1000 sec or shorter, and more preferably 500 sec or shorter.

(2) The softening temperature measured by TMA is preferably 110° C. or higher, more preferably 120° C. or higher, and particularly preferably 130° C. or higher.

The composition (X3i) which is a preferred embodiment of the present invention (6), preferably satisfies at least one of the following (i-1) to (i-3); more preferably either satisfies (i-1) and (i-3), or satisfies (i-2) and (i-3); and even more preferably satisfies all of (i-1) to (i-3).

(i-1) The half-crystallization time ($t_{1/2}$) is preferably 1000 sec or shorter, and more preferably 500 sec or shorter.

(i-2) The softening temperature measured by TMA is preferably 110° C. or higher, more preferably 120° C. or higher, and particularly preferably 130° C. or higher.

(i-3) The modulus of rebound resilience measured according to JIS K6255 is preferably 40% or less, more preferably 35% or less, and even more preferably 30% or less.

The composition (X3i) more preferably also satisfies the following (i-7).

(i-7) The internal haze is preferably 50% or less, and more preferably 30% or less.

The composition (X3i) particularly preferably satisfies the following (i-6).

(i-6) The tensile modulus is in the range of 1 MPa to 1000 MPa, preferably 1 to 800 MPa, more preferably 10 MPa to 500 MPa.

The composition (X3ii), which is a preferred embodiment of the present invention (6), preferably satisfies one or more of the following (ii-1), (ii-2), (ii-4) and (ii-5); more preferably either satisfies (ii-1) and (ii-5), or satisfies (ii-2) and (ii-5); even more preferably either satisfies (ii-1), (ii-5) and (ii-4), or satisfies (ii-2), (ii-5) and (ii-4); and still more preferably satisfies all of (ii-1), (ii-2), (ii-4) and (ii-5).

(ii-1) The half-crystallization time ($t_{1/2}$) is preferably 1000 sec or shorter, and more preferably 500 sec or shorter.

(ii-2) The softening temperature measured by TMA is preferably 145° C. or higher, and more preferably 147° C.

(ii-4) The Izod impact strength is preferably 50 J/m or greater, and more preferably 100 J/m.

(ii-5) The gross rate of change before and after Gakushin abrasion test is preferably 40(%) or less, and more preferably 30(%) or less.

Also, the composition (X3ii) of the present invention (6) more preferably satisfies the following (ii-6).

(ii-6) The tensile modulus is in the range of preferably 1 MPa to 1000 MPa, more preferably in the range of 1 MPa to 500 MPa, and even more preferably in the range of 1 MPa to 200 MPa.

The softening temperature (property (2), or may also be referred to as the needle penetration temperature) measured by TMA can be measured as follows.

Using SS-120 manufactured by Seiko Co., Ltd. or Q-400 manufactured by TA Instrument, and using a specimen of press sheet having a thickness of 1 mm, a pressure of 2 kgf/cm$^2$ is applied with a planar indentor of 1.8 mm $\phi$ at a rate of temperature increase of 5° C./min, and the needle penetration temperature (° C.) is determined from the TMA curve.

Furthermore, measurement methods for the modulus of rebound resilience (may be referred to as property (3)), the Izod impact strength (may be referred to as property (4)), the gross rate of change (may be referred to as property (5)), the tensile modulus (may be referred to as property (6)), and the haze (may be referred to as property (7)) will be described below.

(3) Modulus of Rebound Resilience

The modulus of rebound resilience measured according to JIS K6255 is preferably 40% or less, more preferably 35% or less, and particularly preferably 30% or less.

(4) Izod Impact Strength

A specimen of 12.7 mm (width)×3.2 mm (thickness)×64 mm (length) is punched from a press sheet having a thickness of 3 mm, a notch is inserted by machine processing, and the Izod impact strength is measured at 0° C. An average of three measurements was taken as the value.

(5) Gross Rate of Change

The gross rate of change before and after a JSPS type abrasion test is preferably 40(%) or less, and more preferably 30(%) or less.

(6) Tensile Modulus

A press sheet having a thickness of 1 mm is punched for No. JIS3 dumbbell according to JIS K6301, and the specimen is provided as evaluation sample. The measurement is performed, for example, by measuring the tensile modulus using a tensile tester Inston 1123 manufactured by Instron, Inc. at a span interval of 30 mm and a tensile rate of 30 mm/min at 23° C., and an average value of three measurements is determined.

(7) Haze

The internal haze is measured using a press sheet specimen having a thickness of 1 mm, and using a digital hazemeter "NDH-20D" manufactured by Nippon Denshoku Industries Co., Ltd. An average value of two measurements is determined.

Also, for the description above, in the respective tests, specimens were obtained by producing a sheet having a predetermined thickness by pre-heating the sample at 200° C. for 5 minutes to 10 minutes in a press molding machine, subsequently molding the sheet for 1 to 2 minutes under a pressure of 10 MPa, and then cooling the sheet at 20° C. under a pressure of 10 MPa.

Graft Modification

In the propylene-based polymer composition (X3) of the present invention (6), at least a part or the entirety may be graft modified with a polar monomer.

For example, a part or all of the component (AA) may be graft modified, a part or all of the component (B3) may be graft modified, and a part or all of each of the component (AA) and component (B3) may be graft modified.

This polar monomer may be exemplified by a hydroxyl group-containing ethylenic unsaturated compound, an amino group-containing ethylenic unsaturated compound, an epoxy group-containing ethylenic unsaturated compound, an aromatic vinyl compound, an unsaturated carboxylic acid or a derivative thereof, a vinyl ester compound, vinyl chloride, a carbodiimide compound, or the like.

As the polar monomer, in particular, the unsaturated carboxylic acid or its derivatives are particularly preferred. As the unsaturated carboxylic acid or its derivatives, an unsaturated compound having at least one carboxylic acid group, an ester of a compound having a carboxylic acid group and an alkyl alcohol, an unsaturated compound having at least one anhydrous carboxylic acid group, or the like, and as the unsaturated group, a vinyl group, a vinylene group, an unsaturated cyclic hydrocarbon group, or the like.

Specific examples of the compound include unsaturated carboxylic acids such as acrylic acid, maleic acid, fumaric acid, tetrahydrophthalic acid, itaconic acid, citraconic acid, crotonic acid, isocrotonic acid, Nadic acid [trade name] (endocis-bicyclo[2.2.1]hept-5-ene-2,3-dicarboxylic acid) and the like; or derivatives thereof, for example, acid halides, amides, imides, anhydrides, esters and the like. Specific examples of these derivatives include, for example, malenyl chloride, maleimide, maleic anhydride, citraconic anhydride, monomethyl maleate, dimethyl maleate, glycidyl maleate and the like.

These unsaturated carboxylic acids and/or derivatives thereof may be used individually or in combination of two or more species. Among these, an unsaturated dicarboxylic acid or an acid anhydride thereof is suitable, and particularly maleic acid, Nadic acid or acid anhydrides thereof are preferably used.

Modification can be obtained by graft polymerizing a polar monomer to a product to be modified. When graft polymerizing such polar monomer to the product to be modified, the polar monomer is usually used in an amount of 1 to 100 parts by weight, preferably 5 to 80 parts by weight, based on 100 parts by weight of the product to be modified. This graft polymerization is generally performed in the presence of a radical initiator.

As the radical initiator, an organic peroxide, an azo compound or the like may be used.

The radical initiator can be used after directly mixing with the product to be modified and the polar monomer, but may be used after dissolving the initiator in a small amount of an organic solvent. This organic solvent is not particularly limited for use, as long as it is an organic solvent which can dissolve the radical initiator.

Also, upon graft polymerizing a polar monomer to the product to be modified, a reducing substance can be used. If a reducing substance is used, the amount of the polar monomer to be grafted can be enhanced.

Graft modification of the product to be modified with a polar monomer can be performed by a conventionally known method, and for example, can be performed by dissolving the product to be modified in an organic solvent, subsequently adding a polar monomer, a radical initiator and the like to the solution, and allowing the mixture to react at a temperature of 70 to 200° C., and preferably 80 to 190° C., for 0.5 to 15 hours, and preferably 1 to 10 hours.

Also, a modified propylene-based polymer composition can be produced by reacting the product to be modified with a polar monomer, using an extruder or the like. This reaction is preferably performed at a temperature usually above the melting point of the product to be modified, specifically in the case of modifying the component (B3), at a temperature of 120 to 300° C., and preferably 120 to 250° C., usually for 0.5 to 10 minutes. Also, in the case of modifying a product to be modified containing the component (AA), for example, the reaction is preferably performed at a temperature of 160 to 300° C., and preferably 180° C. to 250° C., usually for 0.5 to 10 minutes.

The amount of modification of the modified product thus obtained (amount of the polar monomer to be grafted) is usually 0.1 to 50 wt %, preferably 0.2 to 30 wt %, and more preferably 0.2 to 10 wt %, when the modified product is taken as 100 wt %.

In the present invention (6), a propylene-based polymer composition (X3) of the present invention (6), which is at least partially graft modified, can be obtained by using these modified products, and kneading, if necessary, the products with one or more unmodified products selected from the component (AA) and component (B3).

Furthermore, the content of the polar monomer relative to 100 wt % of the propylene-based polymer composition (X3) having at least partially graft modified by the polar monomer is usually 0.001 to 50 wt %, preferably 0.001 to 10 wt %, more preferably 0.001 to 5 wt %, and even more preferably 0.01 to 3 wt %. Control of the content of the polar monomer can be easily performed, for example, by appropriately selecting the grafting conditions.

When the propylene-based polymer composition (X3) of the present invention (6) is at least partially graft modified by a polar monomer, the composition has excellent adhesiveness to other resins and excellent compatibility, and also, the surface wettability of the molded product obtained from the propylene-based polymer composition may be improved.

Also, by at least partially graft modifying the composition, compatibility with other materials or adhesiveness may be added, while maintaining the performance of the propylene-based polymer composition (X3) of the present invention (6), such as low temperature impact resistance, mechanical properties (rigidity or flexibility), heat resistance, and the like.

When the content of the polar monomer, for example, an unsaturated carboxylic acid and/or a derivative thereof, is within in the mentioned range, the polyolefine composition (X3) of the present invention (6) shows high adhesive strength to polar group-containing resins (for example, polyesters, polyvinyl alcohols, ethylene-vinyl alcohol copolymers, polyamides, PMMA, polycarbonates, etc.).

The at least partially graft modified propylene-based polymer composition (X3) of the present invention (6) may have added other polymers, for example, thermoplastic resins or elastomers, within the scope of not impairing the properties possessed by the modified product. Such addition may be carried out by mixing during the graft modification step, or after modification.

The propylene-based polymer composition (X3) of the present invention (6) may have incorporated, within the scope of not impairing the purpose of the present invention, additives such as a weather resistant stabilizer, a heat resistant stabilizer, an antistatic agent, an anti-slipping agent, an anti-blocking agent, an anti-fogging agent, a nucleating agent, a lubricating agent, a dye, a pigment, a plasticizer, an anti-aging agent, a hydrochloric acid absorbent, an antioxidant, and the like.

The propylene-based polymer composition (X3) of the present invention (6) may contain polyethylene, isotactic polypropylene or styrene-based elastomers, but a composition not containing polyethylene, isotactic polypropylene or styrene-based elastomers is also an embodiment.

Also, the propylene-based polymer composition (X3) of the present invention (6) may contain a nucleating agent, which is a specific arbitrary component, in order to improve the moldability, that is, to increase the crystallization temperature and increase the rate of crystallization. In this case, for example, the nucleating agent is a dibenzylidene sorbitol-based nucleating agent, phosphoric acid ester-based nucleating agent, a rosin-based nucleating agent, a benzoic acid metal salt-based nucleating agent, a fluorinated polyethylene, sodium 2,2-methylenebis(4,6-di-tert-butylphenyl)phosphate, pimellic acid or a salt thereof, 2,6-naphthalenic acid dicarboxylic acid dicyclohexylamide, or the like. The amount of mixing is not particularly limited, but the amount is preferably about 0.1 to 1 part by weight based on 100 parts by weight of the propylene based polymer composition. The timing for mixing is not particularly limited, and addition is possible during or after polymerization, or during the molding process.

Method for Producing Propylene-Based Polymer Composition (X3)

The propylene-based polymer composition (X3) as described above can be produced by various methods that are known in the scope described above, for example, by multi-stage polymerizing the respective components in the continuous mode or batch mode in a slurry phase, solution phase or gas phase, by mixing the respective components in a Henschel mixer, a V-blender, a ribbon blender, a tumbler blender or the like, or by melt kneading the respective components in a single screw extruder, a twin screw extruder, a kneader, a Bunbury mixer or the like, and then granulating or grinding.

Molded Products Formed Using Propylene-Based Polymer Composition of the Present Inventions (4), (5) or (6)

The propylene-based polymer composition of the present invention (4) as described above, and the propylene-based polymer composition of the invention present (5) as described above have excellent moldability and heat resistance, and molded products having excellent flexibility, transparency and scratch resistance can be obtained. On the other hand, the propylene-based polymer composition of the present invention (6) as described above has excellent moldability and heat resistance, and molded products having excellent flexibility, scratch resistance, damping properties and low temperature impact properties can be obtained. Thus, it was practically difficult to use conventional syndiotactic polypropylene. Being widely used in polyolefin applications, particularly, the propylene-based polymer composition of the present invention (4), the propylene-based polymer composition of the invention present (5) or the propylene-based polymer composition of the present invention (6) (hereinafter, they may be collectively referred to as "propylene-based polymer composition (X)") in particular can be molded into, for example, sheets, unstretched or stretched films, filaments, and other molded products of various shapes. Furthermore, the molded products formed using the propylene-based polymer composition (X) may have the propylene-based polymer composition (X) partially contained in the molded products, that is, the propylene-based polymer composition (X) may be used in parts of the molded products, and also the propylene-based polymer composition (X) may be used in the entirety of the molded products. As an example of using the propylene-based polymer composition (X) in parts of a molded product, a multilayer laminate may be mentioned. The multilayer laminate may be specifically a laminate in which at least one layer is a layer comprising the propylene-based polymer composition (X), and multilayer films and sheets, multilayer containers, multilayer tubes, multilayer film laminate contained in aqueous coating materials as one constituent component, and the like may be mentioned.

As the molded products, specifically those molded products can be obtained by known thermal molding methods such as extrusion molding, injection molding, inflation molding, blow molding, extrusion blow molding, injection blow molding, press molding, vacuum molding, calender molding, expansion molding, powder slash molding, and the like. Hereinafter, various examples of molded products will be described.

In the case where the molded product of the present invention is, for example, an extrusion molded product, the shape and the product type are not particularly limited, but for example, sheets, films (unstretched), pipes, hoses, wire coatings, tubes and the like may be mentioned, and particularly sheets (skin materials), films, tubes, catheters, monofilaments (non-woven fabrics) and the like are preferable.

Upon extrusion molding the propylene-based polymer composition (X), conventionally known extrusion apparatuses and molding conditions may be employed, and for example, using a single screw extruder, a kneading extruder, a ram extruder, a gear extruder and the like, a desired shape can be molded by extruding a molten propylene-based composition through a certain die or the like.

A stretched film can be obtained by stretching an extruded sheet or extruded film (unstretched) as described above by a known stretching method such as, for example, a tentering method (longitudinal transverse stretching, transverse longitudinal stretching), a simultaneous biaxial stretching method, a uniaxial stretching method or the like.

The draw ratio employed during stretching a sheet or an unstretched film is typically about 20 to 70 times in the case of biaxial stretching, and typically about 2 to 10 times in the case of uniaxial stretching. It is preferable to obtain a stretched film having a thickness of about 5 to 200 μm by stretching.

An inflation film can be also produced as a film-shaped molded product. Drawdown is unlikely to occur during the process of inflation molding.

The sheet and film molded products formed using the propylene-based polymer composition (X) are not likely to be statically charged, and are excellent in mechanical properties, heat resistance, resilience, impact resistance, aging resistance, transparency, visibility, gloss, rigidity, moisture-proof properties and gas barrier properties. The products can be widely used as packaging films and the like.

In this case, the sheet and film molded products formed using the propylene-based polymer composition (X) may be multilayer molded products, and may be used as multilayer laminates containing the propylene-based polymer composition (X) in at least one layer.

A filament molded product can be produced by, for example, extruding the molten propylene based polymer composition (X) through a spinneret. Specifically, a spun-bonding method or a melt blown method is suitably used. A filament thus obtained may be further stretched. This stretching may be performed so that the molecules become oriented in at least one axial direction of the filament, and it is usually desirable to perform stretching at a draw ratio of about 5 to 10 times. The filament obtained from the propylene based polymer composition (X) according to the present invention is hardly charged, and is excellent in transparency, rigidity, thermal resistance, impact resistance and resilience.

An injection molded product can be produced by injection molding the propylene-based polymer composition (X) into various shapes using conventionally known injection molding apparatuses and employing known conditions. The injection molded product obtained using the propylene-based polymer composition (X) is not likely to be statically charged, is excellent in transparency, rigidity, thermal resistance, impact resistance, surface gloss, chemical resistance, abrasion resistance and the like, and can be used widely as a trimming material for automobile interior decoration, a material for automobile exterior decoration, housing for household electric appliances, containers, and the like.

A blow molded product can be produced by blow molding the propylene-based polymer composition (X) by using conventionally known blow molding apparatuses and employing known conditions. In this case, the blow molded product formed from the propylene-based polymer composition (X) may be a multilayer molded product, and contains the propylene-based polymer composition (X) in at least one layer.

For example, in extrusion blow molding, the propylene-based polymer composition (X) is extruded from a die in a molten state at a resin temperature of 100 to 300° C. to form a tube-shaped parison. Then, after retaining the parison in a mold of a desired shape, air is blown in to make the parison fit the mold at a resin temperature of 130 to 300° C., and thereby a hollow molded product can be produced. It is desirable that the draw (blow) ratio is about 1.5 to 5 times in the transverse direction.

In injection blow molding, the propylene-based polymer composition (X) is injected into a parison-mold at a resin temperature of 100° C. to 300° C. After retaining the parison in a mold of the desired shape, air is blown in to make the parison fit the mold at a resin temperature of 120° C. to 300° C., and thereby a hollow molded product can be produced. In obtaining the hollow molded product, it is desirable that the draw (blow) ratio is 1.1 to 1.8 times in the longitudinal direction and 1.3 to 2.5 times in the transverse direction.

Blow molded products obtained from the propylene-based polymer composition (X) has excellent transparency, rigidity, flexibility, thermal resistance and impact resistance, and is also excellent in moisture-proof properties.

As a press molded product, mold stamping molded products may be mentioned. For example, when a base material and a skin material are simultaneously press molded to perform composite integration molding (mold stamping molding) of the two materials, the base material can be formed from the propylene-based polymer composition (X).

Specific examples of such mold stamping molded product include the materials for automobile interior decoration, such as door trims, rear package trims, seat back garnishes, instrument panels, and the like.

Press molded products formed using the propylene-based polymer composition (X) are not likely to be statically charged, and are excellent in flexibility, thermal resistance, transparency, impact resistance, aging resistance, surface gloss, chemical resistance, abrasion resistance and the like.

Expanded molded products formed using the propylene-based polymer composition (X) can be obtained at high expansion ratios, and also have good injection moldability, as well as high rigidity and material strength.

The propylene-based polymer composition (X) can be produced into vacuum molded products such as interior decoration skin materials for automobile instrument panels, door trims and the like. The molded products are not likely to be statically charged, and are excellent in flexibility, heat resistance, impact resistance, aging resistance, surface gloss, chemical resistance, abrasion resistance and the like.

The propylene-based polymer composition (X) can be produced into powder slash molded products such as automobile parts, electric appliance parts, toys, miscellaneous goods and the like can be produced. The molded products are not likely to be statically charged, and are excellent in flexibility, heat resistance, impact resistance, aging resistance, surface gloss, chemical resistance, abrasion resistance and the like.

Also, as the molded product of the present invention, a laminate having at least one layer of a layer comprising the propylene-based polymer composition (X) may be mentioned.

The propylene-based polymer composition (X) of the present invention is appropriate in, for example, containers or non-woven fabrics. Such container may be exemplified by food containers such as freeze storage containers, retort pouches and the like, bottle containers and the like. Also, medical containers, infusion bags and the like may also be mentioned.

As described above, the propylene-based polymer composition (X) can be widely used in applications such as, for example, infusion bags, medical containers, automobile interior and exterior decorating materials, beverage bottles, apparel cases, food packaging materials, retort containers, PET replacements, pipes, transparent substrates, transparent sealants, porous films, masking films, films for condenser, laminates (including glass), expanded products, reflective films, dicing films, wire cables, soundproofing materials, damping materials, expanded materials, construction materials, automobile skin materials, solar cell sealing materials, radiation resistant films, γ-ray resistant films, flowmark modifiers, non-woven fabrics, modified materials, shape memory materials, films for composite glass, bulletproof materials, bulletproof glass films, protective films, adhesives, compatibilized materials (for example, may be graft modified), shrinkable films and the like.

The polypropylene-based resin film of the present invention (7) (usually refers to a polypropylene-based resin monolayer film; the term 'monolayer' does not exclude the case where a layer other than the polypropylene film is laminated) is a polypropylene-based resin film simultaneously satisfying the following requirements (1) to (3), preferably at least one requirement selected from the requirements (4) to (7) in addition to the requirements (1) to (3), and more preferably all of the requirements (4) to (7) in addition to the requirements (1) to (3).

The thickness of the polypropylene-based resin film of the present invention (7) is in the range of 10 to 500 μm, preferably 100 to 400 μm, and more preferably 100 to 300 μm. Within the above range, the polypropylene-based resin film simultaneously satisfying the requirements (1) to (3) can be stably molded.

<Requirement (1)>

Young's modulus of the polypropylene-based resin film of the present invention (7) is in the range of 10 to 500 MPa, preferably 50 to 400 MPa, as measured according to JIS K6781. When the Young's modulus falls outside this range, flexibility may not be maintained after the retort treatment (hot water sterilization treatment under pressure).

<Requirement (2)>

Tensile impact strength of the polypropylene-based resin film of the present invention (7) measured at 0° C. is in the range of 50 to 1,000 kJ/m$^2$, preferably 100 to 1,000 kJ/m$^2$. When the tensile impact strength is less than 50 kJ/m$^2$, leak of contents from a container made from the polypropylene-based resin film filled with food or medicine may be caused when the container stored at low temperature is dropped.

<Requirement (3)>

Light transmittance of the polypropylene-based resin film of the present invention (7) is in the range of 85 to 99%, preferably 85 to 95%, and the rate of decrease in light transmittance after hot water treatment at 120° C. for 30 minutes is less than 15%, preferably less than 10%. When the light transmittance is less than 80%, visual identification of the content from outside the container may be difficult depending on the content. Meanwhile, when the light transmittance is more than 95%, it is practically difficult to produce the polypropylene-based resin film of the present invention which simultaneously satisfies all of the requirements other than the present requirement. When the rate of decrease in light transmittance after the hot water treatment is 15% or more, transparency significantly deteriorates by a sterilization treatment at high temperature of 121° C. Herein, 'light transmittance' can be measured according to the method described in Examples that will be described later. Also, 'rate of decrease in light transmittance' is a value calculated from the following equation.

$$\begin{pmatrix} \text{Rate of decrease} \\ \text{in Light} \\ \text{Transmittance} \end{pmatrix} = \frac{\begin{pmatrix} \text{light transmittance before} \\ \text{hot water treatment} \end{pmatrix} - \begin{pmatrix} \text{light transmittance after} \\ \text{hot water treatment} \end{pmatrix}}{\begin{pmatrix} \text{light transmittance before} \\ \text{hot water treatment} \end{pmatrix}} \times 100$$

<Requirement (4)>

Tm of the polypropylene-based resin film of the present invention (7) as measured by differential scanning calorimetry (DSC) is preferably 145° C. or higher, more preferably 145 to 170° C., even more preferably 150 to 170° C., and particularly preferably 154 to 170° C. Within this range, excellent heat resistance can be exhibited.

<Requirement (5)>

The polypropylene-based resin constituting the polypropylene-based resin film of the present invention (7) is preferably a polypropylene-based resin composition formed from a syndiotactic polypropylene polymer (7A), a propylene.α-olefin copolymer (7B), and if necessary, an ethylene.α-olefin copolymer (7C). Hereinbelow, each component will be described in detail.

<Syndiotactic Propylene Polymer (7A)>

The syndiotactic propylene polymer (7A) of the present invention (7) may be a homopolypropylene or may be a random copolymer of propylene and an α-olefin having 2 to 20 carbon atoms (excluding propylene), or may be a propylene block copolymer, as long as it is a propylene polymer having the properties described below. However, the polymer is preferably a homopolypropylene or a random copolymer of propylene and an α-olefin having 2 to 20 carbon atoms, and particularly preferably a copolymer of propylene with ethylene or an α-olefin having 4 to 10 carbon atoms, or a copolymer of propylene with ethylene and an α-olefin having 4 to 10 carbon atoms, while homopolypropylene is particularly preferable from the viewpoint of heat resistance or the like.

Herein, the α-olefins having 2 to 20 carbon atoms other than propylene include ethylene, 1-butene, 1-pentene, 1-hexene, 3-methyl-1-butene, 4-methyl-1-pentene, 1-octene, 1-decene, 1-dodecene, 1-tetradecene, 1-hexadecene, 1-octadecene, 1-eicosene, and the like. The propylene units are generally contained in an amount of more than 90 mol %, preferably 91 mol % or more, based on 100 mol % of the sum of amounts of units of the α-olefins having 2 to 20 carbon atoms (including propylene). That is, the syndiotactic propylene polymer (7A) of the present invention generally contains propylene units in an amount of more than 90 mol % to 100 mol %, and units of α-olefin having 2 to 20 carbon atoms (excluding propylene) in an amount of 0 to less than 10 mol % (provided that the sum of amounts of the propylene units and the units of α-olefin having 2 to 20 carbon atoms (excluding propylene) is 100 mol %), and particularly preferably contains propylene units in an amount of 91 mol % to 100 mol % and units of α-olefin having 2 to 20 carbon atoms (excluding propylene) in an amount of 0 to 9 mol %.

When the syndiotactic propylene polymer (7A) is a propylene.α-olefin random copolymer, units of α-olefin having 2 to 20 carbon atoms (excluding propylene) are contained in an amount of 0.3 to 7 mol %, preferably 0.3 to 6 mol %, and more preferably 0.3 to 5 mol %.

The syndiotactic pentad fraction (rrrr fraction, pentad syndiotacticity) of the syndiotactic propylene polymer (7A) used in the present invention (7), as measured by NMR, is 85% or more, preferably 90% or more, more preferably 93% or more, and even more preferably 94% or more. The syndiotactic propylene polymer (7A) having an rrrr fraction in this range is preferable from the viewpoint of having excellent moldability, heat resistance, and transparency, and having good properties as crystalline polypropylene. There is no particular upper limit of the rrrr fraction, but it is 100% or less, and usually 99% or less, for example.

This syndiotactic pentad fraction (rrrr fraction) is measured as follows.

The rrrr fraction is determined from the absorption intensities of Prrrr (the absorption intensity resulting from the methyl group of the third unit at a site where five propylene units are sequentially syndiotactically bonded) and Pw (the absorption intensity resulting from all the methyl groups of propylene units) in the $^{13}$C-NMR spectrum according to the following equation (1):

$$rrrr \text{ fraction } (\%) = 100 \times Prrrr/Pw \quad (1)$$

The NMR measurement is performed, for example, as follows. Specifically, 0.35 g of a sample is dissolved under heating in 2.0 ml of hexachlorobutadiene. This solution is filtered through a glass filter (G2), and then is introduced into an NMR tube having an internal diameter of 10 mm after addition of 0.5 ml of deuterated benzene. Then, $^{13}$C-NMR measurement is performed at 120° C. using a GX-500 NMR measuring apparatus manufactured by JEOL, Ltd. The number of scans is 10,000 or more.

The intrinsic viscosity [η] of the syndiotactic propylene polymer (7A) as measured in decalin at 135° C. is 0.1 to 10 dL/g, preferably 0.5 to 10 dL/g, more preferably 0.50 to 8.00 dL/g, even more preferably 0.95 to 8.00 dL/g, particularly preferably in the range of 1.00 to 8.00, more preferably in the range of 1.40 to 8.00 dL/g, and particularly preferably in the range of 1.40 to 5.00 dL/g. The syndiotactic propylene polymer (7A) having such intrinsic viscosity [η] value exhibits good flowability and good miscibility with other components, and the obtainable composition tends to yield molded products having excellent mechanical strength.

Furthermore, the melting point (Tm) of the syndiotactic propylene polymer (7A) that is measured by differential scanning calorimetry (DSC) is 145° C. or higher, preferably 147° C. or higher, more preferably 150° C. or higher, even more preferably 155° C. or higher, and particularly preferably 156° C. or higher. Although there is no particular upper limit of Tm, it is usually 170° C. or lower, for example.

Moreover, the heat of fusion (ΔH) of the syndiotactic propylene polymer (7A) is 40 mJ/mg or higher, preferably 45 mJ/mg or higher, more preferably 50 mJ/mg or higher, even more preferably 52 mJ/mg or higher, and particularly preferably 55 mJ/mg or higher.

The differential scanning calorimetry is performed, for example, in the following manner. About 5.00 mg of a sample is placed in an aluminum pan for exclusive use, and the melting point (Tm) and the heat of fusion (ΔH) are determined from an endothermic curve obtained by heating the sample from 30° C. to 200° C. at a rate of 320° C./min, holding the sample at 200° C. for 5 minutes, cooling the sample from 200° C. to 30° C. at a rate of 10° C./min, allowing the sample to stand at 30° C. for 5 minutes, and heating the sample again at a rate of 10° C./min, using DSC Pyris 1 or DSC7 manufactured by PerkinElmer, Inc. If a plurality of peaks is detected during the DSC measurement, the peak detected at the highest temperature is defined as the melting point (Tm).

The syndiotactic propylene polymer (7A) having the melting point (Tm) in this range has excellent moldability, heat resistance, and mechanical properties, and has good properties as a crystalline polypropylene. By controlling the polymerization conditions as will be described later and by using the catalyst system that will be described later, the syndiotactic propylene polymer (7A) having the melting point (Tm) within this range can be produced.

The syndiotactic propylene polymer (7A) satisfies, when the isothermal crystallization temperature determined by differential scanning calorimetry (DSC) is designated as $T_{iso}$ and the half-crystallization time at the isothermal crystallization temperature $T_{iso}$ is designated as $t_{1/2}$, the following Equation (Eq-1) in the range of $110 \leq T_{iso} \leq 150$ (° C.):

$$1.67 \times 10^{-4} \exp(0.10 \times T_{iso}) \leq t_{1/2} \leq 5.56 \times 10^{-4} \exp(0.12 \times T_{iso}) \quad \text{(Eq-1)}$$

preferably satisfies the following equation (Eq-2):

$$1.67 \times 10^{-4} \exp(0.10 \times T_{iso}) \leq t_{1/2} \leq 3.71 \times 10^{-4} \exp(0.12 \times T_{iso}) \quad \text{(Eq-2)}$$

and more preferably satisfies the following equation (Eq-3):

$$1.67 \times 10^{-4} \exp(0.10 \times T_{iso}) \leq t_{1/2} \leq 2.23 \times 10^{-4} \exp(0.12 \times T_{iso}) \quad \text{(Eq-3)}$$

The half-crystallization time ($t_{1/2}$) determined by isothermal crystallization measurement is, when the area between the DSC caloric curve and the baseline in the course of the isothermal crystallization process is considered as the total calories, the time taken to reach 50% of the calories [see New Lectures on Polymer Experiments, 8. Properties of Polymers (KYORITSU SHUPPAN CO., LTD.)].

Measurement of the half-crystallization time ($t_{1/2}$) is performed as follows. About 5 mg of a sample is placed in an aluminum pan for exclusive use, and the half-crystallization time ($t_{1/2}$) is determined from a DSC curve obtained by heating the sample from 30° C. to 200° C. at a rate of 320° C./min, holding the sample at 200° C. for 5 minutes, cooling the sample from that temperature (200° C.) to the isothermal crystallization temperature at a rate of 320° C./min, and allowing the sample to stand at that isothermal crystallization temperature, using DSC Pyris 1 or DSC7 manufactured by PerkinElmer, Inc. Here, the half-crystallization time ($t_{1/2}$) is determined by zero-setting the time when the isothermal crystallization process starts (t=0) (the time when the isothermal crystallization temperature is reached from 200° C.). For the syndiotactic propylene polymer (7A) of the present invention (7), $t_{1/2}$ can be determined as described above. When crystallization does not occur at any isothermal crystallization temperature, for example, at 110° C., then the degree of crystallization is measured at an isothermal crystallization temperature below 110° C. several times, and the half crystallization time ($t_{1/2}$) is determined by extrapolation.

The syndiotactic propylene polymer (7A) satisfying the equation (Eq-1) is remarkably excellent in moldability compared to existing syndiotactic propylene polymers. Here, the words excellent in moldability indicate that in the case of molding processes such as injection molding, inflation molding, blow molding, extrusion and press molding, the time taken from the molten state to the solid state is short. Also, such syndiotactic propylene polymer (A) is excellent in molding cycle properties, shape stability, long-term productivity, and the like.

By controlling the polymerization conditions as will be described later and by using the catalyst system that will be described later, the syndiotactic propylene polymer (7A) satisfying the equation (Eq-1) can be produced.

In a preferred embodiment of the syndiotactic propylene polymer (7A) of the present invention (7), the following requirement (n-decane-soluble content) is satisfied in addition to the above-described preferred embodiments (satisfying $\Delta H \geq 40$ mJ/mg, and satisfying the above equation (Eq-1)).

The amount of the n-decane-soluble content of the syndiotactic propylene polymer (7A) is preferably 1 (wt %) or less, preferably 0.8 (wt %) or less, and more preferably 0.6 (wt %) or less. This amount of n-decane-soluble content is an index closely related to the blocking properties of the syndiotactic propylene polymer (A) and the molded products obtained therefrom, and a smaller amount of n-decane-soluble content usually means a smaller amount of low-crystalline components. That is, the syndiotactic propylene polymer (A) further satisfying the present requirement (n-decane-soluble content) has very good anti-blocking properties.

Therefore, one of the most preferred embodiments of the component (7A) is a syndiotactic propylene polymer that contains constituent units derived from propylene in an amount of more than 90 mol %, has a syndiotactic pentad fraction (rrrr fraction) of 85% or more as measured by $^{13}$C-NMR, a melting point (Tm) of 145° C. or higher as measured by DSC, and a heat of fusion ($\Delta H$) of 40 mJ/mg or more, satisfies the equation (Eq-1), and has an n-decane-soluble content of 1 wt % or less.

In the production of the syndiotactic propylene polymer (7A) used in the present invention (7), the catalyst for polymerization (cat-1) comprising:

(I) a bridged metallocene compound represented by General Formula [1], and (II) at least one compound selected from:

(II-1) an organoaluminum oxy compound, (II-2) a compound which reacts with the bridged metallocene compound (7A) to form an ion pair, and (II-3) an organoaluminum compound, or the catalyst for polymerization (cat-2) having the catalyst (cat-1) supported on a particulate support, is suitably used. However, as long as the produced polymer shows properties that satisfy the requirements required for the syndiotactic propylene polymer (7A), the catalyst used in the production of the syndiotactic polypropylene polymer (7A) is not limited to such catalysts.

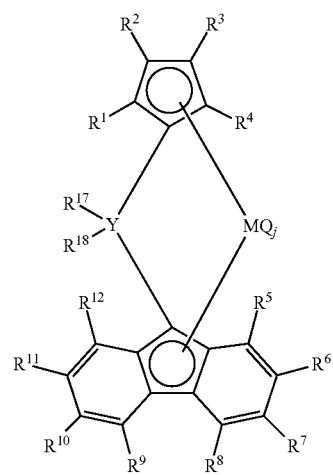

[1]

In General Formula [1], $R^1$, $R^2$, $R^3$ and $R^4$ are each selected from a hydrogen atom, a hydrocarbon group, and a silicon-containing group; $R^2$ and $R^3$ may be linked to each other to form a ring, $R^5$, $R^6$, $R^8$, $R^9$, $R^{11}$ and $R^{12}$ may be selected from hydrogen, a hydrocarbon group, and a silicon-containing group; the two groups of $R^7$ and $R^{10}$ are not hydrogen atoms, but are each selected from a hydrocarbon group and a silicon-containing group, and may be identical to or different from each other; and in one or more combinations of adjacent groups selected from $R^5$ and $R^6$, $R^7$ and $R^8$, $R^8$ and $R^9$, $R^9$ and $R^{10}$, and $R^{11}$ and $R^{12}$, the adjacent groups may be linked to each other to form a ring. $R^{17}$ and $R^{18}$ are each a hydrogen atom, a hydrocarbon group having 1 to 20 carbon atoms, or a silicon atom-containing group, and may be identical to or different from each other, while the substituents may be linked to each other to form a ring. M is Ti, Zr, or Hf; Y is carbon; Q may be selected from halogen, a hydrocarbon group, an anionic ligand, and a neutral ligand capable of coordination with a lone electron pair, in identical or different combinations; and j is an integer from 1 to 4.

(I) Bridged Metallocene Compound

Specific examples of the bridged metallocene compound (I) represented by above General Formula [1] (in the present specification, may also be referred to as "component (I)") include:

cyclopropylidene(cyclopentadienyl)(3,6-di-tert-fluorenyl)zirconium dichloride,
cyclobutylidene(cyclopentadienyl)(3,6-di-tert-fluorenyl)zirconium dichloride,
cyclopentylidene(cyclopentadienyl)(3,6-di-tert-fluorenyl)zirconium dichloride,
cyclohexylidene(cyclopentadienyl)(3,6-di-tert-fluorenyl)zirconium dichloride,
cycloheptylidene(cyclopentadienyl)(3,6-di-tert-fluorenyl)zirconium dichloride,
dibenzylmethylene(cyclopentadienyl)(3,6-di-tert-butylfluorenyl)zirconium dichloride,
dibenzylmethylene(cyclopentadienyl)(octamethyloctahydrodibenzofluorenyl)zirconium dichloride,
di-n-butylmethylene(cyclopentadienyl)(2,7-dimethyl-3,6-di-tert-butylfluorenyl)zirconium dichloride,
di-n-butylmethylene(cyclopentadienyl(2,7-di(2,4,6-trimethylphenyl)-3,6-di-tert-butylfluorenyl)zirconium dichloride,
di-n-butylmethylene(cyclopentadienyl)(2,7-diphenyl-3,6-di-tert-butylfluorenyl)zirconium dichloride,
di-n-butylmethylene(cyclopentadienyl)(2,7-di(3,5-dimethylphenyl)-3,6-di-tert-butylfluorenyl)zirconium dichloride,
di-n-butylmethylene(cyclopentadienyl)(2,3,6,7-tetra-tert-butylfluorenyl)zirconium dichloride,
di-n-butylmethylene(cyclopentadienyl)(2,7-di(4-methylphenyl)-3,6-di-tert-butylfluorenyl)zirconium dichloride,
di-n-butylmethylene(cyclopentadienyl)(2,7-dinaphthyl-3,6-di-tert-butylfluorenyl)zirconium dichloride,
di-n-butylmethylene(cyclopentadienyl)(2,7-di(4-tert-butylphenyl)-3,6-di-tert-butylfluorenyl)zirconium dichloride,
diisobutylmethylene(cyclopentadienyl)(2,7-dimethyl-3,6-di-tert-butylfluorenyl)zirconium dichloride,
diisobutylmethylene(cyclopentadienyl(2,7-di(2,4,6-trimethylphenyl)-3,6-di-tert-butylfluorenyl)zirconium dichloride,
diisobutylmethylene(cyclopentadienyl)(2,7-diphenyl-3,6-di-tert-butylfluorenyl)zirconium dichloride,
diisobutylmethylene(cyclopentadienyl)(2,7-di(3,5-dimethylphenyl)-3,6-di-tert-butylfluorenyl)zirconium dichloride,
diisobutylmethylene(cyclopentadienyl)(2,3,6,7-tetra-tert-butylfluorenyl)zirconium dichloride,
diisobutylmethylene(cyclopentadienyl)(2,7-di(4-methylphenyl)-3,6-di-tert-butylfluorenyl)zirconium dichloride,
diisobutylmethylene(cyclopentadienyl)(2,7-dinaphthyl-3,6-di-tert-butylfluorenyl)zirconium dichloride,
diisobutylmethylene(cyclopentadienyl)(2,7-di(4-tert-butylphenyl)-3,6-di-tert-butylfluorenyl)zirconium dichloride,
dibenzylmethylene(cyclopentadienyl)(2,7-dimethyl-3,6-di-tert-butylfluorenyl)zirconium dichloride [also referred to as 1,3-diphenyl isopropylidene(cyclopentadienyl)(2,7-dimethyl-3,6-di-tert-butylfluorenyl)zirconium dichloride, the same applies hereinafter],
dibenzylmethylene(cyclopentadienyl(2,7-di(2,4,6-trimethylphenyl)-3,6-di-tert-butylfluorenyl)zirconium dichloride,
dibenzylmethylene(cyclopentadienyl)(2,7-diphenyl-3,6-di-tert-butylfluorenyl)zirconium dichloride,
dibenzylmethylene(cyclopentadienyl)(2,7-di(3,5-dimethylphenyl)-3,6-di-tert-butylfluorenyl)zirconium dichloride,
dibenzylmethylene(cyclopentadienyl)(2,3,6,7-tetra-tert-butylfluorenyl)zirconium dichloride,
dibenzylmethylene(cyclopentadienyl)(2,7-di(4-methylphenyl)-3,6-di-tert-butylfluorenyl)zirconium dichloride,
dibenzylmethylene(cyclopentadienyl)(2,7-dinaphthyl-3,6-di-tert-butylfluorenyl)zirconium dichloride,
dibenzylmethylene(cyclopentadienyl)(2,7-di(4-tert-butylphenyl)-3,6-di-tert-butylfluorenyl)zirconium dichloride,
diphenethylmethylene(cyclopentadienyl)(2,7-dimethyl-3,6-di-tert-butylfluorenyl)zirconium dichloride,
diphenethylmethylene(cyclopentadienyl)(2,7-diphenyl-3,6-di-tert-butylfluorenyl)zirconium dichloride, di(benzhydryl)methylene(cyclopentadienyl)(2,7-dimethyl-3,6-di-tert-butylfluorenyl)zirconium dichloride, di(benzhydryl)methylene(cyclopentadienyl)(2,7-diphenyl-3,6-di-tert-butylfluorenyl)zirconium dichloride,
di(cumyl)methylene(cyclopentadienyl)(2,7-dimethyl-3,6-di-tert-butylfluorenyl)zirconium dichloride,
di(cumyl)methylene(cyclopentadienyl)(2,7-diphenyl-3,6-di-tert-butylfluorenyl)zirconium dichloride,
di(1-phenyl-ethyl)methylene(cyclopentadienyl)(2,7-dimethyl-3,6-di-tert-butylfluorenyl)zirconium dichloride,
di(1-phenyl-ethyl)methylene(cyclopentadienyl)(2,7-diphenyl-3,6-di-tert-butylfluorenyl)zirconium dichloride,
di(cyclohexylmethyl)methylene(cyclopentadienyl)(2,7-dimethyl-3,6-di-tert-butylfluorenyl)zirconium dichloride,
di(cyclohexylmethyl)methylene(cyclopentadienyl)(2,7-diphenyl-3,6-di-tert-butylfluorenyl)zirconium dichloride,
di(cyclopentylmethyl)methylene(cyclopentadienyl)(2,7-dimethyl-3,6-di-tert-butylfluorenyl)zirconium dichloride,
di(cyclopentylmethyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
(benzyl)(n-butyl)methylene(cyclopentadienyl)(2,7-dimethyl-3,6-di-tert-butylfluorenyl)zirconium dichloride,
(benzyl)(n-butyl)methylene(cyclopentadienyl)(2,7-diphenyl-3,6-di-tert-butylfluorenyl)zirconium dichloride,
(benzyl)(cumyl)methylene(cyclopentadienyl)(2,7-dimethyl-3,6-di-tert-butylfluorenyl)zirconium dichloride,
(benzyl)(cumyl)methylene(cyclopentadienyl)(2,7-diphenyl-3,6-di-tert-butylfluorenyl)zirconium dichloride, cyclopropylidene(cyclopentadienyl)(2,7-dimethyl-3,6-di-tert-butylfluorenyl)zirconium dichloride,
cyclopropylidene(cyclopentadienyl)(2,7-diphenyl-3,6-di-tert-butylfluorenyl)zirconium dichloride,
cyclobutylidene(cyclopentadienyl)(2,7-dimethyl-3,6-di-tert-butylfluorenyl)zirconium dichloride,
cyclobutylidene(cyclopentadienyl)(2,7-diphenyl-3,6-di-tert-butylfluorenyl)zirconium dichloride,
cyclopentylidene(cyclopentadienyl)(2,7-dimethyl-3,6-di-tert-butylfluorenyl)zirconium dichloride,
cyclopentylidene(cyclopentadienyl)(2,7-diphenyl-3,6-di-tert-butylfluorenyl)zirconium dichloride,
cyclohexylidene(cyclopentadienyl)(2,7-dimethyl-3,6-di-tert-butylfluorenyl)zirconium dichloride,
cyclohexylidene(cyclopentadienyl)(2,7-diphenyl-3,6-di-tert-butylfluorenyl)zirconium dichloride,
cycloheptylidene(cyclopentadienyl)(2,7-dimethyl-3,6-di-tert-butylfluorenyl)zirconium dichloride,
cycloheptylidene(cyclopentadienyl)(2,7-diphenyl-3,6-di-tert-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
dibenzylmethylene(cyclopentadienyl)(2,7-dimethyl-3,6-dicumyl-butylfluorenyl)zirconium dichloride,
di-n-butylmethylene(cyclopentadienyl)(2,7-dimethyl-3,6-dicumyl-butylfluorenyl)zirconium dichloride,
dibenzylmethylene(cyclopentadienyl)(2,7-dimethyl-3,6-di(trimethylsilyl)-butylfluorenyl)zirconium dichloride,
di-n-butylmethylene(cyclopentadienyl)(2,7-dimethyl-3,6-di(trimethylsilyl)-butylfluorenyl)zirconium dichloride,
dibenzylmethylene(cyclopentadienyl)(2,7-dimethyl-3,6-diphenyl-butylfluorenyl)zirconium dichloride,
di-n-butylmethylene(cyclopentadienyl)(2,7-dimethyl-3,6-diphenyl-butylfluorenyl)zirconium dichloride,
dibenzylmethylene(cyclopentadienyl)(2,7-dimethyl-3,6-dibenzyl-butylfluorenyl)zirconium dichloride,
di-n-butylmethylene(cyclopentadienyl)(2,7-dimethyl-3,6-dibenzyl-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
diphenylmethylene(cyclopentadienyl)(2,7-dimethyl-3,6-di-tert-butylfluorenyl)zirconium dichloride,
diphenylmethylene(cyclopentadienyl)(2,7-diphenyl-3,6-di-tert-butylfluorenyl)zirconium dichloride,
di(p-tolyl)methylene(cyclopentadienyl)(2,7-dimethyl-3,6-di-tert-butylfluorenyl)zirconium dichloride,
di(p-tolyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-tert-butyl-phenyl)methylene(cyclopentadienyl)(2,7-dimethyl-3,6-di-tert-butylfluorenyl)zirconium dichloride,
di(p-tert-butyl-phenyl)methylene(cyclopentadienyl)(2,7-diphenyl-3,6-di-tert-butylfluorenyl)zirconium dichloride,
di(p-n-butyl-phenyl)methylene(cyclopentadienyl)(2,7-dimethyl-3,6-di-tert-butylfluorenyl)zirconium dichloride,
di(p-n-butyl-phenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-diphenyl-3,6-di-tert-butylfluorenyl)zirconium dichloride,
di(1-naphthyl)methylene(cyclopentadienyl)(2,7-dimethyl-3,6-di-tert-butylfluorenyl)zirconium dichloride,
di(1-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(p-isopropylphenyl)methylene(cyclopentadienyl)(2,7-dimethyl-3,6-di-tert-butylfluorenyl)zirconium dichloride,
di(p-isopropylphenyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
diphenylsilylene(cyclopentadienyl)(2,7-dimethyl-3,6-di-tert-butylfluorenyl)zirconium dichloride,
diphenylsilylene(cyclopentadienyl)(2,7-diphenyl-3,6-di-tert-butylfluorenyl)zirconium dichloride, and the like.

Furthermore, examples thereof also include compounds resulting from replacing the "zirconium" of the compounds described above with "hafnium" or "titanium", and metallocene compounds resulting from replacing the "dichloride" of the compounds described above with "difluoride", "dibromide", or "diiodide", or resulting from replacing the "dichloride" of the compounds described above with "dimethyl" or "methylethyl". The bridged metallocene compound (I) can be produced by known methods, and the method for production is not particularly limited. Examples of the known methods for production include the methods for production described in WO 2001/27124 and WO 2004/087775 filed by the present applicant.

Such bridged metallocene compounds (I) can be used alone or in combination of two or more kinds.

(II-1) Organoaluminum Oxy Compound

As the organoaluminum oxy compound (II-1) used in the production of the syndiotactic propylene polymer (7A) (in the present specification, may also be referred to as "component (II-1)"), a known aluminoxane may be directly used, and specific examples thereof include a compound represented by following General Formula [2]:

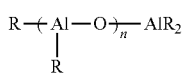

[2]

and/or a compound represented by General Formula [3]:

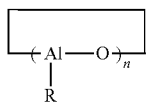

[3]

(In above Formula [2], R's each independently represent a hydrocarbon group having 1 to 10 carbon atoms; and n represents an integer of 2 or more.)

(In above Formula [3], R represents a hydrocarbon group having 1 to 10 carbon atoms; and n represents an integer of 2 or more.) In particular, methylaluminoxane in which R is a methyl group and n is 3 or more, preferably 10 or more, is used. These aluminoxanes may have some amount of an organoaluminum compound entrained therein.

For the invention (7), the benzene-insoluble organoaluminum oxy compounds as illustrated in JP-A No. 2-78687 can be also used. The organoaluminum oxy compounds described in JP-A No. 2-167305, aluminoxanes having 2 or more kinds of alkyl groups as described in JP-A Nos. 2-24701 and 3-103407, and the like are also suitably used. The "benzene-insoluble" organoaluminum oxy compound means an organoaluminum oxy compound which is insoluble or poorly soluble in benzene to the extent that the Al component soluble in benzene at 60° C. is contained in an amount of generally 10% or less, preferably 5% or less, and particularly preferably 2% or less, relative to Al atoms.

Examples of the organoaluminum oxy compound also include modified methylaluminoxane as represented by following Formula [4] and the like:

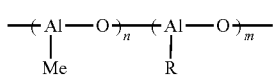

[4]

(In Formula [4], R represents a hydrocarbon group having 1 to 10 carbon atoms; and m and n each independently represent an integer of 2 or more).

This modified methylaluminoxane is prepared using trimethylaluminum and alkylaluminum other than trimethylaluminum. Such modified methylaluminoxane [4] is generally referred to as MMAO. MMAO can be prepared by the methods disclosed in U.S. Pat. No. 4,960,878 and U.S. Pat. No. 5,041,584. In addition, such a compound in which R is an isobutyl group, which compound is prepared using trimethylaluminum and triisobutylaluminum, is also commercially produced by Tosoh Finechem Corporation and the like under the product name of MMAO or TMAO. Such MMAO is aluminoxane having improved solubility in various solvents and storage stability, and specifically, the compound is soluble in aliphatic hydrocarbons and alicyclic hydrocarbons, unlike the aluminoxanes that are insoluble or poorly soluble in benzene, such as the compounds represented by above Formula [2] or [3].

Furthermore, examples of the organoaluminum oxy compound also include an organoaluminum oxy compound containing boron, represented by following General Formula [5]:

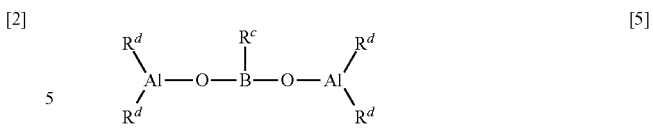

[5]

(In Formula [5], $R^c$ represents a hydrocarbon group having 1 to 10 carbon atoms; $R^d$'s, which may be identical to or different from each other, each represent a hydrogen atom, a halogen atom, or a hydrocarbon group having 1 to 10 carbon atoms).

(II-2) Compound which Reacts with the Bridged Metallocene Compound (a) to Form an Ion Pair Examples of the compound (II-2) which reacts with the bridged metallocene compound (I) to form an ion pair (hereinafter, may be also referred to as "ionic compound" or "component (II-2)"), which can be used in the production of the syndiotactic propylene polymer (7A), include Lewis acids, ionic compounds, borane compounds, and carborane compounds described in JP-A No. 1-501950, JP-A No. 1-502036, JP-A No. 3-179005, JP-A No. 3-179006, JP-A No. 3-207703, JP-A No. 3-207704, U.S. Pat. No. 5,321,106, and the like. Examples thereof also include heteropoly compounds and isopoly compounds. An ionic compound preferably employed in the present invention is a compound represented by following General Formula [6]:

[6]

in Formula, $R^{e+}$ is exemplified by $H^+$, a carbenium cation, an oxonium cation, an ammonium cation, a phosphonium cation, a cycloheptyltrienyl cation, a ferrocenium cation having a transition metal, or the like; $R^f$ to $R^i$ may be identical to or different from each other, and are each an organic group, preferably an aryl group.

Specific examples of the carbenium cation include trisubstituted carbenium cations such as triphenylcarbenium cation, tris(methylphenyl)carbenium cation, and tris(dimethylphenyl)carbenium cation.

Specific examples of the ammonium cation include trialkylammonium cations such as trimethylammonium cation, triethylammonium cation, tri(n-propyl)ammonium cation, triisopropylammonium cation, tri(n-butyl)ammonium cation, and triisobutylammonium cation; N,N-dialkylanilinium cations such as N,N-dimethylanilinium cation, N,N-diethylanilinium cation, and N,N-2,4,6-pentamethylanilinium cation; and dialkylammonium cations such as diisopropylammonium cation and dicyclohexylammonium cation.

Specific examples of the phosphonium cation include triarylphosphonium cations such as triphenylphosphonium cation, tris(methylphenyl)phosphonium cation, and tris(dimethylphenyl)phosphonium cation.

Among them, $R^{e+}$ is preferably a carbenium cation, an ammonium cation, or the like, and particularly preferably a triphenylcarbenium cation, an N,N-dimethylanilinium cation, or an N,N-diethylanilinium cation.

Specific examples of the carbenium salt include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)

carbenium tetrakis(pentafluorophenyl)borate, tris(3,5-dimethylphenyl)carbenium tetrakis(pentafluorophenyl)borate, and the like.

Examples of the ammonium salt include trialkyl-substituted ammonium salts, N,N-dialkylanilinium salts, dialkylammonium salts, and the like.

Specific examples of the trialkyl-substituted ammonium salt include triethylammonium tetraphenylborate, tripropylammonium tetraphenylborate, tri(n-butyl)ammonium tetraphenylborate, trimethylammoniumtetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, dioctadecylmethylammonium, and the like.

Specific examples of the N,N-dialkylanilinium salt include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, N,N-2,4,6-pentamethylanilinium tetrakis(pentafluorophenyl)borate, and the like.

Specific examples of the dialkylammonium salt include di(1-propyl)ammonium tetrakis(pentafluorophenyl)borate, dicyclohexylammonium tetraphenylborate, and the like.

In addition to these, ionic compounds disclosed by the present applicant (JP-A No. 2004-51676) can also be used without limitation.

The ionic compounds (II-2) as described above can be used as a mixture of two or more kinds.

(II-3) Organoaluminum Compound

Examples of the organoaluminum compound (II-3) (in the present specification, may also be referred to as "component (II-3)") for use in the production of the syndiotactic propylene polymer (7A) include an organoaluminum compound represented by following General Formula [7], and a complex alkylated product of Group 1 metal and aluminum represented by following General Formula [8]:

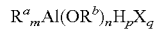  [7]

(In Formula [7], $R^a$ and $R^b$, which may be identical to or different from each other, each represent a hydrocarbon group having 1 to 15, preferably 1 to 4 carbon atoms; X represents a halogen atom; m is a number satisfying 0<m≤3, n is a number satisfying 0≤n<3, p is a number satisfying 0≤p<3, and q is a number satisfying 0≤q<3; and m+n+p+q=3).

Specific examples of such compound include tri-n-alkylaluminums such as trimethylaluminum, triethylaluminum, tri-n-butylaluminum, trihexylaluminum, and trioctylaluminum;

tri-branched-alkylaluminums such as triisopropylaluminum, triisobutylaluminum, tri-sec-butylaluminum, tri-tert-butylaluminum, tri-2-methylbutylaluminum, tri-3-methylhexylaluminum, and tri-2-ethylhexylaluminum;

tricycloalkylaluminums such as tricyclohexylaluminum and tricyclooctylaluminum;

triarylaluminums such as triphenylaluminum, and tritolylaluminum;

dialkylaluminum hydrides such as diisopropylaluminum hydride and diisobutylaluminum hydride;

alkenylaluminums represented by general formula: $(i-C_4H_9)_xAl_y(C_5H_{10})_z$ (wherein x, y, and z are positive numbers, and z≤2x), such as isoprenylaluminum;

alkylaluminum alkoxides such as isobutylaluminum methoxide and isobutylaluminum ethoxide;

dialkylaluminum alkoxides such as dimethylaluminum methoxide, diethylaluminum ethoxide, and dibutylaluminum butoxide;

alkylaluminum sesquialkoxides such as ethylaluminum sesquiethoxide and butylaluminum sesquibutoxide;

partially alkoxylated alkylaluminums having an average composition represented by general formula: $Ra_{2.5}Al(ORb)_{0.5}$ and the like;

alkylaluminum aryloxides such as diethylaluminum phenoxide and diethylaluminum (2,6-di-t-butyl-4-methylphenoxide);

dialkylaluminum halides such as dimethylaluminum chloride, diethylaluminum chloride, dibutylaluminum chloride, diethylaluminum bromide, and diisobutylaluminum chloride;

alkylaluminum sesquihalides such as ethylaluminum sesquichloride, butylaluminum sesquichloride, and ethylaluminum sesquibromide;

partially halogenated alkylaluminums such as alkylaluminum dihalide such as ethylaluminum dichloride; dialkylaluminum hydrides such as diethylaluminum hydride and dibutylaluminum hydride;

partially hydrogenated alkylaluminums such as alkylaluminum dihydrides such as ethylaluminum dihydride and propylaluminum dihydride; and partially alkoxylated and halogenated alkylaluminums such as ethylaluminum ethoxychloride, butylaluminum butoxychloride, and ethylaluminum ethoxybromide.

  [8]

(In Formula [8], $M^2$ represents Li, Na, or K; and $R^a$ represents a hydrocarbon group having 1 to 15, preferably 1 to 4 carbon atoms).

Such compound is exemplified by $LiAl(C_2H_5)_4$, $LiAl(C_7H_{15})_4$, or the like.

A compound similar to the compound represented by the General Formula [8] can also be used, and examples thereof include an organoaluminum compound in which two or more aluminum compounds are bound with a nitrogen atom interposed therebetween. Specifically, such compound is exemplified by $(C_2H_5)_2AlN(C_2H_5)Al(C_2H_5)_2$ or the like.

As the organoaluminum compound (II-3), trimethylaluminum and triisobutylaluminum are preferably used from the aspect of easy availability.

Further, the above-mentioned respective components may be used while being supported on a particulate support.

Support (III)

The support (III) that can be used as necessary (in the present specification, may also be referred to as "component (III)") is an inorganic or organic compound, and is a granular or microparticulate solid.

Among these, the inorganic compound is preferably a porous oxide, an inorganic halide, a clay, a clay mineral, or an ion exchangeable lamellar compound.

As the porous oxide, specifically $SiO_2$, $Al_2O_3$, MgO, ZrO, $TiO_2$, $B_2O_3$, CaO, ZnO, BaO, $ThO_2$ and the like, or complexes or mixtures containing these, for example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like can be used. Among these, it is preferable that $SiO_2$ and/or $Al_2O_3$ is a main component.

The above-mentioned inorganic oxide may contain a small amount of carbonate, sulfate, nitrate, or oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Such porous oxides may vary in properties depending on the type and method for production. The support that can be preferably used has a particle size of 3 to 300 μm, preferably 10 to 300 μm, and more preferably 20 to 200 μm, a specific surface area in the range of 50 to 1000 $m^2$/g, preferably 100 to 700 $m^2$/g, and a pore volume preferably in the range of 0.3 to 3.0 $cm^3$/g. Such support is calcined as necessary at 100 to 1000° C., and preferably 150 to 700° C. before use.

As the inorganic halide, $MgCl_2$, $MgBr_2$, $MnCl_2$, $MnBr_2$, and the like are used. The inorganic halide may be used directly, or may be used after being ground with a ball mill or a vibration mill. Furthermore, a halide obtained by dissolving the inorganic halide in a solvent such as alcohol, and then precipitating the compound into a microparticulate form using a precipitating agent, can also be used.

The clay is usually comprised of a clay mineral as a main component. The ion exchangeable lamellar compound is a compound having a crystal structure in which planes constituted of ionic bonding or the like are stacked on one another in parallel with weak bonding strength, and in which the ions contained can be exchanged. Most clay minerals are ion exchangeable lamellar compounds. The clay, clay mineral and ion exchangeable lamellar compound are not limited to natural products, and artificially synthesized products can also be used.

Furthermore, examples of the clay, clay mineral, or ion exchangeable lamellar compound include clays, clay minerals, and ion crystalline compounds having lamellar crystal structures such as hexagonal close packed type, antimony type, $CdCl_2$ type, and $CdI_2$ type.

Examples of the clay and clay mineral include kaolin, bentonite, kibushi clay, gairome clay, allophane, hisingerite, pyrophyllite, mica group, montmorillonite group, vermiculite, phyllite group, palygorskite, kaolinite, nacrite, dickite, halloysite, and the like. Examples of the ion exchangeable lamellar compound include crystalline acid salts of multivalent metals such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$, and γ-$Ti(NH_4PO_4)_2 \cdot H_2O$.

It is preferable for such clay, clay mineral, or ion exchangeable lamellar compound that the volume of pores having a radius of 20 Å or more as measured by mercury porosimetry is preferably 0.1 cc/g or larger, and particularly preferably 0.3 to 5 cc/g. The pore volume is measured for the pore radius in the range of 20 to $3 \times 10^4$ Å according to the mercury porosimetry using a mercury porosimeter.

When a support having a volume of pores with 20 Å radius or more of less than 0.1 cc/g is used, there is a tendency that high polymerization activity is hardly obtained.

The clay and clay mineral may preferably be subjected to a chemical treatment.

Any of the chemical treatments such as a surface treatment which removes impurities attached on the surface, and treatments giving an effect on the crystal structure of the clay, can be used. Specific examples of the chemical treatment include an acid treatment, an alkali treatment, a treatment with salts, and a treatment with organic compounds. The acid treatment removes impurities on the surface, and also increases the surface area by eluting a positive ion such as Al, Fe, and Mg in the crystal structure. The alkali treatment destroys the crystal structure of the clay, and brings a structural change in the clay. The treatment with salts and the treatment with organic compounds form an ionic complex, molecular complex, organic derivative, or the like, and can change the surface area and the interlayer distance.

The ion exchangeable lamellar compound may be enlarged in interlayer distance by exchanging the interlayer exchangeable ions with other bulkier ions using the ion exchangeability. Such bulky ion plays a supportive role to support the lamellar structure, and is generally called pillar. Also, the introduction of other substance between layers of the lamellar compound is known as intercalation. Examples of the guest compound for intercalation include cationic inorganic compounds such as $TiCl_4$ and $ZrCl_4$, metal alkoxides such as $Ti(OR)_4$, $Zr(OR)_4$, $PO(OR)_3$, and $B(OR)_3$ (wherein R is a hydrocarbon group or the like), and metal hydroxide ions such as $[Al_{13}O_4(OH)_{24}]^{7+}$, $[Zr_4(OH)_{14}]^{2+}$, and $[Fe_3O(OCOCH_3)_6]^+$. These compounds may be used alone or in combination of two or more kinds. When these compounds are intercalated, a polymer obtained by hydrolyzing metal alkoxide such as $Si(OR)_4$, $Al(OR)_3$, or $Ge(OR)_4$ (R's are each a hydrocarbon group, or the like), a colloidal inorganic compound such as $SiO_2$, or the like can be allowed to coexist. Examples of the pillar include oxides produced by conducting thermal dehydration of the above-mentioned metal hydroxide ions after intercalation thereof. Among these compounds, preferred are clays and clay minerals and particularly preferred are montmorillonite, vermiculite, pectolite, tainiolite, and synthetic mica.

The clays, clay minerals, and ion-exchangeable lamellar compounds may be used directly or after subjected to a treatment with ball mill, sieving or the like. Moreover, they may be used after adsorbing newly added water thereonto, or after being subjected to thermal dehydration treatment. They may be used alone or in combination of two or more kinds.

The use of an ion-exchangeable lamellar silicate provides an advantage that while the silicate serves as support, the ion exchangeable properties and the lamellar structure thereof permit reducing the amount of the organoaluminum oxy compound such as alkylaluminoxane. Ion exchangeable lamellar silicates are mainly obtained as a main component of natural clay minerals, but the silicates in the invention are not limited to natural products, and artificially synthesized products can also be used. Specific examples of the clay, the clay mineral, and ion exchangeable lamellar silicate include kaolinite, montmorillonite, hectorite, bentonite, smectite, vermiculite, tainiolite, synthetic mica, synthetic hectorite, and the like.

The organic compound may be exemplified by a granular solid or a microparticulate solid having a particle size in the range of 3 to 300 μm, and preferably 10 to 300 μm. Specific examples thereof include (co)polymers produced from an α-olefin having 2 to 14 carbon atoms such as ethylene, propylene, 1-butene, or 4-methyl-1-pentene as a main component; (co)polymers or copolymers produced from vinylcyclohexane or styrene as a main component; and polymers or modified products having a polar functional group that are obtained by copolymerizing or graft polymerizing a polar monomer such as acrylic acid, acrylic ester or maleic anhydride, with the above-mentioned polymers. These particulate supports may be used alone or in combination of two or more kinds.

Furthermore, the catalyst for olefin polymerization that can be used in the production of the syndiotactic propylene polymer (7A) may also contain a specific organic compound component (IV) described below according to necessity, along with the above-mentioned components.

(IV) Organic Compound Component

In the present invention, the organic compound component (IV) (in the present specification, may also be referred to as "component (IV)") is used as necessary, for the purpose of improving the polymerization performance and properties of the produced polymer. Such organic compound is exemplified by alcohols, phenolic compounds, carboxylic acids, phosphorus compounds, sulfonates, and the like, but the compounds are not limited to these.

Method for Producing Syndiotactic Propylene Polymer (7A)

In the polymerization, the mode of using each of the components, and the order of addition are arbitrarily selected, and the following methods may be mentioned.

(1) A method comprising adding the component (I) alone into the polymerization vessel.

(2) A method comprising adding the component (I) and component (II) into the polymerization vessel in an arbitrary order.

(3) A method comprising adding a catalyst component in which the component (I) is supported on the support (III), and the component (II) into the polymerization vessel in an arbitrary order.

(4) A method comprising adding a catalyst component in which the component (II) is supported on the support (III), and the component (I) into the polymerization vessel in an arbitrary order.

(5) A method comprising adding a catalyst component in which the component (I) and the component (II) are supported on the support (III) into the polymerization vessel.

In the respective methods of (2) to (5) described above, at least two or more of the catalyst components may be brought into contact with each other in advance.

In the respective methods of (4) and (5) described above using the supported component (II), unsupported component (II) may be added in any order as necessary. In this case, the components (II) may be identical to or different from each other.

Furthermore, the solid catalyst component having the component (I) supported on the component (III), and the solid catalyst component having the component (I) and component (II) both supported on the component (III) may have a prepolymerized olefin. Such prepolymerized solid catalyst component may further have a catalyst component supported thereon.

The syndiotactic propylene polymer (7A) can be obtained by polymerizing or copolymerizing propylene with at least one kind of olefin selected from α-olefins having 2 to 20 carbon atoms (excluding propylene) in the presence of the catalyst for olefin polymerization as mentioned above.

The polymerization can be carried out by any of a liquid phase polymerization method such as a solution polymerization or a suspension polymerization, and a gas phase polymerization method. Specific examples of inert hydrocarbon medium used in the liquid phase polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof. The olefin to be polymerized may also be used per se as the solvent.

When the polymerization of propylene with at least one kind of olefin selected from α-olefins having 2 to 20 carbon atoms (excluding propylene) is performed using the catalyst for olefin polymerization as described above, the component (I) is usually used in an amount of $10^{-9}$ to $10^{-1}$ moles, and preferably $10^{-8}$ to $10^{-2}$ moles, per liter of the reaction volume.

The component (II-1) is used in an amount such that the molar ratio [(II-1)/M] of the component (II-1) to the total transition metal atoms (M) in the component (I) is usually 0.01 to 5,000, and preferably 0.05 to 2,000. The component (II-2) is used in an amount such that the molar ratio [(II-2)/M] of the component (II-2) to the transition metal atoms (M) in the component (I) is usually 1 to 10, and preferably 1 to 5. The component (II-3) is used in an amount such that the molar ratio [(II-3)/M] of the aluminum atoms in the component (II-3) to the total transition metal atoms (M) in the component (I) is usually 10 to 5,000, and preferably 20 to 2,000.

The component (IV) is used, in the case where the component (II) is component (II-1), in an amount such that the molar ratio [(IV)/(II-1)] is usually 0.01 to 10, and preferably 0.1 to 5; in the case where the component (II) is component (II-2), in an amount such that the molar ratio [(IV)/(II-2)] is usually 0.01 to 10, and preferably 0.1 to 5; and in the case where the component (II) is component (II-3), in an amount such that the molar ratio [(IV)/(II-3)] is usually 0.01 to 2, and preferably 0.005 to 1.

The temperature for olefin polymerization using the catalyst for olefin polymerization is generally within the range from −50 to +200° C., preferably from 0 to 170° C. The polymerization pressure is generally from normal pressure to 10 MPa gauge pressure, and preferably from normal pressure to 5 MPa gauge pressure, and the polymerization reaction can be carried out batchwise, semicontinuously or continuously. The polymerization can be carried out in two or more stages under different reaction conditions. The molecular weight of the resulting olefin polymer can be regulated by allowing hydrogen to exist in the polymerization system or by varying the polymerization temperature. Moreover, the molecular weight can be regulated by changing the amount of the component (II) used. When hydrogen is added, a suitable amount thereof is from about 0.001 to 100 NL per 1 kg of the olefin.

The olefins supplied to the polymerization reaction are propylene and one or more olefins selected from α-olefins having 2 to 20 carbon atoms (excluding propylene). The α-olefin having 4 to 20 carbon atoms may be a linear or branched α-olefin having 4 to 20, preferably 4 to 10 carbon atoms, and is exemplified by 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, or the like.

<Propylene·α-Olefin Copolymer (7B)>

The propylene·α-olefin copolymer (7B) is a propylene·α-olefin copolymer that contains propylene units in an amount of 55 to 90 mol % and units of at least one α-olefin selected from α-olefins having 2 to 20 carbon atoms (excluding propylene) in an amount of 10 to 45 mol %, has an MFR in the range of 0.01 to 100 g/min as measured according to JIS K-6721 at 230° C. under a load of 2.16 kg, and satisfies at least one of the following requirements (b-1) and (b-2):

(b-1): the syndiotactic triad fraction (rr fraction) as measured by $^{13}$C-NMR is 60% or more, and (b-2): the intrinsic viscosity [η] (dL/g) as measured in decalin at 135° C. and the MFR (g/10 min) as measured according to JIS K-6721 at 230° C. under a load of 2.16 kg satisfy the following relationship:

$$1.50 \times MFR^{(-0.20)} \leq [\eta] \leq 2.65 \times MFR^{(-0.20)}$$

The propylene.α-olefin copolymer (B) contains propylene units in an amount of 55 to 90 mol %, and units of α-olefin having 2 to 20 carbon atoms (excluding propylene) in an amount of 10 to 45 mol %.

Here, the sum of amounts of the constituent units derived from propylene and the units of α-olefin having 2 to 20 carbon atoms (excluding propylene) is 100 mol %.

The α-olefin having 2 to 20 carbon atoms (excluding propylene) may be exemplified by ethylene, 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene, 1-eicosene, or the like. In particular, ethylene, 1-butene, 1-hexene, 4-methyl-1-pentene, and 1-octene are preferred.

Among the propylene.α-olefin copolymers (7B) as described above, a propylene.ethylene copolymer is a preferred embodiment.

In the case of propylene.ethylene copolymer, constituent units derived from propylene are preferably contained in an amount of 10 to 35 mol %, more preferably 10 to 25 mol %.

Among the propylene.α-olefin copolymers (7B) as described above, a preferred embodiment is a propylene.ethylene.HAO copolymer comprising propylene units, ethylene units, and constituent units of any one of 1-butene, 1-hexene, 4-methyl-1-pentene, and 1-octene (may also be referred to as HAO comonomer), wherein the proportion (mol %) of the ethylene units is larger than the proportion (mol %) of the HAO comonomer units.

Furthermore, the propylene.ethylene copolymer and the propylene.ethylene.HAO copolymer, which are preferred embodiments, preferably satisfy both (b-1) and (b-2) described above.

The propylene.α-olefin copolymer (7B) used in the present invention preferably has an MFR in the range of 0.01 to 100 g/10 min, and more preferably in the range of 0.02 to 100 g/10 min, as measured according to JIS K-6721 at 230° C. under a load of 2.16 kg.

The propylene.α-olefin copolymer (7B) used in the present invention satisfies at least one of (b-1) and (b-2) below:

(b-1): The syndiotactic triad fraction (rr fraction, triad syndiotacticity) as measured by $^{13}$C-NMR is 60% or more; and (b-2): The intrinsic viscosity [η] (dL/g) as measured in decalin at 135° C. and the MFR (g/10 min, 230° C., under a load of 2.16 kg) satisfy the following relationship:

$$1.50 \times MFR^{(-0.20)} \leq [\eta] \leq 2.65 \times MFR^{(-0.20)}$$

First, the requirement (b-1) will be explained.

(b-1): The syndiotactic triad fraction (rr fraction, triad syndiotacticity) of the propylene.α-olefin copolymer (7B) as measured by $^{13}$C-NMR is 60% or more, preferably 70% or more, and more preferably 75% or more. The propylene.α-olefin copolymer (7B) having this rr fraction shows good compatibility with the syndiotactic propylene polymer (A).

The polymer satisfying (b-1) can be obtained, for example, by copolymerizing propylene and an α-olefin in the presence of a catalyst capable of producing syndiotactic polypropylene, and may also be produced using, for example, a catalyst as will be described later.

The rr fraction is determined from the absorption intensities of Prr (absorption intensity resulting from the methyl group of the second unit at a site where 3 propylene units are sequentially syndiotactically bound) and Pw (absorption intensity resulting from the total methyl groups of propylene units) in the $^{13}$C-NMR spectrum according to the following formula (2):

$$rr \text{ fraction } (\%) = 100 \times Prr/Pw \quad (2)$$

Here, when the absorption resulting from mr (the absorption resulting from at least both the syndiotactic bonding and isotactic bonding in the 3 propylene units; used in the determination of Pmr (absorption intensity)), the absorption resulting from rr (the absorption resulting from the methyl group of the second unit at a site where 3 propylene units are sequentially syndiotactically bound; used in the determination of Prr (absorption intensity)), or the absorption resulting from mm (the absorption resulting from the methyl group of the second unit at a site where 3 propylene units are sequentially isotactically bound; used in the determination of Pmm (absorption intensity)) overlaps with the absorption resulting from the comonomer, the absorption intensity is calculated without subtracting the contribution of the comonomer component.

Specifically, reference is made to JP-A No. 2002-097325 that describes a method for determining the syndiotacticity parameter (SP value) ([0018] to [0031]). In the present invention, the procedures described from [0018] to [0023] are performed, and integrated intensities of the signals of the first, second and third regions are obtained. Then, the fraction may be calculated using the above formula (2).

In particular, in the invention, the $rr_1$ value, specifically, a value determined by the method for determining the "syndiotacticity parameter (SP value)" described in [0018] to [0031] of JP-A No. 2002-097325, is 60% or greater, preferably 65% or greater, and more preferably 70% or greater. The $rr_1$ value may be obtained in the same manner as the rr value with the exception that when the absorption resulting from mr (the absorption resulting from at least both the syndiotactic bonding and isotactic bonding in the 3 propylene units; used in the determination of Pmr (absorption intensity)), the absorption resulting from rr (the absorption resulting from the methyl group of the second unit at a site where 3 propylene units are sequentially syndiotactically bound; used in the determination of Prr (absorption intensity)), or the absorption resulting from mm (the absorption resulting from the methyl group of the second unit at a site where 3 propylene units are sequentially isotactically bound; used in the determination of Pmm (absorption intensity)) overlaps with the absorption resulting from the comonomer, the absorption intensity is calculated with subtraction of the contribution of the comonomer component.

For the measurement of the rr value and $rr_1$ value, the NMR measurement is, for example, carried out in the following manner. Specifically, 0.35 g of a sample is dissolved by heating in 2.0 ml of hexachlorobutadiene. This solution is filtered through a glass filter (G2), subsequently, 0.5 ml of deuterated benzene is added, and the mixture is placed in an NMR tube having an internal diameter of 10 mm. Then, $^{13}$C-NMR measurement is performed at 120° C. using a GX-400 type NMR measuring apparatus manufactured by JEOL, Ltd. The number of scans is 8,000 or greater.

Next, the requirement (b-2) will be explained.

(b-2): The propylene.α-olefin copolymer (B) used in the present invention (7) is such that the intrinsic viscosity [η] (dL/g) as measured in decalin at 135° C. and the MFR (g/10 min) as measured according to JIS K-6721 at 230° C. under a load of 2.16 kg satisfy the following relationship:

$$1.50 \times MFR^{(-0.20)} \leq [\eta] \leq 2.65 \times MFR^{(-0.20)}$$

more preferably, $$1.80 \times MFR^{(-0.20)} \leq [\eta] \leq 2.50 \times MFR^{(-0.19)}$$

The propylene.α-olefin copolymer (7B) satisfying the relationship has good compatibility with the syndiotactic propylene polymer (7A), and thus is preferable.

The propylene.α-olefin copolymer (7B) satisfying the above expression can be obtained, for example, by copolymerizing propylene with an α-olefin with a catalyst capable of producing syndiotactic propylene, and may also be produced, for example, using a catalyst as will be described later. Such material is highly compatible with the syndiotactic propylene polymer (7A).

The propylene.α-olefin copolymer satisfying (b-2) has a larger MFR compared to known isotactic propylene-based copolymers at the same level of [η].

This fact is thought to be due to the difference in entanglement molecular weight, as described in Macromolecules, 31, 1335-1340 (1998), between the isotactic polypropylene (reported to be Me=6900 (g/mol) in the article) and the syndiotactic polypropylene (reported to be Me=2170 (g/mol) in the article). In more detail, provided that [η] is identical, the syndiotactic structure provides a larger number of entanglements than does the isotactic structure, and the MFR is increased.

As described above, the propylene.α-olefin copolymer (7B) satisfying at least one of (b-1) and (b-2) shows different stereospecificity from propylene.α-olefin copolymers having an isotactic structure, and thus is thought to have a syndiotactic structure. The excellent compatibility of the propylene.α-olefin copolymer (7B) with the component (7A) is probably due to such structure.

The intrinsic viscosity [η] of the propylene.α-olefin copolymer (7B) as measured in decalin at 135° C. is 0.1 to 10 dL/g, preferably 0.5 to 8.0 dL/g, more preferably 1.0 to 7.0 dL/g, and even more preferably 1.0 to 5.0 dL/g.

This propylene.α-olefin copolymer (7B) preferably has a degree of crystallization of 20% or less, and more preferably 0 to 15%, as measured by X-ray diffractometry.

It is preferable that this propylene.α-olefin copolymer (7B) has a single glass transition temperature, and the glass transition temperature (Tg) measured with differential scanning calorimeter (DSC) is usually 0° C. or below. If the glass transition temperature (Tg) of the propylene.α-olefin copolymer (7B) is within the above-described range, the cold resistance and low temperature properties are excellent.

Differential scanning calorimetric measurement is performed, for example, in the following manner. About 10.00 mg of a sample is placed in an aluminum pan for exclusive use, and the glass transition temperature (Tg) is determined from an endothermal curve obtained by heating the sample from 30° C. to 200° C. at a rate of 200° C./min, holding the sample at 200° C. for 5 minutes, cooling the sample from 200° C. to −100° C. at a rate of 10° C./min, allowing the sample to stand at −100° C. for 5 minutes, and then heating the sample at a rate of 10° C./min, using DSC RDC 220 manufactured by Seiko Instruments, Inc.

Also, the molecular weight distribution of this propylene.α-olefin copolymer (7B) as measured by GPC (Mw/Mn, relative to polystyrene, Mw: weight average molecular weight, Mn: number average molecular weight) is preferably 3.5 or less, more preferably 3.0 or less, therefore even more preferably 2.5 or less.

The propylene.α-olefin copolymer (7B) that is used in the present invention can be produced by polymerizing propylene, and at least one olefin selected from α-olefins having 2 to 20 carbon atoms (excluding propylene), in the presence of a catalyst for olefin polymerization comprising: (I') a bridged metallocene compound represented by following General Formula [9]; and (II) at least one compound selected from (II-1) an organoaluminum oxy compound, (II-2) a compound which reacts with the bridged metallocene compound (I') to form an ion pair, and (II-3) an organoaluminum compound. However, as long as the requirements of the propylene.α-olefin copolymer (7B) are satisfied, the method for production is not limited to this.

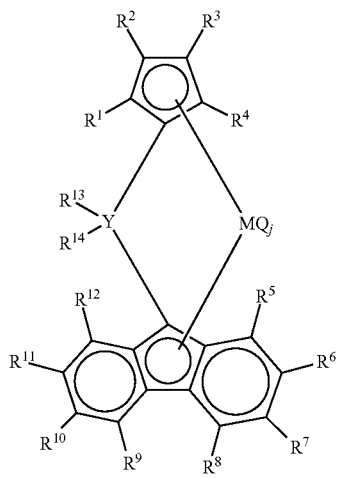

[9]

(In Formula, $R^1$, $R^2$, $R^3$, $R^4$, $R^5$, $R^8$, $R^9$ and $R^{12}$, which may be identical to or different from each other, are each an atom or a group selected from a hydrogen atom, a hydrocarbon group, and a silicon-containing group;

$R^6$ and $R^{11}$ are the same atoms or same groups selected from a hydrogen atom, a hydrocarbon group, and a silicon-containing group; $R^7$ and $R^{10}$ are the same atoms or same groups selected from a hydrogen atom, a hydrocarbon group, and a silicon-containing group; all of $R^6$, $R^7$, $R^{10}$ and $R^{11}$ cannot be simultaneously hydrogen atoms (in other words, there will be no case where all of $R^6$, $R^7$, $R^{10}$ and $R^{11}$ are simultaneously hydrogen atoms); $R^2$ and $R^3$ may be linked to each other to form a ring; among $R^5$ to $R^{12}$, adjacent groups may be linked to each other to form a ring;

$R^{13}$ and $R^{14}$, which may be identical to or different from each other, are each selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms; at least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms; M is Ti, Zr, or Hf; Y is carbon or silicon; Q is selected from halogen, a hydrocarbon group, a neutral, conjugated or non-conjugated diene having 10 or less carbon atoms, an anionic ligand, and a neutral ligand capable of coordination with a lone electron pair, in identical or different combinations; and j is an integer from 1 to 4).

Hereinafter, specific examples of the bridged metallocene compound represented by above General Formula [9] will be given (in the present specification, may also be referred to as "component (I')"), but the scope of the present invention is not intended to be particularly limited thereby. Herein, octamethyloctahydrodibenzofluorene refers to a structure represented by Formula [10], octamethyltetrahydrodicyclopentafluorene refers to a structure represented by Formula [11], and dibenzofluorene refers to a structure represented by Formula [12].

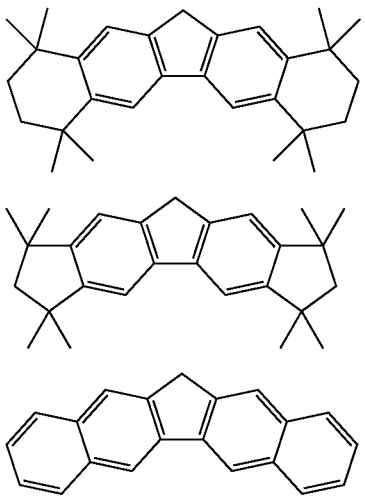

[10]

[11]

[12]

The specific examples include
di(p-chlorophenyl)methylene(cyclopentadienyl)(2,7-di-tert-butylfluorenyl)zirconium dichloride,
di(p-chlorophenyl)methylene(cyclopentadienyl)(3,6-di-tert-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(dibenzofluorenyl)zirconium dichloride,
di(p-chlorophenyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-(trimethylphenyl)-3,6-di-tert-butylfluorenyl)zirconium dichloride,
di(p-chlorophenyl)methylene(cyclopentadienyl)(2,7-(dimethylphenyl)-3,6-di-tert-butylfluorenyl)zirconium dichloride,
di(p-chlorophenyl)methylene(cyclopentadienyl)(2,3,6,7-tetra-tert-butylfluorenyl)zirconium dichloride,
di(m-chlorophenyl)methylene(cyclopentadienyl)(2,7-di-tert-butylfluorenyl)zirconium dichloride,
di(m-chlorophenyl)methylene(cyclopentadienyl)(3,6-di-tert-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(dibenzofluorenyl)zirconium dichloride,
di(m-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-(trimethylphenyl)-3,6-di-tert-butylfluorenyl)zirconium dichloride,
di(m-chlorophenyl)methylene(cyclopentadienyl)(2,7-(dimethylphenyl)-3,6-di-tert-butylfluorenyl)zirconium dichloride,
di(m-chlorophenyl)methylene(cyclopentadienyl)(2,3,6,7-tetratert-butylfluorenyl)zirconium dichloride,
di(p-bromophenyl)methylene(cyclopentadienyl)(2,7-di-tert-butylfluorenyl)zirconium dichloride,
di(p-bromophenyl)methylene(cyclopentadienyl)(3,6-di-tert-butylfluorenyl)zirconium dichloride,
di(p-bromophenyl)methylene(cyclopentadienyl)(octamethyloctahydrodibenzofluorenyl)zirconium dichloride,
di(p-bromophenyl)methylene(cyclopentadienyl)(octamethyltetrahydrodicyclopentafluorenyl)zirconium dichloride,
di(p-bromophenyl)methylene(cyclopentadienyl)(dibenzofluorenyl)zirconium dichloride,
di(p-bromophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-(trimethylphenyl)-3,6-di-tert-butylfluorenyl)zirconium dichloride,
di(p-bromophenyl)methylene(cyclopentadienyl)(2,7-(dimethylphenyl)-3,6-di-tert-butylfluorenyl)zirconium dichloride,
di(p-bromophenyl)methylene(cyclopentadienyl)(2,3,6,7-tetra-tert-butylfluorenyl)zirconium dichloride,
di(m-bromophenyl)methylene(cyclopentadienyl)(2,7-di-tert-butylfluorenyl)zirconium dichloride,
di(m-bromophenyl)methylene(cyclopentadienyl)(3,6-di-tert-butylfluorenyl)zirconium dichloride,
di(m-bromophenyl)methylene(cyclopentadienyl)(octamethyloctahydrodibenzofluorenyl)zirconium dichloride,
di(m-bromophenyl)methylene(cyclopentadienyl)(octamethyltetrahydrodicyclopentafluorenyl)zirconium dichloride,
di(m-bromophenyl)methylene(cyclopentadienyl)(dibenzofluorenyl)zirconium dichloride,
di(m-bromophenyl)methylene(cyclopentadienyl)(2,7-diphenyl-3,6-di-tert-butylfluorenyl)zirconium dichloride,
di(m-bromophenyl)methylene(cyclopentadienyl)(2,7-dimethyl-3,6-di-tert-butylfluorenyl)zirconium dichloride,
di(m-bromophenyl)methylene(cyclopentadienyl)(2,7-(trimethylphenyl)-3,6-di-tert-butylfluorenyl)zirconium dichloride,
di(m-bromophenyl)methylene(cyclopentadienyl)(2,7-(dimethylphenyl)-3,6-di-tert-butylfluorenyl)zirconium dichloride,
di(m-bromophenyl)methylene(cyclopentadienyl)(2,3,6,7-tetra-tert-butylfluorenyl)zirconium dichloride,
di(p-iodophenyl)methylene(cyclopentadienyl)(2,7-di-tert-butylfluorenyl)zirconium dichloride,
di(p-iodophenyl)methylene(cyclopentadienyl)(3,6-di-tert-butylfluorenyl)zirconium dichloride, di(p-iodophenyl)methylene(cyclopentadienyl)(octamethyloctahydrodibenzofluorenyl)zirconium dichloride,
di(p-iodophenyl)methylene(cyclopentadienyl)(octamethyltetrahydrodicyclopentafluorenyl)zirconium dichloride,
di(p-iodophenyl)methylene(cyclopentadienyl)(dibenzofluorenyl)zirconium dichloride,
di(p-iodophenyl)methylene(cyclopentadienyl)(2,7-diphenyl-3,6-di-tert-butylfluorenyl)zirconium dichloride,
di(p-iodophenyl)methylene(cyclopentadienyl)(2,7-dimethyl-3,6-di-tert-butylfluorenyl)zirconium dichloride,
di(p-iodophenyl)methylene(cyclopentadienyl)(2,7-(trimethylphenyl)-3,6-di-tert-butylfluorenyl)zirconium dichloride,
di(p-iodophenyl)methylene(cyclopentadienyl)(2,7-(dimethylphenyl)-3,6-di-tert-butylfluorenyl)zirconium dichloride,
di(p-iodophenyl)methylene(cyclopentadienyl)(2,3,6,7-tetra-tert-butylfluorenyl)zirconium dichloride,
di(m-trifluoromethyl-phenyl)methylene(cyclopentadienyl)(2,7-di-tert-butylfluorenyl)zirconium dichloride,
di(m-trifluoromethyl-phenyl)methylene(cyclopentadienyl)(3,6-di-tert-butylfluorenyl)zirconium dichloride,
di(m-trifluoromethyl-phenyl)methylene(cyclopentadienyl)(octamethyloctahydrodibenzofluorenyl)zirconium dichloride,
di(m-trifluoromethyl-phenyl)methylene(cyclopentadienyl)(octamethyltetrahydrodicyclopentafluorenyl)zirconium dichloride,
di(m-trifluoromethyl-phenyl)methylene(cyclopentadienyl)(dibenzofluorenyl)zirconium dichloride,
di(m-trifluoromethyl-phenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-(trimethylphenyl)-3,6-di-tert-butylfluorenyl)zirconium dichloride,
di(m-trifluoromethyl-phenyl)methylene(cyclopentadienyl)(2,7-(dimethylphenyl)-3,6-di-tert-butylfluorenyl)zirconium dichloride,
di(m-trifluoromethyl-phenyl)methylene(cyclopentadienyl)(2,3,6,7-tetra-tert-butylfluorenyl)zirconium dichloride,
di(p-trifluoromethyl-phenyl)methylene(cyclopentadienyl)(2,7-di-tert-butylfluorenyl)zirconium dichloride,
di(p-trifluoromethyl-phenyl)methylene(cyclopentadienyl)(3,6-di-tert-butylfluorenyl)zirconium dichloride,
di(p-trifluoromethyl-phenyl)methylene(cyclopentadienyl)(octamethyloctahydrodibenzofluorenyl)zirconium dichloride,
di(p-trifluoromethyl-phenyl)methylene(cyclopentadienyl)(octamethyltetrahydrodicyclopentafluorenyl)zirconium dichloride,
di(p-trifluoromethyl-phenyl)methylene(cyclopentadienyl)(dibenzofluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-(trimethylphenyl)-3,6-di-tert-butylfluorenyl)zirconium dichloride,
di(p-trifluoromethyl-phenyl)methylene(cyclopentadienyl)(2,7-(dimethylphenyl)-3,6-di-tert-butylfluorenyl)zirconium dichloride,
di(p-trifluoromethyl-phenyl)methylene(cyclopentadienyl)(2,3,6,7-tetra-tert-butylfluorenyl)zirconium dichloride,
di(p-trichloromethyl-phenyl)methylene(cyclopentadienyl)(2,7-di-tert-butylfluorenyl)zirconium dichloride,
di(p-trichloromethyl-phenyl)methylene(cyclopentadienyl)(3,6-di-tert-butylfluorenyl)zirconium dichloride,
di(p-trichloromethyl-phenyl)methylene(cyclopentadienyl)(octamethyloctahydrodibenzofluorenyl)zirconium dichloride,
di(p-trichloromethyl-phenyl)methylene(cyclopentadienyl)(octamethyltetrahydrodicyclopentafluorenyl)zirconium dichloride,
di(p-trichloromethyl-phenyl)methylene(cyclopentadienyl)(dibenzofluorenyl)zirconium dichloride,
di(p-trichloromethyl-phenyl)methylene(cyclopentadienyl)(2,7-diphenyl-3,6-di-tert-butylfluorenyl)zirconium dichloride,
di(p-trichloromethyl-phenyl)methylene(cyclopentadienyl)(2,7-dimethyl-3,6-di-tert-butylfluorenyl)zirconium dichloride,
di(p-trichloromethyl-phenyl)methylene(cyclopentadienyl)(2,7-(trimethylphenyl)-3,6-di-tert-butylfluorenyl)zirconium dichloride,
di(p-trichloromethyl-phenyl)methylene(cyclopentadienyl)(2,7-(dimethylphenyl)-3,6-di-tert-butylfluorenyl)zirconium dichloride,
di(p-trichloromethyl-phenyl)methylene(cyclopentadienyl)(2,3,6,7-tetra-tert-butylfluorenyl)zirconium dichloride,
di(m-trichloromethyl-phenyl)methylene(cyclopentadienyl)(2,7-di-tert-butylfluorenyl)zirconium dichloride,
di(m-trichloromethyl-phenyl)methylene(cyclopentadienyl)(3,6-di-tert-butylfluorenyl)zirconium dichloride,
di(m-trichloromethyl-phenyl)methylene(cyclopentadienyl)(octamethyloctahydrodibenzofluorenyl)zirconium dichloride,
di(m-trichloromethyl-phenyl)methylene(cyclopentadienyl)(octamethyltetrahydrodicyclopentafluorenyl)zirconium dichloride,
di(m-trichloromethyl-phenyl)methylene(cyclopentadienyl)(dibenzofluorenyl)zirconium dichloride,
di(m-trichloromethyl-phenyl)methylene(cyclopentadienyl)(2,7-diphenyl-3,6-di-tert-butylfluorenyl)zirconium dichloride,
di(m-trichloromethyl-phenyl)methylene(cyclopentadienyl)(2,7-dimethyl-3,6-di-tert-butylfluorenyl)zirconium dichloride,
di(m-trichloromethyl-phenyl)methylene(cyclopentadienyl)(2,7-(trimethylphenyl)-3,6-di-tert-butylfluorenyl)zirconium dichloride,
di(m-trichloromethyl-phenyl)methylene(cyclopentadienyl)(2,7-(dimethylphenyl)-3,6-di-tert-butylfluorenyl)zirconium dichloride,
di(m-trichloromethyl-phenyl)methylene(cyclopentadienyl)(2,3,6,7-tetra-tert-butylfluorenyl)zirconium dichloride,
di(p-biphenyl)methylene(cyclopentadienyl)(2,7-di-tert-butylfluorenyl)zirconium dichloride,
di(p-biphenyl)methylene(cyclopentadienyl)(3,6-di-tert-butylfluorenyl)zirconium dichloride,
di(p-biphenyl)methylene(cyclopentadienyl)(octamethyloctahydrodibenzofluorenyl)zirconium dichloride,
di(p-biphenyl)methylene(cyclopentadienyl)(octamethyltetrahydrodicyclopentafluorenyl)zirconium dichloride,
di(p-biphenyl)methylene(cyclopentadienyl)(dibenzofluorenyl)zirconium dichloride,
di(p-biphenyl)methylene(cyclopentadienyl)(2,7-diphenyl-3,6-di-tert-butylfluorenyl)zirconium dichloride, di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-(trimethylphenyl)-3,6-di-tert-butylfluorenyl)zirconium dichloride,
di(p-biphenyl)methylene(cyclopentadienyl)(2,7-(dimethylphenyl)-3,6-di-tert-butylfluorenyl)zirconium dichloride,
di(p-biphenyl)methylene(cyclopentadienyl)(2,3,6,7-tetra-tert-butylfluorenyl)zirconium dichloride,
di(3,5-ditrifluoromethyl-phenyl)methylene(cyclopentadienyl)(2,7-di-tert-butylfluorenyl)zirconium dichloride,
di(3,5-ditrifluoromethyl-phenyl)methylene(cyclopentadienyl)(3,6-di-tert-butylfluorenyl)zirconium dichloride,
di(3,5-ditrifluoromethyl-phenyl)methylene(cyclopentadienyl)(octamethyloctahydrodibenzofluorenyl)zirconium dichloride,
di(3,5-ditrifluoromethyl-phenyl)methylene(cyclopentadienyl)(octamethyltetrahydrodicyclopentafluorenyl)zirconium dichloride,
di(3,5-ditrifluoromethyl-phenyl)methylene(cyclopentadienyl)(dibenzofluorenyl)zirconium dichloride,
di(3,5-ditrifluoromethyl-phenyl)methylene(cyclopentadienyl)(2,7-diphenyl-3,6-di-tert-butylfluorenyl)zirconium dichloride,
di(3,5-ditrifluoromethyl-phenyl)methylene(cyclopentadienyl)(2,7-dimethyl-3,6-di-tert-butylfluorenyl)zirconium dichloride,
di(3,5-ditrifluoromethyl-phenyl)methylene(cyclopentadienyl)(2,7-(trimethylphenyl)-3,6-di-tert-butylfluorenyl)zirconium dichloride,
di(3,5-ditrifluoromethyl-phenyl)methylene(cyclopentadienyl)(2,7-(dimethylphenyl)-3,6-di-tert-butylfluorenyl)zirconium dichloride,
di(3,5-ditrifluoromethyl-phenyl)methylene(cyclopentadienyl)(2,3,6,7-tetra-tert-butylfluorenyl)zirconium dichloride,
di(3,5-dichloromethyl-phenyl)methylene(cyclopentadienyl)(2,7-di-tert-butylfluorenyl)zirconium dichloride,
di(3,5-dichloromethyl-phenyl)methylene(cyclopentadienyl)(3,6-di-tert-butylfluorenyl)zirconium dichloride,
di(3,5-dichloromethyl-phenyl)methylene(cyclopentadienyl)(octamethyloctahydrodibenzofluorenyl)zirconium dichloride,
di(3,5-dichloromethyl-phenyl)methylene(cyclopentadienyl)(octamethyltetrahydrodicyclopentafluorenyl)zirconium dichloride,
di(3,5-dichloromethyl-phenyl)methylene(cyclopentadienyl)(dibenzofluorenyl)zirconium dichloride,
di(3,5-dichloromethyl-phenyl)methylene(cyclopentadienyl)(2,7-diphenyl-3,6-di-tert-butylfluorenyl)zirconium dichloride,
di(3,5-dichloromethyl-phenyl)methylene(cyclopentadienyl)(2,7-dimethyl-3,6-di-tert-butylfluorenyl)zirconium dichloride,
di(3,5-dichloromethyl-phenyl)methylene(cyclopentadienyl)(2,7-(trimethylphenyl)-3,6-di-tert-butylfluorenyl)zirconium dichloride,
di(3,5-dichloromethyl-phenyl)methylene(cyclopentadienyl)(2,7-(dimethylphenyl)-3,6-di-tert-butylfluorenyl)zirconium dichloride,
di(3,5-dichloromethyl-phenyl)methylene(cyclopentadienyl)(2,3,6,7-tetra-tert-butylfluorenyl)zirconium dichloride,
di(4-chloronaphthyl)methylene(cyclopentadienyl)(2,7-di-tert-butylfluorenyl)zirconium dichloride,
di(4-chloronaphthyl)methylene(cyclopentadienyl)(3,6-di-tert-butylfluorenyl)zirconium dichloride,
di(4-chloronaphthyl)methylene(cyclopentadienyl)(octamethyloctahydrodibenzofluorenyl)zirconium dichloride,
di(4-chloronaphthyl)methylene(cyclopentadienyl)(octamethyltetrahydrodicyclopentafluorenyl)zirconium dichloride,
di(4-chloronaphthyl)methylene(cyclopentadienyl)(dibenzofluorenyl)zirconium dichloride,
di(4-chloronaphthyl)methylene(cyclopentadienyl)(2,7-diphenyl-3,6-di-tert-butylfluorenyl)zirconium dichloride,
di(4-chloronaphthyl)methylene(cyclopentadienyl)(2,7-dimethyl-3,6-di-tert-butylfluorenyl)zirconium dichloride,
di(4-chloronaphthyl)methylene(cyclopentadienyl)(2,7-(trimethylphenyl)-3,6-di-tert-butylfluorenyl)zirconium dichloride,
di(4-chloronaphthyl)methylene(cyclopentadienyl)(2,7-(dimethylphenyl)-3,6-di-tert-butylfluorenyl)zirconium dichloride,
di(4-chloronaphthyl)methylene(cyclopentadienyl)(2,3,6,7-tetra-tert-butylfluorenyl)zirconium dichloride,
di(3-chloronaphthyl)methylene(cyclopentadienyl)(2,7-di-tert-butylfluorenyl)zirconium dichloride,
di(3-chloronaphthyl)methylene(cyclopentadienyl)(3,6-di-tert-butylfluorenyl)zirconium dichloride,
di(3-chloronaphthyl)methylene(cyclopentadienyl)(octamethyloctahydrodibenzofluorenyl)zirconium dichloride,
di(3-chloronaphthyl)methylene(cyclopentadienyl)(octamethyltetrahydrodicyclopentafluorenyl)zirconium dichloride,
di(3-chloronaphthyl)methylene(cyclopentadienyl)(dibenzofluorenyl)zirconium dichloride,
di(3-chloronaphthyl)methylene(cyclopentadienyl)(2,7-diphenyl-3,6-di-tert-butylfluorenyl)zirconium dichloride,
di(3-chloronaphthyl)methylene(cyclopentadienyl)(2,7-dimethyl-3,6-di-tert-butylfluorenyl)zirconium dichloride,
di(3-chloronaphthyl)methylene(cyclopentadienyl)(2,7-(trimethylphenyl)-3,6-di-tert-butylfluorenyl)zirconium dichloride,
di(3-chloronaphthyl)methylene(cyclopentadienyl)(2,7-(dimethylphenyl)-3,6-di-tert-butylfluorenyl)zirconium dichloride,
di(3-chloronaphthyl)methylene(cyclopentadienyl)(2,3,6,7-tetra-tert-butylfluorenyl)zirconium dichloride,
di(5-chloronaphthyl)methylene(cyclopentadienyl)(2,7-di-tert-butylfluorenyl)zirconium dichloride,
di(5-chloronaphthyl)methylene(cyclopentadienyl)(3,6-di-tert-butylfluorenyl)zirconium dichloride,
di(5-chloronaphthyl)methylene(cyclopentadienyl)(octamethyloctahydrodibenzofluorenyl)zirconium dichloride,
di(5-chloronaphthyl)methylene(cyclopentadienyl)(octamethyltetrahydrodicyclopentafluorenyl)zirconium dichloride,
di(5-chloronaphthyl)methylene(cyclopentadienyl)(dibenzofluorenyl)zirconium dichloride,
di(5-chloronaphthyl)methylene(cyclopentadienyl)(2,7-diphenyl-3,6-di-tert-butylfluorenyl)zirconium dichloride,
di(5-chloronaphthyl)methylene(cyclopentadienyl)(2,7-dimethyl-3,6-di-tert-butylfluorenyl)zirconium dichloride,
di(5-chloronaphthyl)methylene(cyclopentadienyl)(2,7-(trimethylphenyl)-3,6-di-tert-butylfluorenyl)zirconium dichloride,
di(5-chloronaphthyl)methylene(cyclopentadienyl)(2,7-(dimethylphenyl)-3,6-di-tert-butylfluorenyl)zirconium dichloride,
di(5-chloronaphthyl)methylene(cyclopentadienyl)(2,3,6,7-tetra-tert-butylfluorenyl)zirconium dichloride,
phenyl(p-chlorophenyl)methylene(cyclopentadienyl)(2,7-di-tert-butylfluorenyl)zirconium dichloride,
phenyl(p-chlorophenyl)methylene(cyclopentadienyl)(3,6-di-tert-butylfluorenyl)zirconium dichloride, phenyl(p-chlorophenyl)methylene(cyclopentadienyl)(octamethyloctahydrodibenzofluorenyl)zirconium dichloride,
phenyl(p-chlorophenyl)methylene(cyclopentadienyl)(octamethyltetrahydrodicyclopentafluorenyl)zirconium dichloride,
phenyl(p-chlorophenyl)methylene(cyclopentadienyl)(dibenzofluorenyl)zirconium dichloride,
phenyl(p-chlorophenyl)methylene(cyclopentadienyl)(2,7-diphenyl-3,6-di-tert-butylfluorenyl)zirconium dichloride,
phenyl(p-chlorophenyl)methylene(cyclopentadienyl)(2,7-dimethyl-3,6-di-tert-butylfluorenyl)zirconium dichloride,
phenyl(p-chlorophenyl)methylene(cyclopentadienyl)(2,7-(trimethylphenyl)-3,6-di-tert-butylfluorenyl)zirconium dichloride,
phenyl(p-chlorophenyl)methylene(cyclopentadienyl)(2,7-(dimethylphenyl)-3,6-di-tert-butylfluorenyl)zirconium dichloride,
phenyl(p-chlorophenyl)methylene(cyclopentadienyl)(2,3,6,7-tetra-tert-butylfluorenyl)zirconium dichloride,
phenyl(m-chlorophenyl)methylene(cyclopentadienyl)(2,7-di-tert-butylfluorenyl)zirconium dichloride,
phenyl(m-chlorophenyl)methylene(cyclopentadienyl)(3,6-di-tert-butylfluorenyl)zirconium dichloride,
phenyl(m-chlorophenyl)methylene(cyclopentadienyl)(octamethyloctahydrodibenzofluorenyl)zirconium dichloride,
phenyl(m-chlorophenyl)methylene(cyclopentadienyl)(octamethyltetrahydrodicyclopentafluorenyl)zirconium dichloride,
phenyl(m-chlorophenyl)methylene(cyclopentadienyl)(dibenzofluorenyl)zirconium dichloride,
phenyl(m-chlorophenyl)methylene(cyclopentadienyl)(2,7-diphenyl-3,6-di-tert-butylfluorenyl)zirconium dichloride,
phenyl(m-chlorophenyl)methylene(cyclopentadienyl)(2,7-dimethyl-3,6-di-tert-butylfluorenyl)zirconium dichloride,
phenyl(m-chlorophenyl)methylene(cyclopentadienyl)(2,7-(trimethylphenyl)-3,6-di-tert-butylfluorenyl)zirconium dichloride,
phenyl(m-chlorophenyl)methylene(cyclopentadienyl)(2,7-(dimethylphenyl)-3,6-di-tert-butylfluorenyl)zirconium dichloride,
phenyl(m-chlorophenyl)methylene(cyclopentadienyl)(2,3,6,7-tetra-tert-butylfluorenyl)zirconium dichloride,
phenyl(m-trifluoromethyl-phenyl)methylene(cyclopentadienyl)(2,7-di-tert-butylfluorenyl)zirconium dichloride,
phenyl(m-trifluoromethyl-phenyl)methylene(cyclopentadienyl)(3,6-di-tert-butylfluorenyl)zirconium dichloride,
phenyl(m-trifluoromethyl-phenyl)methylene(cyclopentadienyl)(octamethyloctahydrodibenzofluorenyl)zirconium dichloride,
phenyl(m-trifluoromethyl-phenyl)methylene(cyclopentadienyl)(octamethyltetrahydrodicyclopentafluorenyl)zirconium dichloride,
phenyl(m-trifluoromethyl-phenyl)methylene(cyclopentadienyl)(dibenzofluorenyl)zirconium dichloride,
phenyl(m-trifluoromethyl-phenyl)methylene(cyclopentadienyl)(2,7-diphenyl-3,6-di-tert-butylfluorenyl)zirconium dichloride,
phenyl(m-trifluoromethyl-phenyl)methylene(cyclopentadienyl)(2,7-dimethyl-3,6-di-tert-butylfluorenyl)zirconium dichloride,
phenyl(m-trifluoromethyl-phenyl)methylene(cyclopentadienyl)(2,7-(trimethylphenyl)-3,6-di-tert-butylfluorenyl)zirconium dichloride,
phenyl(m-trifluoromethyl-phenyl)methylene(cyclopentadienyl)(2,7-(dimethylphenyl)-3,6-di-tert-butylfluorenyl)zirconium dichloride,
phenyl(m-trifluoromethyl-phenyl)methylene(cyclopentadienyl)(2,3,6,7-tetra-tert-butylfluorenyl)zirconium dichloride,
naphthyl(p-chlorophenyl)methylene(cyclopentadienyl)(2,7-di-tert-butylfluorenyl)zirconium dichloride,
naphthyl(p-chlorophenyl)methylene(cyclopentadienyl)(3,6-di-tert-butylfluorenyl)zirconium dichloride,
naphthyl(p-chlorophenyl)methylene(cyclopentadienyl)(octamethyloctahydrodibenzofluorenyl)zirconium dichloride,
naphthyl(p-chlorophenyl)methylene(cyclopentadienyl)(octamethyltetrahydrodicyclopentafluorenyl)zirconium dichloride,
naphthyl(p-chlorophenyl)methylene(cyclopentadienyl)(dibenzofluorenyl)zirconium dichloride,
naphthyl(p-chlorophenyl)methylene(cyclopentadienyl)(2,7-diphenyl-3,6-di-tert-butylfluorenyl)zirconium dichloride,
naphthyl(p-chlorophenyl)methylene(cyclopentadienyl)(2,7-dimethyl-3,6-di-tert-butylfluorenyl)zirconium dichloride,
naphthyl(p-chlorophenyl)methylene(cyclopentadienyl)(2,7-(trimethylphenyl)-3,6-di-tert-butylfluorenyl)zirconium dichloride,
naphthyl(p-chlorophenyl)methylene(cyclopentadienyl)(2,7-(dimethylphenyl)-3,6-di-tert-butylfluorenyl)zirconium dichloride,
naphthyl(p-chlorophenyl)methylene(cyclopentadienyl)(2,3,6,7-tetra-tert-butylfluorenyl)zirconium dichloride,
naphthyl(m-chlorophenyl)methylene(cyclopentadienyl)(2,7-di-tert-butylfluorenyl)zirconium dichloride,
naphthyl(m-chlorophenyl)methylene(cyclopentadienyl)(3,6-di-tert-butylfluorenyl)zirconium dichloride,
naphthyl(m-chlorophenyl)methylene(cyclopentadienyl)(octamethyloctahydrodibenzofluorenyl)zirconium dichloride,
naphthyl(m-chlorophenyl)methylene(cyclopentadienyl)(octamethyltetrahydrodicyclopentafluorenyl)zirconium dichloride,
naphthyl(m-chlorophenyl)methylene(cyclopentadienyl)(dibenzofluorenyl)zirconium dichloride,
naphthyl(m-chlorophenyl)methylene(cyclopentadienyl)(2,7-diphenyl-3,6-di-tert-butylfluorenyl)zirconium dichloride,
naphthyl(m-chlorophenyl)methylene(cyclopentadienyl)(2,7-dimethyl-3,6-di-tert-butylfluorenyl)zirconium dichloride,
naphthyl(m-chlorophenyl)methylene(cyclopentadienyl)(2,7-(trimethylphenyl)-3,6-di-tert-butylfluorenyl)zirconium dichloride,
naphthyl(m-chlorophenyl)methylene(cyclopentadienyl)(2,7-(dimethylphenyl)-3,6-di-tert-butylfluorenyl)zirconium dichloride,
naphthyl(m-chlorophenyl)methylene(cyclopentadienyl)(2,3,6,7-tetra-tert-butylfluorenyl)zirconium dichloride,
naphthyl(m-trifluoromethyl-phenyl)methylene(cyclopentadienyl)(2,7-di-tert-butylfluorenyl)zirconium dichloride,
naphthyl(m-trifluoromethyl-phenyl)methylene(cyclopentadienyl)(3,6-di-tert-butylfluorenyl)zirconium dichloride,
naphthyl(m-trifluoromethyl-phenyl)methylene(cyclopentadienyl)(octamethyloctahydrodibenzofluorenyl)zirconium dichloride,
naphthyl(m-trifluoromethyl-phenyl)methylene(cyclopentadienyl)(octamethyltetrahydrodicyclopentafluorenyl)zirconium dichloride, naphthyl(m-trifluoromethyl-phenyl)methylene(cyclopentadienyl)(dibenzofluorenyl)zirconium dichloride,
naphthyl(m-trifluoromethyl-phenyl)methylene(cyclopentadienyl)(2,7-diphenyl-3,6-di-tert-butylfluorenyl)zirconium dichloride,
naphthyl(m-trifluoromethyl-phenyl)methylene(cyclopentadienyl)(2,7-dimethyl-3,6-di-tert-butylfluorenyl)zirconium dichloride,
naphthyl(m-trifluoromethyl-phenyl)methylene(cyclopentadienyl)(2,7-(trimethylphenyl)-3,6-di-tert-butylfluorenyl)zirconium dichloride,
naphthyl(m-trifluoromethyl-phenyl)methylene(cyclopentadienyl)(2,7-(dimethylphenyl)-3,6-di-tert-butylfluorenyl)zirconium dichloride,
naphthyl(m-trifluoromethyl-phenyl)methylene(cyclopentadienyl)(2,3,6,7-tetra-tert-butylfluorenyl)zirconium dichloride,
(p-tolyl)(p-chlorophenyl)methylene(cyclopentadienyl)(2,7-di-tert-butylfluorenyl)zirconium dichloride,
(p-tolyl)(p-chlorophenyl)methylene(cyclopentadienyl)(3,6-di-tert-butylfluorenyl)zirconium dichloride,
(p-tolyl)(p-chlorophenyl)methylene(cyclopentadienyl)(octamethyloctahydrodibenzofluorenyl)zirconium dichloride,
(p-tolyl)(p-chlorophenyl)methylene(cyclopentadienyl)(octamethyltetrahydrodicyclopentafluorenyl)zirconium dichloride,
(p-tolyl)(p-chlorophenyl)methylene(cyclopentadienyl)(dibenzofluorenyl)zirconium dichloride,
(p-tolyl)(p-chlorophenyl)methylene(cyclopentadienyl)(2,7-diphenyl-3,6-di-tert-butylfluorenyl)zirconium dichloride,
(p-tolyl)(p-chlorophenyl)methylene(cyclopentadienyl)(2,7-dimethyl-3,6-di-tert-butylfluorenyl)zirconium dichloride,
(p-tolyl)(p-chlorophenyl)methylene(cyclopentadienyl)(2,7-(trimethylphenyl)-3,6-di-tert-butylfluorenyl)zirconium dichloride,
(p-tolyl)(p-chlorophenyl)methylene(cyclopentadienyl)(2,7-(dimethylphenyl)-3,6-di-tert-butylfluorenyl)zirconium dichloride,
(p-tolyl)(p-chlorophenyl)methylene(cyclopentadienyl)(2,3,6,7-tetra-tert-butylfluorenyl)zirconium dichloride,
(p-tolyl)(m-chlorophenyl)methylene(cyclopentadienyl)(2,7-di-tert-butylfluorenyl)zirconium dichloride,
(p-tolyl)(m-chlorophenyl)methylene(cyclopentadienyl)(3,6-di-tert-butylfluorenyl)zirconium dichloride,
(p-tolyl)(m-chlorophenyl)methylene(cyclopentadienyl)(octamethyloctahydrodibenzofluorenyl)zirconium dichloride,
(p-tolyl)(m-chlorophenyl)methylene(cyclopentadienyl)(octamethyltetrahydrodicyclopentafluorenyl)zirconium dichloride,
(p-tolyl)(m-chlorophenyl)methylene(cyclopentadienyl)(dibenzofluorenyl)zirconium dichloride,
(p-tolyl)(m-chlorophenyl)methylene(cyclopentadienyl)(2,7-diphenyl-3,6-di-tert-butylfluorenyl)zirconium dichloride,
(p-tolyl)(m-chlorophenyl)methylene(cyclopentadienyl)(2,7-dimethyl-3,6-di-tert-butylfluorenyl)zirconium dichloride,
(p-tolyl)(m-chlorophenyl)methylene(cyclopentadienyl)(2,7-(trimethylphenyl)-3,6-di-tert-butylfluorenyl)zirconium dichloride,
(p-tolyl)(m-chlorophenyl)methylene(cyclopentadienyl)(2,7-(dimethylphenyl)-3,6-di-tert-butylfluorenyl)zirconium dichloride,
(p-tolyl)(m-chlorophenyl)methylene(cyclopentadienyl)(2,3,6,7-tetra-tert-butylfluorenyl)zirconium dichloride,
(p-tolyl)(m-trifluoromethyl-phenyl)methylene(cyclopentadienyl)(2,7-di-tert-butylfluorenyl)zirconium dichloride,
(p-tolyl)(m-trifluoromethyl-phenyl)methylene(cyclopentadienyl)(3,6-di-tert-butylfluorenyl)zirconium dichloride,
(p-tolyl)(m-trifluoromethyl-phenyl)methylene(cyclopentadienyl)(octamethyloctahydrodibenzofluorenyl)zirconium dichloride,
(p-tolyl)(m-trifluoromethyl-phenyl)methylene(cyclopentadienyl)(octamethyltetrahydrodicyclopentafluorenyl)zirconium dichloride,
(p-tolyl)(m-trifluoromethyl-phenyl)methylene(cyclopentadienyl)(dibenzofluorenyl)zirconium dichloride,
(p-tolyl)(m-trifluoromethyl-phenyl)methylene(cyclopentadienyl)(2,7-diphenyl-3,6-di-tert-butylfluorenyl)zirconium dichloride,
(p-tolyl)(m-trifluoromethyl-phenyl)methylene(cyclopentadienyl)(2,7-dimethyl-3,6-di-tert-butylfluorenyl)zirconium dichloride,
(p-tolyl)(m-trifluoromethyl-phenyl)methylene(cyclopentadienyl)(2,7-(trimethylphenyl)-3,6-di-tert-butylfluorenyl)zirconium dichloride,
(p-tolyl)(m-trifluoromethyl-phenyl)methylene(cyclopentadienyl)(2,7-(dimethylphenyl)-3,6-di-tert-butylfluorenyl)zirconium dichloride,
(p-tolyl)(m-trifluoromethyl-phenyl)methylene(cyclopentadienyl)(2,3,6,7-tetra-tert-butylfluorenyl)zirconium dichloride, and the like.

Furthermore, compounds resulting from replacing the "zirconium" of the compounds described above with "hafnium" or "titanium", and metallocene compounds having "difluoride", "dibromide" or "diiodide" instead of "dichloride", or having "dimethyl" or "methylethyl" instead of "dichloride", and the like are also examples of the metallocene compound represented by General Formula [9].

The bridged metallocene compound (I') described above can be produced by referring to known methods. As the known method for production, for example, the method for production described in the pamphlet of WO 04/029062 filed by the present applicant may be mentioned.

The metallocene compounds as described above can be used individually or in combination of two or more kinds.

As the organoaluminum oxy compound (II-1) used in the production of the propylene.α-olefin copolymer (7B), the same compounds mentioned as the organoaluminum oxy compounds (II-1) used in the production of the syndiotactic propylene polymer (7A) described above, may be used.

As the compound (II-2) reacting with the bridged metallocene compound (I') to form an ion pair used in the production of the propylene.α-olefin copolymer (7B), the same compounds mentioned as the compounds (II-2) reacting with the bridged metallocene compound (I) to form an ion pair used in the production of the syndiotactic propylene polymer (7A) described above, may be used.

As the organoaluminum compound (II-3) used in the production of the propylene.α-olefin copolymer (7B), the same compounds mentioned as the organoaluminum compounds (II-3) used in the production of the syndiotactic propylene polymer (7A), may be used.

Further, the above-mentioned respective components may be used while being supported on a particulate support. As the support used as necessary, the same supports used in the production of the syndiotactic propylene polymer (7A) can be used.

Method for Producing Propylene.α-Olefin Copolymer (7B)

In the polymerization, the mode of using each of the components, and the order of addition are arbitrarily selected, and the following methods may be mentioned:

a method of adding the component (I') and the component (II) into the polymerization vessel in an arbitrary order.

In the method described above, at least two or more of the catalyst components may be brought into contact in advance.

When the polymerization of olefins is performed using the catalyst for olefin polymerization as described above, the component (I') is usually used in an amount of $10^{-9}$ to $10^{-1}$ moles, and preferably $10^{-8}$ to $10^{-2}$ moles, per liter of the reaction volume.

The component (II-1) is used in an amount such that the molar ratio of the component (II-1) to the total transition metal atoms (M) in the component (I') [(II-1)/M] is usually 0.01 to 5,000, and preferably 0.05 to 2,000. The component (II-2) is used in an amount such that the molar ratio of the aluminum atoms in the component (II-2) to the total transition metal atoms (M) in the component (I') [(II-2)/M] is usually 1 to 1,000, and preferably 1 to 500. The component (II-3) is used in an amount such that the molar ratio of the component (II-3) to the transition metal atoms (M) in the component (a) [(II-3)/M] is usually 1 to 10,000, and preferably 1 to 5,000.

For the propylene.α-olefin copolymer (7B), propylene and at least one olefin selected from α-olefins having 2 to 20 carbon atoms (excluding propylene) are usually copolymerized in the liquid phase in the presence of the catalyst for olefin polymerization as described above. Here, hydrocarbon solvents are generally used, but the α-olefins may also be used as the solvent. As the hydrocarbon medium, the same compounds as those described above may be specifically mentioned. The copolymerization can be performed in any mode such as batch mode or continuous mode.

Examples of the α-olefin that can be used in the polymerization include ethylene, 1-butene, 1-pentene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, 1-eicosene, and the like. The α-olefins can be used alone or in combination of two or more kinds.

When performing the copolymerization in batch mode using the catalyst for olefin polymerization, the concentration of the metallocene compound in the polymerization system is usually 0.00005 to 1 millimoles, and preferably 0.0001 to 0.50 millimoles, per 1 liter of the polymerization volume.

Furthermore, the reaction time (average residence time in the case of performing the copolymerization in the continuous mode) may vary depending on the conditions such as catalyst concentration, polymerization temperature, and the like, but it is usually 5 minutes to 3 hours, and preferably 10 minutes to 1.5 hours.

The propylene and the at least one olefin selected from α-olefins having 2 to 20 carbon atoms (excluding propylene) are each supplied in an amount such that the propylene.α-olefin copolymer (7B) of specific composition can be obtained. In the copolymerization, a molecular weight modifier such as hydrogen can also be used.

When propylene and at least one olefin selected from α-olefins having 2 to 20 carbon atoms (excluding propylene) are copolymerized as described above, the propylene.α-olefin copolymer (7B) is usually obtained as a polymerization solution containing the same. This polymerization solution is treated according to conventional methods to give the propylene.α-olefin copolymer (7B).

The copolymerization reaction is usually performed under the conditions of a temperature of 40° C. to 200° C., preferably 40° C. to 180° C., and more preferably 50° C. to 150° C., and of a pressure of greater than 0 to 10 Mpa, preferably 0.5 to 10 Mpa, and more preferably 0.5 to 7 Mpa.

<Ethylene-α-Olefin Random Copolymer (7C)>

The ethylene.α-olefin random copolymer (7C) used in the present invention (7) is desirably an ethylene.α-olefin copolymer containing 50 to 99 mol % of ethylene units, and 1 to 50 mol % of units of α-olefin having 3 to 20 carbon atoms other than ethylene (the sum of amounts of ethylene and α-olefin is 100 mol %).

Preferably, the copolymer contains ethylene units in an amount of 60 to 95 mol %, and units of an α-olefin having 3 to 20 carbon atoms other than ethylene in an amount of 5 to 40 mol % (the sum of amounts of ethylene and α-olefin is 100 mol %), has a density of 910 to 850 kg/m$^3$, and has an MFR in the range of 0.01 to 100 g/10 min, as measured according to JIS K-6721 at 190° C. under a load of 2.16 kg.

More preferably, the copolymer contains ethylene units in an amount of 80 to 95 mol %, and units of an α-olefin having 3 to 20 carbon atoms other than ethylene in an amount of 5 to 20 mol % (the sum of amounts of ethylene and α-olefin is 100 mol %), has a density of 900 to 860 kg/m$^3$, and has an MFR in the range of 0.05 to 10 g/10 min, as measured according to JIS K-6721 at 190° C. under a load of 2.16 kg.

The α-olefin to be copolymerized with ethylene is an α-olefin having 3 to 20 carbon atoms, and specific examples thereof include propylene, 1-butene, 1-pentene, 1-hexene, 1-heptene, 1-octene, 1-nonene, 1-decene, 1-undecene, 1-dodecene, 1-hexadodecene, 1-octadecene, 1-nonadecene, 1-eicosene, 4-methyl-1-pentene, and the like. Among these, the α-olefins having 3 to 10 carbon atoms are preferred. In particular, propylene, 1-butene, 4-methyl-1-pentene, 1-hexene, and 1-octene are preferred. These α-olefins are used individually or in combination of two or more kinds.

Also, the ethylene.α-olefin random copolymer (7C) may contain other polymerizable monomer units in addition to those units, within the scope of not impairing the purpose of the present invention.

Examples of these other polymerizable monomers include vinyl compounds such as styrene, vinylcyclopentene, vinylcyclohexane, and vinylnorbornane; vinyl esters such as vinyl acetate; unsaturated organic acids or derivatives thereof, such as maleic anhydride; conjugated dienes such as butadiene, isoprene, pentadiene, and 2,3-dimethylbutadiene; and non-conjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene. According to a preferred embodiment, the copolymer does not contain non-conjugated dienes and non-conjugated polyenes.

The ethylene.α-olefin random copolymer (7C) may contain such other polymerizable monomer units in an amount of 10 mol % or less, preferably 5 mol % or less, and more preferably 3 mol % or less.

Specific examples of the ethylene.α-olefin random copolymer (7C) include an ethylene.propylene random copolymer, an ethylene.1-butene random copolymer, an ethylene.propylene.1-butene random copolymer, an ethylene.propylene.ethylidenenorbornene random copolymer, an ethylene.1-butene.1-octene random copolymer, an ethylene.4-methyl-1-pentene random copolymer, an ethylene.1-hexene random copolymer, an ethylene.1-octene random copolymer, and the like. Among these, an ethylene.propylene random copolymer, an ethylene.1-butene random copolymer, an ethylene.1-butene.1-octene random copolymer, an ethylene.1-hexene random copolymer, an ethylene.1-octene random copolymer, and the like are particularly preferably used. These copolymers may be used in combination of two or more kinds.

Also, the ethylene.α-olefin random copolymer (7C) used in the present invention (7) has a degree of crystallization, as measured by X-ray diffractometry, of usually 40% or less, preferably 0 to 39%, and more preferably 0 to 35%. Also, the ethylene.α-olefin random copolymer (7C) used in the present invention has an intrinsic viscosity [η], as measured in decalin at 135° C., of usually 0.1 to 10 dL/g, and more preferably 0.5 to 5 dL/g.

According to the present invention (7), by using the component (7C), the balance between impact resistance and transparency in particular is improved.

The ethylene.α-olefin random copolymer as described above can be produced by conventionally known methods using a vanadium-based catalyst, a titanium-based catalyst, or a metallocene-based catalyst. As the ethylene.α-olefin random copolymer (7C), for example, commercially available products such as "TAFMER™" manufactured by Mitsui Chemicals, Inc., and the like may be used.

[Polypropylene-Based Resin Composition]

The polypropylene-based resin composition containing the syndiotactic propylene polymer (7A), the propylene.α-olefin copolymer (7B), and if necessary, the ethylene.α-olefin random copolymer (7C), may be obtained by melt-kneading these components optionally together with various additives such as an antioxidant, an ultraviolet absorbing agent, an antistatic agent, a nucleating agent, a lubricant, a flame retardant, an anti-blocking agent, a coloring agent, an inorganic or organic filler, and various synthetic resins. The composition thus obtained is palletized to form pellets.

The polypropylene resin that can be used in the present invention (7) preferably contains:

85 to 25 parts by weight of the syndiotactic propylene polymer (7A);

15 to 75 parts by weight of the propylene.α-olefin copolymer (7B) (the sum of amounts of (7A) and (7B) is 100 parts by weight); and, if necessary, 1 to 100 parts by weight of the ethylene.α-olefin copolymer (7C) based on 100 parts by weight of the sum of amounts of (7A) and (7B).

When the contents of respective components are within this range, the polypropylene resin gives a film particularly excellent in heat resistance (Tm of film) and further excellent in transparency, flexibility, and low temperature impact resistance.

Where a polypropylene-based resin film having good flexibility and excellent low temperature impact resistance is required, the polypropylene resin preferably contains:

80 to 25 parts by weight of the syndiotactic propylene polymer (7A);

20 to 75 parts by weight of the propylene.α-olefin copolymer (7B) (the sum of amounts of (7A) and (7B) is 100 parts by weight); and 1 to 100 parts by weight of the ethylene.α-olefin copolymer (7C) based on 100 parts by weight of the sum of amounts of (7A) and (7B).

More preferably, the syndiotactic propylene polymer (7A) content is in the range of 75 to 25 parts by weight, more preferably 75 to 35 parts by weight, and the propylene.α-olefin copolymer (7B) content is in the range of preferably 25 to 75 parts by weight, more preferably 25 to 65 parts by weight. The polypropylene resin as described above can be molded into the polypropylene-based resin film of the present invention by an extrusion or inflation molding method.

<Requirement (6)>

The polypropylene-based resin constituting the polypropylene-based resin film of the present invention (7) has a propylene unit concentration (Sp) of 40 to 95 mol %, preferably 45 to 90 mol %, an ethylene unit concentration ($S_E$) of 60 to 5 mol %, preferably 55 to 8 mol %, and a C4-10 α-olefin unit concentration (Sα) of 0 to 15 mol %, preferably 2 to 13 mol % (Sp+SE+Sα=100 mol %, and Sp/SE>1). Here, these values are measured according to a measurement method that will be described later in Examples. When the propylene units, the ethylene units, and the α-olefin units of 4 to 10 carbon atoms are contained in such ranges, the polypropylene-based resin film tends to exhibit sufficient transparency, flexibility, mechanical strength, heat resistance, and impact resistance.

<Requirement (7)>

The polypropylene-based resin film of the present invention (7) satisfies the requirement that the intrinsic viscosity [η] of a n-decane-soluble component (Dsol) which is soluble in n-decane at room temperature is 1.5 to 4.0 dl/g, preferably 1.5 to 3.5 dl/g, and more preferably 1.7 to 3.2 dl/g. When the intrinsic viscosity [η] of the n-decane-soluble component (Dsol) which is soluble in n-decane at room temperature falls within this range, the polypropylene-based resin film is particularly excellent in heat resistance, transparency, low temperature impact strength, flexibility, and flowability, and is especially excellent in the balance between low temperature impact resistance and transparency.

[Method for Producing Polypropylene-Based Resin Film]

The polypropylene-based resin constituting the polypropylene-based resin film of the present invention (7) may be any resin having propylene units, and may be a composition of crystalline propylene polymer and elastomer. For the polypropylene-based resin film of the present invention, the production method, constitution, and molding method for the polypropylene-based resin are not particularly limited as long as the properties as described above are satisfied.

For the molding method, an inflation method and a (co)extrusion T die method are preferably employed in consideration of the hygienic and economical aspects. Specifically, the aforementioned pellets may be melt-extruded using an extruder and a circular die, then further extruded through a spiral or slit die, and inflated by predetermined air flow to prepare a film (inflation method). As the cooling method, a water-cooling method or an air-cooling method can be employed.

Conditions for the water-cooling inflation molding method are not particularly limited, but preferably the molding temperature is from 190 to 280° C., and the water-cooling temperature is from 10 to 60° C.

Alternatively, the pellets may be melt-extruded using an extruder and a circular die, then further extruded using a coat-hanger die and a T-die, and cooled to prepare a film (extrusion molding). In order to produce a multilayer, a multilayer T-die method, a dry lamination method, an extrusion lamination method, or the like can be employed. The molding conditions are not particularly limited, but preferably the molding temperature is from 190 to 280° C., and the cooling temperature of chill rolls is from 10 to 80° C.

[Multilayer Film]

The polypropylene-based resin monolayer film of the present invention (7) is not only used as the monolayer but can also be suitably used for the production of the multilayer film by a co-extrusion film-forming method. The present invention (7) relates to a multilayer film which can be obtained by the co-extrusion film-forming method and comprises the polypropylene-based resin monolayer film as a base layer and an outer layer comprising a polyolefin-based resin on at least one side of the base layer.

In a preferred embodiment of the multilayer film, it is preferable that propylene-based resins (random, homo, syndio or alloy composition) each having a thickness of 10 to 50 µm, preferably 15 to 40 µm are laminated on both outer surfaces of the polypropylene-based resin monolayer film of the present invention (7), from the viewpoints of heat resistance and inter-adhesiveness. In addition, it is preferable that a propylene-based resin (random, homo, syndio or alloy composition) having a thickness of 10 to 50 µm, preferably 15 to 40 µm is laminated in between two polypropylene monolayer films of the present invention, from the viewpoint of barrier properties.

With regard to the constitution of layers of the multilayer film, there may be a case where the multilayer film has 4 or more layers. Although there is no particular limitation, the thickness of the polypropylene-based resin monolayer film of the present invention (7) is preferably 150 µm or more when the thickness of the multilayer film is 250 µm. Within this thickness range, an excellent balance between flexibility, transparency, and impact resistance can be provided. The multilayer may include a gas barrier layer, an adhesive layer, and the like. Examples of the gas barrier layer include a PET layer, an EVOH layer, a cyclic olefin polymer layer, and an aluminum-deposition film. Examples of the adhesive layer include a layer of an olefin polymer (Admer) in which a polar group is introduced.

[Method for Manufacturing Food and Medical Containers]

The food and medical containers comprising the monolayer or multilayer film of the present invention (7) can be manufactured by cutting by a general method the tube-shaped or sheet-shaped film obtained by the molding method described above, then heat sealing the cut film, and attaching a mouth member by a heat sealing method or the like, thereby producing containers having predetermined shape and size. Conditions for the heat sealing of the film vary depending on the thickness of the film, but it is preferable that the temperature is usually around 120 to 250° C.

EXAMPLES

Hereinafter, the present inventions (1) to (7) will be described in more detail with reference to [Example I] to [Example VII], respectively.

Example I

Hereinafter, the present invention (1) will be described in more detail based on Synthesis Examples and Examples, but the present invention is not intended to be limited to these Examples. The methods described in the following patent documents were used for synthesizing
dibenzylmethylene(cyclopentadienyl)(3,6-ditert-butylfluorenyl)zirconium dichloride,
cyclohexylidene(cyclopentadienyl)(octamethyloctahydrodibenzofluorenyl)zirconium dichloride,
cyclohexylidene(cyclopentadienyl)(octamethyloctahydrodibenzofluorenyl)zirconium dichloride,
dimethylmethylene(cyclopentadienyl)(3,6-ditert-butylfluorenyl)zirconium dichloride,
dibenzylmethylene(cyclopentadienyl)(octamethyloctahydrodibenzofluorenyl)zirconium dichloride, and
diphenylmethylene(cyclopentadienyl)(octamethyloctahydrodibenzofluorenyl)zirconium dichloride.
JP-A No. 2000-212194,
JP-A No. 2004-168744,
JP-A No. 2004-189666.

The structures of the compounds obtained in Synthesis Examples were determined using 270 MHz $^1$H-NMR (JEOL LTD. GSH-270), FD-mass analysis (JEOL LTD. SX-102 A) and the like.

Synthesis Example 1-1

Synthesis of dibenzylmethylene(cyclopentadienyl)(2,7-diphenyl-3,6-ditert-butylfluorenyl)zirconium dichloride (i) Synthesis of 2,7-dibromo-3,6-ditert-butylfluorene Under a nitrogen atmosphere, a 300-mL three-necked flask was charged with 15.22 g (54.7 mmol) of 3,6-ditert-butylfluorene synthesized according to the method described in Bull. Chem. Soc. Jpn., 59, 97 (1986) and 170 mL of propylene carbonate, and the mixture was stirred. To this solution, 20.52 g (115 mmol) of N-bromosuccinimide was added, and the mixture was heated and stirred at 80° C. for 5 hours. Subsequently, the mixture was left to be naturally cooled. The reaction solution was added to 800 mL of water, and the mixture was stirred at room temperature for 15 minutes. Then, solids precipitated were separated by filtration. The solids obtained were washed 5 times with 10 mL of ethanol. Subsequently, a mixture solution of n-hexane and a small amount of dichloromethane was added to the solids, and the mixture was heated to 60° C. to dissolve the solids completely. The resultant solution was left to stand overnight at −20° C. Crystals precipitated were washed 3 times with 5 mL of hexane to obtain a target product (yield 21.16 g (76%)). The target product was identified by $^1$H-NMR and FD-MS spectroscopy.

$^1$H-NMR (270 MHz, CDCl$_3$, TMS): δ/ppm 1.60 (s, tBu (Flu), 18H), 3.75 (s, Flu-9H, 2H), 7.73 (s, Flu, 2H), 7.81 (s, Flu, 2H).

MS (FD): M/z 436 (M$^+$).

(ii) Synthesis of 2,7-diphenyl-3,6-ditert-butyl-fluorene

Under a nitrogen atmosphere, a 300-mL three-necked flask was charged with 8.15 g (18.7 mmol) of 2,7-dibromo-3,6-ditert-butyl-fluorene and 1.08 g (0.93 mmol) of Pd(PPh$_3$), and further charged with 120 mL of dehydrated 1,2-dimethoxyethane. The mixture was stirred at room temperature for 20 minutes. To this solution, 20 mL of an ethanol solution in which 5.01 g (41.1 mmol) of phenylboric acid was dissolved was added, and the mixture was then stirred at room temperature for 20 minutes. Thereafter, 37.4 mL (74.8 mmol) of a 2.0 mol/L aqueous solution of sodium carbonate was added. Subsequently, the mixture was heated to reflux for 18 hours, left to be naturally cooled, and quenched with dilute hydrochloric acid in an ice bath. Thereafter, ether was added to extract the soluble fraction, and the organic layer was washed two times with a saturated aqueous solution of sodium hydrogen carbonate, two times with water, and two times with saturated brine, and then dried over magnesium sulfate. Subsequently, the solvent was distilled off, and the resulting solids were subjected to separation by column chromatography to obtain a target product (yield 4.36 g (54%)). The target product was identified by $^1$H-NMR and FD-MS spectroscopy.

$^1$H-NMR (270 MHz, CDCl$_3$, TMS): δ/ppm 1.29 (s, tBu (Flu), 18H), 3.78 (s, Flu-9H, 2H), 7.16 (s, Flu, 2H), 7.34 (br, PhFlu, 10H), 7.97 (s, Flu, 2H).
MS (FD): M/z 430 (M$^+$).

(iii) Synthesis of 6,6-dibenzofulvene

Under a nitrogen atmosphere, a 500-mL three-necked flask was charged with 8.0 g (121 mmol) of cyclopentadiene and 100 mL of dehydrated tetrahydrofuran, and the mixture was stirred. This mixed solution was cooled in an ice bath, and 80 mL (125.6 mmol) of a 1.57 mol/L hexane solution of n-butyllithium was then added. Thereafter, the mixture was stirred at room temperature for 3 hours. The resulting white slurry was cooled in an ice bath, and then a solution prepared by dissolving 25.0 g (118 mmol) of 1,3-diphenyl-2-propanone in 50 mL of dehydrate tetrahydrofuran was added. Subsequently, the mixture was stirred at room temperature for 12 hours. The resulting yellow solution was quenched with a saturated aqueous solution of ammonium chloride. The soluble fraction was extracted with 100 mL of n-hexane, and this organic phase was washed with water and saturated brine, and then dried over magnesium sulfate. The solvent was distilled off, and the residue was purified by column chromatography to obtain a target product as a yellow solid (yield 3.7 g (12%)). The target product was identified by $^1$H-NMR.
$^1$H-NMR (270 MHz, CDCl$_3$, TMS): δ/ppm 3.69 (s, PhCH$_2$, 4H), 6.60-6.72 (m, Cp, 4H), 7.13-7.32 (m, PhCH$_2$, 10H).

(iv) Synthesis of dibenzylmethylene(cyclopentadienyl)(2,7-diphenyl-3,6-ditert-butylfluorene)

Under a nitrogen atmosphere, mL of dehydrate tetrahydrofuran was added to 1.60 g (3.71 mmol) of 2,7-diphenyl-3,6-ditert-butylfluorene, and the mixture was stirred. This solution was cooled in an ice bath, and 2.65 mL (4.13 mmol) of a 1.56 mol/L hexane solution of n-butyllithium was added. The mixture was stirred at room temperature for 2 hours. The resulting red solution was cooled to −78° C. in a dry ice-methanol bath, a solution of 1.06 g (4.10 mmol) prepared by dissolving 6,6-dibenzofulvene in 20 mL of tetrahydrofuran was added dropwise over 20 minutes. Subsequently, the mixture was stirred for 18 hours while gradually warming to room temperature. To the resulting red-black solution, 60 mL of 1 N hydrochloric acid was added to terminate the reaction. 80 mL of diethyl ether was added to perform liquid-liquid phase separation, and the soluble fraction was extracted. This organic layer was washed two times with a saturated aqueous solution of sodium hydrogen carbonate, two times with water, and once with saturated brine, and then dried over magnesium sulfate. The solvent was distilled off, and the residue was purified by silica gel chromatography to obtain a target product as a pale yellow powder (yield 0.59 g (23%)). The target product was identified by $^1$H-NMR and FD-MS spectroscopy.
$^1$H-NMR (270 MHz, CDCl$_3$, TMS): δ/ppm 1.25 (s, tBu (Flu), 18H), 2.66 (br, CpH, 1H), 3.22 (br, CH$_2$Ph, 4H), 4.41 (br, Flu-9H, 1H), 5.85-6.51 (m, Cp, 4H), 6.82-7.40 (m, Ph(Flu) and CH$_2$Ph and Flu, 22H), 7.67 (s, Flu, 2H).
MS (FD): M/z 688 (M$^+$).

(v) Synthesis of dibenzylmethylene(cyclopentadienyl)(2,7-diphenyl-3,6-ditert-butylfluorenyl)zirconium dichloride Under a nitrogen atmosphere, a 100-mL Schlenk flask was charged with 0.59 g (0.855 mmol) of dibenzylmethylene (cyclopentadienyl)(2,7-diphenyl-3,6-ditert-butylfluorene) and 40 mL of dehydrated diethyl ether, and the mixture was stirred. This mixed slurry solution was cooled in an ice bath, and 1.21 mL (1.88 mmol) of a 1.56 mol/L hexane solution of n-butyllithium was added. The mixture was stirred for 45 hours while gradually warming to room temperature. The resulting red reaction solution was cooled to −78° C. in a dry ice/methanol bath, and then 0.200 g (0.858 mmol) of zirconium tetrachloride was added. Subsequently, the mixture was stirred for 42 hours while gradually warming to room temperature to obtain a red-orange suspension. The solvent was removed by distillation under reduced pressure. Under a nitrogen atmosphere, the residue was dissolved in n-hexane, and the liquid was passed through a glass filter filled with Celite, insolubles were washed n-hexane, and the orange colored powder insoluble in n-hexane was subjected to extraction with dichloromethane. The solvent in which the dichloromethane-solubles were dissolved was distilled off. The residue was washed with diethyl ether/cold n-pentane and dried to obtain a target product as an orange-colored powder (yield 515 mg (71%)). The target product was identified by $^1$H-NMR and FD-MS spectroscopy.
$^1$H-NMR (270 MHz, CDCl$_3$, TMS): δ/ppm 1.30 (s, tBu (Flu), 18H), 3.82 (d, J=15.5 Hz, CH$_2$Ph, 2H), 3.93 (d, J=15.5 Hz, CH$_2$Ph, 2H), 5.80 (t, J=2.6 Hz, Cp, 2H), 6.25 (t, J=2.6 Hz, Cp, 2H), 6.97-7.34 (m, Ph(Flu) and CH$_2$Ph, 20H), 7.37 (s, Flu, 2H), 8.32 (s, Flu, 2H).
MS (FD): M/z 848 (M$^+$).

Synthesis Example 1-2

Synthesis of di(n-butyl)methylene(cyclopentadienyl)(2,7-diphenyl-3,6-ditert-butylfluorenyl)zirconium dichloride (i) Synthesis of 6,6-di(n-butyl)fulvene Under a nitrogen atmosphere, a 200-mL three-necked flask was charged with 15 mL of methanol and 11.8 mL (146 mmol) of pyrrolidine. The mixture was cooled in an ice bath. Subsequently, 20.21 g (144 mmol) of 5-nonanone and 11.0 mL (146 mmol) of cyclopentadiene were added, and the mixture was stirred at room temperature for 22 hours. 100 mL of diethyl ether and 100 mL of water were added to extract the soluble fraction. This organic layer was washed two times with water and once with saturated brine, and dried over magnesium sulfate. The solvent was distilled off, and the residue was purified by column chromatography to obtain a target product as a yellow oil (yield 22.53 g (82%)). The target product was identified by $^1$H-NMR.
$^1$H-NMR (270 MHz, CDCl$_3$, TMS): δ/ppm 0.93 (t, J=7.3 Hz, CH$_2$CH$_2$CH$_2$CH$_3$, 6H), 1.38 (sex, J=7.3 Hz, CH$_2$CH$_2$CH$_2$CH$_3$, 4H), 1.53 (quin, J=7.3 Hz, CH$_2$CH$_2$CH$_2$CH$_3$, 4H), 2.53 (t, J=7.3 Hz, CH$_2$CH$_2$CH$_2$CH$_3$, 4H), 6.40-6.57 (m, Cp, 4H).

(ii) Synthesis of di(n-butyl)methylene(cyclopentadienyl)(2,7-diphenyl-3,6-ditert-butylfluorene)

Under a nitrogen atmosphere, 30 mL of dehydrated tetrahydrofuran was added to 1.51 g (3.51 mmol) of 2,7-diphenyl-3,6-ditert-butyl-fluorene synthesized in Synthesis Example 1-1 (ii), and the mixture was stirred. This solution was cooled in an ice bath, and 2.50 mL (3.90 mmol) of a 1.56 mol/L hexane solution of n-butyllithium was added. The mixture was stirred at room temperature for 2 hours. The resulting dark red solution was cooled to −78° C. in a dry ice/methanol bath, and a tetrahydrofuran solution prepared by dissolving 0.757 g (3.98 mmol) of 6,6-di(n-butyl)fulvene in 15 mL of tetrahydrofuran was added dropwise over 15 minutes. Subsequently, the mixture was stirred for 18 hours while gradually warming to room temperature. 50 mL of 1 N hydrochloric acid was added to the resulting red solution to terminate the reaction. 100 mL of diethyl ether was added to perform liquid-liquid phase separation, and the soluble fraction was extracted. This organic layer was washed two times with a saturated aqueous solution of sodium hydrogen carbonate, two times with water and once with saturated brine, and dried over magnesium sulfate. The solvent was distilled off, and the residue was recrystallized from hexane to obtain a target product as a white powder (yield 1.54 g (70%)). The target product was identified by $^1$H-NMR and FD-MS spectroscopy.

$^1$H-NMR (270 MHz, CDCl$_3$, TMS): δ/ppm 0.72 (t, J=7.3 Hz, CH$_2$CH$_2$CH$_2$CH$_3$, 6H), 0.86-1.24 (m, CH$_2$CH$_2$CH$_2$CH$_3$, 8H), 1.26 (s, tBu(Flu), 18H), 1.57-1.72 (m, CH$_2$CH$_2$CH$_2$CH$_3$, 4H), 2.68 (br, CpH, 1H), 3.97 (br, Flu-9H, 1H), 5.70-6.55 (m, Cp, 4H), 6.78 (s, Flu, 2H), 7.15-7.50 (m, Ph(Flu), 10H), 7.81 (s, Flu, 2H).

MS (FD): M/z 620 (M$^+$).

(iii) Synthesis of di(n-butyl)methylene(cyclopentadienyl)(2,7-diphenyl-3,6-ditert-butylfluorenyl)zirconium dichloride Under a nitrogen atmosphere, a 100-mL Schlenk flask was charged with 0.71 g (1.15 mmol) of di(n-butyl)methylene(cyclopentadienyl)(2,7-diphenyl-3,6-ditert-butylfluorene) and 30 mL of dehydrated diethyl ether, and the mixture was stirred. This mixed slurry solution was cooled in an ice bath, 1.62 mL (2.53 mmol) of a 1.56 mol/L hexane solution of n-butyllithium was added. The mixture was stirred for 47 hours while gradually warming to room temperature. The resulting red-orange reaction solution was cooled to −78° C. in a dry ice/methanol bath, and then 0.265 g (1.14 mmol) of zirconium tetrachloride was added. Subsequently, the mixture was stirred for 42 hours while gradually warming to room temperature to obtain a red suspension. The solvent was removed by distillation under reduced pressure. Under a nitrogen atmosphere, the residue was dissolved in n-hexane, and the mixture was passed through a glass filter filled with Celite, insolubles were washed with n-hexane and the red powder insoluble in n-hexane was subjected to extraction with dichloromethane. The solvent in which the dichloromethane-solubles was dissolved was distilled off. The residue was recrystallized from dichloromethane/n-hexane to obtain a target product as an orange-colored powder (yield 217 mg (24%)). The target product was identified by $^1$H-NMR and FD-MS spectroscopy.

$^1$H-NMR (270 MHz, CDCl$_3$, TMS): δ/ppm 0.82 (t, J=7.3 Hz, CH$_2$CH$_2$CH$_2$CH$_3$, 6H), 1.12-1.70 (m, CH$_2$CH$_2$CH$_2$CH$_3$, 8H), 1.24 (s, tBu(Flu), 18H), 2.30-2.60 (m, CH$_2$CH$_2$CH$_2$CH$_3$, 4H), 5.53 (t, J=2.6 Hz, Cp, 2H), 6.26 (t, J=2.6 Hz, Cp, 2H), 7.15-7.40 (m, Ph(Flu) and Flu, 12H), 8.19 (s, Flu, 2H).

MS (FD): M/z 780 (M$^+$).

Synthesis Example 1-3

Synthesis of di(n-butyl)methylene(cyclopentadienyl)(2,7-dimethyl-3,6-ditert-butylfluorenyl)zirconium dichloride (i) Synthesis of 2,7-dimethyl-3,6-ditert-butyl-fluorene Under a nitrogen atmosphere, 100 mL of dehydrated tert-butyl methyl ether was added to 5.03 g (11.5 mmol) of 2,7-dibromo-3,6-ditert-butyl-fluorene synthesized in Synthesis Example 1-1 (i) and 0.196 g (0.24 mmol) of PdCl$_2$(dppf).CH$_2$Cl$_2$, and the mixture was stirred. This solution was cooled in an ice bath, and 19.2 mL (57.6 mmol) of a 3 mol/L diethyl ether solution of methyl magnesium bromide was added dropwise over 15 minutes. The mixture was heated to reflux for 5 days. The mixture was left to be naturally cooled, and 1 N hydrochloric acid was then added dropwise in an ice bath to terminate the reaction. Diethyl ether was added to perform liquid-liquid phase separation, and the organic layer was washed two times with a saturated aqueous solution of sodium hydrogen carbonate, two times with water, and once with saturated brine, and dried over magnesium sulfate. The solvent was distilled off, and the residue was subjected to separation by silica gel chromatography to obtain a target product as a white powder (yield 2.07 g (63%)). The target product was identified by $^1$H-NMR.

$^1$H-NMR (270 MHz, CDCl$_3$, TMS): δ/ppm 1.50 (s, tBu (Flu), 18H), 2.60 (s, Me(Flu), 6H), 7.26 (s, Flu, 2H), 7.75 (s, Flu, 2H).

(ii) Synthesis of di(n-butyl)methylene(cyclopentadienyl)(2,7-dimethyl-3,6-ditert-butylfluorene)

Under a nitrogen atmosphere, dehydrated tetrahydrofuran was added to 0.783 g (2.55 mmol) of 2,7-dimethyl-3,6-ditert-butyl-fluorene, and the mixture was stirred. This solution was cooled in an ice bath, and 1.85 mL (2.85 mmol) of a 1.54 mol/L hexane solution of n-butyllithium was added. The mixture was stirred at room temperature for 2 hours. The resulting orange-colored solution was cooled to −78° C. in a dry ice/methanol bath, and a solution prepared by dissolving 0.571 g (3.00 mmol) of 6,6-di(n-butyl)fulvene synthesized in Synthesis Example 1-2 (i) in 15 mL of dehydrated tetrahydrofuran was added dropwise over 20 minutes, and the mixture was stirred for 2 hours. 100 mL of 1 N hydrochloric acid was added to the resulting orange-colored solution to terminate the reaction. 100 mL of diethyl ether was added to perform liquid-liquid phase separation, and the soluble fraction was extracted. This organic layer was washed two times with a saturated aqueous solution of sodium hydrogen carbonate, two times with water, and once with saturated brine, and dried over magnesium sulfate. The solvent was distilled off, and the residue was recrystallized from diethyl ether/methanol to obtain a target product as a white powder (yield 0.63 g (50%)). The target product was identified by $^1$H-NMR and FD-MS spectroscopy.

$^1$H-NMR (270 MHz, CDCl$_3$, TMS): δ/ppm 0.76 (t, J=7.3 Hz, CH$_2$CH$_2$CH$_2$CH$_3$, 6H), 0.80-1.90 (m, CH$_2$CH$_2$CH$_2$CH$_3$, 10H), 1.46 (s, tBu(Flu), 18H), 2.50 (s, Me(Flu), 6H), 3.00 (br, CpH, 1H), 4.01 (br, Flu-9H, 1H), 5.85-6.70 (m, Cp, 4H), 6.93 (s, Flu, 2H), 7.60 (s, Flu, 2H).

MS (FD): M/z 496 (M$^+$).

(iii) Synthesis of di(n-butyl)methylene(cyclopentadienyl)(2,7-dimethyl-3,6-ditert-butylfluorenyl)zirconium dichloride Under a nitrogen atmosphere, a 100-mL Schlenk flask was charged with 0.614 g (1.24 mmol) of di(n-butyl)methylene (cyclopentadienyl)(2,7-dimethyl-3,6-ditert-butylfluorene) and 30 mL of dehydrated diethyl ether, and the mixture was stirred. This mixed slurry solution was cooled in an ice bath, 1.78 mL (2.74 mmol) of a 1.54 mol/L hexane solution of n-butyllithium was added, and the mixture was stirred for 16 hours while gradually warming to room temperature. This red orange reaction solution was cooled to −78° C. in a dry ice/methanol bath, and then 0.239 g (1.02 mmol) of zirconium tetrachloride was added. Subsequently, the mixture was stirred for 22 hours while gradually warming to room temperature to obtain a red brown suspension. The solvent was removed by distillation under reduced pressure. Under a nitrogen atmosphere, the residue was dissolved in n-hexane, and the mixture was passed through a glass filter filled with Celite, insolubles were washed with n-hexane and a red powder insoluble in n-hexane was subjected to extraction with dichloromethane. The solvent in which the dichloromethane-solubles were dissolved was distilled off. The residue was recrystallized from dichloromethane/n-hexane to obtain a target product as an orange-colored powder (yield 286 mg (41%)). The target product was identified by $^1$H-NMR and FD-MS spectroscopy.

$^1$H-NMR (270 MHz, CDCl$_3$, TMS): δ/ppm 0.99 (t, J=7.3 Hz, CH$_2$CH$_2$CH$_2$CH$_3$, 6H), 1.30-1.78 (m, CH$_2$CH$_2$CH$_2$CH$_3$, 8H), 1.46 (s, tBu(Flu), 18H), 2.53 (s, Me(Flu), 2.60-2.80 (m, CH$_2$CH$_2$CH$_2$CH$_3$, 4H), 5.60 (t, J=2.6 Hz, Cp, 2H), 6.21 (t, J=2.6 Hz, Cp, 2H), 7.38 (s, Flu, 2H), 7.95 (s, Flu, 2H).

MS (FD): M/z 656 (M$^+$).

Synthesis Example 1-4

Synthesis of di(p-chlorophenyl)methylene(cyclopentadienyl)(2,7-diphenyl-3,6-ditert-butylfluorenyl)zirconium dichloride (i) Synthesis of 6,6-di(p-chlorophenyl)fulvene Under a nitrogen atmosphere, a reaction vessel equipped with a dropping funnel was charged with 40 mL of dry tetrahydrofuran and 2.15 mL (25.89 mmol) of cyclopentadiene. While cooling this solution to 0° C., 18 mL (28.47 mmol) of a 1.58 mol/L hexane solution of n-butyllithium was slowly added dropwise and the mixture was stirred. Subsequently, a dropping funnel was charged with a solution prepared by dissolving 5.00 g (19.91 mmol) of 4,4'-dichlorobenzophenone in 30 mL of tetrahydrofuran, and the solution was slowly added dropwise. The mixture was left to be stand so that the temperature of the mixture was at room temperature, and stirred for one day. This reaction solution was then subjected to extraction with diethyl ether. The organic layer was washed with 1 N hydrochloric acid, a saturated aqueous solution of sodium hydrogen carbonate and saturated brine, and then dried over magnesium sulfate. The solvent was removed by distillation under reduce pressure. The residue was purified by using a silica gel column to obtain a target product (yield 3.37 g (57%)). The target product was identified by $^1$H-NMR.

$^1$H-NMR (270 MHz, CDCl$_3$, TMS): δ/ppm 6.21-6.24 (m, 2H), 6.60-6.63 (m, 2H), 7.23 (d, 2H, J=8.1 Hz), 7.37 (d, 2H, J=8.6 Hz).

(ii) Synthesis of di-(p-chlorophenyl)methylene(cyclopentadienyl)(2,7-diphenyl-3,6-ditert-butylfluorene)

Under a nitrogen atmosphere, a 200-mL three-necked flask was charged with 3.5 g (8.1 mmol) of 2,7-diphenyl-3,6-ditert-butylfluorene synthesized in Synthesis Example 1-1 (ii) and 100 mL of dehydrated tetrahydrofuran, and the mixture was stirred. This solution was cooled to −78° C. in a dry ice/methanol bath, and 5.7 mL (8.87 mmol) of a 1.56 mol/L hexane solution of n-butyllithium was added dropwise. Subsequently, the mixture was stirred at room temperature for 3 hours. The resulting solution was cooled again to −40° C., a tetrahydrofuran solution of 2.22 g (7.39 mmol) of 6,6-di(p-chlorophenyl)fulvene was added dropwise, and the mixture was stirred at room temperature for 5 hours. Subsequently, the solution was quenched with an aqueous solution of dilute hydrochloric acid. 100 mL of n-hexane was added to the reaction solution to extract the soluble fraction, and this organic layer was washed with a saturated solution of sodium hydrogen carbonate, water and saturated brine, and dried over magnesium sulfate. Subsequently, the solvent was concentrated, and then the residue was washed with n-hexane and methanol to obtain a target product (yield 3.2 g (54%)). The target product was identified by $^1$H-NMR and FD-MS spectroscopy.

$^1$H-NMR (270 MHz, CDCl$_3$, TMS): δ/ppm 1.2 (s, 18H), 2.9 (s, 2H), 5.2 (s, 1H), 6.0 (d, 1H), 6.2 (d, 1H), 6.3 (s, 1H), 6.6 (s, 2H), 6.9 (s, 10H), 7.2-7.4 (m+s, 8H), 7.6 (s, 2H), MS (FD): M/z 729 (M$^+$)

(iii) Synthesis of di(p-chlorophenyl)methylene(cyclopentadienyl)(2,7-diphenyl-3,6-di-tert butyl-fluorenyl)zirconium dichloride Under a nitrogen atmosphere, a 100-mL Schlenk flask was charged with 60 mL of dehydrate diethyl ether and 1.0 g (1.4 mmol) of di(p-chlorophenyl)methylene(cyclopentadienyl) (2,7-diphenyl-3,6-ditert-butyl-fluorene), and the mixture was stirred. This solution was cooled to −78° C. in a dry ice/methanol bath, and 1.8 mL (2.88 mmol) of a 1.56 mol/L hexane solution of n-butyllithium was added dropwise, and the mixture was stirred at room temperature for 20 hours. Subsequently, the mixture was cooled to −60° C. in a dry ice/methanol bath, and then 0.37 g (1.59 mmol) of zirconium tetrachloride was added. The mixture was then stirred at room temperature for 20 hours. The solvent was removed by distillation under reduced pressure, the residue was subjected to extraction with n-hexane and dichloromethane under a nitrogen atmosphere, and the residue was recrystallized from the respective solutions to obtain a target product (yield 0.47 g (38%)). The target product was identified by $^1$H-NMR and FD-MS spectroscopy.

$^1$H-NMR (270 MHz, CDCl$_3$, TMS): δ/ppm 1.2 (s, 18H), 5.4 (m, 2H), 5.8 (s, 2H), 6.3 (m, 2H), 7-7.2 (s+m+m, 6H), 7.5-7.7 (m, 12H), 8.3 (s, 2H)

MS (FD): M/z 888 (M$^+$)

Synthesis Example 1-5

Synthesis of di(p-chlorophenyl)methylene(cyclopentadienyl)(2,7-dimethyl-3,6-ditert-butyl-fluorenyl) zirconium dichloride (i) Synthesis of di(p-chlorophenyl)methylene(cyclopentadienyl)(2,7-dimethyl-3,6-ditert-butyl-fluorene)

Under a nitrogen atmosphere, a 200-mL three-necked flask was charged with 2.6 g (8.48 mmol) of 2,7-dimethyl-3,6-ditert-butyl-fluorene synthesized in Synthesis Example 1-3 (i) and 100 mL of dehydrated tetrahydrofuran, and the mixture was stirred. This mixed solution was cooled in an ice bath to −78° C., and 5.7 mL (8.9 mmol) of a 1.56 mol/L hexane solution of n-butyllithium was added dropwise. Thereafter, the mixture was stirred at room temperature for 3 hours. Then, solution thus obtained was cooled to −40° C. in a dry ice/methanol bath, 60 mL of a tetrahydrofuran solution in which 2.78 g (9.33 mmol) of 6,6-di(p-chlorophenyl)fulvene synthesized in Synthesis Example 1-4 (i) was dissolved was added dropwise. Subsequently, the mixture was stirred for 1 hour while gradually warming to room temperature. To the reaction solution, 100 mL of 1N hydrochloric acid and 100 mL of n-hexane was sequentially added to extract the soluble fraction. This organic layer was washed with water and saturated brine, and then dried over magnesium sulfate. The solvent was distilled off, and the residue was recrystallized from n-hexane to obtain a target product (yield 4.4 g (86%)). The target product was identified by $^1$H-NMR and FD-MS spectroscopy.

$^1$H-NMR (270 MHz, CDCl$_3$, TMS): δ/ppm 1.3 (s, 18H), 2.3 (s, 6H), 3.0 (s, 2H), 5.2 (s, 2H), 6.1-6.3 (s, 4H), 6.7 (s, 2H), 7.0 (s, 6H), 7.4 (s, 2H)

MS (FD): M/z 604 (M$^+$)

(ii) Synthesis of di(p-chlorophenyl)methylene(cyclopentadienyl)(2,7-dimethyl-3,6-ditert-butyl-fluorenyl) zirconium dichloride Under a nitrogen atmosphere, a 100-mL Schlenk flask was charged with 1.0 g (1.65 mmol) of di(p-chlorophenyl)methylene(cyclopentadienyl)(2,7-dimethyl-3,6-ditert-butyl-fluorene) and 50 mL of dehydrated diethyl ether, and the mixture was stirred. This mixed slurry solution was cooled to −40° C. in an dry ice/methanol bath, and 2.2 mL (3.38 mmol) of a 1.56 mol/L hexane solution of n-butyllithium was then added. The mixture was stirred for 22 hours while gradually warming to room temperature. This reaction solution was cooled to −78° C. in a dry ice/methanol bath, and then 0.38 g (1.65 mmol) of zirconium tetrachloride was added. Subsequently, the mixture was stirred for 20 hours while gradually warming to room temperature. The solvent was removed by distillation under reduced pressure. Under a nitrogen atmosphere, about 30 mL of n-hexane was added, and the mixture was stirred. The insolubles were removed by filtration through celite. Subsequently, the insolubles were dissolved in dichloromethane and the insolubles were removed by filtration through celite. The n-hexane extract was concentrated, and then the solids precipitated were washed with n-hexane and n-pentane to obtain a target product (yield 0.122 g (10%)). The target product was identified by $^1$H-NMR and FD-MS spectroscopy.

$^1$H-NMR (270 MHz, CDCl$_3$, TMS): δ/ppm 1.5 (s, 18H), 2.3 (s, 6H), 5.6 (m, 2H), 6.0 (m, 2H), 6.3 (m, 2H), 7.3 (dd, 2H), 7.4 (dd, 2H), 7.7 (dd, 2H), 7.8 (dd, 2H), 8.1 (s, 2H)

MS (FD): M/z 764 (M$^+$)

Synthesis Example 1-6

Synthesis of di(m-trifluoromethyl-phenyl)methylene (cyclopentadienyl)(2,7-dimethyl-3,6-ditert-butylfluorenyl)zirconium dichloride (i) Synthesis of 6,6-di(m-trifluoromethylphenyl)fulvene Under a nitrogen atmosphere, 2.08 mL (25.14 mmol) of cyclopentadiene was added to 70 mL of dehydrated tetrahydrofuran, and the mixture was stirred. This solution was cooled to 0° C., and 16.3 mL (25.77 mmol) of a 1.58 mol/L hexane solution of n-butyllithium was added dropwise. The mixture was stirred at room temperature for 20 hours. The resultant solution was again cooled to 0° C., and 4.08 g (12.6 mmol) of 3,3'-ditrifluoromethyl benzophenone in 30 mL of dehydrated tetrahydrofuran was added dropwise over 15 minutes. The mixture was stirred at room temperature for 2.5 hours, and 1N hydrochloric acid was added to terminate the reaction. A liquid-liquid phase separation was performed, and the aqueous layer was subjected to extraction with diethyl-ether twice. The resultant was then combined with the organic layer obtained previously. The resulting liquid was washed with a saturated aqueous solution of sodium hydrogen carbonate, water, and saturated brine, and then dried over magnesium sulfate. The solvent was distilled off, and the resultant was subjected to separation by silica gel chromatography to obtain a target product (yield 1.2 g (26%)). The target product was identified by $^1$H-NMR and FD-MS spectroscopy.

$^1$H-NMR (270 MHz, CDCl$_3$, TMS): δ/ppm 6.17-6.21 (m, 2H), 6.64-6.66 (m, 2H), 7.44-7.58 (m, 6H), 7.68 (d, 2H).

MS (FD): m/z 366 (M$^+$).

(ii) Synthesis of di(m-trifluoromethyl-phenyl)methylene(cyclopentadienyl)(2,7-dimethyl-3,6-ditert-butylfluorene)

Under a nitrogen atmosphere, a 300-mL three-necked flask was charged with 2.1 g (6.85 mmol) of 2,7-diphenyl-3,6-ditert-butyl-fluorene synthesized in Synthesis Example 1-1 (ii) and 60 mL of dehydrated tetrahydrofuran, and the mixture was stirred. This solution was cooled to 0° C., and 4.83 mL (7.5 mmol) of a 1.56 mol/L hexane solution of n-butyllithium was added. Thereafter, the mixture was stirred at room temperature for 2 hours. The solution thus obtained was cooled to −78° C. in a dry ice/methanol bath, and 2.39 g (6.52 mmol) of 6,6'-di(m-trifluoromethylphenyl)fulvene in 50 mL of dehydrated tetrahydrofuran was added dropwise over 15 minutes. The mixture was stirred for 10 minutes, and 1N hydrochloric acid was added to the reaction solution to terminate the reaction. An oil-liquid separation was performed, and the aqueous layer was extracted twice with 50 mL of diethyl ether. The resultant was then combined with the organic layer obtained previously. The resulting liquid was washed with a saturated aqueous solution of sodium hydrogen carbonate, water, and saturated brine, and then dried over magnesium sulfate. The solvent was distilled off, and 4.8 g of the residue was dissolved in 15 mL of dichloromethane. The liquid was then added dropwise to 300 mL of methanol. The methanol solution was cooled to 0° C., and the resulting crystals were separated by filtration to obtain a target product (yield 2.3 g (50%)). The target product was identified by $^1$H-NMR and FD-MS spectroscopy.

$^1$H-NMR (270 MHz, CDCl$_3$, TMS): δ/ppm 1.37 (s, 18H), 2.35 (s, 6H) 3.16 (s, 1H), 5.30 (s, 1H), 6.38-6.52 (m, 2H), 6.86 (m, 2H), 7.06-7.28 (m, 12H).

MS (FD): m/z 673 (M$^+$).

(iii) Synthesis of di(m-trifluoromethyl-phenyl)methylene(cyclopentadienyl)(2,7-dimethyl-3,6-ditert-butylfluorenyl)zirconium dichloride Under a nitrogen atmosphere, a 100-mL Schlenk flask was charged with 0.672 g (1 mmol) of di(m-trifluoromethyl-phenyl)methylene(cyclopentadienyl)(2,7-dimethyl-3,6-ditert-butylfluorene) and 40 mL of dehydrated diethyl ether, and the mixture was stirred. This solution was cooled to −78° C. in a dry ice/methanol bath, and 1.3 mL (2.05 mmol) of a 1.56 mol/L hexane solution of n-butyllithium was added. The mixture was stirred at room temperature for 19 hours until the clouded solution becomes a clear orange color. This reaction solution was cooled again to −78° C. in a dry ice/methanol bath, and then 0.23 g (1 mmol) of zirconium tetrachloride was added. Subsequently, the mixture was stirred for 23 hours while gradually warming to room temperature. The solvent was then removed by distillation under reduced pressure. Subsequently, about 50 mL of n-hexane was added under a nitrogen atmosphere and in solubles were removed by a filtration through celite. The n-hexane solution thus obtained was concentrated to about 5 mL and left to stand at −18° C. for 24 hours. The solids precipitated were separated by filtration, and washed with n-hexane and n-pentane to obtain a target product as an orange powder (yield 0.2 g (24%)). The target product was identified by $^1$H-NMR and FD-MS spectroscopy.

$^1$H-NMR (270 MHz, CDCl$_3$, TMS): δ/ppm 1.44 (s, 18H), 2.20 (s, 6H), 5.59 (d, 2H), 5.80 (m, 2H), 6.31 (m, 2H), 7.19-8.14 (m, 10H).

MS (FD): m/z 833 (M$^+$).

Synthesis Example 1-7

Synthesis of cyclohexylidene(cyclopentadienyl)(2,7-diphenyl-3,6-ditert-butylfluorenyl)zirconium dichloride (i) Synthesis of cyclohexylidene(cyclopentadienyl)(2,7-diphenyl-3,6-ditert-butylfluorene)

Under a nitrogen atmosphere, 30 mL of dehydrated tetrahydrofuran was added to 1.14 g (2.65 mmol) of 2,7-diphenyl-3,6-ditert-butyl-fluorene synthesized in Synthesis Example 1-1 (ii), and the mixture was stirred. This solution was cooled in an ice bath, and 1.90 mL (2.96 mmol) of a 1.56 mol/L hexane solution n-butyllithium was added. The mixture was stirred at room temperature for 2 hours. The resulting dark red solution was cooled to −78° C. in a dry ice/methanol bath, and a solution prepared by dissolving 0.49 g (3.35 mmol) of cyclohexylfulvene, which was synthesized according to a method described in JP-A No. 2000-26490, in 20 mL of tetrahydrofuran was added dropwise over 15 minutes. Subsequently, the mixture was stirred for 19 hours while gradually warming to room temperature. 30 mL of 1 N hydrochloric acid was added to the resulting dark red solution to terminate the reaction. 100 mL of diethyl ether was added to perform liquid-liquid phase separation, and the soluble fraction was extracted. This organic layer was washed two times with a saturated aqueous solution of sodium hydrogen carbonate, two times with water, and once with saturated brine, and dried over magnesium sulfate. The solvent was distilled off, and the residue was recrystallized with diethylether and methanol to obtain a target product as a pale yellow powder (yield 0.98 g (64%)). The target product was identified by $^1$H-NMR and FD-MS spectroscopy.

$^1$H-NMR (270 MHz, CDCl$_3$, TMS): δ/ppm 1.26 (s, tBu (Flu), 18H), 0.90-1.85 (m, C6, 10H), 2.75 (br, CpH, 1H), 3.79 (br, Flu-9H, 1H), 5.80-6.52 (m, Cp, 4H), 6.73 (s, Flu, 2H), 7.20-7.60 (m, Ph(Flu), 10H), 7.82 (s, Flu, 2H).

MS (FD): M/z 577 (M$^+$).

(ii) Synthesis of cyclohexylidene(cyclopentadienyl)(2,7-diphenyl-3,6-ditert-butylfluorenyl)zirconium dichloride Under a nitrogen atmosphere, a 100-mL Schlenk flask was charged with 0.98 g (1.70 mmol) of cyclohexylidene(cyclopentadienyl)(2,7-diphenyl-3,6-ditert-butylfluorene) and 40 mL of dehydrated diethyl ether, and the mixture was stirred. This mixed slurry solution was cooled to 0° C. in an ice bath, and 2.40 mL (3.74 mmol) of a 1.56 mol/L hexane solution of n-butyllithium was added. The mixture was stirred for 23 hours while gradually warming to room temperature. This red reaction solution was cooled to −78° C. in a dry ice/methanol bath, and then 0.391 g (1.68 mmol) of zirconium tetrachloride was added. Subsequently, the mixture was stirred for 22 hours while gradually warming to room temperature to obtain an orange suspension. The solvent was removed by distillation under reduced pressure. Under a nitrogen atmosphere the residue was dissolved in n-hexane. The liquid was passed through a glass filter filled with Celite, and insolubles were washed with n-hexane, and the red powders insoluble in n-hexane was subjected to extraction with dichloromethane. The solvent in which the dichloromethane-solubles were dissolved was distilled off. The residue was washed with cold diethyl ether/cold n-hexane to obtain a target product as an orange solid (yield 0.71 g (57%)). The target product was identified by $^1$H-NMR and FD-MS spectroscopy.

$^1$H-NMR (270 MHz, CDCl$_3$, TMS): δ/ppm 1.25 (s, tBu (Flu), 18H), 1.45-1.90 (m, C6, 6H), 2.10-2.35 (m, C6, 2H), 2.85-3.00 (m, C6, 2H), 5.55 (t, J=2.6 Hz, Cp, 2H), 6.29 (t, J=2.6 Hz, Cp, 2H), 7.15-7.45 (m, Ph(Flu) and Flu, 12H), 8.22 (s, Flu, 2H).

MS (FD): M/z 736 (M$^+$).

Synthesis Example 1-8

Synthesis of dibenzylmethylene(cyclopentadienyl)(2,7-di[2-naphthyl]-3,6-ditert-butylfluorenyl)zirconium dichloride (i) Synthesis of 2,7-di(2-naphthyl)-3,6-ditert-butyl-fluorene Under a nitrogen atmosphere, 45 mL of dehydrated 1,2-dimethoxyethane was added to 3.02 g (6.92 mmol) of 2,7-dibromo-3,6-ditert-butyl-fluorene synthesized in Synthesis Example 1-1(i) and 0.40 g (0.35 mmol) of Pd(PPh$_3$), and the mixture was stirred at room temperature for 20 minutes. To this solution, a solution prepared by dissolving 2.62 g (15.2 mmol) of 2-naphthylboric acid in 15 mL of ethanol was added, and the mixture was stirred at room temperature for 20 minutes. Then, 13.8 mL (27.7 mmol) of a 2.0 mol/L aqueous solution of sodium carbonate was added. The mixture was heated to reflux for 21 hours, and then left to be naturally cooled. Subsequently, the reaction was terminated with 1N hydrochloric acid in an ice bath. Thereafter, dichloromethane was added to perform liquid-liquid phase separation. The aqueous layer was subjected to extraction with diethyl ether twice, and the resultant was combined with the organic layer obtained previously. The resulting liquid was washed two times with a saturated aqueous solution of sodium hydrogen carbonate, two times with water, and once with saturated brine, and then dried over magnesium sulfate. Subsequently, the solvent was distilled off, and the resulting solids were subjected to separation by silica gel chromatography. To the yellow powder obtained, a mixed solution of n-hexane and a small amount of dichloromethane was added. The mixture was heated to 65° C. to dissolve the powder completely, and was then left to stand overnight at room temperature. Crystals precipitated were washed three times with 10 mL of n-hexane to obtain a target product as a white powder (yield 2.71 g (74%)). The target product was identified by $^1$H-NMR and FD-MS spectroscopy.

$^1$H-NMR (270 MHz, CDCl$_3$, TMS): δ/ppm 1.32 (s, tBu (Flu), 18H), 3.81 (s, Flu-9H, 2H), 7.22 (s, Flu, 2H), 7.46-7.52 (m, NapFlu, 6H), 7.77-7.90 (m, NapFlu, 8H), 8.03 (s, Flu, 2H).

MS (FD): M/z 530 (M$^+$).

(ii) Synthesis of dibenzylmethylene(cyclopentadienyl)(2,7-di[2-naphthyl]-3,6-ditert-butylfluorene)

Under a nitrogen atmosphere, 80 mL of dehydrated tert-butylmethylether was added to 0.82 g (1.54 mmol) of 2,7-di (2-naphthyl)-3,6-ditert-butyl-fluorene, and the mixture was stirred. This solution was cooled in an ice bath, and 1.10 mL (1.76 mmol) of a 1.60 mol/L hexane solution of n-butyllithium was added. The mixture was stirred at room temperature for 22 hours. To the yellow suspension thus obtained, 0.44 g (1.70 mmol) of 6,6-dibenzofulvene synthesized in Synthesis Example 1-1 (iii) was added, and the mixture was heated to reflux for 19 hours. Subsequently, 30 mL of 1N hydrochloric acid was added to the light orange-brown solution obtained to terminate the reaction. Then, 100 mL of diethylether was added to perform a liquid-liquid phase separation, and the soluble fraction was extracted. This organic layer was washed two times with a saturated aqueous solution of sodium hydrogen carbonate, two times with water, and once with saturated brine, and then dried over magnesium sulfate. The solvent was distilled off, and the residue was purified by column chromatography to obtain a target product as a pale yellow solid (yield 0.64 g (53%)). The target product was identified by $^1$H-NMR and FD-MS spectroscopy.

$^1$H-NMR (270 MHz, CDCl$_3$, TMS): δ/ppm 1.28 (s, tBu (Flu), 18H), 2.65 (br, CpH, 1H), 3.28 (br, CH$_2$Ph, 4H), 4.46 (br, Flu-9H, 1H), 5.85-6.48 (m, Cp, 4H), 6.80-7.92 (m, Nap (Flu) and CH$_2$Ph and Flu, 26H).

MS (FD): M/z 788 (M$^+$).

(iii) Synthesis of dibenzylmethylene(cyclopentadienyl)(2,7-di[2-naphthyl]-3,6-ditert-butylfluorenyl) zirconium dichloride Under a nitrogen atmosphere, a 100-mL Schlenk flask was charged with 0.64 g (0.811 mmol) of dibenzylmethylene (cyclopentadienyl)(2,7-di[2-naphthyl]-3,6-ditert-butylfluorene) and 40 mL of dehydrated diethyl ether, and the mixture was stirred. This mixed slurry solution was cooled in an ice bath, 1.14 mL (1.82 mmol) of a 1.60 mol/L hexane solution of n-butyllithium was added. The mixture was stirred for 42 hours while gradually warming to room temperature. This red reaction solution was cooled to −78° C. in a dry ice/methanol bath, and then 0.180 g (0.772 mmol) of zirconium tetrachloride was added. Subsequently, the mixture was stirred for 47 hours while gradually warming to room temperature to obtain an orange colored suspension. The solvent was removed by distillation under reduced pressure. Under a nitrogen atmosphere, the residue was dissolved in n-hexane, and the liquid was passed through a glass filter filled with Celite, insolubles were washed with n-hexane, and the red powder insoluble in n-hexane was subjected to extraction with dichloromethane. The solvent in which the dichloromethane-solubles were dissolved was distilled off. The residue was washed with diethyl ether/n-hexane to obtain a target product as a red-orange powder (yield 379 mg (49%)). The target product was identified by $^1$H-NMR and FD-MS spectroscopy.

$^1$H-NMR (270 MHz, CDCl$_3$, TMS): δ/ppm 1.35 (s, tBu (Flu), 18H), 3.72-4.00 (m, CH$_2$Ph, 4H), 5.83 (br, Cp, 2H), 6.52 (br, Cp, 2H), 6.95-7.90 (m, Nap(Flu) and CH$_2$Ph, 26H), 8.40 (s, Flu, 2H).

MS (FD): M/z 948 (M$^+$).

Synthesis Example 1-9

Synthesis of dibenzylmethylene(cyclopentadienyl)(2,7-di[p-tolyl]-3,6-ditert-butylfluorenyl)zirconium dichloride (i) Synthesis of 2,7-di(p-tolyl)-3,6-ditert-butyl-fluorene Under a nitrogen atmosphere, 120 mL of dehydrated 1,2-dimethoxyethane was added to 8.00 g (18.3 mmol) of 2,7-dibromo-3,6-ditert-butyl-fluorene synthesized in Synthesis Example 1-1(i) and 1.05 g (0.909 mmol) of Pd(PPh$_3$), and the mixture was stirred at room temperature for 20 minutes. To this solution, a solution prepared by dissolving 5.50 g (40.5 mmol) of 4-methylphenylboric acid in 20 mL of ethanol was added. The mixture was stirred at room temperature for 20 minutes, and then 36.8 mL (73.6 mmol) of a 2.0 mol/L aqueous solution of sodium carbonate was added. Subsequently, the mixture was heated to reflux for 21 hours, left to be naturally cooled, and then 1N hydrochloric acid was added in an ice bath to terminate the reaction. Dichloromethane was then added to perform a liquid-liquid phase separation, and the aqueous layer was subjected to extraction with diethyl ether twice. The resultant was combined with the organic layer obtained previously. The resultant liquid was then washed two times with a saturated aqueous solution of sodium hydrogen carbonate, two times with water, and once with saturated brine, and then dried over magnesium sulfate. Subsequently, the solvent was distilled off, and the resultant was subjected to separation by silica gel chromatography. To the whitish yellow powder obtained, small amount of a mixed solution of n-hexane and ethanol was added. The mixture was heated to 65° C., and then was left to stand for 1 hour at room temperature. Crystals Precipitated were washed 10 times with 2 mL of cold methanol and 20 times with 1 mL of cold n-hexane to obtain a target product as a white powder (yield 6.95 g (83%)). The target product was identified by $^1$H-NMR and FD-MS spectroscopy.

$^1$H-NMR (270 MHz, CDCl$_3$, TMS): δ/ppm 1.29 (s, tBu (Flu), 18H), 2.41 (s, MePhFlu, 6H), 3.76 (s, Flu-9H, 2H), 7.12-7.26 (m, Flu and MePhFlu 10H), 7.95 (s, Flu, 2H).

MS (FD): M/z 458 (M$^+$).

(ii) Synthesis of dibenzylmethylene(cyclopentadienyl)(2,7-di[p-tolyl]-3,6-ditert-butylfluorene)

Under a nitrogen atmosphere, 100 mL of dehydrated tert-butylmethylether was added to 1.30 g (2.84 mmol) of 2,7-di(p-tolyl)-3,6-ditert-butyl-fluorene, and the mixture was stirred. This solution was cooled in an ice bath, and 2.10 mL (3.36 mmol) of a 1.60 mol/L hexane solution of n-butyllithium was added. The solution was stirred at room temperature for 21 hours. To the yellowy-black suspension obtained, 0.808 g (3.12 mmol) of 6,6-dibenzofulvene synthesized in Synthesis Example 1-1(iii) was added. Subsequently, the mixture was heated to reflux for 19 hours. Subsequently, 30 mL of 1N hydrochloric acid was added to the red-brown solution obtained to terminate the reaction. Then, 100 mL of diethylether was added to perform a liquid-liquid phase separation, and the soluble fraction was extracted. This organic layer was washed two times with a saturated aqueous solution of sodium hydrogen carbonate, two times with water, and once with saturated brine, and then dried over magnesium sulfate. The solvent was solvent was distilled off, and the residue was subjected to separation by column chromatography. The whitish yellow powder obtained was washed once with 10 mL of cold hexane, three times with 5 mL of cold ethanol, and 3 times with 2 mL of cold hexane to obtain a target product as a white powder (yield 1.04 g (51%)). The target product was identified by $^1$H-NMR and FD-MS spectroscopy.

$^1$H-NMR (270 MHz, CDCl$_3$, TMS): δ/ppm 1.25 (s, tBu (Flu), 18H), 2.38 (s, MePhFlu, 6H), 2.69 (br, CpH, 1H), 3.27 (br, CH$_2$Ph, 4H), 4.40 (br, Flu-9H, 1H), 5.80-6.48 (m, Cp, 4H), 6.80-7.30 (m, MePh(Flu) and CH$_2$Ph and Flu, 20H), 7.66 (s, Flu, 2H).

MS (FD): M/z 717 (M$^+$).

(iii) Synthesis of dibenzylmethylene(cyclopentadienyl)(2,7-di[p-tolyl]-3,6-ditert-butylfluorenyl)zirconium dichloride Under a nitrogen atmosphere, a 100-mL Schlenk flask was charged with 1.04 g (1.45 mmol) of dibenzylmethylene(cyclopentadienyl)(2,7-di[p-tolyl]-3,6-ditert-butylfluorene) and 60 mL of dehydrated diethyl ether, and the mixture was stirred. This mixed slurry solution was cooled in an ice bath, and 2.00 mL (3.20 mmol) of a 1.60 mol/L hexane solution of n-butyllithium was added. The mixture was stirred for 51 hours while gradually warming to room temperature. This red-orange reaction solution was cooled to −78° C. in a dry ice/methanol bath, and then 0.363 g (1.60 mmol) of zirconium tetrachloride was added. Subsequently, the mixture was stirred for 43 hours while gradually warming to room temperature to obtain an orange colored suspension. The solvent was removed by distillation under reduced pressure. Under a nitrogen atmosphere, the residue was dissolved in n-hexane, the liquid was passed through a glass filter filled with Celite, insolubles were washed with n-hexane, and the orange powder insoluble in n-hexane was subjected to extraction with dichloromethane. The solvent in which the dichloromethane-solubles were dissolved was distilled off. The residue was washed with diethyl ether/n-hexane to obtain a target product as an orange powder (yield 744 mg (58%)). The target product was identified by $^1$H-NMR and FD-MS spectroscopy.

$^1$H-NMR (270 MHz, CDCl$_3$, TMS): δ/ppm 1.32 (s, tBu (Flu), 18H), 2.37 (s, MePhFlu, 6H), 3.86 (d, J=15.5 Hz, CH$_2$Ph, 2H), 3.94 (d, J=15.5 Hz, CH$_2$Ph, 2H), 5.81 (t, J=2.6 Hz, Cp, 2H), 6.46 (t, J=2.6 Hz, Cp, 2H), 6.90-7.40 (m, MePh (Flu) and CH$_2$Ph and Flu, 20H), 8.32 (s, Flu, 2H).

MS (FD): M/z 876 (M$^+$).

Synthesis Example 1-10

Synthesis of dibenzylmethylene(cyclopentadienyl)(2,7-di[o-tolyl]-3,6-ditert-butylfluorenyl)zirconium dichloride (i) Synthesis of 2,7-di(p-tolyl)-3,6-ditert-butyl-fluorene Under a nitrogen atmosphere, 50 mL of dehydrated tetrahydrofuran was added to 3.50 g (8.02 mmol) of 2,7-dibromo-3,6-ditert-butyl-fluorene synthesized in Synthesis Example 1-1(i), 0.186 g (0.20 mmol) of Pd$_2$(dba)$_3$, 0.115 g (0.57 mmol) of P(tBu)$_3$, and 6.81 g (32.1 mmol) of tripotassium phosphate, and the mixture was stirred at room temperature for 20 minutes. To the solution, a solution of 2.73 g (20.0 mmol) prepared by dissolving o-tolylboronic acid in 15 mL of dehydrated tetrahydrofuran was added. Subsequently, the mixture was heated to reflux for 72 hours, left to be naturally cooled, and then 1N hydrochloric acid was added in an ice bath to terminate the reaction. Thereafter, diethylether was added to perform liquid-liquid phase separation. The aqueous layer was extracted twice with diethylether and the resultant was combined with the organic layer obtained previously. Then, the resultant liquid washed two times with a saturated aqueous solution of sodium hydrogen carbonate, two times with water, and once with saturated brine, and dried over magnesium sulfate. Subsequently, the solvent was distilled off, and the resultant was subjected to separation by silica gel chromatography to obtain a target product as a white powder (yield 0.532 g (14%)). The target product was identified by $^1$H-NMR.

$^1$H-NMR (270 MHz, CDCl$_3$, TMS): δ/ppm 1.27 (s, tBu (Flu), 18H), 2.07 (s, Me(o-tolyl), 6H), 3.79 (s, Flu-9H, 2H), 7.07 (s, Flu, 2H), 7.19-7.25 (m, o-tolylFlu, 10H), 8.00 (s, Flu, 2H).

(ii) Synthesis of dibenzylmethylene(cyclopentadienyl)(2,7-di[o-tolyl]-3,6-ditert-butylfluorene)

Under a nitrogen atmosphere, 40 mL of dehydrated tert-butylmethylether was added to 0.92 g (2.00 mmol) of 2,7-di(p-tolyl)-3,6-ditert-butyl-fluorene, and the mixture was stirred. This solution was cooled in an ice bath, and 1.45 mL (2.20 mmol) of a 1.52 mol/L hexane solution of n-butyllithium was added. The mixture was stirred at room temperature for 4 hours. The resulting red solution was cooled in an ice bath, a solution prepared by dissolving 0.58 g (2.24 mmol) of 6,6-dibenzofulvene, which was synthesized in Synthesis Example 1-2 (iii), in 20 mL of THF was added dropwise over 25 minutes. Subsequently, the mixture was stirred for 18 hours while gradually warming to room temperature, and then heated to reflux for 3 hours. The reddish black solution obtained was left to be naturally cooled, and then 1N hydrochloric acid was added in an ice bath to terminate the reaction. Thereafter, diethylether was added to perform liquid-liquid phase separation, and the aqueous layer was subjected to extraction with diethylether twice. The resultant was combined with the organic layer obtained previously. The resultant liquid was washed two times with a saturated aqueous solution of sodium hydrogen carbonate, two times with water, and once with saturated brine, and dried over magnesium sulfate. The solvent was distilled off, and the resultant was subjected to separation by silica gel chromatography to obtain a yellow powder. To this yellow powder, a mixed solvent of hexane and ethanol was added, and the mixture was heated to 60° C. to dissolve the powder completely, and the liquid was left to stand overnight at −20° C. Crystals precipitated were washed with ethanol to obtain a target product as a pale yellow powder (yield 0.57 g (40%)). The target product was identified by $^1$H-NMR and FD-MS spectroscopy.

$^1$H-NMR (270 MHz, CDCl$_3$, TMS): δ/ppm 1.21-1.23 (m, tBu(Flu), 18H), 1.96-1.99 (m, CH$_3$(o-tolyl), 3H), 2.14-2.19 (m, CH$_3$(o-tolyl), 3H), 2.66 (br, CpH, 1H), 3.06-3.34 (br, CH$_2$Ph, 4H), 4.45 (br, Flu-9H, 1H), 5.80-6.48 (br, Cp, 4H), 6.75-7.20 (m, o-tolyl(Flu) and CH$_2$Ph and Flu, 20H), 7.64-7.79 (m, Flu, 2H).

MS (FD): M/z 716 (M$^+$).

(iii) Synthesis of dibenzylmethylene(cyclopentadienyl)(2,7-di[o-tolyl]-3,6-ditert-butylfluorenyl)zirconium dichloride Under a nitrogen atmosphere, a 50-mL Schlenk flask was charged with 0.36 g (0.50 mmol) of dibenzylmethylene(cyclopentadienyl)(2,7-di[o-tolyl]-3,6-ditert-butylfluorene) and 25 mL of dehydrated diethyl ether, and the mixture was stirred. This mixed slurry solution was cooled in an ice bath, 0.72 mL (1.09 mmol) of a 1.52 mol/L hexane solution of n-butyllithium was added, and the mixture was stirred for 40 hours while gradually warming to room temperature. This red reaction solution was cooled to −78° C. in a dry ice/methanol bath, and then 0.251 g (1.08 mmol) of zirconium tetrachloride was added. Subsequently, the mixture was stirred for 17 hours while gradually warming to room temperature to obtain a red-orange suspension. The solvent was dried under reduced pressure. Under a nitrogen atmosphere, the residue was dissolved in n-hexane, and the liquid was passed through a glass filter filled with Celite, insolubles were washed with n-hexane, and the orange powder insoluble in n-hexane was subjected to extraction with dichloromethane. The solvent in which the dichloromethane-solubles were dissolved was distilled off. The residue was washed with diethyl ether/cold n-pentane and dried to obtain a target product as a dark pink powder (yield 167 mg (38%)). The target product was identified by $^1$H-NMR and FD-MS spectroscopy.

$^1$H-NMR (270 MHz, CDCl$_3$, TMS): δ/ppm 1.28-1.33 (m, tBu(Flu), 18H), 1.68, 1.87, 2.16 (s, s, s, CH$_3$(o-tolyl), 6H), 3.34-4.30 (m, CH$_2$Ph, 4H), 5.73-5.82 (m, Cp, 2H), 6.45-6.48 (m, Cp, 2H), 6.95-7.30 (m, o-tolyl(Flu) and CH$_2$Ph, 18H), 7.48 (s, Flu, 2H), 8.37-8.41 (m, Flu, 2H).

MS (FD): M/z 876 (M$^+$).

Synthesis Example 1-11

Synthesis of di(4-chlorobenzyl)methylene(cyclopentadienyl)(2,7-diphenyl-3,6-ditert-butylfluorenyl)zirconium dichloride (i) Synthesis of bis(4-chlorobenzyl)ketone Under a nitrogen atmosphere, a 500-mL three-necked flask was charged with 15.12 g (73.3 mmol) of dicyclohexylcarbodiimide and 2.24 g (18.3 mmol) of dimethylaminopyridine, further charged with 150 mL of absolute dichloromethane, and the mixture was stirred at room temperature. To this solution, 12.50 g (73.3 mmol) of 4-chlorophenylacetic acid dissolved in 120 mL of absolute dichloromethane was added dropwise. The solution was stirred at room temperature for 3 days, and then white crystals precipitated were separated by filtration using Kiriyama funnel. The filtrate was concentrated, and the residue was subjected to separation by silica gel column chromatography to obtain a mixed product of white crystal/yellowy oil. To this mixed product, ethanol was added. The mixture was heated to 50° C. to dissolve the mixed product completely, and then left to stand overnight at room temperature. Crystals precipitated were washed with a small amount of ethanol to obtain a target product as a white powder (yield 5.52 g (54%)). The target product was identified by $^1$H-NMR.

$^1$H-NMR (270 MHz, CDCl$_3$, TMS): δ/ppm 3.69 (s, 4-Cl-PhCH$_2$, 4H), 7.05 (d, 4-Cl-PhCH$_2$, 4H), 7.28 (d, 4-Cl-PhCH$_2$, 4H).

(ii) Synthesis of 6,6-di(4-chlorobenzyl)fulvene

Under a nitrogen atmosphere, a 100-mL three-necked flask was charged with 0.66 g (9.22 mmol) of lithium cyclopentadiene and 10 mL of dehydrated THF, and the mixture was stirred. This solution was cooled (to −78° C.) in a dry ice/methanol bath, and 2.50 g (8.96 mmol) of bis(4-chlorobenzyl)ketone dissolved in 15 mL of dehydrated THF was added dropwise. Subsequently, the mixture was stirred for 17 hours while gradually warming to room temperature. Then, 1 N hydrochloric acid was added to the resulting brown-black solution to terminate the reaction. Thereafter, hexane was added to perform liquid-liquid phase separation, and the aqueous layer was subjected to extraction with hexane twice. The resultant was combined with the organic layer obtained previously. The resultant liquid was then washed two times with a saturated aqueous solution of sodium hydrogen carbonate, two times with water, and once with saturated brine, and dried over magnesium sulfate. The solvent was distilled off, and the residue was purified by column chromatography to obtain a target product as a yellow powder (yield 0.65 g (22%)). The target product was identified by $^1$H-NMR.

$^1$H-NMR (270 MHz, CDCl$_3$, TMS): δ/ppm 3.65 (s, PhCH$_2$, 4H), 6.64 (s, Cp, 4H), 7.02 (d, 4-Cl-PhCH$_2$, 4H), 7.23 (d, 4-Cl-PhCH$_2$, 4H).

(iii) Synthesis of di(4-chlorobenzyl)methylene(cyclopentadienyl)(2,7-diphenyl-3,6-ditert-butylfluorene)

Under a nitrogen atmosphere, 15 mL of absolute THF was added to 0.69 g (1.60 mmol) of 2,17-diphenyl-3,6-ditert-butyl-fluorene synthesized in Synthesis Example 1-1 (ii), and the mixture was stirred. This solution was cooled (to −78° C.) in a methanol/dry ice bath, and 1.26 mL (1.92 mmol) of a 1.52 mol/L hexane solution of n-butyllithium was added. Subsequently, the mixture was stirred for 19 hours while gradually warming to room temperature. The resulting dark red solution was cooled (to −78° C.) in a dry ice/methanol bath, and 0.62 g (1.88 mmol) of 6,6-di(4-chlorobenzyl)fulvene dissolved in 10 mL of THF was added dropwise over 20 minutes. The mixture was stirred for 30 minutes, and 1N hydrochloric acid was added to the dark red solution obtained to terminate the reaction. Thereafter, hexane was added to perform liquid-liquid phase separation, and the aqueous layer was subjected to extraction with hexane twice. The resultant was combined with the organic layer obtained previously. The resultant liquid was then washed two times with a saturated aqueous solution of sodium hydrogen carbonate, two times with water, and once with saturated brine, and dried over magnesium sulfate. The solvent was distilled off to obtain a whitish yellow powder. This whitish yellow powder was washed with a mixed solvent of hexane and ethanol to obtain a target product as a white powder (yield 0.80 g (66%)). The target product was identified by $^1$H-NMR and FD-MS spectroscopy.

$^1$H-NMR (270 MHz, CDCl$_3$, TMS): δ/ppm 1.27 (s, tBu (Flu), 18H), 2.70 (br, CpH, 1H), 3.12 (br, 4-Cl-PhCH$_2$, 4H), 4.34 (s, Flu-9H, 1H), 5.87-6.62 (m, Cp, 4H), 6.70-7.30 (m, Ph(Flu) and 4-Cl-PhCH$_2$ and Flu, 20H), 7.67 (br, Flu, 2H).

MS (FD): M/z 756 (M$^+$).

(iv) Synthesis of di(4-chlorobenzyl)methylene(cyclopentadienyl)(2,7-diphenyl-3,6-ditert-butylfluorenyl) zirconium dichloride Under a nitrogen atmosphere, a 50-mL Schlenk flask was charged with 0.79 g (1.01 mmol) of di(4-chlorobenzyl)methylene(cyclopentadienyl)(2,7-diphenyl-3,6-ditert-butylfluorene) and 40 mL of absolute diethyl ether, and the mixture was stirred. This mixed slurry solution was cooled (to −78° C.) in a dry ice/methanol bath, and 1.45 mL (2.20 mmol) of a 1.52 mol/L hexane solution of n-butyllithium was added. Subsequently, the mixture was stirred for 18 hours while gradually warming to room temperature. This red reaction solution was cooled (to −78° C.) in a dry ice/methanol bath, and 0.32 g (1.37 mmol) of zirconium tetrachloride was added. The mixture was stirred for 22 hours while gradually warming to room temperature, to obtain an orange colored suspension. The solvent was dried under reduced pressure. Under a nitrogen atmosphere, the resultant was filtered through a glass filter filled with Celite, and insolubles were washed with a small amount of diethyl ether. The filtrate was concentrated to obtain an orange colored solid. Extraction was carried out using a mixed solvent of diethylether/hexane/pentane, and the solvent in which solubles were dissolved was distilled off. The residue was dried to obtain a target product as a dark pink powder (yield 366 mg (40%)). The target product was identified by $^1$H-NMR and FD-MS spectroscopy.

$^1$H-NMR (270 MHz, CDCl$_3$, TMS): δ/ppm 1.32 (s, tBu (Flu), 18H), 3.70 (d, J=15.5 Hz, 4-Cl-PhCH$_2$, 2H), 3.86 (d, J=15.5 Hz, 4-Cl-PhCH$_2$, 2H), 5.79 (t, J=2.6 Hz, Cp, 2H), 6.48 (t, J=2.6 Hz, Cp, 2H), 6.92-7.33 (m, Ph(Flu) and 4-Cl-PhCH$_2$ and Flu, 20H), 8.35 (s, Flu, 2H).

MS (FD): M/z 916 (M$^+$).

Example 1-1

Propylene Polymerization

A thoroughly nitrogen purged glass autoclave with an internal volume of 500 ml was charged with 250 ml of toluene, and then charged with propylene at a rate of 150 liter/hour, which was kept at 25° C. for 20 minutes. Meanwhile, a magnetic stirrer was placed in a thoroughly nitrogen purged side arm flask with an internal volume of 30 ml, and the flask was sequentially charged with 5.00 mmol of a toluene solution of methylaluminoxane (Al=1.53 mol/l) in terms of aluminum atom and 5.0 μmol of a toluene solution of dibenzylmethylene(cyclopentadienyl)(2,7-diphenyl-3,6-ditert-butylfluorenyl)zirconium dichloride in terms of zirconium atom. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 25° C. for 10 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 6.32 g. The polymerization activity was 7.58 kg-PP/mmol-Zr·hr. The polymer obtained had [η]=2.54 dl/g, Tm$_1$=157.0° C., Tm$_2$=162.0° C., and rrrr=95.3%.

Example 1-2

Propylene Polymerization

The polymerization was performed in the same manner as in Example 1-1, except that the temperature inside the autoclave before the polymerization and during the polymerization was kept at 50° C., and that the polymerization time was changed to 15 minutes. The amount of the polymer obtained was 12.74 g and the polymerization activity was 10.19 kg-PP/mmol-Zr·hr. The polymer obtained had [η]=1.64 dl/g, Tm$_1$=142.9° C., and Tm$_2$=150.1° C.

Example 1-3

Propylene Polymerization

A thoroughly nitrogen purged glass autoclave with an internal volume of 500 ml was charged with 250 ml of toluene, and then charged with propylene at a rate of 150 liter/hour, which kept at 25° C. for 20 minutes. Meanwhile, a magnetic stirrer was placed in a thoroughly nitrogen purged side arm flask with an internal volume of 30 ml, and the flask sequentially charged with 5.00 mmol of a toluene solution of methylaluminoxane (Al=1.53 mol/l) in terms of aluminum atom and 5.0 μmol of a toluene solution of di(n-butyl)methylene(cyclopentadienyl)(2,7-diphenyl-3,6-ditert-butylfluorenyl)zirconium dichloride in terms of zirconium atom. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 25° C. for 25 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 7.35 g. The polymerization activity was 3.53 kg-PP/mmol-Zr·hr. The polymer obtained had [η]=2.43 dl/g, Tm$_1$=154.9° C., Tm$_2$=160.0° C., and rrrr=95.2%.

Example 1-4

Propylene Polymerization

The polymerization was performed in the same manner as in Example 1-3, except that the temperature inside the autoclave before the polymerization and during the polymerization was kept at 50° C. The amount of polymer obtained was 11.00 g and the polymerization activity was 5.28 kg-PP/mmol-Zr·hr. The polymer obtained had [η]=1.54 dl/g, Tm$_1$=138.6° C., and Tm$_2$=146.2° C.

Example 1-5

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to di(n-butyl)methylene(cyclopentadienyl)(2,7-dimethyl-3,6-ditert-butylfluorenyl)zirconium dichloride, and that the polymerization time was changed to 40 minutes. As a result, a polymer was obtained in an amount of 3.31 g and the polymerization activity was 0.99 kg-PP/mmol-Zr·hr. The polymer obtained had [η]=2.52 dl/g, Tm$_1$=142.6° C., and Tm$_2$=151.8° C.

Example 1-6

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to di(p-chlorophenyl)methylene(cyclopentadienyl)(2,7-diphenyl-3,6-ditert-butylfluorenyl)zirconium dichloride, and that the polymerization time was changed to 30 minutes. As a result, a polymer was obtained in an amount of 8.35 g and the polymerization activity was 3.34 kg-PP/mmol-Zr·hr. The polymer obtained had [η]=5.98 dl/g and Tm$_2$=153.3° C.

Example 1-7

Propylene Polymerization

The preparation of the catalyst solution and the polymerization were carried out in the same manner as in Example 1-2, except that dibenzylmethylene(cyclopentadienyl)(2,7-diphenyl-3,6-ditert-butylfluorenyl)zirconium dichloride was changed to di(p-chlorophenyl)methylene(cyclopentadienyl)(2,7-diphenyl-3,6-ditert-butylfluorenyl)zirconium dichloride, and that the polymerization time was changed to 40 minutes. As a result, a polymer was obtained in an amount of 2.90 g and the polymerization activity was 0.87 kg-PP/mmol-Zr·hr. The polymer obtained had [η]=3.22 dl/g, $Tm_1$=139.1° C., and $Tm_2$=143.8° C.

Example 1-8

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to di(p-chlorophenyl)methylene(cyclopentadienyl)(2,7-dimethyl-3,6-ditert-butylfluorenyl)zirconium dichloride, and that the polymerization time was changed to 60 minutes. As a result, a polymer was obtained in an amount of 7.30 g and that the polymerization activity was 1.46 kg-PP/mmol-Zr·hr. The polymer obtained had [η]=5.96 dl/g, $Tm_1$=142.6° C., and $Tm_2$=149.0° C.

Example 1-9

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to di(m-trifluoromethyl-fluorenyl)methylene(cyclopentadienyl)(2,7-dimethyl-3,6-ditert-butylfluorenyl)zirconium dichloride, and that the polymerization time was changed to 60 minutes. As a result, a polymer was obtained in an amount of 2.90 g and the polymerization activity was 0.58 kg-PP/mmol-Zr·hr. The polymer obtained had [η]=4.64 dl/g, $Tm_1$=135.7° C., and $Tm_2$=141.9° C.

Example 1-10

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to cyclohexylidene(cyclopentadienyl)(2,7-diphenyl-3,6-ditert-butylfluorenyl)zirconium dichloride, and that the polymerization time was changed to 15 minutes. As a result, a polymer was obtained in an amount of 6.55 g and the polymerization activity was 5.24 kg-PP/mmol-Zr·hr. The polymer obtained had [η]=2.17 dl/g, $Tm_1$=153.7° C., and $Tm_2$=157.7° C.

Example 1-11

Propylene Polymerization

The preparation of the catalyst solution and the polymerization were carried out in the same manner as in Example 1-2, except that, in Example 1-1, dibenzylmethylene(cyclopentadienyl)(2,7-diphenyl-3,6-ditert-butylfluorenyl)zirconium dichloride was changed to cyclohexylidene(cyclopentadienyl)(2,7-diphenyl-3,6-ditert-butylfluorenyl)zirconium dichloride, and that the polymerization time was changed to 15 minutes. As a result, a polymer was obtained in an amount of 5.64 g and the polymerization activity was 4.51 kg-PP/mmol-Zr·hr. The polymer obtained had [η]=1.42 dl/g, $Tm_1$=136.9° C., and $Tm_2$=145.8° C.

Example 1-12

Propylene Polymerization

A thoroughly nitrogen purged glass autoclave with a internal volume of 500 ml was charged with 250 ml of toluene, and then charged with propylene at a rate of 150 liter/hour, which was kept at 25° C. for 20 minutes. Subsequently, the autoclave was sequentially charged with 2.0 mmol of 1.0 mmol/ml toluene solution of triisobutylaluminum in terms of aluminum atom, 5.0 µmol of a toluene solution of dibenzylmethylene(cyclopentadienyl)2,7-diphenyl-3,6-ditert-butylfluorenyl)zirconium dichloride in terms of zirconium atom, and 0.020 millimole/liter of a toluene solution of N,N-dimethylanilinium tetrakis(pentafluorophenyl)borate. Then, polymerization was initiated. Propylene gas was continuously supplied at a rate of 150 liter/hour, and the polymerization was performed at 25° C. for 20 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 10.56 g. The polymerization activity was 6.34 kg-PP/mmol-Zr·hr. The polymer obtained had [η]=1.25 dl/g, $Tm_1$=144.9° C., and $Tm_2$=151.8° C.

Comparative Example 1-1

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to dibenzylmethylene(cyclopentadienyl)(3,6-ditert-butylfluorenyl)zirconium dichloride, and that the polymerization time was changed to 15 minutes. As a result, a polymer was obtained in an amount of 8.94 g and the polymerization activity was 7.15 kg-PP/mmol-Zr·hr. The polymer obtained had [η]=2.12 dl/g, $Tm_1$=150.2° C., $Tm_2$=155.2° C., and rrrr=94.1%.

Comparative Example 1-2

Propylene Polymerization

The preparation of the catalyst solution and the polymerization were carried out in the same manner as in Example 1-2, except that dibenzylmethylene(cyclopentadienyl)(2,7-diphenyl-3,6-ditert-butylfluorenyl)zirconium dichloride was changed to dibenzylmethylene(cyclopentadienyl)(3,6-ditert-butylfluorenyl)zirconium dichloride. As a result, a polymer was obtained in an amount of 8.23 g and the polymerization activity was 6.58 kg-PP/mmol-Zr·hr. The polymer obtained had [η]=1.23 dl/g, $Tm_1$=132.2° C., and $Tm_2$=142.1° C.

Comparative Example 1-3

Propylene Polymerization

The preparation of the catalyst solution and the polymerization were carried out in the same manner as in Example 1-1, except that dibenzylmethylene(cyclopentadienyl)(2,7- diphenyl-3,6-ditert-butylfluorenyl)zirconium dichloride was changed to cyclohexylidene(cyclopentadienyl)(octamethyloctahydrodibenzofluorenyl)zirconium dichloride, and that the polymerization time was changed to 60 minutes. As a result, a polymer was obtained in an amount of 0.06 g and the polymerization activity was 0.02 kg-PP/mmol-Zr·hr. The polymer obtained had [η]=1.61 dl/g, $Tm_1$=149.1° C., and $Tm_2$=153.7° C.

Comparative Example 1-4

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to dimethylmethylene(cyclopentadienyl)(3,6-ditert-butylfluorenyl)zirconium dichloride, and that the polymerization time was changed to 30 minutes. As a result, a polymer was obtained in an amount of 1.70 g and the polymerization activity was 0.68 kg-PP/mmol-Zr·hr. The results of the polymer analysis were $Tm_2$=150.1° C.

Comparative Example 1-5

Propylene Polymerization

The preparation of the catalyst solution and the polymerization were carried out in the same manner as in Example 1-2, except that dibenzylmethylene(cyclopentadienyl)(2,7-diphenyl-3,6-ditert-butylfluorenyl)zirconium dichloride was changed to dimethylmethylene(cyclopentadienyl)(3,6-ditert-butylfluorenyl)zirconium dichloride, and that the polymerization time was changed to 60 minutes. As a result, a polymer was obtained in an amount of 2.65 g and the polymerization activity was 0.53 kg-PP/mmol-Zr·hr. The polymer obtained had [η]=1.22 dl/g and $Tm_2$=131.0° C.

Comparative Example 1-6

Propylene Polymerization

The preparation of the catalyst solution and the polymerization were carried out in the same manner as in Example 1-1, except that dibenzylmethylene(cyclopentadienyl)(2,7-diphenyl-3,6-ditert-butylfluorenyl)zirconium dichloride was changed to dibenzylmethylene(cyclopentadienyl)(octamethyloctahydrodibenzofluorenyl)zirconium dichloride, and that the polymerization time was changed to 45 minutes. As a result, a polymer was obtained in an amount of 2.38 g and the polymerization activity was 0.63 kg-PP/mmol-Zr·hr. The polymer obtained had [η]=2.15 dl/g, $Tm_1$=150.1° C., $Tm_2$=155.4° C., and rrrr=94.2%.

Comparative Example 1-7

Propylene Polymerization

The preparation of the catalyst solution and the polymerization were carried out in the same manner as in Example 1-2, except that dibenzylmethylene(cyclopentadienyl)(2,7-diphenyl-3,6-ditert-butylfluorenyl)zirconium dichloride was changed to dibenzylmethylene(cyclopentadienyl)(octamethyloctahydrodibenzofluorenyl)zirconium dichloride, and that the polymerization time was changed to 45 minutes. As a result, a polymer was obtained in an amount of 2.14 g and the polymerization activity was 0.57 kg-PP/mmol-Zr·hr. The polymer obtained had [η]=1.32 dl/g, $Tm_1$=125.4° C., and $Tm_2$=136.1° C.

Comparative Example 1-8

Propylene Polymerization

The preparation of the catalyst solution and the polymerization were carried out in the same manner as in Example 1-2, except that dibenzylmethylene(cyclopentadienyl)(2,7-diphenyl-3,6-ditert-butylfluorenyl)zirconium dichloride was changed to diphenylmethylene(cyclopentadienyl)(octamethyloctahydrodibenzofluorenyl)zirconium dichloride, and that the polymerization time was changed to 60 minutes. As a result, a polymer was obtained in an amount of 0.75 g and the polymerization activity was 0.15 kg-PP/mmol-Zr·hr. The polymer obtained had [η]=1.85 dl/g, $Tm_1$=98.0° C., and $Tm_2$=104.0° C.

Example 1-13

Ethylene Polymerization

A thoroughly nitrogen purged glass autoclave with an internal volume of 500 ml was charged with 400 ml of toluene, and then charged with ethylene at a rate of 100 liter/hour, which was kept at 75° C. for 10 minutes. The autoclave was sequentially charged with 1.3 mmol of a toluene solution of methylaluminoxane (Al=1.21 mol/l) in terms of aluminum atom, and 2.0 mmol of a toluene solution of dibenzylmethylene(cyclopentadienyl)(2,7-diphenyl-3,6-ditert-butylfluorenyl)zirconium dichloride in terms of zirconium atom. Then, polymerization was initiated. Ethylene gas was continuously supplied at a rate of 100 liter/hour, and the polymerization was performed at 75° C. for 6 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 4.59 g. The polymerization activity was 23.0 kg-PE/mmol-Zr·hr. The polymer obtained had [η]=3.69 dl/g.

Example 1-14

Ethylene Polymerization

A thoroughly nitrogen purged glass autoclave with an internal volume of 500 ml was charged with 400 ml of toluene, and then charged with ethylene at a rate of 100 liter/hour, which was kept at 75° C. for 10 minutes. The autoclave was sequentially charged with 0.52 mmol of a toluene solution of methylaluminoxane (Al=1.21 mol/l) in terms of aluminum atom and 0.8 µmol of a toluene solution of di(n-butyl)methylene(cyclopentadienyl)(2,7-diphenyl-3,6-ditert-butylfluorenyl)zirconium dichloride in terms of zirconium atom. Then, polymerization was initiated. Ethylene gas was continuously supplied at a rate of 100 liter/hour, and the polymerization was performed at 75° C. for 3 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 2.70 g. The

Example 1-15

Ethylene Polymerization

The preparation of the catalyst solution and the polymerization were carried out in the same manner as in Example 1-14, except that dibenzylmethylene(cyclopentadienyl)(2,7-diphenyl-3,6-ditert-butylfluorenyl)zirconium dichloride was changed to di(n-butyl)methylene(cyclopentadienyl)(2,7-dimethyl-3,6-ditert-butylfluorenyl)zirconium dichloride. As a result, a polymer was obtained in an amount of 4.72 g. The polymerization activity was 118.0 kg-PE/mmol-Zr·hr and the polymer obtained had $[\eta]$=3.53 dl/g.

Example 1-16

Ethylene Polymerization

The preparation of the catalyst solution and the polymerization were carried out in the same manner as in Example 1-14, except that dibenzylmethylene(cyclopentadienyl)(2,7-diphenyl-3,6-ditert-butylfluorenyl)zirconium dichloride was changed to di(p-chlorophenyl)methylene(cyclopentadienyl)(2,7-dimethyl-3,6-ditert-butylfluorenyl)zirconium dichloride. As a result, a polymer was obtained in an amount of 3.68 g. The polymerization activity was 92.0 kg-PE/mmol-Zr·hr and the polymer obtained had $[\eta]$=7.32 dl/g.

Example 1-17

Ethylene Polymerization

The preparation of the catalyst solution and the polymerization were carried out in the same manner as in Example 1-14, except that dibenzylmethylene(cyclopentadienyl)(2,7-diphenyl-3,6-ditert-butylfluorenyl)zirconium dichloride was changed to di(m-trifluoromethyl-phenyl)methylene(cyclopentadienyl)(2,7-dimethyl-3,6-ditert-butylfluorenyl)zirconium dichloride, and that the polymerization time was changed to 2 minutes. As a result, a polymer was obtained in an amount of 4.24 g. The polymerization activity was 159.0 kg-PE/mmol-Zr·hr and the polymer obtained had $[\eta]$=7.61 dl/g.

Example 1-18

Ethylene Polymerization

The preparation of the catalyst solution and the polymerization were carried out in the same manner as in Example 1-13, except that dibenzylmethylene(cyclopentadienyl)(2,7-diphenyl-3,6-ditert-butylfluorenyl)zirconium dichloride was changed to cyclohexylidene(cyclopentadienyl)(2,7-diphenyl-3,6-ditert-butylfluorenyl)zirconium dichloride, and that the polymerization time was changed to 4 minutes. As a result, a polymer was obtained in an amount of 4.07 g. The polymerization activity was 30.5 kg-PE/mmol-Zr·hr and the polymer obtained had $[\eta]$=4.05 dl/g.

Comparative Example 1-9

Ethylene Polymerization

The preparation of the catalyst solution and the polymerization were carried out in the same manner as in Example 1-13, except that dibenzylmethylene(cyclopentadienyl)(2,7-diphenyl-3,6-ditert-butylfluorenyl)zirconium dichloride was changed to cyclohexylidene(cyclopentadienyl)(octamethyloctahydrodibenzofluorenyl)zirconium dichloride, and that the polymerization time was changed to 2 minutes. As a result, a polymer was obtained in an amount of 1.21 g. The polymerization activity was 18.2 kg-PE/mmol-Zr·hr and the polymer obtained had $[\eta]$=2.23 dl/g.

Comparative Example 1-10

Ethylene Polymerization

The preparation of the catalyst solution and the polymerization were carried out in the same manner as in Example 1-13, except that dibenzylmethylene(cyclopentadienyl)(2,7-diphenyl-3,6-ditert-butylfluorenyl)zirconium dichloride was changed to dibenzylmethylene(cyclopentadienyl)(octamethyloctahydrodibenzofluorenyl)zirconium dichloride, and that the polymerization time was changed to 2.5 minutes. As a result, a polymer was obtained in an amount of 1.76 g. The polymerization activity was 21.1 kg-PE/mmol-Zr·hr and the polymer obtained had $[\eta]$=2.62 dl/g.

Comparative Example 1-11

Ethylene Polymerization

The preparation of the catalyst solution and the polymerization were carried out in the same manner as in Example 1-13, except that dibenzylmethylene(cyclopentadienyl)(2,7-diphenyl-3,6-ditert-butylfluorenyl)zirconium dichloride was changed to diphenylmethylene(cyclopentadienyl)(octamethyloctahydrodibenzofluorenyl)zirconium dichloride, and that the polymerization time was changed to 3 minutes. As a result, a polymer was obtained in an amount of 4.15 g. The polymerization activity was 41.5 kg-PE/mmol-Zr·hr.

Example 1-19

Preparation of Supported Catalyst

In a 100 ml three-neck flask thoroughly purged with nitrogen, a stirrer rod was placed and the flask was charged with 0.501 g of silica-supported methylaluminoxane (Al=16.1 wt %). The flask was then charged with 15 ml of dehydrated toluene at room temperature, and further charged with 10 ml of toluene solution in which 10.2 mg of dibenzylmethylene(cyclopentadienyl)(2,7-diphenyl-3,6-ditert-butylfluorenyl)zirconium dichloride was dissolved while stirring. The mixture was stirred for 1 hour. The slurry obtained was filtered, and a powder on the filter was washed once with 10 ml of dehydrated toluene, and subsequently washed three times with 10 ml of dehydrated hexane. The washed powder was dried under reduced pressure for 2 hours to obtain a powder in an amount of 0.422 g. The powder obtained was mixed with 3.80 g of a mineral oil to obtain a 10.0 wt % slurry.

Example 1-20

Propylene Bulk Polymerization

In a 50 ml side-arm flask thoroughly purged with nitrogen, a magnetic stirrer chip was placed, and the flask was charged with 0.596 g of a supported catalyst slurry prepared in Example 1-19 above mentioned, 1.0 mmol of hexane solution (Al=1.0M) of triisobutylaluminum, and 5.0 ml of dehydrated hexane. The resultant mixture was introduced to a thoroughly nitrogen purged SUS autoclave with an internal volume of 2000 ml. Thereafter, 500 g of liquid propylene was charged. Subsequently, the polymerization was carried out at 70° C. for 40 minutes, and then the autoclave was cooled and propylene was purged to terminate the polymerization. The amount of the syndiotactic polypropylene obtained was 38.7 g. The polymerization activity was 45.8 kg-PP/mmol-Zr·hr. The results of polymer analysis were [η]=0.99 dl/g, Mw=72800, Mw/Mn=1.87, $Tm_1$=135.9° C., and $Tm_2$=145.7° C.

Example 1-21

Propylene Bulk Polymerization

The polymerization was carried out under the same condition as in Example 1-20 described above, except that 0.194 g of the supported catalyst slurry prepared in Example 1-19 above mentioned was used and that 0.3 NL of hydrogen was added after charging 500 g of liquid propylene. The amount of the syndiotactic polypropylene obtained was 42.2 g, and the polymerization activity was 153.5 kg-PP/mmol-Zr·hr. The results of polymer analysis were [η]=1.00 dl/g, Mw=74200, Mw/Mn=1.99, $Tm_1$=134.6° C., and $Tm_2$=145.8° C.

Comparative Example 1-12

Preparation of Supported Catalyst

In a 100 ml three-neck flask thoroughly purged with nitrogen, a stirrer rod was placed, and the flask was charged with 0.506 g of silica-supported methylaluminoxane (AL=16.1 wt %). The flask was then charged with 15 ml of dehydrated toluene at room temperature, and further charged with 10 ml of toluene solution in which 10.3 mg of the isopropylidene (cyclopentadienyl)(3,6-ditert-butylfluorenyl)zirconium dichloride was dissolved while stirring. The mixture was stirred for 1 hour. The slurry obtained was filtered, and a powder on the filter was washed once with 10 ml of dehydrated toluene, and subsequently washed three times with 10 ml of dehydrated hexane. The washed powder was dried under reduced pressure for 2 hours to obtain a powder in an amount of 0.410 g. The powder obtained was mixed with 3.69 g of a mineral oil to obtain a 10.0 wt % slurry.

Comparative Example 1-13

Propylene Bulk Polymerization

In a 50 ml side-arm flask thoroughly purged with nitrogen, a magnetic stirrer chip was placed, and the flask was charged with 0.205 g of a supported catalyst slurry prepared in Comparative Example 1-12 above mentioned, 1.0 mmol of hexane solution (Al=1.0M) of triisobutylalminium, and 5.0 ml of dehydrated hexane. The resultant mixture was introduced to a thoroughly nitrogen purged SUS autoclave with an internal volume of 2000 ml. Thereafter, 500 g of liquid propylene was charged. Subsequently, the polymerization was carried out at 70° C. for 40 minutes, and then the autoclave was cooled and propylene was purged to terminate the polymerization. The polymer was dried under reduced pressure at 80° C. for 10 hours. The amount of a syndiotactic polypropylene obtained was 6.9 g. The polymerization activity was 16.9 kg-PP/mmol-Zr·hr. The results of polymer analysis were [η]=1.15 dl/g, Mw=88200, Mw/Mn=1.76, $Tm_1$=126.9° C., and $Tm_2$=136.9° C.

Comparative Example 1-14

Propylene Bulk Polymerization

The polymerization was carried out under the same condition as in Comparative Example 1-13 described above, except that 0.198 g of the supported catalyst slurry prepared in Comparative Example 1-12 above mentioned was used and that 0.3 NL of hydrogen was added after charging 500 g of liquid propylene. The amount of a syndiotactic polypropylene obtained was 168.9 g and the polymerization activity was 429.7 kg-PP/mmol-Zr·hr. The results of polymer analysis were [η]=1.07 dl/g, Mw=84700, Mw/Mn=1.96, $Tm_1$=122.3° C., and $Tm_2$=136.4° C.

Example 1-22

Propylene Polymerization

A thoroughly nitrogen purged glass autoclave with an internal volume of 500 ml, was charged with 400 mL of n-heptane, and then charged with propylene at a rate of 150 liter/hour, which was kept at 25° C. for 20 minutes. Meanwhile, a magnetic stirrer was placed in a thoroughly nitrogen purged side arm flask with an internal volume of 30 ml, and the flask was sequentially charged with 5.00 mmol of a toluene solution of methylaluminoxane (Al=1.53 mol/L), and 5.0 µmol of a toluene solution of dibenzylmethylene(cyclopentadienyl)(2,7-diphenyl-3,6-ditert-butylfluorenyl)zirconium dichloride. The mixture was stirred for 20 minutes. This solution was then added to n-heptane in the glass autoclave which had been charged with propylene, and the polymerization was initiated. Propylene gas was continuously supplied at a rate of 150 liter/hour, and the polymerization was performed at 25° C. for 7.5 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 9.00 g. The polymerization activity was 14.40 kg-PP/mmol-Zr·hr. The polymer obtained had [η]=2.73 dl/g and $Tm_2$=159.0° C.

Example 1-23

Propylene Polymerization

The polymerization was carried out in the same manner as in Example 1-22, except that the temperature inside the autoclave before the polymerization and during the polymerization was kept at 50° C., and that the polymerization time was changed to 31 minutes. The amount of the polymer obtained was 19.60 g, and the polymerization activity was 7.59 kg-PP/mmol-Zr·hr. The polymer obtained had [η]=1.72 dl/g, $Tm_1$=149.9° C., and $Tm_2$=154.8° C.

Example 1-24

Propylene Polymerization

A thoroughly nitrogen purged glass autoclave with an internal volume of 500 ml was charged with 250 ml of toluene was charged, and then charged with propylene at a rate of 150 liter/hour, which was kept at 25° C. for 20 minutes. Meanwhile, a magnetic stirrer was placed in a thoroughly nitrogen purged side arm flask with an internal volume of 30 ml, and the flask was sequentially charged with 5.00 mmol of a toluene solution of methylaluminoxane (Al=1.53 mol/L) and 5.0 µmol of a toluene solution of dibenzylmethylene(cyclopentadienyl)(2,7-[2-naphthyl]-3,6-ditert-butylfluorenyl)zirconium dichloride. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 25° C. for 15 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 12.19 g. The polymerization activity was 9.75 kg-PP/mmol-Zr·hr. The polymer obtained had [η]=2.27 dl/g, $Tm_1$=156.5° C., and $Tm_2$=161.0° C.

Example 1-25

Propylene Polymerization

Polymerization was carried out in the same manner as in Example 1-24, except that the temperature inside the autoclave before the polymerization and during the polymerization was kept at 50° C., and that the polymerization time was changed to 20 minutes. The amount of the polymer obtained was 12.30 g, and the polymerization activity was 7.38 kg-PP/mmol-Zr·hr. The polymer obtained had [η]=1.43 dl/g, $Tm_1$=143.0° C., and $Tm_2$=150.6° C.

Example 1-26

Propylene Polymerization

Preparation of a catalyst solution and polymerization were carried out in the same manner as in Example 1-23, except that dibenzylmethylene(cyclopentadienyl)(2,7-diphenyl-3,6-ditert-butylfluorenyl)zirconium dichloride was changed to dibenzylmethylene(cyclopentadienyl)(2,7-[2-naphthyl]-3,6-ditert-butylfluorenyl)zirconium dichloride, and that the polymerization time was changed to 15 minutes. As a result, a polymer was obtained in an amount of 5.75 g. The polymerization activity was 4.60 kg-PP/mmol-Zr·hr, and the polymer obtained had [η]=1.59 dl/g, $Tm_1$=147.2° C., and $Tm_2$=154.1° C.

Example 1-27

Propylene Polymerization

Preparation of a catalyst solution and polymerization were carried out in the same manner as in Example 1-24, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[p-tolyl]-3,6-ditert-butylfluorenyl)zirconium dichloride, and that the polymerization time was changed to 10 minutes. As a result, a polymer was obtained in an amount of 29.81 g. The polymerization activity was 35.77 kg-PP/mmol-Zr·hr, and the polymer obtained had [η]=1.00 dl/g, $Tm_1$=155.1° C., and $Tm_2$=160.0° C.

Example 1-28

Propylene Polymerization

Preparation of a catalyst solution and polymerization were carried out in the same manner as in Example 1-25, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[p-tolyl]-3,6-ditert-butylfluorenyl)zirconium dichloride, and that the polymerization time was changed to 15 minutes. As a result, a polymer was obtained in an amount of 39.08 g. The polymerization activity was 31.26 kg-PP/mmol-Zr·hr, and the polymer obtained had [η]=0.71 dl/g, $Tm_1$=140.5° C., and $Tm_2$=148.9° C.

Example 1-29

Propylene Polymerization

Preparation of a catalyst solution and polymerization were carried out in the same manner as in Example 1-23, except that dibenzylmethylene(cyclopentadienyl)(2,7-diphenyl-3,6-ditert-butylfluorenyl)zirconium dichloride was changed to dibenzylmethylene(cyclopentadienyl)(2,7-[p-tolyl]-3,6-ditert-butylfluorenyl)zirconium dichloride, and that the polymerization time was changed to 15 minutes. As a result, a polymer obtained in an amount of 7.42 g. The polymerization activity was 5.94 kg-PP/mmol-Zr·hr, and the polymer obtained had [η]=1.87 dl/g, $Tm_1$=147.2° C., and $Tm_2$=153.6° C.

Example 1-30

Propylene Polymerization

Preparation of a catalyst solution and polymerization were carried out in the same manner as in Example 1-24, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[o-tolyl]-3,6-ditert-butylfluorenyl)zirconium dichloride, and that the polymerization time was changed to 5 minutes. As a result, a polymer was obtained in an amount of 2.24 g. The polymerization activity was 5.38 kg-PP/mmol-Zr·hr, and the polymer obtained had [η]=3.63 dl/g and $Tm_2$=156.0° C.

Example 1-31

Propylene Polymerization

Preparation of a catalyst solution and polymerization were carried out in the same manner as in Example 1-25, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[o-tolyl]-3,6-ditert-butylfluorenyl)zirconium dichloride, and that the polymerization time was changed to 8 minutes. As a result, a polymer was obtained in an amount of 3.98 g. The polymerization activity was 5.97 kg-PP/mmol-Zr·hr, and the polymer obtained had [η]=2.46 dl/g, $Tm_1$=138.4° C., and $Tm_2$=145.8° C.

Example 1-32

Propylene Polymerization

Preparation of a catalyst solution and polymerization were carried out in the same manner as in Example 1-22, except that dibenzylmethylene(cyclopentadienyl)(2,7-diphenyl-3,6-ditert-butylfluorenyl)zirconium dichloride was changed to dibenzylmethylene(cyclopentadienyl)(2,7-[o-tolyl]-3,6-ditert-butylfluorenyl)zirconium dichloride, and that the polymerization time was changed to 9 minutes. As a result, a polymer was obtained in an amount of 3.75 g. The polymerization activity was 5.00 kg-PP/mmol-Zr·hr, and the polymer obtained had [η]=3.88 dl/g and $Tm_2$=156.2° C.

Example 1-33

Propylene Polymerization

Preparation of a catalyst solution and polymerization were carried out in the same manner as in Example 1-23, except that dibenzylmethylene(cyclopentadienyl)(2,7-diphenyl-3,6-ditert-butylfluorenyl)zirconium dichloride was changed to dibenzylmethylene(cyclopentadienyl)(2,7-[o-tolyl]-3,6-ditert-butylfluorenyl)zirconium dichloride, and that the polymerization time was changed to 20 minutes. As a result, a polymer was obtained in an amount of 6.66 g. The polymerization activity was 4.00 kg-PP/mmol-Zr·hr, and the polymer obtained had $Tm_1$=141.9° C. and $Tm_2$=149.0° C.

Example 1-34

Ethylene Polymerization

A thoroughly nitrogen purged glass autoclave with an internal volume of 500 ml was charged with 400 ml of toluene, and then charged with ethylene at a rate of 100 liter/hour, which was kept at 75° C. for 10 minutes. Then, the flask was sequentially charged with 1.3 mmol of a toluene solution of methylaluminoxane (Al=1.21 mol/l) and 2.0 μmol of a toluene solution of dibenzylmethylene(cyclopentadienyl)(2,7-[2-naphthyl]-3,6-ditert-butylfluorenyl)zirconium dichloride. Thereafter, the polymerization was initiated. Ethylene gas was continuously supplied at a rate of 100 liter/hour, and the polymerization was performed at 75° C. for 4 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 3.76 g. The polymerization activity was 28.2 kg-PE/mmol-Zr·hr. The polymer obtained had [η]=3.74 dl/g.

Example 1-35

Ethylene Polymerization

Preparation of a catalyst solution and polymerization were carried out in the same manner as in Example 1-34, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[p-tolyl]-3,6-ditert-butylfluorenyl)zirconium dichloride, and that the polymerization time was changed to 5 minutes. As a result, a polymer was obtained in an amount of 6.00 g. The polymerization activity was 36.0 kg-PE/mmol-Zr·hr and the polymer obtained had [η]=4.58 dl/g.

Example 1-36

Ethylene Polymerization

Preparation of a catalyst solution and polymerization were carried out in the same manner as in Example 1-34, except that dibenzylmethylene(cyclopentadienyl)(2,7-[2-naphthyl]-3,6-ditert-butylfluorenyl)zirconium dichloride was changed to dibenzylmethylene(cyclopentadienyl)(2,7-[o-tolyl]-3,6-ditert-butylfluorenyl)zirconium dichloride, and that the polymerization time was changed to 6 minutes. As a result, a polymer was obtained in an amount of 4.41 g. The polymerization activity was 22.1 kg-PE/mmol-Zr·hr and the polymer obtained had [η]=6.37 dl/g.

Example 1-37

Propylene Polymerization

Preparation of a catalyst solution and polymerization were carried out in the same manner as in Example 1-24, except that dibenzylmethylene(cyclopentadienyl)(2,7-[2-naphthyl]-3,6-ditert-butylfluorenyl)zirconium dichloride was changed to di(4-chlorobenzyl)methylene(cyclopentadienyl)(2,7-diphenyl-3,6-ditert-butylfluorenyl)zirconium dichloride. As a result, a polymer was obtained in an amount of 6.54 g. The polymerization activity was 5.23 kg-PP/mmol-Zr·hr, and the polymer obtained had [η]=2.29 dl/g, $Tm_1$=157.6° C., and $Tm_2$=163.0° C.

Example 1-38

Propylene Polymerization

The preparation of the catalyst solution and the polymerization were carried out in the same manner as in Example 1-25, except that dibenzylmethylene(cyclopentadienyl)(2,7-[2-naphthyl]-3,6-ditert-butylfluorenyl)zirconium dichloride was changed to di(4-chlorobenzyl)methylene(cyclopentadienyl)(2,7-diphenyl-3,6-ditert-butylfluorenyl)zirconium dichloride, and that the polymerization time was changed to 15 minutes. As a result, a polymer obtained in an amount of 6.17 g. The polymerization activity was 4.94 kg-PP/mmol-Zr·hr, and the polymer obtained had [η]=1.48 dl/g, $Tm_1$=146.6° C., and $Tm_2$=154.1° C.

Example 1-39

Propylene Polymerization

Preparation of a catalyst solution and polymerization were carried out in the same manner as in Example 1-22, except that dibenzylmethylene(cyclopentadienyl)(2,7-diphenyl-3,6-ditert-butylfluorenyl)zirconium dichloride was changed to di(4-chlorobenzyl)methylene(cyclopentadienyl)(2,7-diphenyl-3,6-ditert-butylfluorenyl)zirconium dichloride, and that the polymerization time was changed to 8 minutes. As a result, a polymer was obtained in an amount of 2.76 g. The polymerization activity was 4.14 kg-PP/mmol-Zr·hr, and the polymer obtained had [η]=2.68 dl/g and $Tm_2$=160.5° C.

Example 1-40

Propylene Polymerization

Preparation of a catalyst solution and polymerization were carried out in the same manner as in Example 1-23, except that dibenzylmethylene(cyclopentadienyl)(2,7-diphenyl-3,6-ditert-butylfluorenyl)zirconium dichloride was changed to di(4-chlorobenzyl)methylene(cyclopentadienyl)(2,7-diphenyl-3,6-ditert-butylfluorenyl)zirconium dichloride, and that the polymerization time was changed to 10 minutes. As a result, a polymer was obtained in an amount of 1.69 g. The polymerization activity was 2.03 kg-PP/mmol-Zr·hr, and the polymer obtained had [η]=1.55 dl/g, $Tm_1$=150.2° C., and $Tm_2$=156.8° C.

Comparative Example 1-15

Propylene Polymerization

A thoroughly nitrogen purged glass autoclave with an internal volume of 500 ml was charged with 400 mL of n-hexane, and then charged with propylene at a rate of 150 liter/hour, which was kept at 45° C. for 20 minutes. Meanwhile, a magnetic stirrer was placed in a thoroughly nitrogen purged side arm flask with an internal volume of 30 ml, and the flask was sequentially charged with 5.00 mmol of a toluene solution of methylaluminoxane (Al=1.53 mol/L) and 5.0 µmol of a toluene solution of dibenzylmethylene(cyclopentadienyl)(3,6-ditert-butylfluorenyl)zirconium dichloride. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 45° C. for 30 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 2.15 g. The polymerization activity was 0.86 kg-PP/mmol-Zr·hr, and the polymer obtained had [η]=1.31 dl/g, $Tm_1$=134.1° C., and $Tm_2$=143.5° C.

Example 1-41

Ethylene Polymerization

Preparation of a catalyst solution and polymerization were carried out in the same manner as in Example 1-34, except that dibenzylmethylene(cyclopentadienyl)(2,7-[2-naphthyl]-3,6-ditert-butylfluorenyl)zirconium dichloride was changed to di(4-chlorobenzyl)methylene(cyclopentadienyl)(2,7-diphenyl-3,6-ditert-butylfluorenyl)zirconium dichloride, and that the polymerization time was changed to 6 minutes. As a result, a polymer was obtained in an amount of 2.00 g. The polymerization activity was 10.0 kg-PE/mmol-Zr·hr, and the polymer obtained had [η]=3.36 dl/g.

Example 1-42

Ethylene Polymerization

A thoroughly nitrogen purged glass autoclave with the internal volume of 500 ml was charged with 400 mL of toluene, and then charged with ethylene at a rate of 100 liter/hour, which was kept at 75° C. for 10 minutes. Thereafter, the flask was sequentially charged with 0.52 mmol of a toluene solution of methylaluminoxane (Al=1.21 mol/l) and 0.8 µmol of a toluene solution of di(p-chlorophenyl)methylene(cyclopentadienyl)(2,7-diphenyl-3,6-ditert-butylfluorenyl)zirconium dichloride, and the polymerization was initiated. Ethylene gas was continuously supplied at a rate of 100 liter/hour, and the polymerization was performed at 75° C. for 6 minutes under normal pressure. Thereafter, a small amount of methanol was added to terminate the polymerization. The polymer solution was added to an excessive amount of methanol to precipitate a polymer, which was then dried under reduced pressure at 80° C. for 12 hours to obtain a polymer in an amount of 0.42 g. The polymerization activity was 5.3 kg-PE/mmol-Zr·hr. The polymer obtained had [η]=8.44 dl/g.

The results for the propylene polymerization according to Examples 1-1 to -12 and Comparative Examples 1-1 to -8 are arranged in Table 1-1. The results for the ethylene polymerization according to Examples 1-13 to -18 and Comparative Examples 1-9 to -11 are arranged in Table 1-2. The results for the propylene polymerization according to Examples 1-22 to -33, and -37 to -40, and Comparative Example 1-12, are arranged in Table 1-3. The results for the ethylene polymerization according to Examples 1-34 to -36, 41, and 42, are arranged in Table 1-4.

TABLE 1-1

Table 1-1. Propylene Polymerization

| | Transition metal compound | | | | Polymerization | | | | |
|---|---|---|---|---|---|---|---|---|---|
| | Type | *1 (µmol) | *2 (° C.) | *3 (min) | Yield (g) | activity (Kg-PP/mmol-Zr · hr) | [η] (dl/g) | $Tm_1/Tm_2$ (° C.) | rrrr (%) |
| Ex. 1-1 | Catalyst a | 5 | 25 | 10 | 6.32 | 7.58 | 2.54 | 157.0/162.0 | 95.3 |
| Ex. 1-2 | Catalyst a | 5 | 50 | 15 | 12.74 | 10.19 | 1.64 | 142.9/150.1 | — |
| Ex. 1-3 | Catalyst b | 5 | 25 | 25 | 7.35 | 3.53 | 2.43 | 154.9/160.0 | 95.2 |
| Ex. 1-4 | Catalyst b | 5 | 50 | 25 | 11.00 | 5.28 | 1.54 | 138.6/146.2 | — |
| Ex. 1-5 | Catalyst c | 5 | 25 | 40 | 3.31 | 0.99 | 2.52 | 142.6/151.8 | — |
| Ex. 1-6 | Catalyst d | 5 | 25 | 30 | 8.35 | 3.34 | 5.98 | —/153.3 | — |
| Ex. 1-7 | Catalyst d | 5 | 50 | 40 | 2.90 | 0.87 | 3.22 | 139.1/143.8 | — |
| Ex. 1-8 | Catalyst e | 5 | 25 | 60 | 7.30 | 1.46 | 5.96 | 142.6/149.0 | — |
| Ex. 1-9 | Catalyst f | 5 | 25 | 60 | 2.90 | 0.58 | 4.64 | 135.7/141.9 | — |
| Ex. 1-10 | Catalyst g | 5 | 25 | 15 | 6.55 | 5.24 | 2.17 | 153.3/157.7 | — |
| Ex. 1-11 | Catalyst g | 5 | 50 | 15 | 5.64 | 4.51 | 1.42 | 136.9/145.8 | — |
| Ex. 1-12 | Catalyst a | 5 | 25 | 20 | 10.56 | 6.34 | 1.25 | 144.9/151.8 | — |
| C. E. 1-1 | Catalyst h | 5 | 25 | 15 | 8.94 | 7.15 | 2.12 | 150.2/155.2 | 94.1 |
| C. E. 1-2 | Catalyst h | 5 | 50 | 15 | 8.23 | 6.58 | 1.23 | 132.2/142.1 | — |
| C. E. 1-3 | Catalyst i | 5 | 25 | 60 | 0.06 | 0.02 | 1.61 | 149.1/153.7 | — |
| C. E. 1-4 | Catalyst j | 5 | 25 | 30 | 1.70 | 0.68 | — | —/150.1 | — |
| C. E. 1-5 | Catalyst j | 5 | 50 | 60 | 2.65 | 0.53 | 1.22 | —/131.0 | — |
| C. E. 1-6 | Catalyst k | 5 | 25 | 45 | 2.38 | 0.63 | 2.15 | 150.1/155.4 | 94.2 |
| C. E. 1-7 | Catalyst k | 5 | 50 | 45 | 2.14 | 0.57 | 1.32 | 125.4/136.1 | — |
| C. E. 1-8 | Catalyst l | 5 | 50 | 60 | 0.75 | 0.15 | 1.85 | 98.0/104.0 | — |

Ex: Example
C. E.: Comparative Example
*1: Amount in terms of Zr ato
*2: Polymerization temperature
*3: Polymerization time Catalyst a:
dibenzylmethylene(cyclopentadienyl)(2,7-diphenyl-3,6-ditert-butylfluorenyl)zirconium dichloride, Catalyst b:
di(n-butyl)methylene(cyclopentadienyl)(2,7-diphenyl-3,6-ditert-butylfluorenyl)zirconium dichloride, Catalyst c:
di(n-butyl)methylene(cyclopentadienyl)(2,7-dimethyl-3,6-ditert-butylfluorenyl)zirconium dichloride, Catalyst d:
di(p-chlorophenyl)methylene(cyclopentadienyl)(2,7-diphenyl-3,6-ditert-butylfluorenyl)zirconium dichloride, Catalyst e:
di(p-chlorophenyl)methylene(cyclopentadienyl)(2,7-dimethyl-3,6-ditert-butylfluorenyl)zirconium dichloride, Catalyst f:
di(m-trifluoromethyl-phenyl)methylene(cyclopentadienyl)(2,7-dimethyl-3,6-ditert-butylfluorenyl)zirconium dichloride, Catalyst g:
cyclohexylidene(cyclopentadienyl)(2,7-diphenyl-3,6-ditert-butylfluorenyl)zirconium dichloride, Catalyst h:
dibenzylmethylene(cyclopentadienyl)(3,6-ditert-butylfluorenyl)zirconium dichloride, Catalyst i:
cyclohexylidene(cyclopentadienyl)(octamethyloctahydrodibenzofluorenyl)zirconium dichloride, Catalyst j:
dimethylmethylene(cyclopentadienyl)(3,6-ditert-butylfluorenyl)zirconium dichloride, Catalyst k:
dibenzylmethylene(cyclopentadienyl)(octamethyloctahydrodibenzofluorenyl)zirconium dichloride, Catalyst l:
diphenylmethylene(cyclopentadienyl)(octamethyloctahydrodibenzofluorenyl)zirconium dichloride,

TABLE 1-2

Table 1-2. Ethylene Polymerization

| | Transition metal compound | | Ethylene flow amount (l/hr) | MAO *2 (mmol) | *3 (min) | Yield (g) | Polymerization activity (Kg-PE/mmol-Zr · hr) | [η] (dl/g) |
|---|---|---|---|---|---|---|---|---|
| | Type | *1 (mmol) | | | | | | |
| Ex. 1-13 | Catalyst a | 2.0 | 100 | 1.30 | 6 | 4.59 | 23.0 | 3.69 |
| Ex. 1-14 | Catalyst b | 0.8 | 100 | 0.52 | 3 | 2.7 | 67.5 | 4.32 |
| Ex. 1-15 | Catalyst c | 0.8 | 100 | 0.52 | 3 | 4.72 | 118.0 | 3.53 |
| Ex. 1-16 | Catalyst e | 0.8 | 100 | 0.52 | 3 | 3.68 | 92.0 | 7.32 |
| Ex. 1-17 | Catalyst f | 0.8 | 100 | 0.52 | 2 | 4.24 | 159.0 | 7.61 |
| Ex. 1-18 | Catalyst g | 2.0 | 100 | 1.30 | 4 | 4.07 | 30.5 | 4.05 |
| C. E. 1-9 | Catalyst i | 2.0 | 100 | 1.30 | 2 | 1.21 | 18.2 | 2.23 |
| C. E. 1-10 | Catalyst k | 2.0 | 100 | 1.30 | 2.5 | 1.76 | 21.1 | 2.62 |
| C. E. 1-11 | Catalyst l | 2.0 | 100 | 1.30 | 3 | 4.15 | 41.5 | |

Ex: Example
C. E.: Comparative Example
*1: Amount in terms of Zr atom
*2: Amount in terms of Al atom
*3: Polymerization time

TABLE 1-3

Table 1-3 Propylene Polymerization

| | Transition metal compound | | | | | Polymerization | | | |
|---|---|---|---|---|---|---|---|---|---|
| | Type | *1 (μmol) | *2 (° C.) | *3 (Min) | Yield (g) | activity (Kg-PP/mmol-Zr · hr) | [η] (dl/g) | $Tm_1/Tm_2$ (° C.) |
| Ex. 1-22 | Catalyst a | 5 | 25 | 7.5 | 9.00 | 14.40 | 2.73 | —/159.0 |
| Ex. 1-23 | Catalyst a | 5 | 50 | 31 | 19.60 | 7.59 | 1.72 | 149.9/154.8 |
| Ex. 1-24 | Catalyst m | 5 | 25 | 15 | 12.19 | 9.75 | 2.27 | 156.5/161.0 |
| Ex. 1-25 | Catalyst m | 5 | 50 | 20 | 12.30 | 7.38 | 1.43 | 143.0/150.6 |
| Ex. 1-26 | Catalyst m | 5 | 50 | 15 | 5.75 | 4.60 | 1.59 | 147.2/154.1 |
| Ex. 1-27 | Catalyst n | 5 | 25 | 10 | 29.81 | 35.77 | 1.00 | 155.1/160.0 |
| Ex. 1-28 | Catalyst n | 5 | 50 | 15 | 39.08 | 31.26 | 0.71 | 140.5/148.9 |
| Ex. 1-29 | Catalyst n | 5 | 50 | 15 | 7.42 | 5.94 | 1.87 | 147.2/153.6 |
| Ex. 1-30 | Catalyst o | 5 | 25 | 5 | 2.24 | 5.38 | 3.63 | —/156.0 |
| Ex. 1-31 | Catalyst o | 5 | 50 | 8 | 3.98 | 5.97 | 2.46 | 138.4/145.8 |
| Ex. 1-32 | Catalyst o | 5 | 25 | 9 | 3.75 | 5.00 | 3.88 | —/156.2 |
| Ex. 1-33 | Catalyst o | 5 | 50 | 20 | 6.66 | 4.00 | — | 141.9/149.0 |
| Ex. 1-37 | Catalyst p | 5 | 25 | 15 | 6.54 | 5.23 | 2.29 | 157.6/163.0 |
| Ex. 1-38 | Catalyst p | 5 | 50 | 15 | 6.17 | 4.94 | 1.48 | 146.6/154.1 |
| Ex. 1-39 | Catalyst p | 5 | 25 | 8 | 2.76 | 4.14 | 2.68 | —/160.5 |
| Ex. 1-40 | Catalyst p | 5 | 50 | 10 | 1.69 | 2.03 | 1.55 | 150.2/156.8 |
| C. E. 1-15 | Catalyst h | 5 | 45 | 30 | 2.15 | 0.86 | 1.31 | 134.1/143.5 |

Ex: Example
C. E.: Comparative Example
*1: Amount in terms of Zr atom
*2: Polymerization temperature
*3: Polymerization time Catalyst a:
dibenzylmethylene(cyclopentadienyl)(2,7-diphenyl-3,6-ditert-butylfluorenyl)zirconium dichloride, Catalyst h:
dibenzylmethylene(cyclopentadienyl)(3,6-ditert-butylfluorenyl)zirconium dichloride, Catalyst m:
dibenzylmethylene(cyclopentadienyl)(2,7-[2-naphthyl]-3,6-ditert-butylfluorenyl)zirconium dichloride, Catalyst n:
dibenzylmethylene(cyclopentadienyl)(2,7-[p-tolyl]-3,6-ditert-butylfluorenyl)zirconium dichloride, Catalyst o:
dibenzylmethylene(cyclopentadienyl)(2,7-[o-tolyl]-3,6-ditert-butylfluorenyl)zirconium dichloride, Catalyst p:
di(4-chlorobenzyl)methylene(cyclopentadienyl)(2,7-diphenyl-3,6-ditert-butylfluorenyl)zirconium dichloride, Catalyst d:
di(p-chlorophenyl)methylene(cyclopentadienyl)(2,7-diphenyl-3,6-ditert-butylfluorenyl)zirconium dichloride, Catalyst m:
dibenzylmethylene(cyclopentadienyl)(2,7-[2-naphthyl]-3,6-ditert-butylfluorenyl)zirconium dichloride, Catalyst n:
dibenzylmethylene(cyclopentadienyl)(2,7-[p-tolyl]-3,6-ditert-butylfluorenyl)zirconium dichloride, Catalyst o:
dibenzylmethylene(cyclopentadienyl)(2,7-[o-tolyl]-3,6-ditert-butylfluorenyl)zirconium dichloride, Catalyst p:
di(4-chlorobenzyl)methylene(cyclopentadienyl)(2,7-diphenyl-3,6-ditert-butylfluorenyl)zirconium dichloride,

TABLE 1-4

Table 1-4. Ethylene Polymerization

| | Transition metal compound | | MAO | | | | |
|---|---|---|---|---|---|---|---|
| | Type | *1 (μmol) | *2 (mmol) | *3 (Minute) | Yield (g) | Polymerization activity (Kg-PE/mmol-Zr · hr) | [η] (dl/g) |
| Ex. 1-34 | Catalyst m | 2.0 | 1.30 | 4 | 3.76 | 28.2 | 3.74 |
| Ex. 1-35 | Catalyst n | 2.0 | 1.30 | 5 | 6.00 | 36.0 | 4.58 |
| Ex. 1-36 | Catalyst o | 2.0 | 1.30 | 6 | 4.41 | 22.1 | 6.37 |
| Ex. 1-41 | Catalyst p | 2.0 | 1.30 | 6 | 2.00 | 10.0 | 3.36 |
| Ex. 1-42 | Catalyst d | 0.8 | 0.52 | 6 | 0.42 | 5.3 | 8.44 |

Ex: Example
*1: Amount in terms of Zr atom
*2: Amount in terms of Al atom
*3: Polymerization time

Example II

Hereinafter, the present invention (2) will be further explained in detail with the reference to Examples, but the present invention is not limited to Examples.

The structures of the metallocene compounds and the precursors thereof were determined with use of 270 MHz $^1$H-NMR (JEOL LTD. GSH-270), FD-mass analysis (JEOL LTD. SX-102 A), and the like.

Hereinbelow, the conditions of property tests and the like are described.

1. The intrinsic viscosity [η] was measured in decalin at 135° C.
2. Butene content and ethylene content were determined by $^{13}$C-NMR spectrum.

[Synthesis Method of Known Metallocene Compound]

Diphenylmethylene(cyclopentadienyl)(fluorenyl)zirconium dichloride used in Comparative Examples was a known metallocene compound and was synthesized in accordance with a method described in JP-A No. 2-274703.

Synthesis Example 2-1

Synthesis of di{m-(trifluoromethyl) phenyl}methylene(cyclopentadienyl)(octamethyloctahydrodibenzofluorenyl)zirconium dichloride (i) Synthesis of octamethyloctahydrodibenzofluorene To a 500-ml three-necked flask which was thoroughly purged with nitrogen and equipped with a three-way cock, a dropping funnel and a magnetic stirrer, 9.72 g (58.6 mmol) of fluorine and 19.6 g (134 mmol) of 2,5-dimethyl-2,5-hexanediol were added at room temperature. Then, 85 ml of dehydrated dichloromethane was added. The mixture was stirred with a magnetic stirrer, and cooled to −8° C. in an ice bath. Subsequently, 38.9 g (292 mmol) of pulverized anhydrous aluminum chloride was added thereto over 70 minutes, and the mixture was then stirred for 2 hours at 0° C. Thereafter, the ice bath was removed, and the mixture was further stirred at room temperature for 19 hours. Disappearance of fluorine was confirmed by G.C., and then the dark brown solution was poured into 150 ml of ice water to quench the solution. Subsequently, the soluble fraction was extracted with 500 ml of diethyl ether, and then the organic layer was neutralized with a saturated aqueous solution of sodium hydrogen carbonate, and washed with water. The organic phase collected by separation was dried over anhydrous magnesium sulfate. Subsequently, magnesium sulfate was separated by filtration, and the filtrate was subjected to distillation under reduced pressure with use of a rotary evaporator to remove the solvent. The residue was transferred onto a Kiriyama funnel, washed 6 times with 10 ml of hexane, and dried under reduced pressure to obtain a target product (yield 12.0 g (53%)). The target product was identified by $^1$H-NMR and FD-MS spectroscopy.

$^1$H-NMR (270 MHz, CDCl$_3$, TMS): δ/ppm 1.3 (s, 12H), 1.4 (s, 12H), 1.7 (s, 8H), 3.8 (s, 2H), 7.4 (s, 2H), 7.6 (s, 2H).

MS (FD): M/z 386 (M$^+$).

(ii) Synthesis of 6,6-di[m-(trifluoromethyl)phenyl]fulvene

A reaction vessel equipped with a dropping funnel was charged with 80 ml of dehydrated tetrahydrofuran and 2.0 ml (24.1 mmol) of cyclopentadiene under a nitrogen atmosphere. Then, 17.0 ml (26.5 mmol) of a 1.56 mol/L hexane solution of n-butyllithium was slowly added dropwise while cooling this solution to 0° C., and the mixture was stirred overnight at room temperature. Subsequently, the dropping funnel was charged with a solution prepared by dissolving 8.43 g (26.5 mmol) of 3,3'-(trifluoromethyl)benzophenone in 50 ml of dehydrated tetrahydrofuran. The solution was slowly added dropwise while cooling to 0° C. Thereafter, the mixture was left to stand and the temperature thereof was returned to room temperature. The mixture was then stirred for one day. This reaction solution was subjected to extraction with diethyl ether. The organic layer was washed with 1 N hydrochloric acid, a saturated aqueous solution of sodium hydrogen carbonate and saturated brine. The organic phase collected by separation was dried over anhydrous magnesium sulfate. Subsequently, magnesium sulfate was separated by filtration, and the filtrate was subjected to distillation under reduced pressure with use of a rotary evaporator to remove the solvent. The residue was purified using a silica gel column to obtain a target product (yield 4.14 g (47%)). The target product was identified by $^1$H-NMR.

$^1$H-NMR (270 MHz, CDCl$_3$, TMS): δ/ppm 6.17-6.21 (m, 2H), 6.64-6.66 (m, 2H), 7.44-7.58 (m, 6H), 7.68 (d, 2H, J=7.56 Hz).

(iii) Synthesis of di[m-(trifluoromethyl)phenyl]cyclopentadienyl(octamethyloctahydrodibenzofluorenyl)methane A reaction vessel equipped with a dropping funnel was charged with 30 m of dehydrated tetrahydrofuran and 0.82 g (2.11 mmol) of octamethyloctahydrodibenzofluorene under a nitrogen atmosphere. Then, 1.50 ml (2.32 mmol) of a 1.56 mol/L hexane solution of n-butyllithium was slowly added dropwise while cooling this solution to 0° C. Thereafter, the mixture was stirred overnight at room temperature. Subsequently, the dropping funnel was charged with a solution prepared by dissolving 1.00 g (2.32 mmol) of 6,6-di{m-(trifluoromethyl)phenyl}fulvene in 20 ml of dehydrated tetrahydrofuran. The solution was slowly added dropwise while cooling to −78° C. Thereafter, the mixture was stirred for one day while returning the temperature thereof slowly to room temperature. This reaction solution was subjected to extraction with diethyl ether. The organic layer was washed with 1 N hydrochloric acid, a saturated aqueous solution of sodium hydrogen carbonate and saturated brine. The organic phase collected by separation was dried over anhydrous magnesium sulfate, and magnesium sulfate was separated by filtration. The filtrate was subjected to distillation under reduced pressure with use of a rotary evaporator to remove the solvent. The residue was purified by using a silica gel column to obtain a target product (yield 0.74 g (47%)). The target product was identified by $^1$H-NMR and FD-MS spectroscopy.

$^1$H-NMR (270 MHz, CDCl$_3$, TMS): δ/ppm 0.94 (b, 5H), 1.14 (s, 6H) 1.21 (s, 7H), 1.26 (s, 7H), 1.62 (s, 8H), 3.14 (b, 2H), 5.46 (s, 1H), 6.48 (m, 2H), 7.06-7.28 (m, 12H).

MS (FD): m/z 752 (M$^+$).

(iv) Synthesis of di[m-(trifluoromethyl)phenyl]methylene(cyclopentadienyl)(octamethyloctahydrodibenzofluorenyl)zirconium dichloride Under a nitrogen atmosphere, 0.79 g (1.05 mmol) of di[m-(trifluoromethyl)phenyl]cyclopentadienyl(octamethyloctahydrodibenzofluorenyl)methane was added to 30 m of dehydrated diethyl ether. Then, 1.39 mL (2.20 mmol) of a 1.58 mol/L hexane solution of n-butyllithium was slowly added dropwise while cooling this solution to 0° C., and the mixture was stirred overnight. Subsequently, 438 mg (1.16 mmol) of zirconium tetrachloride.tetrahydrofuran complex (1:2) was added while cooling to −78° C., and the mixture was stirred overnight. The volatile fraction of this slurry was removed by distillation under reduced pressure. The residue was washed with 40 ml of dehydrated hexane, and the wash liquid was separated by filtration. The filtrate in which the hexane-solubles were dissolved was concentrated, dehydrated pentane was added to the resulting solids, and the solid was recrystallized to obtain a target product (yield 70 mg (7%)). The target product was identified by $^1$H-NMR and FD-MS spectroscopy.

$^1$H-NMR (270 MHz, CDCl$_3$, TMS): δ/ppm 0.827 (s, 6H), 0.93 (s, 6H), 1.42 (s, 6H), 1.49 (s, 6H), 1.60-1.69 (m, 8H), 5.52-5.56 (m, 2H), 6.042 (s, 1H), 6.088 (s, 1H), 6.32-6.38 (m, 2H), 7.56-7.66 (m, 4H), 8.09-8.12 (m, 4H), 8.16-8.25 (m, 2H).

MS (FD): m/z 912 (M$^+$).

Synthesis Example 2-2

Synthesis of di(p-chlorophenyl)methylene(cyclopentadienyl)(octamethyloctahydrodibenzofluorenyl) zirconium dichloride (i) Synthesis of 6,6-di(p-chlorophenyl)fulvene A reaction vessel equipped with a dropping funnel was charged with 40 ml of dehydrated tetrahydrofuran and 2.15 ml (25.9 mmol) of cyclopentadiene under a nitrogen atmosphere. Then, 18.0 mL (28.5 mmol) of a 1.58 mol/L hexane solution of n-butyllithium was slowly added dropwise while cooling this solution to 0° C., and the mixture was stirred. Subsequently, the dropping funnel was charged with a solution prepared by dissolving 5.00 g (19.9 mmol) of 4,4'-dichlorobenzophenone in 30 ml of dehydrated tetrahydrofuran was placed in. The solution was slowly added dropwise while cooling to −0° C. Thereafter, the mixture was left to stand and the temperature thereof was returned to room temperature. The mixture was then stirred for one day. This reaction solution was subjected to extraction with diethyl ether. The organic layer was washed with 1 N hydrochloric acid, a saturated aqueous solution of sodium hydrogen carbonate and saturated brine. The organic phase collected by separation was dried over anhydrous magnesium sulfate. Subsequently, magnesium sulfate was separated by filtration, and the filtrate was subjected to distillation under reduced pressure with use of a rotary evaporator to remove the solvent. The residue was purified by using a silica gel column to obtain a target product (yield 3.37 g (57%)). The target product was identified by $^1$H-NMR.

$^1$H-NMR (270 MHz, CDCl$_3$, TMS): δ/ppm 6.21-6.24 (m, 2H), 6.60-6.63 (m, 2H), 7.23 (d, 2H, J=8.1 Hz), 7.37 (d, 2H, J=8.6 Hz).

(ii) Synthesis of di(p-chlorophenyl)cyclopentadienyl (octamethyloctahydrodibenzofluorenyl)methane A reaction vessel equipped with a dropping funnel was charged with 40 ml of dehydrated tetrahydrofuran and 2.35 g (6.08 mmol) of octamethyloctahydrodibenzofluorene synthesized in Synthesis Example 2-1 under a nitrogen atmosphere. Then, 4.62 ml (7.30 mmol) of a 1.58 mol/L hexane solution of n-butyllithium was slowly added dropwise and while cooling this solution to 0° C., and the mixture was stirred. Then, 0.86 ml (7.90 mmol) of 1,3-dimethyl-2-imidazolidinone was added to the solution and the mixture was stirred for 30 minutes. Subsequently, the dropping funnel was charged with a solution prepared by dissolving 2.00 g (6.68 mmol) of 6,6-di{p-chlorophenyl}fulvene in 30 ml of dehydrated tetrahydrofuran. The solution was slowly added dropwise while cooling the solution to −78° C. The mixture was stirred for one day while returning the temperature thereof slowly to room temperature. This reaction solution was subjected to extraction with diethyl ether. The organic layer was washed with 1 N hydrochloric acid, a saturated aqueous solution of sodium hydrogen carbonate and saturated brine. The organic phase collected by separation was dried over anhydrous magnesium sulfate and magnesium sulfate was separated by filtration. The filtrate was subjected to distillation under reduced pressure using a rotary evaporator to remove the solvent. The residue was purified by using a silica gel column and recrystallized from toluene to obtain a target product (yield 0.714 g (17%)). The target product was identified by $^1$H-NMR and FD-MS spectroscopy.

$^1$H-NMR (270 MHz, CDCl$_3$, TMS): δ/ppm 0.94 (s, 6H), 1.14 (s, 6H), 1.27 (s, 12H), 1.62 (s, 8H), 3.06 (b, 2H), 5.30 (s, 1H), 6.38-6.50 (b, 3H), 7.00-7.29 (m, 8H).

MS (FD): m/z 684 (M$^+$).

(iii) Synthesis of di(p-chlorophenyl)methylene(cyclopentadienyl)(octamethyloctahydrodibenzofluorenyl)zirconium dichloride Under a nitrogen atmosphere, 428 mg (0.62 mmol) of di[p-chlorophenyl]cyclopentadienyl(octamethyloctahydrodibenzofluorenyl)methane was added to 15 ml of dehydrated diethyl ether. Then, 0.87 ml (1.37 mmol) of a 1.58 mol/L hexane solution of n-butyllithium was slowly added dropwise while cooling this solution to 0° C., and the mixture was stirred overnight. Subsequently, 224 mg (0.59 mmol) of zirconium tetrachloride.tetrahydrofuran complex (1:2) was added while cooling the mixture to −78° C., and the mixture was stirred overnight. The volatile fraction of this slurry was removed by distillation under reduced pressure. The residue was washed with 40 ml of dehydrated hexane, and the washed liquid was separated by filtration. The filtrate in which the hexane-solubles were dissolved was concentrated, dehydrated hexane was added to the resulting solids and the solid was recrystallized to obtain a target product (yield 90 mg (18%)). The target product was identified by $^1$H-NMR and FD-MS spectroscopy.

$^1$H-NMR (270 MHz, CDCl$_3$, TMS): δ/ppm 0.87 (s, 6H), 0.99 (s, 6H), 1.42 (s, 6H), 1.49 (s, 6H), 1.64-1.71 (m, 8H), 5.51-5.53 (m, 2H), 6.17 (s, 2H), 6.29-6.31 (m, 2H), 7.33 (dd, 2H, J=2.16 Hz, 8.37 Hz), 7.46 (dd, 2H, J=1.89 Hz, 8.64 Hz), 7.74 (dd, 2H, J=2.43 Hz, 8.1 Hz), 7.88 (dd, 2H, J=2.16 Hz, 8.37 Hz), 8.08 (s, 2H).

MS (FD): m/z 844 (M$^+$).

Synthesis Example 2-3

Synthesis of di(m-chlorophenyl)methylene(cyclopentadienyl)(octamethyloctahydrodibenzofluorenyl) zirconium dichloride (i) Synthesis of di(m-chloro)benzophenone To a 500-ml three-necked flask which was thoroughly purged with nitrogen and equipped with a dropping funnel and a magnetic stirrer, 7.51 g (31.5 mmol) of 1-chloro-3-iodobenzene and 40 ml of dehydrated diethyl ether were added, and the mixture was stirred. The mixture was cooled to −78° C., and 19.7 ml (31.5 mmol) of a 1.60 mol/L hexane solution of n-butyllithium was added over 10 minutes. The progress of reaction was confirmed by gas chromatography, and subsequently 1.98 g (12.6 mmol) of ethyl piperidine-1-carboxylate was added over 30 minutes. After the dropwise addition, the mixture was stirred at −78° C. for 30 minutes. Dilute hydrochloric acid was added to terminate the reaction. Then, 50 ml of diethyl ether was added, and the organic phase was collected by separation with a separatory funnel. The aqueous phase was subjected to extraction with 30 ml of diethyl ether. The organic phase was combined and washed two times with 50 ml of water and once with 50 ml of saturated brine. The organic phase collected by separation was dried over anhydrous magnesium sulfate. Then, magnesium sulfate was separated by filtration, and the filtrate was subjected to distillation under reduced pressure using a rotary evaporator to remove the solvent. The residue was purified by column chromatography to obtain a target product (yield 3.70 g (82%)). The target product was identified by $^1$H-NMR and FD-MS spectroscopy.

$^1$H-NMR (270 MHz, CDCl$_3$, TMS): δ/ppm 7.4-7.8 (m, Ph, 8H).

MS (FD): m/z 250 (M$^+$).

(ii) Synthesis of 6,6-di(m-chloro)phenylfulvene

To a 500-ml three-necked flask which was thoroughly purged with nitrogen and equipped with a dropping funnel and a magnetic stirrer, 3.80 g (15.0 mmol) of di(m-chloro)benzophenone and 20 ml of dehydrated tetrahydrofuran were added, and the mixture was stirred. To this solution, 11.25 ml (22.5 mmol) of a 2.0 mol/L tetrahydrofuran solution of sodium cyclopentadienide was added dropwise from the dropping funnel. After the dropwise addition, the mixture was stirred at 0° C. for 30 minutes. Then, 50 ml of a saturated aqueous solution of ammonium chloride and 50 ml of ether were added, and the organic phase was collected by separation with a separatory funnel. The aqueous phase was subjected to extraction with 30 ml of ether. The organic phases were combined and washed two times with 50 mL of water and once with 50 ml of saturated brine. The organic phase collected by separation was dried over anhydrous magnesium sulfate. Then, magnesium sulfate was separated by filtration, and the filtrate was subjected to distillation under reduced pressure using a rotary evaporator to remove the solvent. The residue was purified by column chromatography to obtain a target product (yield 3.70 g (82%)). The target product was identified by $^1$H-NMR and FD-MS spectroscopy.

$^1$H-NMR (270 MHz, CDCl$_3$, TMS): δ/ppm 6.2 (m Cp 2H), 6.6 (m, Cp, 2H), 7.1-7.4 (m, Ph, 10H).

MS (FD): m/z 299 (M$^+$).

(iii) Synthesis of di(m-chloro)phenylmethylene(cyclopentadienyl)(octamethyloctahydrodibenzofluorenyl)

To a 200-ml three-necked flask which was thoroughly purged with nitrogen and equipped with a three-way cock, a dropping funnel and a magnetic stirrer, 2.13 g (5.50 mmol) of octamethyloctahydrodibenzofluorene synthesized by the method described in Synthesis Example 2-1(i) and 80 ml of dehydrated tetrahydrofuran were added. The mixture was stirred with a magnetic stirrer, and the mixture was cooled to 0° C. To this mixture, 3.90 ml (6.01 mmol) of a 1.54 mol/L hexane solution of n-butyllithium was added, the ice bath was subsequently removed, and the mixture was stirred at room temperature for 4 hours. Thereafter, this slurry was cooled to −78° C., and then a solution prepared by dissolving 1.50 g (5.00 mmol) of 6,6-di(m-chloro)phenylfulvene in 10 mL of dehydrated tetrahydrofuran was added over 15 minutes. This mixture was stirred at −78° C. for 2 hours. This solution was quenched with 1 N hydrochloric acid, and the soluble fraction was extracted with 50 ml of diethyl ether. The organic phase collected by separation was washed with 100 ml of saturated brine, and then dried over anhydrous magnesium sulfate. Then, magnesium sulfate was separated by filtration, and the filtrate was subjected to distillation under reduced pressure using a rotary evaporator to remove the solvent. The resulting crude purification product was recrystallized from dichloromethane/methanol to obtain a target product (yield 3.40 g (91%)). The target product was identified by $^1$H-NMR and FD-MS spectroscopy.

$^1$H-NMR (270 MHz, CDCl$_3$, TMS): δ/ppm 0.9-1.5 (m, 24H), 1.6 (s+s, 8H), 3.0 (br, 2H), 5.4 (s+s, 1H), 6.2-6.5 (m(br), 3H), 7.0-7.4 (br+s, 12H).

MS (FD): M/z 684 (M$^+$).

(iv) Synthesis of di(m-chloro)phenylmethylene(cyclopentadienyl)(octamethyloctahydrodibenzofluorenyl)zirconium dichloride To a 30-ml Schlenk flask which was thoroughly purged with nitrogen and equipped with a dropping funnel and a magnetic stirrer, 1.37 g (2.00 mmol) of di(m-chloro)phenylmethylene(cyclopentadienyl)(octamethyloctahydrodibenzofluorenyl) and 15 ml of dehydrated diethyl ether were added. The mixture was stirred with a magnetic stirrer, and then cooled to −78° C. To this mixture, 2.90 ml (4.47 mmol) of a 1.54 mol/L hexane solution of n-butyllithium was added. Then, the temperature was gradually increased, and the mixture was stirred at room temperature for 22 hours. This slurry was cooled again to −78° C., and 0.73 g (1.94 mmol) of zirconium tetrachloride.tetrahydrofuran complex (1:2) was added. Subsequently, the mixture was stirred at room temperature for 19 hours. The volatile fraction of this slurry was removed by distillation under reduced pressure. Subsequently, the residue was washed with 40 ml of dehydrated hexane, and the insoluble was separated by filtration. The solution obtained by filtration was subjected to recrystallization using pentane to obtain a target product (yield 0.40 g (24%)). The target product was identified by FD-MS spectroscopy.

MS (FD): M/z 845 (M+).

Synthesis Example 2-4

Synthesis of di(p-chlorophenyl)methylene(cyclopentadienyl)(2,7-diphenyl-3,6-di-t-butyl-fluorenyl)zirconium dichloride (i) Synthesis of 2,7-di-bromo-3,6-di-t-butyl-fluorene Under a nitrogen stream, a 300-ml three-necked flask was charged with 15.2 g (54.7 mmol) of 3,6-di-t-butyl-fluorene and 170 ml of propylene carbonate, and the mixture was stirred. To this solution, 20.5 g (115 mmol) of N-bromosuccinimide was added, and the mixture was heated and stirred at 80° C. for 5 hours. Subsequently, the mixture was left to be naturally cooled. The reaction solution was then added to 800 ml of water, and stirred at room temperature for 15 minutes. The solids precipitated were separated by filtration. The solids obtained were washed 5 times with 10 ml of ethanol. Subsequently, a mixed solution of hexane and a small amount of dichloromethane was added to these solids, and the mixture was heated to 60° C. to dissolve the solids completely.

Then, the solution was left to stand overnight at 20° C. Crystals precipitated were washed three times with 5 mL of hexane to obtain a target product (yield 21.2 g (76%)). The target product was identified by $^1$H-NMR and FD-MS spectroscopy.

$^1$H-NMR (270 MHz, CDCl$_3$, TMS): δ/ppm 1.5 (s, 18H), 3.7 (s, 2H), 7.7 (s, 2H), 7.8 (s, 2H).

MS (FD): M/z 436 (M+).

(ii) Synthesis of 2,7-diphenyl-3,6-di-t-butyl-fluorene

Under a nitrogen stream, a 300-mL three-necked flask was charged with 8.15 g (18.7 mmol) of 2,7-dibromo-3,6-di-t-butyl-fluorene and 1.08 g (0.93 mmol) of Pd(PPh$_3$), and further charged with 120 ml of 1,2-dimethoxyethane. The mixture was stirred at room temperature for 20 minutes. To this solution, 20 ml of an ethanol solution in which 5.01 g (41.1 mmol) of phenylboric acid was dissolved was added, and the mixture was stirred at room temperature for 20 minutes. Thereafter, 37.4 ml (74.8 mmol) of a 2.0 mol/L aqueous solution of sodium carbonate was added. Subsequently, the mixture was heated to reflux for 18 hours, left to be naturally cooled, and quenched with dilute hydrochloric acid in an ice bath. Thereafter, ether was added to extract the soluble fraction, and the organic layer was washed two times with a saturated aqueous solution of sodium hydrogen carbonate, two times with water, and two times with saturated brine, and then dried over magnesium sulfate. Then, magnesium sulfate was separated by filtration, and the filtrate distillation under reduced pressure using a rotary evaporator to remove the solvent. The resulting solids were purified by column chromatography to obtain a target product (yield 4.36 g (54%)). The target product was identified by $^1$H-NMR and FD-MS spectroscopy.

$^1$H-NMR (270 MHz, CDCl$_3$, TMS): δ/ppm 1.3 (s, 18H), 3.8 (s, 2H), 7.1 (s, 2H), 7.3 (s, 10H), 7.9 (s, 2H).

MS (FD): M/z 430 (M$^+$).

(iii) Synthesis of di(p-chlorophenyl)methylene(cyclopentadienyl)(2,7-diphenyl-3,6-di-t-butyl-fluorenyl)

Under a nitrogen atmosphere, a 200-ml three-necked flask was charged with 3.50 g (8.14 mmol) of 2,7-diphenyl-3,6-di-t-butyl-fluorene and 100 ml of dehydrated tetrahydrofuran, and the mixture was stirred. This solution was cooled in an ice bath, and 5.70 ml (8.89 mmol) of a 1.56 mol/L hexane solution of n-butyllithium was added dropwise. Subsequently, the mixture was stirred at room temperature for 3 hours. The resulting solution was cooled again to −40° C., 2.22 g (7.39 mol) of a dehydrated tetrahydrofuran solution of 6,6-di(p-chlorophenyl)fulvene synthesized by the procedure of Synthesis Example 2-2 (i) was added dropwise, and the mixture was stirred at room temperature for 5 hours. Subsequently, the mixture was quenched with a dilute aqueous solution of hydrochloric acid. Then, 100 ml of hexane was added to the reaction liquid to extract the soluble fraction. This organic layer was washed with a saturated solution of sodium hydrogen carbonate, water and saturated brine, and dried over magnesium sulfate. Thereafter, magnesium sulfate was separated by filtration, and the filtrate was subjected to distillation under reduced pressure using a rotary evaporator to remove the solvent. Subsequently, the residue was washed with hexane and methanol to obtain a target product (yield 3.20 g (54%)). The target product was identified by $^1$H-NMR, FD-MS spectroscopy. The target product was identified by $^1$H-NMR, FD-MS spectroscopy.

$^1$H-NMR (270 MHz, CDCl$_3$, TMS): δ/ppm 1.2 (s, 18H), 2.9 (s, 2H), 5.2 (s, 1H), 6.0 (d, 1H), 6.2 (d, 1H), 6.3 (s, 1H), 6.6 (s, 2H), 6.9 (s, 10H), 7.2-7.4 (m+s, 8H), 7.6 (s, 2H).

MS (FD): M/z 729 (M$^+$).

(iv) Synthesis of di(p-chlorophenyl)methylene(cyclopentadienyl)(2,7-diphenyl-3,6-di-t-butyl-fluorenyl)zirconium dichloride Under a nitrogen atmosphere, a 100-mL Schlenk flask was charged with 1.00 g (1.37 mmol) of di(p-chlorophenyl)methylene(cyclopentadienyl)(2,7-diphenyl-3,6-di-t-butyl-fluorenyl) and 60 ml of dehydrated diethyl ether were added, and the mixture was stirred. This solution was cooled in a dry ice/methanol bath, 1.80 ml (2.81 mmol) of a 1.56 mol/L hexane solution of n-butyllithium was added dropwise, and the mixture was stirred at room temperature for 20 hours. Subsequently, the mixture was cooled to −60° C. in a dry ice/methanol bath. Then, 0.37 g (1.59 mmol) of zirconium tetrachloride was added, and the mixture was stirred at room temperature for 20 hours. This solution was subjected to distillation under reduced pressure to remove the organic solvent. Subsequently, the residue was extracted with dehydrated hexane and dehydrated dichloromethane, and recrystallized from the respective solutions to obtain a target product (yield 0.47 g (38%)). The target product was identified by $^1$H-NMR.

$^1$H-NMR (270 MHz, CDCl$_3$, TMS): δ/ppm 1.2 (s, 18H), 5.4 (m, 2H), 5.8 (s, 2H), 6.3 (m, 2H), 7-7.2 (s+m+m, 6H), 7.5-7.7 (m, 12H), 8.3 (s, 2H).

Synthesis Example 2-5

Synthesis of di(p-chlorophenyl)methylene(cyclopentadienyl)(2,7-dimethyl-3,6-di-t-butyl-fluorenyl)zirconium dichloride (i) Synthesis of 2,7-dimethyl-3,6-di-t-butyl-fluorene Under a nitrogen stream, a 300-ml three-necked flask was charged with 5.03 g (11.5 mmol) of 2,7-dibromo-3,6-di-t-butyl-fluorene synthesized by the procedure of Synthesis Example 2-4(i) and 0.196 g (0.24 mmol) of PdCl$_2$(dppf).CH$_2$Cl$_2$, and further charged with 100 mL of dehydrated t-butylmethylether. The mixture was stirred at room temperature for 20 minutes. This solution was cooled in an ice bath, and 19.2 mL (57.6 mmol) of a 3.0 mol/L ether solution of methylmagnesium bromide was added dropwise over 15 minutes. Subsequently, a slurry solution obtained by heating to reflux for 5 days was left to be naturally cooled, and then quenched with cold 1 N hydrochloric acid in an ice bath. Subsequently, ether was added to extract the soluble fraction, and this organic layer was washed with a saturated aqueous solution of sodium hydrogen carbonate, water and saturated brine, and then dried over magnesium sulfate. Magnesium sulfate was separated by filtration, and the filtrate was subjected to distillation under reduced pressure using a rotary evaporator to remove the solvent. The residue was purified by column chromatography to obtain a target product (yield 2.07 g (63%)). The target product was identified by $^1$H-NMR and FD-MS spectroscopy.

$^1$H-NMR (270 MHz, CDCl$_3$, TMS): δ/ppm 1.5 (s, 18H), 2.5 (s, 6H), 3.7 (s, 2H), 7.2 (d, 2H), 7.7 (s, 2H).

MS (FD): M/z 306 (M$^+$).

(ii) Synthesis of di(p-chlorophenyl)methylene(cyclopentadienyl)(2,7-dimethyl-3,6-di-t-butyl-fluorenyl)

Under a nitrogen atmosphere, a 200-ml three-necked flask was charged with 2.60 g (8.49 mmol) of 2,7-dimethyl-3,6-dit-butyl-fluorene and 100 mL of dehydrated tetrahydrofuran, and the mixture was stirred. This mixed solution was cooled in an ice bath, and 5.70 ml (8.89 mmol) of a 1.56 mol/L hexane solution of n-butyllithium was added dropwise. The mixture was stirred at room temperature for 3 hours. Subsequently, the resulting solution was cooled to −40° C. in a dry ice/methanol bath, and 60 ml of a tetrahydrofuran solution in which 2.78 g (9.33 mmol) of 6,6-di(p-chlorophenyl)fulvene synthesized by the procedure of Synthesis Example 2-2(i) was dissolved was added dropwise. Subsequently, the mixture was stirred for 1 hour while gradually warming to room temperature. Then, 100 ml of 1 N hydrochloric acid and 100 ml of hexane was sequentially added to the reaction solution to extract the soluble fraction. This organic layer was washed with water and saturated brine, and then dried over magnesium sulfate. Then, magnesium sulfate was separated by filtration, and the filtrate was subjected to distillation under reduced pressure using a rotary evaporator to remove the solvent. The residue was recrystallized from hexane to obtain a target product (yield 4.40 g (86%)). The target product was identified by $^1$H-NMR and FD-MS spectroscopy.

$^1$H-NMR (270 MHz, CDCl$_3$, TMS): δ/ppm 1.3 (s, 18H), 2.3 (s, 6H), 3.0 (s, 2H), 5.2 (s, 2H), 6.1-6.3 (s, 4H), 6.7 (s, 2H), 7.0 (s, 6H), 7.4 (s, 2H)

MS (FD): M/z 604 (M$^+$).

(iii) Synthesis of di(p-chlorophenyl)methylene(cyclopentadienyl)(2,7-dimethyl-3,6-di-t-butyl-fluorenyl)zirconium dichloride Under a nitrogen atmosphere, a 100-ml Schlenk flask was charged with 1.00 g (1.65 mmol) of di(p-chlorophenyl)methylene(cyclopentadienyl)(2,7-dimethyl-3,6-di-t-butyl-fluorenyl) and 50 ml of dehydrated diethyl ether, and the mixture was stirred. This mixed slurry solution was cooled to −40° C. in a dry ice/methanol bath, and 2.20 ml (3.43 mmol) of a 1.56 mol/L hexane solution of n-butyllithium was added. The mixture was stirred for 22 hours while gradually warming to room temperature. This reaction liquid was cooled in a dry ice/methanol bath, and 0.38 g (1.65 mmol) of zirconium tetrachloride was added. Subsequently, the mixture was stirred for 20 hours while gradually warming to room temperature.

The solvent was removed by distillation under reduced pressure. Subsequently, about 30 ml of dehydrated hexane was added, and the mixture was stirred. Then, the insolubles were removed by separation by filtration and were dissolved in dehydrated methylene chloride. The insolubles were removed by separation by filtration. The hexane solution and the methylene chloride solution obtained by filtration were combined and concentrated, and then a powder precipitated with dehydrated hexane was separated by filtration. Finally, the powder was washed with dehydrated hexane and dehydrated pentane to obtain a target product (yield 0.122 g (10%)). The target product was identified by $^1$H-NMR and FD-MS spectroscopy.

$^1$H-NMR (270 MHz, CDCl$_3$, TMS): δ/ppm 1.5 (s, 18H), 2.3 (s, 6H), 5.6 (m, 2H), 6.0 (m, 2H), 6.3 (m, 2H), 7.3 (dd, 2H), 7.4 (dd, 2H), 7.7 (dd, 2H), 7.8 (dd, 2H), 8.1 (s, 2H)

MS (FD): M/z 764 (M$^+$).

Synthesis Example 2-6

Synthesis of (m-chlorophenyl)(phenyl)methylene(cyclopentadienyl)(octamethyloctahydrodibenzofluorenyl)zirconium dichloride (i) Synthesis of 6,6-(m-chlorophenyl)(phenyl)fulvene To a 500-ml three-necked flask which was thoroughly purged with nitrogen, and equipped with a three-way cock, a dropping funnel and a magnetic stirrer, 6.48 g (29.9 mmol) of (m-chlorophenyl)(phenyl)ketone and 100 ml of dehydrated tetrahydrofuran were added, and the mixture was stirred. To this solution, 22.5 ml (45 mmol) of a 2.0 M tetrahydrofuran solution of sodium cyclopentadienide was added dropwise from the dropping funnel, and the mixture was stirred for 4 hours at 0° C. Then, the reaction was terminated with dilute hydrochloric acid. Thereafter, 50 ml of diethyl ether was added, and the organic phase was collected by separation using a separatory funnel. The aqueous phase was subjected to extraction with 30 ml of diethyl ether. The organic phases were combined, and washed two times with 50 ml of a saturated aqueous solution of sodium hydrogen carbonate, once with 50 ml of saturated brine, and the organic phase was dried over magnesium sulfate. Then, magnesium sulfate was separated by filtration, and the filtrate was subjected to distillation under reduced pressure using a rotary evaporator to remove the solvent. The residue was purified by column chromatography to obtain a target product (yield 4.85 g (61%)). The target product was identified by $^1$H-NMR and FD-MS spectroscopy.

$^1$H-NMR (270 MHz, CDCl$_3$, TMS): δ/ppm 6.2 (m Cp 2H), 6.6 (m, Cp, 2H), 7.1-7.4 (m, Ph, 9H).

MS (FD): M/z 264 (M$^+$).

(ii) Synthesis of (m-chlorophenyl)(phenyl)methylene(cyclopentadienyl)(octamethyloctahydrodibenzofluorenyl)

To a 500-ml three-necked flask which was thoroughly purged with nitrogen, and equipped with a three-way cock, a dropping funnel and a magnetic stirrer, 6.73 g (17.4 mmol) of octamethyloctahydrodibenzofluorene synthesized by the method described in Synthesis Example 2-1(i) and 150 ml of dehydrated tetrahydrofuran were added, and the mixture was stirred. The mixture was cooled to 0° C., and 12.6 ml (20.1 mmol) of a 1.60 mol/L hexane solution of n-butyllithium was added. The resulting mixture was stirred for 4 hours at room temperature. The reaction liquid was cooled to −78° C., and then a solution prepared by dissolving 4.85 g (18.4 mmol) of 6,6-(m-chlorophenyl)(phenyl)fulvene in 30 ml of dehydrated tetrahydrofuran was added over 15 minutes. This mixture was stirred at −78° C. for 2 hours. This solution was quenched with a dilute aqueous solution of hydrochloric acid, and the soluble fraction was extracted with 50 ml of diethyl ether. The organic phase was collected, and washed two times with 50 ml of a saturated aqueous solution of sodium hydrogen carbonate and once with 50 mL of saturated brine. Then, magnesium sulfate was separated by filtration, and the filtrate was subjected to distillation under reduced pressure using a rotary evaporator to remove the solvent. The residue was subjected to column chromatography to obtain a target product (yield 3.10 g (26%)). The target product was identified by $^1$H-NMR and FD-MS spectroscopy.

$^1$H-NMR (270 MHz, CDCl$_3$, TMS): δ/ppm 0.9-1.5 (m, 24H), 1.6 (s+s, 8H), 3.0 (br, 2H), 5.4 (s+s, 1H), 6.2-6.5 (m(br), 3H), 7.0-7.4 (br+s, 13H)

MS (FD): M/z 650 (M$^+$).

(iii) Synthesis of (m-chlorophenyl)(phenyl)methylene(cyclopentadienyl)(octamethyloctahydrodibenzofluorenyl)zirconium dichloride To a 30-ml Schlenk flask which was thoroughly purged with nitrogen and equipped with a dropping funnel and a magnetic stirrer, 1.31 g (2.02 mmol) of di(m-chloro)phenylmethylene(cyclopentadienyl)(octamethyloctahydrodibenzofluorenyl) and 30 ml of dehydrated diethyl ether were added. The mixture was stirred with a magnetic stirrer, and then cooled to −78° C. To this mixture, 2.60 ml (4.20 mmol) of a 1.60 mmol/L hexane solution of n-butyllithium was added. Then, the mixture was gradually warmed to room temperature and stirred at room temperature for 22 hours. This slurry was cooled again to −78° C. Subsequently, 0.45 g (1.90 mmol) of zirconium tetrachloride was added, and the mixture was stirred at room temperature for 19 hours. The volatile fraction of this slurry was removed by distillation under reduced pressure. The residue was washed with 40 ml of dehydrated hexane, and the insolubles were separated by filtration. The solution obtained by filtration was subjected to recrystallization to obtain a target product (yield 0.12 g (7%)). The target product was identified by $^1$H-NMR and FD-MS spectroscopy.

$^1$H-NMR (270 MHz, CDCl$_3$, TMS): δ/ppm 0.8 (s, 6H), 0.9 (s, 6H), 1.4 (s, 6H), 1.5 (s, 6H), 1.6-1.7 (m, 8H), 5.6 (dd, 2H), 6.2 (s, 2H), 6.3 (dd, 2H), 7.2-7.5 (m, 5H), 7.9 (d, 2H), 8.0 (d, 2H), 8.1 (s, 2H).

MS (FD): M/z 811 (M$^+$).

Synthesis Example 2-7

Synthesis of di(2-naphthyl)methylene(cyclopentadienyl)(octamethyloctahydrodibenzofluorenyl)zirconium dichloride (i) Synthesis of 6,6-di-2-naphthylfulvene A 200-ml two-necked flask equipped with a magnetic stirrer and a three-way cock was thoroughly purged with nitrogen, and sequentially charged with 1.55 g (5.48 mmol) of di-2-naphthyl ketone produced by the method described in Heterocycles, vol. 40, No. 1, 79-83 (1995) and 40 ml of tetrahydrofuran. Then, 5.50 ml (11.0 mmol) of a 2.0 mol/l cyclopentadienyl sodium/tetrahydrofuran solution was gradually added while cooling the mixture in an ice water bath, and then the mixture was stirred at room temperature for 65 hours under a nitrogen atmosphere. Subsequently, 100 ml of 3 N hydrochloric acid and 100 ml of diethyl ether were gradually added. The two-layered solution thus obtained was transferred to a 300-ml separatory funnel and the funnel was shaken several times. The aqueous layer was then removed. This aqueous layer was subjected to extraction with 30 ml of diethyl ether once, and the extract was combined with the organic layer obtained previously. Subsequently, the organic layer obtained was washed 3 times with 100 ml of water and once with 100 ml of saturated brine, and dried over anhydrous magnesium sulfate for 2 hours. The solids were separated by filtration, and the solvent was distilled off to obtain solids. The solids were purified by separation using silica gel chromatography to obtain a target product (yield 1.21 g (67%)). The target product was identified by $^1$H-NMR spectroscopy.

$^1$H-NMR (270 MHz, CDCl$_3$, TMS): δ/ppm 6.3-6.5 (m, Cp, 2H), 6.6-6.7 (m, Cp, 2H), 7.3-7.5 (m, Ar, 2H), 7.5-7.6 (m, Ar, 4H), 7.7-7.9 (m, Ar, 8H).

(ii) Synthesis of di-2-naphthyl(cyclopentadienyl)(octamethyloctahydrodibenzofluorenyl)methane A 200-ml two-necked flask equipped with a magnetic stirrer, a three-way cock and a 100-ml dropping funnel was thoroughly purged with nitrogen, and sequentially charged with 1.35 g (3.48 mmol) of octamethyloctahydrodibenzofluorene and 40 mL of tetrahydrofuran. Then, 2.30 ml (3.60 mmol) of a 1.58 mol/l n-butyllithium/hexane solution was gradually added while cooling the mixture in an ice water bath, and then the mixture was stirred at room temperature for 20 hours under a nitrogen atmosphere. Subsequently, 1.18 g (3.57 mmol) of 6,6-di-2-naphthylfulvene dissolved in 30 ml of tetrahydrofuran in advance was gradually added over 30 minutes while cooling the mixture in a methanol/dry ice bath. The mixture was gradually warmed to room temperature, and stirred for 20 hours at room temperature under a nitrogen atmosphere. Then, 100 ml of 1 N hydrochloric acid was gradually added, and subsequently 100 ml of diethyl ether was added. The two-layered solution thus obtained was transferred to a 300-ml separatory funnel and the funnel was shaken several times. The aqueous layer was then removed. Subsequently, the organic layer obtained was washed 2 times with 100 ml of water and once with 100 ml of saturated brine, and dried over anhydrous magnesium sulfate for 3 hours. The solids were separated by filtration, and the solvent was distilled off. The residue was purified by separation using silica gel chromatography to obtain a target product (yield 1.28 g (51%)). The target product was identified by $^1$H-NMR and FD-MS spectroscopy.

$^1$H-NMR (270 MHz, CDCl$_3$, TMS): δ/ppm 1.1-1.3 (m, Me(OMOHDBFlu), 24H), 1.4-1.7 (br, CH$_2$(OMOHDBFlu), 8H), 2.8-3.2 (br, CH$_2$(Cp), 1H), 5.56 (s, CH(9-OMOHDBFlu), 1H), 6.1-6.5 (br, Cp, 4H), 7.1-8.0 (br, Ar(OMOHDBFlu) & Ar(Nap), 18H)

MS (FD): M/z 716 (M$^+$).

(iii) Synthesis of di(2-naphthyl)methylene(cyclopentadienyl)(octamethyloctahydrodibenzofluorenyl) zirconium dichloride A 100-ml gilder flask equipped with a magnetic stirrer was thoroughly purged with nitrogen, and sequentially charged with 0.50 g (0.70 mmol) of di(2-naphthyl)(cyclopentadienyl)(octamethyloctahydrodibenzofluorenyl)methane and 40 ml of diethyl ether. Then, 0.92 ml (1.5 mmol) of a 1.58 mol/l n-butyllithium/hexane solution was gradually added while cooling the mixture in an ice water bath, and the mixture was stirred at room temperature for 24 hours under a nitrogen atmosphere. Thereafter, 0.25 g (0.67 mmol) of a zirconium tetrachloride.tetrahydrofuran complex (1:2) was added while maintaining the mixture cool in a methanol/dry ice bath. Subsequently, the mixture was gradually warmed to room temperature, and stirred at room temperature for 24 hours under a nitrogen atmosphere. The solid obtained by distilling off the solvent under reduced pressure was subjected to extraction with pentane under a nitrogen atmosphere, and the extract was again left to stand at −18° C. for one day. White solids precipitated were separated by filtration, and the filtrate was left to stand for another day at −18° C. White solids precipitated were again separated by filtration, the filtrate obtained was subjected to distillation under reduced pressure to remove the solvent, thereby obtaining a target product as a red peach-colored solid (yield 0.35 g (58%)). The target product was identified by $^1$H-NMR and FD-MS spectroscopy.

$^1$H-NMR (270 MHz, CDCl$_3$, TMS): δ/ppm 0.6-1.8 (m, Me(OMOHDBFlu) & CH$_2$(OMOHDBFlu), 32H), 5.5-6.4 (m, Cp, 4H), 7.3-8.6 (m, Ar, 18H).

MS (FD): M/z 876 (M$^+$).

Synthesis Example 2-8

Synthesis of bis(4-biphenyl)methylene(cyclopentadienyl)(octamethyloctahydrodibenzofluorenyl)zirconium dichloride (i) Synthesis of 6,6-bis(4-biphenyl)fulvene A reaction vessel thoroughly purged with nitrogen was charged with tetrahydrofuran (60 ml) and cyclopentadiene 2.47 ml (29.9 mmol). Then, 19.6 ml (30.8 mmol) of 1.57 mol/l n-butyllithium/hexane solution was added while cooling this solution in a dry ice/methanol bath and the mixture was stirred overnight while gradually warming to room temperature. A solution prepared by dissolving 10 g (29.9 mmol) of 4,4'-diphenylbenzophenone in tetrahydrofuran (50 ml) was slowly added dropwise using a dropping funnel while cooling the reaction solution to 0° C., and then the mixture was stirred at room temperature for 3 days. This reaction liquid was subjected to extraction with diethyl ether. The organic layer was washed with a saturated aqueous solution of ammonium chloride, water and saturated brine, and dried over magnesium sulfate. The solvent was removed by distillation under reduced pressure. The residue was purified by separation using silica gel chromatography to obtain a target product (yield 0.80 g (7%)). The target product was identified by $^1$H-NMR spectrometry.

$^1$H-NMR (270 MHz, CDCl$_3$, TMS): δ/ppm 6.3-6.4 (m, 2H, Cp), 6.6-6.7 (m, 2H, Cp), 7.3-7.5 (m, 10H, Ar), 7.6-7.7 (m, 8H, Ar).

(ii) Synthesis of bis(4-biphenyl)cyclopentadienyl (octamethyloctahydrodibenzofluorenyl)methane A reaction vessel was charged with t-butylmethylether (60 ml) and 2.09 g (5.41 mmol) of octamethyloctahydrodibenzofluorene under a nitrogen atmosphere. Then, 3.90 ml (6.14 mmol) of a 1.58 mol/l n-butyllithium/hexane solution was slowly added dropwise while cooling this solution to 0° C. and the mixture was stirred. Thereafter, 1.38 g (3.61 mmol) of solid 6,6-bis(4-biphenyl)fulvene was added while cooling this solution to -78° C., and the mixture was stirred for one day while slowly warming to room temperature. This reaction liquid was subjected to extraction with diethyl ether. The organic layer was washed with 1 N hydrochloric acid, a saturated aqueous solution of sodium hydrogen carbonate and saturated brine, and dried over magnesium sulfate. The solvent was removed by distillation under reduced pressure. The residue was purified by separation using a silica gel column and recrystallized from n-hexane to obtain a target product (yield 1.15 g (41%)). The target product was identified by $^1$H-NMR and FD-MS spectroscopy.

$^1$H-NMR (270 MHz, CDCl$_3$, TMS): δ/ppm 0.93 (b, 6H), 1.12 (b, 6H), 1.24 (s, 6H), 1.26 (s, 6H), 1.61 (b, 8H), 2.93-3.05 (b, 2H), 5.44 (s, 1H), 6.34 (b, 3H), 7.30-7.64 (m, 22H).

MS (FD): M/z 768 (M$^+$).

(iii) Synthesis of bis(4-biphenyl)methylene(cyclopentadienyl)(octamethyloctahydrodibenzofluorenyl) zirconium dichloride Under a nitrogen atmosphere, 0.50 g (0.65 mmol) of bis(4-biphenyl)cyclopentadienyl(octamethyloctahydrodibenzofluorenyl)methane was added to a diethyl ether solvent (20 mL). Then, 0.91 ml (1.43 mmol) of a 1.58 mol/l n-butyllithium/hexane solution was slowly added dropwise while cooling this solution to 0° C., and the mixture was stirred overnight. Subsequently, 0.23 g (0.62 mmol) of zirconium tetrachloride.tetrahydrofuran complex (1:2) was added while cooling to -78° C., and the mixture was stirred overnight. The solids obtained by distilling off the solvent under reduced pressure was dissolved in hexane under a nitrogen atmosphere, the liquid was passed through a glass filter filled with Celite and insolubles were washed with hexane, and hexane-insolubles were washed with dichloromethane. The filtrate in which dichloromethane-solubles were dissolved was concentrated. The resultant was washed with diethyl ether and hexane, and dried to obtain a target product (yield 0.14 g (24%)). The target product was identified by $^1$H-NMR and FD-MS spectroscopy.

$^1$H-NMR (270 MHz, CDCl$_3$, TMS): δ/ppm 0.84 (s, 6H), 0.97 (s, 6H), 1.43 (s, 6H), 1.50 (s, 6H), 1.60-1.71 (m, 8H), 5.62-5.64 (m, 2H), 6.27 (s, 2H), 6.31-6.33 (m, 2H), 7.26-7.47 (m, 6H), 7.56-7.61 (m, 6H), 7.71 (dd, 2H, J=1.89 Hz, 7.83 Hz), 7.97 (dd, 2H, J=2.16 Hz, 8.1 Hz), 8.05-8.09 (m, 4H).

MS (FD): M/z 928 (M$^+$).

Synthesis Example 2-9

Synthesis of bis(4-[p-trifluoromethylphenyl]-phenyl) methylene(cyclopentadienyl)(octamethyloctahydrodibenzofluorenyl)zirconium dichloride (i) 6,6-bis(4-bromo)fulvene Under a nitrogen stream, 80 ml of dried THF were added to 5.50 g (16.2 mmol) of 4,4'-dibromobenzophenone and the mixture was stirred. At -78° C., 9.70 ml (19.4 mmol) of a 2.0 mol/l cyclopentadienyl sodium/tetrahydrofuran solution was gradually added dropwise. The temperature of the mixture was warmed to -10° C. and the mixture was then stirred for 3 hours. When completion of the reaction was checked, the reaction was terminated with 1 N hydrochloric acid. Liquid-liquid phase separation was performed, and the aqueous layer was subjected to extraction with diethyl ether two times. The extract was combined with the organic layer previously obtained, and the liquid was washed with a saturated aqueous solution of sodium hydrogen carbonate, water and saturated brine, and then dried over magnesium sulfate. The solvent was distilled off, and the residue was subjected to separation by silica gel chromatography to obtain a target product (yield 5.20 g (83%)). The target product was identified by $^1$H-NMR and FD-MS spectroscopy.

$^1$H-NMR (270 MHz, CDCl$_3$, TMS): δ/ppm 6.22 (d, 2H), 6.63 (d, 2H), 7.14 (d, 4H), 7.54 (d, 4H).

MS (FD): M/z 386 (M$^+$).

(ii) Synthesis of 6,6-bis(4-[p-trifluoromethylphenyl]-phenyl)fulvene

Under a nitrogen stream, 100 ml of methanol was added to 1.28 g (3.30 mmol) of 6,6-bis(4-bromo)fulvene, and the mixture was stirred. Then, 1.68 g (8.80 mmol) of 4-(trifluoromethyl)phenylboric acid, 0.21 g (0.165 mmol) of tetrakistriphenylphosphinepalladium and 2.09 g (1.98 mmol) of sodium carbonate were added, and the mixture was stirred at 65° C. for 2 hours. Liquid-liquid phase separation was performed using water and dichloromethane, and the aqueous layer was subjected to extraction with dichloromethane two times. The extract was washed with saturated brine and dried over magnesium sulfate. The solvent was distilled off, and the residue was subjected to separation by silica gel chromatography to obtain a target product (yield 1.38 g (81%)). The target product was identified by $^1$H-NMR and FD-MS spectroscopy.

$^1$H-NMR (270 MHz, CDCl$_3$, TMS): δ/ppm 6.34 (d, 2H), 6.65 (d, 2H), 7.46 (d, 4H), 7.66 (d, 4H), 7.75 (t, 8H).

MS (FD): M/z 518 (M$^+$).

(iii) Synthesis of bis(4-[p-trifluoromethylphenyl]-phenyl)cyclopentadienyl(octamethyloctahydrodibenzofluorenyl)methane Under a nitrogen atmosphere, 0.81 g (2.20 mmol) of octamethyloctahydrodibenzofluorene and 100 ml of dehydrated tert-butyl methyl ether were added, and the mixture was stirred. This solution was cooled to 0° C., and 1.59 ml (2.42 mmol) of a 1.52 mol/l hexane solution of n-butyllithium was added. Subsequently, the mixture was stirred at room temperature for 24 hours. The resulting solution was cooled to −78° C., and 1.04 g (2 mmol) of 6,6-bis(4-(p-trifluoromethylphenyl)-phenyl)fulvene was added. The mixture was stirred at room temperature for 3 hours. When the completion of reaction was checked, 1 N hydrochloric acid was added to the reaction solution to perform liquid-liquid phase separation. The aqueous layer was subjected to extraction with diethyl ether two times, and the extract was combined with the organic layer previously obtained. The liquid was washed with a saturated aqueous solution of sodium hydrogen carbonate, water and saturated brine, and dried over magnesium sulfate. The solvent was distilled off, and the residue was subjected to separation by silica gel chromatography to obtain a target product (yield 0.92 g (47%)). The target product was identified by $^1$H-NMR and FD-MS spectroscopy.

$^1$H-NMR (270 MHz, CDCl$_3$, TMS): δ/ppm 0.8-1.7 (m, 24H), 2.1-2.4 (br, 8H), 2.7-3.1 (br, 1H), 5.2-5.4 (m, 1H), 5.8-6.5 (br, 4H), 6.7-7.5 (br, 8H), 7.29 (s, 2H).

MS (FD): M/z 904 (M$^+$).

(iv) Synthesis of bis(4-[p-trifluoromethylphenyl]-phenyl)methylene(cyclopentadienyl)(octamethyloctahydrodibenzofluorenyl)zirconium dichloride Under a nitrogen atmosphere, 456 mg (0.50 mmol) of bis(4-[p-trifluoromethylphenyl]-phenyl)cyclopentadienyl (octamethyloctahydrodibenzofluorenyl)methane was added to 30 ml of diethyl ether, and this solution was cooled to −78° C. Then, 0.69 ml (1.05 mmol) of a 1.52 mol/L hexane solution of n-butyllithium was slowly added dropwise. The mixture was stirred for 19 hours while gradually warming to room temperature. Subsequently, the mixture was cooled again to −78° C., and 0.12 g (0.50 mmol) of zirconium tetrachloride was added. The mixture was stirred for 19 hours while gradually warming to room temperature. This reaction solution was concentrated, and dissolved in 30 mL of hexane under a nitrogen stream. The liquid in which hexane-solubles were dissolved was concentrated, and recrystallization from 10 ml of pentane was performed. Impurities were removed to obtain a target product (yield 0.08 g (15%)). The target product was identified by $^1$H-NMR and FD-MS spectroscopy.

$^1$H-NMR (270 MHz, CDCl$_3$, TMS): δ/ppm 0.84 (s, 6H), 0.97 (s, 6H), 1.43 (s, 6H), 1.50 (s, 6H), 1.60-1.71 (m, 8H), 5.62-5.64 (m, 2H), 6.27 (s, 2H), 6.31-6.33 (m, 2H), 7.26-7.47 (m, 6H), 7.56-7.61 (m, 4H), 7.71 (dd, 2H), 7.97 (dd, 2H), 8.05-8.09 (m, 4H).

MS (FD): M/z 1062 (M$^+$).

Example 2-1

Synthesis of Syndiotactic Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of di[m-(trifluoromethyl)phenyl]methylene(cyclopentadienyl)(octamethyloctahydrodibenzofluorenyl)zirconium dichloride synthesized in Synthesis Example 2-1 had been contacted with 0.6 mmol, in terms of aluminum, of methylaluminoxane (manufactured by Tosoh Finechem Corporation). Polymerization was then performed for 15 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 54.0 g, and the polymerization activity was 108.0 kg-polymer/mmol-cat·hr. The polymer composition was 55.0 mol % of propylene content, 6.5 mol % of ethylene content, and 38.5 mol % of 1-butene content, and the intrinsic viscosity [η] was 2.79 dl/g.

Example 2-2

Synthesis of Syndiotactic Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of di(p-chlorophenyl)methylene(cyclopentadienyl)(octamethyloctahydrodibenzofluorenyl)zirconium dichloride synthesized in Synthesis Example 2-2 had been contacted with 0.6 mmol, in terms of aluminum, of methylaluminoxane (manufactured by Tosoh Finechem Corporation). Polymerization was then performed for 20 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 72.8 g, and the polymerization activity was 109.1 kg-polymer/mmol-cat·hr. The polymer composition was 53.0 mol % of propylene content, 10.0 mol % of ethylene content, and 37.0 mol % of 1-butene content, and the intrinsic viscosity [η] was 2.35 dl/g.

Example 2-3

Synthesis of Syndiotactic Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.004 mmol of di(m-chlorophenyl)methylene(cyclopentadienyl)(octamethyloctahydrodibenzofluorenyl)zirconium dichloride synthesized in Synthesis Example 2-3 had been contacted with 1.2 mmol, in terms of aluminum, of methylaluminoxane (manufactured by Tosoh Finechem Corporation). Polymerization was then performed for 35 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 65.4 g, and the polymerization activity was 28.0 kg-polymer/mmol-cat·hr. The polymer composition was 51.0 mol % of propylene content, 17.0 mol % of ethylene content, and 32.0 mol % of 1-butene content, and the intrinsic viscosity [η] was 2.48 dl/g.

Example 2-4

Synthesis of Syndiotactic
Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure to 6.1 kg/cm$^2$G, and then with ethylene to 6.2 kg/cm$^2$G. Subsequently, the polymerization vessel was charged with a toluene solution in which 0.002 mmol of di(p-chlorophenyl)methylene(cyclopentadienyl)(2,7-diphenyl-3,6-di-t-butyl-fluorenyl)zirconium dichloride synthesized in Synthesis Example 2-4 had been contacted with 0.6 mmol, in terms of aluminum, of methylaluminoxane (manufactured by Tosoh Finechem Corporation). Polymerization was then performed for 60 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 8.1 g, and the polymerization activity was 4.1 kg-polymer/mmol-cat·hr. The polymer composition was 61.0 mol % of propylene content, 2.0 mol % of ethylene content, and 37.0 mol % of 1-butene content, and the intrinsic viscosity [η] was 2.42 dl/g.

Example 2-5

Synthesis of Syndiotactic
Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of di(p-chlorophenyl)methylene(cyclopentadienyl)(2,7-dimethyl-3,6-di-t-butyl-fluorenyl)zirconium dichloride synthesized in Synthesis Example 2-5 had been contacted with 0.6 mmol, in terms of aluminum, of methylaluminoxane (manufactured by Tosoh Finechem Corporation). Polymerization was then performed for 60 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 22.6 g, and the polymerization activity was 11.3 kg-polymer/mmol-cat·hr. The polymer composition was 51.0 mol % of propylene content, 8.0 mol % of ethylene content, and 41.0 mol % of 1-butene content, and the intrinsic viscosity [η] was 2.10 dl/g.

Example 2-6

Synthesis of Syndiotactic
Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of (m-chlorophenyl)(phenyl)methylene(cyclopentadienyl)(octamethyloctahydrodibenzofluorenyl)zirconium dichloride synthesized in Synthesis Example 2-6 had been contacted with 0.6 mmol, in terms of aluminum, of methylaluminoxane (manufactured by Tosoh Finechem Corporation). Polymerization was then performed for 15 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 30.4 g, and the polymerization activity was 26.1 kg-polymer/mmol-cat·hr. The polymer composition was 58.0 mol % of propylene content, 5.0 mol % of ethylene content, and 37.0 mol % of 1-butene content, and the intrinsic viscosity [η] was 2.29 dl/g.

Example 2-7

Synthesis of Syndiotactic
Propylene-Butene-Ethylene-Based Copolymer

In a 2000-ml polymerization apparatus which had been dried under reduced pressure and thoroughly purged with nitrogen, 700 ml of dry hexane, 120 g of 1-butene and triisobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of di(2-naphthyl)methylene(cyclopentadienyl)(octamethyloctahydrodibenzofluorenyl)zirconium dichloride synthesized in Synthesis Example 2-7 had been contacted with 0.6 mmol, in terms of aluminum, of methylaluminoxane (manufactured by Tosoh Finechem Corporation). Polymerization was then performed for 12 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130°

C. for 12 hours. The amount of the polymer obtained was 25.8 g, and the polymerization activity was 64.6 kg-polymer/mmol-cat·hr. The polymer composition was 56.5 mol % of propylene content, 7.0 mol % of ethylene content, and 36.5 mol % of 1-butene content, and the intrinsic viscosity [η] was 2.73 dl/g.

Example 2-8

Synthesis of Syndiotactic
Propylene-Butene-Ethylene-Based Copolymer

In a 2000-ml polymerization apparatus which had been dried under reduced pressure and thoroughly purged with nitrogen, 700 ml of dry hexane, 120 g of 1-butene and tri-isobutylaluminum (1.0 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.002 mmol of bis(4-biphenyl)methylene(cyclopentadienyl)(octamethyloctahydrodibenzofluorenyl)zirconium dichloride synthesized in Synthesis Example 2-8 had been contacted with 0.6 mmol, in terms of aluminum, of methylaluminoxane (manufactured by Tosoh Finechem Corporation). Polymerization was then performed for 30 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 40.1 g, and the polymerization activity was 40.1 kg-polymer/mmol-cat·hr. The polymer composition was 54.5 mol % of propylene content, 13.0 mol % of ethylene content, and 32.5 mol % of 1-butene content, and the intrinsic viscosity [η] was 2.44 dl/g.

Example 2-9

Synthesis of Syndiotactic
Propylene-Butene-Ethylene-Based Copolymer

In a 1500-ml polymerization apparatus which had been dried under reduced pressure and thoroughly purged with nitrogen, 525 ml of dry hexane, 90 g of 1-butene and triisobutylaluminum (0.75 mmol) were placed at normal temperature. Subsequently, the internal temperature of the polymerization apparatus was raised to 65° C., and propylene was introduced to raise the pressure in the system to 6.1 kg/cm$^2$G, and then with ethylene to 6.2 kg/cm$^2$G. Subsequently, the polymerization vessel was charged with a toluene solution in which 0.0015 mmol of bis(4-[p-trifluoromethylphenyl]-phenyl)methylene(cyclopentadienyl)(octamethyloctahydrodibenzofluorenyl)zirconium dichloride synthesized in Synthesis Example 2-9 had been contacted with 0.45 mmol, in terms of aluminum, of methylaluminoxane (manufactured by Tosoh Finechem Corporation). Polymerization was then performed for 30 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 16.9 g, and the polymerization activity was 22.5 kg-polymer/mmol-cat·hr. The polymer composition was 56.5 mol % of propylene content, 9.0 mol % of ethylene content, and 34.5 mol % of 1-butene content, and the intrinsic viscosity [η] was 2.48 dl/g.

Comparative Example 2-1

Synthesis of Syndiotactic
Propylene-Butene-Ethylene-Based Copolymer

In a 2000-ml polymerization apparatus which had been dried under reduced pressure and thoroughly purged with nitrogen, 100 ml of dry hexane, 480 g of 1-butene and tri-isobutylaluminum (1.0 mmol) were placed at normal temperature. Subsequently, the internal temperature of the polymerization apparatus was raised to 35° C., and propylene was introduced to raise the pressure in the system to 6.0 kg/cm$^2$G, and then with ethylene to 6.2 kg/cm$^2$G. Subsequently, the polymerization vessel was charged with a toluene solution in which 0.005 mmol of diphenylmethylene(cyclopentadienyl)(fluorenyl)zirconium dichloride had been contacted with 1.5 mmol, in terms of aluminum, of methylaluminoxane (manufactured by Tosoh Finechem Corporation). Polymerization was then performed for 5 minutes while maintaining the internal temperature at 35° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 36.1 g, and the polymerization activity was 86.7 kg-polymer/mmol-cat·hr. The polymer composition was 58.2 mol % of propylene content, 4.1 mol % of ethylene content, and 37.7 mol % of 1-butene content, and the intrinsic viscosity [η] was 2.69 dl/g.

Comparative Example 2-2

Synthesis of Syndiotactic
Propylene-Butene-Ethylene-Based Copolymer

In a 2000-ml polymerization apparatus which had been dried under reduced pressure and thoroughly purged with nitrogen, 100 ml of dry hexane, 240 g of 1-butene and tri-isobutylaluminum (1.0 mmol) were placed at normal temperature. Subsequently, the internal temperature of the polymerization apparatus was raised to 65° C., and propylene was introduced to raise the pressure in the system to 6.0 kg/cm$^2$G, and then with ethylene to 6.2 kg/cm$^2$G. Subsequently, the polymerization vessel was charged with a toluene solution in which 0.004 mmol of diphenylmethylene(cyclopentadienyl)(fluorenyl)zirconium dichloride had been contacted with 1.2 mmol, in terms of aluminum, of methylaluminoxane (manufactured by Tosoh Finechem Corporation). Polymerization was then performed for 15 minutes while maintaining the internal temperature at 65° C. and the ethylene pressure at 6.2 kg/cm$^2$G, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 82.6 g, and the polymerization activity was 82.6 kg-polymer/mmol-cat·hr. The polymer composition was 51.0 mol % of propylene content, 14.0 mol % of ethylene content, and 34.0 mol % of 1-butene content, and the intrinsic viscosity [η] was 1.60 dl/g.

Example III

Hereinafter, the present invention (3) will be described in more detail based on Examples, but the present invention is not intended to be limited to these Examples. The respective properties in Examples were measured in the following manner.

Intrinsic Viscosity [η]

Intrinsic viscosity [η] was a value measured at 135° C. using a decalin solvent. Specifically, about 20 mg of a polymerization powder, a pellet or a resin lump was dissolved in 15 ml of decalin, and the specific viscosity $\eta_{sp}$ was measured in an oil bath at 135° C. Thereafter, 5 ml of the decalin solvent was added to this decalin solution for dilution, and than the specific viscosity $\eta_{sp}$ was measured in the same manner. This dilution operation was additionally repeated two times, and the value of $\eta_{sp}/C$ of when the concentration (C) was extrapolated to 0 was determined as the intrinsic viscosity (see the following equation).

$$[\eta]=\lim(\eta_{sp}/C) \ (C \to 0)$$

Amount of N-Decane-Soluble Fraction 200 ml of n-decane was added to 5 g of a syndiotactic propylene polymer sample, and the polymer was heated at 145° C. for 30 minutes to be dissolved. The resulting solution was cooled to 20° C. over about 3 hours, and left to stand for 30 minutes. Subsequently, the precipitate (n-decane-insoluble fraction) was separated by filtration. The filtrate was poured to acetone of about 3-fold volume, and the components dissolved in n-decane were precipitated. The precipitate was separated by filtration from acetone, and then dried. On the other hand, although the filtrate was concentrated and dried, no residue was observed. The amount of the n-decane-soluble fraction was determined by the following equation:

Amount of n-Decane-soluble fraction (wt %)=[weight of precipitate/weight of sample]×100

Molecular Weight Distribution (Mw/Mn)

The molecular weight distribution (Mw/Mn) was measured in the following manner using gel permeation chromatograph Alliance GPC-2000 type manufactured by Waters Corp. The separation columns used were two TSKgel GNH6-HT columns and two TSKgel GNH6-HTL columns, and all of the columns had a size of 7.5 mm in diameter and 300 mm in length. The column temperature was set at 140° C., the mobile phase was o-dichlorobenzene (Wako Pure Chemical Industries, Ltd.) containing 0.025 wt % of BHT (Takeda Yakuhin Co., Ltd.) as an antioxidant, moving at a rate of 1.0 ml/min. The sample concentration was 15 mg/10 mL, the injection volume of a sample was 500 microliters, and a differential refractometer was used as the detector. For the standard polystyrene, a product by Tosoh Finechem Corporation was used for the molecular weight Mw<1000 and Mw>4×10$^6$, and a product by Pressure Chemical Company was used for the molecular weight 1000≤Mw≤4×10$^6$.

Contents of Ethylene, Propylene and α-Olefin in Polymer

Quantification of the contents of ethylene, propylene and α-olefin was determined as follows using a JNM GX-500 type NMR measuring apparatus manufactured by JEOL, Ltd. 0.35 g of a sample was dissolved in 2.0 ml of hexachlorobutadiene while heating. This solution was filtered through a glass filter (G2). Subsequently, 0.5 ml of deuterated benzene was added, and the mixture was placed in an NMR tube having an internal diameter of 10 mm. $^{13}$C-NMR measurement was performed at 120° C. The accumulation times were 10,000 or more. The composition of ethylene, propylene and α-olefin was quantified using the $^{13}$C-NMR spectrum obtained.

Melting Point (Tm), Heat of Fusion (ΔH).

Using DSCPyris1 or DSC7 manufactured by PerkinElmer Inc., about 5 mg of a sample was heated to 200° C., maintained for 10 minutes, and then cooled to 30° C. at 10° C./min, under a nitrogen atmosphere (20 ml/min). The temperature was maintained at 30° C. for 5 minutes and then heated to 200° C. at 10° C./min. The melting point was calculated from the apex of the crystal melting peak, and the heat of fusion was calculated from the integrated value of the peak.

When two peaks were observed for the propylene-based polymer described in the Examples of the present invention, in the case that the peak on the lower temperature side was designated as $Tm_1$ and the peak on the higher temperature side was designated as $Tm_2$, $Tm_2$ was considered as the Tm defined in the requirements [2-1] and [2-2].

Half-Crystallization Time ($t_{1/2}$)

About 5 mg of a sample was placed in an aluminum pan for exclusive use, and a DSC curve was obtained by heating the sample from 30° C. to 200° C. at a rate of 320° C./min, maintaining at 200° C. for 5 minutes, cooling from 200° C. to the isothermal crystallization temperature 110° C. at a rate of 320° C./min, maintaining at the respective isothermal crystallization temperature, using DSCPyris1 or DSC7 manufactured by PerkinElmer, Inc. From the DSC curve thus obtained, the half-crystallization time ($t_{1/2}$) was obtained. Here, the half-crystallization time ($t_{1/2}$) was determined from the initial time of the isothermal crystallization process (the time to reach the isothermal crystallization temperature from 200° C.) as t=0. For the composition of the present invention, $t_{1/2}$ was determined as described above. However, when crystallization did not occur at an isothermal crystallization temperature, for example, at 110° C., measurement was taken for convenience at several points in the range of not more than 110° C. of an isothermal crystallization temperature, and the half crystallization time ($t_{1/2}$) was determined from the extrapolated value.

MFR

MFR was measured at 230° C. under a load of 2.16 kgf, according to JIS K-6721.

Method for Producing Press Sheet for Various Measurements

Using a hydraulic hot press machine which was set at 200° C. and which was manufactured by Shinto Metal Industries, Ltd., sheet forming was performed at a pressure of 10 MPa. In the case of a sheet having a thickness of 0.5 to 3 mm (spacer shaped; four sheets of 80×80×0.5 to 3 mm were obtained from a plate of 240×240×2 mm), preheating was carried out for about 5 minutes to 7 minutes, and a pressure of 10 MPa was applied for 1 to 2 minutes. Subsequently, the sheet was compressed at 10 MPa using another hydraulic hot press machine which was set at 20° C. and which was manufactured by Shinto Metal Industries, Ltd., and the sheet was then cooled for about 5 minutes to produce a specimen for measurement. Here, a brass plate having a thickness of 5 mm was used for the thermal plate. The samples produced by the method described above were supplied as the specimens for various property evaluations.

Tensile Modulus

A press sheet having a thickness of 1 mm was punched using an O-dumbbell for No. JIS3 dumbbell according to JIS K6301, and the specimen was provided as evaluation sample. The measurement was performed at 23° C. under the condition that the span interval was 30 mm and the tensile rate was 30 mm/min.

Izod Impact Strength

According to ASTM D-256, a specimen of 12.7 mm (width)×3.2 mm (thickness)×64 mm (length) was punched out from a press sheet having a thickness of 3 mm, and a notch was inserted by machine processing. The Izod impact strength was measured at 0° C.

Softening Temperature from TMA Measurement

According to JIS K7196, using a specimen having a thickness of 1 mm, the measurement was performed under the condition that pressure applied to a planar indenter of 1.8 mmΦ was 2 kgf/cm$^2$ and heating rate was 5° C./min. The softening temperature (° C.) was determined from the TMA curve.

Method for Producing Sample for Internal Haze Measurement

In the case of a 1-mm thickness press sheet, a test sample was produced according to the method for producing a press sheet for various measurements described above. In the case of a 2-mm thickness injection molded specimen, molding was performed using an injection molding machine IS-55 manufactured by Toshiba Corp. to produce a specimen having a shape of angular plate with a size of 2 mm in thickness×120 mm in length×130 mm in width. The conditions of the molding were that resin temperature was 200° C., injection pressure was 1000 kgf/cm$^2$, and mold temperature was 40° C.

Internal Haze (%)

The internal haze (%) was measured using a press sheet having a thickness of 1 mm as the specimen, and using a digital turbidimeter "NDH-20D" manufactured by Nippon Denshoku Industries Co., Ltd.

Evaluation of Injection Moldability

The evaluation was performed using a 55-ton injection molding machine manufactured by Toshiba Corp. under the condition that resin temperature was 200° C., mold temperature was 40° C. and cool time was one of the 2 conditions, 20 seconds (condition 1) or 1 second (condition 1). Moldability was rated as follows. When injection molding was performed 5 times, the sample was peeled off from the mold with ejector pins and continuous operation was possible: ○, the sample was not peeled off from the mold all times: Δ, and the sample was not peeled off from the mold and continuous operation was impossible: x.

Catalyst Synthesis Example

Dibenzylmethylene(cyclopentadienyl)(3,6-ditert-butylfluorenyl)zirconium dichloride was produced by the method described in Synthesis Example 3 of JP-A No. 2004-189668.

Dibenzylmethylene(cyclopentadienyl)(2,7-diphenyl-3,6-ditert-butylfluorenyl)zirconium dichloride was produced in the same manner as in Synthesis Example [1-1].

Polymerization Example 3-1

Synthesis of Syndiotactic Propylene Polymer (A-1)

In a thoroughly nitrogen purged reaction bath having an internal volume of 3 m$^3$, 1000 L of n-heptane was placed, and 610 mL (0.93 mol) of a toluene solution of methylaluminoxane (Al=1.53 mol/l) was added dropwise at normal temperature. Meanwhile, in a thoroughly nitrogen purged side arm flask having an internal volume of 5 L, a magnetic stirrer was placed, and the flask was sequentially charged with 610 mL (0.93 mol) of a toluene solution of methylaluminoxane (Al=1.53 mol/l) and a toluene solution of 1.30 g (1.86 mmol) of dibenzylmethylene(cyclopentadienyl)(3,6-di-tert-butylfluorenyl)zirconium dichloride. The mixture was stirred for 20 minutes. This solution was introduced into the reaction bath, and then 3200 NL of hydrogen was supplied at 19 Nm$^3$/h over 10 minutes. Subsequently, polymerization was initiated while supplying propylene at 65 kg/h and supplying hydrogen at such a rate that the gas phase concentration inside the reaction bath would be 53 mol %. Propylene was continuously supplied at a rate of 65 kg/h while maintaining the gas phase concentration of hydrogen inside the reaction bath at 53 mol %, and polymerization was performed for 4 hours at 25° C. Then, a small amount of diethylene glycol monoisopropyl ether was added to terminate the polymerization. The polymer obtained was washed with 1.8 m$^3$ of heptane, and dried under reduced pressure at 80° C. for 15 hours to obtain a polymer in an amount of 100 kg. The polymerization activity was 13.4 kg-PP/mmol-Zr·hr, the polymer obtained had [η]=1.90 dl/g, $Tm_1$=152° C., $Tm_2$=158 C, and rrrr fraction=94%.

Polymerization Example 3-2

Synthesis of Syndiotactic Propylene Polymer (A-2)

In a thoroughly nitrogen purged glass autoclave having an internal volume of 500 ml was charged with 250 ml of toluene and then charged with propylene at a rate of 150 liters/hr, which was maintained at 25° C. for 20 minutes. Meanwhile, a magnetic stirrer was placed in a thoroughly nitrogen purged side arm flask having an internal volume of 30 ml, and the flask was sequentially charged with 5.00 mmol of a toluene solution of methylaluminoxane (Al=1.53 mol/l) and 5.0 μmol of a toluene solution of dibenzylmethylene(cyclopentadienyl)(2,7-diphenyl-3,6-di-tert-butylfluorenyl)zirconium dichloride. The mixture was stirred for 20 minutes. This solution was added to the toluene in the glass autoclave which had been charged with propylene, and polymerization was initiated. Propylene gas was continuously supplied at a rate of 150 liters/hr, polymerization was performed at 25° C. for 10 minutes under normal pressure. Thereafter, a small amount of methanol was added to terminate the polymerization. The polymer solution was added to an excess of methanol to precipitate a polymer. The polymer was then dried under reduced pressure at 80° C. for 12 hours to obtain a polymer in an amount of 6.95 g. The polymerization activity was 7.58 kg-PP/mmol-Zr·hr, the polymer obtained had [η]=2.90 dl/g, $Tm_1$=157° C., $Tm_2$=162° C., and rrrr fraction=95%.

Polymerization Example 3-3

Synthesis of Syndiotactic Propylene Polymer (A-3)

A thoroughly dried and nitrogen purged SUS autoclave having an internal volume of 2.0 L was charged with 1.0 L of heptane, and subsequently charged with propylene gas to 0.3 MPaG while stirring to be purged. This process was repeated three times. Meanwhile, in a thoroughly nitrogen purged side arm flask having an internal volume of 50 ml, a magnetic stirrer was placed, and the flask was sequentially charged with 1.80 mmol of a toluene solution of methylaluminoxane (Al=1.53 mol/l) and 1.8 μmol of a toluene solution of dibenzylmethylene(cyclopentadienyl)(2,7-diphenyl-3,6-di-tert-butylfluorenyl)zirconium dichloride. The mixture was stirred for 15 minutes. This solution was added to the heptane contained in the SUS autoclave which had been charged with propylene, and polymerization was initiated. Propylene gas was continuously supplied such that the pressure in the system was maintained at 0.2 MPaG, and polymerization was performed at 25° C. for 60 minutes. Thereafter, a small amount of methanol was added to terminate the polymerization. The resulting polymer was recovered from the heptane slurry by filtration, and dried under reduced pressure at 80° C. for 6 hours to obtain a polymer in an amount of 75.4 g.

Polymerization activity was 42.0 kg-PP/mmol-Zr·hr, the polymer obtained had [η]=2.4 dl/g, Tm=161° C., and rrrr fraction=97%.

Example 3-1

100 parts by weight of the syndiotactic polypropylene polymer obtained in Polymerization Example 3-1 was blended with, based on 100 parts by weight of the polymer, 0.1 part by weight of Tris(2,4-di-tert-buthylphenyl)phosphate as a secondary antioxidant, 0.1 part by weight of Benzenepropanoic acid, 3,5-bis(1,1-dimethylethyl)-4-hydroxy-, 2,2-bis [[3-[3,5-bis(1,1-dimethylethyl)-4-hydroxyphenyl]-1-oxo-propoxy]methyl]-1,3-propandiyl ester as a heat stabilizer, and 0.1 part by weight of calcium stearate as a neutralizer. Then, using a Laboplast Mill (twin screw batch type melt kneading apparatus) manufactured by Toyo Seiki Co., Ltd., and the composition was melt kneaded for 5 minutes under the conditions of set temperature of 200° C., amount of resin of 40 g (apparatus batch volume=60 cm$^3$) and 50 rpm. Subsequently, the composition was removed and molded into a sheet with a cold press set at 20° C., and the sheet was used as a sample for measurement after cutting into an appropriate size, or the like. Also, a press sheet was produced from the sample, and the properties thereof were measured. The results of various property tests are presented in Table 3-2. Besides, an equal amount of the additives were added to the polymer, and using a twin screw extruder BT-30 (30 mmΦ, L/D—46, co-rotation, four kneading zones) manufactured by Prabo Co., Ltd., the polymer was granulated under the conditions of set temperature of 230° C., extrusion amount of resin of 50 g/min, and 200 rpm. The granules were used in the injection molding evaluation test. The results are presented in Table 3-3. Compared to the products of Comparative Examples, the composition had excellent moldability and heat resistance, as well as an excellent balance between transparency, mechanical properties and strength.

Example 3-2

100 parts by weight of the syndiotactic polypropylene polymer obtained in Polymerization Example 3-2 was blended with, based on 100 parts by weight of the polymer, the same amounts of additives used in Example 1. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$) and 50 rpm. Subsequently, the composition was removed and molded into a sheet with a cold press set at 20° C. The sheet was used as a sample for measurement after cutting into an appropriate size, or the like. Also, a press sheet was produced from the specimen, and the properties thereof were measured. The results of various property tests are presented in Table 3-2. Compared to the products of Comparative Examples, the composition had excellent moldability and heat resistance, as well as an excellent balance between transparency, mechanical properties and strength.

Example 3-3

100 parts by weight of the syndiotactic polypropylene polymer (A-3) obtained in Polymerization Example 3-3 was blended with, based on 100 parts by weight the polymer, the same amounts of additives used in Example 3-1. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$) and 50 rpm. Subsequently, the composition was removed and molded into a sheet with a cold press set at 20° C. The sheet was used as a sample for measurement after cutting into an appropriate size, or the like. Also, a press sheet was produced from the sample, and the properties thereof were measured. The results of various property tests are presented in Table 3-2. Compared to the products of Comparative Examples, the composition had excellent moldability and heat resistance, as well as an excellent balance between transparency, mechanical properties and strength.

Comparative Example 3-1

A press sheet was produced using polypropylene 1471 pellets manufactured by TOTAL Corp., and the properties thereof were measured. The results of various property tests are presented in Table 3-2. The pellets were used in the injection molding evaluation test. The results are presented in Table 3-3. Compared to the products of Examples, the polymer had inferior moldability and heat resistance, as well as an inferior balance between mechanical properties and strength.

Comparative Example 3-2

A press sheet was produced using polypropylene F327 pellets manufactured by Prime Polymer Co., Ltd., and the properties thereof were measured. The results of various property tests are presented in Table 3-2. The pellets were used in the injection molding evaluation test. The results are presented in Table 3-3. Compared to the products of Examples, the polymer had inferior heat resistance, as well as an inferior balance between transparency, mechanical properties and strength.

TABLE 3-1

| | | Examples | | | Comparative Examples | |
|---|---|---|---|---|---|---|
| | | 3-1 | 3-2 | 3-3 | 3-1 | 3-2 |
| Melting point (Tm) | (° C.) | 152/158 | 157/162 | 161 | 113/125 | 137/145 |
| Crystallization temperature (Tc) | (° C.) | 104 | 110 | 111 | 66 | 99 |
| ΔH | (mJ/mg) | 60 | 59 | 68 | 33 | 66 |
| $t_{1/2}$ (110° C.) | (sec) | 138 | 98 | 86 | 22730 | 299 |
| r.r.r.r. | (%) | 94 | 95 | 97 | 69 | — |

TABLE 3-1-continued

Table 3-1

|  |  | Examples | | | Comparative Examples | |
|---|---|---|---|---|---|---|
|  |  | 3-1 | 3-2 | 3-3 | 3-1 | 3-2 |
| Amount of decane-soluble fraction | (%) | <0.5 | <0.5 | <0.5 | 25 | <0.5 |
| [η] | (dL/g) | 1.9 | 2.9 | 2.4 | 1.6 | 2.2 |
| Density | (g/cm³) | 0.882 | 0.883 | 0.881 | 0.877 | 0.898 |
| Mw/Mn |  | 2.0 | 2.0 | 2.0 | 2.0 | — |

TABLE 3-2

Table 3-2

|  |  | Examples | | | Comparative Examples | |
|---|---|---|---|---|---|---|
|  |  | 3-1 | 3-2 | 3-3 | 3-1 | 3-2 |
| Tensile modulus | (MPa) | 827 | 858 | 822 | 558 | 814 |
| Tensile break strength | (MPa) | 36 | 39 | 36 | 18 | 25 |
| Elongation | (%) | 577 | 592 | 512 | 535 | 1092 |
| Needle penetration temperature | (° C.) | 155 | 158 | 162 | 121 | 137 |
| Internal Haze, 1 mmt | (%) | 24 | 20 | 20 | 23 | 71 |

TABLE 3-3

Table 3-3

|  | Mold release characteristics test | |
|---|---|---|
|  | Condition 1 | Condition 2 |
| Example 3-1 | ◯ | ◯ |
| Example 3-2 | — | — |
| Comparative Example 3-1 | X | X |
| Comparative Example 3-2 | ◯ | ◯ |

Example IV

Hereinafter, the present invention (4) will be described in more detail based on Examples, but the present invention is not intended to be limited to these Examples. In the Examples, the respective properties were measured as follows.

Methods for Property Measurement

[Intrinsic Viscosity [η]]

Intrinsic viscosity [η] was measured by the same method as in Example III.

[Amount of n-Decane-Soluble Fraction]

Amount of n-decane-soluble fraction was measured by the same method as in Example III.

[Molecular Weight Distribution (Mw/Mn)]

Molecular weight distribution (Mw/Mn) was measured by the same method as in Example III.

[Contents of Ethylene, Propylene and α-Olefin in Polymer]

Quantification of the contents of ethylene, propylene and α-olefin was determined as follows using a JNM GX-400 type NMR measuring apparatus manufactured by JEOL, Ltd. 0.35 g of a sample was dissolved while heating in 2.0 ml of hexachlorobutadiene, and this solution was filtered through a glass filter (G2). Subsequently, 0.5 ml of deuterated benzene was added and the mixture was placed in an NMR tube having an internal diameter of 10 mm. $^{13}$C-NMR measurement was performed at 120° C. The accumulation times were 8,000 or more. The composition of ethylene, propylene and α-olefin was quantified using the $^{13}$C-NMR spectrum obtained.

[Melting Point (Tm) and Heat of Fusion (ΔH) of Component (AA)]

Melting point (Tm) and heat of fusion (ΔH) of component (AA) were measured by the same method as in Example III.

[Half-Crystallization Time ($t_{1/2}$)]

Half-crystallization time ($t_{1/2}$) was measured by the same method as in Example III.

[Glass Transition Temperature (Tg) and Melting Point (Tm) of Component (B2)]

About 5 mg of a sample was placed in an aluminum pan for measurement, and, using a DSC manufactured by Seiko Instruments, Inc., the sample was heated to 200° C. at a rate of 100° C./min, maintained at 200° C. for 5 minutes, cooled to −150° C. at a rate of 10° C./min, and then heated to 200° C. at a rate 10° C./min to obtain an endothermal curve. The glass transition temperature (Tg) and melting point (Tm) of component (B2) were determined from the endothermal curve thus obtained.

[MFR]

The MFR of the syndiotactic propylene polymer (AA) and propylene.α-olefin copolymer (B3) were measured at 230° C. under a load of 2.16 kg, according to JIS K-6721.

The MFR of the ethylene.butene copolymer (C0) was measured at 190° C. under a load of 2.16 kg, according to JIS K-6721.

[Method for Producing Press Sheet for Various Measurements]

A press sheet for various measurements was produced by the same method as in Example III.

[Tensile Modulus]

Tensile modulus was measured by the same method as in Example III.

[Izod Impact Strength]

Izod impact strength was measured by the same method as in Example III.

[Softening Temperature from TMA Measurement]

Softening temperature from TMA measurement was measured by the same method as in Example III.

[Internal Haze (%)]

The internal haze was measured using a specimen having a thickness of 1 mm, and using a digital turbidimeter "NDH-20D" manufactured by Nippon Denshoku Industries Co., Ltd.

[Gloss Change Rate (%) after Gakushin Abrasion]

The Gakushin abrasion testing machine manufactured by Toyo Seiki Co., Ltd., and a specimen having a thickness of 2 mm was used. The tip of a 45R SUS abrasion indenter 470 g was covered with a cotton fabric #10, and the sample was abraded under the conditions of 23° C., shuttling number of 100 times, shuttling rate of 33 times/min, and a stroke of 100 mm. The gloss change rate before and after the abrasion, ΔGloss, was determined as follows.

ΔGloss=(Gloss before abrasion−Gloss after abrasion)/ gloss before abrasion×100

[Permanent Set (%) after 200% Stretching]

A dumbbell specimen having a shape of length: 50 mm ($L_0$), length between marks: 15 mm, and width: 5 mm, and a thickness of 1 mmt, was mounted on a jig with a chuck interval of 30 mm, and 200% deformation (chuck interval: up to 90 mm) was applied at a stress rate of 30 mm/min, and then the length (L) resulting in zero stress during the process of unloading at the stress rate was measured. Permanent set (%)=L/$L_0$×100

[Evaluation of Film Formability]

Under the conditions of using a single screw extruder with 20 mmΦ·L/D=28, a die of 25 mmΦ, lip width of 250 mm, and processing temperature of 210° C., granulated pellets of the composition as a sample was extruded at a roll temperature of 40° C. and at a winding rate of 0.63 m/min to form a film having a thickness of 250 μm. The formability was rated as follows. No winding on the roll was occurred and continuous operation for 1 hour was possible: ○, some winding on the roll was occurred but operation was possible: Δ, and winding on the roll was occurred and continuous operation was impossible: x. The results are presented in Table 4-2.

Catalyst Synthesis Example

Synthesis Example 4-1

Dibenzylmethylene(cyclopentadienyl)(3,6-ditert-butylfluorenyl)zirconium dichloride was produced by the method described in Synthesis Example 3 of JP-A No. 2004-189666.

Synthesis Example 4-2

Dibenzylmethylene(cyclopentadienyl)(2,7-diphenyl-3,6-ditert-butylfluorenyl)zirconium dichloride was produced by the same method as in [Synthesis Example 1-1].

Synthesis Example 4-3

Di(p-chlorophenyl)methylene(cyclopentadienyl)(octamethyloctahydrodibenzofluorenyl)zirconium dichloride was produced by the same method as in Synthesis Example [2-2].

Synthesis Example 4-4

Synthesis of diphenylmethylene(3-tert-butyl-5-ethylcyclopentadienyl)(2,7-di-tert-butylfluorenyl)zirconium dichloride (i) Synthesis of 1-ethyl-3-tert-butylcyclopentadiene Under a nitrogen atmosphere, a 300 ml three-neck flask equipped with a magnetic stirrer chip and a three-way cock was charged with 200 ml of dehydrated diethyl ether and 52 ml (154 mmol) of diethyl ether solution of 3.0M ethyl magnesium bromide. In an ice-water bath, 17.8 g (129 mmol) of 3-tert-butylcyclopentenone was added dropwise over 1 hour and the resultant solution was further stirred at room temperature for 20 hours. Then, the reaction solution was poured into 100 ml of 2N hydrochloric acid. The organic layer was separated, and the aqueous layer was subjected to extraction with 50 ml of ether twice. The organic layers obtained were combined with the organic layer previously obtained, and the liquid was washed two times with a saturated aqueous solution of sodium hydrogencarbonate, two times with water, and once with saturated brine, and dried over magnesium sulfate. The solvent was distilled off, and then the residue was purified by column chromatography to obtain 20.2 g of a pale yellowy clear solution (75% GC purity). The yield was 78%. Identification was done by $^1$H-NMR spectrum. The measurement results are shown as follows.

$^1$H-NMR spectrum (270 MHz, CDCl$_3$, TMS standard): δ/ppm 6.19+6.05+5.81+5.77 (m+m+m+m, 2H), 2.91+2.85 (m+m, 2H), 2.48-2.27 (m, 2H), 1.15-1.08 (s+s+m, 12H)

(ii) Synthesis of 3-tert-butyl-1-ethyl-6,6-diphenylfulvene

Under a nitrogen atmosphere, a 300 ml three-neck flask equipped with a magnetic stirrer chip and a three-way cock was charged with 5.11 g (23.9 mmol) of 1-ethyl-3-tert-butylcyclopentadiene (75% GC purity) and 150 ml of THF. In the dry ice/methanol bath, 16 ml (25.2 mmol) of 1.56M n-butyllithium hexane solution was gradually added dropwise and the mixture was then stirred at room temperature for 20 hours. Then, 3.1 ml (28.8 mmol) of 1,3-dimethyl-2-imidazolidinone and 5.3 g (28.8 mmol) of benzophenone were sequentially added to the reaction solution obtained, and the solution was stirred for 48 hours under reflux. The reaction solution was poured into 100 ml of 2N hydrochloric acid. The organic layer was separated, and the aqueous layer was subjected to extraction with 50 ml of hexane twice. The organic layers obtained were combined with the organic layer previously obtained. The liquid was washed with a saturated aqueous solution of sodium hydrogencarbonate, water, and a saturated aqueous solution of sodium chloride, and dried over magnesium sulfate. The solvent was distilled off, and the residue was purified by column chromatography to obtain 4.2 g of an orange solid. The yield was 56%. Identification was done by $^1$H-NMR spectrum. The measurement results are shown as follows.

$^1$H-NMR spectrum (270 MHz, CDCl$_3$, TMS standard): δ/ppm 7.2-7.4 (m, 10H), 6.3 (m, 1H), 5.7 (m, 1H), 1.70+1.85 (q, 2H), 1.15 (s, 9H), 0.85 (t, 3H).

(iii) Synthesis of diphenylmethylene(3-tert-butyl-5-ethylcyclopentadienyl)(2,7-di-tert-butylfluorenyl)

A 200 ml three-neck flask equipped with a magnetic stirrer chip and a three-way cock was thoroughly purged with nitrogen, and 3.8 g of 2,7-di-tert-butylfluorene (13.7 mmol) was dissolved in 80 ml of dehydrated diethyl ether under a nitrogen atmosphere. In an ice-water bath, 9.2 ml of n-butyl lithium/hexane solution (1.56M: 14.3 mmol) was slowly added dropwise to the solution, and the mixture was then stirred at room temperature for 100 hours. To the reaction solution, 4.5 g of 3-tert-butyl-1-ethyl-6,6-diphenylfulvene (14.3 mmol) was added, and the mixture was then stirred under reflux for 30 hours. The reaction solution was poured into 100 ml of aqueous solution of 2N hydrochloric acid in an ice bath. Then, diethylether was added to separate the organic layer. The aqueous layer was subjected to extraction with 50 ml of diethyl ether twice. The organic layers were combined with the organic layer previously obtained, and the liquid was washed with a saturated aqueous solution of sodium hydrogencarbonate, water, and a saturated aqueous solution of sodium chloride, and then dried over magnesium sulfate. The solvent was distilled off, and the residue was purified by column chromatography to obtain 4.2 g of a white solid. The yield was 53%. Identification was done by FD-mass analysis spectrum (FD-MS). The measurement results are shown as follows.

FD-MS: m/z=592 (M$^+$)

(iv) Synthesis of diphenylmethylene(3-tert-butyl-5-ethylcyclopentadienyl)(2,7-di-tert-butylfluorenyl) zirconium dichloride A 100 ml Schlenk flask equipped with a magnetic stirrer chip and a three-way cock was thoroughly purged with nitrogen, and 1.0 g of diphenylmethylene(3-tert-butyl-5-ethylcyclopentadienyl)(2,7-di-tert-butylfluorenyl) (1.68 mmol) was dissolved in 40 ml of dehydrated diethylether under a nitrogen atmosphere. In an ice bath, 2.2 ml (3.4 mmol) of 1.56 M n-butyllithium hexane solution was gradually added dropwise to this solution, and then stirred at room temperature for 28 hours. This reaction solution was thoroughly cooled in a dry ice/methanol bath, and then 0.39 g of zirconium tetrachloride (1.68 mmol) was added. The solution was stirred for 48 hours while gradually warming to room temperature. Then, the solvent was distilled off under reduced pressure. The resulting product was reslurred in hexane, and the slurry was filtered with use of a diatomite-filled glass filter. A brown solid on the filter was separated through extraction with a small amount of dichloromethane. For the hexane solution and dichloromethane solution obtained, each solvent was distilled off under reduced pressure. The dark orange solids were each washed with a small amount of pentane and diethylether, and then dried under reduced pressure to obtain 140 mg (0.186 mmol) of a target compound as an orange solid. Identification was done by $^1$H-NMR spectrum and FD-mass analysis spectrum. The measurement results are shown as follows.

$^1$H-NMR spectrum (270 MHz, CDCl$_3$, TMS standard): δ/ppm 7.90-8.07 (m, 5H), 7.75 (m, 1H), 7.15-7.60 (m, 8H), 6.93 (m, 1H), 6.15-6.25 (m, 2H), 5.6 (d, 1H), 2.05+2.25 (q, 2H), 0.95-1.15 (s+t+s, 30H)

FD-MS: m/z=752 (M$^+$)

Polymerization Examples

Polymerization Example 4A-1

Synthesis of Syndiotactic Propylene Polymer (4A-1)

A thoroughly nitrogen purged glass autoclave having the internal volume of 500 ml was charged with 250 ml of toluene, and then charged with propylene at a rate of 150 liter/hour, which was kept at 25° C. for 20 minutes. Meanwhile, a magnetic stirrer was placed in a thoroughly nitrogen purged side arm flask having an internal volume of 30 ml, and the flask was sequentially charged with 5.00 mmol of a toluene solution of methylaluminoxane (Al=1.53 mol/l) and 5.0 μmol of a toluene solution of dibenzylmethylene(cyclopentadienyl)(3,6-di-tert-butylfluorenyl)zirconium dichloride. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 25° C. for 45 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 2.38 g. The polymerization activity was 0.63 kg-PP/mmol-Zr·hr. The polymer obtained had [η]=1.9 dl/g, Tm1=152° C., Tm2=158° C., rrrr=93.5%, and Mw/Mn=2.0. This procedure was repeated to obtain a required amount of the polymer, which was then used in Examples. In addition, for the evaluation of the film formability, a sample used was a polymer having the same TMA softening temperature, rrrr fraction, [η], and Mw/Mn as that of the above-mentioned polymer. The polymer was produced in accordance with the above-mentioned production process, but in a larger scale.

Polymerization Example 4A-2

Synthesis of Syndiotactic Propylene Polymer (4A-2)

A thoroughly nitrogen purged glass autoclave having an internal volume of 500 ml was charged with 250 ml of toluene, and then charged with propylene at a rate of 150 liter/hour, which kept at 25° C. for 20 minutes. Meanwhile, a magnetic stirrer was placed in a thoroughly nitrogen purged side arm flask having an internal volume of 30 ml, the flask was sequentially charged with 5.00 mmol of a toluene solution of methylaluminoxane (Al=1.53 mol/l) and 5.0 μmol of a toluene solution of dibenzylmethylene(cyclopentadienyl)(2,7-diphenyl-3,6-di-tert-butylfluorenyl)zirconium dichloride. The mixture was stirred for 20 minutes. This solution was then added to toluene in the glass autoclave which had been charged with propylene, and the polymerization was initiated. Propylene gas was continuously supplied at a rate of 150 liter/hour, and the polymerization was performed at 25° C. for 10 minutes under normal pressure. Thereafter, a small amount of methanol was added to terminate the polymerization. The polymer solution was added to an excessive amount of methanol to precipitate a polymer. The polymer was then dried under reduced pressure at 80° C. for 12 hours to obtain a polymer in an amount of 6.95 g. The polymerization activity was 7.58 kg-PP/mmol-Zr·hr. The polymer obtained had [η]=2.9 dl/g, Tm=162.0° C., and rrrr fraction=95.3%. This procedure was repeated to obtain a required amount of the polymer, which was then used in Examples.

Syndiotactic Propylene Polymer (4A-3)

Syndiotactic polypropylene (Trade Name: Finaplas 1471, MFR=5.0 g/10 min) produced by Total, Inc. was used in Examples. The properties are shown in Table 4-1.

Polymerization Example 4A-4

Synthesis of Syndiotactic Propylene Polymer (4A-4)

The syndiotactic propylene polymer (4A-4) (propylene homopolymer) was produced in accordance with the production process in Polymerization Example 4A-1, except that hydrogen was introduced (in other words, hydrogen was further supplied in the polymerization system). The polymer obtained had the same TMA softening temperature, rrrr fraction, and Mw/Mn as those of the polymer (4A-1), and had [η] of 1.4 dl/g. The properties of the polymer (4A-4) are shown in Table 4-4.

Polymerization Example 4A-5

Synthesis of Syndiotactic Propylene Polymer (4A-5)

The syndiotactic propylene polymer (4A-5) (propylene homopolymer) was produced in accordance with the production process in Polymerization Example 4A-1, except that hydrogen was introduced (in other words, hydrogen was further supplied in the polymerization system). The polymer obtained had the same TMA softening temperature, rrrr fraction, and Mw/Mn as those of the polymer (4A-1), and had [η] of 1.2 dl/g. The properties of the polymer (4A-5) are shown in Table 4-4.

Syndiotactic Propylene Polymer (4A-6)

Syndiotactic polypropylene (Trade Name: Finaplas 1571, MFR=9.1 g/10 min) produced by Total, Inc. was used in Examples. The properties are shown in Table 4-4.

Polymerization Example 4B-1

Synthesis of Propylene.α-Olefin Copolymer (4B-1)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 70° C., and propylene was introduced to raise the pressure in the system to 0.66 MPa, and ethylene was then introduced to adjust the pressure in the system to 1.36 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 15 minutes while maintaining the internal temperature at 70° C. and the pressure in the system at 1.36 MPa with ethylene, and 20 ml of methanol was added to the terminate polymerization. After depressurizing, the resulting polymer was precipitated from the polymerization solution in 4 L of methanol, and dried in a vacuum at 130° C. for 12 hours. The amount of the polymer obtained was 105 g, MFR was 0.7 (g/10 min), and [η] measured at 135° C. in decalin was 2.5 (dL/g). The polymer properties measured are shown in Table 4-1. The $rr_1$ value was 78%.

Polymerization Example 4B-2

Propylene.α-Olefin Copolymer (4B-2)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 70° C., and propylene was introduced to raise the pressure in the system to 0.64 MPa, and ethylene was then introduced to adjust the pressure in the system to 1.34 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 15 minutes while maintaining the internal temperature at 70° C. and the pressure in the system at 1.34 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the polymer obtained was 109 g, MFR was 0.6 (g/10 min), and [η] measured at 135° C. in decalin was 2.6 (dL/g). The polymer properties measured are shown in Table 4-1. The $rr_1$ value was 76%. This procedure was repeated to obtain a required amount of the polymer, which was then used in Examples. In addition, the polymer used in the evaluation of the film formability was produced in accordance with the above-mentioned production process, but in a large scale. The polymer had the same ethylene content, rr fraction, [η], and Mw/Mn as those of the above-mentioned polymer.

Polymerization Example 4B-3

Propylene.α-Olefin Copolymer (4B-3)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 70° C., and propylene was introduced to raise the pressure in the system to 0.67 MPa, and ethylene was then introduced to adjust the pressure in the system to 1.37 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.37 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the polymer obtained was 90 g, MFR was 1.0 (g/10 min), and [η] measured at 135° C. in decalin was 2.3 (dL/g). The $rr_1$ value was 75%. The polymer properties measured are shown in Table 4-1.

Polymerization Example 4B-4

Synthesis of Propylene.α-Olefin Copolymer (4B-4)

A 4000-ml polymerization apparatus thoroughly purged with nitrogen was charged with 1834 ml of dry hexane, 20 g of 1-butene, and triisobutylaluminum (1.0 mmol) at normal temperature. Subsequently, the internal temperature of the polymerization apparatus was raised to 70° C., and propylene was introduced to raise the pressure in the system to 0.63 MPa, and ethylene was then introduced to adjust the pressure in the system to 1.33 MPa. Subsequently, the polymerization vessel was charged with a toluene solution in which 0.001 mmol of di(p-chlorophenyl)methylene(cyclopentadienyl) (octamethyloctahydrodibenzofluorenyl)zirconium dichloride had contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.33 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the resulting polymer was 102 g, MFR was 1.0 (g/10 min), and [η] measured at 135° C. in decalin was 2.3 (dL/g). The polymer properties measured are shown in Table 4-1. The $rr_1$ value was 75%.

Polymerization Example 4B-5

Synthesis of Propylene.α-Olefin Copolymer (4B-5)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 50° C., and propylene was introduced to raise the pressure in the system to 0.67 MPa, and ethylene was then introduced to adjust the pressure in the system to 1.37 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 50° C. and the pressure in the system at 1.37 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the resulting polymer was 78 g, [η] measured at 135° C. in decalin was 3.5 (dL/g), and an ethylene content measured by $^{13}$C-NMR was 18 mol %. The polymer properties measured are shown in Table 4-4.

Details of the ethylene-butene copolymer (4C) and propylene polymers (4D-1) to (4D-8) are as follows.

Ethylene.Butene Copolymer (4C)

Described in Table 4-1, MFR=4.0 g/10 min

Propylene Polymer (4D-1)

PP produced by Prime Polymer Co., Ltd. (Trade Name: F102W, MFR=2.1 g/10 min)

Propylene Polymer (4D-2)

PP produced by Prime Polymer Co., Ltd. (Trade Name: J104W, MFR=5.2 g/10 min)

Propylene Polymer (4D-3)

PP produced by Prime Polymer Co., Ltd. (Trade Name: B101, MFR=0.7 g/10 min)

Propylene Polymer (4D-4)

PP produced by Prime Polymer Co., Ltd. (Trade Name: J106G, MFR=15.0 g/10 min)

Propylene Polymer (4D-5)

PP produced by Prime Polymer Co., Ltd. (Trade Name: J107G, MFR=30.0 g/10 min)

Propylene Polymer (4D-6)

PP produced by Prime Polymer Co., Ltd. (Trade Name: J108M, MFR=45.0 g/10 min)

Propylene Polymer (4D-7)

Synthesis of Propylene.Ethylene.Butene Copolymer

A 4000-ml polymerization apparatus thoroughly purged with nitrogen was charged with 1834 ml of dry hexane, 110 g of 1-butene, and triisobutylaluminum (1.0 mmol) at normal temperature. Subsequently, the internal temperature of the polymerization apparatus was raised to 55° C., and propylene was introduced to raise the pressure in the system to 0.58 MPa, and ethylene was then introduced to adjust the pressure in the system to 0.75 MPa. Subsequently, the polymerization vessel was charged with a toluene solution in which 0.001 mmol of diphenylmethylene(3-tert-butyl-5-ethylcyclopentadienyl)(2,7-di-tert-butylfluorenyl)zirconium dichloride synthesized in Synthesize Example 4-4 had been contacted with 0.3 mmol, in terms of aluminum, of methylaluminoxane (manufactured by Tosoh Finechem Corporation). Polymerization was then performed for 25 minutes while maintaining the internal temperature at 55° C. and the pressure in the system at 0.75 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the resulting polymer was 120.2 g and MFR was 0.7 (g/10 min). The polymer properties measured are shown in Table 4-5.

Propylene Polymer (4D-8)

The polymer (4D-8) was produced in accordance with the process condition of producing the polymer 4D-7, except that the polymerization temperature was changed to 40° C. The polymer had the same ethylene content and butene content as those of the polymer (4D-7), and had [η] of 4.0 dl/g and Mw/Mn of 2.1. The properties of the polymer obtained are shown in Table 4-5.

The properties of the propylene polymers (4D-1) to (4D-8) are shown in Table 4-5.

Figure 3:
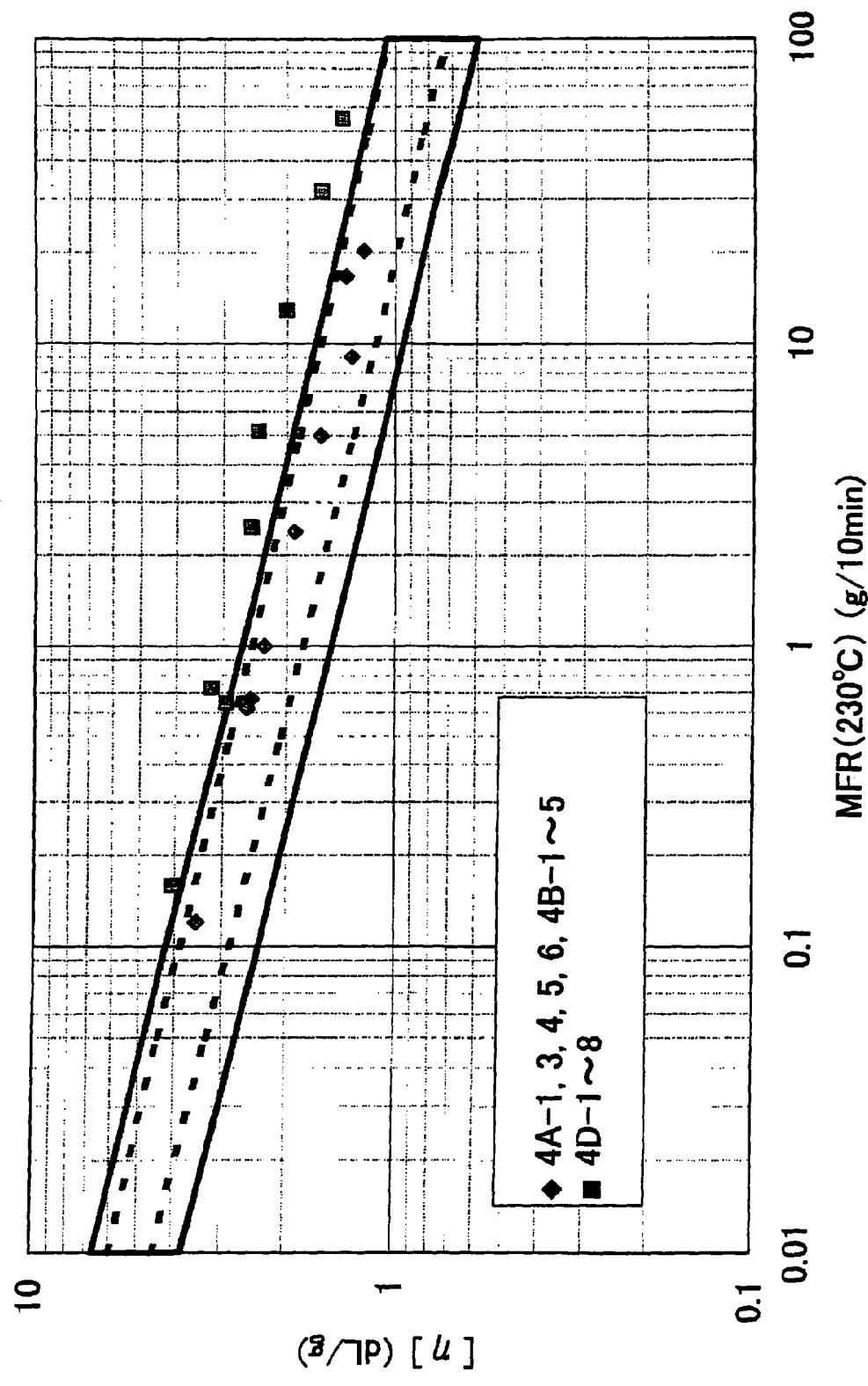
FIG. 3 is a diagram plotting the relationship between MFR and [η] for the polymers corresponding to the component (AA) or component (B2) used in the present inventions (4) and (5), and isotactic propylene polymers. The part surrounded by bold line indicates a region defined by the requirement (b-2) which is one of the preferred properties of the component (B2) used in the present inventions (4) and (5), and broken line indicates a preferred range of (b-2).

FIG. 3 shows a graph in which MFR and [η] are plotted with respect to the isotactic propylene polymers (4D-1) to (4D-8) and of the polymers (4B-1) to (4B-5), (4A-1), (4A-3), (4A-4), (4A-5) and (4A-6) used in the present invention (4). The graph shows the polymers used in the present invention (4) are distinguished from the isotactic propylene-based polymers (4D-1) to (4d-8) by the requirement (b-2).

TABLE 4-1

| | | | Syndiotactic propylene polymer (AA) | | | Propylene·α-olefin copolymer (B2) | | | | Ethylene·Butene copolymer |
|---|---|---|---|---|---|---|---|---|---|---|
| | | | (4A-1) | (4A-2) | (4A-3) | (4B-1) | (4B-2) | (4B-3) | (4B-4) | (4C) |
| Composition | (a) Propylene content | (mol %) | 100 | 100 | 100 | 77 | 72 | 82 | 68 | 0 |
| | (b) Ethylene content | (mol %) | 0 | 0 | 0 | 23 | 28 | 18 | 27 | 88 |
| | (c) α-olefin content | (mol %) | 0 | 0 | 0 | 0 | 0 | 0 | 5 | 12 |
| Melting point (Tm) | | (° C.) | 152/158 | 157/162 | 113/125 | — | — | — | — | 72 |
| rrrr | | (%) | 94 | 95 | 69 | — | — | — | — | — |
| r.r | | (%) | — | — | — | 82.9 | 84.6 | 83.5 | 82.1 | — |
| MFR | | (g/10 min) | 2.4 | — | 5.0 | 0.7 | 0.6 | 1.0 | 1.0 | 4.0 |
| [η] | | (dL/g) | 1.9 | 2.9 | 1.6 | 2.5 | 2.6 | 2.3 | 2.3 | 1.5 |
| Density | | (g/cm$^3$) | 0.882 | 0.883 | 0.877 | 0.852 | 0.852 | 0.852 | 0.853 | 0.888 |
| ΔH | | (mJ/mg) | 62 | 59 | 33 | — | — | — | — | 63 |
| Tg | | (° C.) | −5.7 | −5.8 | −6.5 | −30.1 | −34.9 | −26.8 | −35.4 | −52.8 |
| Mw/Mn | | | 2.0 | 2.0 | 2.0 | 2.0 | 2.0 | 2.0 | 2.0 | — |
| $t_{1/2}$ (110° C.) | | (sec) | 138 | 98 | 22730 | | | | | |
| Amount of Decane-soluble fraction | | (%) | <0.5 | <0.5 | 25 | | | | | |

Example 4-1

A composition of 80 parts by weight of the syndiotactic polypropylene (4A-1) obtained in [Polymerization Example (4A-1)] and 20 parts by weight of the propylene·ethylene copolymer (4B-2) obtained in [Polymerization Example (4B-2)] was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 4-2. The composition has excellent moldability and heat resistance, as well as excellent transparency, impact resistance, and scratch resistance.

Example 4-2

A composition of 70 parts by weight of the syndiotactic polypropylene (4A-1) obtained in [Polymerization Example (4A-1)] and 30 parts by weight of the propylene·ethylene copolymer (4B-2) obtained in [Polymerization Example (4B-2)] was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produce from the specimen, and the properties thereof were measured. The results of various property tests are presented in Table 4-2. The composition has excellent moldability and heat resistance, as well as excellent transparency, impact resistance, and scratch resistance.

Example 4-3

A composition of 60 parts by weight of the syndiotactic polypropylene (4A-1) obtained in [Polymerization Example (4A-1)] and 40 parts by weight of the propylene·ethylene copolymer (4B-2) obtained in [Polymerization Example (4B-2)] was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 4-2. The composition has excellent moldability and heat resistance, as well as excellent transparency, impact resistance, and scratch resistance.

Example 4-4

A composition of 60 parts by weight of the syndiotactic polypropylene (4A-1) obtained in [Polymerization Example (4A-1)] and 40 parts by weight of the propylene·ethylene copolymer (4B-1) obtained in [Polymerization Example (4B-1)] was blended with, based on 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 4-2. The composition has excellent moldability and heat resistance, as well as excellent transparency, impact resistance, and scratch resistance.

Example 4-5

A composition of 60 parts by weight of the syndiotactic polypropylene (4A-1) obtained in [Polymerization Example (4A-1)] and 40 parts by weight of the propylene.ethylene copolymer (4B-4) obtained in [Polymerization Example (4B-4)] was blended with, based on 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 4-2. The composition has excellent moldability and heat resistance, as well as excellent transparency, impact resistance, and scratch resistance.

Comparative Example 4-1

A composition of 60 parts by weight of the syndiotactic polypropylene (4A-3) (trade name: Finaplas1471, MFR=5.0 g/10 min, rrrr fraction=69%) manufactured by Total Corp., and 40 parts by weight of the propylene.ethylene copolymer (4B-2) obtained in [Polymerization Example 4A-4] was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 4-2. Compared to the products of Examples 4-1 to 4-5, the composition has inferior moldability and heat resistance.

TABLE 4-2

| | | Example | | | | | Comparative Example |
|---|---|---|---|---|---|---|---|
| | | 4-1 | 4-2 | 4-3 | 4-4 | 4-5 | 4-1 |
| Polymer (AA) | | 4A-1 | 4A-1 | 4A-1 | 4A-1 | 4A-1 | 4A-3 |
| Copolymer (B2) | | 4B-2 | 4B-2 | 4B-2 | 4B-1 | 4B-4 | 4B-2 |
| Composition ratio (AA)/(B2) (parts by weight) | | 80/20 | 70/30 | 60/40 | 60/40 | 60/40 | 60/40 |
| Softening temperature (TMA) | (° C.) | 155 | 154 | 156 | 155 | 155 | 121 |
| $t_{1/2}$ (110° C.) | (sec) | 170 | 205 | 225 | 210 | 205 | 8850 |
| Cloudiness (Haze) | (%) | 31 | 34 | 43 | 27 | 32 | 25 |
| Internal Haze | (%) | 27 | 29 | 36 | 25 | 28 | 21 |
| Tensile modulus | (MPa) | 450 | 328 | 250 | 230 | 230 | 170 |
| Izod (0° C.) | (J/m) | 720 | 880 | 890 | 860 | 850 | 660 |
| Gloss change rate | (%) | 8 | 12 | 14 | 11 | 7 | 17 |
| Film formability | | o | — | o | — | — | X |
| Amount of decane-soluble fraction at R.T. | (wt %) | 21 | 21 | 41 | 41 | 41 | 58 |
| r.r.r.r. of decane-insoluble fraction at R.T. | (%) | 94 | 94 | 94 | 94 | 94 | 69 |
| Tm of decane-insoluble fraction at R.T. | (° C.) | 152/158 | 152/158 | 152/158 | 152/158 | 152/158 | 113/125 |
| Composition (a) Propylene content | (mol %) | 94.0 | 91.0 | 88.2 | 90.4 | 86.6 | 88.2 |
| (b) Ethylene content | (mol %) | 6.0 | 9.0 | 11.8 | 9.6 | 11.3 | 11.8 |
| (c) α-olefin content | (mol %) | 0.0 | 0.0 | 0.0 | 0.0 | 2.1 | 0.0 |

— indicates non-measured category

Example 4-6

A composition of 20 parts by weight of the syndiotactic polypropylene (4A-1) obtained in [Polymerization Example (4A-1)] and 80 parts by weight of the propylene.ethylene copolymer (4B-3) obtained in [Polymerization Example (4B-3)] was blended with, based on 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 4-3. The composition has excellent moldability and heat resistance, as well as excellent transparency, flexibility, and scratch resistance.

Example 4-7

A composition of 30 parts by weight of the syndiotactic polypropylene (4A-1) obtained in [Polymerization Example (4A-1)] and 70 parts by weight of the propylene.ethylene copolymer (4B-3) obtained in [Polymerization Example (4B-3)] was blended with, based on 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 4-3. The composition has excellent moldability and heat resistance, as well as excellent transparency, flexibility, and scratch resistance.

Example 4-8

A composition of 20 parts by weight of the syndiotactic polypropylene (4A-2) obtained in [Polymerization Example (4A-2)] and 80 parts by weight of the propylene.ethylene copolymer (4B-3) obtained in [Polymerization Example (4B-3)] was blended with, based on 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 4-3. The composition has excellent moldability and heat resistance, as well as excellent transparency, impact resistance, and scratch resistance.

Comparative Example 4-2

A composition of 20 parts by weight of the syndiotactic polypropylene (4A-3) (trade name: Finaplas1471, MFR=5.0 g/10 min) manufactured by Total Corp., and 80 parts by weight of the propylene.ethylene copolymer (4B-3) obtained in [Polymerization Example (4B-3)] was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 4-3. Compared to the products of Examples 4-6 and 4-7, the composition has inferior moldability and heat resistance.

Comparative Example 4-3

A composition of 30 parts by weight of the syndiotactic polypropylene (4A-3) (trade name: Finaplas1471, MFR=5.0 g/10 min) manufactured by Total Corp., and 70 parts by weight of the ethylene.butene copolymer (C) was blended with, based on 100 parts by weight of the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 4-3. Compared to the products of Examples 4-6 and 4-7, the composition has inferior moldability and heat resistance, as well as inferior transparency and scratch resistance.

TABLE 4-3

|  | Example | | | Comparative Example | |
| --- | --- | --- | --- | --- | --- |
|  | 4-6 | 4-7 | 4-8 | 4-2 | 4-3 |
| Polymer (AA) | 4A-1 | 4A-1 | 4A-2 | 4A-3 | 4A-3 |
| Copolymer (B2) or (C) | 4B-3 | 4B-3 | 4B-3 | 4B-3 | 4C |
| Composition ratio (AA)/(B2) or (C) (parts by weight) | 20/80 | 30/70 | 20/80 | 20/80 | 30/70 |

TABLE 4-3-continued

|  |  | Example | | | Comparative Example | |
|---|---|---|---|---|---|---|
|  |  | 4-6 | 4-7 | 4-8 | 4-2 | 4-3 |
| Softening temperature (TMA) | (° C.) | 131 | 156 | 135 | 108 | 56 |
| $t_{1/2}$ (110° C.) | (sec) | 230 | 215 | 178 | 9910 | 11800 |
| Cloudiness (Haze) | (%) | 5 | 10 | 7 | 8 | 90 |
| Internal Haze | (%) | 3 | 8 | 5 | 5 | 89 |
| Tensile modulus | (MPa) | 21 | 68 | 27 | 46 | 70 |
| Gloss change rate | (%) | 18 | 21 | 17 | 30 | 95 |
| Permanent set | (%) | 32 | 37 | 28 | 47 | 87 |
| Amount of decane-soluble fraction at R.T. | (wt %) | 81 | 71 | 80 | 86 | 79 |
| r.r.r.r. of decane-insoluble fraction at R.T. | (%) | 94 | 94 | 95 | 69 | 69 |
| Tm of decane-insoluble fraction at R.T. | (° C.) | 152/158 | 152/158 | 157/162 | 113/125 | 113/125 |
| Composition (a) Propylene content | (mol %) | 82.0 | 87.1 | 82.0 | 82.0 | 24.2 |
| (b) Ethylene content | (mol %) | 18.0 | 12.9 | 18.0 | 18.0 | 66.7 |
| (c) α-olefin content | (mol %) | 0.0 | 0.0 | 0.0 | 0.0 | 9.1 |

TABLE 4-4

|  |  | Syndiotactic propylene polymer (AA) | | | Propylene·α-olefin copolymer (B2) |
|---|---|---|---|---|---|
|  |  | (4A-4) | (4A-5) | (4A-6) | (4B-5) |
| r.r. | (%) | — | — | — | 75 |
| MFR | (g/10 min) | 16.8 | 20.3 | 9.1 | 0.1 |
| [η] | (dL/g) | 1.4 | 1.2 | 1.3 | 3.5 |

TABLE 4-5

|  |  | Propylene polymer (4D) | | | | | | | |
|---|---|---|---|---|---|---|---|---|---|
|  |  | (4D-1) | (4D-2) | (4D-3) | (4D-4) | (4D-5) | (4D-6) | (4D-7) | (4D-8) |
| MFR | (g/10 min) | 2.1 | 5.2 | 0.7 | 15.0 | 30.0 | 45.0 | 0.7 | 0.2 |
| [η] | (dL/g) | 2.7 | 2.4 | 3.2 | 1.9 | 1.7 | 1.4 | 2.9 | 4.0 |
| mmmm | (%) | — | — | — | 96 | — | 96 | — | — |

Example V

Hereinafter, the present invention (5) will be described in more detail based on Examples, but the present invention is not intended to be limited to these Examples. In these Examples, the respective properties were measured as follows.

Methods for Measuring Properties
[Intrinsic Viscosity [η]]
Intrinsic viscosity [η] was measured by the same method as in Example IV.
[Amount of n-Decane-Soluble Fraction]
Amount of n-decane-soluble fraction was measured by the same method as in Example IV.
[Molecular Weight Distribution (Mw/Mn)]
Molecular weight distribution (Mw/Mn) was measured by the same method as in Example IV.
[Contents of Ethylene, Propylene and α-Olefin in Polymer]
Contents of ethylene, propylene and α-olefin in polymer were measured by the same method as in Example IV.
[Melting Point (Tm) and Heat of Fusion (ΔH)]
Using a DSC7 manufactured by PerkinElmer, Inc., under a nitrogen atmosphere (20 ml/min), about 5 mg of a sample was heated to 200° C., maintained for 10 minutes, and then cooled to 30° C. at 10° C./min. Subsequently, the temperature was maintained at 30° C. for 5 minutes and raised to 200° C. at 10° C./min. The melting point was calculated from the peak top of the crystal melting peak, and the heat of fusion was calculated from the integrated value of the peak.
[Half-Crystallization Time ($t_{1/2}$)]
Half-crystallization time ($t_{1/2}$) was measured by the same method as in Example IV.
[Glass Transition Temperature (Tg)]
Glass transition temperature (Tg) was measured by the same method as in Example IV.
[MFR]
MFR was measured by the same method as in Example IV.
[Method for Producing Press Sheet for Various Measurements]
A press sheet for various measurements was produced by the same method as in Example IV.
[Tensile Modulus]
Tensile modulus was measured by the same method as in Example IV.
[Izod Impact Strength]
Izod impact strength was measured by the same method as in Example IV.
[Softening Temperature from TMA Measurement]
Softening temperature from TMA measurement was measured by the same method as in Example IV.
[Internal Haze (%)]
Internal haze (%) was measured by the same method as in Example IV.
Polymer
Here are details of the syndiotactic polypropylenes (5A-1) to (5A-6), propylene·α-olefin copolymers (5B-1) to (5B-5), ethylene·butene copolymer (C), and propylene polymers (D-1) to (D-8).

Syndiotactic Polypropylenes (5A-1) to (5A-6)

Syndiotactic polypropylenes (4A-1), (4A-2), (4A-3), (4A-4), (4A-5) and (4A-6) of Example IV were used as syndiotactic polypropylenes (5A-1), (5A-2), (5A-3), (5A-4), (5A-5) and (5A-6), respectively.

Propylene.α-Olefin Copolymers (5B-1) to (5B-5)

Propylene.α-olefin copolymers (4B-1), (4B-2), (4B-3), (4B-4) and (4B-5) of Example IV were used as propylene.α-olefin copolymers (5B-1), (5B-2), (5B-3), (5B-4) and (5B-5), respectively.

Ethylene-Butene Copolymers (5C-1) to (5C-3)

Properties of ethylene.butene-1 random copolymers (5C-1) to (5C-3) are presented in Table 5-1.

Propylene Polymers (5D-1) to (5D-8)

Propylene polymers (4D-1), (4D-2), (4D-3), (4D-4), (4D-5), (4D-6), (4D-7) and (4D-8) of Example IV were used as propylene polymers (5D-1), (5D-2), (5D-3), (5D-4), (5D-5), (5D-6), (5D-7) and (5D-8), respectively.

Properties of the propylene polymers (5D-1) to (5D-8), namely, the propylene polymers (4D-1) to (4D-8), are presented in Table 4-5.

Figure 2:
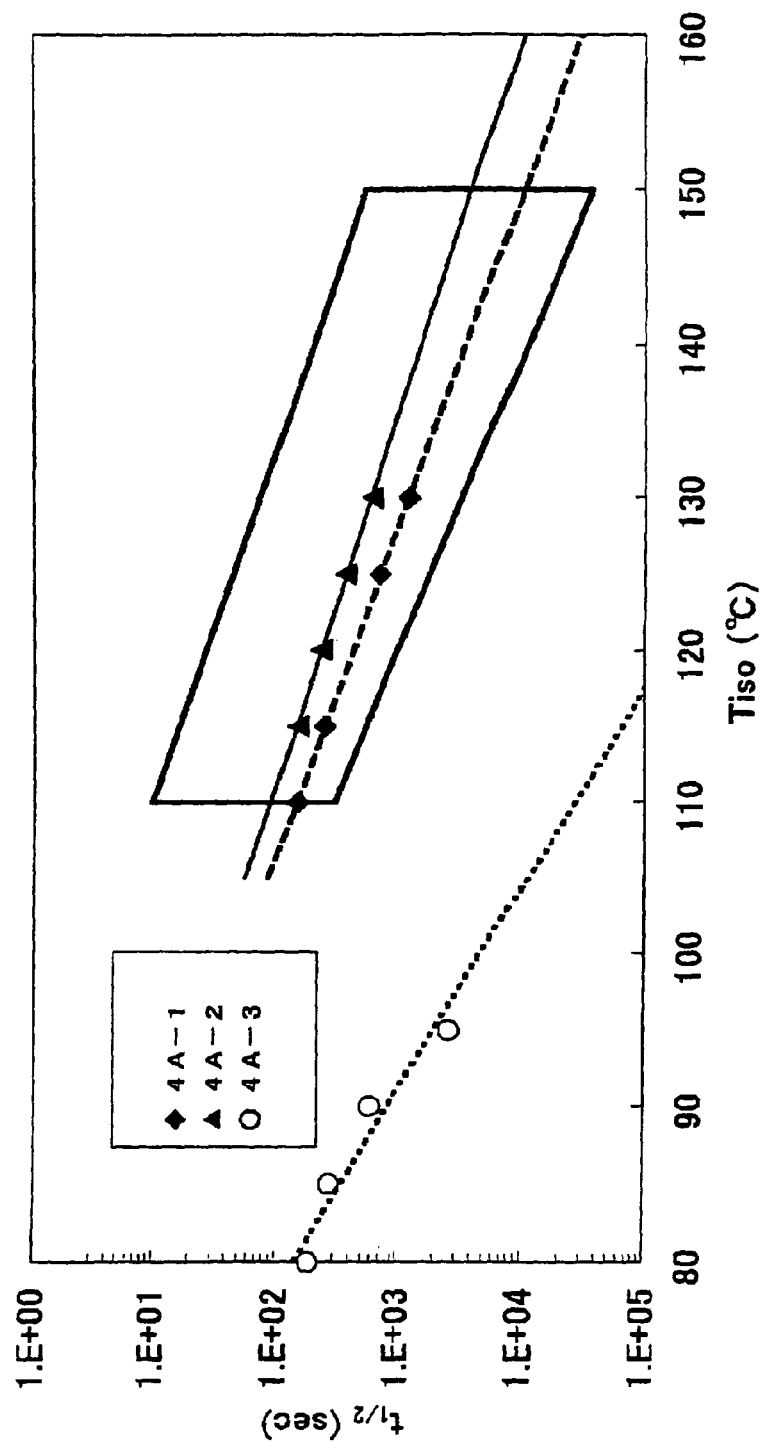
FIG. 2 is a diagram plotting the relationship between the specific isothermal crystallization temperature ($T_{iso}$) and the half-crystallization time ($t_{1/2}$) at the temperature, for the syndiotactic propylene polymers described in Examples and Comparative Examples of the present inventions (4) to (6). The part surrounded by bold line indicates a region defined by the inequality expression (Eq-1), which is a preferred property of the syndiotactic propylene polymer (AA) used in the present inventions (4) to (6).
Figure 4:
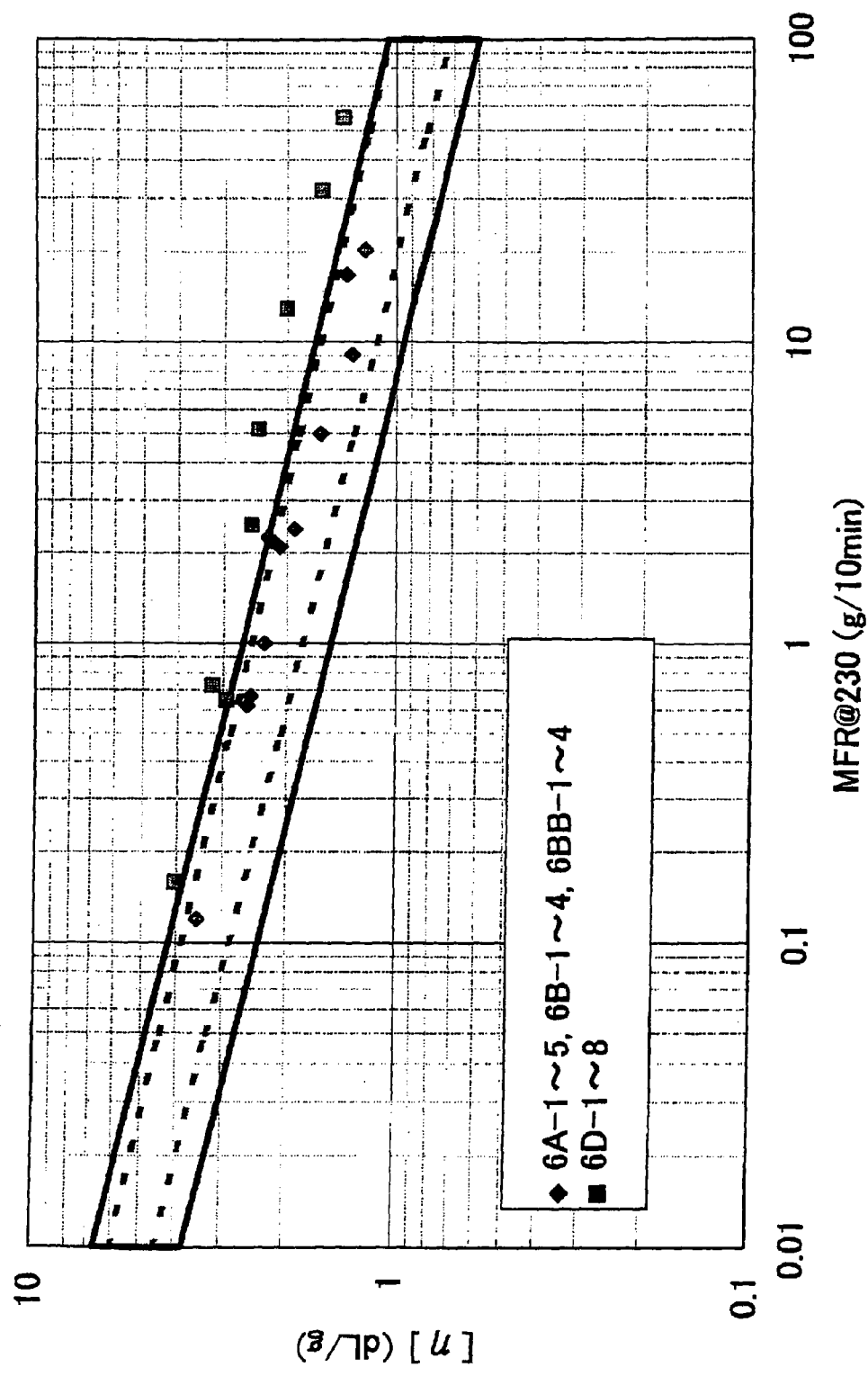
FIG. 4 is a diagram plotting the relationship between MFR and [η] for the polymers corresponding to the component (AA) or component (B3) used in the present invention (6), and isotactic propylene polymers. The part surrounded by bold line indicates a region defined by the requirement (b-2) which is one of the preferred properties of the component (B3) used in the present invention (6), and broken line indicates a preferred range of (b-2).

FIG. 4-2 shows a plotted graph of MFR and [η] of the isotactic propylene polymers (5D-1) to (5D-8) (namely, the polymers (4D-1) to (4D-8)) and the polymers (5B-1) to (5B-5), (5A-1), (5A-3), (5A-4), (5A-5) and (5A-6) used in the present invention (5) (namely, the polymers (4B-1) to (4B-5), (4A-1), (4A-3), (4A-4), (4A-5) and (4A-6)).

That shows the isotactic polymer and the polymers used in the present invention (5) are distinguished by the requirement (b-2).

kneaded for 5 minutes under the conditions of set temperature of 200° C., amount of resin of 40 g (apparatus batch volume=60 cm³), and 50 rpm. Subsequently, the composition was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 5-2. The composition has excellent moldability and heat resistance, as well as excellent transparency and low temperature impact resistance.

Example 5-2

A composition of 100 parts by weight of the syndiotactic polypropylene (5A-1) obtained in [Polymerization Example (5A-1)] and 66.7 parts by weight of the ethylene.1-butene random copolymer (5C-1) (MFR (190° C.)=4.0, 1-butene content 12 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm³), and 50 rpm. Subsequently, the composition

TABLE 5-1

| | | | Syndiotactic propylene copolymer (AA) | | | Propylene•α-olefin copolymer (B2) | | | | Ethylene•α-olefin copolymer | | |
|---|---|---|---|---|---|---|---|---|---|---|---|---|
| | | | (5A-1) | (5A-2) | (5A-3) | (5B-1) | (5B-2) | (5B-3) | (5B-4) | (5C-1) | (5C-2) | (5C-3) |
| Composition | (a) Propylene content | (mol %) | 100 | 100 | 100 | 77 | 72 | 82 | 68 | 0 | 0 | 0 |
| | (b) Ethylene content | (mol %) | 0 | 0 | 0 | 23 | 28 | 18 | 27 | 88 | 88 | 85 |
| | (c) α-olefin content | (mol %) | 0 | 0 | 0 | 0 | 0 | 0 | 5 | 12 | 12 | 15 |
| Melting point (Tm) | | (° C.) | 152/158 | 157/162 | 113/125 | — | — | — | — | 72 | 69 | 56 |
| rrrr | | (%) | 94 | 95 | 69 | — | — | — | — | — | — | — |
| Rr | | (%) | — | — | — | 82.9 | 84.6 | 83.5 | 82.1 | — | — | — |
| [η] | | (dL/g) | 1.9 | 2.9 | 1.6 | — | — | — | — | 1.5 | — | — |
| MFR | | (g/10 min) | 2.4 | — | 5.0 | 0.7 | 0.6 | 1.0 | 1.0 | 4.0 | 0.5 | 4.0 |
| Density | | (g/cm³) | 0.882 | 0.883 | 0.877 | 0.852 | 0.852 | 0.852 | 0.853 | 0.888 | 0.885 | 0.870 |
| ΔH | | (mJ/mg) | 62 | 59 | 33 | — | — | — | — | 63 | 60 | 37 |
| Tg | | (° C.) | −5.7 | −5.8 | −6.5 | −30.1 | −34.9 | −26.8 | −35.4 | −52.8 | −52.1 | −58.7 |
| Mw/Mn | | | 2.0 | 2.0 | 2.0 | 2.0 | 2.0 | 2.0 | 2.0 | — | — | — |
| $t_{1/2}$ (110° C.) | | (sec) | 138 | 98 | 22730 | | | | | | | |
| Amount of Decane-soluble fraction | | (%) | <0.5 | <0.5 | 25 | | | | | | | |

Example 5-1

A composition of 100 parts by weight of the syndiotactic polypropylene (5A-1) obtained in [Polymerization Example (5A-1)] and 25 parts by weight of the ethylene.1-butene random copolymer (5C-1) (MFR (190° C.)=4.0, 1-butene content 12 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt was removed and molded into a sheet with a cold press set at 20° C. The sheet was used as a specimen for measurement after cutting into an appropriate size, or the like. Also, a press sheet was produced from the specimen, and the properties thereof were measured. The results of various property tests are presented in Table 5-2. The composition has excellent moldability and heat resistance, as well as excellent transparency, flexibility and low temperature impact resistance.

Example 5-3

A composition of 75 parts by weight of the syndiotactic polypropylene (5A-1) obtained in [Polymerization Example (5A-1)], 25 parts by weight of the propylene.ethylene copolymer (5B-1) obtained in [Polymerization Example (5B-1)] and 25 parts by weight of the ethylene.1-butene random copolymer (5C-3) (MFR (190° C.)=4.0, 1-butene content 15 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2. The composition has excellent moldability and heat resistance, as well as excellent transparency, flexibility and low temperature impact resistance.

Example 5-4

A composition of 66.7 parts by weight of the syndiotactic polypropylene (5A-1) obtained in [Polymerization Example (5A-1)], 33.4 parts by weight of the propylene.ethylene copolymer (5B-3) obtained from [Polymerization Example (5B-3)] and 66.7 parts by weight of the ethylene.1-butene random copolymer (5C-2) (MFR (190° C.)=0.5, 1-butene content 12 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2. The composition has excellent moldability and heat resistance, as well as excellent transparency, flexibility and impact resistance.

Example 5-5

A composition of 50 parts by weight of the syndiotactic polypropylene (5A-2) obtained in [Polymerization Example (5A-2)], 50 parts by weight of the propylene.ethylene copolymer (5B-4) obtained in [Polymerization Example (5B-4)] and 25 parts by weight of the ethylene.1-butene random copolymer (5C-3) (MFR (190° C.)=4.0, 1-butene content 15 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2. The composition has excellent moldability and heat resistance, as well as excellent transparency, flexibility and impact resistance.

Reference Example 5-1

A composition of 100 parts by weight of the syndiotactic polypropylene (5A-1) obtained in [Polymerization Example (5A-1)] and 150 parts by weight of an ethylene 1-butene random copolymer (5C-1) (MFR (190° C.)=4.0, 1-butene content 12 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2.

Comparative Example 5-2

A composition of 100 parts by weight of the syndiotactic polypropylene (5A-3) (trade name: Finaplas1471, MFR=5.0 g/10 min, rrrr fraction=69%) manufactured by Total Corp., and 25 parts by weight of the ethylene.1-butene random copolymer (5C-1) (MFR (190° C.)=4.0, 1-butene content 12 mol %) was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2. Compared to the products of Examples, the composition has inferior moldability and heat resistance.

Comparative Example 5-3

A 60 parts by weight of the syndiotactic polypropylene (5A-3) (trade name: Finaplas1471, MFR=5.0 g/10 min, rrrr fraction=69%) manufactured by Total Corp., and 40 parts by weight of the propylene.ethylene copolymer (5B-3) obtained in [Polymerization Example (5B-3)] was blended with, based on the composition, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 5-2. Compared to the products of Examples, the composition has inferior moldability, heat resistance, and impact resistance.

[Molecular Weight Distribution (Mw/Mn)]

Molecular weight distribution (Mw/Mn) was measured by the same method as in Example III.

[Contents of Ethylene, Propylene and α-Olefin in Polymer]

Contents of ethylene, propylene and α-olefin in polymer were measured by the same method as in Example IV.

[Melting Point (Tm) and Heat of Fusion (ΔH) of Component (AA)]

Melting point (Tm) and heat of fusion (ΔH) of component (AA) were measured by the same method as in Example III.

[Half-Crystallization Time ($t_{1/2}$)]

Half-crystallization time ($t_{1/2}$) was measured by the same method as in Example III.

[Glass Transition Temperature (Tg) and Melting Point (Tm) of Component (B3)]

Glass transition temperature (Tg) and melting point (Tm) of component (B3) were measured by the same method as in Example IV.

[MFR]

TABLE 5-2

|  |  | Example | | | | | Ref. Ex. | Comp. Ex. | Comp. Ex. |
| --- | --- | --- | --- | --- | --- | --- | --- | --- | --- |
|  |  | 5-1 | 5-2 | 5-3 | 5-4 | 5-5 | 5-1 | 5-2 | 5-3 |
| Polymer (AA) |  | 5A-1 | 5A-1 | 5A-1 | 5A-1 | 5A-2 | 5A-1 | 5A-3 | 5A-3 |
| Copolymer (B2) |  |  |  | 5B-1 | 5B-3 | 5B-4 |  |  | 5B-3 |
| Copolymer (C) |  | 5C-1 | 5C-1 | 5C-3 | 5C-2 | 5C-3 | 5C-1 | 5C-1 | — |
| Composition ratio (AA)/(B2)/(C) (parts by weight) |  | 100/0/25 | 100/0/66.7 | 75/25/25 | 66.7/33.4/66.7 | 50/50/25 | 100/0/150 | 100/0/25 | 60/40 |
| Softening temperature (TMA) | (° C.) | 155 | 156 | 154 | 154 | 155 | 67 | 125 | 124 |
| Half-crystallization time $t_{1/2}$ | (sec) | 250 | 210 | 240 | 310 | 350 | 320 | 8190 | 8540 |
| Cloudiness (Haze) | (%) | 31 | 23 | 27 | 25 | 24 | 81 | 51 | 19 |
| Internal Haze | (%) | 27 | 20 | 25 | 21 | 21 | 77 | 47 | 17 |
| Tensile modulus | (MPa) | 620 | 430 | 260 | 160 | 80 | 230 | 250 | 180 |
| Izod (0° C.) | (J/m) | 720 | 900 | 840 | 900 | non-break | non-break | 320 | 28 |

TABLE 5-3

|  |  | Syndiotactic propylene polymer (AA) | | | Propylene•α-olefin copolymer (B2) |
| --- | --- | --- | --- | --- | --- |
|  |  | (5A-4) | (5A-5) | (5A-6) | (5B-5) |
| r.r. | (%) | — | — | — | 75 |
| MFR | (g/10 min) | 16.8 | 20.3 | 9.1 | 0.1 |
| [η] | (dL/g) | 1.4 | 1.2 | 1.3 | 3.5 |

Example VI

Hereinafter, the present invention (6) will be described in more detail based on Examples, but the present invention is not intended to be limited to these Examples. In these Examples, the respective properties were measured as follows.

Methods for Measuring Properties

[Intrinsic Viscosity [1]]

Intrinsic viscosity [η] was measured by the same method as in Example III.

[Amount of n-Decane-Soluble Fraction]

Amount of n-decane-soluble fraction was measured by the same method as in Example III.

The MFRs of the syndiotactic propylene polymer (AA) and propylene.α-olefin copolymer (B3) were measured at 230° C. under a load of 2.16 kgf, according to JIS K-6721.

The MFR of the ethylene-butene copolymer (C) was measured at 190° C. under a load of 2.16 kgf, according to JIS K-6721.

[Method for Producing Press Sheet for Various Measurements]

A press sheet for various measurements was measured by the same method as in Example III.

[Tensile Modulus]

Tensile modulus was measured by the same method as in Example III.

[Izod Impact Strength]

Izod impact strength was measured by the same method as in Example III.

[Softening Temperature from TMA Measurement]

Softening temperature from TMA measurement was measured by the same method as in Example III.

[Internal Haze (%)]

Internal haze (%) was measured by the same method as in Example IV.

[Gloss Change Rate (%) after Gakushin Abrasion]

Gloss change rate (%) after Gakushin abrasion was measured by the same method as in Example IV.

[Rebound Resilience (%)]

According to the Lupke's type (Lupke's method) described in JIS K6255, rebound resilience was measured using a specimen having a thickness of 15 mm (formed by stacking five press sheets each having a thickness of 3 mm), and using a rebound resilience tester manufactured by Ueshima Seisakusho Co., Ltd.

Polymerization Example

Syndiotactic Propylene Polymer (6A-1) to (6A-5)

The syndiotactic propylene polymers (4A-1), (4A-3), (4A-4), (4A-5) and (4A-6) of Example IV were used as syndiotactic propylene polymers (6A-1), (6A-2), (6A-3), (6A-4) and (6A-5), respectively.

Polymerization Example 6B-1

Synthesis of Propylene.α-Olefin Copolymer (6B-1)

A 2000-mL polymerization apparatus thoroughly purged with nitrogen was charged with 833 ml of dry hexane, 120 g of 1-butene and triisobutylaluminum (1.0 mmol) at normal temperature. Subsequently, the internal temperature of the polymerization apparatus was raised to 60° C., and propylene was introduced to raise the pressure in the system to 0.33 MPa, and ethylene was then introduced to adjust the pressure in the system to 0.62 MPa. Subsequently, the polymerization vessel was charged with a toluene solution in which 0.002 mmol of di(p-chlorophenyl)methylene(cyclopentadienyl)(octamethyloctahydrodibenzofluorenyl)zirconium dichloride had been contacted with 0.6 mmol, in terms of aluminum, of methylaluminoxane (manufactured by Tosoh Finechem Corporation). Polymerization was then performed for 20 minutes while maintaining the internal temperature at 60° C. and the pressure in the system at 0.62 MPa with ethylene, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 73 g, and [η] measured in decalin at 135° C. was 2.1 (dL/g). The properties measured using the polymer obtained are presented in Table 6-1.

Polymerization Example 6B-2

Propylene.α-Olefin Copolymer (6B-2)

A 2000-ml polymerization apparatus thoroughly purged with nitrogen was charged with 833 ml of dry hexane, 120 g of 1-butene and triisobutylaluminum (1.0 mmol) at normal temperature. Subsequently, the internal temperature of the polymerization apparatus was raised to 60° C., and propylene was introduced so that the pressure in the system was raised to 0.33 MPa, and ethylene was then introduced to adjust the pressure in the system to 0.63 MPa. Subsequently, the polymerization vessel was charged with a toluene solution in which 0.002 mmol of di(p-chlorophenyl)methylene(cyclopentadienyl)(octamethyloctahydrodibenzofluorenyl)zirconium dichloride had been contacted with 0.6 mmol, in terms of aluminum, of methylaluminoxane (manufactured by Tosoh Finechem Corporation). Polymerization was then performed for 20 minutes while maintaining the internal temperature at 60° C. and the pressure in the system at 0.63 MPa with ethylene, and 20 ml of methanol was added to terminate the polymerization. After depressurizing, the resulting polymer was precipitated from the polymerization solution in 2 L of methanol, and dried in a vacuum at 130° C. for 12 hours. The amount of the polymer obtained was 97 g, and [η] measured in decalin at 135° C. was 2.3 (dL/g). The properties measured using the polymer obtained are presented in Table 6-1.

Polymerization Example 6B-3

Propylene.α-Olefin Copolymer (6B-3)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 70° C., and propylene was introduced so that the pressure in the system was raised to 0.67 MPa, and ethylene was then introduced to adjust the pressure in the system to 1.37 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.37 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the polymer obtained was 90 g, and [η] measured in decalin at 135° C. was 2.2 (dL/g). The properties measured using the polymer obtained are presented in Table 6-1.

Polymerization Example 6B-4

Synthesis of Propylene.α-Olefin Copolymer (6B-4)

A 4000-ml polymerization apparatus thoroughly purged with nitrogen was charged with 1834 ml of dry hexane and triisobutylaluminum (1.0 mmol) at normal temperature. Subsequently, the internal temperature of the polymerization apparatus was raised to 50° C., and propylene was introduced to raise the pressure in the system to 0.67 MPa, and ethylene was then introduced to adjust the pressure in the system to 1.37 MPa. Subsequently, the polymerization vessel was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 50° C. and the pressure in the system at 1.37 MPa with ethylene, and 20 ml of methanol was added to terminate the polymerization. After depressurizing, the resulting polymer was precipitated from the polymerization solution in 4 L of methanol, and dried in a vacuum at 130° C. for 12 hours. The amount of the polymer obtained was 78 g, [η] measured in decalin at 135° C. was 3.5 (dL/g), and the ethylene content measured by $^{13}$C-NMR was 18 mol %. The properties measured using the polymer obtained are presented in Table 6-4.

Propylene.α-Olefin Copolymers (6BB-1) to (6BB-4)

Propylene.α-olefin copolymers (4B-1), (4B-2), (4B-3) and (4B-4) of Example IV were used as propylene.α-olefin copolymers (6BB-1), (6BB-2), (6BB-3) and (6BB-4), respectively.

Details of other components are as follows.

Hydrocarbon resin (6C-1): Hydrogenated terpene resin P150 manufactured by Yasuhara Chemical Co., Ltd.

Thermoplastic elastomer (6C-2): Milastomer 7030B (MFR=25.0 g/10 min) manufactured by Mitsui Chemicals, Inc.

Ethylene.butene copolymer (6C-3): ethylene.butene copolymer (6C) manufactured by Mitsui Chemicals, Inc. (trade name: Tafmer A4070, MFR=4.0 g/10 min)

Propylene Polymers (6D-1) to (6D-8)

Propylene polymers (4D-1), (4D-2), (4D-3), (4D-4), (4D-5), (4D-6), (4D-7) and (4D-8) of Example IV were used as propylene polymers (6D-1), (6D-2), (6D-3), (6D-4), (6D-5), (6D-6), (6D-7) and (6D-8), respectively.

Properties of the propylene polymers (6D-1) to (6D-8), namely, the propylene polymers (4D-1) to (4D-8), are presented in Table 4-5.

FIG. 4 shows a plotted graph of MFR and $[\eta]$ of the isotactic propylene polymers (6D-1) to (6D-8) (namely, the polymers (4D-1) to (4D-8)), (6B-1) to (6B-4), (6BB-1) to (6BB-4) (namely, the polymers (4B-1) to (4B-4)), and (6A-1) to (6A-5) (the polymers (4A-1), (4A-3), (4A-4), (4A-5) and (4A-6)). The graph shows the isotactic polymers and the polymers used in the present invention are distinguished by the requirement (b-2).

Example 6-1

A composition of 20 parts by weight of the syndiotactic polypropylene (6A-1) obtained in [Polymerization Example (6A-1)] and 80 parts by weight of the propylene.ethylene.1-butene random copolymer (6B-1) (MFR (230° C.)=1.2, $[\eta]$=2.1, ethylene content 5 mol %, 1-butene content 29 mol %) was blended with, based on 100 parts by weight of the sum, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the sample, and the properties thereof were measured. The results of various property tests are presented in Table 6-2. The composition has excellent heat resistance, as well as excellent transparency, abrasion resistance and rebound resilience.

Example 6-2

A composition of 20 parts by weight of the syndiotactic polypropylene (6A-1) obtained in [Polymerization Example (6A-1)] and 80 parts by weight of the propylene ethylene 1-butene random copolymer (6B-2) (MFR (230° C.)=0.9, $[\eta]$=2.3, ethylene content 10 mol %, 1-butene content 28 mol %) was blended with, based on 100 parts by weight of the sum, 20 parts by weight of the resin (6C-1), hydrogenated terpene resin P150 manufactured by Yasuhara Chemical Co., Ltd., 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 6-2. The composition has excellent heat resistance, as well as excellent transparency and abrasion resistance, and, in particular, has more excellent rebound resilience.

Example 6-3

A composition of 60 parts by weight of the syndiotactic polypropylene (6A-1) obtained in [Polymerization Example (6A-1)] and 40 parts by weight of the propylene ethylene 1-butene random copolymer (6B-2) above mentioned was blended with, based on 100 parts by weight of the sum, 20 parts by weight of the resin (6C-1) (hydrogenated terpene resin P150 manufactured by Yasuhara Chemical Co., Ltd.), 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., a sheet was produced in the same manner as in Example 6-2, and the sheet was used as a specimen for measurement after cutting into an appropriate size, or the like. Also, a press sheet was produced from the specimen, and the properties thereof were measured. The results of various property tests are presented in Table 6-2.

Comparative Example 6-1

20 parts by weight of the syndiotactic polypropylene (6A-2) was used instead of the 20 parts by weight of the syndiotactic polypropylene (6A-1) in Example 6-1, and 80 parts by weight of the propylene.ethylene.1-butene random copolymer (6B-3) was used instead of the 80 parts by weight of propylene.ethylene.1-butene copolymer (6B-1) in Example 6-1. Those were blended with, based on 100 parts by weight of the sum of (6A-2) and (6B-3), 0.1 part by weight of tri(2, 4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., a sheet was produced in the same manner as in Example 6-1, and the sheet was used as a specimen for measurement after cutting into an appropriate size, or the like. Also, a press sheet was produced from the specimen, and the properties thereof were measured. The results of various property tests are presented in Table 6-2.

Comparative Example 6-2

20 parts by weight of the syndiotactic polypropylene (6A-2) was used instead of the 20 parts by weight of the syndiotactic polypropylene (6A-1) in Example 6-1, and 80 parts by weight of the ethylene.1-butene random copolymer (6C-3) was used instead of the 80 parts by weight of propylene.ethylene.1-butene copolymer (6B-1) in Example 6-1. Those were blended with, based on 100 parts by weight of the sum of (6A-2) and (6C-3), 0.1 part by weight of tri(2,4-di-t-butylphenyl)phosphate as a secondary antioxidant, 0.1 part by weight of n-octadecyl-3-(4'-hydroxy-3',5'-di-t-butylphenyl) propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., a sheet was produced in the same manner as in Example 6-1, and the sheet was used as a specimen for measurement by cutting into an appropriate size, or the like. Also, a press sheet was produced from the sheet, and the properties thereof were measured. The results of various property tests are presented in Table 6-2.

Example 6-4

20 parts by weight of the syndiotactic polypropylene (6A-1) obtained in [Polymerization Example (6A-1)] and 80 parts by weight of the propylene.ethylene.1-butene random copolymer (6B-1) (MFR (230° C.)=1.2, [η]=2.1, ethylene content 5 mol %, 1-butene content 29 mol %) was blended with, based on 100 parts by weight of the sum, 200 parts by weight of Milastomer™ (trade name) 7030B manufactured by Mitsui Chemical Inc. as the thermoplastic elastomer (6C-2), 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, using a Laboplast Mill (twin screw batch type melt kneading apparatus) manufactured by Toyo Seiki Co., Ltd., the composition was melt kneaded for 5 minutes under the conditions of set temperature of 200° C., amount of resin of 40 g (apparatus batch volume=60 cm$^3$), and 50 rpm. Subsequently, the composition was removed and molded into a sheet with a cold press set at 20° C., and the sheet was used as a specimen for measurement after cutting into an appropriate size, or the like. Also, a press sheet was produced from the specimen, and the properties thereof were measured. The results of various property tests are presented in Table 6-2. The composition has excellent heat resistance, impact strength, abrasion resistance and the like.

Example 6-5

20 parts by weight of the syndiotactic polypropylene (6A-1) obtained in [Polymerization Example (6A-1)] and 80 parts by weight of the propylene.ethylene.1-butene random copolymer (6B-2) obtained in Polymerization Example (6B-2) (MFR=0.9 g/10 min [η]=2.3 dL/g, ethylene content 10 mol %, 1-butene content 28 mol %) was blended with, based on 100 parts by weight of the sum, 100 parts by weight of Milastomer™ (trade name) 7030B manufactured by Mitsui Chemical Inc. as the thermoplastic elastomer (6C-2), 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, a sheet was produced in the same manner as in Example 6-4, and the sheet was used as a specimen for measurement after cutting into an appropriate size, or the like. Also, a press sheet was produced from the specimen, and the properties thereof were measured. The results of various property tests are presented in Table 6-3. The composition has excellent heat resistance, impact strength, abrasion resistance, and the like.

Comparative Example 6-3

The following compounds were blended. The compounds were 100 parts by weight of Milastomer™ (trade name) 7030B manufactured by Mitsui Chemical Inc. as the thermoplastic elastomer (6C-2), 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat resistant stabilizer, and 0.1 part by weight of calcium stearate as a hydrochloric acid absorbent. Then, a sheet was produced in the same manner as in Example 6-4, and the sheet was used as a specimen for measurement after cutting into an appropriate size, or the like. Also, a press sheet was produced from the specimen, and the properties thereof were measured. The results of various property tests are presented in Table 6-3.

TABLE 6-1

| | | | Syndiotactic propylene Polymer (AA) | | Propylene·α-olefin Copolymer (B3) | | | resin |
|---|---|---|---|---|---|---|---|---|
| | | | (6A-1) | (6A-2) | (6B-1) | (6B-2) | (6B-3) | (6C-3) |
| Composition | (a) Propylene content | (mol %) | 100 | 100 | 66 | 62 | 82 | |
| | (b) Ethylene content | (mol %) | 0 | 0 | 5 | 10 | 18 | 85 |
| | (c) α-olefin content | (mol %) | 0 | 0 | 29 | 28 | 0 | 15 |
| Melting point (Tm) | | (° C.) | 152/158 | 113/125 | — | — | — | 56 |
| rrrr | | (%) | 94 | 69 | — | — | — | — |
| [η] | | | 1.9 | 1.6 | 2.1 | 2.3 | 2.2 | — |
| MFR | | (g/10 min) | 2.4 | 5.0 | 1.2 | 0.9 | 1.1 | 4.0 |
| Density | | (g/cm$^3$) | 0.882 | 0.877 | 0.870 | 0.858 | 0.852 | 0.870 |
| ΔH | | (mJ/mg) | 62 | 33 | — | — | — | 37 |
| Tg | | (° C.) | −5.7 | −6.5 | −15.2 | −23.7 | −26.8 | −58.7 |
| Mw/Mn | | | 2.0 | 2.0 | 2.0 | 2.0 | 2.0 | — |
| $t_{1/2}$ (110° C.) | | (sec) | 138 | 22730 | | | | |
| Amount of decane-soluble fraction | | (%) | <0.5 | 25 | | | | |

TABLE 6-2

|  |  | Example | | | Comparative Example | |
|---|---|---|---|---|---|---|
|  |  | 6-1 | 6-2 | 6-3 | 6-1 | 6-2 |
| Polymer (AA) |  | 6A-1 | 6A-1 | 6A-1 | 6A-2 | 6A-2 |
| Copolymer (B3) |  | 6B-1 | 6B-2 | 6B-2 | 6B-3 | — |
| Copolymer (C) |  | — | 6C-1 | 6C-1 | — | 6C-3 |
| Composition ratio (A)/(B)/(C) (parts by weight) |  | 20/80/0 | 20/80/20 | 60/40/20 | 20/80/0 | 20/0/80 |
| Softening temperature (TMA) | (° C.) | 125 | 115 | 155 | 56 | 67 |
| Cloudiness (Haze) | (%) | 4 | 4 | 15 | 4 | 81 |
| Internal Haze | (%) | 3 | 1 | 10 | 2 | 77 |
| Tensile modulus | (MPa) | 55 | 33 | 125 | 16 | 70 |
| Gloss change rate | (%) | 22 | 25 | — | 56 | 95 |
| Rebound resilience | (%) | 24 | 13 | — | — | 65 |

TABLE 6-3

|  |  | Example | | Comparative Example |
|---|---|---|---|---|
|  |  | 6-4 | 6-5 | 6-3 |
| Polymer (AA) |  | 6A-1 | 6A-1 | — |
| Copolymer (B3) |  | 6B-1 | 6B-2 | — |
| Copolymer (C) |  | 6C-2 | 6C-2 | 6C-2 |
| Composition ratio (AA)/(B3)/(C) (Parts by weight) |  | 20/80/200 | 20/80/100 | 0/0/100 |
| Softening temperature (TMA) | (° C.) | 160 | 160 | 160 |
| Tensile modulus | (MPa) | 31 | 21 | 11 |
| Izod (0° C.) | (J/m) | >500 | >500 | >500 |
| Gloss change rate | (%) | 41 | 28 | 85 |

TABLE 6-4

|  |  | Syndiotactic propylene polymer (AA) | | | Propylene·α-olefin copolymer (B3) |
|---|---|---|---|---|---|
|  |  | (6A-3) | (6A-4) | (6A-5) | (6B-4) |
| r.r. | (%) | — | — | — | 75 |
| MFR | (g/10 min) | 16.8 | 20.3 | 9.1 | 0.1 |
| [η] | (dL/g) | 1.4 | 1.2 | 1.3 | 3.5 |

TABLE 6-5

|  |  |  | Propylene·α-olefin copolymer | | | |
|---|---|---|---|---|---|---|
|  |  |  | (6BB-1) | (6BB-2) | (6BB-3) | (6BB-4) |
| Composition | (a) Propylene content | (mol %) | 77 | 72 | 82 | 68 |
|  | (b) Ethylene content | (mol %) | 23 | 28 | 18 | 27 |
|  | (c) α-olefin content | (mol %) | 0 | 0 | 0 | 5 |
| Melting point (Tm) |  | (° C.) | — | — | — | — |
| r.r.r.r. |  | (%) | — | — | — | — |
| r.r. |  | (%) | 82.9 | 84.6 | 83.5 | 82.1 |
| MFR |  | (g/10 min) | 0.7 | 0.6 | 1.0 | 1.0 |
| [η] |  | (dL/g) | 2.5 | 2.6 | 2.3 | 2.3 |
| Density |  | (g/cm³) | 0.852 | 0.852 | 0.852 | 0.853 |
| ΔH |  | (mJ/mg) | — | — | — | — |
| Tg |  | (° C.) | −30.1 | −34.9 | −26.8 | −35.4 |
| Mw/Mn |  |  | 2.0 | 2.0 | 2.0 | 2.0 |

Example VII

Hereinafter, the present invention (7) will be described in more detail based on Examples, but the present invention is not intended to be limited to these Examples.

Measurement Methods for Properties

[1] Amount of n-Decane-Soluble Component (Dsol) Soluble in n-Decane at Room Temperature 200 ml of n-decane was added to a 20 cm×20 cm monolayer film of the present invention, and the film was heated at 145° C. for 30 minutes to be dissolved. The resulting solution was cooled to 20° C. in about 3 hours, and left to stand for 30 minutes. Subsequently, the precipitate (hereinafter, referred to as 'n-decane-insoluble component: Dinsol') was separated by filtration. The filtrate was poured to an about 3-fold volume of acetone, and the components dissolved in n-decane were precipitated (referred to as 'Precipitate (A)'). Precipitate (A) was separated by filtration from acetone, and then dried. On the other hand, although the filtrate was concentrated and dried, no residue was observed. The amount of the n-decane-soluble component was determined by the following equation:

Amount of n-decane-soluble component (wt %)= [weight of Precipitate ($A$)/weight of sample]×100

[2] Mw/Mn Measurement (Mw: Weight Average Molecular Weight, Mn: Number Average Molecular Weight)

The molecular weight distribution (Mw/Mn) was measured in the following manner using gel permeation chromatograph Alliance GPC-2000 manufactured by Waters Corp. The separation columns used were two TSKgel GNH6-HT columns and two TSKgel GNH6-HTL columns, which all had a size of 7.5 mm in diameter and 300 mm in length. The column temperature was set at 140° C., the mobile phase was o-dichlorobenzene (Wako Pure Chemical Industries, Ltd.) containing 0.025 wt % of BHT (Takeda Yakuhin Co., Ltd.) as an antioxidant, and the flow rate of the mobile phase was 1.0 ml/min. The sample concentration was 15 mg/10 mL, the injection volume of sample was 500 microliters, and a differential refractometer was used as the detector. For the standard polystyrenes, products by Tosoh Finechem Corporation were used for the molecular weight $Mw<1000$ and $Mw>4\times10^6$, and products by Pressure Chemical Company were used for the molecular weight $1000 \leq Mw \leq 4\times10^6$.

[3] Melting Point (Tm)

Using DSC Pyris 1 or DSC7 manufactured by PerkinElmer Inc., about 5 mg of the sample was heated to 200° C., maintained for 10 minutes, and then cooled to 30° C. at 10° C./min, under a nitrogen atmosphere (20 ml/min). The temperature was maintained at 30° C. for 5 minutes and then increased to 200° C. at 10° C./min. The melting point was calculated from the apex of the crystal melting peak, and the heat of fusion was calculated from the integrated value of the peak.

When a plurality of peaks were detected for the propylene-based composition described in the present Example, the highest temperature was defined as Tm.

[4] Intrinsic Viscosity [η]

The intrinsic viscosity was a value measured at 135° C. using a decalin solvent. Specifically, about 20 mg of a polymer resin in the form of powder, pellets or block was dissolved in 15 ml of decalin, and the specific viscosity $\eta_{sp}$ was measured in an oil bath at 135° C. Thereafter, 5 ml of the decalin solvent was added to this decalin solution for dilution, and then the specific viscosity $\eta_{sp}$ was measured in the same manner. This diluting operation was additionally repeated two times, and the value of $\eta_{sp}/C$ of when the concentration (C) was extrapolated to 0 was determined as the intrinsic viscosity (see the following equation):

$$[\eta]=\lim(\eta_{sp}/C) \; (C \to 0)$$

[5] Concentration of Propylene Unit (Sp), Ethylene Unit ($S_E$), and α-Olefin Units of 4 to 10 Carbon Atoms (Sα)

Quantification of the contents of ethylene, propylene, and α-olefin was performed as follows using a JNM GX-500 type NMR measuring apparatus manufactured by JEOL, Ltd. 0.35 g of the sample was dissolved in 2.0 ml of hexachlorobutadiene with heating. This solution was filtered through a glass filter (G2). Subsequently, 0.5 ml of deuterated benzene was added, and the mixture was placed in an NMR tube having an internal diameter of 10 mm. $^{13}$C-NMR measurement was performed at 120° C. The number of scans was 10,000 or more. The composition of ethylene, propylene, and α-olefin was quantified using the $^{13}$C-NMR spectrum obtained.

[6] MFR (Melt Flow Rate)

MFR was measured at 230° C. under a load of 2.16 kgf, according to JIS K-6721.

[7] Young's Modulus of Film (=Tensile Modulus)

The film was punched using a JIS No. 3 dumbbell according to JIS K6301 to provide a specimen for evaluation. The specimen was subjected to measurement under conditions of a span of 30 mm and a tensile rate of 30 mm/min at 23° C.

[8] Tensile Impact Strength of Film

Using Heat Seal Tester TP-701-B manufactured by Tester Sangyo K. K., the molded film was subjected to heat sealing under conditions of temperature (upper limit/lower limit) of 210° C./190° C., pressure of 0.2 MPa, time of 5 seconds, and seal width of 150 mm×20 mm, to give a sample for measurement.

The sample was cut to strips of 10 mmt in accordance with JIS K-7160 to provide specimens. The tensile impact test was performed using a No. 258 universal impact tester manufactured by Yasuda Seiki seisakusho LTD., with Hammer 2J under conditions of a hammer pendulum drop angle of 149.2° and an impact speed of 3.0 (m/sec).

[9] Light Transmittance of Film

The measurement was carried out using benzyl alcohol as a solvent according to JIS K-7136. Further, the film was subjected to an annealing treatment in a pressure resistant oven with hot water at 120° C. for 30 minutes, and then the measurement was carried out in the same manner to determine the rate of decrease in light transmittance.

Catalyst Synthesis Examples

Synthesis Example 7-1

Dibenzylmethylene(cyclopentadienyl)(3,6-di-tert-butylfluorenyl)zirconium dichloride was produced by the method described in Synthesis Example 3 of JP-A No. 2004-189666.

Synthesis Example 7-2

Dibenzylmethylene(cyclopentadienyl)(2,7-diphenyl-3,6-di-tert-butylfluorenyl)zirconium dichloride was produced as follows.

(i) Synthesis of
2,7-dibromo-3,6-di-tert-butyl-fluorene

Under a nitrogen atmosphere, 170 mL of propylene carbonate was added to 15.22 g (54.7 mmol) of 3,6-di-tert-butylfluorene, and the mixture was stirred. To this solution, 20.52 g (115 mmol) of N-bromosuccinimide was added, and the mixture was heated and stirred at 80° C. for 5 hours. Subsequently, the mixture was left to be naturally cooled. The reaction solution was added to 800 mL of water. The mixture was stirred at room temperature for 15 minutes, and filtered using a Kiriyama funnel. The whitish yellow powder thus obtained was washed 5 times with 10 mL of ethanol. Subsequently, a mixture solution of hexane and a small amount of dichloromethane was added to the whitish yellow powder, and the mixture was heated to 60° C. to dissolve the powder completely. The resultant solution was left to stand overnight at −20° C. Crystals precipitated were washed 3 times with 5 mL of hexane to give a target product as a whitish yellow powder (yield 21.16 g (76%)).

$^1$H NMR (270 MHz, CDCl$_3$): δ 1.60 (s, tBu(Flu), 18H), 3.75 (s, Flu-9H, 2H), 7.73 (s, Flu, 2H), 7.81 (s, Flu, 2H).

MS (FD): M/z 436 (M$^+$).

(ii) Synthesis of
3,6-di-tert-butyl-2,7-diphenyl-fluorene

Under a nitrogen atmosphere, 120 mL of anhydrous DME was added to 8.15 g (18.7 mmol) of 2,7-dibromo-3,6-di-tert-butylfluorene and 1.08 g (0.93 mmol) of Pd(PPh$_3$), and the mixture was stirred at room temperature for 20 minutes. To this solution, 20 mL of an ethanol solution in which 5.01 g (41.1 mmol) of phenylboric acid was dissolved was added. The flask that had contained the phenylboric acid was washed two times with 4 mL of ethanol, and this was also added to the solution. The mixture was then stirred at room temperature for 20 minutes. Thereafter, 37.4 mL (74.8 mmol) of a 2.0 mol/L aqueous solution of sodium carbonate was added. Subsequently, the mixture was heated to reflux for 18 hours, and left to be naturally cooled, and the reaction was terminated with 1N hydrochloric acid in an ice bath. Thereafter, ether was added to extract the soluble fraction, and the aqueous layer was subjected to extraction with diethyl ether twice. The resultant extract was then combined with the organic layer obtained earlier. The resulting liquid was washed two times with a saturated aqueous solution of sodium hydrogen carbonate, two times with water, and once with saturated brine, and then dried over magnesium sulfate. The solvent was distilled off, and the residue was subjected to separation by silica gel chromatography. To the thus obtained whitish yellow powder, a mixture solution of hexane and a small amount of dichloromethane was added, and the mixture was heated to 60° C. to dissolve the powder completely. The resultant solution was left to stand for 1 hour at room temperature and then left to stand for 13 hours at −20° C. Crystals precipitated were washed 3 times with 10 mL of hexane to give a target product as a white powder (yield 4.36 g (54%)).

$^1$H NMR (270 MHz, CDCl$_3$): δ 1.29 (s, tBu(Flu), 18H), 3.78 (s, Flu-9H, 2H), 7.16 (s, Flu, 2H), 7.34 (br, PhFlu, 10H), 7.97 (s, Flu, 2H).

MS (FD): M/z 430 (M$^+$).

(iii) Synthesis of 6,6-dibenzylfulvene

Under a nitrogen atmosphere, a 500-mL three-necked flask was charged with 8.0 g (121.0 mmol) of cyclopentadiene and 100 mL of dehydrated THF, and the mixture was stirred. This mixture solution was cooled in an ice bath, and 80 mL (125.6 mmol) of a 1.57 mol/L hexane solution of n-butyllithium was added. Thereafter, the mixture was stirred at room temperature for 3 hours. The thus obtained white slurry was cooled in an ice bath, and then a solution prepared by dissolving 25.0 g (118.0 mmol) of 1,3-diphenyl-2-propanone in 50 mL of dehydrated THF was added. Subsequently, the mixture was stirred at room temperature for 12 hours. The resulting yellow solution was quenched with a saturated aqueous solution of NH$_4$Cl. The soluble fraction was extracted with 100 mL of hexane, and this organic phase was washed with water and saturated brine, and then dried over magnesium sulfate. The solvent was distilled off, and the residue was purified by column chromatography to give a target product as a yellow solid (yield 3.7 g (12%)).

$^1$H NMR (270 MHz, CDCl$_3$): δ 3.69 (s, PhCH$_2$, 4H), 6.60-6.72 (m, Cp, 4H), 7.13-7.32 (m, PhCH$_2$, 10H).

(iv) Synthesis of (PhCH$_2$)$_2$C(Cp) (3,6-tBu$_2$-2,7-Ph$_2$-Flu)

Under a nitrogen atmosphere, 40 mL of anhydrous THF was added to 1.60 g (3.71 mmol) of 3,6-di-tert-butyl-2,7-diphenyl-fluorene, and the mixture was stirred. This solution was cooled in an ice bath, and 2.65 mL (4.13 mmol) of a 1.56 M hexane solution of n-butyllithium was added. The mixture was stirred at room temperature for 2 hours. The resulting red solution was cooled to −78° C. in a dry ice-methanol bath, and a solution prepared by dissolving 1.06 g (4.10 mmol) of 6,6-dibenzylfulvene in 20 mL of THF was added dropwise in 20 minutes. Subsequently, the mixture was stirred for 18 hours while the temperature was gradually increased to room temperature. To the resulting red-black solution, 60 mL of 1 N hydrochloric acid was added to terminate the reaction. 80 mL of ether was added to cause liquid separation, and the soluble fraction was extracted. This organic layer was washed two times with a saturated aqueous solution of sodium hydrogen carbonate, two times with water, and once with saturated brine, and then dried over magnesium sulfate. The solvent was distilled off, and the residue was purified by silica gel chromatography to give a target product as a whitish yellow powder (yield 0.59 g (23%)).

$^1$H NMR (270 MHz, CDCl$_3$): δ 1.25 (s, tBu(Flu), 18H), 2.66 (br, CpH, 1H), 3.22 (br, CH$_2$Ph, 4H), 4.41 (br, Flu-9H, 1H), 5.85-6.51 (m, Cp, 4H), 6.82-7.40 (m, Ph(Flu) and CH$_2$Ph and Flu, 22H), 7.67 (s, Flu, 2H).

MS (FD): M/z 688 (M$^+$).

(v) Synthesis of (PhCH$_2$)$_2$C(Cp) (3,6-tBu$_2$-2,7-Ph$_2$-Flu)ZrCl$_2$

Under a nitrogen atmosphere, a 100-mL Schlenk flask was charged with 0.59 g (0.855 mmol) of (PhCH$_2$)$_2$C(Cp) (3,6-tBu$_2$-2,7-Ph$_2$-Flu) and 40 mL of anhydrous diethyl ether, and the mixture was stirred. This mixed slurry solution was cooled in an ice bath, and 1.21 mL (1.88 mmol) of a 1.56 mol/L hexane solution of n-butyllithium was added. The mixture was stirred for 45 hours while the temperature was gradually increased to room temperature. The resulting red reaction liquid was cooled (−78° C.) in a dry ice/methanol bath, and then 0.200 g (0.858 mmol) of zirconium tetrachloride was added. Subsequently, the mixture was stirred for 42 hours while the temperature was gradually increased to room temperature to give a red-orange suspension.

The solvent was dried under reduced pressure, then the residue was dissolved in hexane in a glove box. The resultant liquid was passed through a glass filter filled with Celite, and the residue was washed with hexane. The orange colored powder insoluble in hexane was extracted with dichloromethane. The solvent in which the dichloromethane-solubles were dissolved was distilled off. The residue was washed with diethyl ether/cold pentane and dried to give a target product as an orange-colored powder (yield 515 mg (71%)).

$^1$H NMR (270 MHz, CDCl$_3$): δ 1.30 (s, tBu(Flu), 18H), 3.82 (d, J=15.5 Hz, CH$_2$Ph, 2H), 3.93 (d, J=15.5 Hz, CH$_2$Ph, 2H), 5.80 (t, J=2.6 Hz, Cp, 2H), 6.25 (t, J=2.6 Hz, Cp, 2H), 6.97-7.34 (m, Ph(Flu) and CH$_2$Ph, 20H), 7.37 (s, Flu, 2H), 8.32 (s, Flu, 2H).

MS (FD): M/z 848 (M$^+$).

Synthesis Example 7-3

Di(p-chlorophenyl)methylene(cyclopentadienyl)(octamethyloctahydrodibenzofluorenyl)zirconium dichloride was produced according to the method described in [Synthesis Example 2-2].

Synthesis Example 7-4

Diphenylmethylene(3-tert-butyl-5-ethylcyclopentadienyl)(2,7-di-tert-butylfluorenyl)zirconium dichloride was produced according to the method described in [Synthesis Example 4-4].

Polymerization Example (7A-1)

Synthesis of Syndiotactic Propylene Polymer (7A-1)

In a thoroughly nitrogen purged reaction bath having an internal volume of 3 m$^3$, 1000 L of n-heptane was placed, and 610 mL (0.93 mol) of a toluene solution of methylaluminoxane (Al=1.53 mol/l) was added dropwise at normal temperature. Meanwhile, in a thoroughly nitrogen purged side arm flask having an internal volume of 5 L, a magnetic stirrer was placed, and the flask was sequentially charged with 610 mL (0.93 mol) of a toluene solution of methylaluminoxane (Al=1.53 mol/l) and a toluene solution of 1.30 g (1.86 mmol) of dibenzylmethylene(cyclopentadienyl)(3,6-di-tert-butylfluorenyl)zirconium dichloride. The mixture was stirred for 20 minutes. This solution was added into the reaction bath, and then 3200 NL of hydrogen was supplied at 19 Nm³/h over 10 minutes. Subsequently, polymerization was initiated while supplying propylene at 65 kg/h and supplying hydrogen at such a rate that the gas phase concentration inside the reaction bath would be 53 mol %. Propylene was continuously supplied at a rate of 65 kg/h while maintaining the gas phase concentration of hydrogen inside the reaction bath at 53 mol %, and polymerization was performed for 4 hours at 25° C. Then, a small amount of diethylene glycol monoisopropyl ether was added to terminate the polymerization. The polymer obtained was washed with 1.8 m³ of heptane, and dried under reduced pressure at 80° C. for 15 hours to give a polymer in an amount of 100 kg. The polymerization activity was 13.4 kg-PP/mmol-Zr·hr, and the polymer obtained had [η]=1.90 dl/g, $Tm_1$=152° C., $Tm_2$=159° C., and rrrr fraction=94%. The properties are shown in Table 7-1.

Polymerization Example (7A-2)

Syndiotactic polypropylene (Trade Name: Finaplas 1471, MFR=5.0 g/10 min) produced by Total, Inc. was used as the syndiotactic propylene polymer (A-2). The properties are shown in Table 7-1.

Polymerization Example (7AA-1)

Synthesis of Syndiotactic Propylene Polymer (7AA-1)

A thoroughly nitrogen purged glass autoclave having an internal volume of 500 ml was charged with 250 ml of toluene, and then continuously charged with propylene at a rate of 150 liter/hour for 20 minutes at 25° C. Meanwhile, a magnetic stirrer was placed in a thoroughly nitrogen purged side arm flask having an internal volume of 30 ml, and the flask was sequentially charged with 5.00 mmol of a toluene solution of methylaluminoxane (Al=1.53 mol/l) and 5.0 µmol of a toluene solution of dibenzylmethylene(cyclopentadienyl)(3,6-di-tert-butylfluorenyl)zirconium dichloride. The mixture was stirred for 20 minutes. This solution was then added to the toluene in the glass autoclave which had been charged with propylene, and thereby the polymerization was initiated. Propylene gas was continuously supplied at a rate of 150 liter/hour, and the polymerization was performed at 25° C. for 45 minutes under normal pressure. Thereafter, a small amount of methanol was added to terminate the polymerization. The polymer solution was added to a large excess of methanol to precipitate the polymer. The polymer was then dried under reduced pressure at 80° C. for 12 hours to give a polymer in an amount of 2.38 g. The polymerization activity was 0.63 kg-PP/mmol-Zr·hr. The polymer obtained had [η]=1.9 dl/g, Tm=158° C. ($Tm_1$=152° C., $Tm_2$=158° C.), rrrr=93.5%, and Mw/Mn=2.0. The properties are shown in Table 7-3.

Polymerization Example (7AA-2)

Synthesis of Syndiotactic Propylene Polymer (7AA-2)

A thoroughly nitrogen purged glass autoclave having an internal volume of 500 ml was charged with 250 ml of toluene, and then continuously charged with propylene at a rate of 150 liter/hour for 20 minutes at 25° C. Meanwhile, a magnetic stirrer was placed in a thoroughly nitrogen purged side arm flask having an internal volume of 30 ml, and the flask was sequentially charged with 5.00 mmol of a toluene solution of methylaluminoxane (Al=1.53 mol/l) and 5.0 µmol of a toluene solution of dibenzylmethylene(cyclopentadienyl)(2,7-diphenyl-3,6-di-tert-butylfluorenyl)zirconium dichloride. The mixture was stirred for 20 minutes. This solution was then added to the toluene in the glass autoclave which had been charged with propylene, and thereby the polymerization was initiated. Propylene gas was continuously supplied at a rate of 150 liter/hour, and the polymerization was performed at 25° C. for 10 minutes under normal pressure. Thereafter, a small amount of methanol was added to terminate the polymerization. The polymer solution was added to a large excess of methanol to precipitate the polymer. The polymer was then dried under reduced pressure at 80° C. for 12 hours to give a polymer in an amount of 6.95 g. The polymerization activity was 7.58 kg-PP/mmol-Zr·hr. The polymer obtained had [η]=2.9 dl/g, Tm=162.0° C., and rrrr fraction=95.3%. The properties are shown in Table 7-3.

Syndiotactic Polypropylene (7AA-3)

The syndiotactic propylene polymer (7A-2) was used as the syndiotactic polypropylene (7AA-3).
The properties are shown in Table 7-3.

Polymerization Example (7AA-4)

Synthesis of Syndiotactic Propylene Polymer (7AA-4)

The syndiotactic propylene polymer (7AA-4) (propylene homopolymer) was produced according to the production process in Polymerization Example A-1, except that hydrogen was introduced (in other words, hydrogen was further supplied in the polymerization system). The syndiotactic propylene polymer (7AA-4) had the same rrrr fraction and Mw/Mn as those of the polymer (7A-1), and [η] of 1.4 dl/g. The properties of the polymer (7AA-4) are shown in Table 7-3.

Polymerization Example (7AA-5)

Synthesis of Syndiotactic Propylene Polymer (7AA-5)

The syndiotactic propylene polymer (7AA-5) (propylene homopolymer) was produced according to the production process in Polymerization Example 7A-1, except that hydrogen was introduced (in other words, hydrogen was further supplied in the polymerization system). The syndiotactic propylene polymer (7AA-5) had the same rrrr fraction and Mw/Mn as those of the polymer (7A-1), and [η] of 1.2 dl/g. The properties of the polymer (7AA-5) are shown in Table 7-3.

Syndiotactic Polypropylene (7AA-6)

Syndiotactic polypropylene (Trade Name: Finaplas 1571, MFR=9.1 g/10 min) produced by Total, Inc. was used as the syndiotactic polypropylene (7AA-6). The properties are shown in Table 7-3.

Polymerization Example (7B-1)

Synthesis of Propylene.α-Olefin Copolymer (7B-1)

A 4000-ml polymerization apparatus thoroughly purged with nitrogen was charged with 1834 ml of dry hexane and triisobutylaluminum (1.0 mmol) at normal temperature. Thereafter, the internal temperature of the polymerization apparatus was raised to 70° C., and propylene was introduced to raise the pressure in the system to 0.66 MPa, and ethylene was then introduced to adjust the pressure in the system to 1.36 MPa. Subsequently, the polymerization apparatus was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 15 minutes while maintaining the internal temperature at 70° C. and the pressure in the system at 1.36 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the polymer obtained was 105 g, MFR was 0.7 (g/10 min), and [η] measured at 135° C. in decalin was 2.5 (dL/g). The polymer properties measured are shown in Table 7-1. The rr1 value was 78%. The above procedures were repeated to obtain a required amount of the polymer, which was then melt-kneaded and used in Examples described later.

Polymerization Example (7B-2)

Propylene.α-Olefin Copolymer (7B-2)

A 4000-ml polymerization apparatus thoroughly purged with nitrogen was charged with 1834 ml of dry hexane and triisobutylaluminum (1.0 mmol) at normal temperature. Thereafter, the internal temperature of the polymerization apparatus was raised to 70° C., and propylene was introduced to raise the pressure in the system to 0.67 MPa, and ethylene was then introduced to adjust the pressure in the system to 1.37 MPa. Subsequently, the polymerization apparatus was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.37 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the polymer obtained was 90 g, MFR was 1.0 (g/10 min), and [η] measured at 135° C. in decalin was 2.3 (dL/g). The rr1 value was 75%. The polymer properties measured are shown in Table 7-1. The above procedures were repeated to obtain a required amount of the polymer, which was then melt-kneaded and used in Examples described later.

Polymerization Example (7B-3)

Synthesis of Propylene.α-Olefin Copolymer (7B-3)

A 4000-ml polymerization apparatus thoroughly purged with nitrogen was charged with 1834 ml of dry hexane, 20 g of 1-butene, and triisobutylaluminum (1.0 mmol) at normal temperature. Thereafter, the internal temperature of the polymerization apparatus was raised to 70° C., and propylene was introduced to raise the pressure in the system to 0.63 MPa, and ethylene was then introduced to adjust the pressure in the system to 1.33 MPa. Subsequently, the polymerization apparatus was charged with a toluene solution in which 0.001 mmol of di(p-chlorophenyl)methylene(cyclopentadienyl) (octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.30 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the resulting polymer was 107 g, MFR was 0.8 (g/10 min), and [η] measured at 135° C. in decalin was 2.4 (dL/g). The polymer properties measured are shown in Table 7-1. The rr1 value was 79%. The above procedures were repeated to obtain a required amount of the polymer, which was then melt-kneaded and used in Examples described later.

Polymerization Example (7BB-1)

The polymer was synthesized in the same manner as in Polymerization Example 7B-1.

Polymerization Example (7BB-2)

Propylene.α-Olefin Copolymer (7BB-2)

A 4000-ml polymerization apparatus thoroughly purged with nitrogen was charged with 1834 ml of dry hexane and triisobutylaluminum (1.0 mmol) at normal temperature. Thereafter, the internal temperature of the polymerization apparatus was raised to 70° C., and propylene was introduced to raise the pressure in the system to 0.64 MPa, and ethylene was then introduced to adjust the pressure in the system to 1.34 MPa. Subsequently, the polymerization apparatus was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 15 minutes while maintaining the internal temperature at 70° C. and the pressure in the system at 1.34 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the polymer obtained was 109 g, [η] measured at 135° C. in decalin was 2.6 (dL/g), and MFR was 0.6 (g/10 min). The polymer properties measured are shown in Table 7-1. The $rr_1$ value was 76%. The above procedures were repeated to obtain a required amount of the polymer, which was then used in Examples. For use in the evaluation of the film formability, a polymer was produced in accordance with the above-mentioned production process in a larger scale, and the polymer had the same ethylene content, rr fraction, [η], and Mw/Mn as those of the above-mentioned polymer.

Polymerization Example (7BB-3)

The polymer was synthesized in the same manner as in Polymerization Example 7B-2.

Polymerization Example (7BB-4)

Synthesis of Propylene.α-Olefin Copolymer (7BB-4)

A 4000-ml polymerization apparatus thoroughly purged with nitrogen was charged with 1834 ml of dry hexane, 20 g of 1-butene, and triisobutylaluminum (1.0 mmol) at normal temperature. Thereafter, the internal temperature of the polymerization apparatus was raised to 70° C., and propylene was introduced to raise the pressure in the system to 0.63 MPa, and ethylene was then introduced to adjust the pressure in the system to 1.33 MPa. Subsequently, the polymerization apparatus was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 70° C. and the pressure in the system at 1.33 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the resulting polymer was 102 g, [η] measured at 135° C. in decalin was 2.3 (dL/g), and MFR was 1.0 (g/10 min). The polymer properties measured are shown in Table 5-4. The $rr_1$ value was 75%. The properties are shown in Table 7-3.

Polymerization Example (7BB-5)

Synthesis of Propylene.α-Olefin Copolymer (7B-5)

A 4000-ml polymerization apparatus thoroughly purged with nitrogen was charged with 1834 ml of dry hexane and triisobutylaluminum (1.0 mmol) at normal temperature. Thereafter, the internal temperature of the polymerization apparatus was raised to 50° C., and propylene was introduced to raise the pressure in the system to 0.67 MPa, and ethylene was then introduced to adjust the pressure in the system to 1.37 MPa. Subsequently, the polymerization apparatus was charged with a toluene solution in which 0.001 mmol of di(p-chlorophenyl)methylene(cyclopentadienyl)(octamethyloctahydrodibenzofluorenyl)zirconium dichloride had been contacted with 0.3 mmol, in terms of aluminum, of methylaluminoxane (manufactured by Tosoh Finechem Corporation). Polymerization was then performed for 10 minutes while maintaining the internal temperature at 50° C. and the pressure in the system at 1.37 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the resulting polymer was 78 g, [η] measured at 135° C. in decalin was 3.5 (dL/g), and the ethylene content measured by $^{13}$C-NMR was 18 mol %. The polymer properties measured are shown in Table 7-4.

Propylene Polymers (7D-1) to (7D-8)
Propylene Polymer (7D-1)
PP produced by Prime Polymer Co., Ltd. (Trade Name: F102W, MFR=2.1 g/10 min)
Propylene Polymer (7D-2)
PP produced by Prime Polymer Co., Ltd. (Trade Name: J104W, MFR=5.2 g/10 min)
Propylene Polymer (7D-3)
PP produced by Prime Polymer Co., Ltd. (Trade Name: B101, MFR=0.7 g/10 min)
Propylene Polymer (7D-4)
PP produced by Prime Polymer Co., Ltd. (Trade Name: J106G, MFR=15.0 g/10 min)
Propylene Polymer (7D-5)
PP produced by Prime Polymer Co., Ltd. (Trade Name: J107G, MFR=30.0 g/10 min)
Propylene Polymer (7D-6)
PP produced by Prime Polymer Co., Ltd. (Trade Name: J108M, MFR=45.0 g/10 min)
Propylene Polymer (7D-7)

Synthesis of Propylene.Ethylene.Butene Copolymer

A 4000-ml polymerization apparatus thoroughly purged with nitrogen was charged with 1834 ml of dry hexane, 110 g of 1-butene, and triisobutylaluminum (1.0 mmol) at normal temperature. Thereafter, the internal temperature of the polymerization apparatus was raised to 55° C., and propylene was introduced to raise the pressure in the system to 0.58 MPa, and ethylene was then introduced to adjust the pressure in the system to 0.75 MPa. Subsequently, the polymerization apparatus was charged with a toluene solution in which 0.001 mmol of diphenylmethylene(3-tert-butyl-5-ethylcyclopentadienyl)(2,7-di-tert-butylfluorenyl)zirconium dichloride synthesized in Synthesis Example 7-2 had been contacted with 0.3 mmol, in terms of aluminum, of methylaluminoxane (manufactured by Tosoh Finechem Corporation). Polymerization was then performed for 25 minutes while maintaining the internal temperature at 55° C. and the pressure in the system at 0.75 MPa with ethylene, and 20 ml of methanol was added to terminate the polymerization. After the apparatus was depressurized, the resulting polymer was precipitated from the polymerization solution in 4 L of methanol, and dried in vacuum at 130° C. for 12 hours. The amount of the resulting polymer was 120.2 g and MFR was 0.7 (g/10 min). The polymer properties measured are shown in Table 7-3.

[Propylene Polymer (7D-8)]

The polymer (7D-8) was produced in accordance with the process conditions for producing the propylene polymer (7D-7), except that the polymerization temperature was changed to 40° C. The polymer produced had the same ethylene content and butene content as those of the polymer (7D-7), and had [η] of 4.0 and Mw/Mn of 2.1. The properties of the polymer obtained are shown in Table 7-4.

Figure 5:
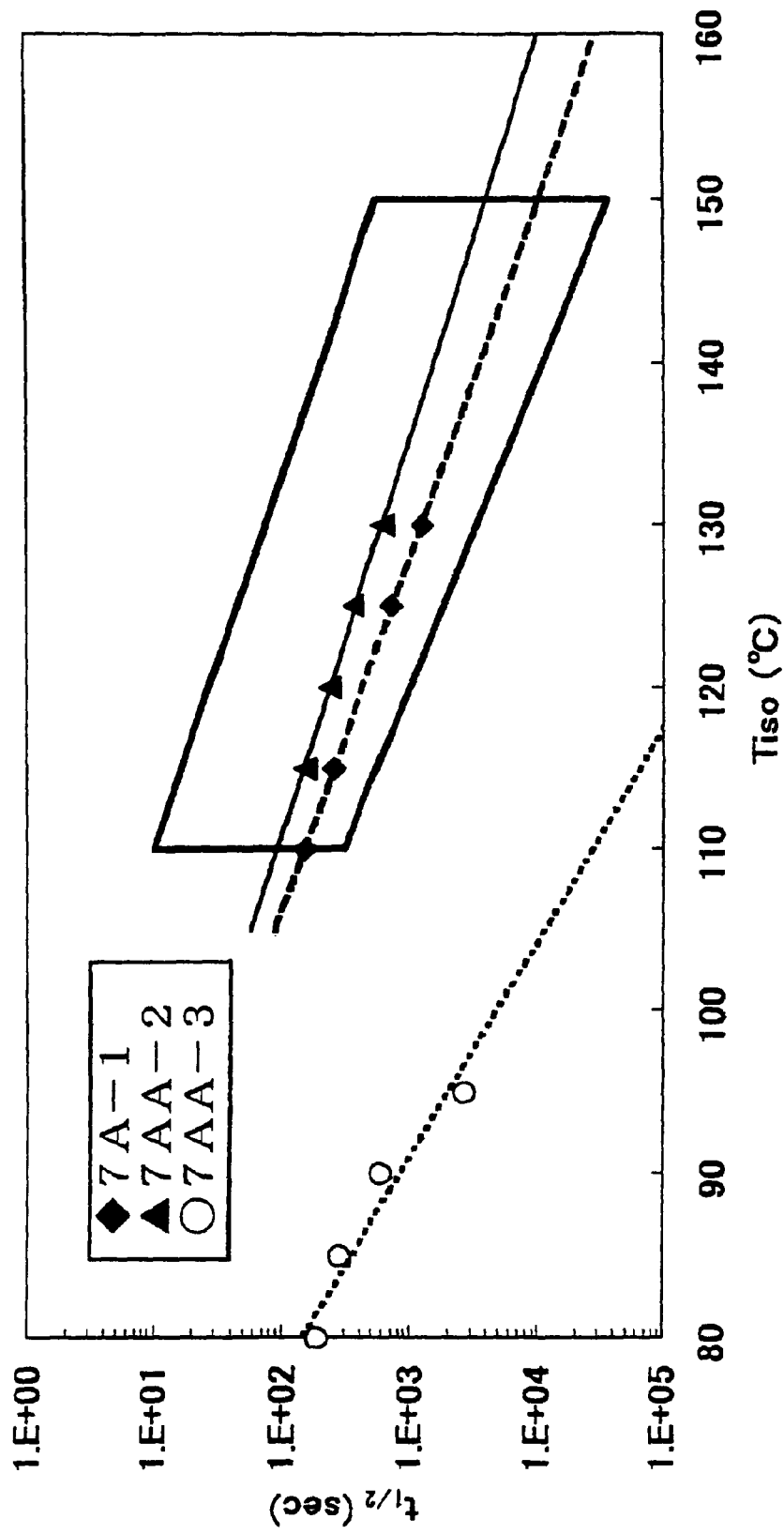
FIG. 5 is a diagram plotting the relationship between the specific isothermal crystallization temperature ($T_{iso}$) and the half-crystallization time ($t_{1/2}$) at the temperature, for the syndiotactic propylene polymers described in Examples and Comparative Examples of the present invention. The part surrounded by bold line indicates a region defined by the parameter inequality expression (Eq-1), which is a preferred property of the syndiotactic propylene polymer (7A) of the present invention. In addition, for reference, plots with respect to a polymer (7AA-2) belonging to (7A), which is not used in Examples, are also indicated.
Figure 6:
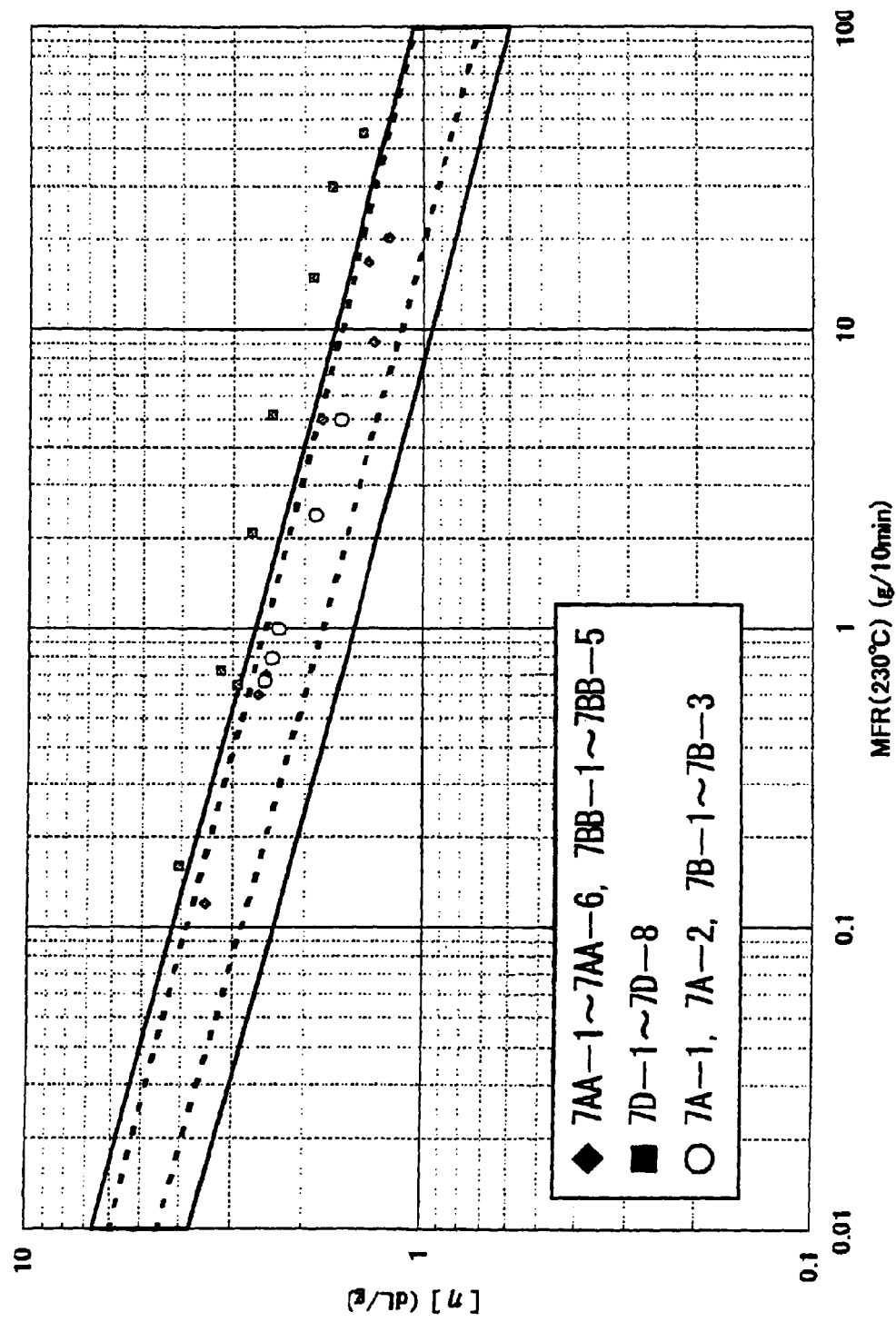
FIG. 6 is a diagram plotting the relationship between MFR and [η] for polymers belonging to the component (7A) or component (7B) (7AA-3 and 7AA-6 do not belong to the component (7A)) that are preferred embodiments of the present invention, and isotactic propylene polymers. The part surrounded by bold line indicates a region defined by the requirement (b-2) which is one of the preferred properties of the component (7B) of the present invention, and broken line indicates a preferred range of (b-2).

FIG. 5 shows a graph in which MFR and [η] are plotted with respect to the isotactic propylene-based polymers (7D-1) to (7D-8), (7BB-1) to (7BB-5), (7AA-1), (7AA-3), (7AA-4), (7AA-5), and (7AA-6). The graph shows that the polymer (7B) used in a preferred embodiment of the present invention is distinguished from the isotactic propylene-based polymers (7D-1) to (7D-8) by Formula (7b-2).

Example 7-1

71 parts by weight of the syndiotactic polypropylene (7A-1) obtained in [Polymerization Example (7A-1)], 29 parts by weight of the propylene.ethylene copolymer (7B-2) obtained in [Polymerization Example (7B-2)], 43 parts by weight of the ethylene.α-olefin copolymer (7C), 0.1 part by weight of tri(2,4-di-t-butylphenyl)phosphate as a secondary antioxidant, and 0.1 part by weight of n-octadecyl-3-(4'-hydroxy-3', 5'-di-t-butylphenyl)propionate as a heat stabilizer for the composition, were blended. The resulting composition was granulated into pellets under the conditions of set temperature of 230° C., resin extrusion rate of 40 g/min and 200 rpm, using a twin screw extruder manufactured by Prabo Co., Ltd.

A T-die with a diameter Φ of 25 mm and a lip width of 250 mm×0.8 mm was attached to a single screw extruder having a diameter Φ of 20 mm and L/D=28, manufactured by Thermo Co., Ltd. The pellets obtained above were extruded into a 250 μm thick film at an extruder temperature of 210° C., a roll temperature of 40° C. and a winding rate of 0.5 m/min. The results are shown in Table 7-2.

Example 7-2

40 parts by weight of the syndiotactic polypropylene (7A-1) obtained in [Polymerization Example (7A-1)], 60 parts by weight of the propylene.ethylene copolymer (7B-3) obtained in [Polymerization Example (7B-3)], and as in Example 7-1, equal amounts of the secondary antioxidant and the heat stabilizer for the composition, were blended. With the use of the twin screw extruder manufactured by Prabo Co., Ltd. and under the same extrusion and molding conditions as in Example 7-1, pellets and a film were formed. The results are shown in Table 7-2.

Example 7-3

67 parts by weight of the syndiotactic polypropylene (7A-1) obtained in [Polymerization Example (7A-1)], 33 parts by weight of the propylene.ethylene copolymer (7B-1) obtained in [Polymerization Example (7B-1)], 67 parts by weight of the ethylene.α-olefin copolymer (7C), and as in Example 7-1, equal amounts of the secondary antioxidant and the heat stabilizer for the composition, were blended. With the use of the twin screw extruder manufactured by Prabo Co., Ltd. and under the same extrusion and molding conditions as in Example 5-6, pellets and a film were formed. The results are shown in Table 7-2.

Example 7-4

50 parts by weight of the syndiotactic polypropylene (7A-1) obtained in [Polymerization Example (7A-1)], 50 parts by weight of the propylene.ethylene copolymer (7B-2) obtained in [Polymerization Example (7B-2)], 67 parts by weight of the ethylene.α-olefin copolymer (7C), and as in Example 5-6, equal amounts of the secondary antioxidant and the heat stabilizer for the composition, were blended. With the use of the twin screw extruder manufactured by Prabo Co., Ltd. and under the same extrusion and molding conditions as in Example 7-1, pellets and a film were formed. The results are shown in Table 7-2.

Comparative Example 7-1

71 parts by weight of the syndiotactic polypropylene (7A-2) (trade name: Finaplas1471, MFR=5.0 g/10 min) manufactured by Total Corp., 29 parts by weight of the propylene.ethylene copolymer (7B-2) obtained in [Polymerization Example (7B-2)], 43 parts by weight of the ethylene.α-olefin copolymer (7C), and as in Example 7-1, equal amounts of the secondary antioxidant and the heat stabilizer for the composition, were blended. With the use of the twin screw extruder manufactured by Prabo Co., Ltd. and under the same extrusion and molding conditions as in Example 7-1, pellets and a film were formed. The results are shown in Table 7-2.

TABLE 7-1

| | | | Syndiotactic propylene polymer (7A) | | propylene-α-olefin copolymer (7B) | | |
|---|---|---|---|---|---|---|---|
| | | | (7A-1) | (7A-2) | (7B-1) | (7B-2) | (7B-3) |
| Composition | (a) propylene content | (mol %) | 100 | 100 | 77 | 82 | 90 |
| | (b) ethylene content | (mol %) | 0 | 0 | 23 | 18 | 10 |
| | (c) α-olefin content | (mol %) | 0 | 0 | 0 | 0 | 0 |
| Melting Point (Tm) | | (° C.) | 152/159 | 113/125 | — | — | — |
| r.r.r.r. | | (%) | 94 | 69 | — | — | — |
| r.r. | | (%) | — | — | 78 | 75 | 79 |
| MFR | | (g/10 min) | 2.4 | 5.0 | 0.7 | 1.0 | 0.8 |
| [η] | | (dL/g) | 1.9 | 1.6 | 2.5 | 2.3 | 2.4 |
| Density | | (g/cm$^3$) | 0.882 | 0.887 | 0.852 | 0.852 | 0.860 |
| ΔH | | (mJ/mg) | 62 | 33 | — | — | — |
| Mw/Mn | | | 2.0 | 2.0 | 2.0 | 2.0 | 2.0 |
| $t_{1/2}$ (110° C.) | | (sec) | 138 | 22730 | | | |
| Amount of decane-soluble fraction | | (%) | <0.5 | 25 | | | |

TABLE 7-2

| | | Examples | | | | Comparative Example |
|---|---|---|---|---|---|---|
| | | 7-1 | 7-2 | 7-3 | 7-4 | 7-1 |
| Propylene polymer (7A) | | 7A-1 | 7A-1 | 7A-1 | 7A-1 | 7A-2 |
| Propylene•α-olefin copolymer (7B) | | 7B-2 | 7B-3 | 7B-1 | 7B-2 | 7B-2 |
| Ethylene•α-olefin copolymer (7C) | | 7C | — | 7C | 7C | 7C |
| (7A)/(7B)/(7C) composition ratio (parts by weight) | | 71/29/43 | 40/60/0 | 67/33/67 | 50/50/67 | 71/29/43 |
| Tm | (° C.) | 155 | 154 | 156 | 155 | 125 |

TABLE 7-2-continued

|  |  | Examples | | | | Comparative Example |
|---|---|---|---|---|---|---|
|  |  | 7-1 | 7-2 | 7-3 | 7-4 | 7-1 |
| Tensile modulus | (MPa) | 214 | 92 | 187 | 91 | 120 |
| Tensile impact strength | (kJ/m$^2$) | 181 | 146 | 527 | 334 | 70 |
| Light transmittance | (%) | 90 | 94 | 88 | 90 | 88 |
| Light transmittance after heat treatment | (%) | 90 | 90 | 91 | 89 | 72 |
| Reduction rate | (%) | 0 | 4 | 3 | 1 | 18 |
| Amount of fraction soluble in decane at room temperature | (wt %) | 49 | 60 | 58 | 78 | 59 |
| [η] of decane-soluble fraction |  | 2.1 | 2.4 | 2.1 | 2.1 | 2.0 |
| Composition (a) propylene content | (mol %) | 67.5 | 94.0 | 49.1 | 48.6 | 67.5 |
| (b) ethylene content | (mol %) | 26.1 | 6.0 | 45.3 | 45.8 | 26.1 |
| (c) α-olefin content | (mol %) | 6.4 | 0.0 | 5.6 | 5.6 | 6.4 |

TABLE 7-3

|  |  | Syndiotactic propylene polymer (7AA) | | | | | | Propylene·α-olefin copolymer (7BB) | | | | |
|---|---|---|---|---|---|---|---|---|---|---|---|---|
|  |  | (7AA-1) | (7AA-2) | (7AA-3) | (7AA-4) | (7AA-5) | (7AA-6) | (7BB-1) | (7BB-2) | (7BB-3) | (7BB-4) | (7BB-5) |
| r.r. | (%) | — | — | — | — | — | — | 82.9 | 84.6 | 83.5 | 82.1 | 75 |
| MFR | (g/10 min) | 2.4 |  | 5.0 | 16.8 | 20.3 | 9.1 | 0.7 | 0.6 | 1.0 | 1.0 | 0.1 |
| [η] | (dL/g) | 1.9 | 2.9 | 1.8 | 1.4 | 1.2 | 1.3 | 2.5 | 2.6 | 2.3 | 2.3 | 3.5 |

TABLE 7-4

|  |  | Propylene polymer (7D) | | | | | | | |
|---|---|---|---|---|---|---|---|---|---|
|  |  | (7D-1) | (7D-2) | (7D-3) | (7D-4) | (7D-5) | (7D-6) | (7D-7) | (7D-8) |
| MFR | (g/10 min) | 2.1 | 5.2 | 0.7 | 15.0 | 30.0 | 45.0 | 0.7 | 0.2 |
| [η] | (dL/g) | 2.7 | 2.4 | 3.2 | 1.9 | 1.7 | 1.4 | 2.9 | 4.0 |
| mmmm | (%) | — | — | — | 96 | — | 96 | — | — |

INDUSTRIAL APPLICABILITY

The catalyst (1) for olefin polymerization of the present invention (1) has excellent polymerization activity and has a large impact on the olefin polymerization industries.

The method for producing the propylene-based copolymer [B1] of the present invention (2) is industrially useful since the method is capable of polymerization at high temperatures and high molecular weight propylene copolymer [B1] can be obtained thereby.

The syndiotactic propylene polymer (A) of the present invention (3) is a syndiotactic propylene polymer having improved crystallization rate and crystallization temperature and excellent moldability compared to existing polymers. Also, molded products obtained from the polymer have an excellent balance between heat resistance, transparency, and rigidity and strength, and thus various new applications that could not be applied heretofore to isotactic polypropylene, can be expected.

The invention claimed is:
1. A method for producing a syndiotactic α-olefin polymer, comprising polymerizing one or more monomers selected from α-olefins having 2 or more carbon atoms, in the presence of a catalyst (1) for olefin polymerization which comprises:

(a-1) a bridged metallocene compound represented by the following Formula [1-1], and
(b) at least one compound selected from:
(b-1) an organoaluminum oxy compound,
(b-2) a compound which reacts with the bridged metallocene compound (a-1) to form an ion pair, and
(b-3) an organoaluminum compound;

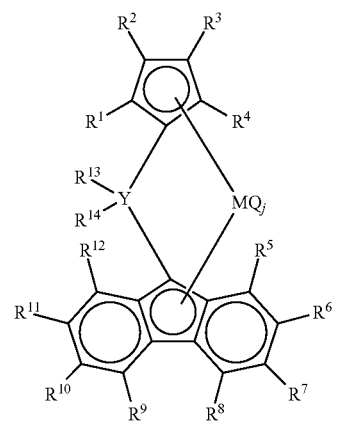

[1-1]

wherein in Formula [1-1], $R^1$, $R^2$, $R^3$ and $R^4$ are each a hydrogen atom;

$R^5$, $R^8$, $R^9$ and $R^{12}$ are each a hydrogen atom;

$R^7$ and $R^{10}$ are each a tert-butyl group, and $R^6$ and $R^{11}$ are each an aryl group or a substituted aryl group;

$R^6$ and $R^7$ are not linked to each other to form a ring and $R^{10}$ and $R^{11}$ are not linked to each other to form a ring;

$R^{13}$ and $R^{14}$, which may be identical to or different from each other, are each a hydrocarbon group having 2 to 20 carbon atoms, provided that $R^{13}$ and $R^{14}$ are not linked to each other to form a ring;

M is Ti, Zr or Hf;

Y is carbon;

Q, which may be identical to or different from each other, is selected from a halogen, a hydrocarbon group, an anion ligand and a neutral ligand capable of coordination with a lone electron pair; and j is an integer from 1 to 4.

2. The method for producing the syndiotactic α-olefin polymer according to claim 1, wherein the catalyst (1) for olefin polymerization further comprises a support (c).

3. The method for producing a syndiotactic α-olefin polymer according to claim 1, wherein $R^6$ and $R^{11}$ are identical groups.

4. The method for producing a syndiotactic α-olefin polymer according to claim 1, wherein $R^{13}$ and $R^{14}$ are each any one selected from an ethyl group, an n-propyl group, an isopropyl group, an n-butyl group, an isobutyl group, a tert-butyl group, cyclopentyl group, a cyclohexyl group, a cycloheptyl group, a phenyl group, an m-tolyl group, a p-tolyl group, a benzyl group, an m-(trifluoromethyl)phenyl group, a p-(trifluoromethyl)phenyl group, a bis(trifluoromethyl)phenyl group, an m-chlorophenyl group, a p-chlorophenyl group and a dichlorophenyl group.

5. The method for producing a syndiotactic α-olefin polymer according to claim 1, wherein the bridged metallocene compound (a-1) has a Cs-symmetric structure.

6. A method for producing a propylene-based copolymer (B1), comprising polymerizing propylene and at least one monomer selected from α-olefins excluding propylene and polyenes, in the presence of a catalyst (2) for olefin polymerization which comprises:

(a-2) a bridged metallocene compound represented by the following Formula [1-2], (b) at least one compound selected from:

(b-1) an organoaluminum oxy compound, (b-2) a compound which reacts with the bridged metallocene compound (a-2) to form an ion pair, and (b-3) an organoaluminum compound;

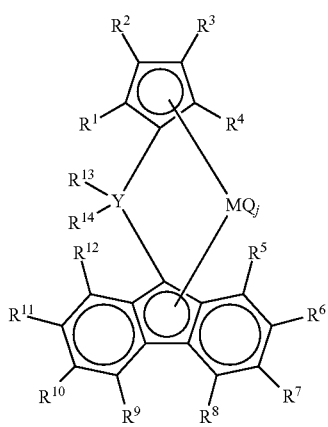

[1-2]

wherein in Formula [1-2], $R^1$, $R^2$, $R^3$, and $R^4$, are each a hydrogen atom;

$R^5$, $R^8$, $R^9$ and $R^{12}$ are each a hydrogen atom;

$R^6$ and $R^{11}$ are the same atoms or same groups selected from a hydrogen atom, a hydrocarbon group and a silicon-containing group;

$R^7$ and $R^{10}$ are each a tert-butyl group;

$R^{13}$ and $R^{14}$, which may be identical to or different from each other, are each selected from a chloroaryl group having 6 to 20 carbon atoms, and a fluoroalkylaryl group having 7 to 40 carbon atoms;

M is Ti, Zr or Hf;

Y is carbon or silicon;

Q is selected from a halogen, a hydrocarbon group, a neutral, conjugated or non-conjugated diene having 10 or fewer carbon atoms, an anion ligand, and a neutral ligand capable of coordination with a lone electron pair, in identical or different combinations;

j is an integer from 1 to 4; and wherein the propylene content in the propylene-based copolymer (B1) is in the range of 90 to 55 mol %.

7. The method for producing a propylene-based copolymer (B1) according to claim 6, wherein in the Formula [1-2], $R^6$ and $R^{11}$ are the same groups selected from a hydrocarbon group and a silicon-containing group.

8. The method for producing a propylene-based copolymer (B1) according to claim 7, wherein $R^6$ and $R^{11}$ are each a phenyl group.

9. The method for producing a propylene-based copolymer (B1) according to claim 6, wherein the chloroaryl group having 6 to 20 carbon atoms, and the fluoroalkylaryl group having 7 to 40 carbon atoms are each a substituted phenyl group having its substituent located at the meta-position and/or para-position.

10. The method for producing a propylene-based copolymer (B1) according to claim 9, wherein $R^{13}$ and $R^{14}$ are each the chloroaryl group having 6 to 20 carbon atoms.

11. The method for producing a propylene-based copolymer (B1) according to claim 9, wherein $R^{13}$ and $R^{14}$ are each selected from the group consisting of an m-chlorophenyl group, a p-chlorophenyl group, an m-trifluorophenyl group, a p-trifluorophenyl group, a 3,5-ditrifluorophenyl group, a 5-chloronaphthyl group, and a 6-chloronaphthyl group.

12. The method for producing a propylene-based copolymer (B1) according to claim 11, wherein $R^{13}$ and $R^{14}$ are each are a p-chlorophenyl group.

13. The method for producing a propylene-based copolymer (B1) according to claim 6, wherein the polymerizing is performed at the temperature within the range from 40 to 200° C.

* * * * *